(12) United States Patent
Karol et al.

(10) Patent No.: US 10,699,597 B2
(45) Date of Patent: Jun. 30, 2020

(54) MODULAR ELECTRO-MECHANICAL AGENT

(71) Applicant: DEKA Products Limited Partnership, Manchester, NH (US)

(72) Inventors: Daniel Scott Karol, Southborough, MA (US); Jason Michael Overson, Manchester, NH (US); William Daniel Hunt, Gilmanton, NH (US); Jacob William Scarpaci, Manchester, NH (US); Andrew Stephen Coll, Manchester, NH (US); Gregory Needel, Dallas, TX (US); Yuuki Gil Crowley, Nashua, NH (US); Christopher C. Langenfeld, Nashua, NH (US); Michael J. Slate, Merrimack, NH (US); Prashant Bhat, Bedford, NH (US); Grant A. Peret, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 158 days.

(21) Appl. No.: 15/419,882

(22) Filed: Jan. 30, 2017

(65) Prior Publication Data
US 2017/0221383 A1    Aug. 3, 2017

Related U.S. Application Data

(60) Provisional application No. 62/290,267, filed on Feb. 2, 2016, provisional application No. 62/367,587, filed
(Continued)

(51) Int. Cl.
*G09B 23/00* (2006.01)
*G09B 23/18* (2006.01)
(Continued)

(52) U.S. Cl.
CPC .......... *G09B 23/00* (2013.01); *A63H 33/042* (2013.01); *A63H 33/26* (2013.01);
(Continued)

(58) Field of Classification Search
CPC ...... A63H 33/04; A63H 33/042; A63H 33/08; A63H 33/26; G09B 23/00; G09B 23/185
(Continued)

(56) References Cited

U.S. PATENT DOCUMENTS

| 1,101,324 A | 3/1914 | Parker |
| 1,385,144 A | 7/1921 | Myers |

(Continued)

FOREIGN PATENT DOCUMENTS

| CN | 206579402 | 10/2017 |
| EP | 1136195 | 9/2001 |

(Continued)

OTHER PUBLICATIONS 8020.net, Part No. 2811—Ready Tube Tabletop Fastening Kit, Found Feb. 7, 2020 (Year: 2020).*
(Continued)

*Primary Examiner* — Chase E Leichliter
(74) *Attorney, Agent, or Firm* — Kathleen Chapman

(57) ABSTRACT

A modular electro-mechanical agent having a plurality of modules including mechanical and electrical components, that can be constructed to complete at least one pre-determined task and/or contribute in performing the at least one pre-determined task. The electro-mechanical agent can include extension modules and can be altered as per user preference to add, eliminate or modify any features of the agent for completing and/or participating in a plurality of pre-determined tasks.

19 Claims, 171 Drawing Sheets

Related U.S. Application Data on Jul. 27, 2016, provisional application No. 62/383,167, filed on Sep. 2, 2016, provisional application No. 62/385,760, filed on Sep. 9, 2016, provisional application No. 62/415,065, filed on Oct. 31, 2016.

(51) Int. Cl.
*A63H 33/04* (2006.01)
*A63H 33/26* (2006.01)
*G09B 19/00* (2006.01)
*H02K 5/00* (2006.01)

(52) U.S. Cl.
CPC ....... *G09B 19/0053* (2013.01); *G09B 23/185* (2013.01); *H02K 5/00* (2013.01); *A63H 2200/00* (2013.01)

(58) Field of Classification Search
USPC .................. 446/85, 86, 90, 91, 102, 103
See application file for complete search history.

(56) References Cited

U.S. PATENT DOCUMENTS

| | | |
|---|---|---|
| 2,791,911 A | 5/1957 | Wasko |
| 2,811,819 A | 11/1957 | Heth |
| 2,831,384 A | 4/1958 | Weiss |
| 2,859,634 A | 11/1958 | Walter |
| 3,176,597 A | 4/1965 | Seaman |
| 3,490,360 A | 1/1970 | Reynolds |
| 3,675,510 A | 7/1972 | Duggar, Jr. |
| 3,873,167 A | 3/1975 | Anderson |
| 3,882,885 A | 5/1975 | McCain |
| D235,620 S | 7/1975 | Forseth |
| 3,936,099 A | 2/1976 | Braun |
| 4,005,917 A | 2/1977 | Richardson |
| D253,641 S | 12/1979 | Tritchka |
| 4,335,899 A | 6/1982 | Hiscock |
| D269,786 S | 7/1983 | Ostling |
| 4,524,652 A | 6/1985 | Wenzel |
| 4,545,230 A | 10/1985 | Jungesjo |
| 4,547,160 A | 10/1985 | Labelle |
| 4,630,498 A | 12/1986 | Santi |
| 4,648,783 A | 3/1987 | Tan et al. |
| D296,886 S | 7/1988 | Young, Jr. |
| 4,819,521 A | 4/1989 | Lang |
| 4,873,899 A | 10/1989 | Mazurek |
| D309,254 S | 7/1990 | Guile |
| D318,219 S | 7/1991 | Guile |
| D318,791 S | 8/1991 | Guile |
| 5,137,500 A | 8/1992 | Lhotak |
| D330,052 S | 10/1992 | Klitsner |
| 5,194,031 A | 3/1993 | Sahler |
| 5,213,176 A | 5/1993 | Oroku |
| D339,595 S | 9/1993 | Waskiewicz |
| 5,251,711 A | 10/1993 | Meyer |
| D341,605 S | 11/1993 | Waskiewicz |
| D341,607 S | 11/1993 | Waskiewicz |
| D343,179 S | 1/1994 | Waskiewicz |
| D349,736 S | 8/1994 | Hatting |
| 5,395,171 A | 3/1995 | Waskiewicz |
| D358,545 S | 5/1995 | Price |
| 5,429,438 A * | 7/1995 | Wood ............... F16C 29/02 384/26 |
| D364,199 S | 11/1995 | Schmidt |
| D366,073 S | 1/1996 | Schmidt |
| D367,069 S | 2/1996 | Thom, Jr. |
| 5,515,934 A * | 5/1996 | Davis ............... B25J 5/007 180/15 |
| D373,077 S | 8/1996 | Dudley |
| D376,160 S | 12/1996 | Waskiewicz |
| 5,582,488 A | 12/1996 | Dudley |
| D378,339 S | 3/1997 | Whitley |
| 5,626,062 A | 5/1997 | Colvin |
| D382,463 S | 8/1997 | Cloud |
| D388,475 S | 12/1997 | Glickman |
| D395,469 S | 6/1998 | Glickman |
| D396,436 S | 7/1998 | Liska |
| 5,775,046 A * | 7/1998 | Fanger ............... A47B 81/06 108/157.16 |
| D399,222 S | 10/1998 | Chang |
| 5,836,702 A | 11/1998 | Whiddon |
| D402,995 S | 12/1998 | Hakamata |
| D402,996 S | 12/1998 | Watanabe |
| 5,888,114 A * | 3/1999 | Slocum ............... A47B 47/0075 446/118 |
| 5,926,673 A | 7/1999 | Foster |
| D412,897 S | 8/1999 | Attwood |
| D412,940 S | 8/1999 | Kato |
| 5,938,497 A * | 8/1999 | Mott ............... A63H 33/10 446/122 |
| 5,997,117 A * | 12/1999 | Krietzman ............... H02B 1/301 312/265.4 |
| 6,004,021 A * | 12/1999 | Rothbarth ............... A63H 33/04 703/2 |
| 6,059,631 A * | 5/2000 | Maddock ............... A63H 33/082 446/104 |
| D427,217 S | 6/2000 | Ostling |
| 6,089,758 A | 7/2000 | Ward |
| 6,101,902 A | 8/2000 | Wei |
| D431,572 S | 10/2000 | Antony |
| D434,351 S | 11/2000 | Takamori |
| D435,001 S | 12/2000 | Takamori |
| D436,561 S | 1/2001 | Louden |
| D442,200 S | 5/2001 | Koch |
| D442,539 S | 5/2001 | Nickel |
| D443,880 S | 6/2001 | Iida |
| D447,148 S | 8/2001 | Antony |
| 6,283,076 B1 | 9/2001 | Simpson |
| D451,526 S | 12/2001 | Lee |
| D453,214 S | 1/2002 | Komatsubara |
| 6,481,177 B1 * | 11/2002 | Wood ............... F16B 7/187 403/189 |
| D470,861 S | 2/2003 | Kohno |
| D470,862 S | 2/2003 | Kohno |
| D472,843 S | 4/2003 | Marquez-Pickering |
| D473,902 S | 4/2003 | Panno |
| 6,547,340 B2 | 4/2003 | Harris |
| 6,623,169 B2 | 9/2003 | Ward |
| D482,847 S | 12/2003 | Lee |
| 6,674,259 B1 | 1/2004 | Norman |
| 6,676,474 B2 * | 1/2004 | Glickman ............... A63H 33/062 446/120 |
| 6,722,221 B2 | 4/2004 | Maxwell |
| D491,428 S | 6/2004 | Barnett |
| D498,775 S | 11/2004 | Hu |
| D498,777 S | 11/2004 | Hu |
| D498,778 S | 11/2004 | Hu |
| 6,857,707 B2 | 2/2005 | Guile |
| 6,877,574 B2 * | 4/2005 | Thompson ............... B25J 5/007 180/65.1 |
| 6,910,980 B2 | 6/2005 | Hamilton |
| D514,607 S | 2/2006 | Wittenstein |
| 6,997,364 B2 * | 2/2006 | Oetlinger ............... B26D 7/1818 225/104 |
| D523,325 S | 6/2006 | Ignagni |
| D527,245 S | 8/2006 | Kelleghan |
| D527,738 S | 9/2006 | Pearson, Sr. |
| D528,951 S | 9/2006 | Oben |
| 7,104,863 B2 * | 9/2006 | Mimlitch ............... A63H 33/042 434/107 |
| D530,187 S | 10/2006 | Esbaugh |
| D534,064 S | 12/2006 | Gimpel |
| D534,905 S | 1/2007 | Sergi |
| D535,204 S | 1/2007 | Bender |
| D536,696 S | 2/2007 | McRae |
| 7,193,384 B1 | 3/2007 | Norman |
| D544,509 S | 6/2007 | Tiller |
| D556,842 S | 12/2007 | Webber |
| D558,006 S | 12/2007 | Tuan Mu |
| D559,080 S | 1/2008 | Boote |
| D561,793 S | 2/2008 | Kanemitsu |
| 7,330,776 B1 | 2/2008 | Norman |

(56) References Cited

U.S. PATENT DOCUMENTS

| | | | |
|---|---|---|---|
| 7,344,463 B2 | 3/2008 | Reiter | |
| D565,443 S | 4/2008 | Frake | |
| D585,345 S | 1/2009 | Maier | |
| 7,510,457 B2 * | 3/2009 | Hussa-Lietz | A63H 33/04 434/79 |
| D597,112 S | 7/2009 | Takeuchi | |
| D604,346 S | 11/2009 | Chiang | |
| D611,391 S | 3/2010 | Bourgeois | |
| D616,004 S | 5/2010 | Andersoon | |
| D616,727 S | 6/2010 | Chou | |
| D618,720 S | 6/2010 | Wasai | |
| D618,721 S | 6/2010 | Wasai | |
| D619,631 S | 7/2010 | Otsuka | |
| D630,598 S | 1/2011 | Bleau | |
| 7,904,706 B2 | 3/2011 | Lambert | |
| 7,914,408 B2 | 3/2011 | Young | |
| D636,790 S | 4/2011 | Brooks | |
| 7,934,971 B2 * | 5/2011 | Mimlitch, III | A63H 33/12 446/102 |
| D641,611 S | 7/2011 | Minayoshi | |
| 7,980,335 B2 | 7/2011 | Potter | |
| 8,025,551 B2 | 9/2011 | Torres | |
| D647,118 S | 10/2011 | Parker | |
| 8,029,399 B2 | 10/2011 | Thompson | |
| D660,334 S | 5/2012 | Takeuchi | |
| D660,828 S | 5/2012 | Petsch | |
| D666,133 S | 8/2012 | In | |
| 8,235,861 B2 | 8/2012 | Lopez | |
| D667,049 S | 9/2012 | Park | |
| D668,527 S | 10/2012 | Noumi | |
| D670,304 S | 11/2012 | Shimozaki | |
| D670,305 S | 11/2012 | Shimozaki | |
| D675,130 S | 1/2013 | Senn | |
| D677,718 S | 3/2013 | Huck | |
| 8,387,319 B1 * | 3/2013 | Gilles-Gagnon | F24S 25/615 52/173.3 |
| D683,099 S | 5/2013 | Wright | |
| D683,616 S | 6/2013 | Noumi | |
| D684,955 S | 6/2013 | Deck | |
| 8,591,281 B2 | 11/2013 | Mimlitch, III | |
| D696,342 S | 12/2013 | Lewis | |
| D699,267 S | 2/2014 | Nelson | |
| D700,825 S | 3/2014 | Furling | |
| D702,411 S | 4/2014 | Bromm | |
| D703,253 S | 4/2014 | Lannoch | |
| D705,762 S | 5/2014 | Yu | |
| D706,340 S | 6/2014 | Lee | |
| D707,276 S | 6/2014 | Norman | |
| D711,974 S | 8/2014 | Norman | |
| D714,213 S | 9/2014 | Rooyakkers | |
| D716,352 S | 10/2014 | Jansson | |
| 8,950,565 B2 | 2/2015 | Adams | |
| D725,037 S | 3/2015 | Norman | |
| D727,186 S | 4/2015 | Shamir | |
| D728,432 S | 5/2015 | Lin | |
| 9,033,835 B2 | 5/2015 | Blank | |
| D731,449 S | 6/2015 | Norman | |
| D732,932 S | 6/2015 | Ng | |
| 9,079,465 B1 | 7/2015 | Sanftleben | |
| 9,097,317 B2 | 8/2015 | Ai | |
| D738,439 S | 9/2015 | Kanbar | |
| D750,676 S | 3/2016 | Brown | |
| D756,199 S | 5/2016 | Carrubba | |
| D757,832 S | 5/2016 | Calcino | |
| D765,551 S | 9/2016 | Baker, Jr. | |
| D767,375 S | 9/2016 | Nakano | |
| 9,452,339 B1 * | 9/2016 | Shah | F41B 4/00 |
| D774,987 S | 12/2016 | Miles | |
| D776,896 S | 1/2017 | Paitchell | |
| D779,587 S | 2/2017 | Li | |
| D779,618 S | 2/2017 | Farthing | |
| D780,118 S | 2/2017 | Rudolph | |
| D781,345 S | 3/2017 | Pratley | |
| D787,380 S | 5/2017 | Karol | |
| D789,436 S | 6/2017 | McCurry | |
| D794,690 S | 8/2017 | Sewell | |
| D795,676 S | 8/2017 | Karol | |
| D796,147 S | 8/2017 | Anderson | |
| D799,937 S | 10/2017 | Karol | |
| D800,194 S | 10/2017 | Sewell | |
| D802,037 S | 11/2017 | Cordingley | |
| D802,039 S | 11/2017 | Cordingley | |
| D806,614 S | 1/2018 | Turner | |
| D811,948 S | 3/2018 | Turner | |
| D815,675 S | 4/2018 | Karol | |
| D816,136 S | 4/2018 | Karol | |
| D817,371 S | 5/2018 | Karol | |
| D817,372 S | 5/2018 | Karol | |
| D818,015 S | 5/2018 | Karol | |
| D824,971 S | 8/2018 | Karol | |
| D824,972 S | 8/2018 | Karol | |
| D825,631 S | 8/2018 | Karol | |
| D828,235 S | 9/2018 | Kittrel, Jr. et al. | |
| D829,627 S | 10/2018 | Hunt | |
| 2001/0037925 A1 | 11/2001 | Becker | |
| 2002/0064447 A1 * | 5/2002 | Gurevich | B25J 9/023 414/749.1 |
| 2002/0102911 A1 * | 8/2002 | Mammano | A63H 17/12 446/479 |
| 2003/0168291 A1 * | 9/2003 | Sneed | B66B 7/02 187/408 |
| 2003/0213328 A1 * | 11/2003 | Grosso | B62D 65/18 74/490.01 |
| 2003/0236146 A1 | 12/2003 | Pattok | |
| 2004/0077257 A1 * | 4/2004 | Mimlitch, III | A63H 33/042 446/85 |
| 2006/0053922 A1 | 3/2006 | Laabs | |
| 2006/0060032 A1 | 3/2006 | Baker | |
| 2006/0061925 A1 | 3/2006 | Shrier | |
| 2007/0000357 A1 | 1/2007 | Hsieh | |
| 2007/0096541 A1 | 5/2007 | Guile | |
| 2007/0142156 A1 | 6/2007 | Smook | |
| 2008/0063400 A1 * | 3/2008 | Hudson | A63H 30/04 398/106 |
| 2008/0086241 A1 * | 4/2008 | Phillips | G05D 1/0038 701/2 |
| 2008/0176688 A1 | 7/2008 | Sakura | |
| 2008/0182693 A1 | 7/2008 | Holmes | |
| 2008/0202837 A1 | 8/2008 | Macedo Ribeiro | |
| 2008/0220689 A1 * | 9/2008 | Mimlitch | A63H 33/108 446/91 |
| 2008/0269949 A1 | 10/2008 | Norman | |
| 2009/0080936 A1 | 3/2009 | Parisi | |
| 2009/0314391 A1 * | 12/2009 | Crump | B22F 3/1055 148/523 |
| 2010/0105511 A1 | 4/2010 | Thompson | |
| 2010/0140888 A1 | 6/2010 | McKinnon | |
| 2010/0196047 A1 | 8/2010 | Jin | |
| 2012/0045247 A1 | 2/2012 | Lewis | |
| 2012/0183331 A1 | 7/2012 | Huang | |
| 2012/0256471 A1 | 10/2012 | Scogna | |
| 2013/0165238 A1 | 6/2013 | Batista Jerez | |
| 2013/0277164 A1 | 10/2013 | Prout | |
| 2013/0306925 A1 | 11/2013 | Cozza | |
| 2013/0327171 A1 | 12/2013 | Shu | |
| 2014/0009561 A1 * | 1/2014 | Sutherland | B25J 5/007 348/14.05 |
| 2014/0206486 A1 | 7/2014 | Fuchs | |
| 2014/0374567 A1 | 12/2014 | Weidner | |
| 2015/0082949 A1 | 3/2015 | MacDonald | |
| 2015/0115694 A1 | 4/2015 | Bando | |
| 2015/0130260 A1 | 5/2015 | Bando | |
| 2015/0136012 A1 * | 5/2015 | Williams | B63G 8/001 114/312 |
| 2015/0308098 A1 * | 10/2015 | Tessadori | E04F 13/0807 52/698 |
| 2015/0321348 A1 * | 11/2015 | Rollinson | B25J 9/065 700/253 |
| 2016/0257357 A1 * | 9/2016 | Ben-Tzvi | B62D 55/02 |
| 2016/0375371 A1 * | 12/2016 | Slepov | A63H 33/12 446/85 |
| 2017/0016489 A1 | 1/2017 | Grosskopf | |
| 2017/0097072 A1 | 4/2017 | Carames Jimenez | |

(56) References Cited

U.S. PATENT DOCUMENTS

| | | |
|---|---|---|
| 2017/0210164 A1 | 7/2017 | Mjelde |
| 2017/0210437 A1 | 7/2017 | Black |
| 2017/0297366 A1 | 10/2017 | Parrott et al. |
| 2017/0373554 A9 | 12/2017 | Kim |
| 2017/0373558 A1 | 12/2017 | Ramirez, Jr. |
| 2018/0003185 A1 | 1/2018 | Afshar |

FOREIGN PATENT DOCUMENTS

| | | |
|---|---|---|
| EP | 1393851 | 3/2004 |
| EP | 1669254 A1 | 6/2006 |
| JP | 2002021981 A | 1/2002 |
| JP | 2007309488 A | 11/2007 |
| KR | 201300622 | 9/2013 |
| WO | WO 2007041291 A1 | 4/2007 |
| WO | WO 2017136290 A1 | 8/2017 |

OTHER PUBLICATIONS mcmaster.com, T-Slotted Framing Machine Bracket, Found Feb. 7, 2020 (Year: 2020).*

25 Sprockets—VEX Robotics, http://www.vexrobotics.com/25-sprockets.html, Innovation First International, Inc. © 2002-2016.

35 Sprockets—VEX Robotics, http://www.vexrobotics.com/35-sprockets.html, Innovation First International, Inc. © 2002-2016.

125" Bearing Bore Gears—VEX Robotics, http://www.vexrobotics.com/bearing-bore-gears.html, Innovation First International, Inc. Copyright © 2002-2016.

Adjustable Angle Bracket—TEKNOMEGA S.r.l. (http://www.teknomega.com) http://www.teknomega.com/fixing-system-for-photovoltaic-installations/steel-brackets-for-strut-profile/adjustable-angle-bracket © 2009 TEKNOMEGA S.r.l.

Andy Mark, Gears Search—Andy Mark Inc. (http://www.andymark.com) http://www.andymark.com/Gears-s/85.htm © 2017 AndyMark, Inc. (2 pgs.).

Andy Mark, motor brackets search—AndyMark Inc. (https://www.andymark.com) (https://www.andymark.com/Search-s/545.htm?Search=motor+bracket&Submit=) © 2017 Andy Mark Inc.

Andymark Gearbox search—AndyMark Inc.,—(http://www.andymark.com) http://www.andymark.com/Search-s/545.htm?Search=gearbox&Submit= Copyright © 2017 AndyMark, Inc.

Andymark Omni-Wheel Search—AndyMark, Inc. (http://www.andymark.com) http://www.andymark.com/Search-s/545.htm?Search=omniwheel&Submit= © 2017 AndyMark, Inc.

AndyMark Sprocket Search—AndyMark Inc. (http://www.andymark.com) http://www.andymark.com/Search-s/545.htm?Search=sprocket&Submit= Copyright © 2017 AndyMark, Inc.

AndyMark Wheel Search—AndyMark Inc. (http://www.andymark.com) http://andymark.com/Wheel-s/229.htm © 2017 AndyMark, Inc.

AP Table Chain Gear Assembly, posted on brunswickbowling.com, no posted date given, no production date given, [online], [site visited May 11, 2017], Available from Internet, <URL: http://www.brunswickbowling.com/products/parts/gs-pinsetter/detail/table-chain-gear-assembly/>.

Ball Shifter & Dog Gears—VEX Robotics, http://www.vexrobotics.com/shifter-gears.html, Innovation First International, Inc. Copyright © 2002-2016.

Camshaft Sprocket Chain Drive, posted on dlbensinger.com, no posted date given, no production date given, [online], [site visited May 11, 2017], Available from Internet , <URL: https://www.dlbensinger.com/product_info.php?manufacturers_id=10&products_id=796>.

Claw Kit—VEX Robotics, http://www.vexrobotics.com/276-2212.html, Innovation First International, Inc. © 2002-2016.

Gear Base Pack—VEX Robotics, http://www.vexrobotics.com/liq-gear-g.html, Innovation First International, Inc. Copyright © 2002-2016.

Gearbox Front Sprocket, posted on ebay.co.uk, posted Nov. 29, 2016, no production date given, [online], [site visited May 11, 2017], Available from Internet, <URL: http://www.ebay.co.uk/itm/NEW-Tag-Metals-MX-Honda-CR250R-88-07-CR500R-CRF450-Gearbox-Front-Sprocket-13T-/252592369100>.

Kawada Machine Cut Spur Gear, posted on ebay.com, no posted date given, no production date given, [online], [site visited May 18, 2017], Available from Internet, <URL: http://www.ebay.com/itm/Kawada-Machine-Cut-Spur-Gear-64P-78T-1-10-RC-Cars-Touring-Drift-On-Road-SM6478-/142068863379?_trksid=p2385738.m2548.14275>.

Lynxmotion ASB-19 Aluminum Interconnect Bracket (2pk)—Lynxmotion Inc. (http://www.lynxmotion.com). http://www.robotshop.com/en/lynxmotion-asb-19-aluminum-interconnect-bracket-2pk.html © 2016 RobotShop Inc.

MakeBlock Gear Search—MakeBlock Co., (http://www.makeblock.com) http://www.makeblock.com/index.php?route=product/search&search=gear © 2013-2017 Makeblock Co., Ltd.

MakeBlock motor bracket search—MakeBlock Co. Ltd—http://www.makeblock.com http://www.makeblock.com/index.php?route=product/search=motor%20bracket © 2013-2017 Makeblock Co., Ltd.

Makeblock, Gears Search—Makeblock Co., Ltd. (http://www.makeblock.com) http://www.makeblock.com/index.php?route=product/category&path=69_99 © 2013-2017 Makeblock Co., Ltd.

Makeblock, Sprocket Search—Makeblock Co., Ltd. (http://www.makeblock.com) http://learn.makeblock.com/en/mechanical-parts/#Sprockets © 2013-2017 Makeblock Co., Ltd.

Makeblock, Wheel Search—MakeBlock Co., Ltd (http://www.makeblock.com) http://www.makeblock.com/index.php?route=product/search&search=wheel © 2013-2017 Makeblock Co., Ltd.

Martin Roller Chain Sprocket, posted on amazon.com, earliest review posted Nov. 18, 2012, no production date given, [online], [site visited May 11, 2017], Available from Internet, <URL: https://www.amazon.com/Martin-Roller-Sprocket-Bored-Single/product-reviews/B004JXWH8C/ref=cm_cr_getr_d_paging_btm_3?ie=UTF8&reviewerType=avp_only_reviews&sortBy=r.

Modern Robitics Omni-wheel search-Modern Robotics Inc., (http://www.modernroboticsinc.com) http://www.modernroboticsinc.com/wheels © 2017 Modern Robotics Inc.

Modern Robotics Wheel Search—Modern Robotics Inc. (https://www.modernroboticsinc.com) http://www.modernroboticsinc.com/search?q=wheel © 2017 Modern Robotics Inc.

Modern Robotics, Gears Search—Modern Robotics, Inc. (http://www.modernroboticsinc.com) http://www.modernroboticsinc.com/search?q=gear © 2017 Modern Robotics, Inc.

Pillow Bracket—Craftex Cleaning Systems (http://www.craftexcleaningsystems.co.uk/) http://www.craftexcleaningsystems.co.uk/spare-parts-accessories-c3/machine-spare-parts-c95/pillow-bracket-p3816 © 2017 Craftex Cleaning Systems.

PITSCO Tetrix Gear and Motor search—Tetrix PITSCO, Inc. (http://www.tetrixrobotics.com) http://www.tetrixrobotics.com/Search/gear_motor?st=0 © Pitsco, Inc.

Pitsco Tetrix, Gears Search—Tetrix Robotics (http://www.tetrixrobotics.com) http://www.tetrixrobotics.com/Search/gears?st=0 © 2017 Pitsco, Inc. (1 pg.).

REV Robotics—REV 15mm—Bent Motor Bracket, www.revrobotics.com/product/rev-41-1027b/, REV Robotics LLC © 2016.

Robinson Racing Spur Gear, 72T; NRU, TMX RRP8572, posted on amazon.com, earliest reviewed Jan. 19, 2015, no production date given, [online], [site visited May 18, 2017], Available from Internet, <URL: https://www.amazon.com/Robinson-Racing-Steel-Spur-Gear/dp/B0006N6N7K/ref=sr_1_9?ie=UTF8&qid=1495154175&sr=8-9&keywords=spur+gear>.

Roller chain sprockets and platewheels, posted fbchain.com, no posted date given, no production date given, [online], [site visited May 11, 2017], Available from Internet, <URL: http://www.fbchain.com/sprockets>.

Servocity Gearbox and Gearmotor search—Servocity Inc. (https://www.servocity.com). http://www.servocity.com/catalogsearch/result/?q=gear+box+motor Copyright 1999-2016 Robotzone, LLC—ServoCity® is a registered trademark of Robotzone, LLC.

(56) References Cited

OTHER PUBLICATIONS

Servocity Robotics Wheel Search—Servocity Robotics (https://www.servocity.com) https://www.servocity.com/catalogsearch/result/?q=wheel © 1999-2016 Robotzone, LLC, ServoCity® is a registered trademark of Robotzone, LLC.
Servocity, Gears Search—Servocity (https://www.servocity.com) © 1999-2016 Robotzone, LLC—ServoCity® is a registered trademark of Robotzone, LLC (2 pgs.).
Servocity Sprocket Search—Servocity (https://servocity.com) https://www.servocity.com/catalogsearch/result/?q=sprocket © 1999-2018 Robotzone, LLC, ServoCity is a registered trademark of Robotzone, LLC.
SparkFun Electronics Sprocket Search—SparkFun Electronics (https://www.sparkfun.com) https://www.sparkfun.com/search/results?term=sprocket (Publication date unknown but assumed to be prior to the filing date).
SparkFun Gear Motor Search—SparkFun Electronics (https://www.sparkfun.com) https://www.sparkfun.com/search/results?term=gearmotor (Publication date unknown but assumed to be prior to the filing date).
SparkFun Gears Search—SparkFun Electronics (https://www.sparkfun.com) https://www.sparkfun.com/search/results?term=gears (Publication date unknown but assumed to be prior to filing date.).
SparkFun Wheel Search—SparkFun Electronics (https://www.sparkfun.com) https://www.sparkfun.com/search/results?term=wheel (Publication date unknown but assumed to be prior to the filing date.).
Sprocket Hub Gear Guard Kit, posted on ebay.com, no posted date given, no production date given, [online], [site visited May 11, 2017], Available from Internet, <URL: http://www.ebay.com/itm/191673594110?rmvSB=true>.
Sprockets & Chain—VEX Robotics, http://vexrobotics.com/sprockets-and-chain.html, Innovation First International, Inc. © 2002-2016.
Sprockets & Chain Kit—VEX Wiki, https://www.vexrobotics.com/wiki/Sprocket_and_Chain_Kit, Innovation First International, Inc. © 2002-2016.
Suzuki TS1000 1987 Gearbox Front Sprocket, no posted date given, no production date given, [online], [site visited Sep. 22, 2017], Available from Internet, <URL: http://www.ebay.co.uk/itm/Suzuki-TS1000-1987-Gearbox-Front-Sprocket-126314-/122307584 706?epid=750887205&hash=item1c7a19a2c2:g:bGIAAOSwopRYdg8Z>.
Tetrix Pitsco Omni-wheel Search—Tetrix Pitsco Inc. (http://www.tetrixrobotics.com) http://www.tetrixrobotics.com/Search/omni_wheel?st=0 © 2017 Pitsco, Inc.
Tetrix Pitsco Wheel Search—Pitsco Inc. (http://www.tetrixrobotics.com) http://www.tetrixrobotics.com/Search/wheel?st=0 © 2017 Pitsco, Inc.
TETRIX® MAX Adjustable Angle Corner Bracket—PITSCO TETRIX ROBOTICS http://www.tetrixrobotics.com/TETRIX_MAX_Adjustable_Angle_Corner_Bracket?ap=10694-8739 © Pitsco, Inc.
TETRIX® MAX Adjustable Angle Flat Bracket—PITSCO TETRIX ROBOTICS http://www.tetrixrobotics.com/Mounts_and_Brackets/TETRIX_MAX_Adjustable_Angle_Flat_Bracket © Pitsco, Inc.
Tsubaki Sprockets, posted on frasers.com, no posted date given, no production date given [online], [site visited May 11, 2017], Available from Internet, <URL: http://www.frasers.com/supplier/tsubaki-of-canada-ltd-16573675102/product-category/chain-sprockets-10647377260>.
United 22mm Spline Drive Metro Sprocket, posted on acebmx.com, posted Sep. 17, 2013, no production date given, [online], [site visited May 11, 2017], Available from Internet, <URL: http://www.acebmx.com/sprockets-bmx-c-60/united-22mm-spline-drive-metro-sprocket-p-3633.html>.
VersaFrame Gussets and Mounts (18 choices)—VEX Robotics, http://www.vexrobotics.com/versaframegussetsandmounts.html, Innovation First International, Inc. © 2002-2016.
VEX Pillow Block Bearing & Lock Bar Pack—Vex Robotics (https://www.vexrobotics.com/) http://www.robotmesh.com/vex-robotics/structure/vex-pillow-block-bearing-lock-bar-pack © 2016 Robot Mesh. Robot Mesh is a division of Keep I.T. Easy LLC.
Vex Pro Gears—VEX ROBOTICS (https://www.vexrobotics.com) https://www.vexrobotics.com/vexpro/motion/vexpro-gears © 2002-2017, VEX Robotics, Inc. is a subsidiary of Innovation First International, Inc. (2 pages).
Vex Robitics Gearbox Search—Vex Robotics Inc. (https://www.vexrobotics.com) https://www.vexrobotics.com/catalogsearch/result/?q=gearbox Copyright © 2002-2017. VEX Robotics, Inc. is a subsidiary of Innovation First International, Inc.
Vex Robotics Gears Search—Vex Robotics (https://www.vexrobotics.com) https://www.vexrobotics.com/catalogsearch/result/?q=gears © 2002-2017. VEX Robotics, Inc. is a subsidiary of Innovation First International, Inc.
Vex Robotics Omni—wheel search—Vex Robotics (https://www.vexrobotics.com) https://www.vexrobotics.com/catalogsearch/result/?q=holonomic © 2002-2017 VEX Robotics, Inc. is a subsidiary of Innovation First International, Inc.
Vex Robotics Sprocket Search—Vex Robotics, Inc. (https://www.vexrobotics.com) https://www.vexrobotics.com/catalogsearch/result/?q=sprocket.
Vex Robotics Wheel Search—Vex Robotics (https://www.vexrobotics.com) https://www.vexrobotics.com/catalogsearch/result/?q=wheel © 2002-2017. VEX Robotics, Inc. is a subsidiary of Innovation First International, Inc.
West Coast Products Gearbox and Gearmotor search—West Coast Products LLC (http://www.wcproducts.net) http://www.wcproducts.net/catalogsearch/result/?q=gearbox © 2016 WestCoast Products & Design LLC.
Written Opinion of the International Searching Authority, Int. App. # PCT/US2017/015671, FD dated Jan. 30, 2017, published Aug. 10, 2017.
U.S. Appl. No. 29/553,516, Daniel Scott Karol Jason Michael Overson, filed Feb. 2, 2016, U.S. Pat. No. D. 799,937.
U.S. Appl. No. 29/553,521, Daniel Scott Karol Jason Michael Overson David Evan Collins Nick Von Bargen, filed Feb. 2, 2016, U.S. Pat. No. D. 799,948.
U.S. Appl. No. 29/553,522, Daniel Scott Karol Jason Michael Overson David Evan Collins Nick Von Bargen, filed Feb. 2, 2016, U.S. Pat. No. D. 795,676.
U.S. Appl. No. 29/553,523, Daniel Scott Karol Jason Michael Overson, filed Feb. 2, 2016.
U.S. Appl. No. 29/553,527, Daniel Scott Karol Jason Michael Overson, filed Feb. 2, 2016, U.S. Pat. No. D. 787,380.
U.S. Appl. No. 29/572,411, Daniel S. Karol William D. Hunt Gregory Needel, filed Jul. 27, 2016, U.S. Pat. No. D. 813,648.
U.S. Appl. No. 29/572,412, Gregory Needel William D. Hunt Daniel S. Karol, filed Jul. 27, 2016, U.S. Pat. No. D. 812,659.
U.S. Appl. No. 29/572,414, Gregory Needel William D. Hunt Daniel S. Karol, filed Jul. 27, 2016, U.S. Pat. No. D. 812,660.
U.S. Appl. No. 29/572,415, Gregory Needel William D. Hunt Daniel S. Karol, filed Jul. 27, 2016.
U.S. Appl. No. 29/572,416, Daniel S. Karol William D. Hunt Jason M. Overson, filed Jul. 27, 2016.
U.S. Appl. No. 29/572,417, Daniel S. Karol William D. Hunt Jason M. Overson, filed Jul. 27, 2016, U.S. Pat. No. D. 815,675.
U.S. Appl. No. 29/572,419, Daniel S. Karol William D. Hunt Jason M. Overson, filed Jul. 27, 2016.
U.S. Appl. No. 29/572,420, Daniel S. Karol Yuuki G. Crowley, filed Jul. 27, 2016.
U.S. Appl. No. 29/572,421, Daniel S. Karol William D. Hunt Jason M. Overson, filed Jul. 27, 2016.
U.S. Appl. No. 29/572,422, Daniel S. Karol William D. Hunt Jason M. Overson, filed Jul. 27, 2016.
U.S. Appl. No. 29/572,423, Daniel S. Karol Jason M. Overson William D. Hunt Jacob W. Scarpaci, filed Jul. 27, 2016.
U.S. Appl. No. 29/582,804, William D. Hunt Daniel S. Karol David E. Collins, filed Oct. 31, 2016.
PCT/US2017/015671, Daniel Scott Karol Jason Michael Overson William Daniel Hunt Jacob William Scarpaci Andrew Stephen Coll Gregory Needel Yuuki Gil Crowley Christopher C. Langenfeld Michael J. Slate Prashant Bhat Grant A. Peret, Jan. 30, 2017.

(56) References Cited

OTHER PUBLICATIONS

U.S. Appl. No. 29/592,452, William Daniel Hunt Jason Michael Overson, filed Jan. 30, 2017.
U.S. Appl. No. 29/629,982, Daniel S. Karol William D. Hunt Jason M. Overson, filed Dec. 18, 2017.
U.S. Appl. No. 29/629,983, Daniel S. Karol William D. Hunt Jason M. Overson, filed Dec. 18, 2017.
U.S. Appl. No. 15/473,793, Benjamin A. Wilson Jason M. Overson Jacob W. Scarpaci, filed Mar. 30, 2017.
AndyMark.com, 4" DuraOmni Wheel Jan. 2017, online product page, retrieved Apr. 27, 2018 from <URLhttp://www.andymark.com/product-p/am-3047.htm> (Year: 2017).
Thingiverse.com, Lego Mecanum Wheel, Nov. 2015, online product page, retrieved Apr. 27, 2018 from <URL https://www.thingiverse.com/thing:1119245> (Year: 2015).
U.S. Appl. No. 29/645,161, Karol et al., dated Apr. 24, 2018, U.S. Pat. No. D. 844,682.
U.S. Appl. No. 29/646,704, Karol et al., dated May 7, 2018.
U.S. Appl. No. 29/657,871, Karol et al., dated Jul. 26, 2018.
U.S. Appl. No. 29/572,419, Karol et al., dated Jul. 27, 2018.
U.S. Appl. No. 29/657,798, Karol et al., dated Jul. 25, 2018.
U.S. Appl. No. 29/657,800, Karol et al., dated Jul. 25, 2018.
U.S. Appl. No. 29/661,815, Hunt et al., dated Aug. 30, 2018.

\* cited by examiner

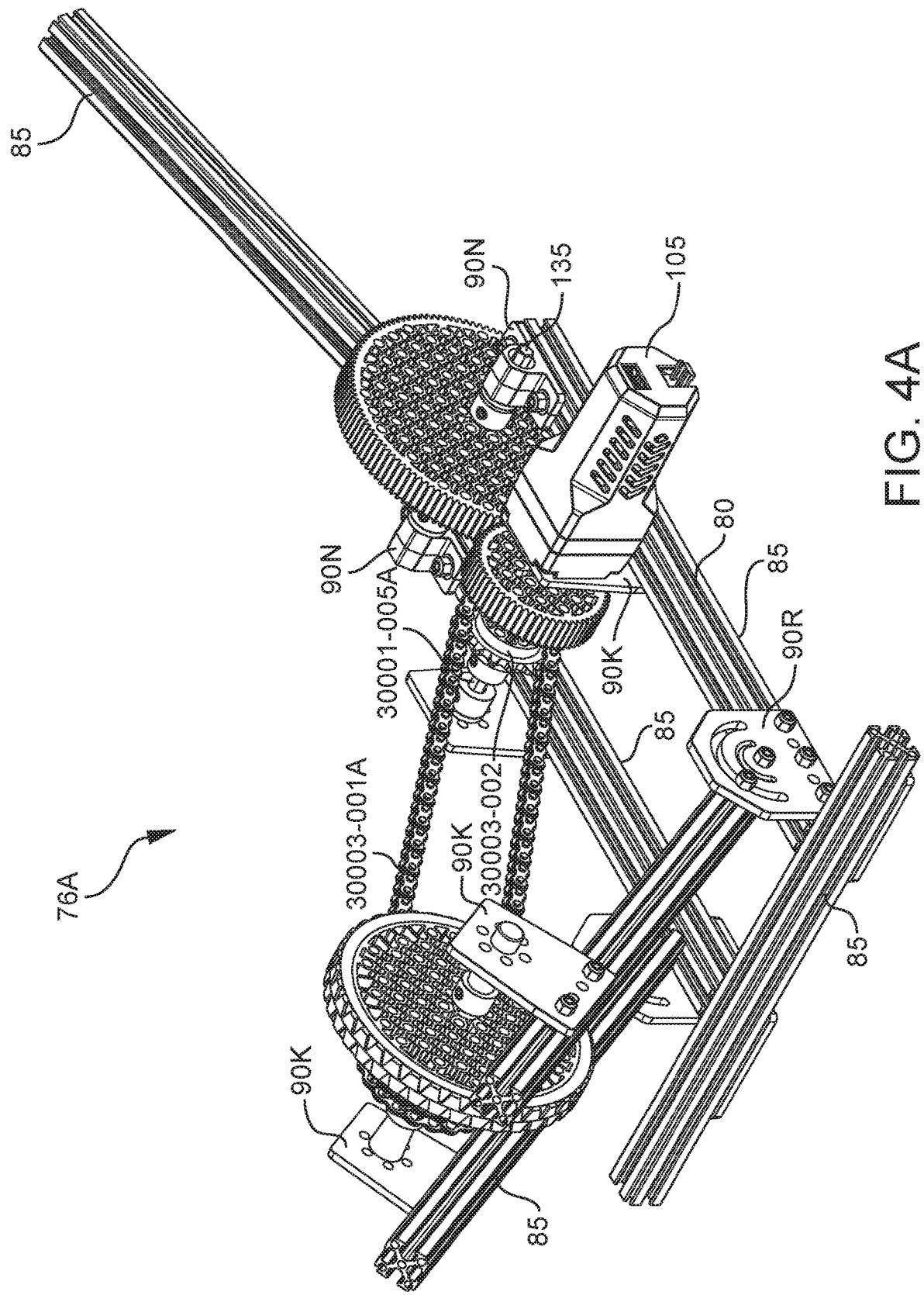

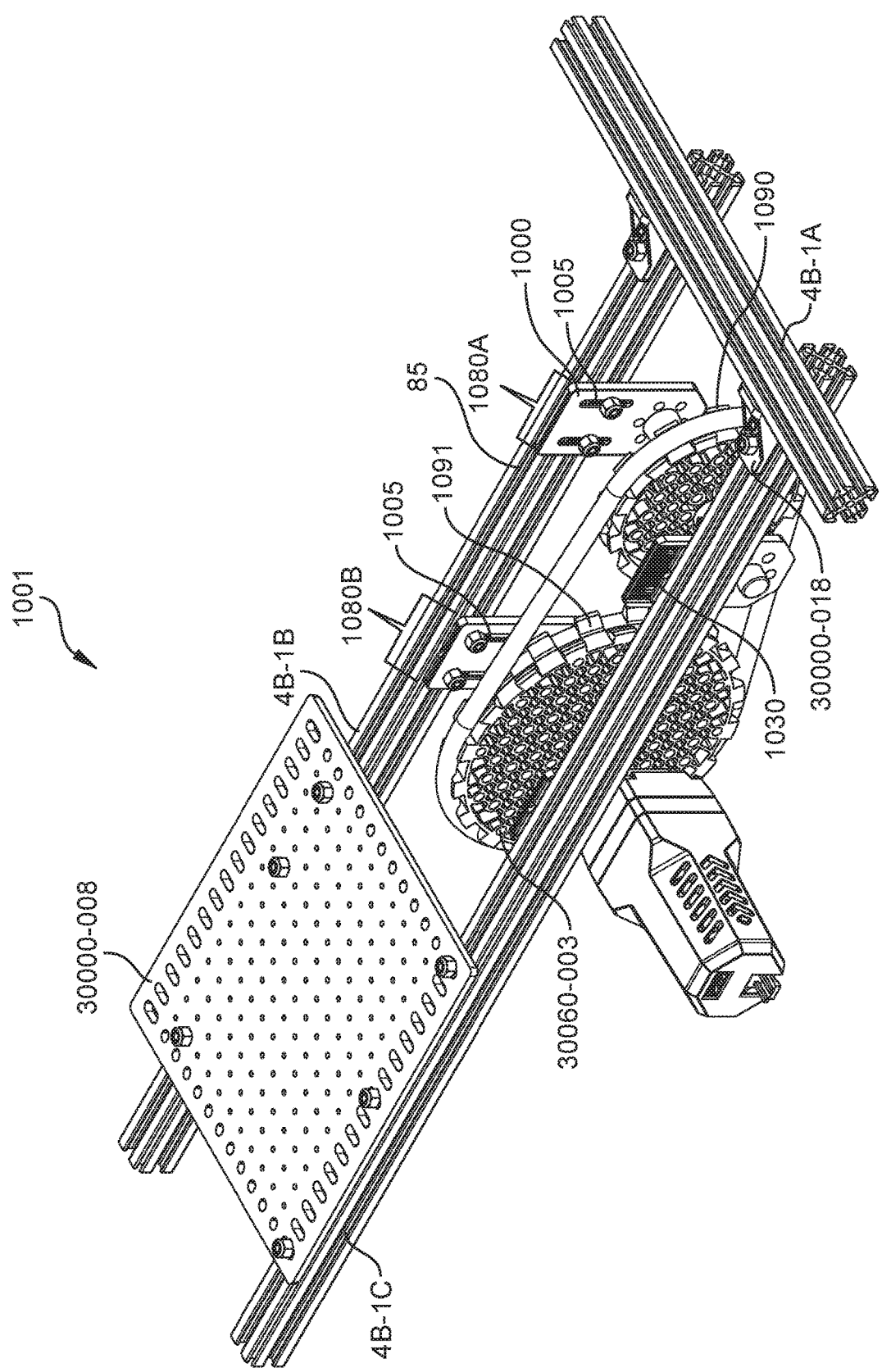

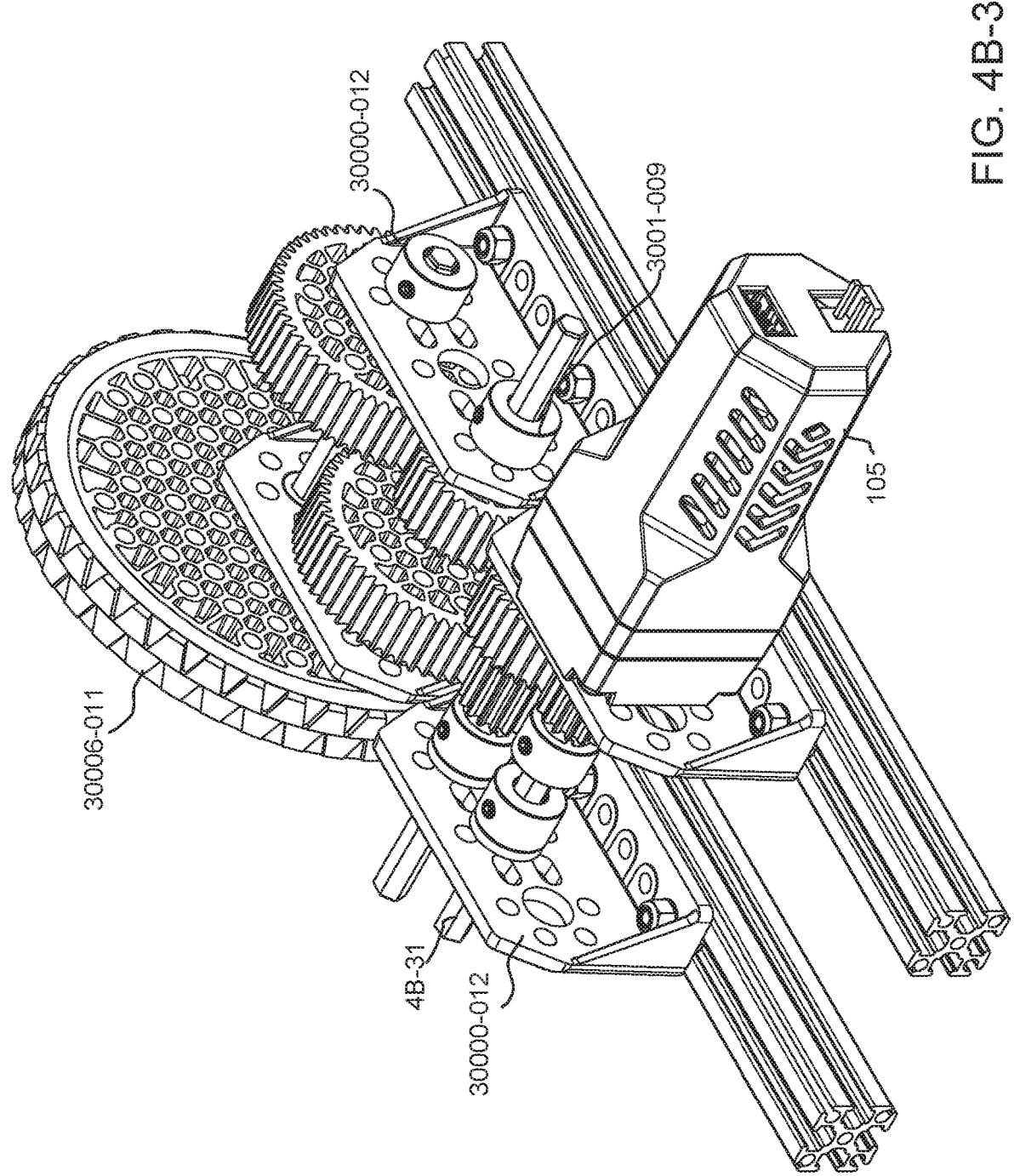

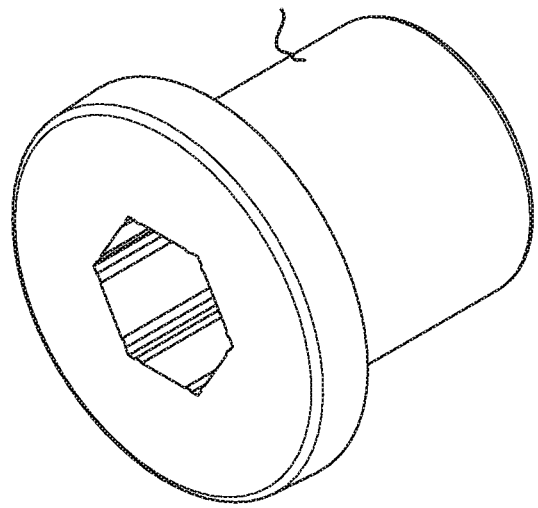
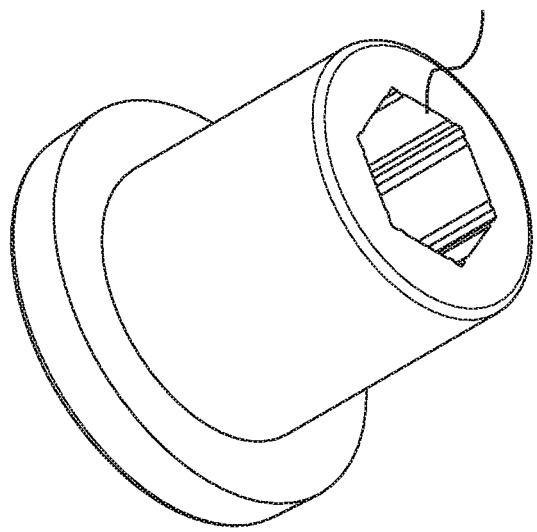
FIG. 4G-5

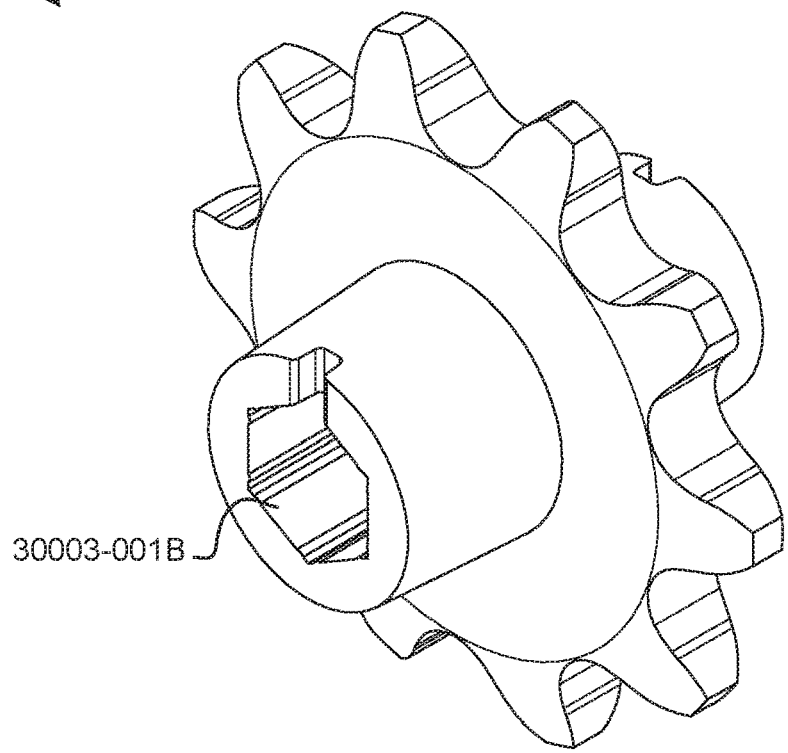
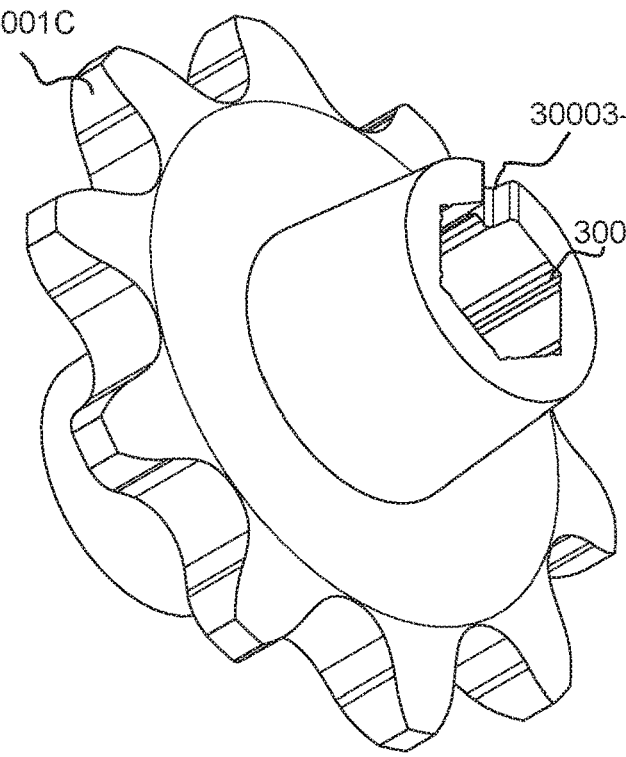
FIG. 4G-6

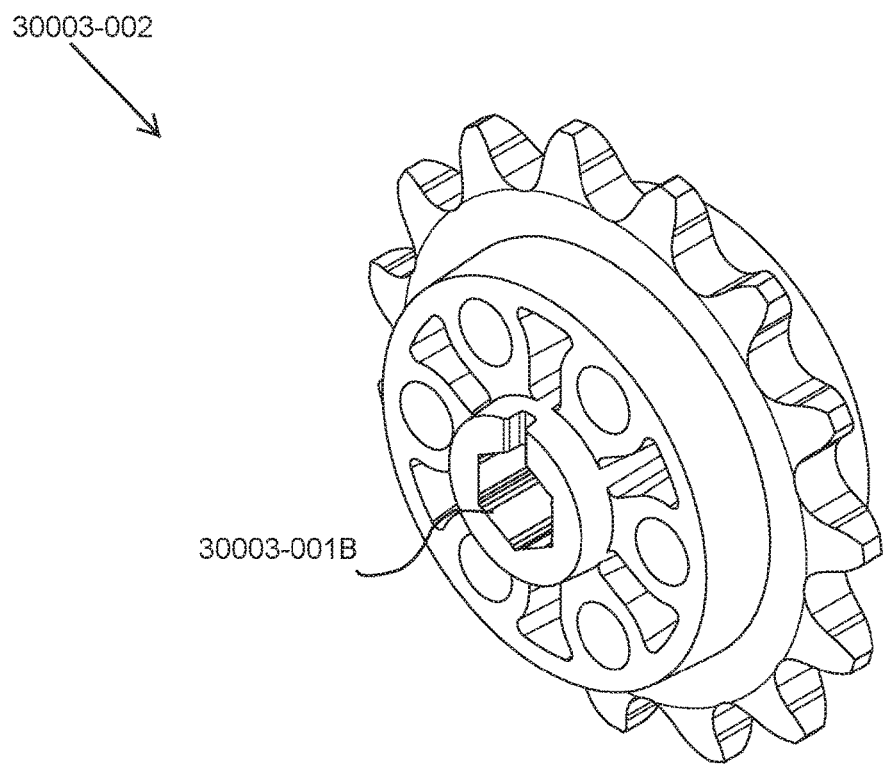
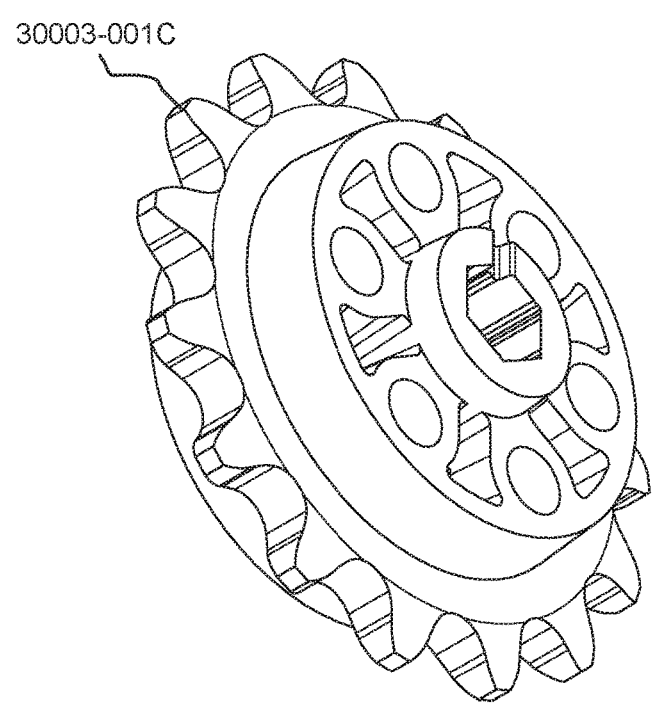
FIG. 4G-7

30003-003
30003-001B
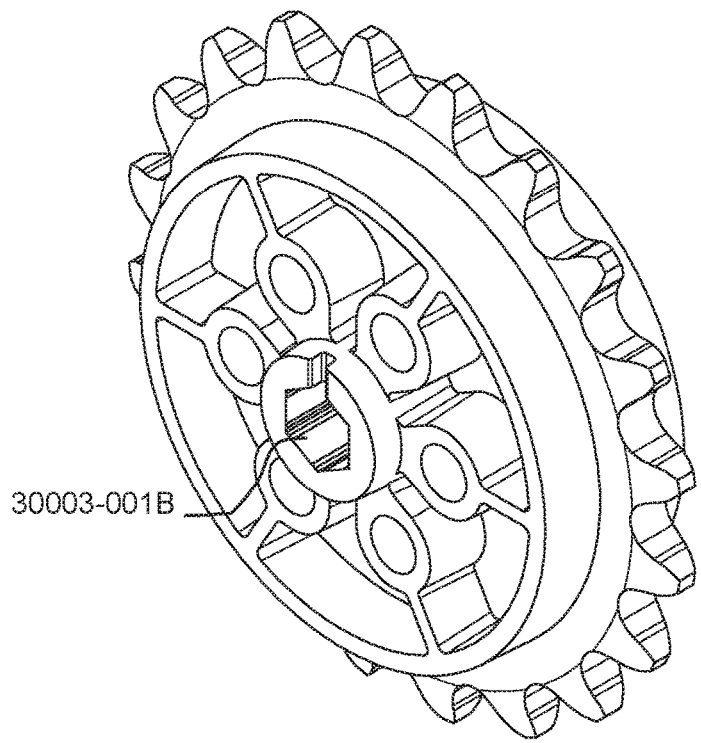
30003-001C
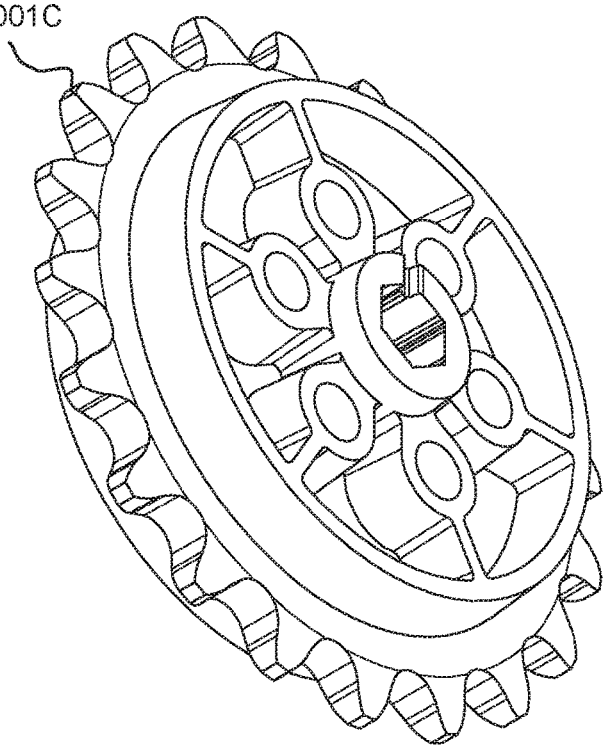
FIG. 4G-8

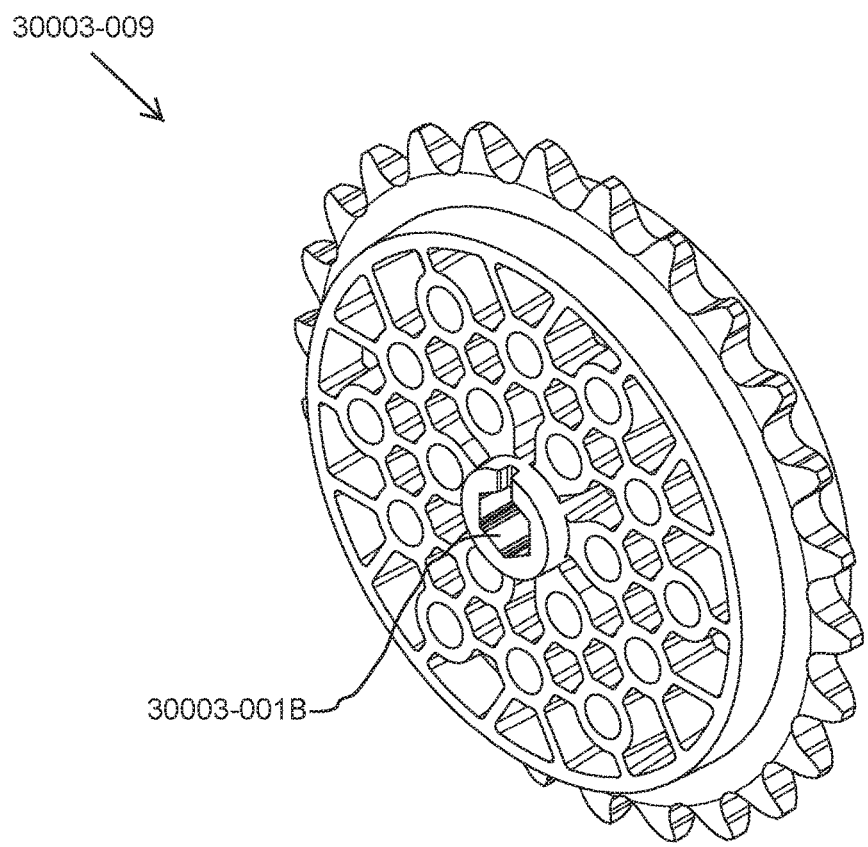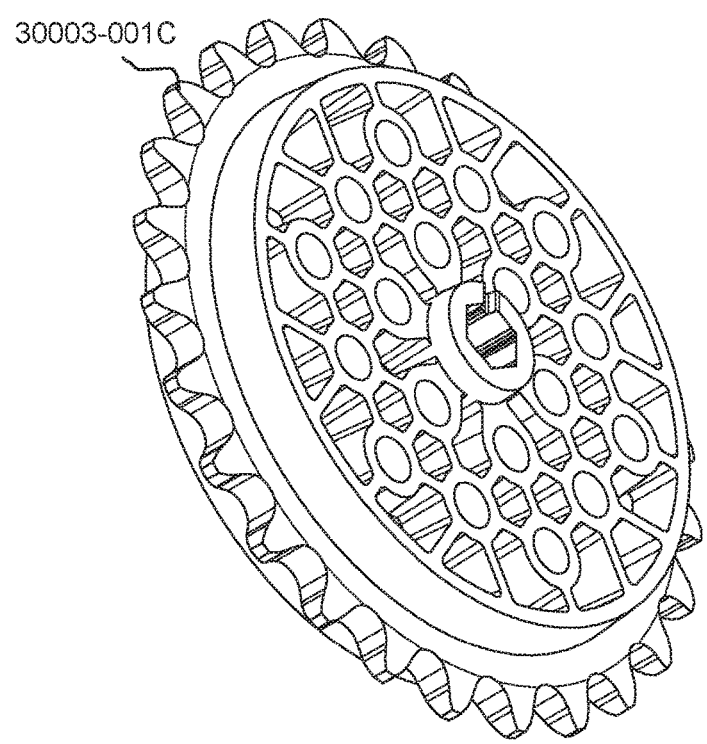
FIG. 4G-10

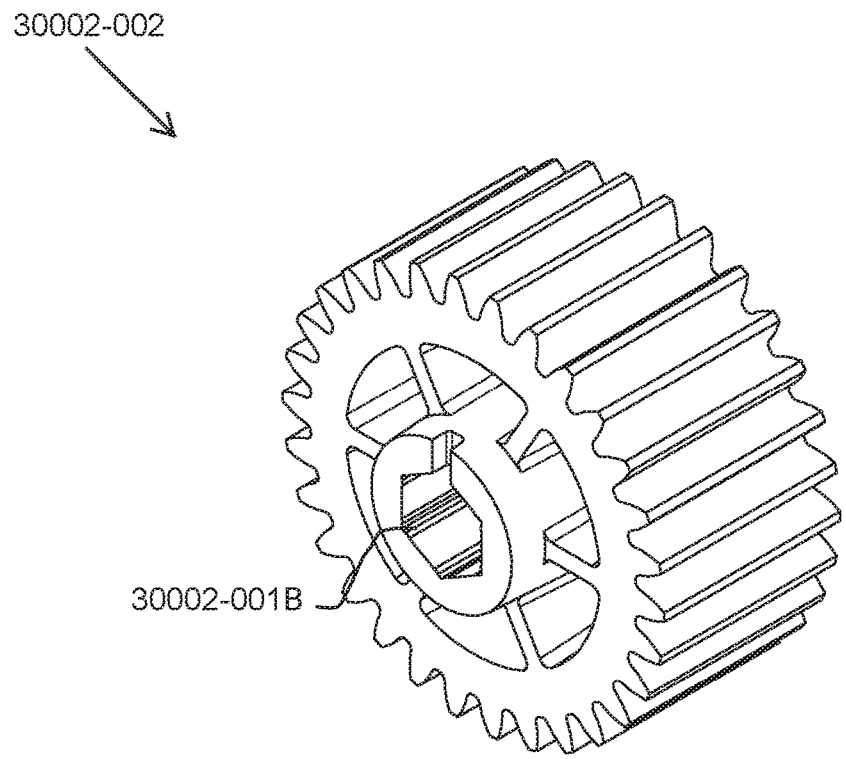
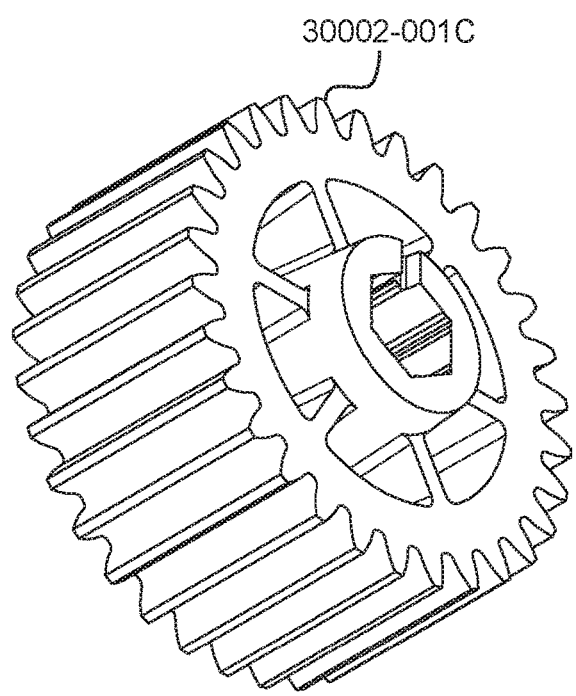
FIG. 4G-13

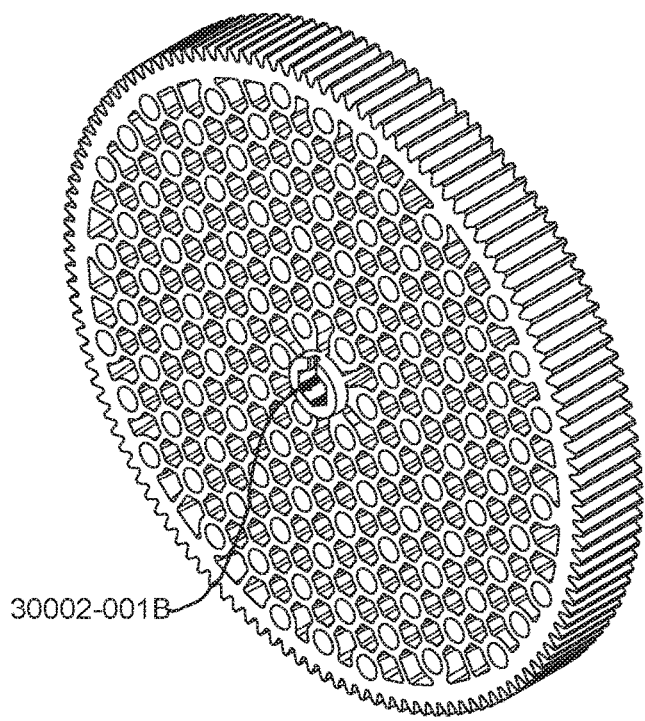
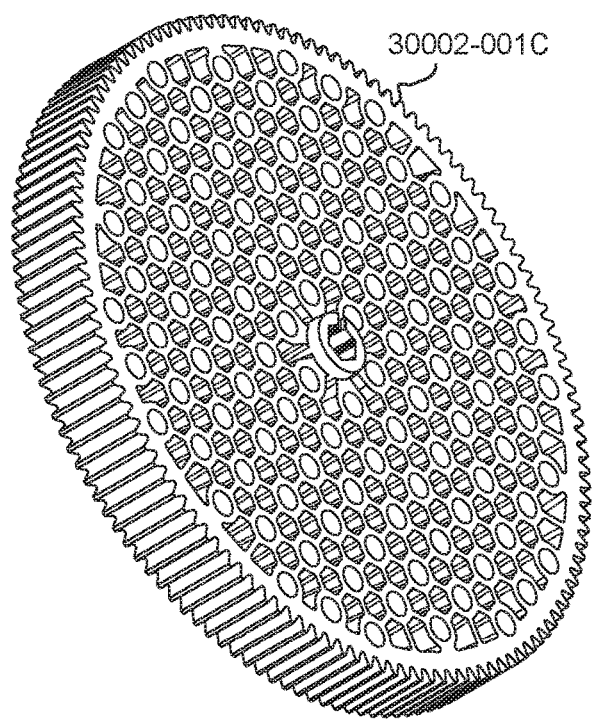
FIG. 4G-14

30002-005A 30002-006
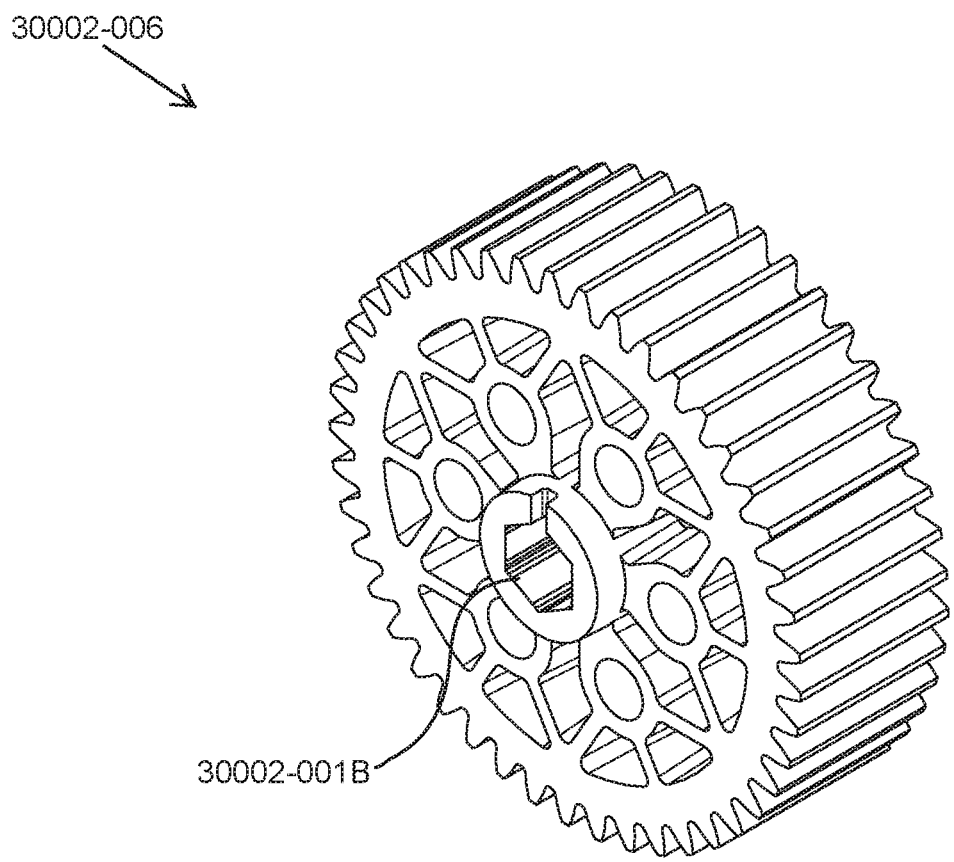
30002-001B
FIG. 4G-15
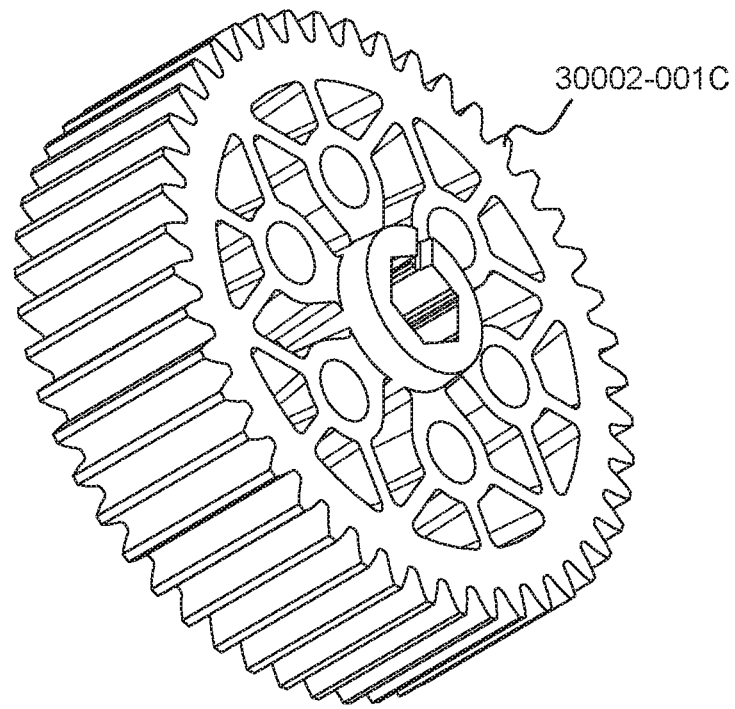
30002-001C

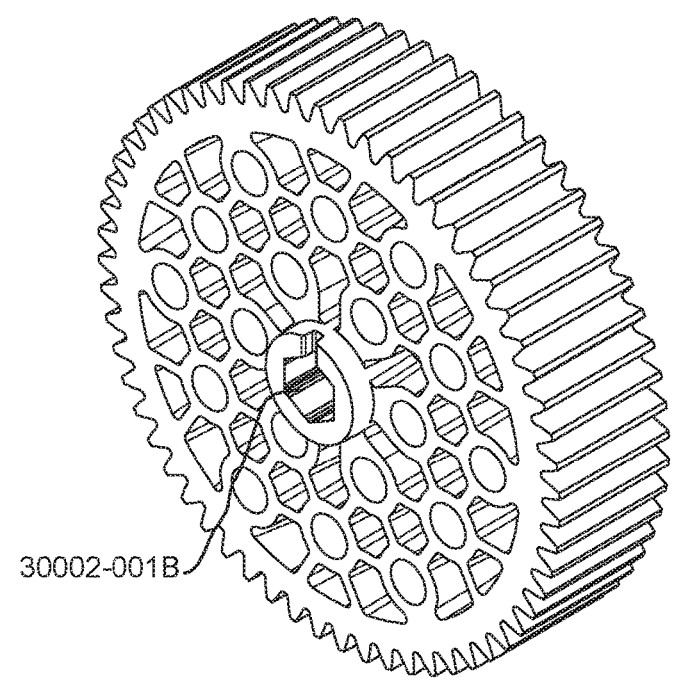
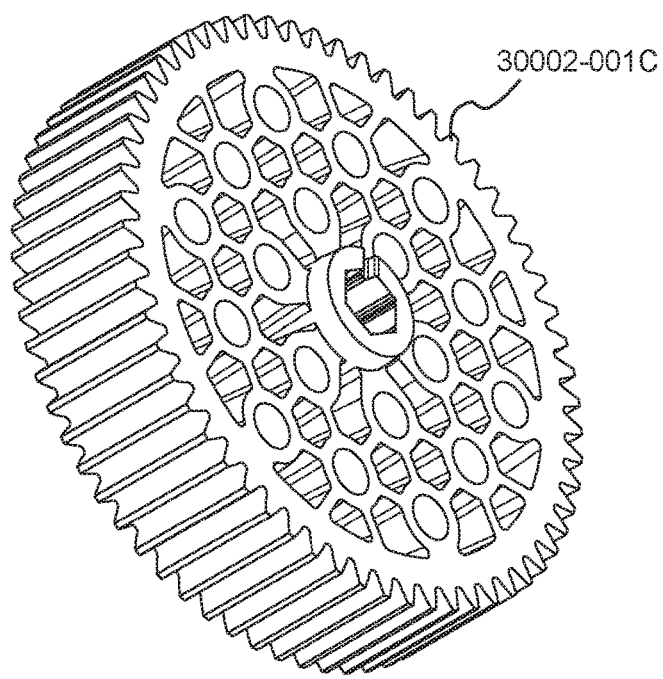
FIG. 4G-16

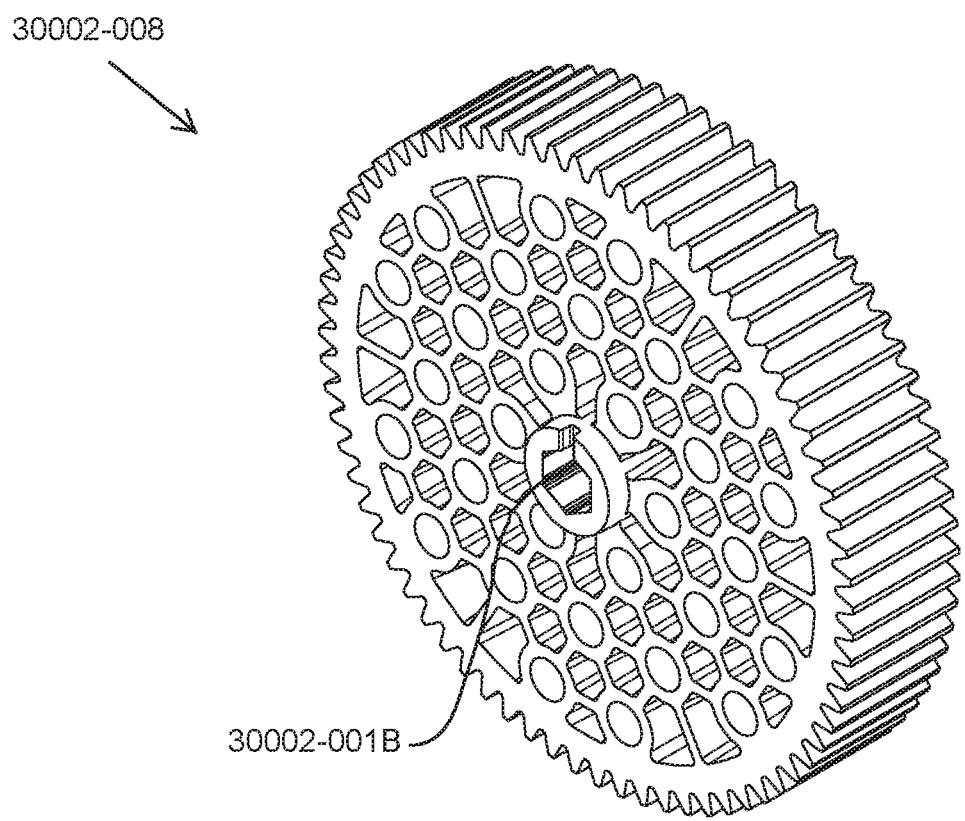
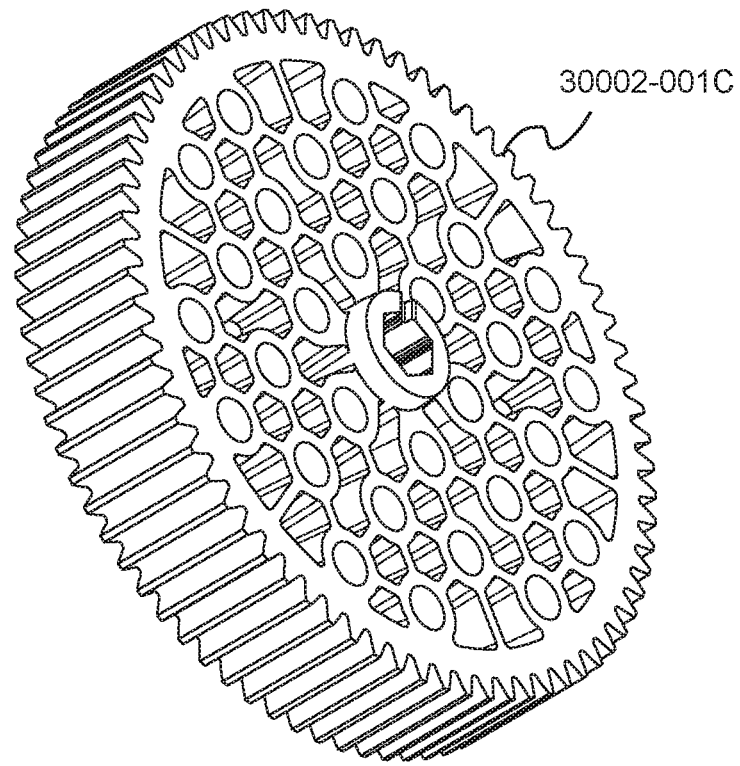
FIG. 4G-17

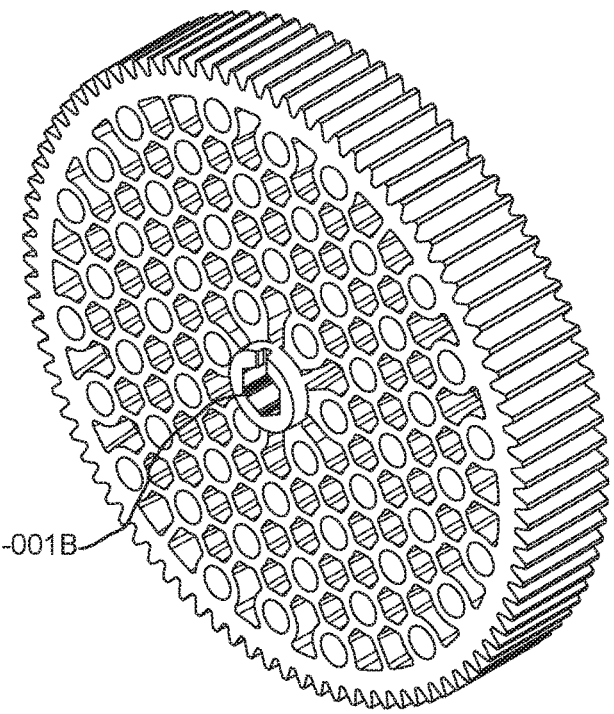
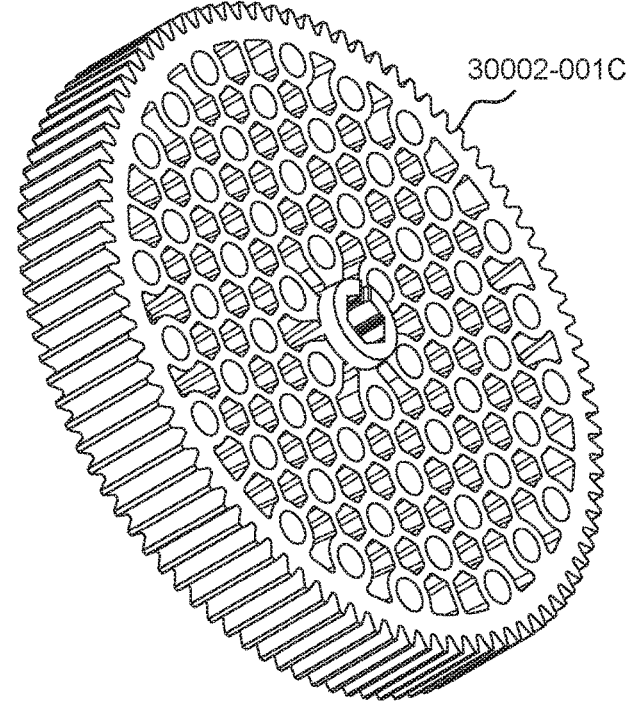
FIG. 4G-18

30011-002
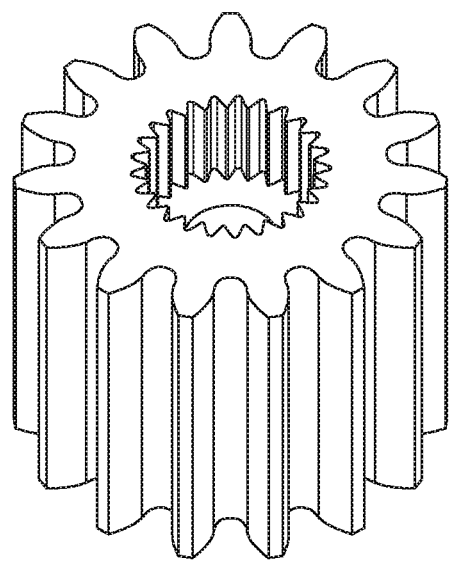
30002-001C
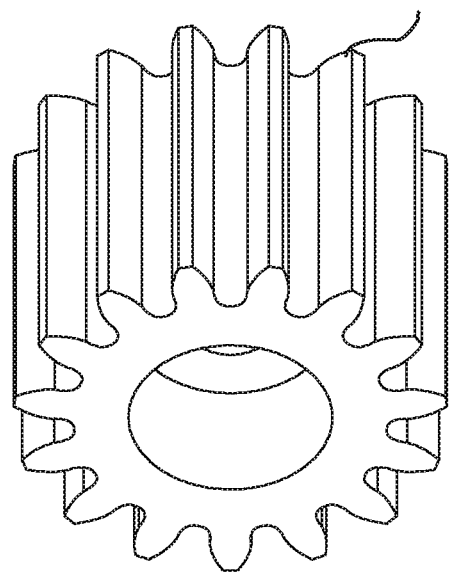
FIG. 4G-19

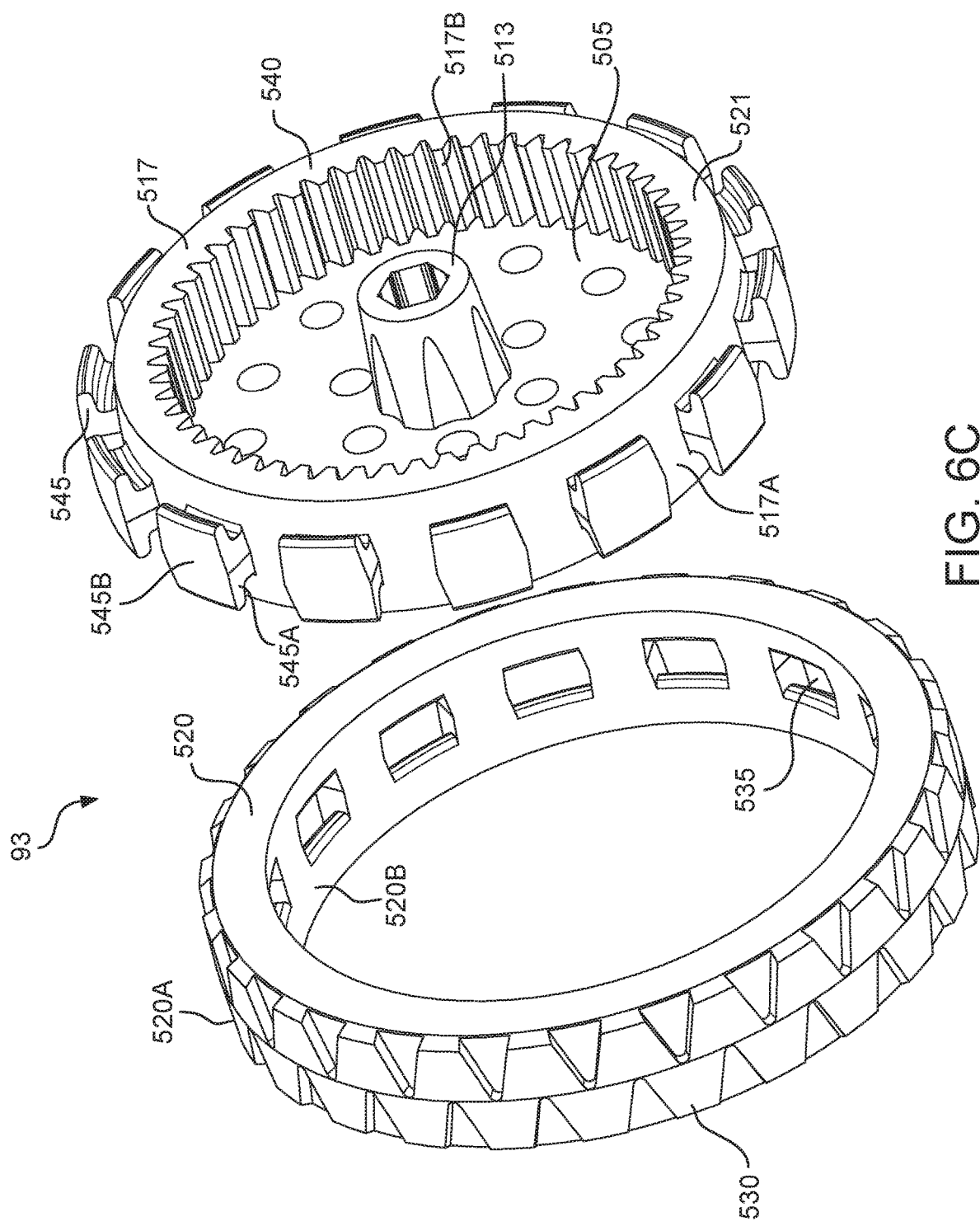

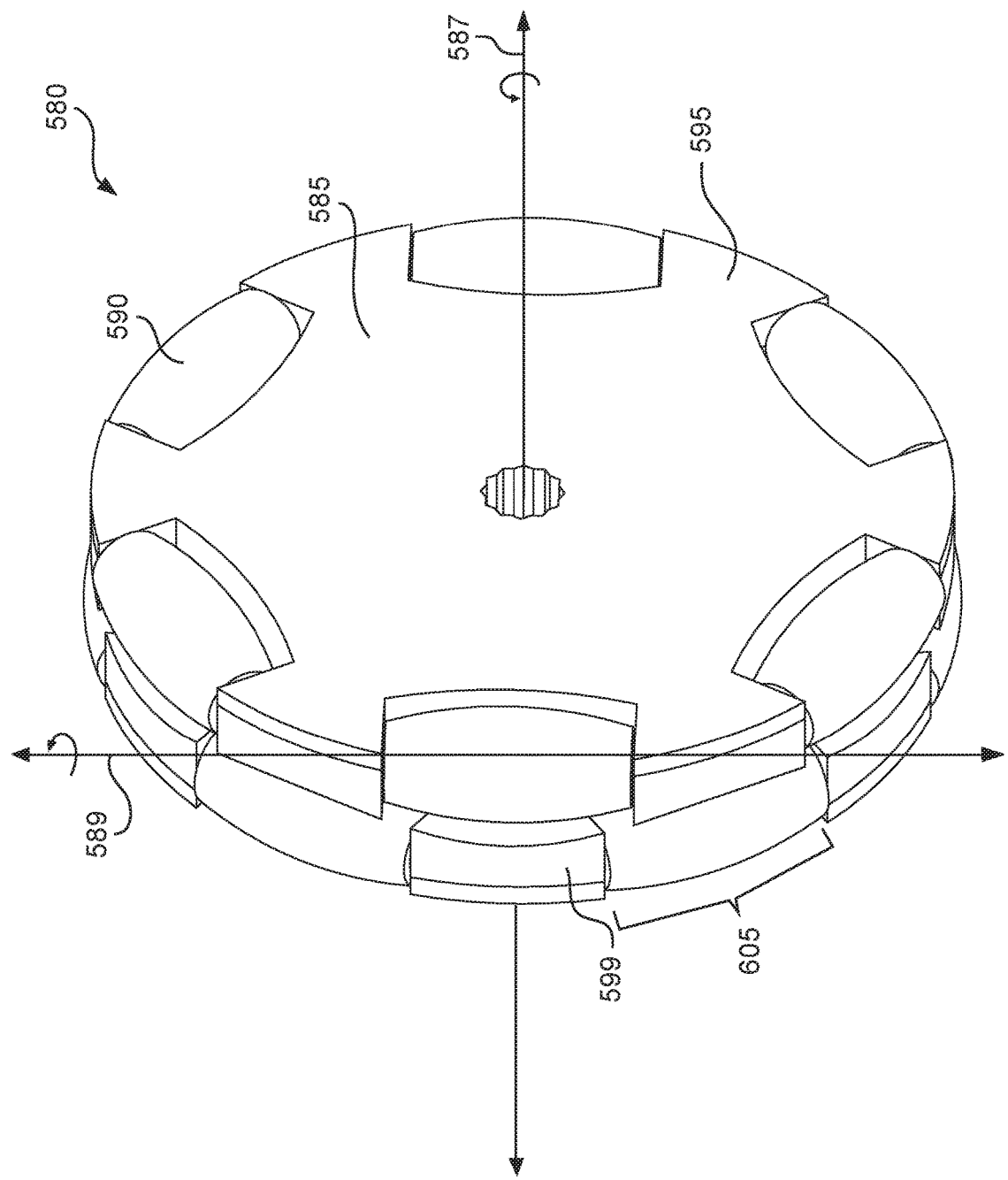

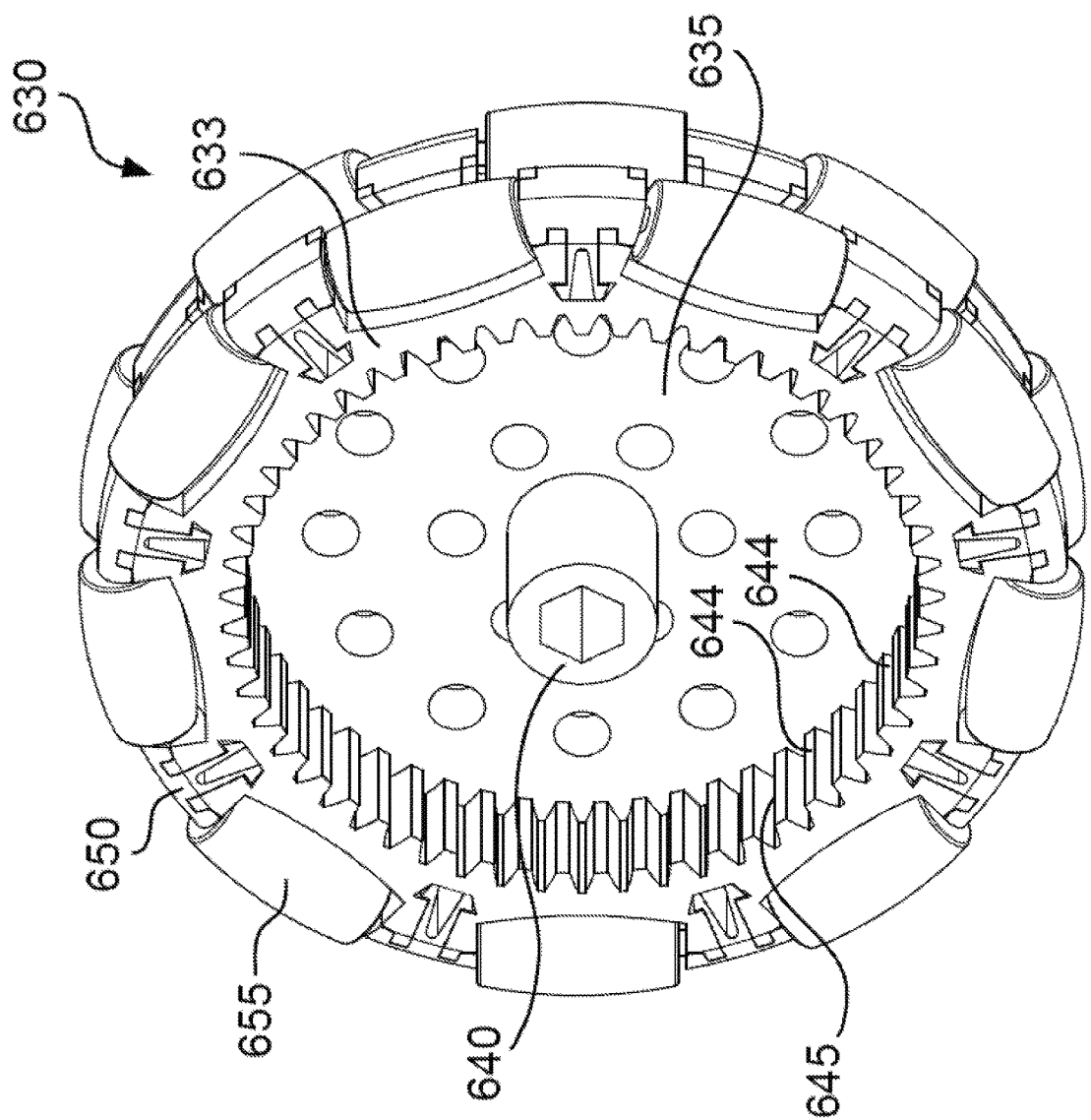

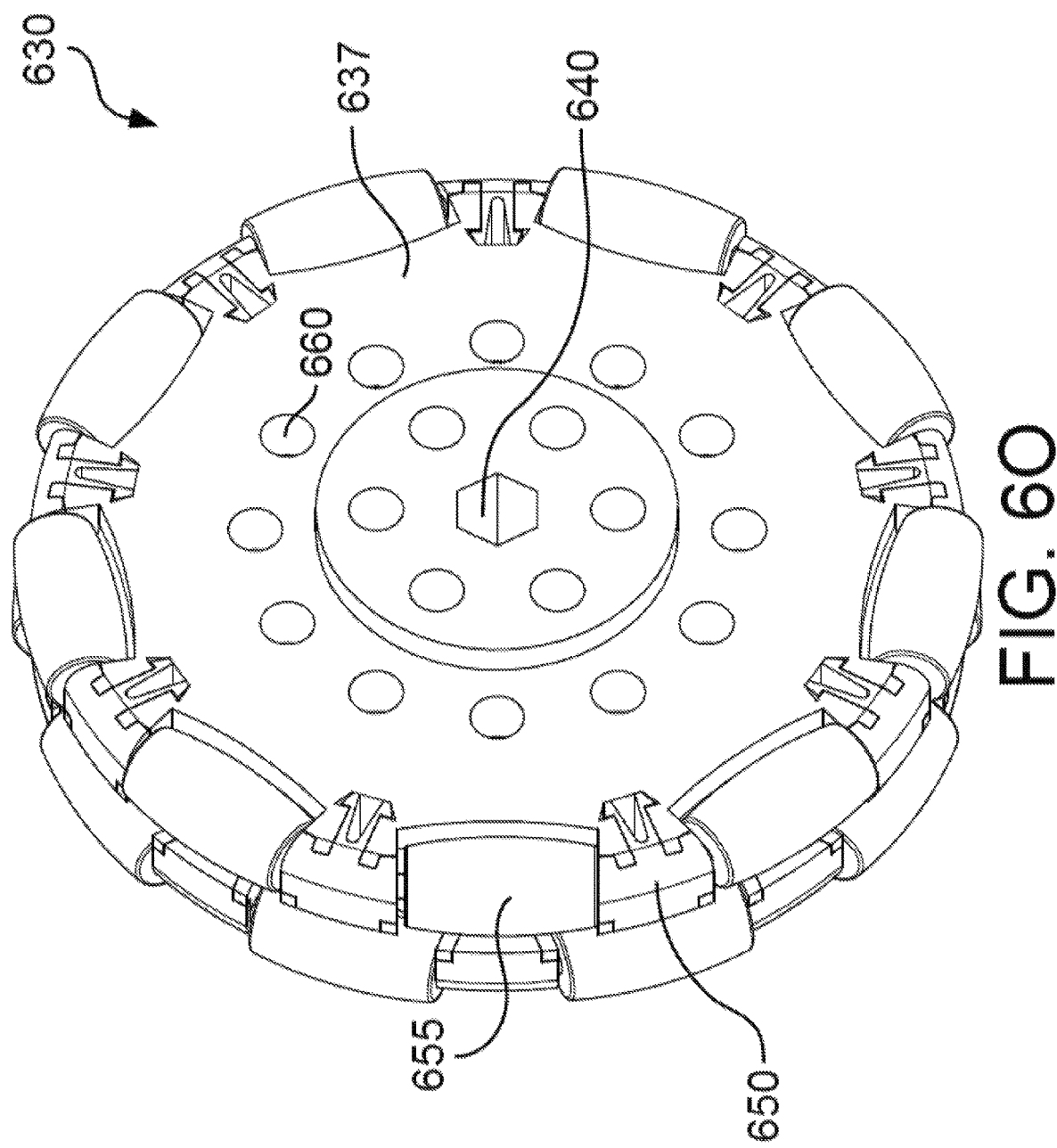

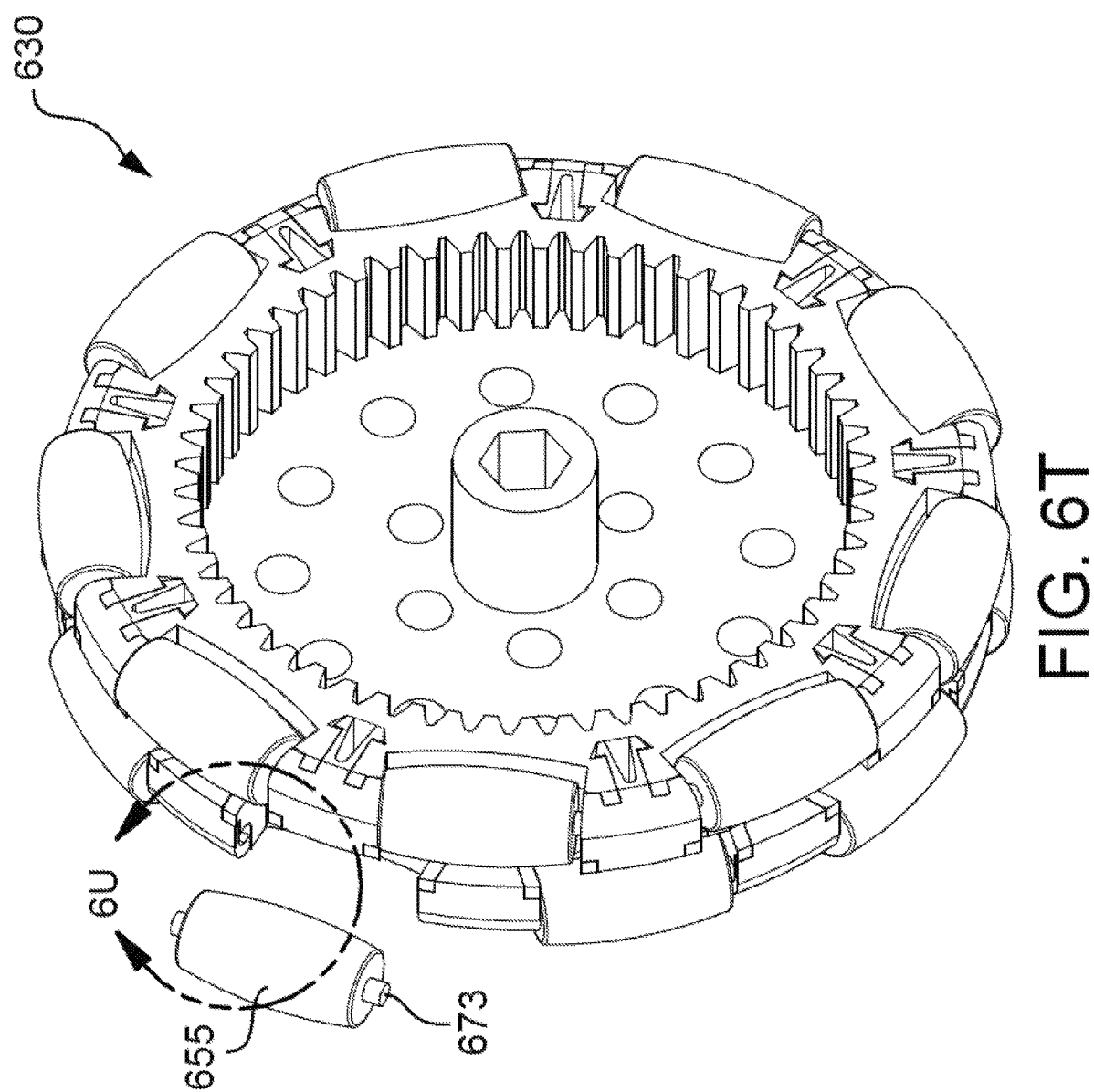

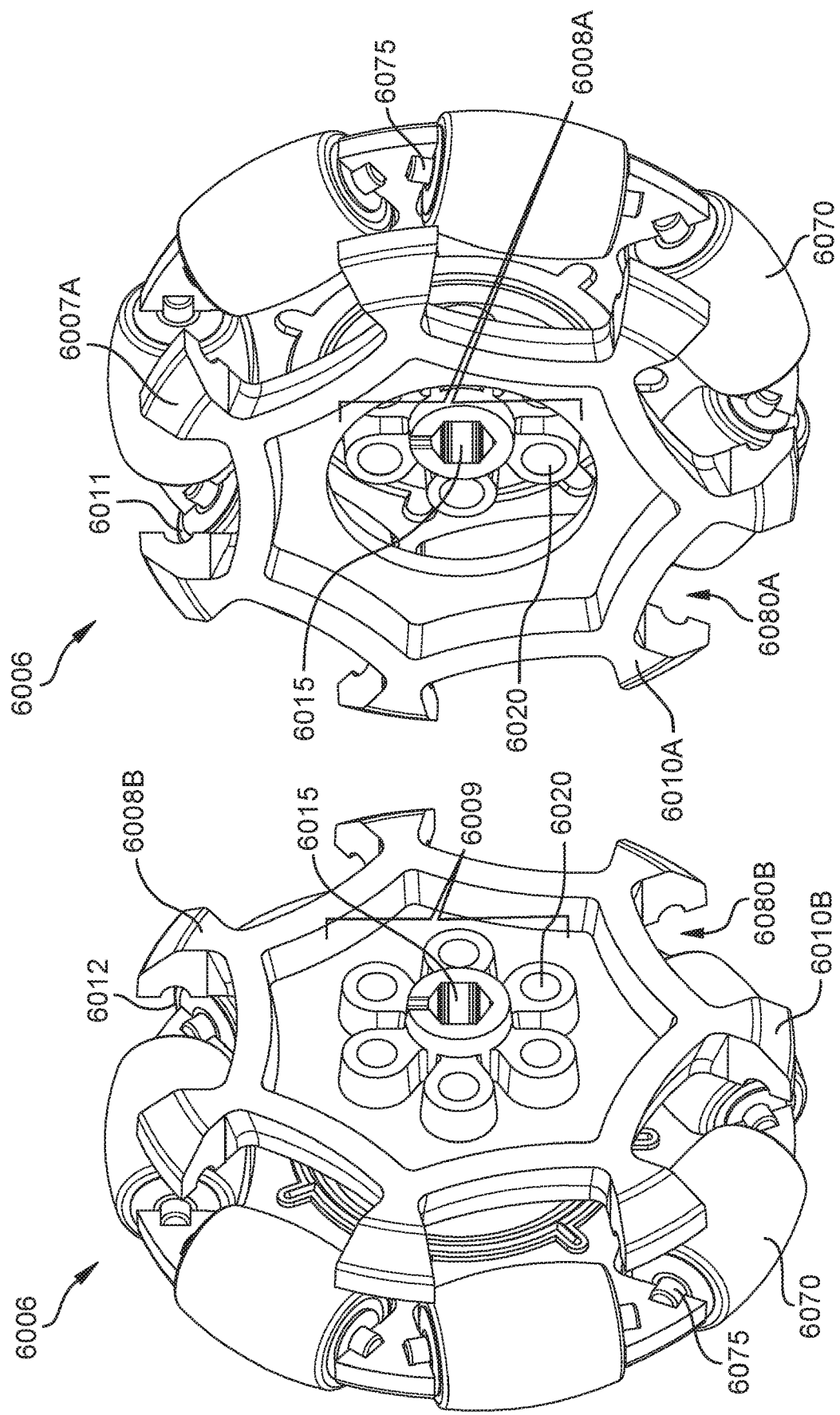

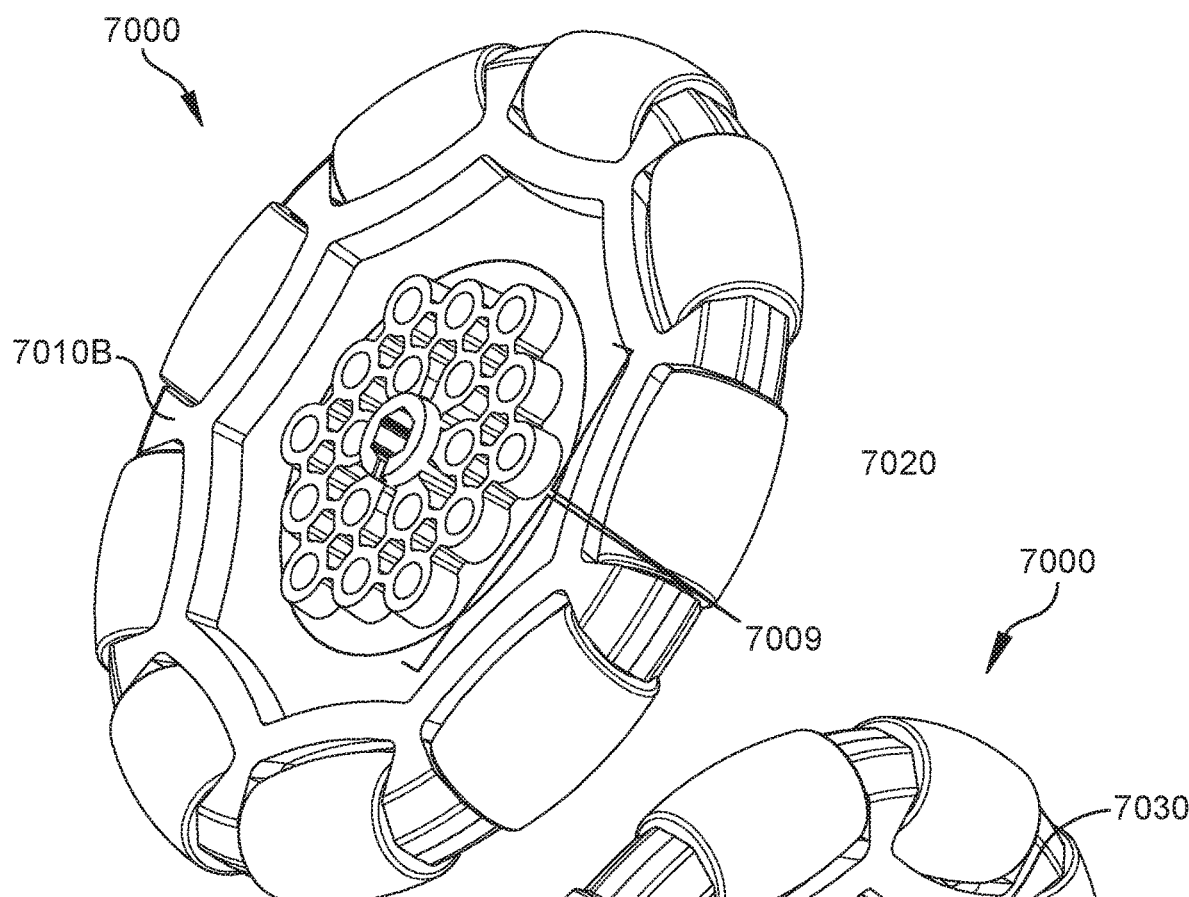
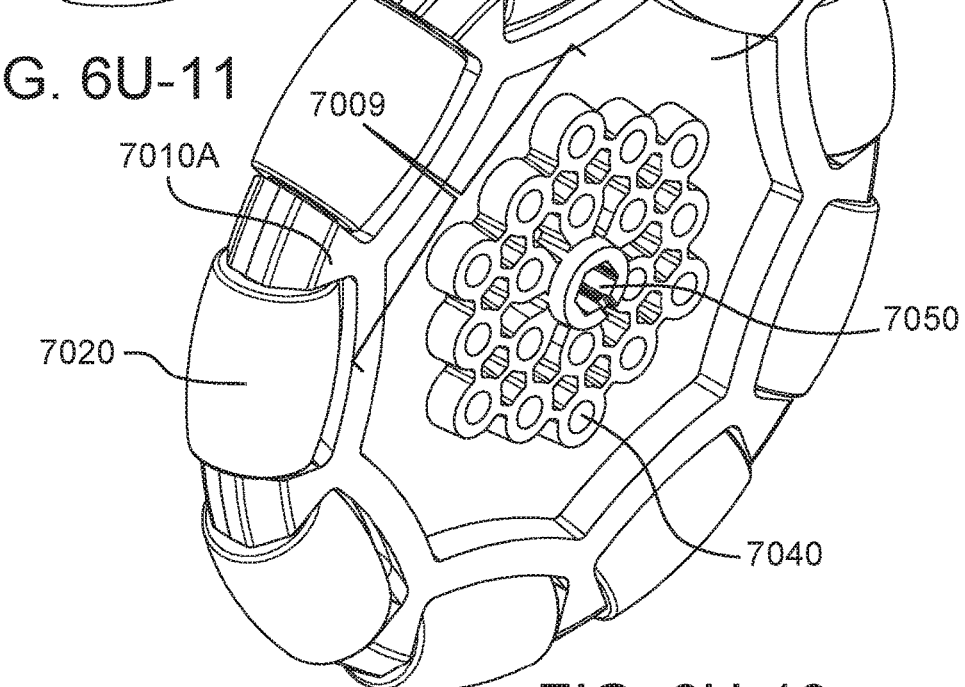
FIG. 6U-11
FIG. 6U-10

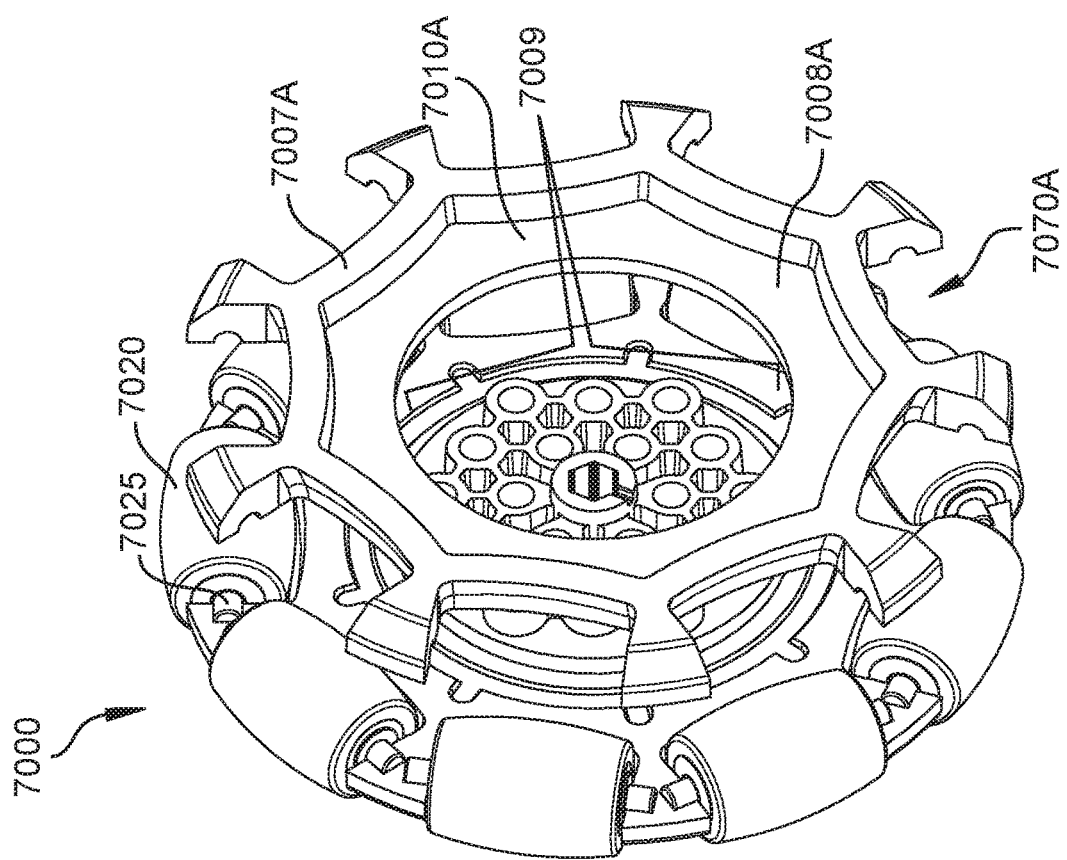
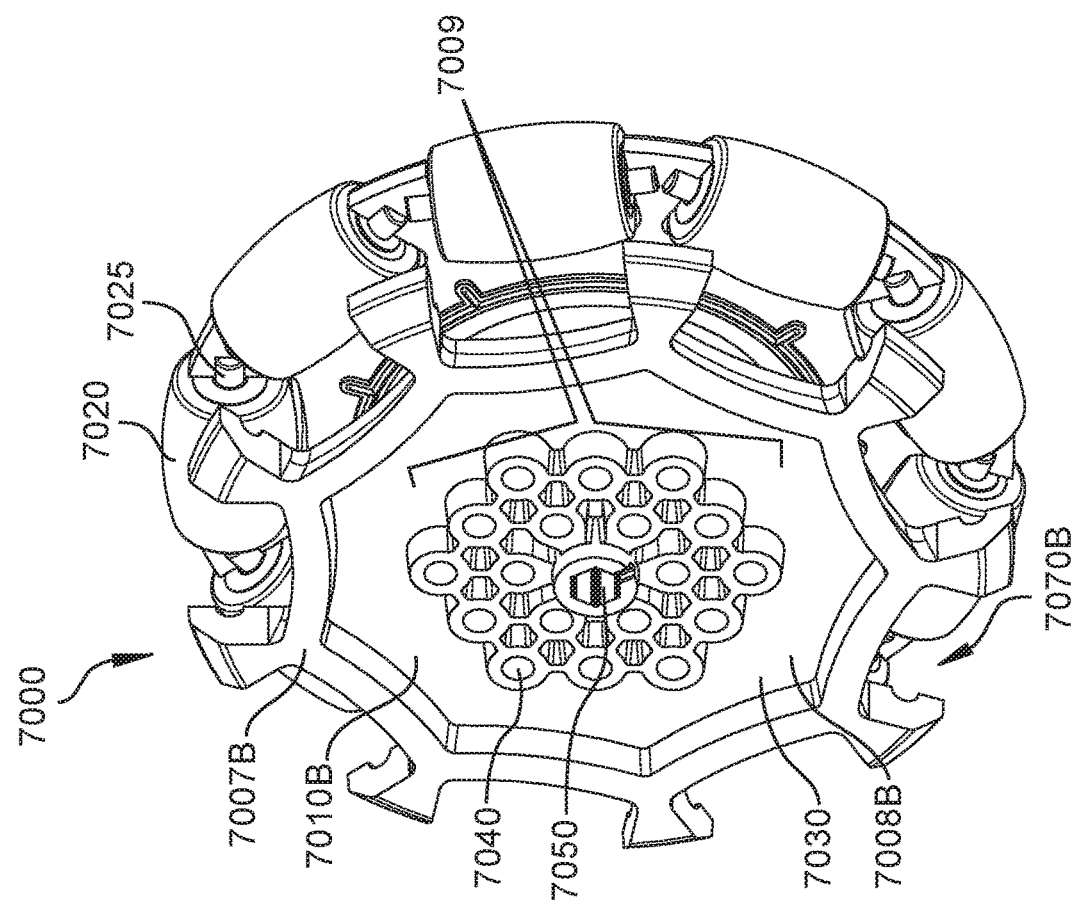

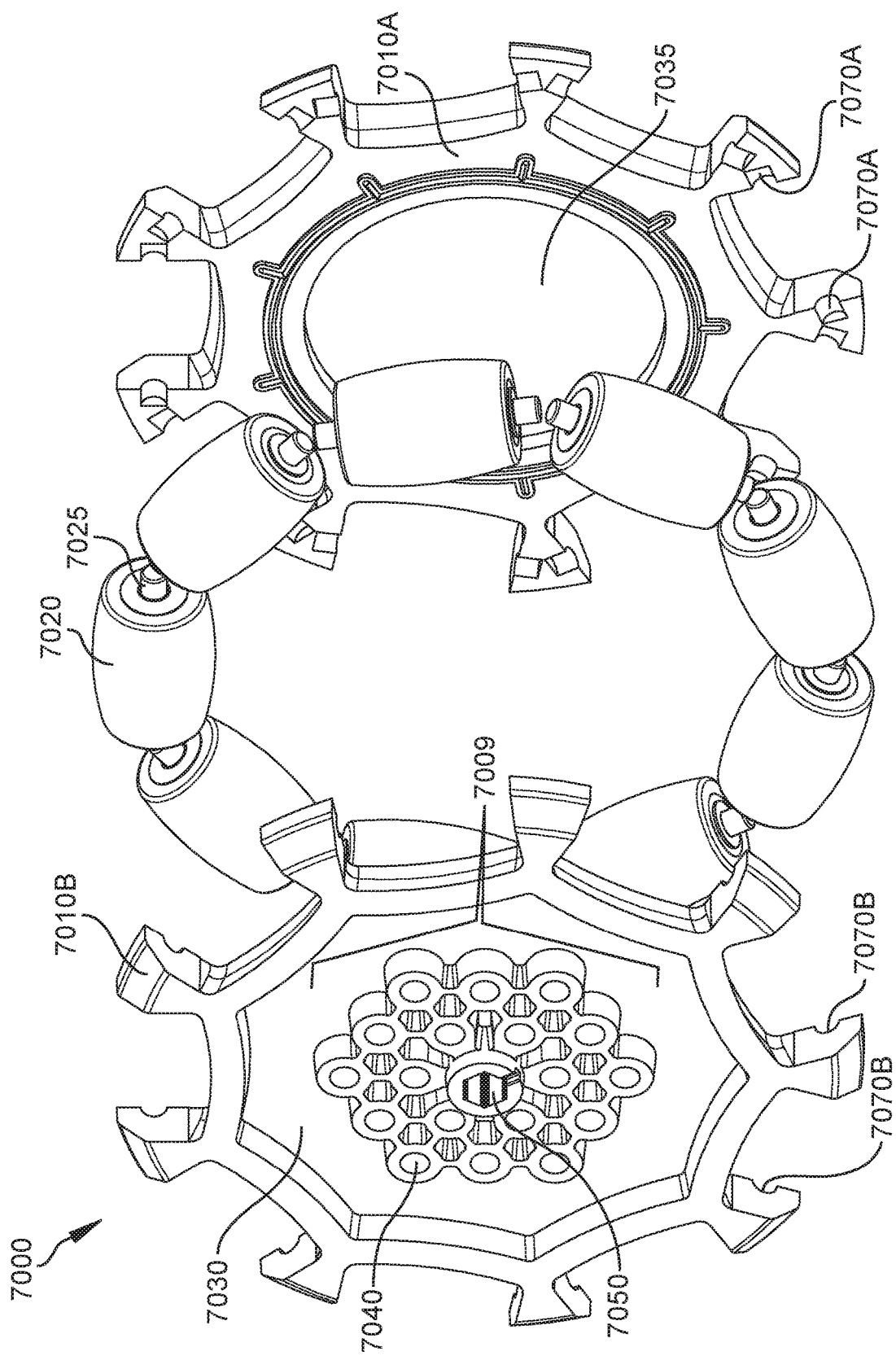

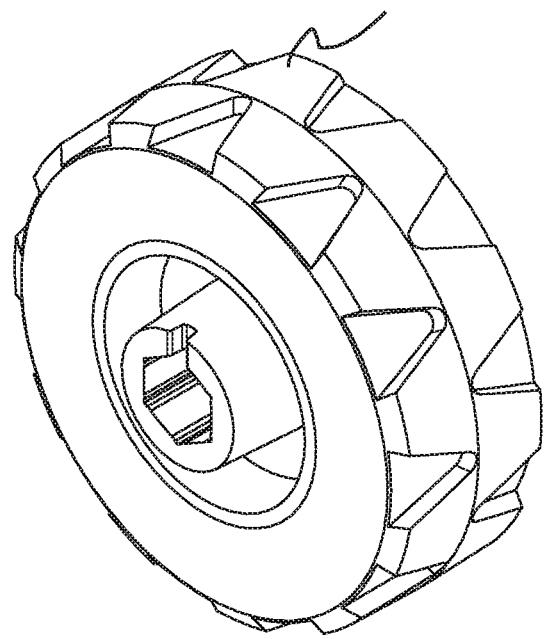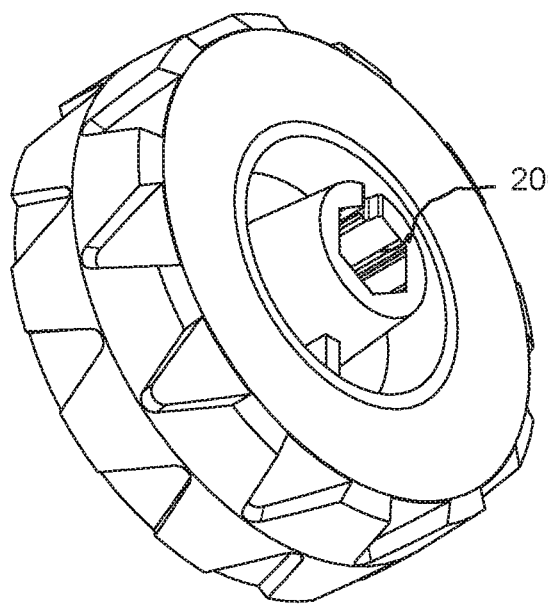
FIG. 6V

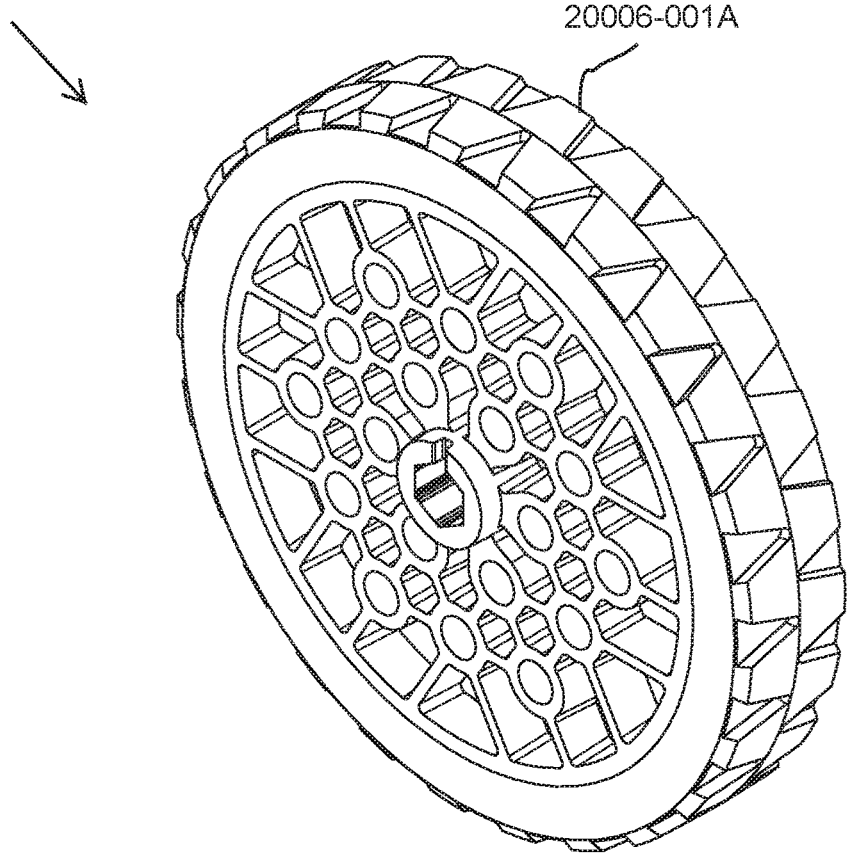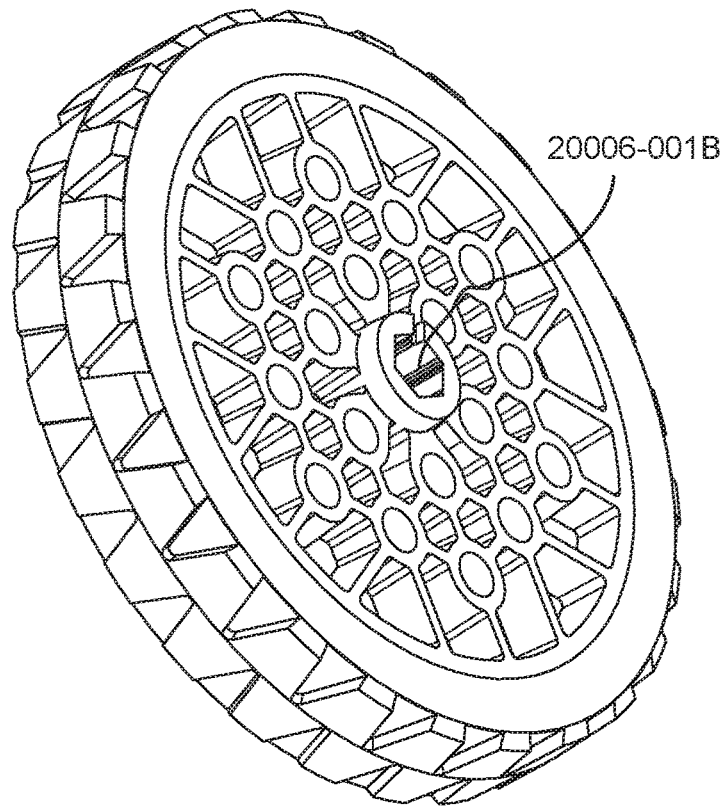
FIG. 6W

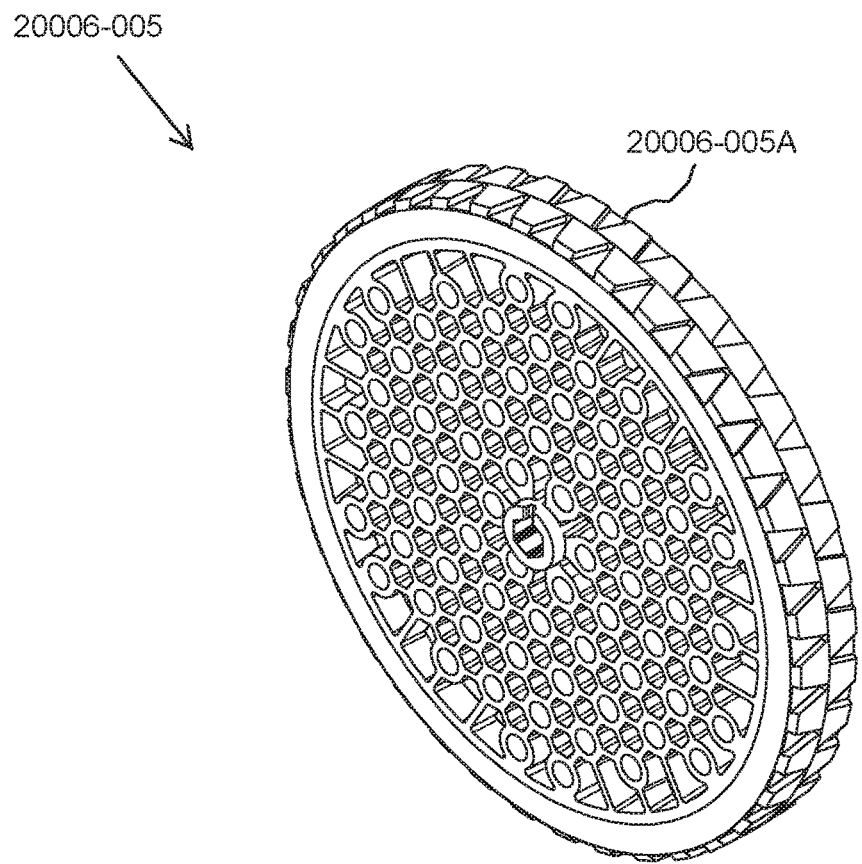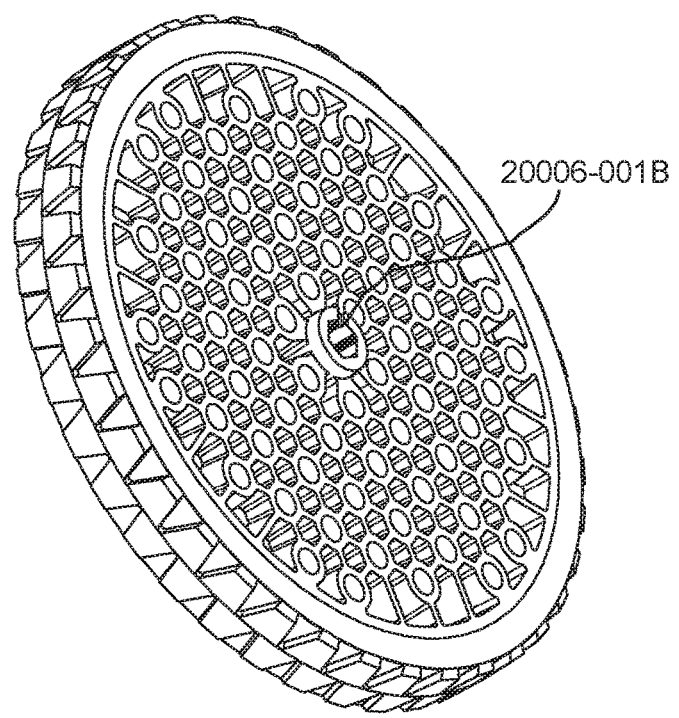
FIG. 6X

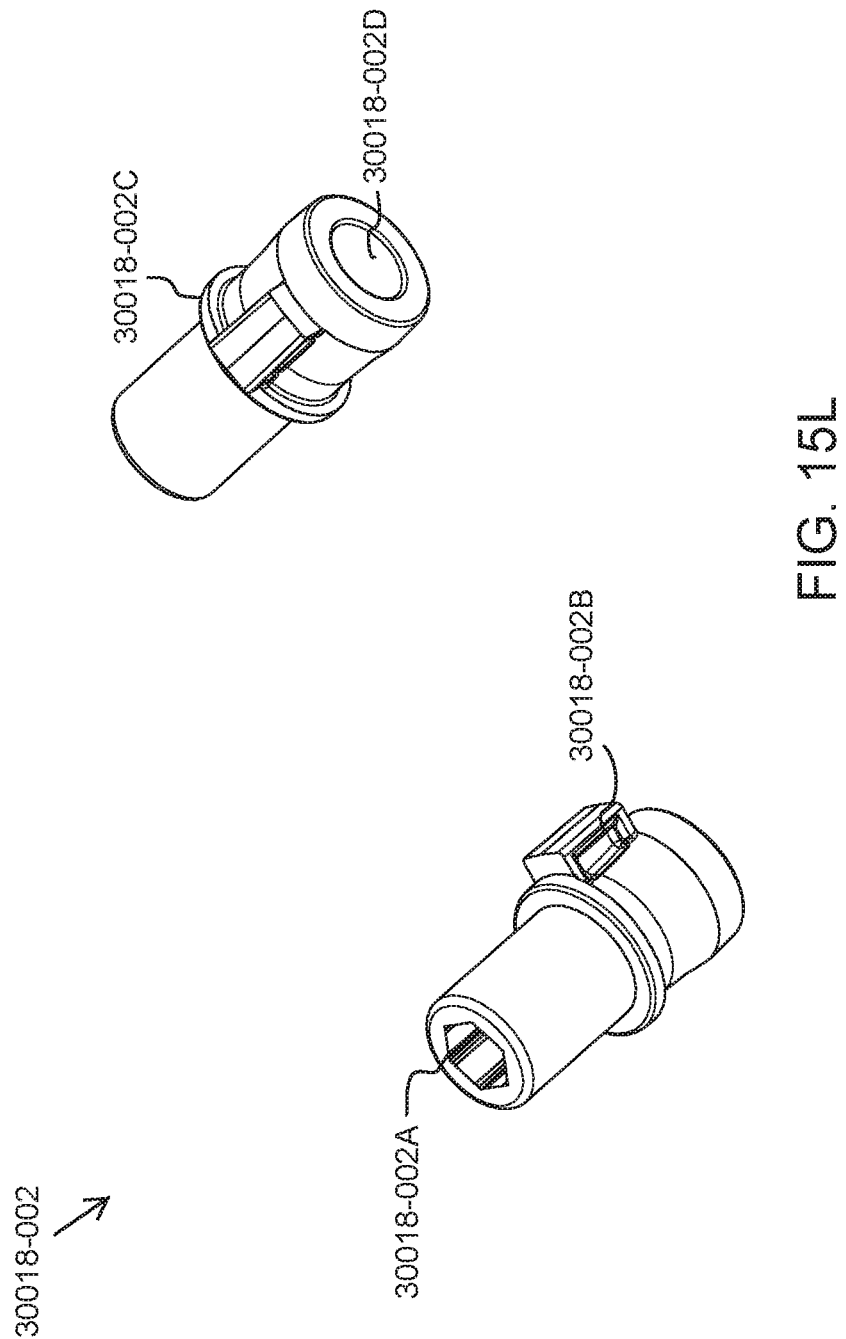

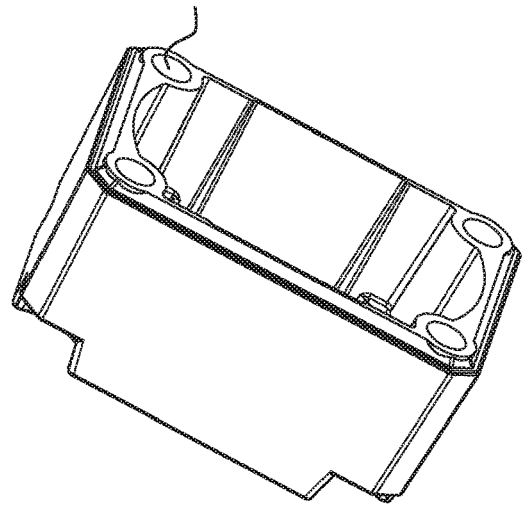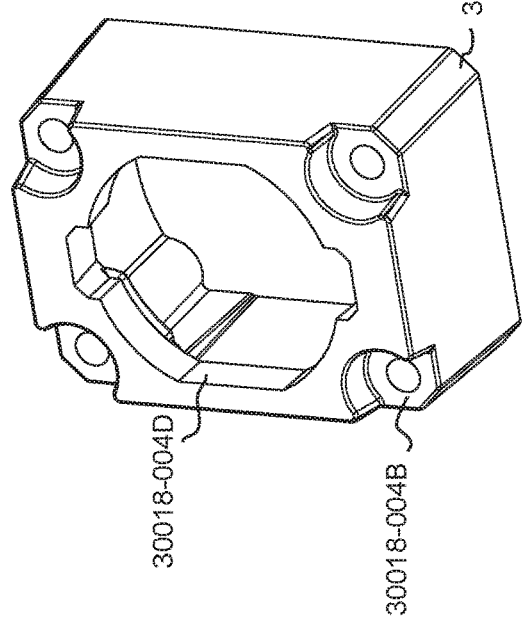
FIG. 15M

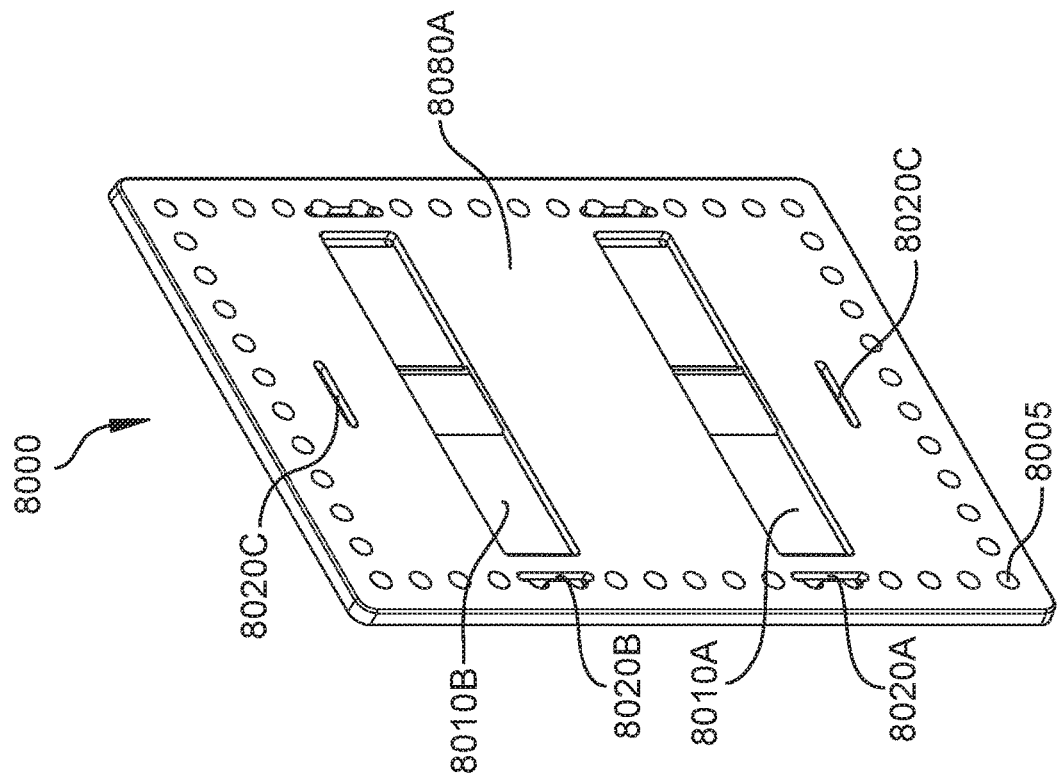
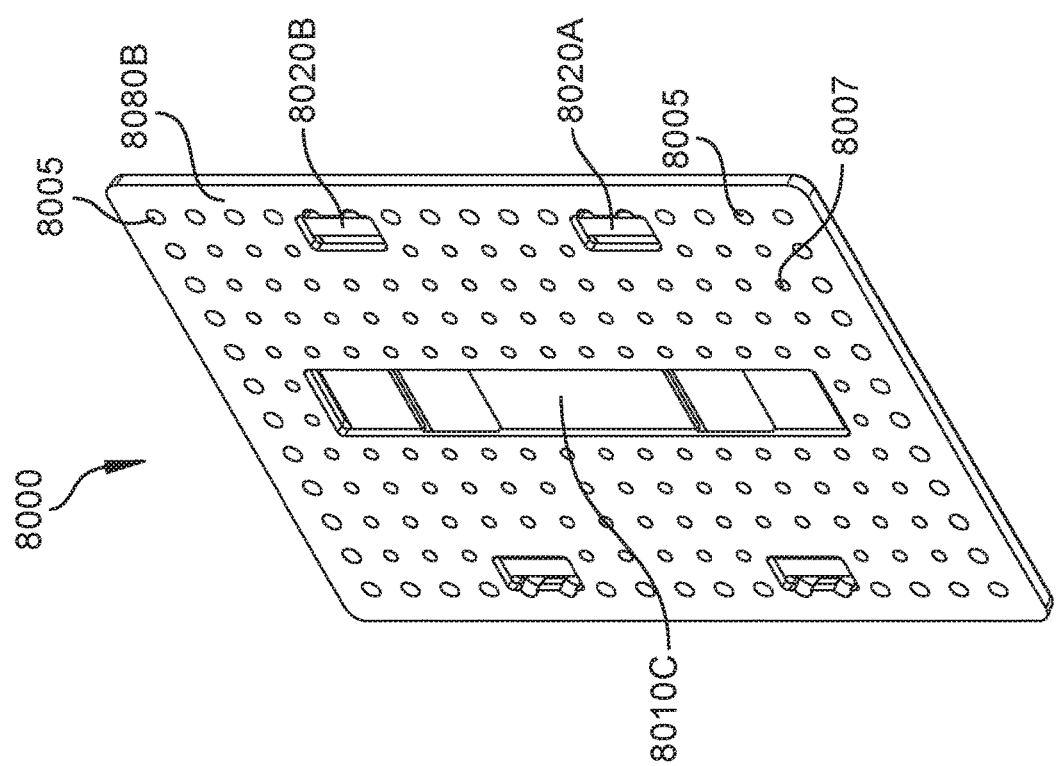

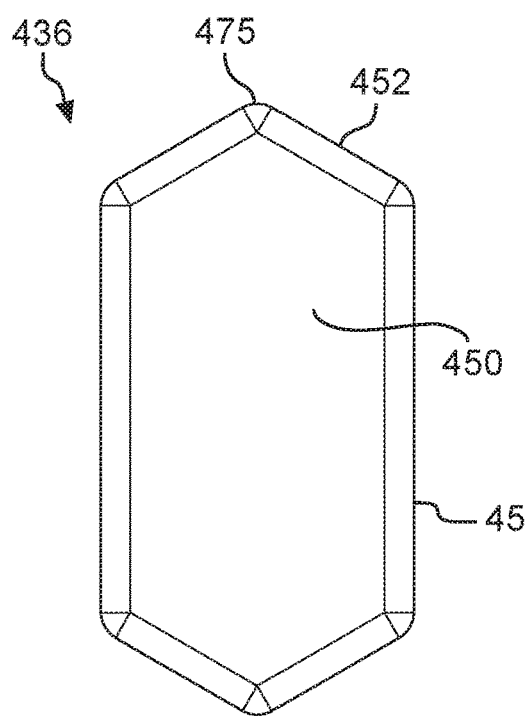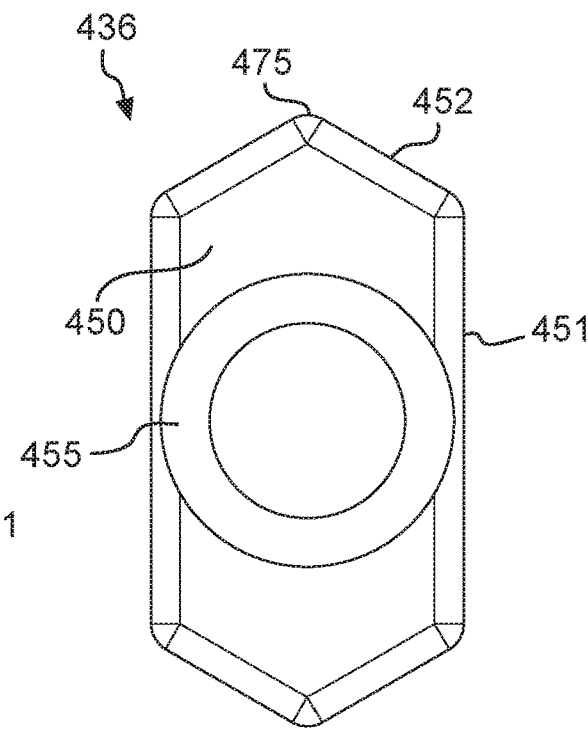
FIG. 42A      FIG. 42B
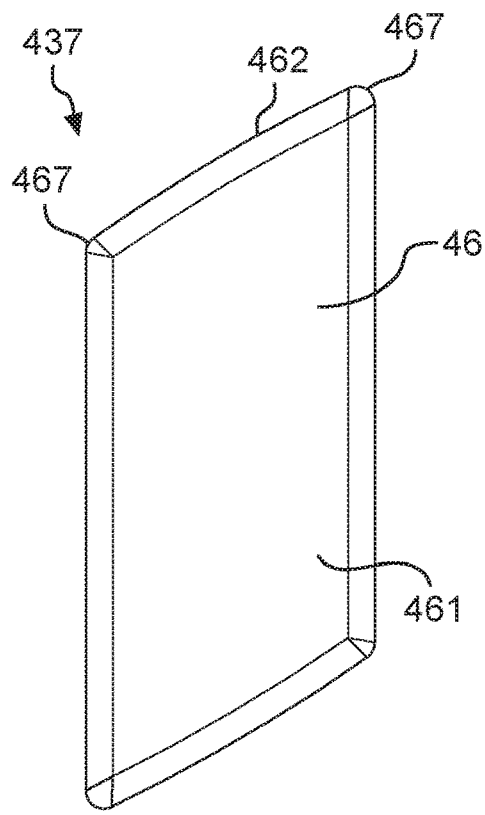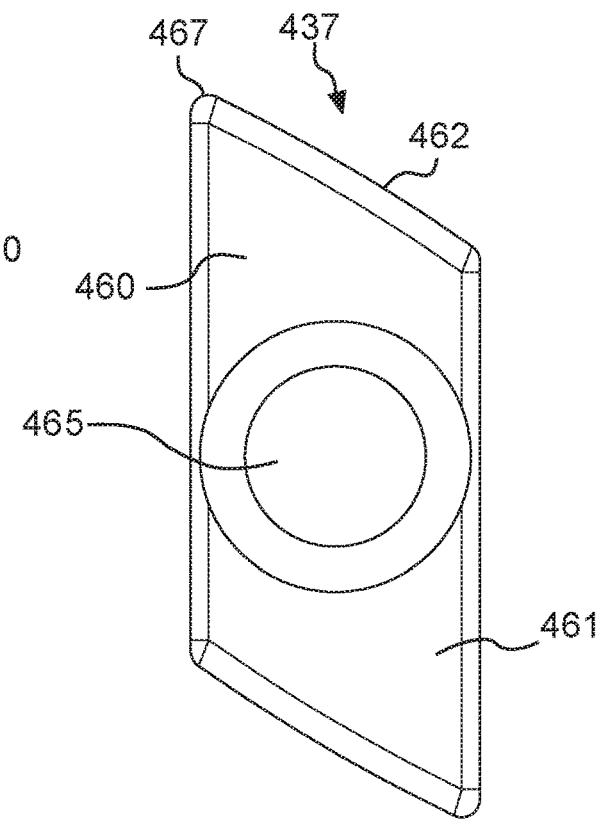
FIG. 43A      FIG. 43B

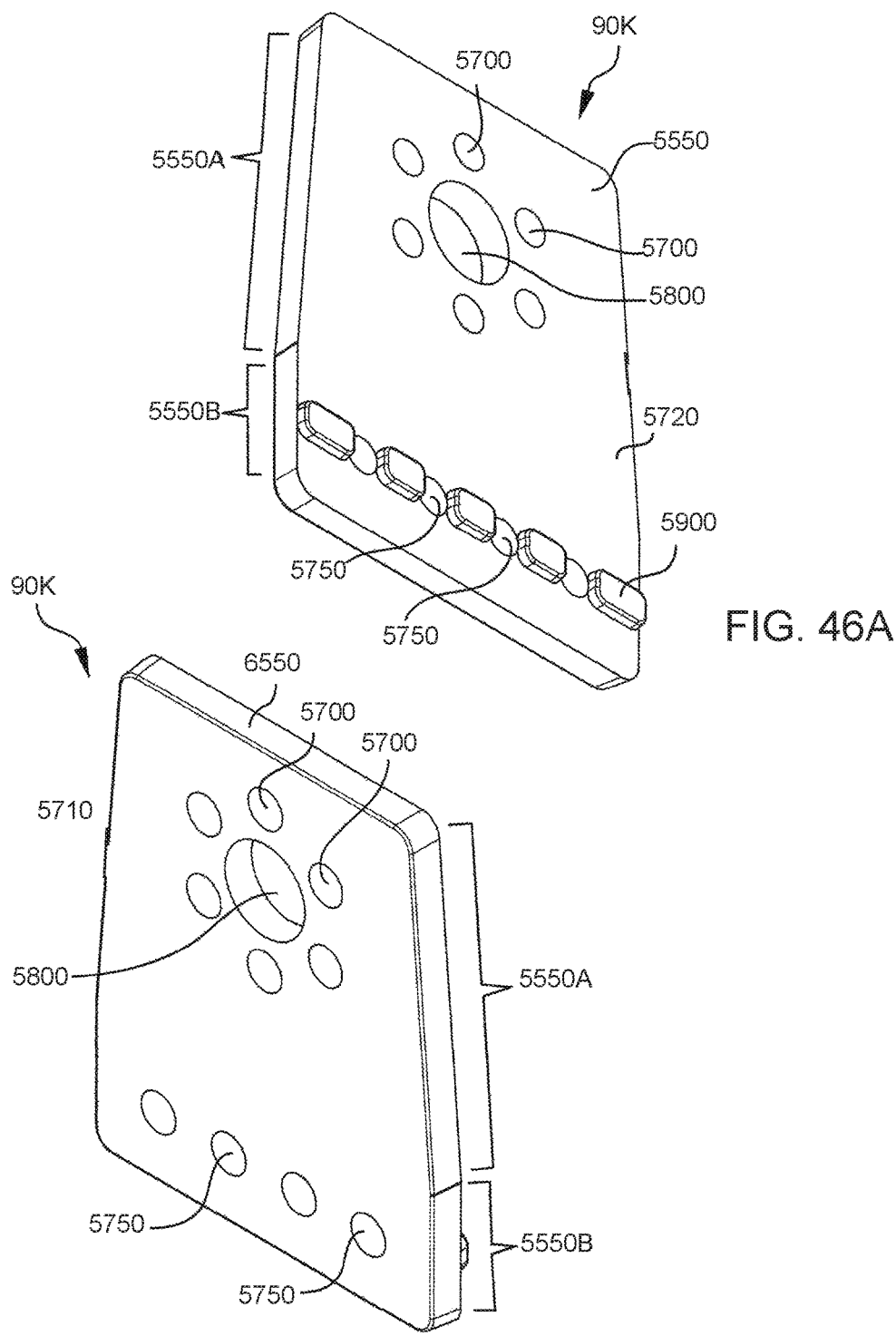

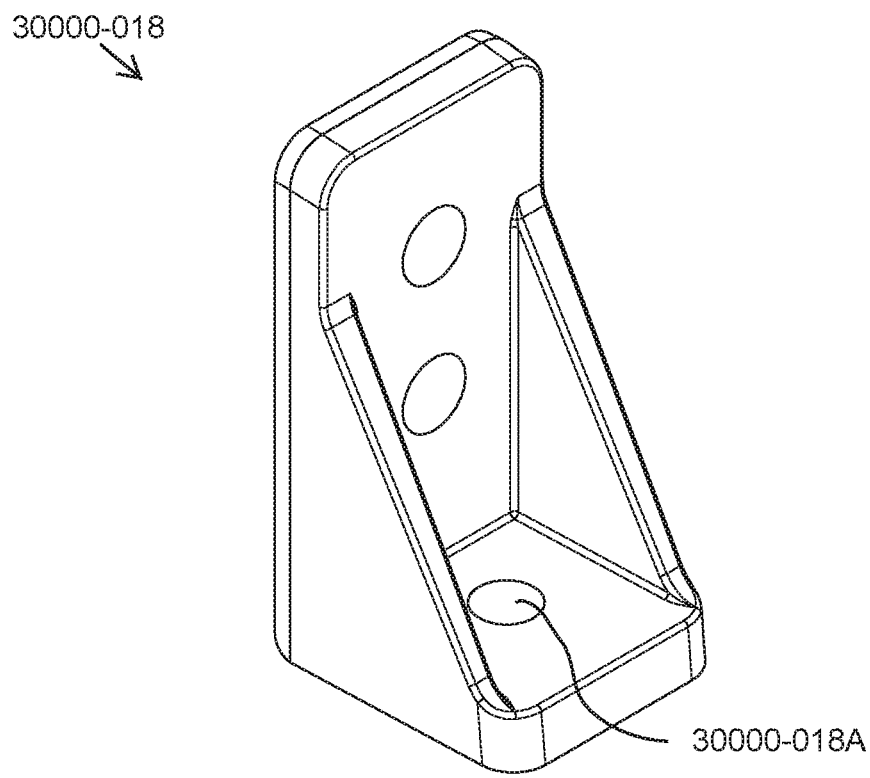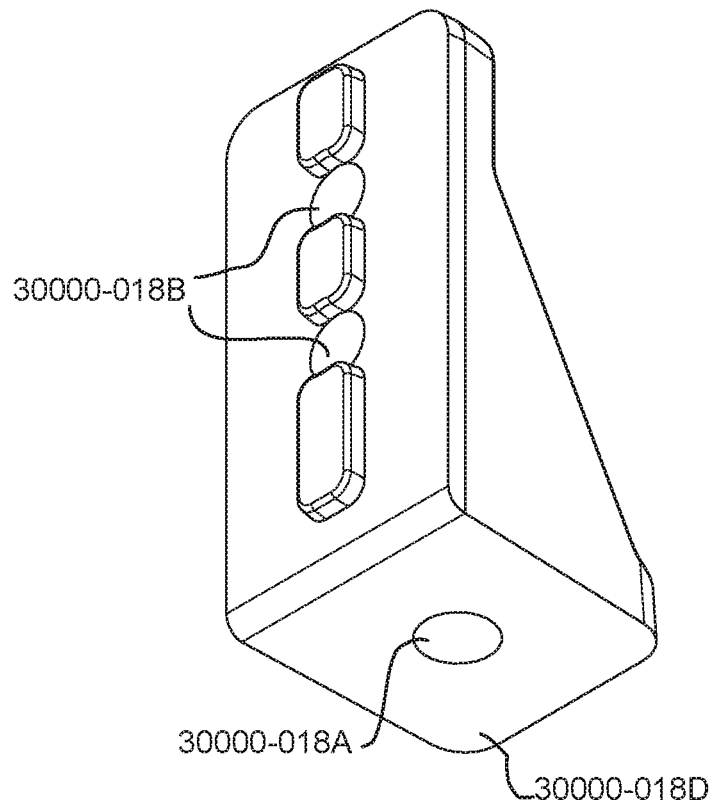
FIG. 53C

MODULAR ELECTRO-MECHANICAL AGENT

CROSS REFERENCE TO RELATED APPLICATIONS

None.

BACKGROUND

The present teachings relate to an electro-mechanical agent. More specifically, the present teachings relate to an electro-mechanical agent that can be configured to form an expandable modular construction system, apparatus of the electro-mechanical agent, and method for constructing one or more electro-mechanical agents such as a robot from a set of modular components.

Global education structure has gradually shifted from what was a purely academic and textual/knowledge based system to a compound system derived from a strategic blend of curricular and co-curricular activities. Inter-school, inter-college and even inter-state student's competitions in various disciplines, serve as a fine platform for application of academic learning since applied-skills are hard to develop at an institutional environment. Technology-driven companies and research organizations take active interests in creating such opportunities which not only develop scientific temperament in participants but also reduce the industry-academic gap in terms of exposing students to latest technical tools and helping organizations fish out bright brains that can be nurtured from an early stage.

For over a decade now, robotic competitions have taken the spot-light amongst other technical competitions across various countries. The competition mainly involves rapid robot building from limited components such that the finished robot is enabled to complete one or more assigned tasks. The tasks can differ from one age group to another. Typically, an older age group is assigned a more complex task than a younger age-group, thus increasing the expectation of building a more versatile robot. Most robotic construction kits comprise inter-connectable components to form a base which can be expanded for providing additional features depending upon the task assigned to the robot. Distinct set of components, in the form of a kit, can be provided to respective age groups. For example, a set of components designed and/or marketed for a younger age group is more likely to introduce students to basic engineering concepts and tools, in a lucid manner, than a set of components designed for older age groups. Such sets can comprise fewer parts with minimum need of assistive components. An example of a starter kit can be a LEGO™ mind storms EV3 kit that comprises less complex components. Such starter kits aim at invoking the participants to apply their preliminary engineering knowledge and/or intuitive thinking for constructing and functioning of the robot. Construction sets for participants belonging to a higher age group can include higher number of components with increase in complexity of assembling and functioning of these components. Additionally, these components can be customized by the participants such that they are suitable for the assigned task/s. As previously mentioned, the set of components can be expandable, i.e. the participants can add, eliminate and/or modify the components to provide additional features to the robot for making it suitable for one or more assigned tasks. The nature of these assigned tasks can be varied. For the purpose of describing construction and functioning of the electro-mechanical agent, some of the potential assigned tasks have been discussed in this specification. One of the assigned tasks can be to carry a certain number of objects from a first location to a second location and the robot may be required to follow a certain path for performing this function within a specified time and/or within a specified area. For such a task the robot can use line-following sensors along with target object detection sensors to complete the assigned task. Yet another example of an assigned task can be to make the robot proceed from a start point to an end point with a number of obstacles in the path which the robot is required to detect and avoid by altering its route or passing over the obstacles without causing any damage to the obstruction or to itself. In such scenarios the robot can use, for example ultrasonic sensors for obstacle detection. Likewise, the speed and efficiency of a robot can be altered by different types or numbers of gear motors with appropriate gear drives.

Increased interest in robotics and higher participation in related competitions has created a thriving market for construction sets suitable for every participating age group. Each participant or a participating team needs an inexpensive construction kit including fewer parts with no compromise on efficiency, load bearing or programming capabilities. A higher complexity in the task increases the cost and number of parts that could be required to build the appropriate robot. Most participating teams include students from public schools and home-schools where funding can be a concern. These students often struggle to obtain financial support for enrollment and purchase of one or more appropriate construction kits. Not all participating teams get financial encouragement from schools. Hence, there stands a need for providing an inexpensive robot construction kit which can be afforded by the participating teams or sponsored by the respective institutions. The disclosed system and apparatus aims at easing the cost burden for construction and operation of an electro-mechanical agent without compromising on the efficiency of each participating component in contributing towards any assigned task/s.

SUMMARY

In accordance with the present teachings, aspects of the current disclosure relate to a modular electro-mechanical agent that can comprise a plurality of modules. The modules can optionally be a mechanical component or an electrical component or can be a combination of a mechanical and an electrical component. The electro-mechanical agent can be constructed to complete at least one pre-determined task and/or contribute in performing the at least one pre-determined task. The electro-mechanical agent can further comprise extension modules that can be obtained from outside the modular construction system. As a result, the electro-mechanical agent can be altered as per user preference to add, eliminate or modify any features of the agent for completing and/or participating in a plurality of pre-determined tasks.

The electro-mechanical agent can be configured to be a modular construction system that can include, but is not limited to including, a plurality of extrudates that can be configured to operatively engage for forming at least one base-structure and the base-structure further configured to be expandable using the plurality of fellow modules or the plurality of extension modules. The modular construction system can also include one or more connectors that can be configured to engage a first extrudate with a second extrudate from the plurality of extrudates. The connectors can be further configured to engage the plurality of extrudates with one or more fellow modules of the modular construction system and the one or more extension modules, outside the modular construction system. Engagement between the various modules, extension modules and the connectors can be achieved by way of at least one subordinating connector that can optionally be a fastener. The fasteners can comprise a head region which can be inserted and trapped into a longitudinal cavity that can be provided on the extrudate. The fastener can further include a body that can be connected to the head region and can extend out of the cavity on insertion of the head region into the extrudate.

A method of the present teachings for making a modular construction kit can include, but is not limited to including, forming a base having at least one wheel. The at least one wheel can be attached to the base by at least one shaft collar. The method can further include attaching, by at least one first fastener, at least one mechanical component to the base. The at least one mechanical component can be driven by a gear system, and the gear system can be disposed within a gear carrier. The gear carrier can be attached by at least one second fastener to the base. The method can still further include attaching, by at least one third fastener, at least one printed circuit board to the base. The at least one printed circuit board can include, but is not limited to including, an ESD suppression system, a communications system, and a controller module. The controller module can direct the at least one wheel and the at least one mechanical component according to commands received by the communications system.

The modular construction kit of the present teachings can include, but is not limited to including, a base having at least one wheel. The at least one wheel can attach to the base by at least one shaft collar. The modular construction kit can also include at least one mechanical component that can be attached, by at least one first fastener, to the base. The module construction kit can still further include a gear system. The gear system can be disposed within a gear carrier, and the gear carrier can be attached to the base by at least one second fastener. The module construction kit can even still further include at least one printed circuit board that can be attached by at least one third fastener to the base. The at least one printed circuit board can include, but is not limited to including, an ESD suppression system, a communications system, and a controller module. The at least one mechanical component can be driven by the at least one wheel, and the controller module can direct the at least one wheel and the at least one mechanical component according to commands received by the communications system. The modular construction kit can also include actuators, a current voltage management and measurement system, and at least one sensor.

The modular construction system can further include, but is not limited to including, at least one shaft collar which can be a multi-part component. A first part of the shaft collar can comprise a top portion with a plurality of cantilever features initiating from the top region and extending away from it such that the cantilever features substantially cover a periphery of the top region. A pathway for a shaft can be provided in the first part of the shaft collar such that the plurality of cantilever crenellations surrounds the shaft on receiving it along the pathway. The cantilever features can further provide several crenellations along its outer surface. A second part of the shaft collar can be configured to couple with the first part and further provide an engaging feature complementing the crenellation on the first part. A progressive coupling of the first part and the second part of the shaft collar can cause the shaft to be locked inside the pathway.

At least one controller module can be provided in the modular construction system. The controller module can be configured to play a mediator between a plurality of user interfaces and the mechanical and/or electrical modules on the system. In some configurations, of the controller module of the present teachings, the controller can receive instructions from at least one communicator which can interact with the user-interfaces or instruction generators of the system. The communicator can advance the generated instructions to the controller module which can consecutively manage the functioning of the plurality of modules on the electro-mechanical agent. In some configurations, the controller module can communicate with a communicator placed in the vicinity of the controller module or on the electro-mechanical agent and can communicate through a wireless or cable mode. This communicator can in turn interact with a second communicator placed remotely from the electro-mechanical agent and close to the user-interfaces or the instruction generators. In some configurations, of the controller module, the processing of the instructions and the electronic execution of the instructions for managing the modules can be performed within the controller module. However, in some configurations, the processing of the instructions can occur outside the controller module while the electronic execution can be performed within the controller module. In some configurations, the modular construction system can comprise a second communications device that can optionally analyze and/or execute instructions from at least one communicator and/or user-interface devices disposed on or in the vicinity of the electro-mechanical agent.

A method of the present teachings for building and mounting a printed circuit board with electro-static discharge control can include, but is not limited to including, mounting at least one diversion diode on the printed circuit board in the vicinity of at least one connector. The at least one connector can provide signals to the printed circuit board from a source external to the printed circuit board. The method can also include cutting at least one suppression point on the printed circuit board, surrounding the at least one suppression point with a conductive material, creating at least one signal channel between the at least one diversion diode and the conductive material surrounding the at least one suppression point; and mounting, by a conductive fastener through the at least one suppression point, the printed circuit board on a base.

The printed circuit board with electro-static discharge control of the present teachings can include, but is not limited to including, at least one diversion diode mounted on the printed circuit board in the vicinity of at least one connector. The at least one connector can provide signals to the printed circuit board from a source external to the printed circuit board. The printed circuit board can also include at least one suppression point that can be cut on the printed circuit board. The at least one suppression point can be surrounded with a conductive material. The printed circuit board can still further include at least one signal channel that can be created between the at least one diversion diode and the conductive material. The printed circuit board can also include a conductive fastener that can mount, through the at least one suppression point, the printed circuit board to a base.

The present teachings of the modular construction system further comprise a torque-optimizer which can include a plurality of torque optimizing elements. These elements can collectively operate to optimize an incoming torque and advance the resultant torque to at least one driven module engaged with the torque optimizer. The incoming torque can be optionally obtained from at least one rotary transmission module that directly interacts with at least one torque optimizing element of the torque optimizer. In the present teachings the torque optimizing element can be but not limited to a spur gear. One or more rotary transmission modules that can operate as driving module and interact with at least one principal gear which can be further surrounded by conditional gears. A plurality of teeth of a principal gear, that can be one of the torque optimizing elements, can mesh with a plurality of teeth of surrounding conditional gears, that can also operate as another of the torque optimizing elements. Such an arrangement can cause rotation of conditional gears by way of principal gear. Conditional gears can optionally be compound gears such that a first part of the conditional gears can include a first set of teeth that can be distinct from a second set of teeth present on a second part of the conditional gears. The principal gear can be disposed such that at least one of the first or the second part of the conditional gears mesh with principal gear. The torque-optimizer configuration can further comprise a ring gear which can be configured to surround the conditional gears, the ring gear can also be one of the torque optimizing elements. The ring gear configuration of the present teachings can optionally surround at least one conditional gear. The ring gear can be disposed to mesh with the teeth of the conditional gears such that this meshing is substantially distinct from meshing between the conditional gears and the principal gear. In some configurations, interaction of the conditional gears with the ring gear can cause the ring gear to rotate about its axis while the conditional gears can rotate about their respective axes and simultaneously revolve around the principal gear. In some configurations, the ring gear can be held stationary while the conditional gears can continue to rotate about their respective axes and can concurrently revolve around the principal gear, optionally meshing with principal gear on one side and/or meshing with ring gear on another side. The torque optimizer can further comprise an output gear which can be co-axial with the ring gear, the output gear can further comprise an inner circumference with a set of gear-teeth disposed on the inner circumference. Additionally, the output gear can be configured to rotatable engaged with a part of the conditional gears other than the part that meshes with the principal gear and the ring gear. The output gear can be engaged with at least one driven component to which the resultant torque is applied.

The torque optimizer of the present teachings can further comprise a plurality of carriers or spacers that can be configured to appropriately align the torque-optimizing elements during operation of the optimizer. In some configurations of the torque-optimizer, the conditional gears can be substantially cylindrical in shape and comprise at least one notch on at least one terminal end of the conditional gears. The carrier configuration of the present teachings can comprise a first set of discs opposing one another and can be disposed such that each of the discs can substantially cover at least one terminal end of conditional gears that face corresponding carriers. Some configurations of the disc can further comprise a plurality of nubs which can be configured to engage in matching notches of conditional gears. In some configurations, the carriers can comprise a plurality of nubs along with projections from opposing discs such that the projections can substantially fill in at least one gap between adjacent conditional gears. The opposing carriers and their respective projections can mate by way of dowel pins that can be provided on a first projection and is received in a dowel pin insert on an opposing projection of the mating disc. In some configurations, the carriers can be a single continuous component which can comprise a set of opposing discs that can be connected by at least one bridging feature. Each of the bridging features can be surrounded by at least one conditional gear such that the gear teeth extend away from the bridging feature. Such a geometry can cause the carrier to be a single continuous component.

The modular construction system can include a gear motor enclosure that can accommodate flexible arrangement of the gears internal to the enclosure, and that is compact. In some configurations, a crown gear can be included in the gear arrangement. The crown gear can include contouring on the teeth that can improve engagement with surrounding gears. The crown gear can also include means to impact tolerance during operation, for example, the crown gear thickness can be adjusted to adjust the tolerance.

The modular construction system can further include a sensing component enclosed in a sensor housing that can be mounted on the electro-mechanical agent. The sensing component can be configured to perform sensing operations such as, but not limited to identifying one or more target objects and/or an obstacle in vicinity of the electro-mechanical agent, identifying one or more pathways to allow a controlled motion of the electro-mechanical agent from a first location to a second location and/or any kind of change such as but not limited to, temperature, pressure, voltage or flow measurement, in an environment of the modular construction system, such a change can be related to one or more assigned tasks. Sensing component can be in further communication with the controller module and/or communicator and/or communication processor to process, to notify the sensed change in the environment. The controller module and/or communicator and/or second communications device can process incoming sensed data and/or change from the sensing component and can further process such incoming data so as to issue one or more instructions to a respective module and/or extension module of the electro-mechanical agent. The sensor housing can include, but is not limited to including, a top housing that can include a sensor cavity, a power/data jack cavity, and mounting cavities. The top housing can include an upper circuit board mount/spacer. The sensor housing can include a bottom housing that can include mounting hooks, a lower circuit board mount/spacer, and a power/data jack rest. The bottom housing can include a mounting protrusion. The mounting protrusion can enable mounting of the sensor housing to connectors and railings described herein.

The electro-mechanical agent can comprise a mobility feature by way of providing at least one mobility module. In some configurations, the electromechanical agent can comprise at least one traction wheel that can operate as a mobility module for allowing a user-instructed motion of the electro-mechanical agent. The traction wheel can further cause the electro-mechanical agent to move in at least one pre-determined pathway without changing direction of the traction wheel. In some configurations, the electro-mechanical agent can further comprise at least one omni-directional wheel. The omni-directional wheel can be configured to provide an omni-directional drive feature to the electro-mechanical agent. Such a feature can be obtained by providing at least one roller element on one or more frames of the omni-directional wheels. The roller element/s can be disposed such that an axis of the roller element, about which the roller element can rotate, can be substantially perpendicular to an axis of the omni-directional wheel, about which a frame of the wheel can rotate. Additionally, roller element/s can be disposed such that each of the participating roller element/s can independently and uninterruptedly perform its rotational motion. Distribution of the roller element/s can be such that they substantially occupy a periphery of the at least one frame and can ensure a continuous circumference of the omni-directional wheel.

A first configuration of an omni-wheel can comprise a first wheel frame and a second wheel frame that can mate by way of substantially receiving at least one brace member, provided on a first and/or a second wheel frame, into an interval that can be provided on another of the first and/or second wheel frame. The first and the second wheel frames can be further configured to provide a roller space wherein at least one roller can be received. The roller space can be formed by at least one pair of flexible members that can be configured to perform a flexing motion to receive the roller into its respective roller space, retaining the roller therein. Additionally, the flexible member along with at least one corresponding brace member can optionally form the roller space. A first configuration of the roller can comprise at least one notch on a terminating end of the roller such that at least one nub provided on flexible pillars, can engage with the notch. Such an arrangement can trap the roller in the roller space, wherein the roller can perform its rotational motion.

A second configuration of an omni-wheel can comprise a first support plate and a second support plate with peripheral features and brace members that can cause the first support plate to mate with the second support plate. The first support plate and the second support plate can further provide a plurality of rollers which can be disposed annularly there upon. In some configurations, the peripheral features and the annularly disposed rollers can be arranged to provide a substantially continuous periphery to the omni-wheel. One of the many configurations of roller/s can comprise a roller stem that can form a bone about which the roller can perform its rotational motion. The roller stem can further comprise stem nubs that can be parked on nub platforms optionally provided by peripheral features on a first and/or second support plate. In some configurations, the nub platforms can be crates in which the stem nubs can settle. Mating of a first support plate and a second support plate can cause the rollers to be retained in corresponding roller space by trapping the stem nubs between at least one nub platform, belonging to first support plate, and a co-operating case, belonging to a brace member of second support plate. A third configuration of the omni-wheel can comprise a wheel frame with roller pocket/s configured to retain respective roller/s therein and can be annularly distributed to provide a continuous circumference to the omni-wheel. In some configurations, the roller pockets can be disposed on a first side and a second side of the wheel frame in an offset manner. Uninterrupted motion of the roller can be caused by providing at least one interval between adjacent rollers. These intervals can be filled in by locking pins that can be received therein and can concurrently lock the rollers in their respective roller pockets. In some configurations, the omni-wheels can be assembled using an ultrasonic welding technique.

Modules of the electro-mechanical agent can include inter-connectable features such as, for example, but not limited to, cavities spaced to enable alignment with components of the electro-mechanical agent. Modules can also include nubs or protrusions that can align with, for example, extrudate fastener accommodations. Modules such as, for example, wheels, sprockets, gears, and pulleys can include hole/spoke patterns that can accommodate fastening, alignment, and coordinated movement. The pulleys can include alternating protrusions forming the pulley cord channel. The alternating protrusions can enable single pull release of a manufacturing mold of the pulley.

Connectors of the electro-mechanical agent can include an indexable bracket including a two-piece connector for variably connecting one or more modules such that a first module is adjustably engaged with respect to a second module. The two-piece connector can include a first piece affixed to the first engaging module. The first piece can include a threaded surface and a generally planar surface. The planar surface can face the first engaging module and the threaded surface can face the incoming second engaging module. The first piece can include apertures that can receive fasteners that can aid engagement between the first piece and the first module. The indexable bracket can include a second piece affixed to the second engaging module. The second piece can variably engage with the first piece. The second piece can include a top portion and a bottom portion. The top portion can include a hole pattern that can receive at least one insert portion from the second engaging module there through. The bottom portion can include at least one slot and a complementing threaded surface configured to mate the first threaded surface of the first piece. The slots can accept a remaining portion of the fasteners. A nut can lock the fastener and obtain an engagement between the first piece and the second piece of the two-piece connector.

Connectors of the electro-mechanical agent can include a servo motor connector that can include an embedded cavity receiving a servo motor, a frame within the embedded cavity housing the servo motor, peripheral apertures along the peripheral of the frame accommodating the servo motor, alignment nubs, and connecting apertures associated with the alignment nubs. Connectors can include variable angle connector including a first portion and a second portion, the first portion including at least one semi-circular aperture and a complementing aperture, the second portion including a plurality of connecting apertures associated with a plurality of alignment nubs. Connectors can include a plate including a pattern of dimples, the dimples enabling drilling of mounting points on the plate, the plate including strap slots.

A method for building and mounting a printed circuit board with electro-static discharge control can include mounting at least one diversion diode on the printed circuit board in the vicinity of at least one connector, the at least one connector providing signals to the printed circuit board from a source external to the printed circuit board. The method can include cutting at least one suppression point on the printed circuit board and surrounding the at least one suppression point with a conductive material. The method can include creating at least one signal channel between the at least one diversion diode and the conductive material surrounding the at least one suppression point, and mounting, by a conductive fastener through the at least one suppression point, the printed circuit board on a base.

A printed circuit board with electro-static discharge control can include at least one diversion diode mounted on the printed circuit board in the vicinity of at least one connector, the at least one connector providing signals to the printed circuit board from a source external to the printed circuit board. The printed circuit board can include at least one suppression point cut on the printed circuit board, the at least one suppression point being surrounded with a conductive material. The printing circuit board can include at least one signal channel created between the at least one diversion diode and the conductive material, and a conductive fastener mounting, through the at least one suppression point, the printed circuit board on a base.

The modular construction kit of the present teachings can include a base that can include extrusions. Mechanical components can be attached by a connector to the base. The connector can include an indexable bracket. The modular construction kit can include electrical components that can be attached by connectors to the base, and controller enclosures that can be attached by connectors to the base. The controller enclosures can include communications systems and controller modules. The controller modules can direct the electrical components to move the mechanical components according to commands received by the communications systems. The indexable connector can include a first piece including a first threaded surface and an opposite planar surface. The first piece can include apertures to receive fasteners. The indexable connector can include a second piece that can variably engage with the first piece. The second piece can include a top portion and a bottom portion. The top portion can include a hole pattern, and the bottom portion can include at least one slot and a second threaded surface that can complementarily mate with the first threaded surface. The modular construction kit can optionally include sensor enclosures that can be attached by connectors to the base. The sensor enclosures can include sensors that can sense the environment in the vicinity of the modular construction kit. The modular construction kit can include shaft collars attaching mechanical components to the base. The shaft collars can include a first part and a second part. The first part can include a head region and a body. The second part can include a locking fixture engaging the body. The body can include cantilever crenellations protruding from the head region, and the locking fixture can include a plurality of rings engaging the crenellations.

BRIEF DESCRIPTION OF THE DRAWINGS

These and other aspects will become more apparent from the following detailed description of the various configurations when taken in conjunction with the accompanying drawings:

FIGS. 4B-1 through 4B-4 and FIG. 4B-4A are schematic diagrams of sub-assemblies of the electro-mechanical agent of the present teachings;

FIGS. 4B-2A through 4B-2C are schematic diagrams of exemplary pulleys of the present teachings;

FIG. 4B-5 is a schematic diagram of a hex-shaped cavity of the present teachings;

FIG. 4B-6 is a schematic diagram of a shaft collar with a circular bore and a hex shaft of the present teachings;

FIG. 4D-1 is a schematic diagram of an adapter and bracket of the present teachings;

FIG. 4G-1 is a schematic diagram of the drive shaft bearing of the present teachings;

FIG. 4G-2 is a schematic diagram of the through-bore bearing of the present teachings;

FIG. 4G-3 is a schematic diagram of the drive shaft bearing of the present teachings;

FIG. 4G-4 is a schematic diagram of the servo shaft adapter of the present teachings;

FIG. 4G-5 is a schematic diagram of another configuration of the through-bore bearing of the present teachings;

FIG. 4G-6 is a schematic diagram of the 10-tooth sprocket of the present teachings;

FIG. 4G-7 is a schematic diagram of the 15-tooth sprocket of the present teachings;

FIG. 4G-8 is a schematic diagram of the 20-tooth sprocket of the present teachings;

FIG. 4G-9 is a schematic diagram of the 54-tooth sprocket of the present teachings;

FIG. 4G-10 is a schematic diagram of the 26-tooth sprocket of the present teachings;

FIG. 4G-11 is a schematic diagram of the 40-tooth sprocket of the present teachings;

FIG. 4G-12 is a schematic diagram of the 15-tooth gear of the present teachings;

FIG. 4G-13 is a schematic diagram of the 30-tooth gear of the present teachings;

FIG. 4G-14 is a schematic diagram of the 125-tooth gear of the present teachings;

FIG. 4G-14A is a schematic diagram of a second configuration of the 125-tooth gear of the present teachings;

FIG. 4G-15 is a schematic diagram of the 45-tooth gear of the present teachings;

FIG. 4G-16 is a schematic diagram of the 60-tooth gear of the present teachings;

FIG. 4G-17 is a schematic diagram of the 72-tooth gear of the present teachings;

FIG. 4G-18 is a schematic diagram of the 90-tooth gear of the present teachings;

FIG. 4G-19 is a schematic diagram of the 15-tooth servo motor gear of the present teachings;

FIG. 5 is a schematic diagram of a first view a configuration of the electro-mechanical agent comprising omni-directional wheels;

FIG. 6 is a schematic diagram of a second view of a configuration of the electro-mechanical agent comprising omni-directional wheels;

FIGS. 6A-6C are schematic diagrams of a traction wheel of the present teachings;

FIGS. 6U-1 through 6U-15 are schematic diagrams of omni-directional wheels of the present teachings;

FIGS. 6V and 6V-1 are schematic diagrams of a 30 mm wheel and tire of the present teachings;

FIGS. 6W and 6W-1 are schematic diagrams of a 60 mm wheel and tire of the present teachings;

FIGS. 6X and 6X-1 are schematic diagrams of a 90 mm wheel and tire of the present teachings;

FIG. 6X-2 is a schematic diagram of a tire of the present teachings;

FIG. 7 is a perspective view of a configuration of a torque-optimizer of the present teachings;

FIG. 8 is an exploded view of a configuration of the torque-optimizer shown in FIG. 7;

FIG. 9 is a perspective view of a configuration of the gear drive and rotary transmission module in the torque-optimizer of the present teachings;

FIG. 10 is an exploded view of the gear drive, including carriers, in the torque-optimizer shown in FIG. 9;

FIG. 11 is another exploded view of the gear drive including the carriers, shown in FIG. 10;

FIG. 12 is yet another view of the carriers shown in the exploded view of the gear drive in FIG. 10;

FIG. 13 is an exploded view of another configuration of carriers and the conditional gears in the torque-optimizer of the present teachings;

FIG. 14 is a cross-section view of the gear drive with carrier configurations shown in FIG. 13;

FIG. 15 is a representative view of a configuration of the gear drive included in the torque-optimizer of the present teachings;

FIG. 15A-1 is a perspective view of a third configuration of the gearmotor of present teachings;

FIG. 15C-1 is a perspective view of another configuration of the gear drive and motor of the gearmotor of the present teachings;

FIG. 15E-1 is an exploded perspective view of another configuration of the gear drive of the present teachings;

FIG. 15E-2 is a perspective view of another configurations of the gear drive of the present teachings;

FIG. 15G-1 is a perspective view of the crown gear of the present teachings;

FIG. 15L is a perspective view of the potentiometer shaft mount of the present teachings;

FIG. 15M is a perspective view of the potentiometer upper housing of the present teachings;

FIG. 16 is a first view of an enclosure configuration of the controller module of the present teachings;

FIG. 17 is a second view of the enclosure configuration of the controller module of the present teachings;

FIG. 18 is an exploded view of the enclosure configuration of the controller module in the present teachings;

FIG. 19 is a detailed view of the enclosure configuration of the controller module in the FIG. 18, focusing on the electrostatic discharge suppression features provided on the electronics board and the enclosure;

FIG. 27A-1 is a perspective view of the third example sensor configuration of the present teachings;

FIG. 27A-2 is an exploded, perspective view of the third example sensor configuration of the present teachings;

FIG. 27A-3 is a perspective view of the third example lower housing of the present teachings;

FIG. 27A-4 is a perspective view of the third example upper housing of the present teachings;

FIG. 27A-5 is a perspective view of the sensor circuitry of the present teachings;

FIGS. 40C-1 through 40C-5 are perspective views of the mounting board of the present teachings;

FIGS. 42A, 42B, 43A, 43B, 44A, 44B, 45A, and 45B are perspective views of various configurations of the T-head fastener of the present teachings;

FIGS. 46A-46B are schematic diagrams of perspective views of the motor connector of the present teachings;

FIGS. 49A-49B are schematic diagrams of perspective views of the hex pillow connector of the present teachings;

FIGS. 50A-50B are schematic diagrams of perspective views of the acute angle connector of the present teachings;

FIGS. 51A-51B are schematic diagrams of perspective views of the first configuration of obtuse angle connector of the present teachings;

FIGS. 51C-51D are schematic diagrams of perspective views of the second configuration of obtuse angle connector of the present teachings;

FIGS. 51E-51F are schematic diagrams of perspective views of the third configuration of obtuse angle connector of the present teachings;

FIGS. 52A-52B are schematic diagrams of perspective views of the variable angle connector of the present teachings;

FIGS. 53A-53B are schematic diagrams of perspective views of the inside corner connector of the present teachings;

Figure 55B:
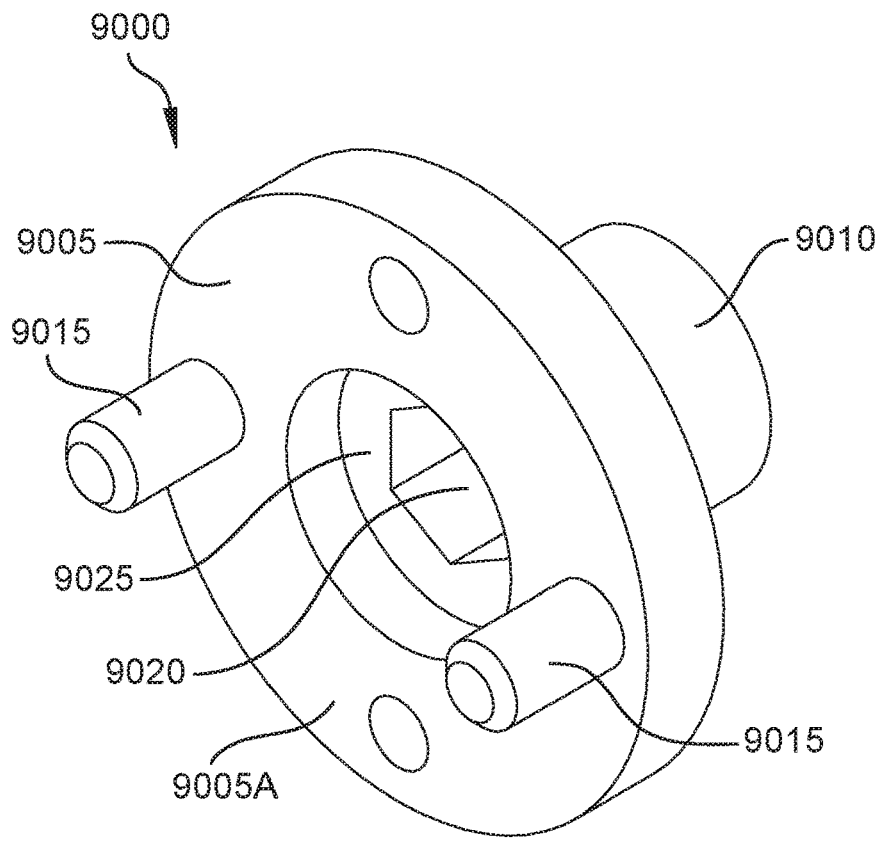
Figure 55A:
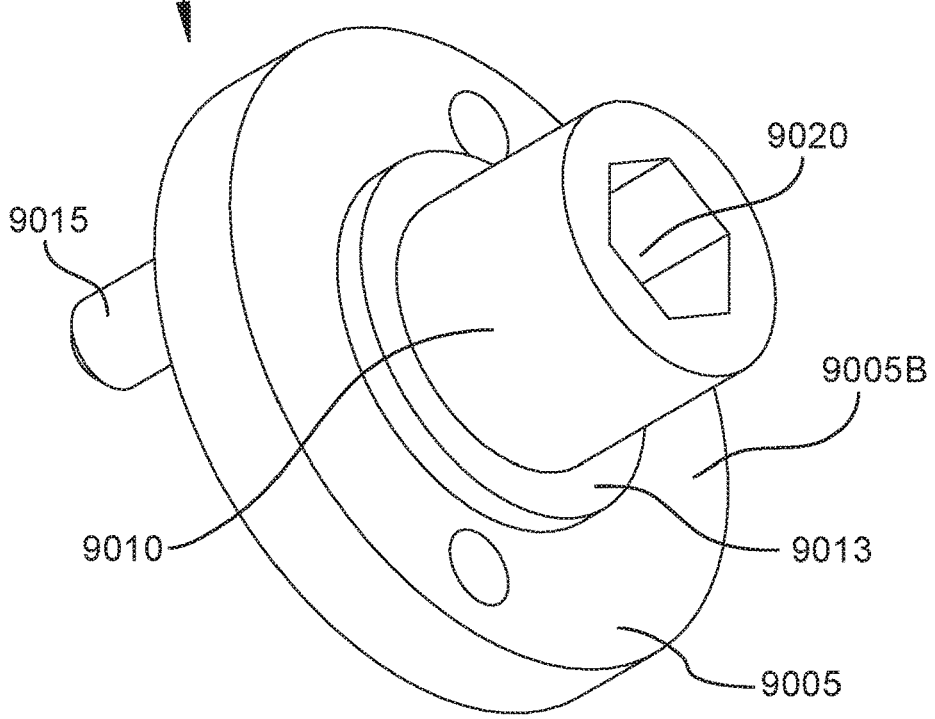
Figure 55C:
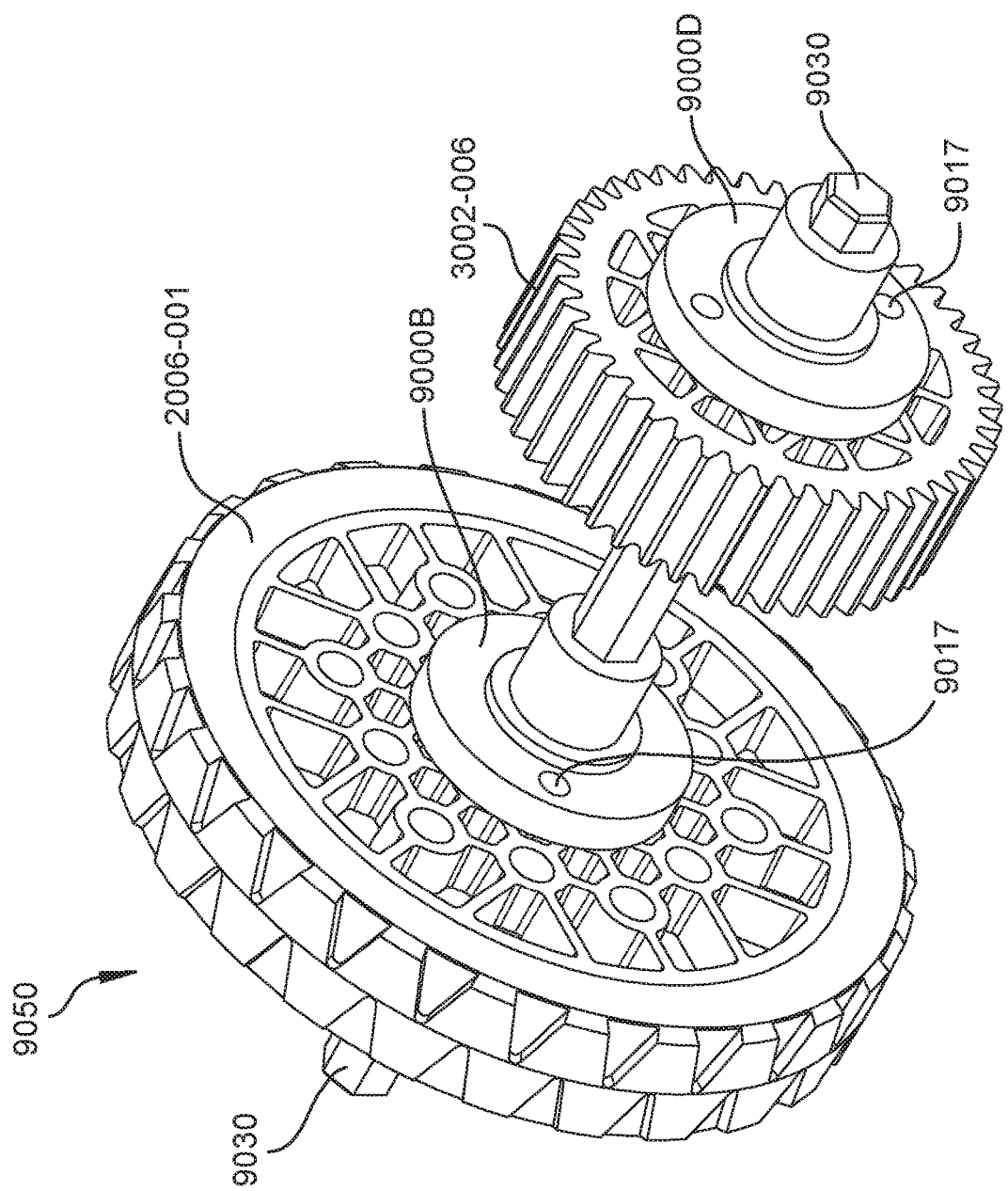
Figure 55D:
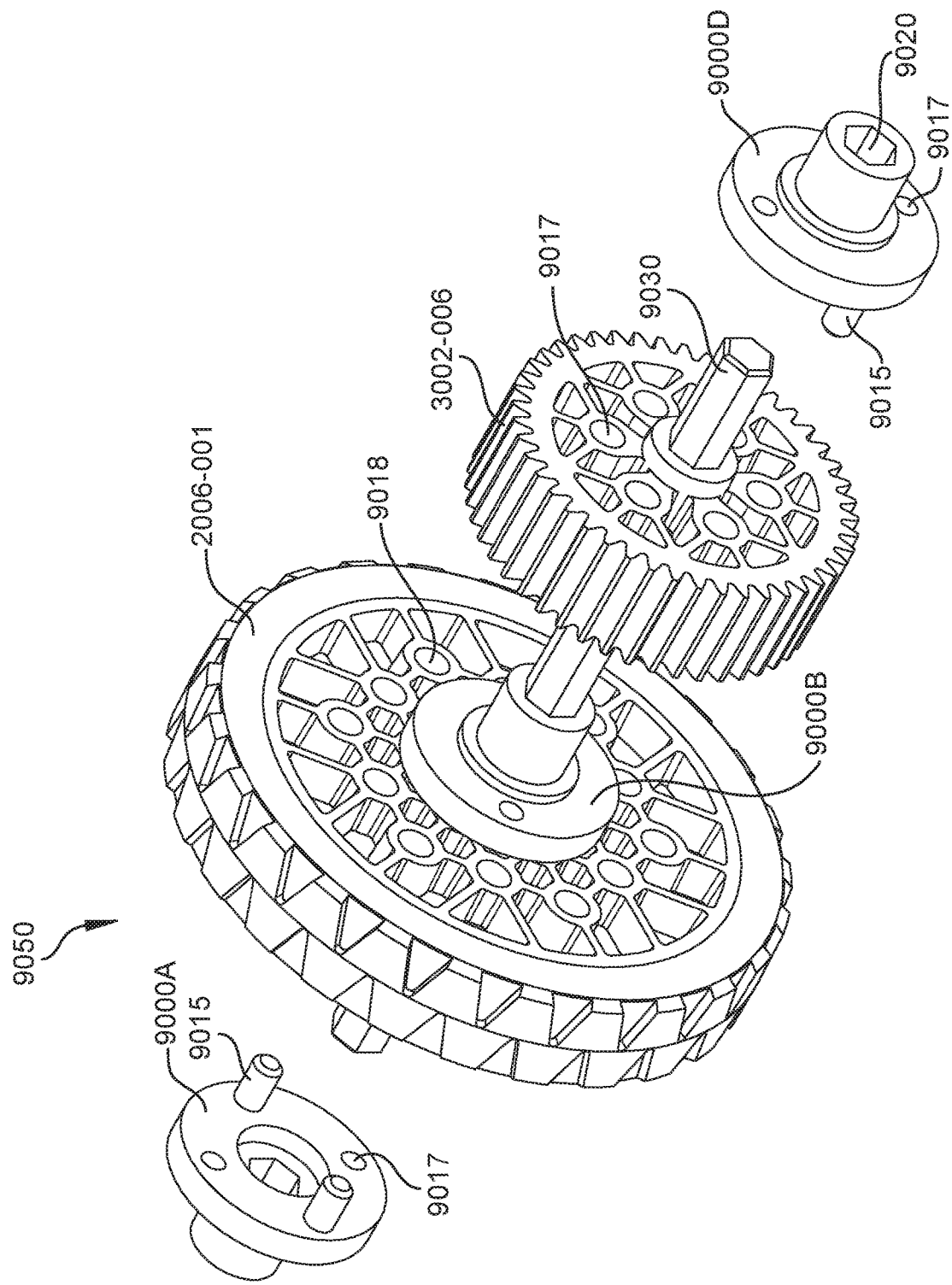
Figure 56A:
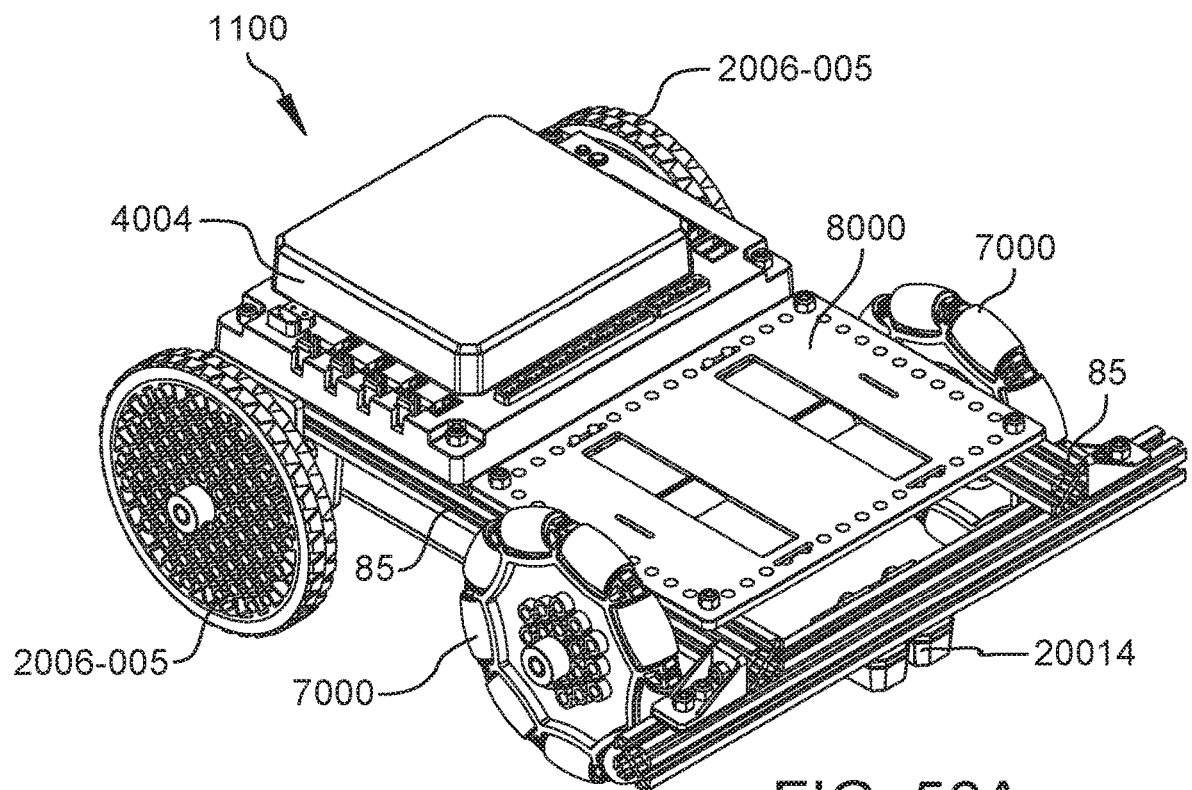
Figure 56B:
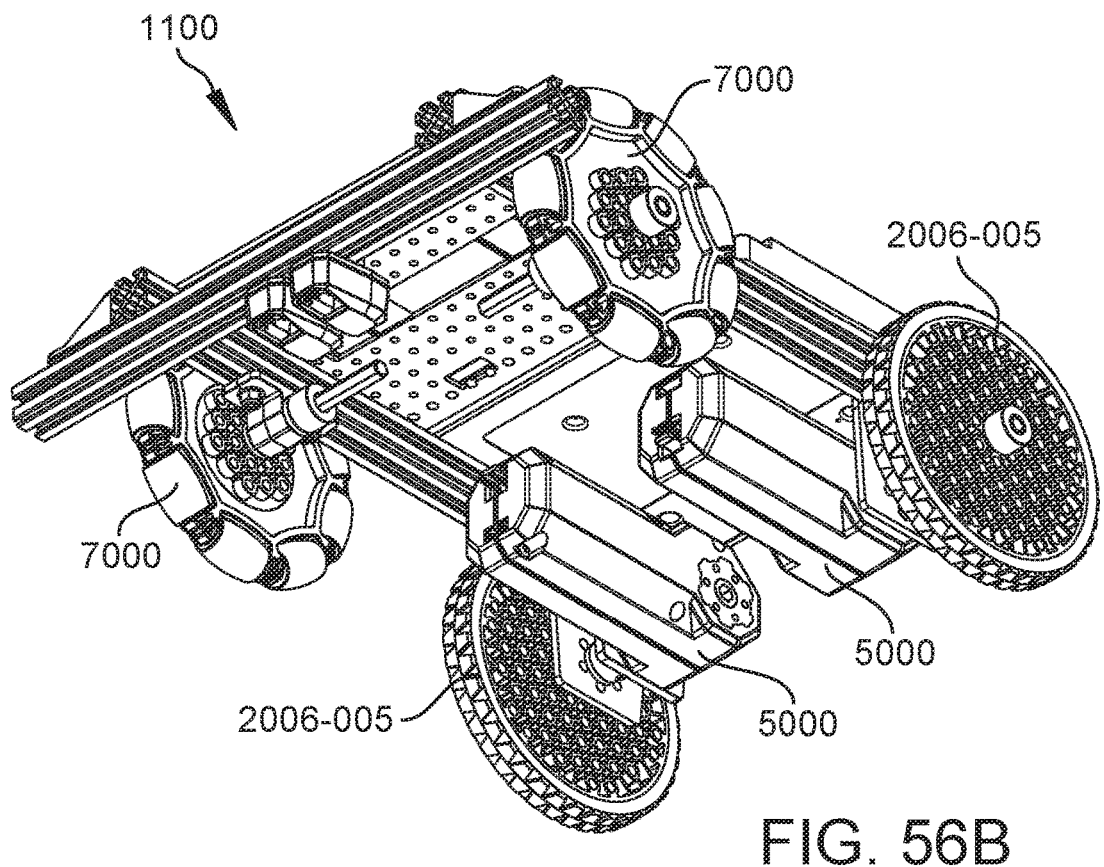
Figure 57A:
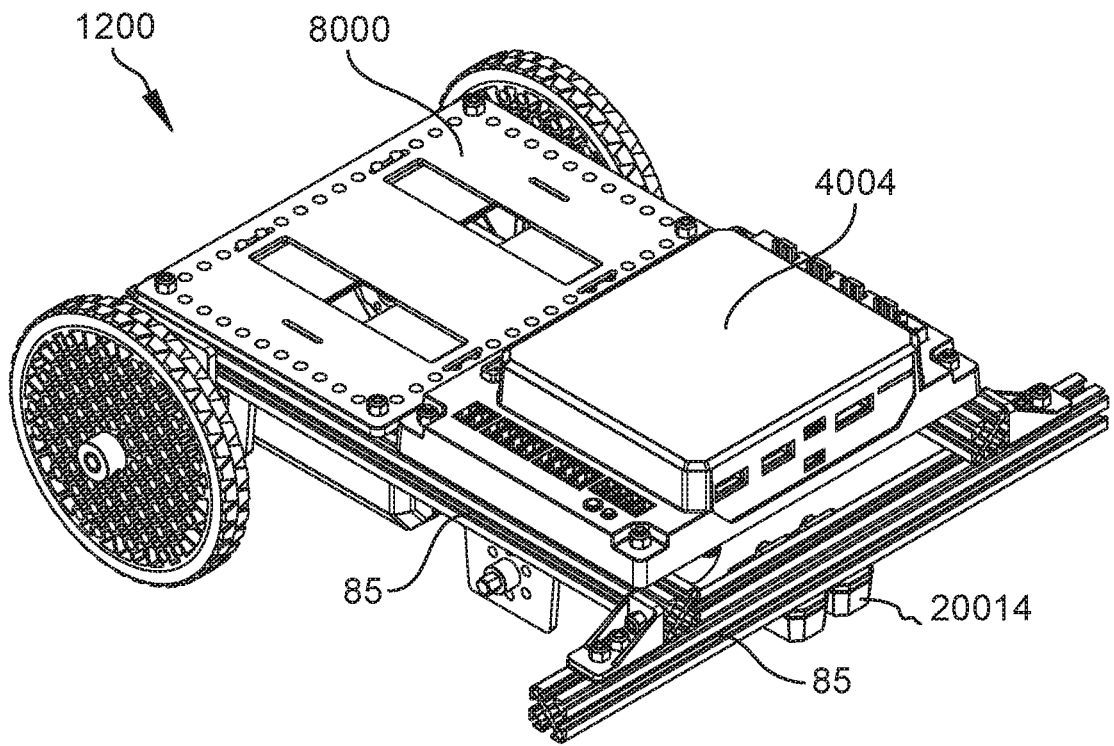
Figure 57B:
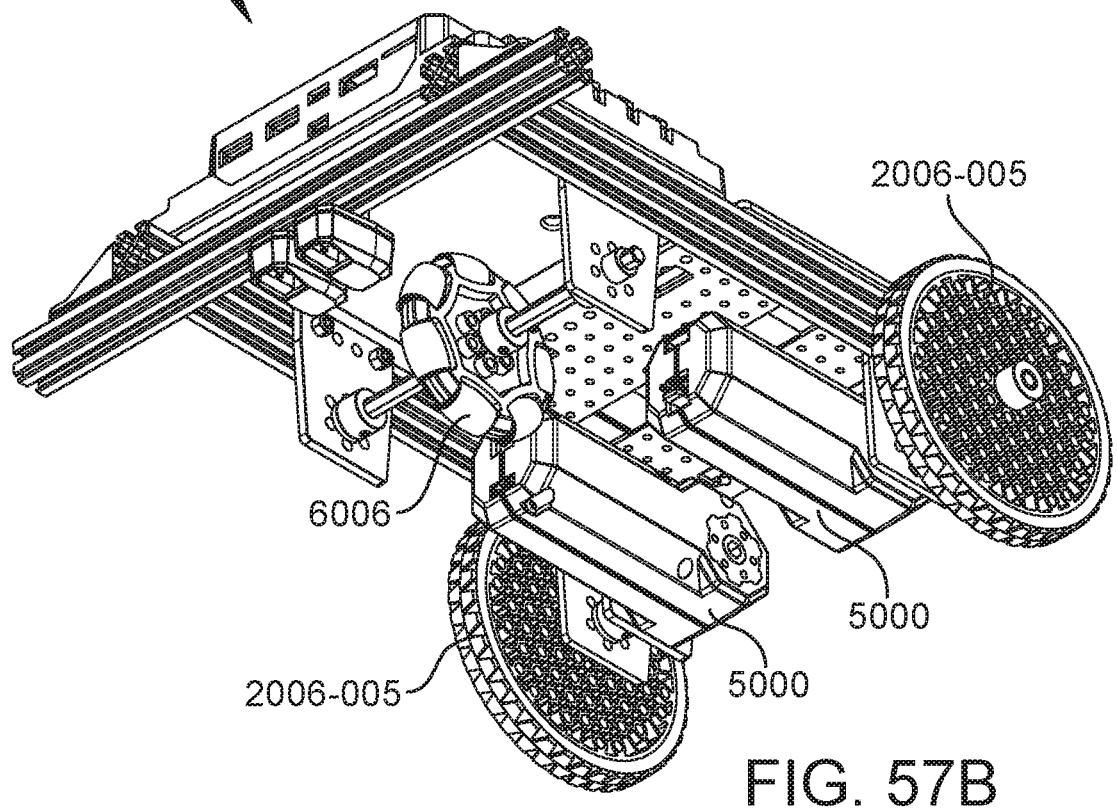

FIG. 53C includes schematic diagrams of perspective views of the lap corner bracket of the present teachings;

FIGS. 54A-54D are schematic diagrams of perspective views of the indexable bracket of the present teachings;

FIGS. 55A-55B are schematic diagrams of a hex adaptor of the present teachings;

FIGS. 55C-55D are perspective views of an assembly including configurations of the hex adaptor of FIGS. 55A-55B;

FIGS. 56A and 56B are perspective views of a configuration of the electro-mechanical agent with mounted sensors of the present teachings; and FIGS. 57A and 57B are perspective views of a configuration of the electro-mechanical agent with mounted sensors of the present teachings.

DETAILED DESCRIPTION

Figure 1:
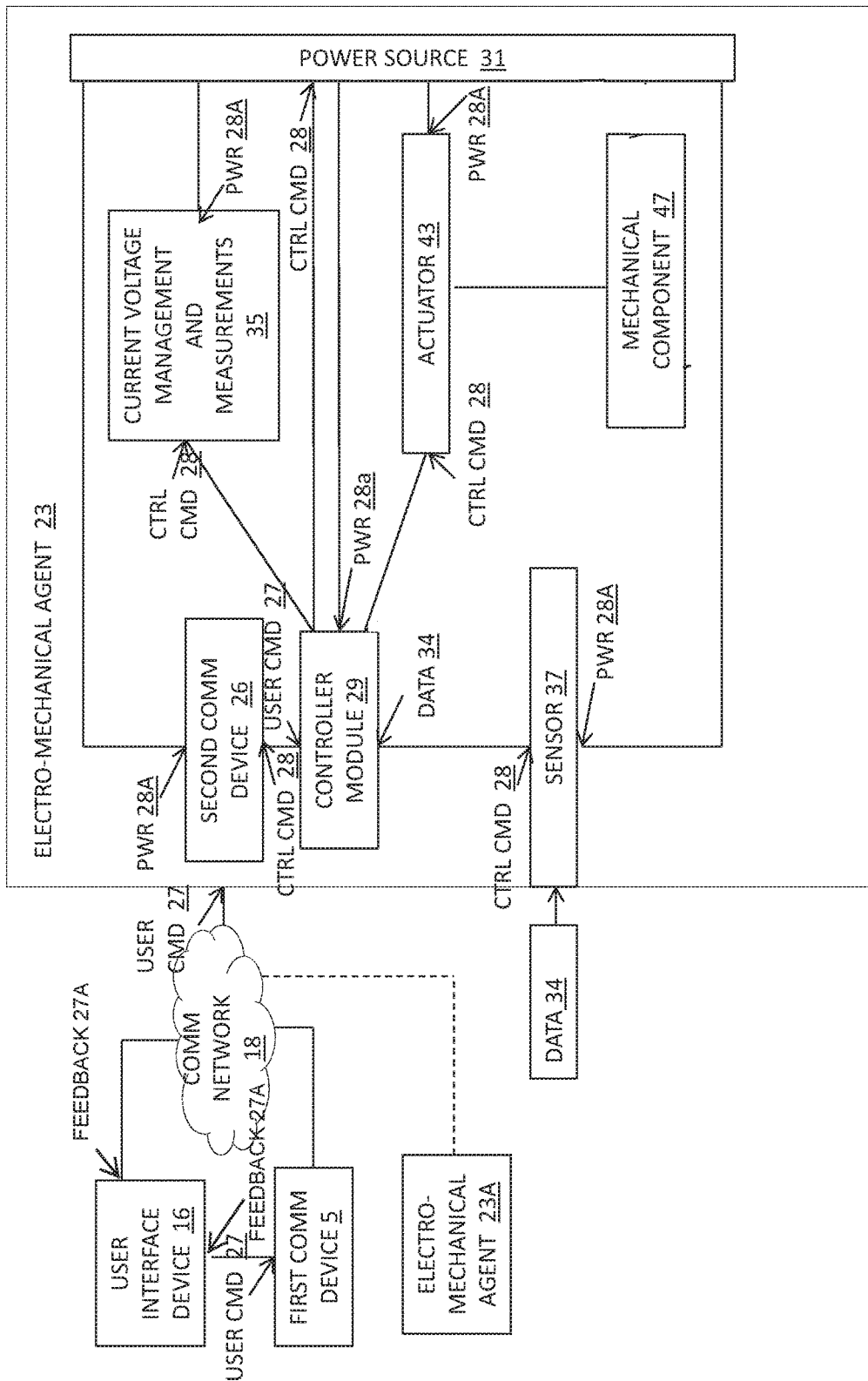
FIG. 1 is a schematic block diagram of a configuration of the system of the present teachings.

Referring now to FIG. 1, system 21 can perform at least one assigned task at a setting such as, for example, but not limited to, a competition. A plurality of inter-communicating units or modules can form system 21 such that each unit or module can participate in performing the at least one assigned task. The plurality of units or modules can be, but are not limited to being, mechanical components or electrical and/or electronic components or a combination of mechanical and electrical and/or electronic components. System 21 can include, but is not limited to including, at least one user interface device 16, first communications device 5, communications network 18, and electro-mechanical agent 23. Electro-mechanical agent 23 can further include, but is not limited to including, second communications device 26, controller module 29, at least one power source 31, at least one actuator 43, at least one mechanical component 47, at least one current/voltage managing and measurement device 35, and at least one sensors 37. User interface device 16 and/or first communications device 5 can provide user commands 28 to second communications device 26 and/or controller module 29 for example, directly and/or through communications network 18, and/or communications device 5. Communications network 18 can be wired or wireless. The modules of electro-mechanical agent 23 can communicate directly and/or wirelessly and can transfer information such as, but not limited to, user commands 27, controller commands 28 which can include user commands 27, or any instructions from one participating module to another participating module. At least one user command 27 can be communicated directly and/or through communications network 18 to electro-mechanical agent 23. System 21 can include, but is not limited to including, one or more electro-mechanical agents 23, which may or may not be identically configured. Communications network 18 can enable communications among the modules of system 21 including multiple electro-mechanical agents 23. Second communications device 26 can receive at least one user command 27 by way of communications network 18, and can advance the at least one user command 27 to controller module 29. In some configurations, modules of multiple of electro-mechanical agents 23, 23A, and first communications devices 5, and user interface 16, can communicate with each other through communications network 18. In some configurations, user interface 16 and first communications device 5 can be the same device. At a competition, there could a field controller that could communicate with any or all of the multiple electro-mechanical agents 23.

Continuing to refer to FIG. 1, second communications device 26 can be optionally configured to receive and process user commands 27 to generate and transmit at least one set of instructions that can be directed to controller module 29. Controller module 29 can issue controller commands 28, based on the at least one set of instructions, for one or more modules on electro-mechanical agent 23. In some configurations, receiving and processing of controller commands 28 can be optionally performed by controller module 29. Sensor 37 can receive data 34 and transmit data 34 to controller module 29. Data 34 along with response functioning and/or execution of controller commands 28 by respective modules can be fed back to controller module 29 and can be further advanced to second communications device 26 for obtaining any, if required, altered instructions. In some configurations, altered instructions from second communications device 26 can be generated as a result of user commands 27 that can be issued on the basis of, for example, but not limited to, response from modules and/or data 34 or new user commands 27 that can be based on user-preference.

Figure 28:
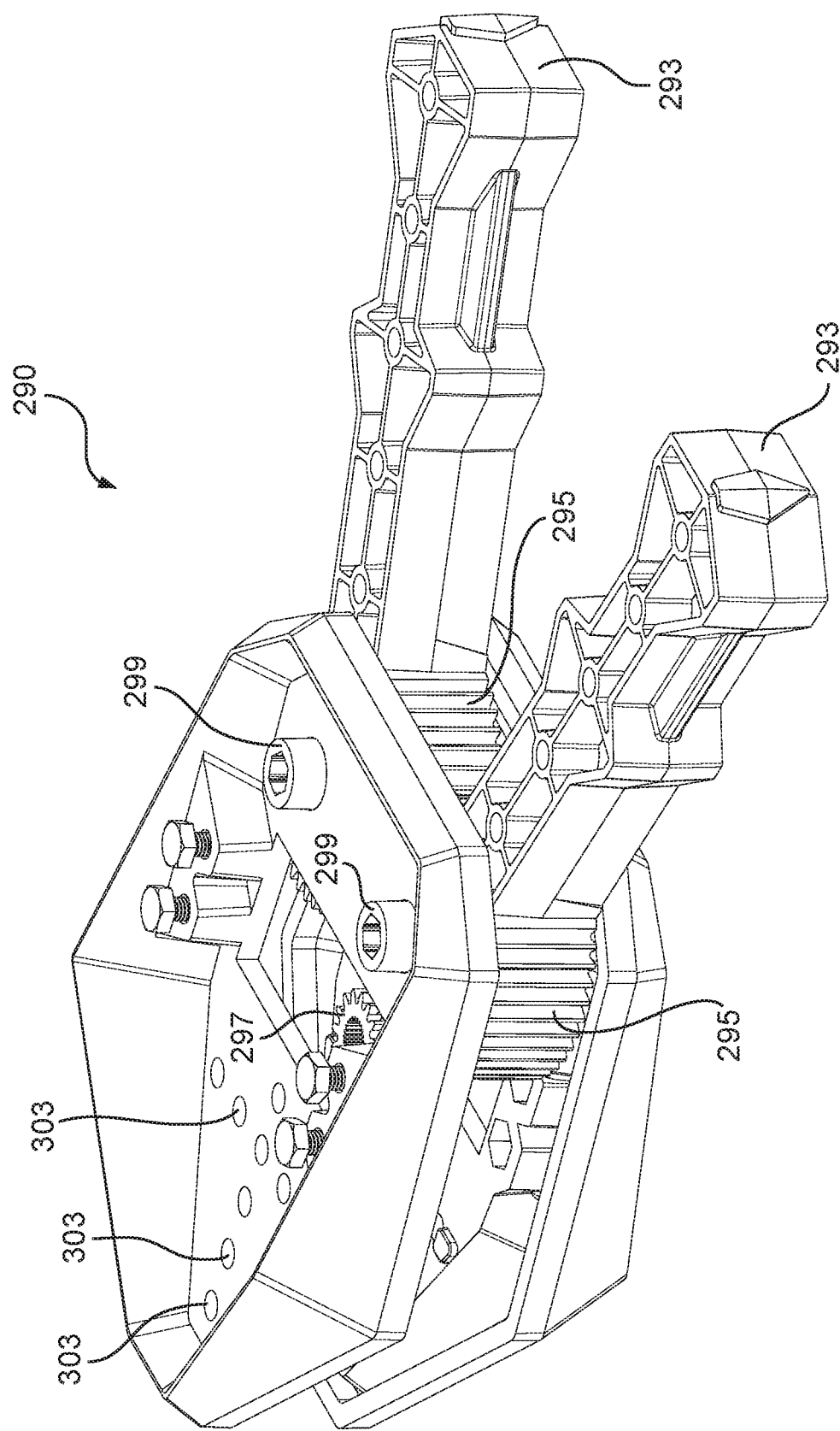
FIG. 28 is a perspective view of a configuration of the engagement assembly, including a grasping tool, of the present teachings.

Continuing to refer to FIG. 1, system 21 can be disposed in a setting or an environment that can further include external objects. Electro-mechanical agent 23 can be configured to be mobile in the environment and can manipulate at least one external object of the environment. Manipulation of the external objects can be substantially related to the at least one assigned task for electro-mechanical agent 23. At least one assigned task can be a pre-determined task that can be assigned prior to constructing electro-mechanical agent 23. Based on the assigned task, electro-mechanical agent 23 can be constructed by employing a plurality of modules relevant to at least one assigned task. An example of the at least one assigned task can be, but is not limited to being, engaging one or more target objects 313 (FIG. 30) using engagement tool 293 (FIG. 28). The assigned task can be supplemented by transferring the one or more target objects 313 (FIG. 30) from a first location to a second location. The transferring of one or more target objects 313 (FIG. 30) from a first location to a second location can also be achieved by passing on one or more target objects 313 (FIG. 30) from a first configuration of electro-mechanical agent 23 to a second configuration of electro-mechanical agent 23A. The second configuration of electro-mechanical agent 23A can comprise similar or dissimilar components as compared to the first configuration of electro-mechanical agent 23. The assigned task can require electro-mechanical agent 23 to travel from a start location to an end location. The task of travelling can be governed by, but not limited to being governed by, travel-time, travel-path which can be linear or non-linear, a pre-determined manner of dealing with one or more obstacles on the travel-path or a combination of these governing parameters. Some configurations of system 21 can employ electro-mechanical agent 23 and/or tournament settings to perform the pre-determined assigned task with higher speed and/or better efficiency than a competing configuration, also tests can be performed autonomously without human intervention.

Figure 2:
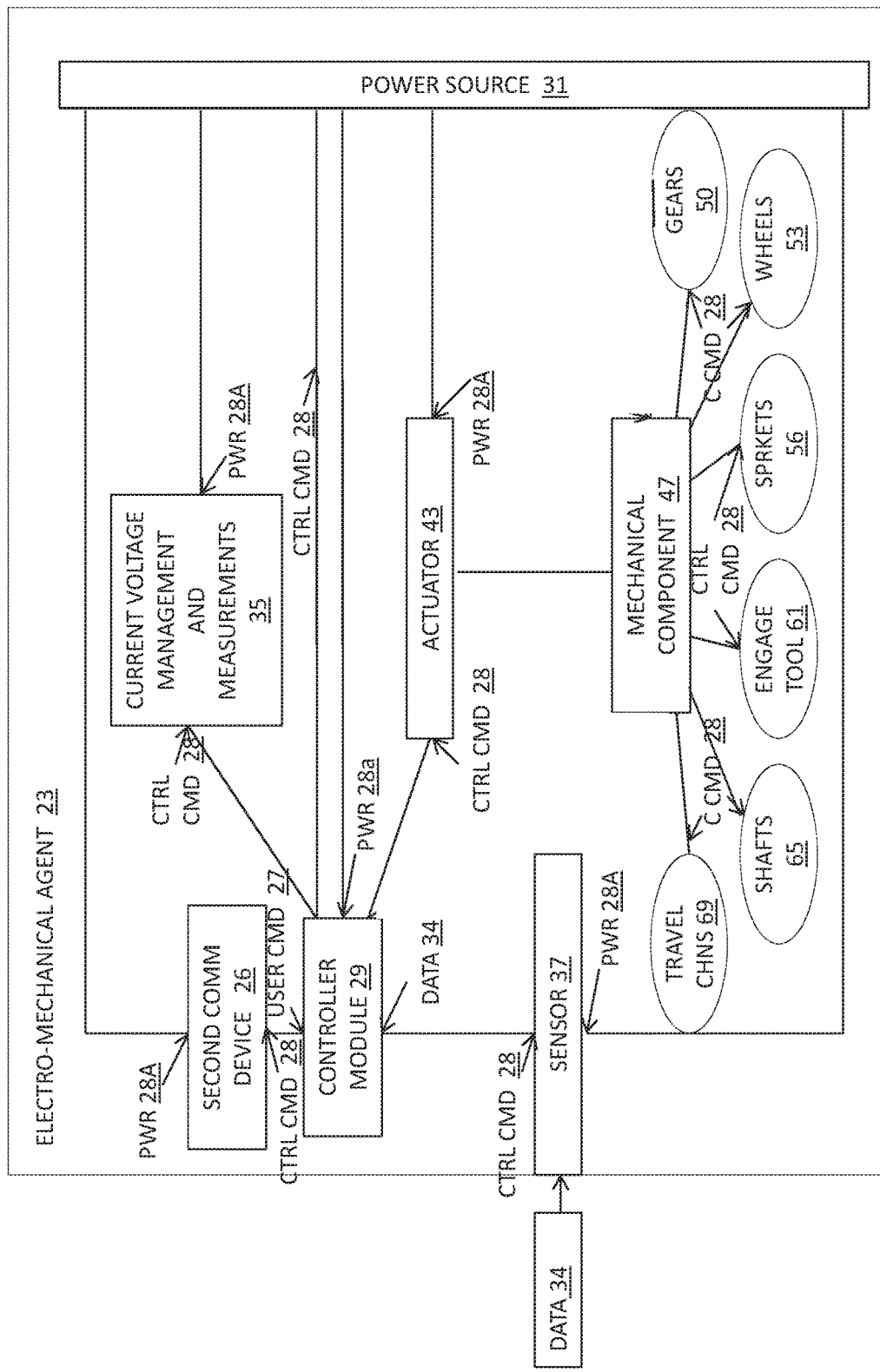
FIG. 2 is a schematic block diagram of a configuration of the electro-mechanical agent of the present teachings.

Referring now to FIG. 1 and FIG. 2 wherein at least one user interface device 16 (FIG. 1) can be operated by one or more users that can participate in an environment or setting comprising system 21 (FIG. 1). A participating user can choose user interface device 16 (FIG. 1) that can be used to communicate user commands 27 to electromechanical agent 23. Some examples of user interface device 16 (FIG. 1) can be, but are not limited to being, gamepad, joy stick, microphone for communicating oral instructions to, hand-held monitor such as a phone or tablet, with push-buttons or a touch pad or a combination of the two. At least one user interface device 16 (FIG. 1) can also include any portable device, possibly having a plurality of input command icons, that can be configured to both remotely control the functioning of one or more electro-mechanical agents 23 and provide at least one user command 27 to electro-mechanical agent 23. At least one user interface device 16 (FIG. 1) can be configured to interact with communications network 18 by way of first communications device 5. First communications device 5 can serve as a messenger for communicating at least one user command 27 from user interface device 16 to second communications device 26 that can be disposed on electro-mechanical agent 23. Second communications device 26 can advance user commands 27 to controller module 29. In some configurations, first communications device 5 can be in direct communication with controller module 29 and can operate the mechanical and electrical components of electro-mechanical agent 23 on the basis of the received of user commands 27. First communications device 5 can be, but is not limited to being, a smart phone, a tablet computer, a laptop computer, a desktop computer or any other device that utilizes a language of operation common with either user interface devices 16 or second communications device 26 or both.

Referring now primarily to FIG. 2, communications network 18 (FIG. 1) between devices outside electro-mechanical agent 23 and devices on or engaged with electro-mechanical agent 23 can accommodate, for example, but not limited to, infrared communication wherein an LED transmitter can be provided in first communications device 5 and a diode receptor can be provided in second communications device 26. Radio communication including the plurality of user commands 27 and/or instructions from user interface device 16 (FIG. 1) can be communicated over a radio frequency spectrum. Second communications device 26 can comprise a receiving antenna and/or a radio signal decoder/processor. In some configurations, bluetooth communication can be used between first communications device 5 and second communications device 26 or first communications device 5 and controller module 29. In some configurations, first communications device 5 and second communications device 26 can connect to a Wi-Fi network and exchange information by way of signing into a virtual application which can be configured to run a language common to first communications device 5 and second communications device 26. Additionally, first communications device 5 and second communications device 26 can be configured to exchange instructions for operation of expansion modules provided on electro-mechanical agent 23, considering that the assigned tasks can be altered. User interface device 16 and first communications device 5 can provide feedback 27A to the user from controller module 29 and/or second communications device 26.

Continuing to refer primarily to FIG. 2, electro-mechanical agent 23 can comprise a plurality of modules, such as, but not limited to, actuators 43, sensors 37, such as, for example potentiometer 20018 (FIG. 15J), and current/voltage managing and measurement components 35. Electro-mechanical agent 23 can further comprise at least one mechanical component 47 (FIG. 1) that can be in information exchange and/or power-communication with electrical components during operation of electro-mechanical agent 23. In some configurations, controller module 29 can execute user commands 27, optionally sent from second communications device 26, by issuing controller commands 28 to the electrical and/or mechanical modules of electro-mechanical agent 23. Controller module 29 can send feedback 27A to second communications device 26 and/or first communications device 5, in case the instructions are required to be revised or a new set of instructions is to be communicated from user interface devices 16 and/or second communications device 26, or feedback 27A can be displayed to the user. Each of the electrical and mechanical modules of agent 23 can be connected to power source 31. In some configurations, a common source of power can be used for the electrical modules and mechanical components 47 (through actuator 43). In some configurations, more than one power source can be used for electro-mechanical agent 23. Some examples of power source module 31 can be, but not limited to being, an external AC power outlet, one or more photovoltaic cells, and one or more batteries which can be for single use or rechargeable. The rechargeable batteries can be, but are not limited to being, nickel-cadmium (Ni-Cad) or nickel metal hydride (Ni-MH) of various sizes. In some configurations, electro-mechanical agent 23 can use one or more nickel-cadmium batteries for the desired function of the electrical and mechanical components. At least one power source module 31 can be configured to distribute power 28A to electrical and/or mechanical component 47 (through actuator 43) of electro-mechanical agent 23.

Continuing to refer primarily to FIG. 2, electro-mechanical agent 23 can include, but is not limited to including, a plurality of electrical and mechanical modules that can communicate with each other and with electrical and mechanical modules in the vicinity of electro-mechanical agent 23. The exchange of information among the modules of electro-mechanical agent 23 can be governed by at least one user interface device 16 (FIG. 1). Power 28A can be supplied to electrical and mechanical components according to when user command 27 directs activation of the electrical and mechanical components. Controller module 29 can control to one or more power sources 31 and can manage the power supply to the respective electrical and mechanical modules. In some configurations, second communications device 26 can be configured to manage power 28A from at least one power source 31 to other modules of electro-mechanical agent 23. In some configurations, a power 28A can be supplied to each of the modules whereas functioning of the modules can be controlled by controller module 29 depending on the assigned task(s).

Figure 3:
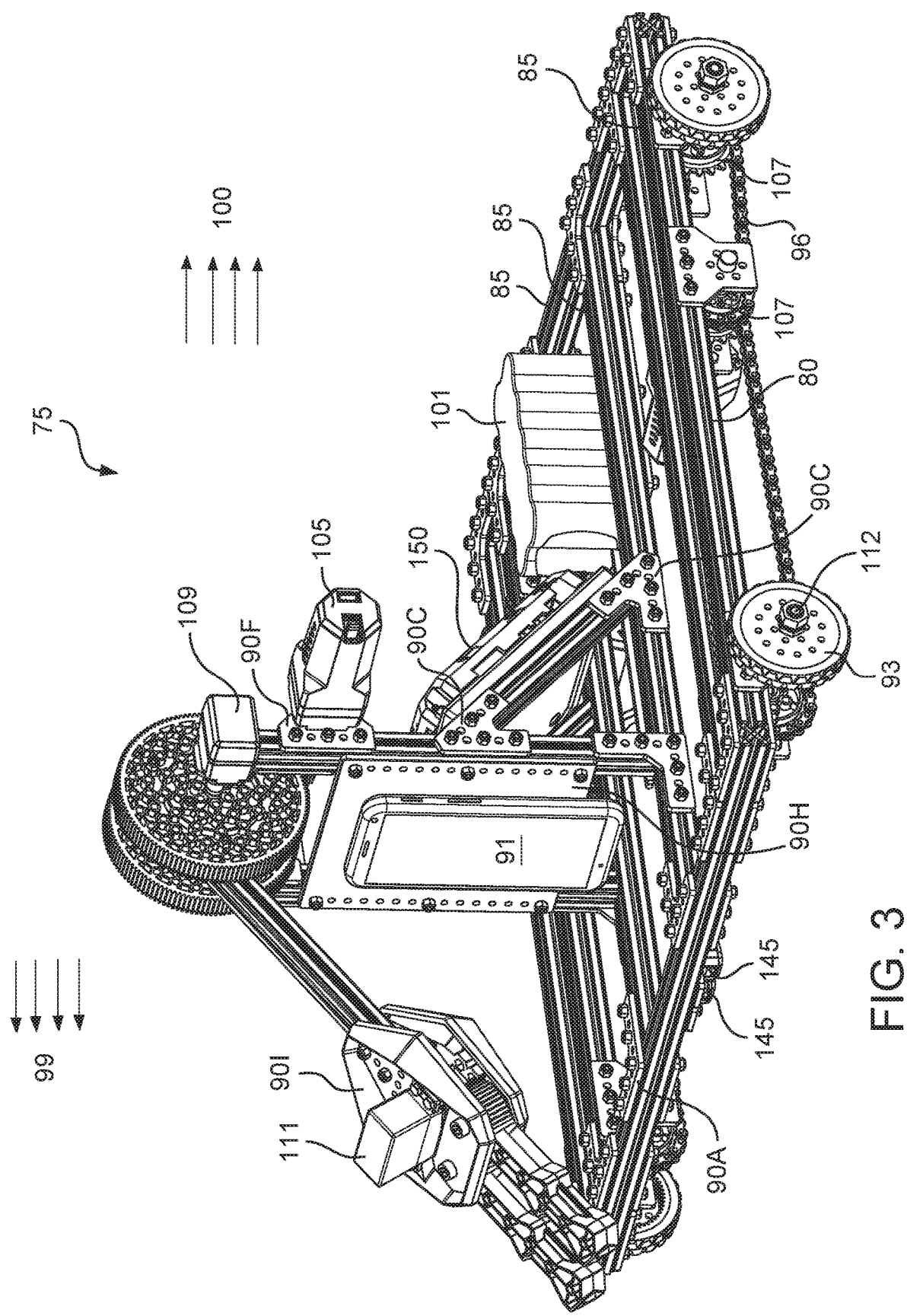
FIG. 3 is a schematic diagram of a first view of a configuration of the electro-mechanical agent of the present teachings.
Figure 4:
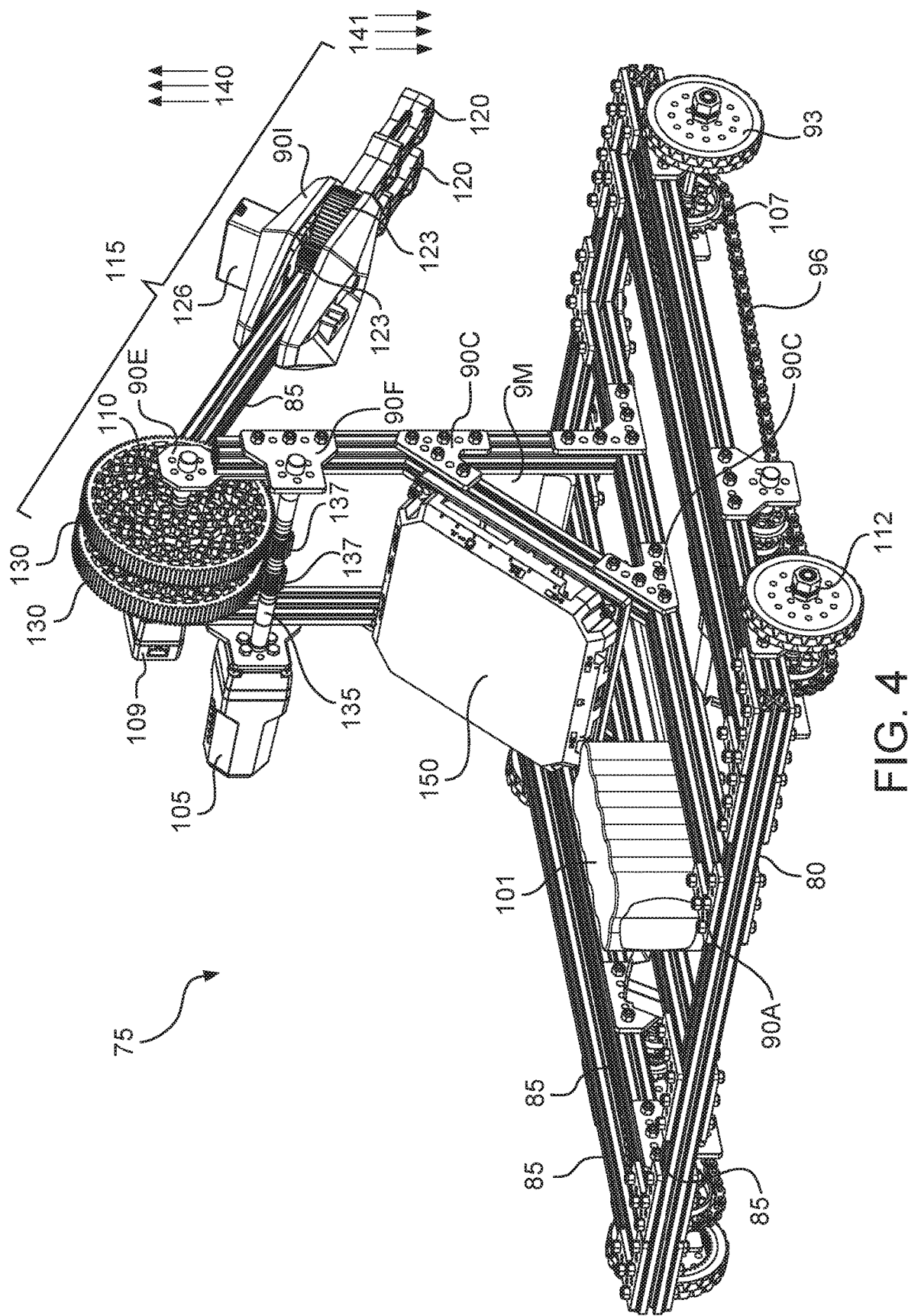
FIG. 4 is a schematic diagram of a second view of a configuration of the electro-mechanical agent.

Referring now to FIG. 3 and FIG. 4, electro-mechanical agent first example configuration 75 can be constructed from a plurality of electrical and mechanical modules of a modular construction kit and/or from a plurality of extension modules that are optional to the modular construction kit. The modules and/or extension modules can comprise electrical components or mechanical components or a combination of electrical and mechanical components. Electro-mechanical agent first example configuration 75 can further comprise base-frame 80 that can be, but is not limited to being, constructed from a plurality of elementary units 85. In some configurations, elementary units 85 can be, but are not limited to being, extrusions configured to provide attachment grooves for receiving fellow modules, extension modules and/or connectors for engaging fellow modules and/or extension modules. Base-frame 80 can be further built upon by engaging additional elementary units 85 and/or engaging supplementary modules of the modular construction kit and/or extension modules from outside the modular construction kit. In some configurations, a combination of a plurality of supplementary modules and a plurality of extension modules can be used for building upon or expanding base-frame 80.

Continuing to refer primarily to FIG. 3 and FIG. 4, electro-mechanical agent first example configuration 75 can include second communications device first example configuration 91 and controller module first example configuration 150 (FIG. 4). Communication processor first example configuration 91 and controller module first example configuration 150 can be disposed on base frame 80 or an expansion structure built on/around base frame 80. FIG. 3 and FIG. 4 depict an exemplary placement of controller module first example configuration 150 and second communications device first example configuration 91. The placement for these modules can be altered depending on, but not limited to, a desired size of electro-mechanical agent first example configuration 75, number of modules employed for construction of electro-mechanical agent first example configuration 75 and the task(s) required to be performed. Second communications device 91 can serve as a hardware input/output system such that it can receive user commands from at least one user interface device 16 (FIG. 1) and advance one or more instructions, based on the user commands, to controller module 150. Second communications device 91 can be further configured to receive at least one execution response, from controller 150 to alter previous instructions and/or issue a new set of instructions. Consequently, second communications device 91 can operate as a brain of electro-mechanical agent first example configuration 75, thus supervising operation of majority of modules and/or extension modules. In some configurations, second communications device 91 or controller 150 can comprise a hardware input/output system, processing of user commands 27 (FIG. 2) from user interface device 16 (FIG. 1) and issuance of instructions to modules and/or extension modules of first configuration of electro-mechanical agent first example configuration 75.

Continuing to refer to FIG. 3 and FIG. 4, electro-mechanical agent first example configuration 75 can comprise electrical modules such as, but not limited to, AC motors, DC motors, gear-motors, sensors and other components configured to manage current/voltage in the modules and/or extension modules of electro-mechanical agent first example configuration 75. The mechanical modules/extension modules that can form electro-mechanical agent first example configuration 75 can further comprise shafts 65 (FIG. 2), gears 50 (FIG. 2), wheels 53 (FIG. 2), sprockets 56 (FIG. 2), engagement tools 61 (FIG. 2), travel chains 69 (FIG. 2), and other mechanical modules required for performing one or more assigned tasks. Elementary units 85 and/or supplementary modules/extension modules can be engaged with or built upon base frame 80 by way of connectors such as, but not limited to, 90° connector 90A, 45° connector 90C, elongated rod end connector 90E (FIG. 4), motor bracket 90F, flat plate connector 90H and grasper bracket 90I. A specific choice of connector can be based upon, but not limited to, type and/or size of connecting elementary unit 85, supplementary module/extension module participating in the connection and the purpose of the connection. As a result, every type of connector can serve a similar or dissimilar function however, and can differ in dimensions and/or groove pattern provided there upon. 90° connector 90A, 45° connector 90C, and flat plate connector 90H can further provide at least one aperture platform (not shown) with engagement grooves. A first aperture platform of 90° connector 90A, 45° connector 90C, and flat plate connector 90H can be disposed on one of the connecting modules of elementary unit 85 while a second aperture platform of 90° connector 90A, 45° connector 90C, and flat plate connector 90H can be disposed on another connecting module. Grooves (not shown) can be disposed such that placement of the aperture platform and insertion of a bolt and/or any other fastening elements therethrough can optionally engage 90° connector 90A, 45° connector 90C, and flat plate connector 90H with at least one connecting module. Number and/or disposition of a aperture platform (not shown) on a connector and number and/or disposition of a groove pattern thereupon can be governed by, but not limited by, the number of elementary units 85 and/or supplementary and/or extension modules that are required to be connected at a given connection point, and/or additional performance features that first configuration of electro-mechanical agent 75 is required to have for contributing to completion of the assigned task(s). 90° connector 90A, 45° connector 90C, and flat plate connector 90H can comprise a plurality of alignment nubs 359 (FIG. 33B) to, for example, but not limited to, ensure a robust engagement with elementary units 85 and/or the supplementary modules and/or extension modules.

Continuing to refer to FIG. 3 and FIG. 4, electro-mechanical agent first example configuration 75 can include at least one traction wheel 93 to incorporate a mobility feature. In some configurations, traction wheels 93 can comprise adjoining travel-sprockets 107 with travel chain 96 wrapped on travel sprocket 107 to allow rotation of traction wheels 93 when first configuration travel chain 96 rotates adjoining first configuration sprockets 107. In other configurations, traction wheels 93 can be directly engaged with a motor. First configuration travel chain 96 can travel along a travel line encompassing part of an outer circumference of first configuration travel sprockets 107 that can be engaged with traction wheels 93 as electro-mechanical agent first example configuration 75 moves in forward direction 99 and/or backward direction 100. In some configurations that comprise more than one traction wheel 93, at least one gear motor (not shown) can be disposed between a first of traction wheels 93 and a second of traction wheels 93. The gear motor (not shown) can engage with at least one first configuration sprocket 107 that can further engage first configuration travel chain 96. Such an arrangement can cause rotation of first and second of traction wheels 93 when a rotational transmission advances from the gear-motor (not shown) to first configuration travel chain 96, that can be further engaged with first and second of traction wheels 93 along its travel line. First configuration travel sprockets 107 can serve to align first configuration travel chain 96 between first and second of traction wheels 93. The gear motor (not shown) can also be engaged directly with first and second of traction wheels 93 to alter the speed of electro-mechanical agent first example configuration 75. The number of first configuration gear motors 105 and the position of first configuration gear motors 105 can depend upon, for example, but not limited to, the assigned task. In some configurations, the electro-mechanical agent first example configuration 75 can comprise gears that can be independent of a motor. In some configurations, a motor can be separately attached with one or more stages of gears that can engage with traction wheels 93, providing a flexibility of altering gears as per user preference. Choice of the motor can be decided on the basis of one or more supplementary modules/extension modules engaged with the additional gears.

Continuing to primarily refer to FIG. 3 and FIG. 4, any number of engagement assembly gears 130, 137 (FIG. 4), for example, can be configured to assist in desired movement of supplementary modules and/or extension modules attached to base frame 80. In some configurations, an assigned task of electro-mechanical agent first example configuration 75 can be to engage target object 313 (FIG. 30), travel a known distance with engaged target object 313 (FIG. 30) and release target object 313 (FIG. 30) at a desired destination. Electro-mechanical agent 75 can be constructed to achieve the above mentioned and/or a similar task. The supplementary modules and/or the extension module of electro-mechanical agent first example configuration 75 can be re-shuffled or re-arranged to build a similar or dissimilar of electro-mechanical agents 23 configured to fulfill any assigned task(s).

Continuing to refer primarily to FIG. 3 and FIG. 4, electro-mechanical agent first example configuration 75 can comprise engaging assembly 115 (FIG. 4) that can be remotely operated by a plurality of users of electro-mechanical agent first example configuration 75. Base frame 80 can further comprise expansion elementary units 85 to support engaging assembly 115 (FIG. 4). Engaging assembly 115 (FIG. 4) can be constructed by using a number of configurations comprising modules such as, but not limited to, elementary units 85, connectors 90, electrical modules and/or extension electrical modules, mechanical modules and/or extension mechanical modules. In some configurations of engaging assembly 115 (FIG. 4), expansion elementary units 85 can support gears 137 (FIG. 4) that can be mounted between by way of bridging shaft 135 (FIG. 4). One of the many ways of engaging bridging shaft 135 (FIG. 4) with expansion elementary units 85 can be by using a connector. For example, connector 90F can be configured to engage bridging shaft 135 (FIG. 4) with expansion elementary units 85.

Figure 30:
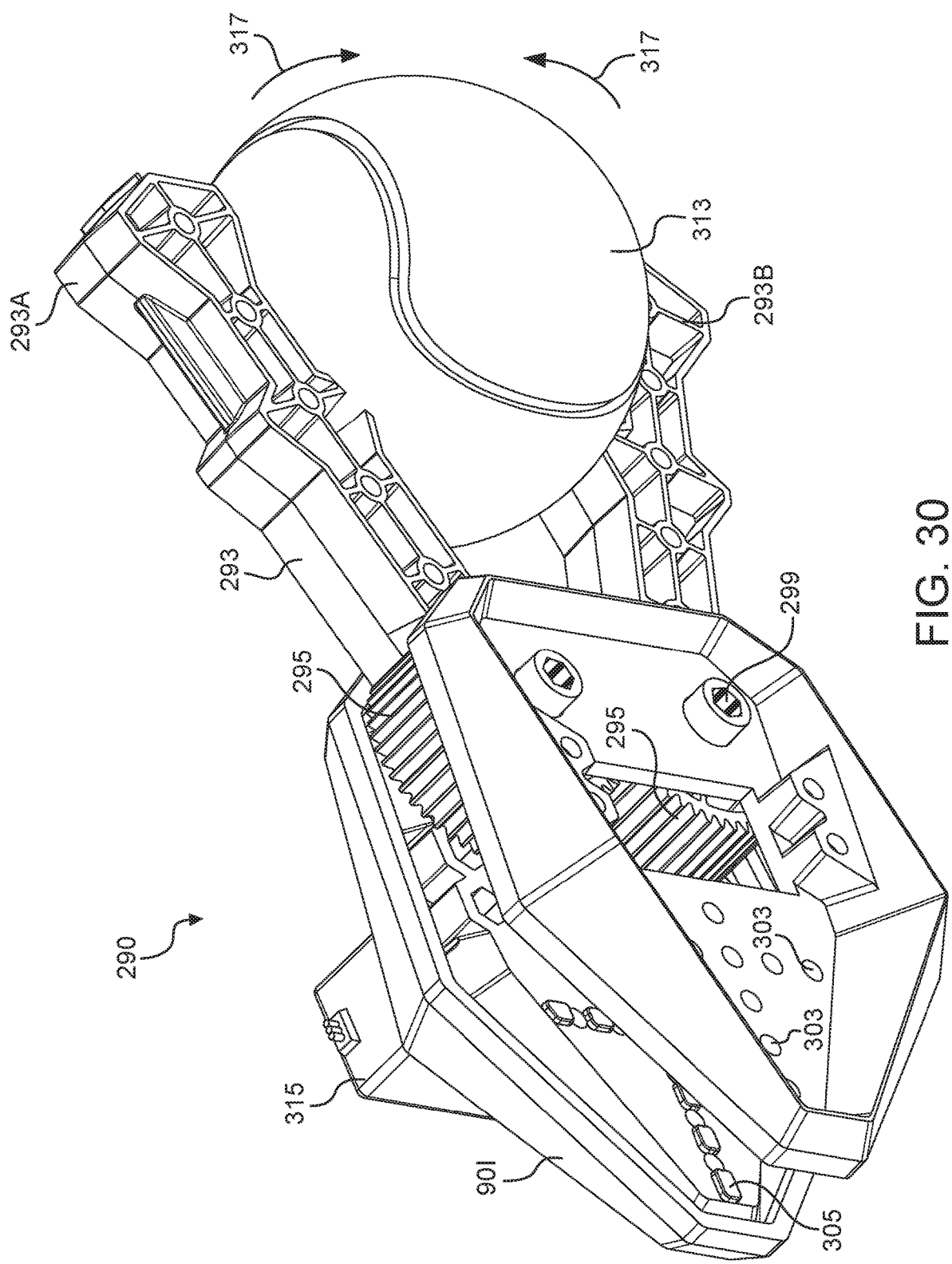
FIG. 30 is a perspective view of a configuration of the engagement assembly including the grasping tool employed to engage a target object.

Referring now primarily to FIG. 4, a primary purpose of engaging assembly 115 is to engage target object 313 (FIG. 30). Engaging tool 120 can perform optionally engaging operation. Engaging assembly 115 can include, but is not limited to including, engaging tools 61 (FIG. 2) such as, for example, graspers, tongs, hooks, magnets, suction device, VELCRO®, a scooping component, a ring configured to engage target object 313 (FIG. 30) there between, and/or the like. Some configurations of engaging assemblies 115 can comprise a combination of first configuration engagement tools 120. In some configurations, engaging assembly 115 can be replaced or can be supplemented with an operating assembly (not shown) that can further contribute in achieving assigned task/s. An exemplary engagement tool 120 can perform opening and closing motion to engage and hold on to target object 313 (FIG. 30), respectively. The height at which engagement tool 120 operates can also be adjusted by allowing the tool to raise or fall at the desired level of target object 313 (FIG. 30). Engagement tool 120 can be connected to engagement tool gears 130 by way of modules such as, but not limited to, at least one elementary unit 85, to provide a cantilever-type movement of engaging assembly 115.

Continuing to refer primarily to FIG. 4, engagement assembly gears 130 can be configured to undergo rotation by way of first configuration shaft 110 that can be rotated using AC/DC motor 109. Alternatively, rotation of engagement assembly gears 130 can be achieved by providing one or more assistive gears 137 engaged with shaft 135 that can be rotated using gear motor 105. Meshing of assistive gear teeth 137 with teeth of primary gears 130 can cause a consequent rotational motion of primary gears 130 thus allowing engaging tool 120 to move in upward direction 140 or downward direction 141. In some configurations, engagement tool 120 can include at least one set of graspers 120 with an opening and closing feature to engage one or more target objects 313 (FIG. 30). Graspers 120 can comprise an engaging end and geared end 123. Graspers 120 can include gears that can be phased for claw alignment such that there is both no right and left claw, and graspers 120 can be manufactured identically. Geared end 123 can be engaged with elementary units 85 by way of grasper connector 90I. Rotary movement of geared end 123 can be performed and controlled by employing a motor such as, but not limited to, servo motor 126. In other configurations, servo motor 126 can be replaced with, for example, but not limited to, an AC/DC motor or a gear motor with an additional means for controlling the opening and closing movement of graspers 120.

Referring again to FIG. 3 and FIG. 4, electro-mechanical agent first example configuration 75 can be constructed to participate at an institutional level tournament such that every participating team can construct one or more electro-mechanical agents first example configuration 75 configured to efficiently and rapidly perform the assigned task(s). A user-identifying feature can be provided on electro-mechanical agent first example configuration 75 such that a first of electro-mechanical agents first example configuration 75 belonging to a first set of users can be differentiated from a second of electro-mechanical agents first example configuration 75 belonging to a second set of users. The user-identifying feature can be modified in case the same of electro-mechanical agents first example configuration 75 or a modified and or advanced version of electro-mechanical agent first example configuration 75 is used for performing more than one assigned tasks. Electro-mechanical agent first example configuration 75 can also comprise status indicators to communicate one or more pre-determined modes of electro-mechanical agent first example configuration 75. The pre-determined modes can be related to, but limited to, a powered-on mode, a powered-off mode, low battery mode, failure mode and the like. In some configurations, the status indicators can be, but are not limited to being, visual and/or audio.

Referring now to FIGS. 4A-4F, in some configurations, electromechanical agent first configuration 75 (FIGS. 3 and 4) can comprise connectors other than 90° connector 90A (FIG. 4), 45° connector 90C (FIG. 4), elongated rod end connector 90E (FIG. 4), motor bracket 90F (FIG. 4), flat plate connector 90H (FIG. 4), and grasper bracket 90I (FIG. 4). Connectors other than the enlisted connectors can include one or more configurations of the enlisted connectors and/or can be connectors unique from the enlisted connectors and configured to fulfill an engagement requirement for one or more supplementary/extension module. For example, some extension modules may be required to connect at an obtuse angle with respect to base frame 80. As a result, this assembly can engage an elementary unit 85 and/or supplementary module through at least one obtuse angle connector (FIGS. 4E and 4F) such as but not limited to 120° connector 750 (FIGS. 51A and 51B), 135° connector 770 (FIGS. 51C and 51D) and 150° connector 800 (FIGS. 51E and 51D). FIGS. 4A-4F depict exemplary partial assemblies with use of variant connector that can fulfill requirement of a specific engagement.

Figure 4B:
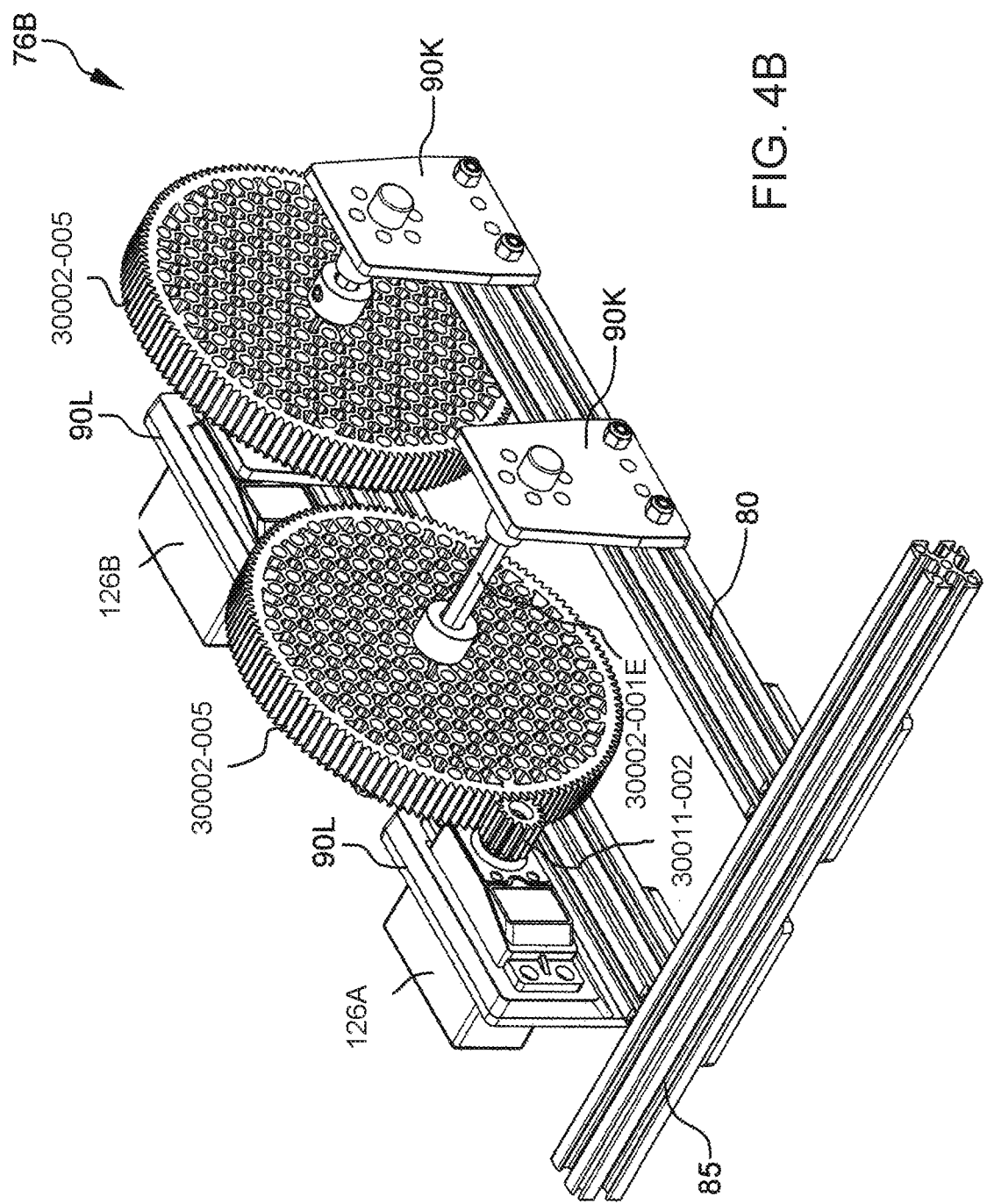
FIGS. 4B-4D are schematic diagrams of a second sub-assembly of the electro-mechanical agent of the present teachings.
Figures 2, 4B:
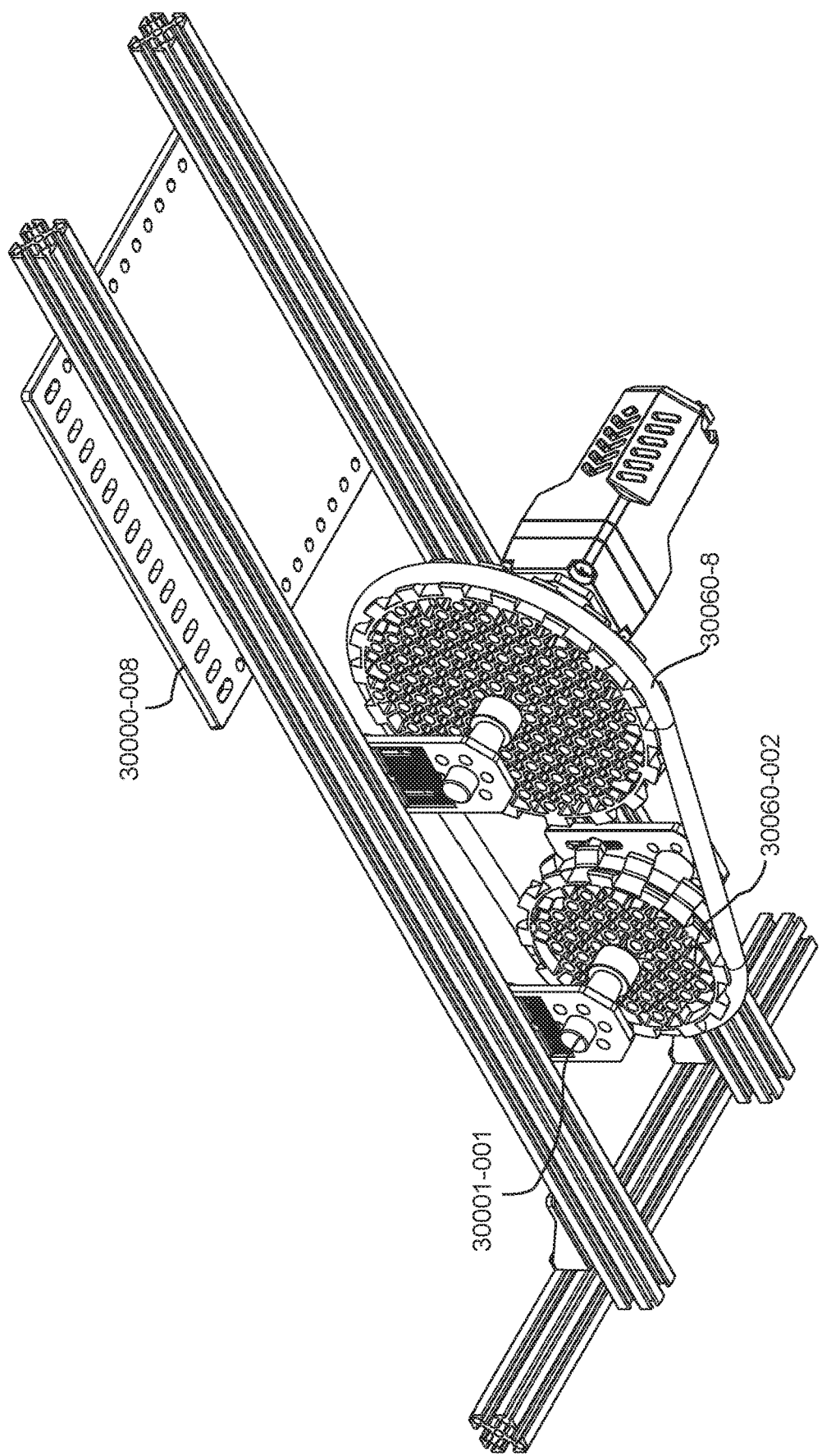
Figures 2A, 4B:
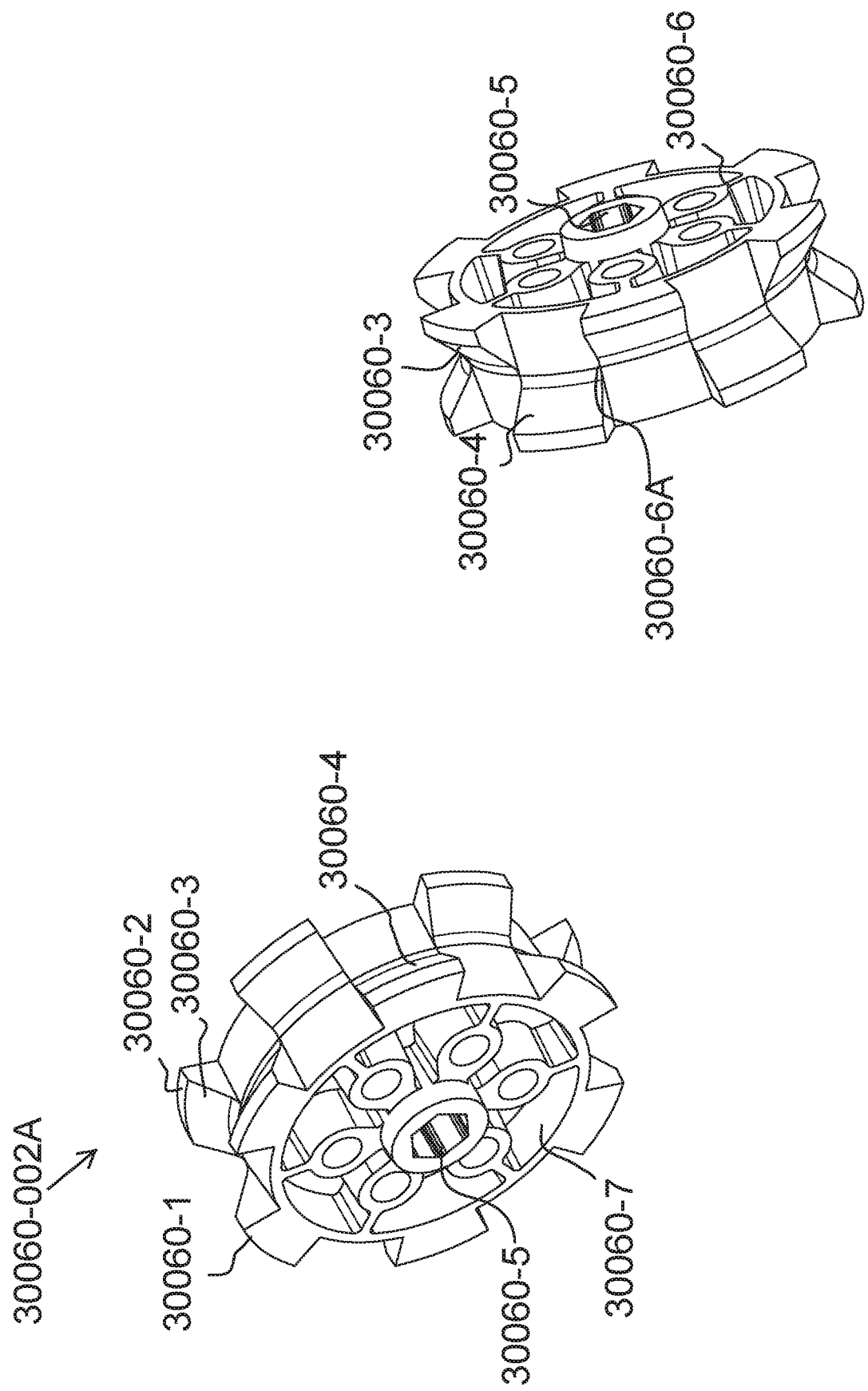
Figure 4B:
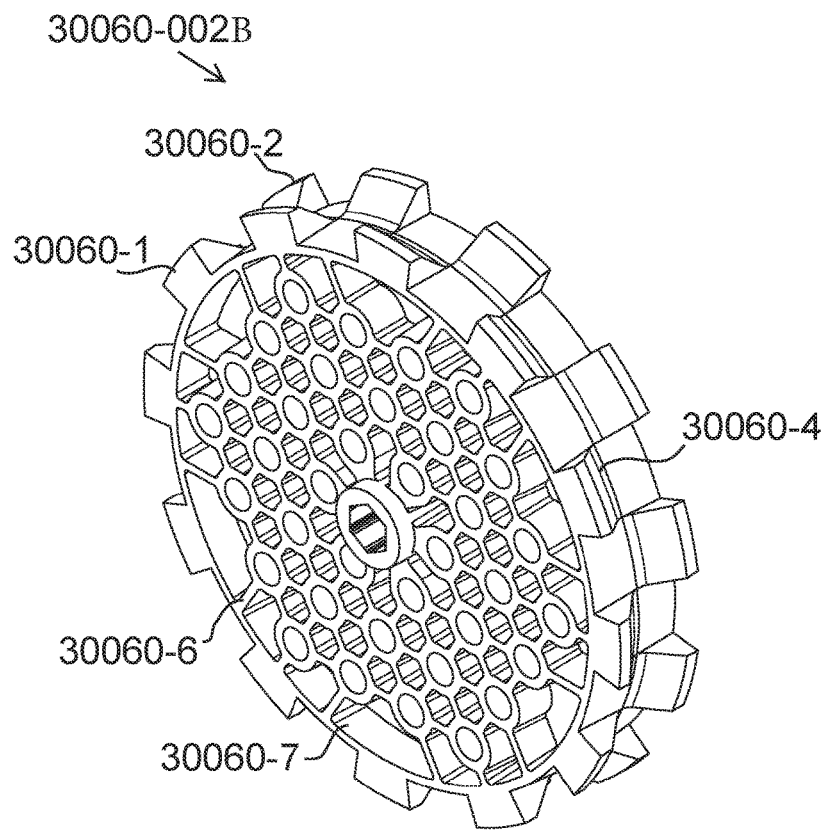
Figure 4B:
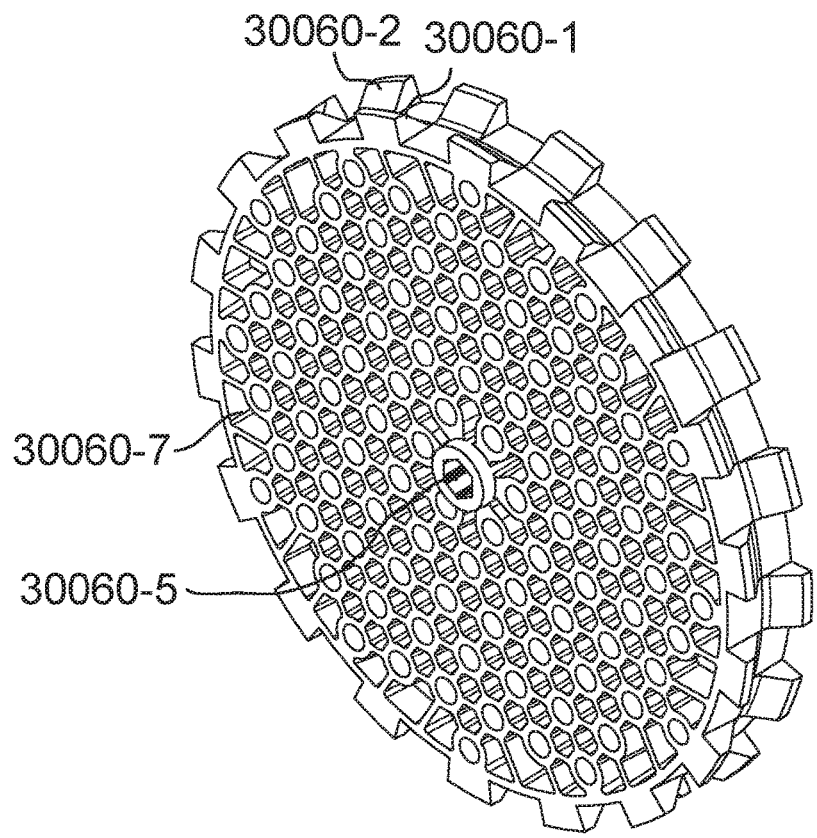
Figures 4, 4B:
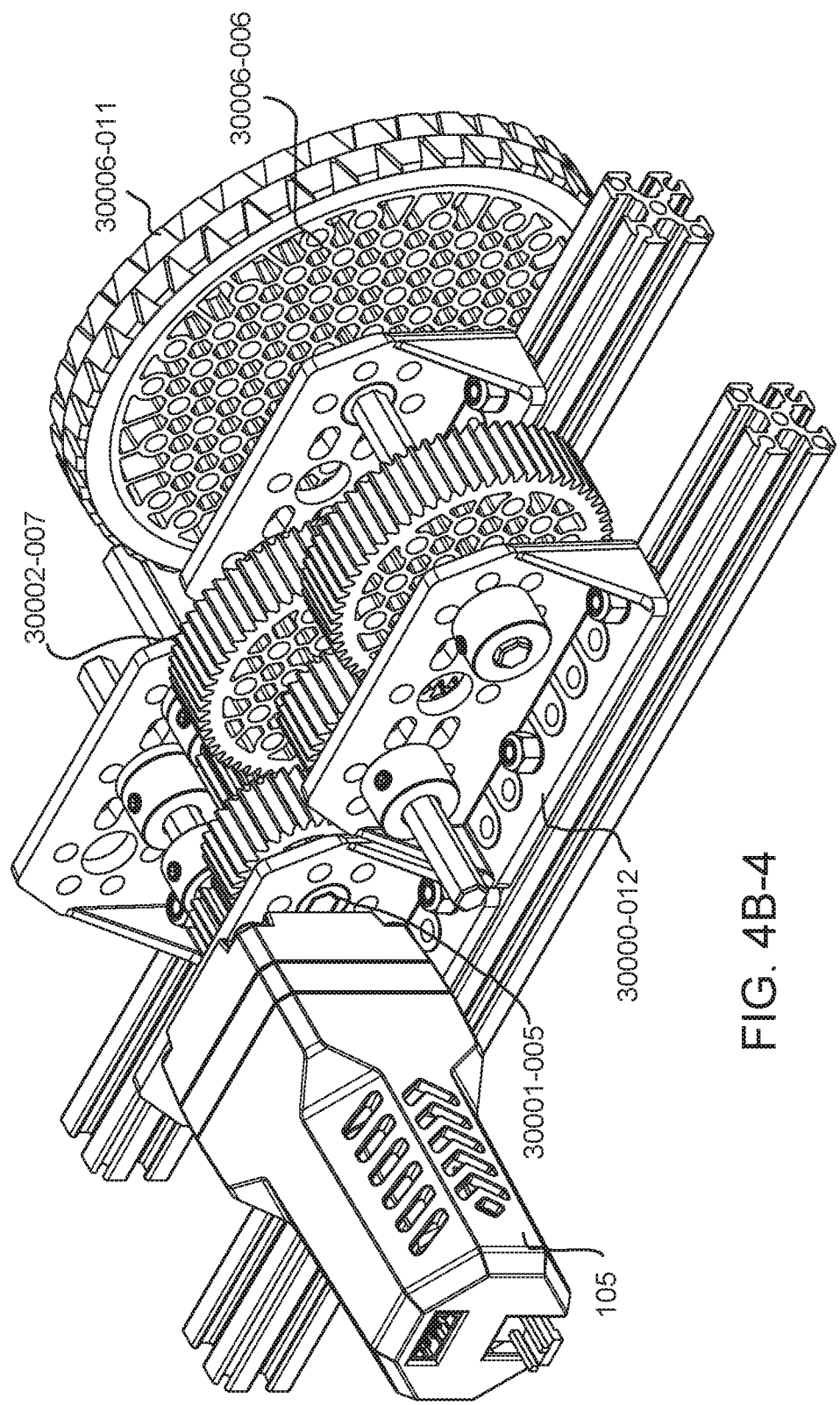
Figures 4A, 4B:
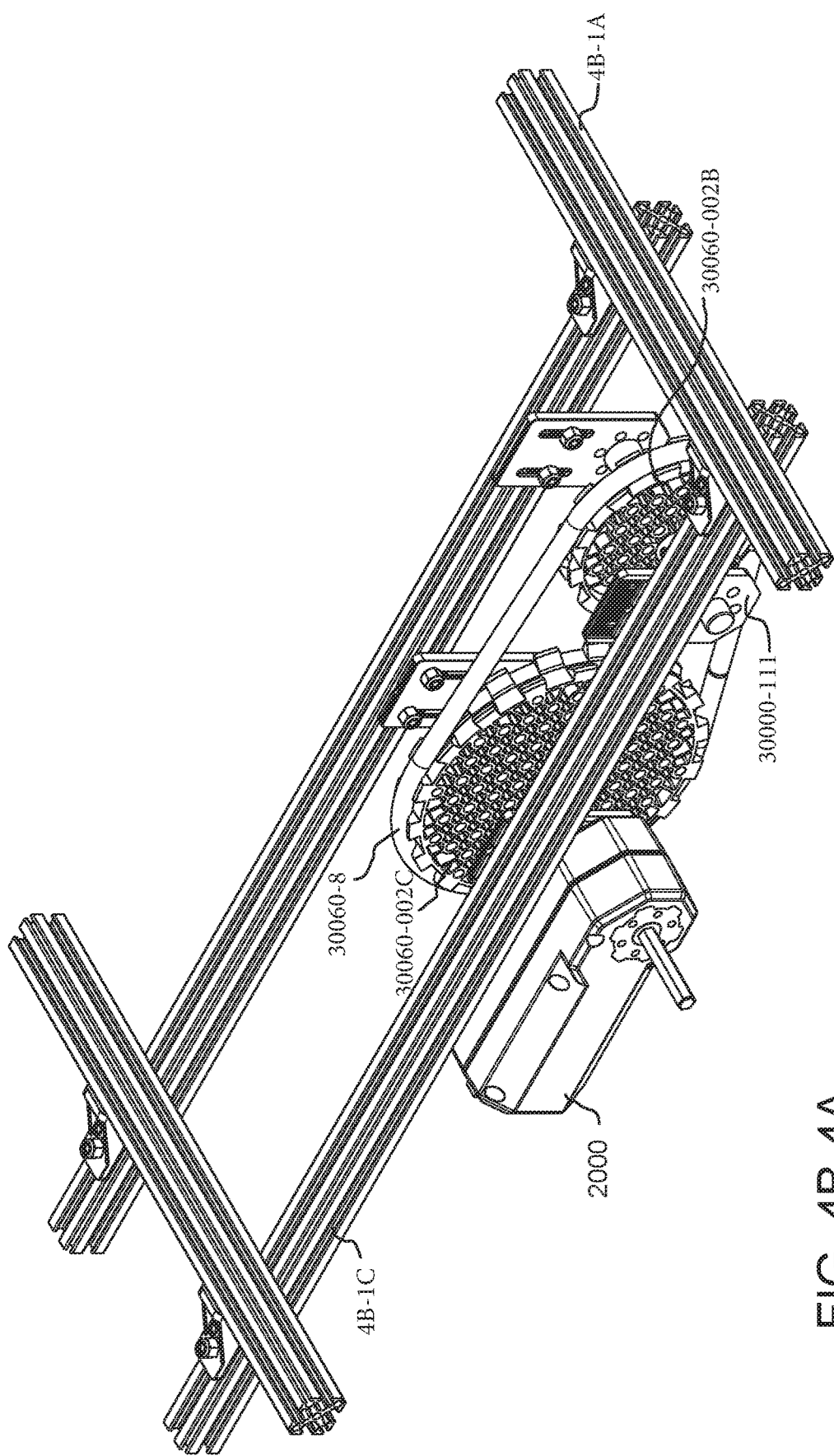
FIG. 4A is a schematic diagram of a first sub-assembly of the electro-mechanical agent of one configuration of the present teachings.

Referring primarily to FIG. 4A, partial assembly 76A can include one of elementary units 85 engaged with base frame 80 by forming an angle there between. FIG. 4A depicts the use of variable angle connector 90R configured to receive a part of base frame 80 and a part of elementary unit 85 to achieve a required angled relationship there between. Variable angle connector 90R can be further configured to provide a range of angled relationships between two or more engaging components. Some configurations of variable angle connector 90R can be further configured to engage with two or more pairs of components, i.e. a first set of two or more engaging components can form a first angled relationship and a second set of two or more engaging components can form a second angled relationship using a single variable bracket 90R. Motor bracket second configuration 90K can engage two or more supplementary/extension modules. In some configurations, the engaging components can include, but are not limited to including, a shaft, AC and/or DC motor, servo motor, etc. FIG. 4A depicts motor bracket 90K at more than one locations for engaging supplementary/extension modules with elementary unit 85 and/or base fame 80. In some configurations, a first portion of the motor bracket second configuration 90K can be engaged with elementary unit 85 and a second portion can be configured to receive a shaft through principal aperture 580 (FIGS. 46A and 46B) such that the shaft can be engaged with two distinct modules provided on either sides of motor bracket second configuration 90K. It should be noted that a desired spacing between first portion 555A (FIGS. 46A and 46B) and second portion 555B (FIGS. 46A and 46B) of motor bracket second configuration 90K can allow exemplary modules, such as but not limited to gear motor 105 to be engaged on either side of motor bracket second configuration 90K without any intrusion or interference from engaging elementary unit 85. Partial assembly 76A depicts disposition of motor bracket second configuration 90K at one of the locations with an elementary unit 85 and gear motor 105 uninterruptedly engaged on same side of motor bracket second configuration 90K.

Continuing to refer to FIG. 4A, partial assembly 76A can include bearing pillow connector 90N engaging part of shaft 135 with elementary unit 85 and/or base frame 80. Bearing pillow connector 90N can provide first portion 695A (FIGS. 48A and 48B) configured to engage with or mount on elementary unit 85 and a second portion 695B (FIGS. 48A and 48B) configured to receive part of shaft such as but not limited to bridging shaft 135 (FIG. 4). In some configurations, second portion 695B of bearing pillow bracket 90N can be dimensioned to receive a shaft with a varied geometry. For example, second portion of bearing pillow bracket 90N can be configured to receive a hex geometry shaft there through. In some configurations, received shaft 135 can be engaged with a bearing (not shown) while entering, exiting or interacting with bearing pillow connector 90N, to allow shaft 135 to maintain its rotational and/or linear freedom of motion. Bearing pillow bracket 90N has been used at multiple locations in partial assembly 76A. One of the many locations depicts engagement of shaft 135 with two elementary units 85 through use of bearing pillow connector 90N employed at either ends of shaft 135. Motor pillow bracket 30000-012 (FIG. 46C) can act as a rotating shaft support, while a hex connector 650 (FIG. 49A) can hold a shaft in a fixed position relative to a structure.

Figures 4, 4B, 5:
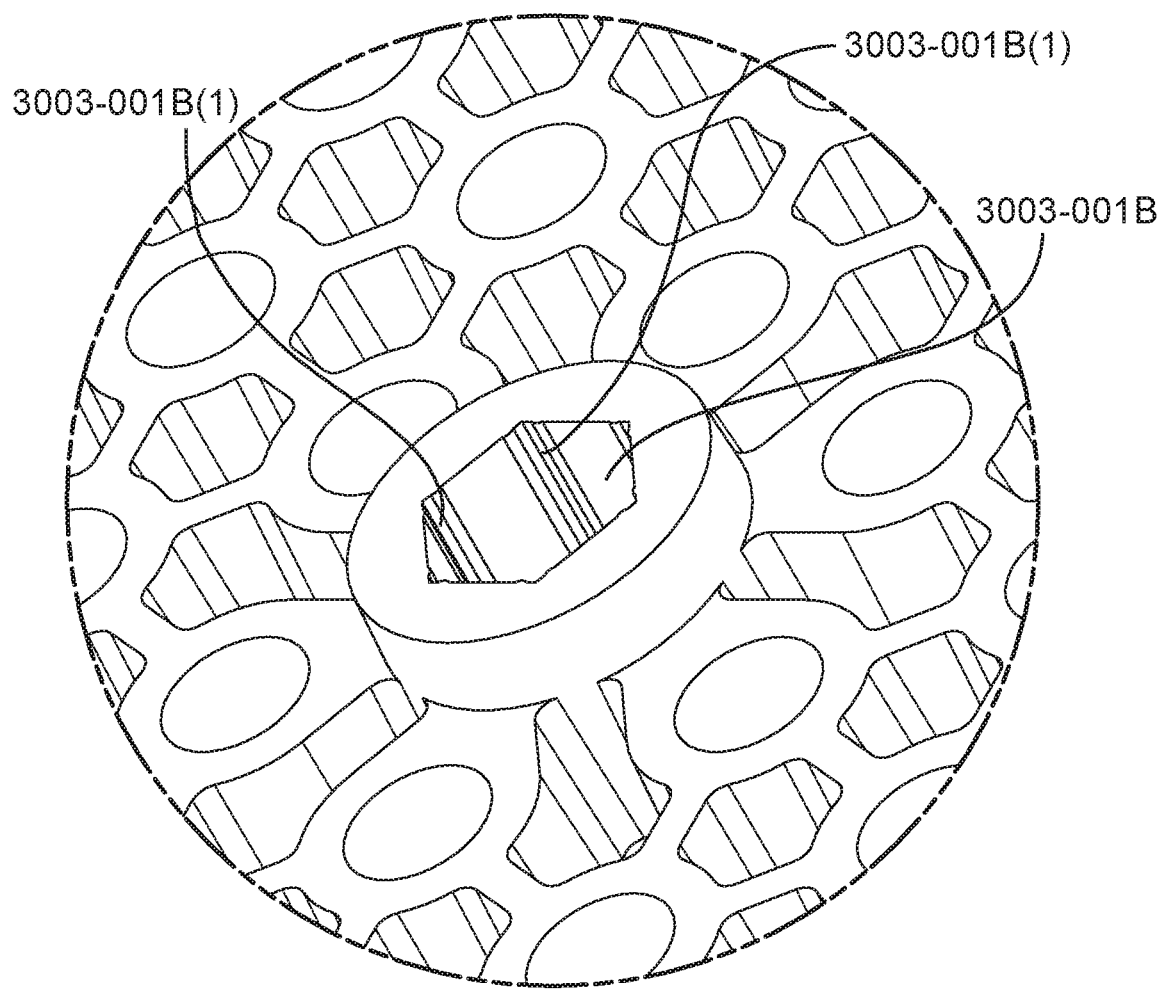
Figures 4, 4B, 5, 6:
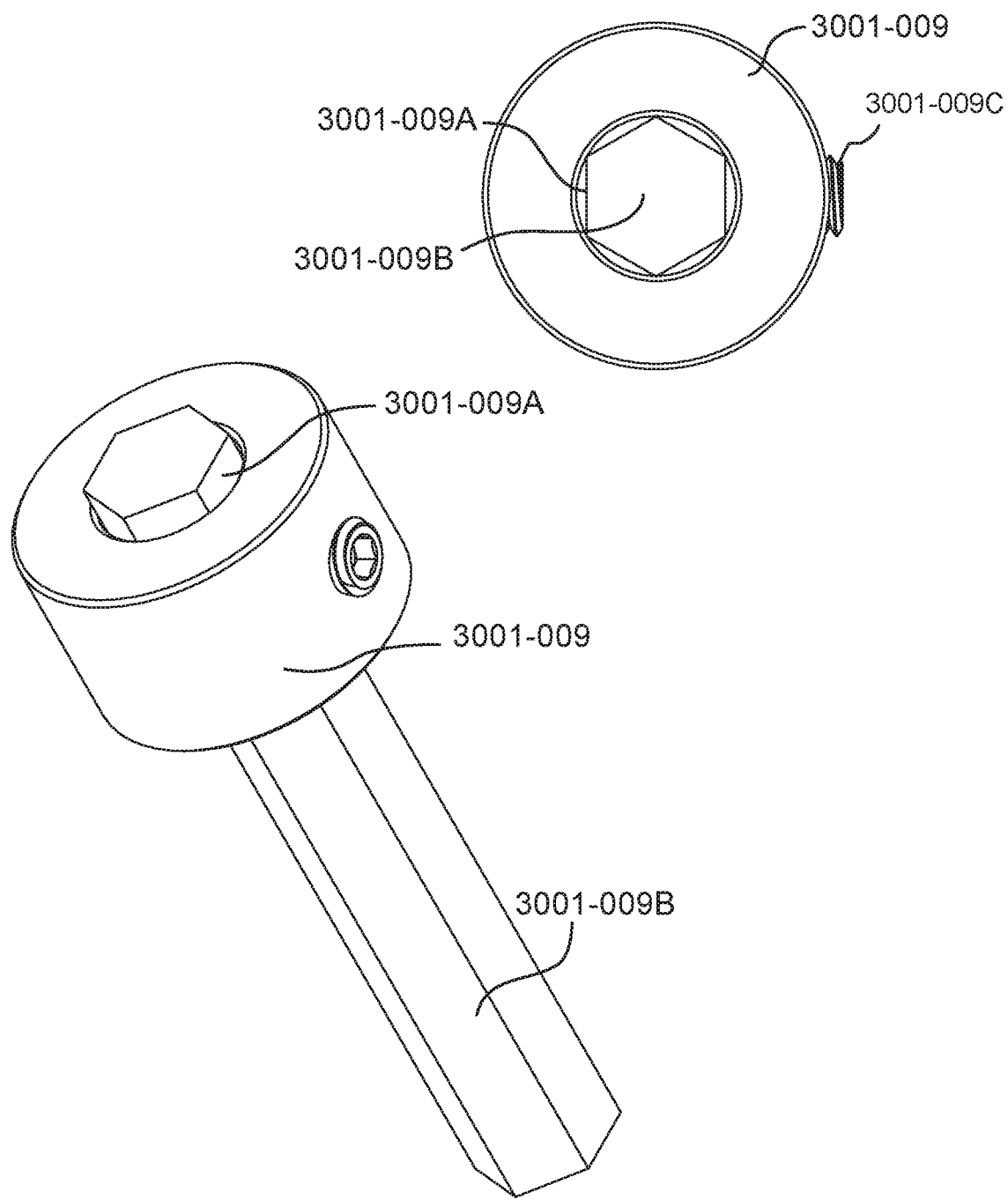
Figure 4C:
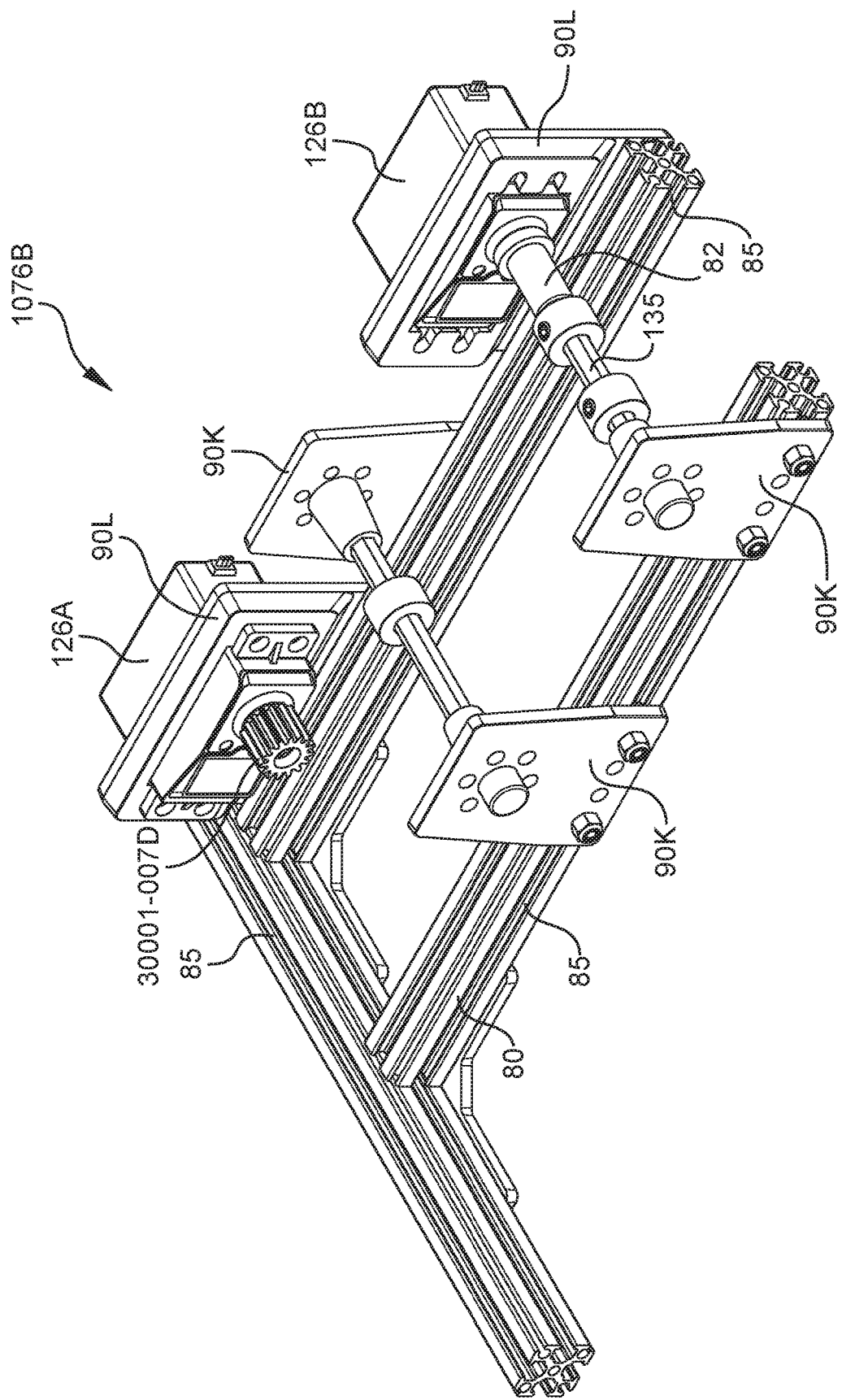
Figure 4D:
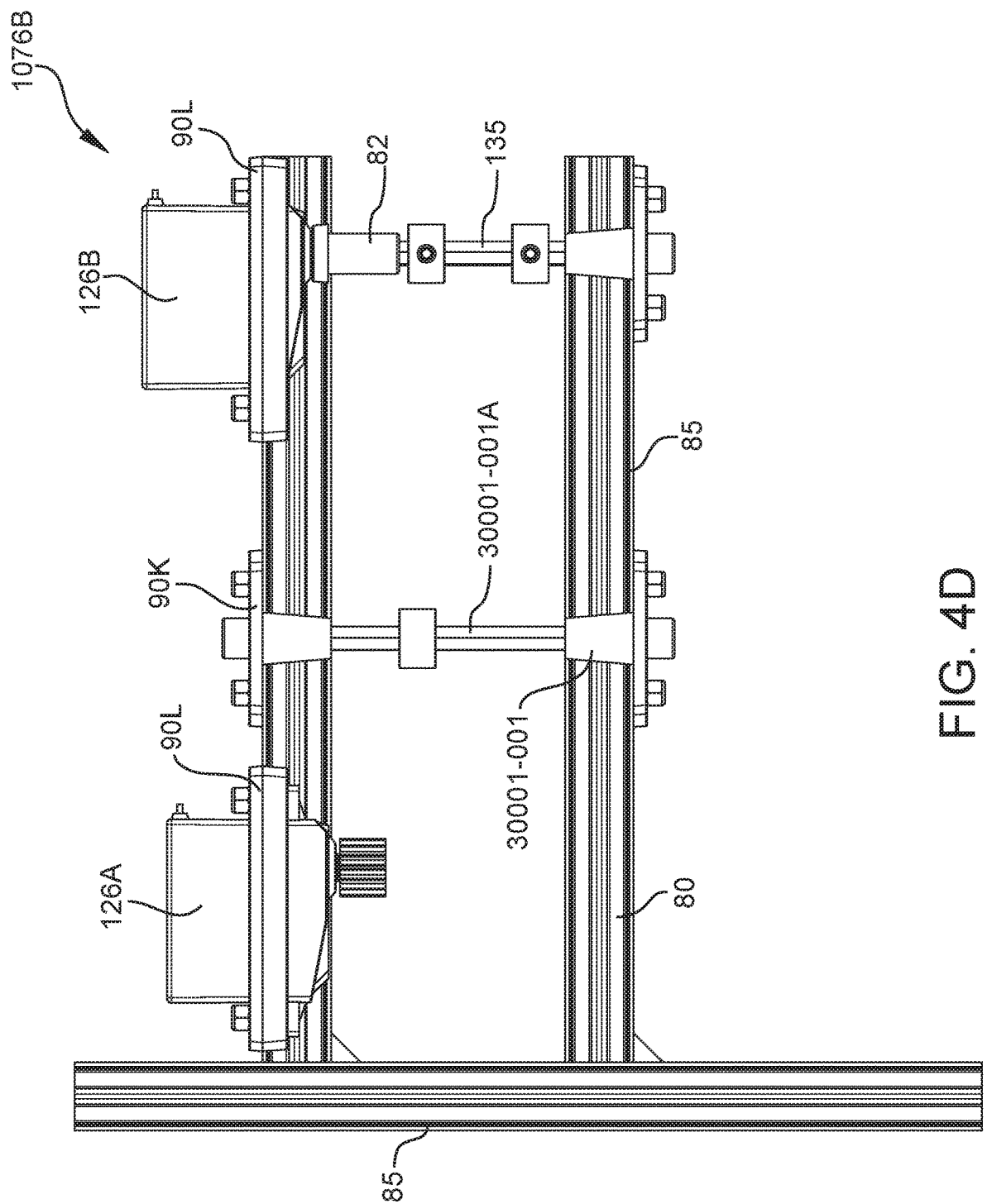
Figures 1, 4D:
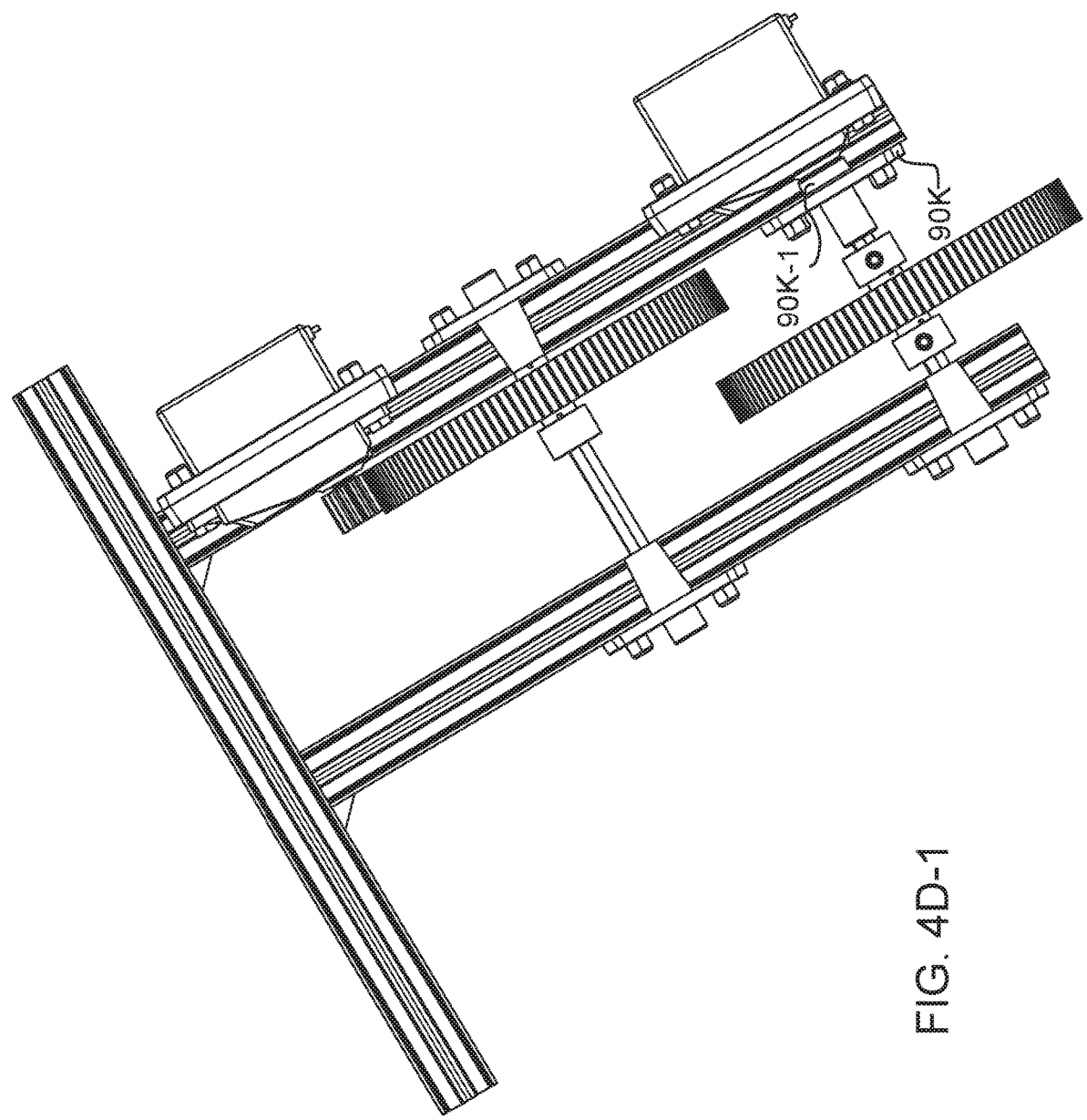

Referring now to FIGS. 4B-4D, partial assembly 1076B can include servo motor connector 90L that can engage at least one servo motor 126A/126B with elementary unit 85 and/or base frame 80. Servo motor connector 90L can comprise first portion 615A (FIGS. 47A and 47B) configured to partially or completely receive servo motor 126A/B and second portion 615B (FIGS. 47A and 47B) configured to receive a second engaging component such as but not limited to supplementary module, elementary units 85 or base frame 80. In some configurations, servo motor connector 90L can be configured to engage servo motor 126A/B in more than one configuration. FIGS. 4B-4D depict first servo motor 126A engaged with elementary unit 85 in a first exemplary configuration by way of servo motor connector 90L and second servo motor 126B engaged with elementary unit 85 in a second exemplary configuration by way of another servo motor connector 90L. A clear view of two exemplary configurations of this engagement can be depicted through FIG. 4C and FIG. 4D wherein gears 30002-005 (FIG. 4G-14) have been temporarily discarded. A first exemplary engagement configuration can be achieved by engaging elementary unit 85 with second portion 615B (FIGS. 47A and 47B) through a second side of servo motor connector 90L and accommodating servo motor 126A into frame 625 (FIGS. 47A and 47B) through first side such that a servo shaft (not shown) can extend away from frame 625 (FIGS. 47A and 47B) and surpass a width of elementary unit 85 engaged on a second side of servo motor connector 90L. Such an exemplary engagement can allow servo shaft (not shown) to engage at least one gear 30002-005 (FIG. 4G-14). Engaged gear can be further configured to interact with one or more meshed gears without any interference of elementary unit 85. A second exemplary engagement configuration can be achieved by engaging an elementary unit 85 with second portion 615B (FIGS. 47A and 47B) through a second side of servo motor connector 90L and accommodating servo motor 126B into frame 625 (FIGS. 47A and 47B) through first side such that a servo shaft (not shown) can extend away from frame 625 (FIG. 47A and FIG. 47B) and can stay within a width of elementary unit 85. Such an arrangement can allow servo shaft to interact with a shaft component 135 (FIG. 4C) through an servo motor shaft adapter 82 configured to play an intermediary between the two shafts. The above mentioned interaction can be achieved irrespective of elementary unit 85 being attached to second portion 615B (FIG. 47A and FIG. 47B) of servo connector 90L. FIG. 4D is a top view of partial assembly 1076B that depicts a comparative view of the extents to which first servo motor 126A and second servo motor 126B engage with respective servo motor connectors 90L. Adapter 90K-1 (FIG. 4D-1) can provide a resting place for bracket 90K (FIG. 4D).

Referring now to FIG. 4B-1, exemplary assembly 1001 depicts engagement of modules 1090 and 1091 with elementary unit 85 through indexable bracket 1000. A first setup 1080A depicts engagement of first module 1090 with elementary unit 85 at a first level while a second setup 1080B depicts engagement of second module 1091 at a second level. As previously mentioned, a slideable adjustment of engaging screws can allow modules to be disposed at a desirable height with respect to elementary unit 85.

Referring now primarily to FIGS. 4B-1 through 4B-4 and FIG. 4B-4A, in some configurations, rotational parts such as, for example, but not limited to, wheels 30006-006 (FIG. 4B-4), gears 30002-007 (FIG. 4B-4), pulleys 30060-002 (FIG. 4B-2), and sprockets 30003-001 (FIG. 4G-6) can include hex-shaped shaft cavities 30003-001B (FIG. 4G-6), for example, acting as splines to enable non-adapter/keyway shaft coupling. Rotational parts can have the same width and can be swappable without changing the system. Tension on axles, due to the nature of the brackets and shafts, can be slide-adjustable by sliding the axles along the extrusion to tune power transmission (gear mesh, chain tension, etc.). Slide-adjustability results from mounting to the slot of the extrusion with brackets. For example, gears can be slid together until they engage, and sprockets can be slid relative to each other to, for example, tension a chain. The extrusion can enable motion brackets to be mounted on the sides of the extrusion structure. In some configurations, the hex-shaped shaft cavities 30003-001B (FIG. 4G-6) can include grooves 30003-001D (FIG. 4G-6) that can enable shaft alignment and key features. In some configurations, hex-shaped shaft cavities 30003-001B (FIG. 4G-6) can include bumps 30003-001E that can enable a snug fit. In some configurations, a 5 mm shaft profile can be used. In some configurations, adapters and bearings, for example drive shaft bearing 30001-001 (FIG. 4G-1), can be used to enable the hex shafts to spin in round holes. The adapters and bearings can include round outer diameters 30001-001D (FIG. 4G-1), for example. In some configurations, long 30001-008 (FIG. 4G-5) and short 30001-005 (FIG. 4G-2) through-hole bearings can be placed anywhere on the hex shaft based on need, for example, enabling a compact mechanism as shown in FIG. 4B-4. Shaft collar 330 (FIG. 32A), for example, can hold the lateral position of the hex shaft relative to the bearings. In some configurations, the hex shaft can terminate inside an adapter or bearing such as, for example, drive shaft bearing 30001-001 (FIG. 4D). Lateral movement of the shaft can be reduced and/or eliminated when both ends of the hex shaft terminate inside an adapter or bearing such as, for example, pillow bracket 90N (FIG. 4A). Pillow bracket 90N (FIG. 4A) can couple a rotating shaft with a rotating system part. In some configurations, shafts and bearings can require support. Motion brackets and/or pillow brackets can supply the support. In some configurations, the motion and/or pillow brackets can include cavity 5800 (FIG. 46A), for example, of the same dimension as the outer diameter of the adapters and/or bearings. In some configurations, cavity 5800 (FIG. 46A) can include a 9 mm dimension. In some configurations, the motion and/or pillow brackets can include hole patterns 5700 (FIG. 46A), for example, in the vicinity of cavity 5800 (FIG. 46A). Bearing support for, for example, a robot, can depend upon the coupling between a motion bracket and a bearing. The coupling can depend upon the materials the brackets and bearings are made from, and the tolerancing to provide bearing support for robots. Materials can include those that have a low coefficient of friction, and those that retain integrity when exposed to heat and/or friction such as, for example, but not limited to acetal, for example, but not limited to, Delrin, and Nylon, for example, PA66. In some configurations, the tolerance can be between about 0.02 mm and 0.28 mm. In some configurations, the hex shaft can be manufactured of metal and the bearings and supports can be manufactured of plastics. In some configurations, first configuration gear motor 105 (FIG. 4B-3) can drive motion in, for example, but not limited to, gears 30002-001 through 30002-009 (FIG. 4G-12 through FIG. 4G-18) and wheel assemblies 20006-004 (FIG. 6V), 20006-001 (FIG. 6W), and 20006-005 (FIG. 6X). In some configurations, second configuration gear motor 2000 (FIG. 4B-4A) can drive motion in, for example, but not limited to, pulleys 30060-002B/C.

Referring now to FIGS. 4B-2A, 4B-2B, and 4B-2C, pulley 30060-002A (FIG. 4B-2A), pulley 30060-002B (FIG. 4B-2B), and pulley 30060-002C (FIG. 4B-2C) can include alternating retaining features 30060-1/30060-2 that can be positioned to alternately oppose each other, and that can form track 30060-4 split across the width of pulley 30060-002. Alternating retaining features 30060-1/30060-2 can include slanted walls 30060-3 that can include any slant angle that can accommodate the diameter of belt 30060-8. Alternating retaining features 30060-1/30060-2, slanted walls 30060-3, and formed track 30060-4 can guide belt 30060-8 (FIG. 4B-2). The geometry of pulleys 30060-002A/002B/003C (FIGS. 4B-2A, 4B-2B, and 4B-2C) can produce a functioning device, and can allow pulleys 30060-002A/002B/003C (FIGS. 4B-2A, 4B-2B, and 4B-2C) to be molded using a two-part mold. In some configurations, pulleys 30060-002A/002B/003C (FIGS. 4B-2A, 4B-2B, and 4B-2C) can include hex-shaped shaft cavities 30060-5 that can accommodate a hex-shaped shaft. Pulleys 30060-002A/002B/003C (FIGS. 4B-2A, 4B-2B, and 4B-2C) can include any shaft cavity shape. In some configurations, pulleys 30060-002A/002B/003C (FIGS. 4B-2A, 4B-2B, and 4B-2C) can include strengthening shapes 30060-6 and associated cavities 30060-7 that can maintain the structural integrity of pulleys 30060-002A/002B/003C (FIGS. 4B-2A, 4B-2B, and 4B-2C) without unnecessarily increasing weight and material requirements of pulleys 30060-002A/002B/003C (FIGS. 4B-2A, 4B-2B, and 4B-2C). Pulleys 30060-002A/002B/003C (FIGS. 4B-2A, 4B-2B, and 4B-2C) can include any number of alternating retaining features 30060-1/30060-2, strengthening shapes 30060-6, and associated cavities 30060-7.

Figure 2B:
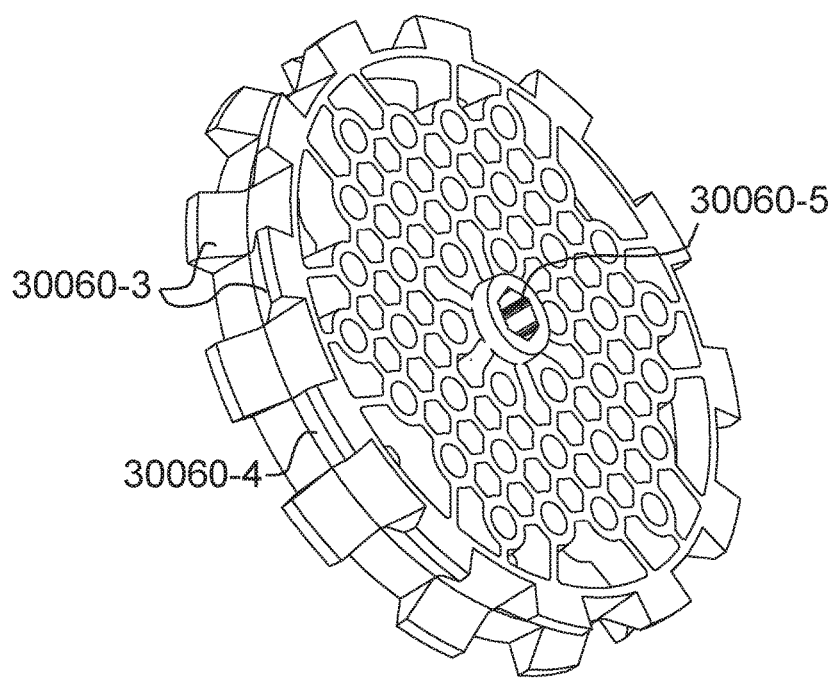
Figure 2C:
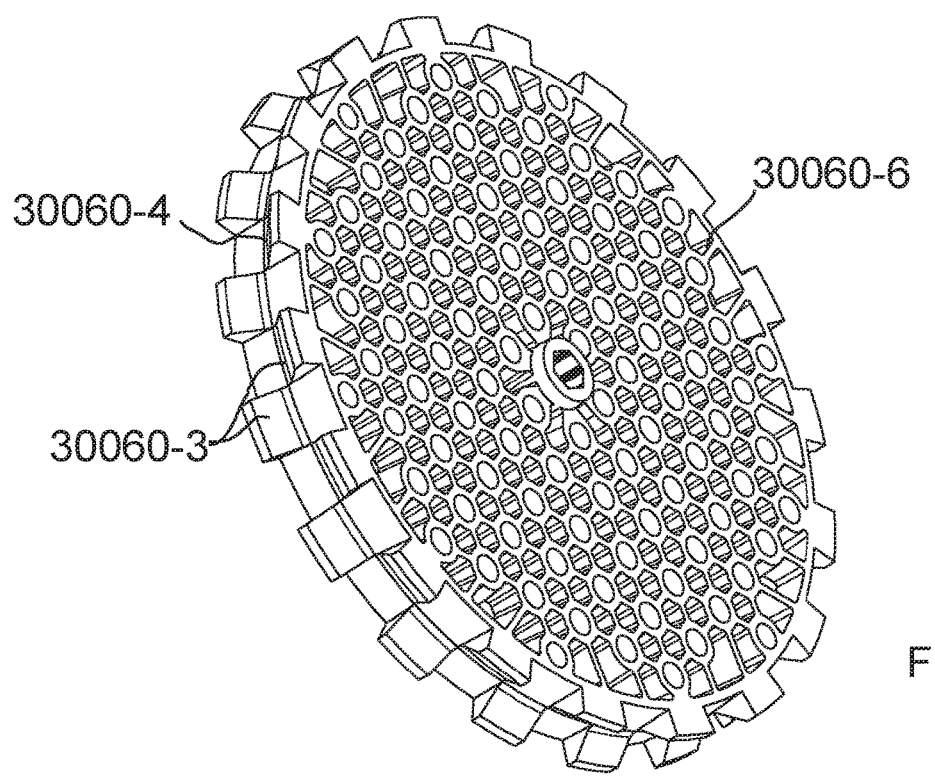

Continuing to refer to FIGS. 4B-2A, 4B-2B, and 4B-2C, in an injection molded part, any axis that intersects the part parallel to the axis of mold release must enter the part and exit the part exactly once to prevent the part from becoming stuck inside the molding cavity after the part solidifies unless the mold tool for that part includes an additional slider or insert. This additional complexity can increase the cost of the mold tool. Some pulleys incorporate a circumferential groove, concentric to the central pivot bore axis which can cause the mold release axis to enter and exit the part twice. Pulleys 30060-002A (FIG. 4B-2A), 30060-002A (FIG. 4B-2B), and 30060-002C (FIG. 4B-2C) of the present teachings can include first slanted protrusion 30060-1 that can be positioned opposite to and offset from second slanted protrusion 30060-2, the positioning of which can form depression 30060-4. In use, pulley cord 30060-8 (FIG. 4B-2) can rest in depression 30060-4. The mold features for pulleys 30060-002A (FIG. 4B-2A), 30060-002A (FIG. 4B-2B), and 30060-002C (FIG. 4B-2C) can be free from overhang in the direction that the mold opens, thereby accommodating a single mould release axis for pulleys 30060-002A (FIG. 4B-2A), 30060-002B (FIG. 4B-2B), and 30060-002C (FIG. 4B-2C).

Referring now primarily to FIG. 4B-5, hex-shaped shaft cavities 3003-001B of exemplary wheels 30006-006 (FIG. 4B-4), gears 30002-007 (FIG. 4B-4), pulleys 30060-002 (FIG. 4B-2), and sprockets 30003-001 (FIG. 4G-6), can include grooved vertices 3003-001B (1). Grooved vertices 3003-001B (1) can be configured to aid in coupling of hex shaft 3001-009B (FIG. 4B-6) within hex shaped cavity 3003-001B and further restrict hex shaft 3001-009B (FIG. 4B-6) to rotate within hex shaped cavity 3003-001B. Such an arrangement can enable torque transfer from hex shaft 3001-009B (FIG. 4B-6) to coupled components, as enlisted herein. In some configurations, hex-shaped cavity 3003-001B can accommodate a cylindrical shaft that may or may not rotate within hex shaped cavity 3003-001B.

Referring now to FIG. 4B-6, shaft collar 3001-009 is depicted with a circular bore 3001-009A. Hex shaft 3001-009B can be received within circular bore 3001-009A of shaft collar 3001-009. In some configurations, hex shaft 3001-009B can be rotated within circular bore 3001-009A to affix with walls of circular bore 3001-009A. Such an affixation can be achieved by allowing at least one of the hex sides of hex shaft 3001-009B to be substantially parallel to a part of the wall of circular bore 3001-009A. Hex shaft 3001-009B can be received into circular bores 3001-009A of other components such as but not limited to, wheels 30006-006 (FIG. 4B-4), gears 30002-007 (FIG. 4B-4), pulleys 30060-002 (FIG. 4B-2), and sprockets 30003-001 (FIG. 4G-6), and connectors (FIGS. 33A to 40C and FIGS. 46A to 54D). Set screw 3001-009C can enable secure coupling between hex shaft 3001-009B and shaft collar 3001-009. Shaft collar 3001-009 can include a standard thread such as, for example, but not limited to, an M3 thread. In some configurations, a standard hex cap bolt can be used in shaft collar 3001-009 instead of set screw 3001-009C.

Figure 4F:
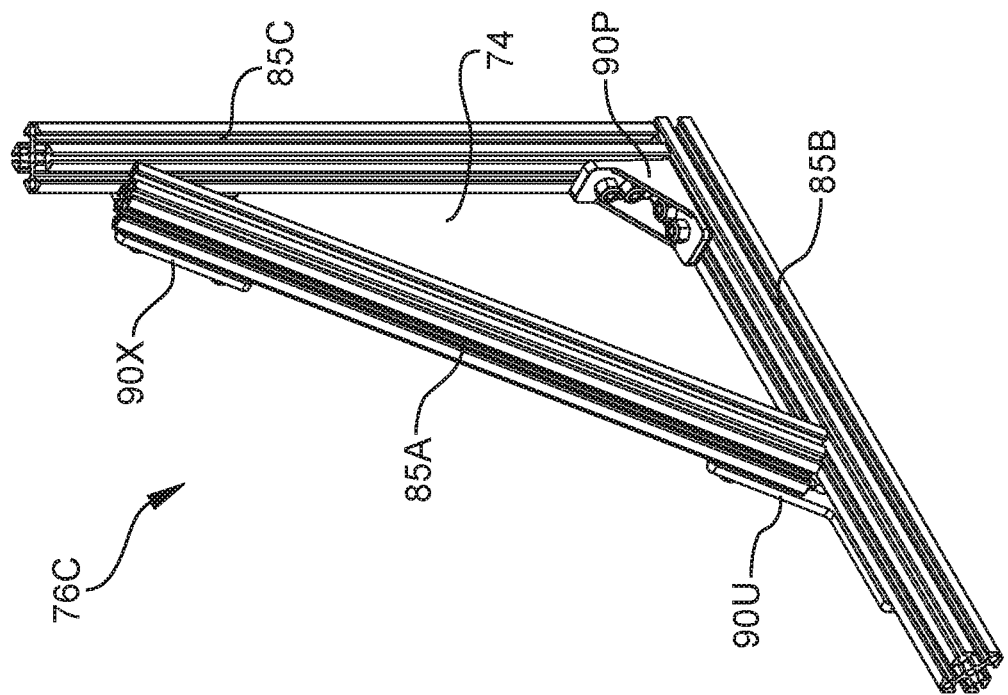
FIGS. 4E and 4F are schematic diagrams of exemplary uses of connectors of the present teachings.
Figure 4E:
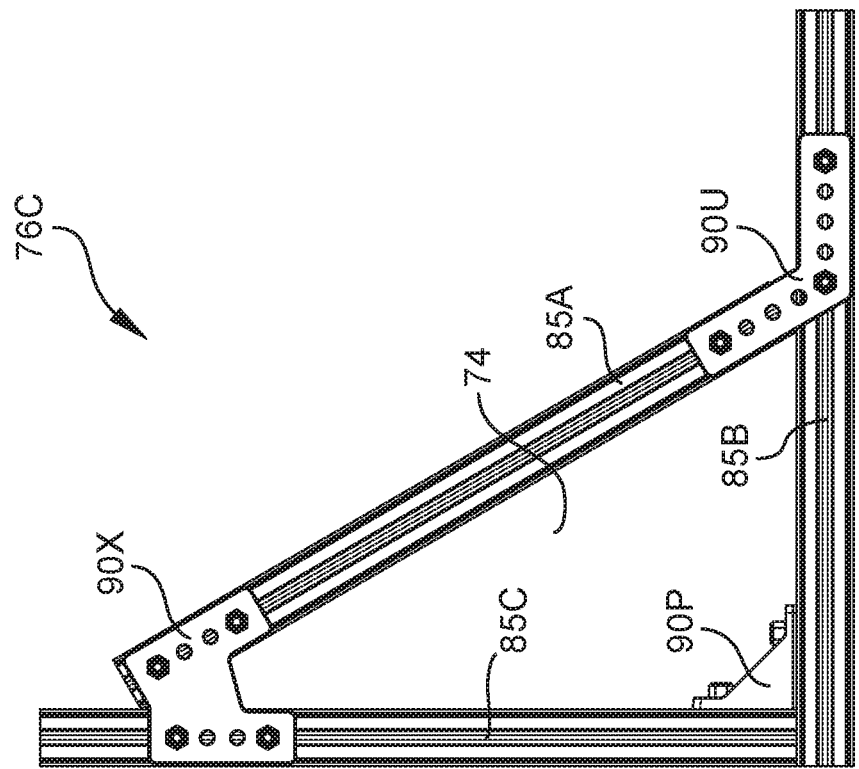

Referring now to FIGS. 4E and 4F, partial assembly 76C can include frame 74 formed from a plurality of elementary units 85. The plurality of elementary units 85 can be engaged by way of at least one obtuse angle connector 90U, at least one acute angle connector 90X and at least one inside corner connector 90P. Obtuse angle connector 90U can be configured to provide a first arm in an obtuse relationship with a second arm. A first elementary unit 85A can be engaged with first arm 755 (FIGS. 51A and 51B) and second elementary unit 85B can be engaged with second arm 757 (FIGS. 51A and 51B), thereby forming an obtuse relationship between first elementary unit 85A and second elementary unit 85B. Such an engagement can further allow obtuse angle connector 90U to be disposed at an edge of frame 74 and facing away from first elementary unit 85A and second elementary unit 85B. Partial assembly 76C employees 120° connector 90U that can be replaced by any other obtuse angle connector such as but not limited to 135° connectors, 150° connectors, etc. A second location of partial assembly 76C depicts an acute angled relationship between first elementary unit 85A and third elementary unit 85C via acute angle connector 90X. Acute angle connector 90X can be, but is not limited to being a 30° connector. Acute angle connector 90X can further comprise first arm 710 (FIGS. 50A and 50B) that can engage first elementary unit 85A, and second arm 715 (FIGS. 50A and 50B) that can engage another, in this case, third elementary unit 85C, thus achieving an acute angle relationship between the two elementary units 85A, 85C. Such an engagement can allow acute angle connector 90X to be disposed along edge of frame 74 and facing away from engaged elementary units 85A and 85C. In some configurations, bridging gap 720 (FIGS. 50A and 50B) can be provided between first arm 710 (FIGS. 50A and 50B) and second arm 715 (FIGS. 50A and 50B) to ensure an uninterrupted engagement of elementary units 85A, 85C. Partial assembly 76C can include engagement of second elementary unit 85B and third elementary unit 85C via inside corner bracket 90P. Inside corner bracket 90P can comprise first arm 910 (FIGS. 53A and 53B) configured to engage second elementary unit 85B, and second arm 912 (FIGS. 53A and 53B) configured to engage third elementary unit 85C. A variety of angled relationships can be provided between first arm 910 (FIGS. 53A and 53B) and second arm 912 (FIGS. 53A and 53B) of inside corner bracket 90P. Disposition of inside corner connector 90P can be in the interior of frame 74 and in a plane also comprising engaging elementary units 85B and 85C. Acute and obtuse brackets can be combined to form various geometric shapes, for example, but not limited to, a triangle.

Figure 4G:
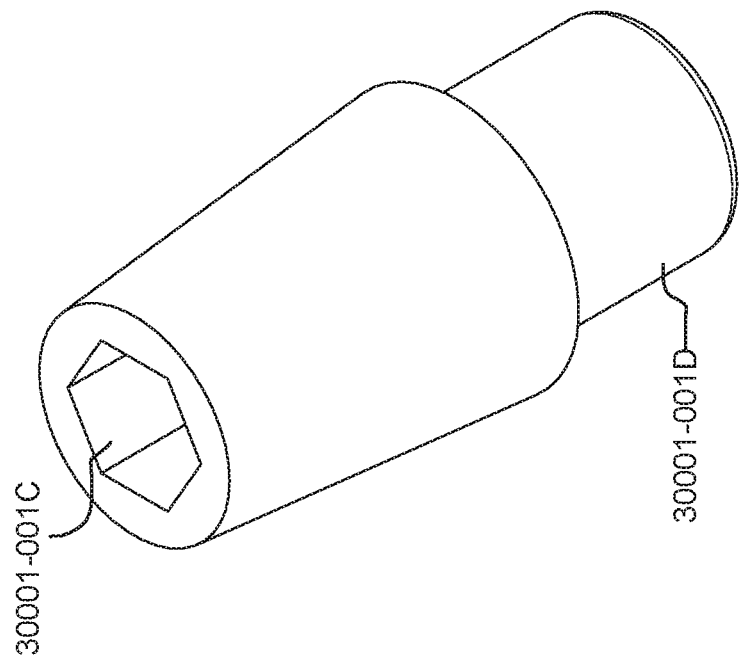
Figure 1:
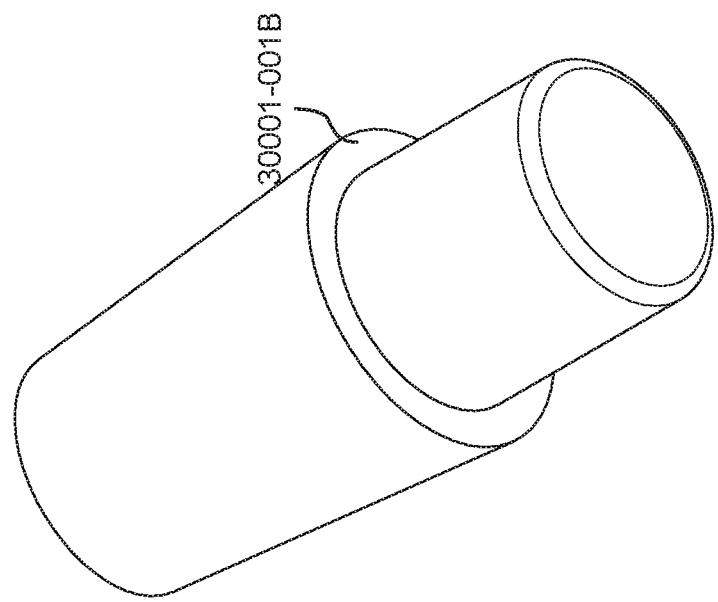
Figures 2, 4G:
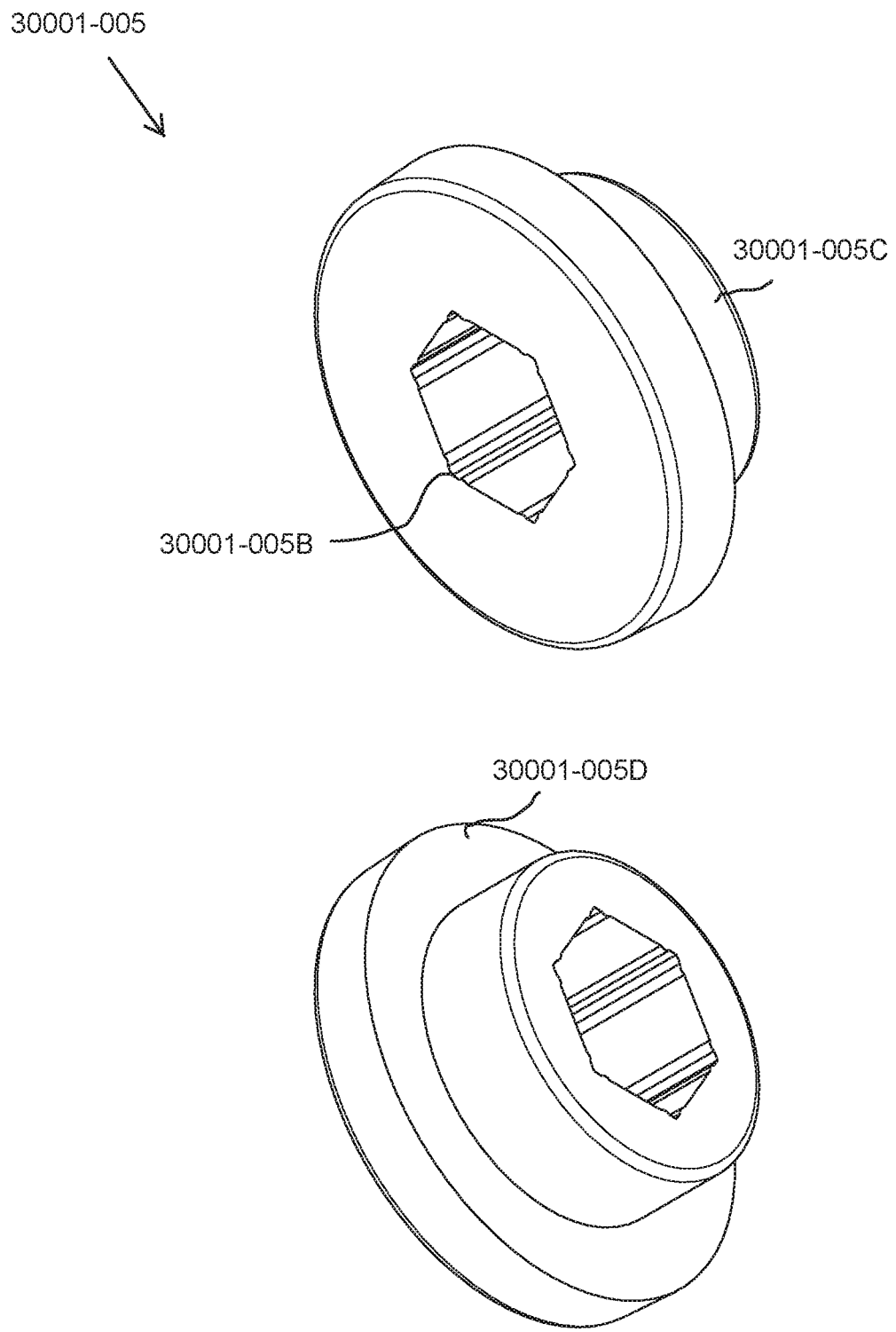
Figure 4G:
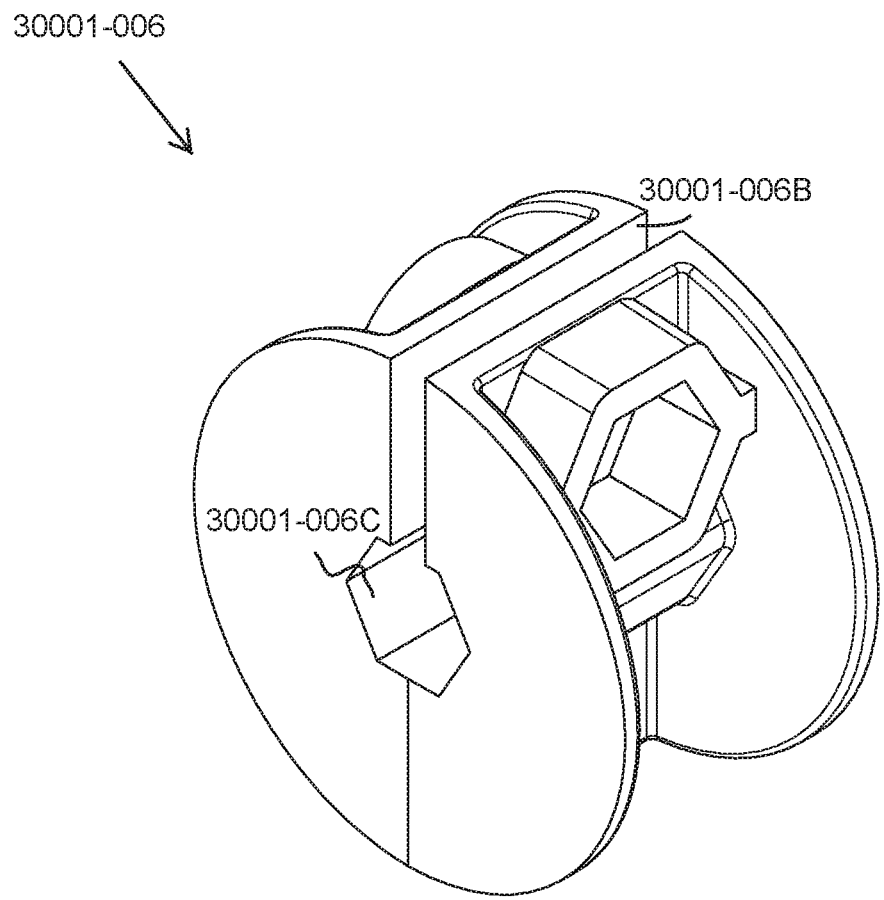
Figure 3:
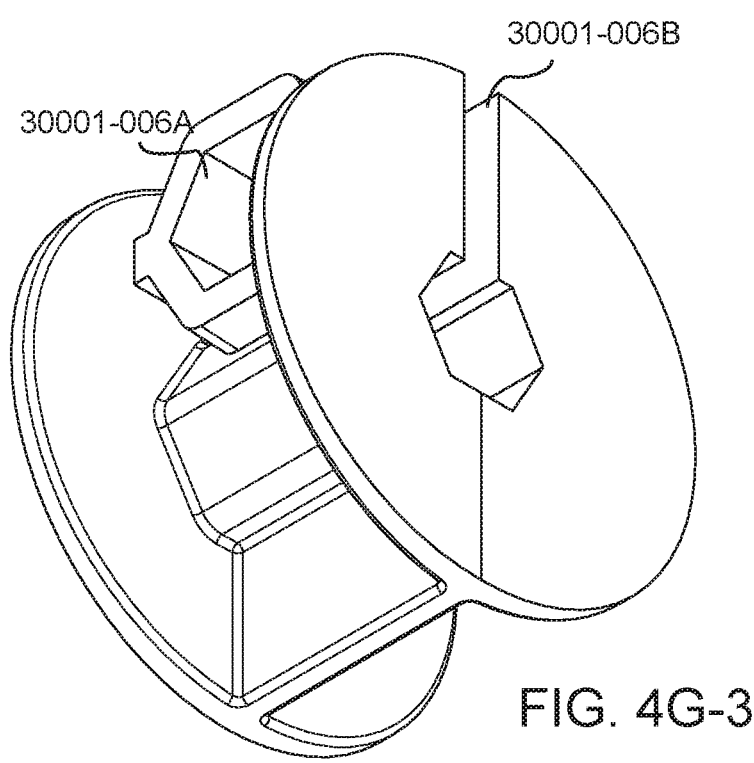
Figures 4, 4G:
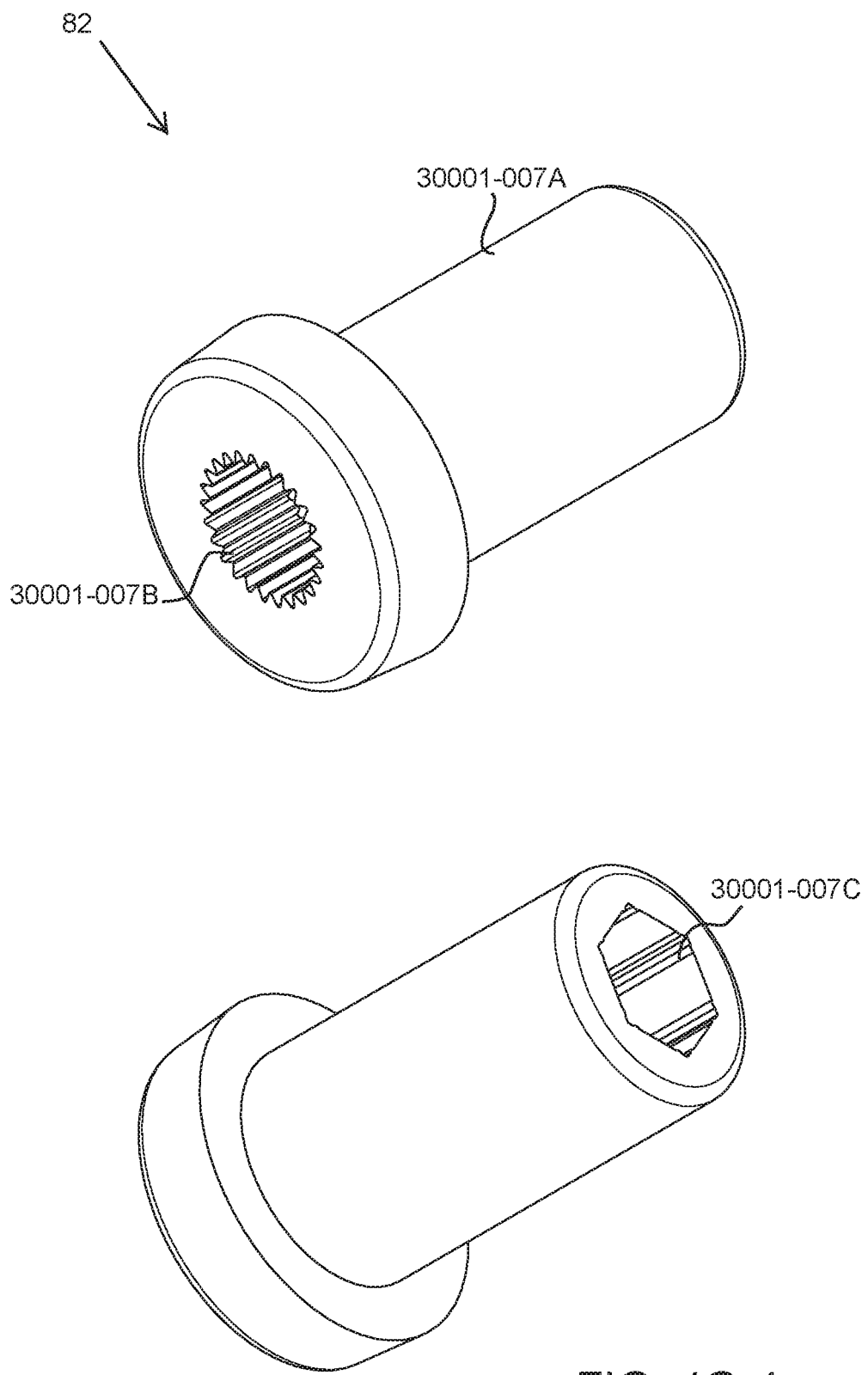

Referring now to FIG. 4G-1, drive shaft bearing 30001-001 can operably couple with shaft 30001-001A (FIG. 4C) and can provide bearing surface 30001-001B against motor bracket second configuration 90K (FIG. 4C). Shaft 30001-001A (FIG. 4D) can operably couple with drive shaft bearing 30001-001 at bearing cavity 30001-001C which can be any shape to accommodate shaft 30001-001A (FIG. 4D). Bearing mount 30001-001D can operably couple with, for example, motor bracket second configuration 90K (FIGS. 46A/46B) at principal aperture 5800 (FIGS. 46A/46B).

Referring now to FIG. 4G-2, through-bore bearing 30001-005 can attach to shaft 30001-005A (FIG. 4A), for example, and can provide bearing surface 30001-005D against shaft support brackets such as, for example, motor bracket second configuration 90K (FIGS. 46A/46B). Shaft 30001-005A (FIG. 4A) can operably couple with through-bore bearing 30001-005 at bearing cavity 30001-005B which can be any shape to accommodate shaft 30001-005A (FIG. 4A). Bearing mount 30001-005C can operably couple with, for example, motor bracket second configuration 90K (FIGS. 46A/46B) at principal aperture 5800 (FIGS. 46A/46B).

Referring now to FIG. 4G-3, shaft collar 30001-006 can clamp down on a shaft to retain axial position of the shaft. The shaft can operably couple with shaft collar 30001-006 at shaft cavity 30001-006C. Shaft collar 30001-006 can be tightened at tightening port 30001-006A to reduce the size of collar opening 30001-006B, because shaft collar 30001-006 is flexible, and thus tighten shaft collar 30001-006 against a shaft such as, for example, but not limited to, shaft 30001-005A (FIG. 4A).

Referring now to FIG. 4G-4, servo shaft adapter 82 can operably couple servo motor output shaft 30001-007D (FIG. 4C) to hex shaft 135 (FIG. 4C) at shaft cavity 30001-007C. Bearing mount 30001-007A can operably couple with, for example, motor bracket second configuration 90K (FIGS. 46A/46B) at principal aperture 5800 (FIGS. 46A/46B).

Figure 48A:
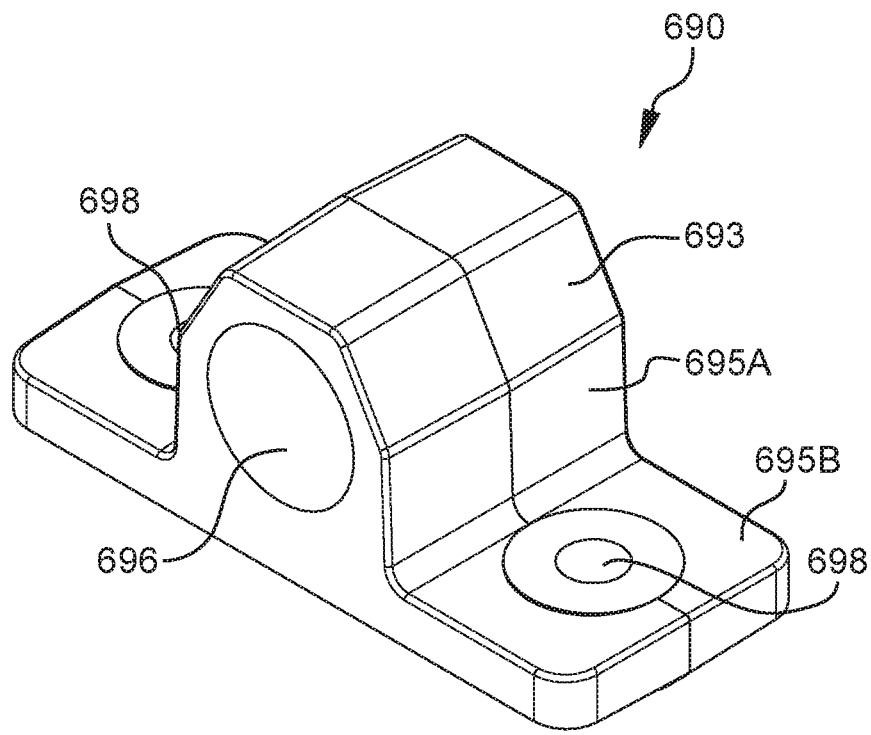
FIGS. 48A-48B are schematic diagrams of perspective views of the bearing pillow connector of the present teachings.

Referring now to FIG. 4G-5, through-bore bearing second configuration 30001-008 can couple pillow bracket 90N (FIG. 4A) to a shaft (not shown), for example, and can provide bearing surface 30001-008D against, for example, pillow bracket 90N (FIG. 4A) at cylindrical bore 696 (FIGS. 48A/48B). A shaft can operably couple with through-bore bearing 30001-008 at bearing cavity 30001-008A which can be any shape to accommodate the shaft. Through bore bearing first configuration 30001-005 (FIG. 4G-2) and through bore bearing second configuration can allow a shaft to fully pass through bearing first configuration 30001-005 (FIG. G-2) and/or bearing second configuration 30001-008 supplying support to an axle at any point on the length of the axle.

Referring now to FIGS. 4G-6 through 4G-11, sprockets 30003-001 (FIG. 4G-6), 30003-002 (FIG. 4G-7), 30003-003 (FIG. 4G-8), 30008-008 (FIG. 4G-9), 30003-009 (FIG. 4G-10), and 30003-010 (FIG. 4G-11) can mount on shafts and transmit rotational power to a chain such as for example chain 30003-001A (FIG. 4A). Any size sprocket can be used to enable movement of chain 30003-001A (FIG. 4A), for example, sprocket 30003-002 (FIG. 4A). sprockets 30003-001 (FIG. 4G-6), 30003-002 (FIG. 4G-7), 30003-003 (FIG. 4G-8), 30008-008 (FIG. 4G-9), 30003-009 (FIG. 4G-10), and 30003-010 (FIG. 4G-11) can include notched shaft cavity 30003-001B that can enable in phase mounting of modules onto a shaft, for example, shaft 30001-005A (FIG. 4A). Each of sprockets 30003-001 (FIG. 4G-6), 30003-002 (FIG. 4G-7), 30003-003 (FIG. 4G-8), 30008-008 (FIG. 4G-9), 30003-009 (FIG. 4G-10), and 30003-010 (FIG. 4G-11) can include a particular number of teeth 30003-001C that can engage chain 30003-001A (FIG. 4A) and enable specific power transmission to the wheels (not shown).

Referring now to FIGS. 4G-12 through 4G-19, gears 30002-001 (FIG. 4G-12), 30002-002 (FIG. 4G-13), 30002-005 (FIG. 4G-14), 30002-005A (FIG. 4G-14A), 30002-006 (FIG. 4G-15), 30002-007 (FIG. 4G-16), 30002-008 (FIG. 4G-17), 30002-009 (FIG. 4G-18), and 30011-002 (FIG. 4G-19) can mount on a shaft such as, for example, shaft 135 (FIG. 4C), and can transmit rotational power. In some configurations, notch 30002-001D can be included to assist in placement and proper alignment of gear 3002-001. Notch 30002-001D can be included in any module that can require alignment assistance. Any size gear can be used to enable transmission of power and gear reduction from, for example, servo motor 126A (FIG. 4C), for example, to gear 30002-005 (FIG. 4B). Each of gears 30002-001 (FIG. 4G-12), 30002-002 (FIG. 4G-13), 30002-005 (FIG. 4G-14), 30002-006 (FIG. 4G-15), 30002-007 (FIG. 4G-16), 30002-008 (FIG. 4G-17), 30002-009 (FIG. 4G-18), and 30011-002 (FIG. 4G-19) can include notched shaft cavity 30002-001B that can enable in phase mounting of modules onto a shaft, for example, shaft 30002-001E (FIG. 4B). Each of gears 30002-001 (FIG. 4G-12), 30002-002 (FIG. 4G-13), 30002-005 (FIG. 4G-14), 30002-006 (FIG. 4G-15), 30002-007 (FIG. 4G-16), 30002-008 (FIG. 4G-17), 30002-009 (FIG. 4G-18), and 30011-002 (FIG. 4G-19) can include a particular number of teeth 30002-001C that can enable specific power transmission from servo motor 126A (FIG. 4A), for example, through gears 30011-002 (FIG. 4B) and 30002-005 (FIG. 4B). In some configurations, motion components (gears, sprockets, pulleys, and wheels) can include a hole mounting pattern that is on, for example, but not limited to, an 8 mm pitch. In some configurations, the bolt holes can accommodate, for example, M3 bolts. Various hole and supporting structure patterns in gears, sprockets, wheels, and pulleys can be used to reduce weight, improve strength, and accommodate manufacturing considerations.

Referring now to FIG. 5 and FIG. 6, electro-mechanical agent second example configuration 76 can include, but is not limited to including, at least one omni-wheel 160. Omni-directional wheel 160 can be configured to provide a mobility feature to electro-mechanical agent second example configuration 76. A plurality of rollers on omni-wheel 160 and can be arranged in a substantially circular set up. The rollers can be configured to allow electro-mechanical agent second example configuration 76 to move in an omni-directional fashion. Additionally, electro-mechanical agent second example configuration 76 can also include regular wheels 53 that allow electro-mechanical agent second example configuration 76 to retain its ability of moving in other directions, thus providing an omni-directional mobility feature to electro-mechanical agent second example configuration 76. In some configurations, all wheels of electro-mechanical agent second example configuration 76 can be replaced by omni-wheels 160. Omni-directional wheels 160 can be further arranged to allow electro-mechanical agent second example configuration 76 to move in holonomic directions. In some configurations, regular wheels 53 of electro-mechanical agent second example configuration 76 can be replaced by wheels 160. The position of regular wheel/s 53 and/or omni-directional wheels 160 can be as per user preference. Choice of wheels whether regular 53 and/or omni 160, can be based on, but are not limited to be based on, user requirements and/or expectations from electro-mechanical agent second example configuration 76, number of modules employed for building electro-mechanical agent second example configuration 76 and/or the assigned task(s).

Figure 6:
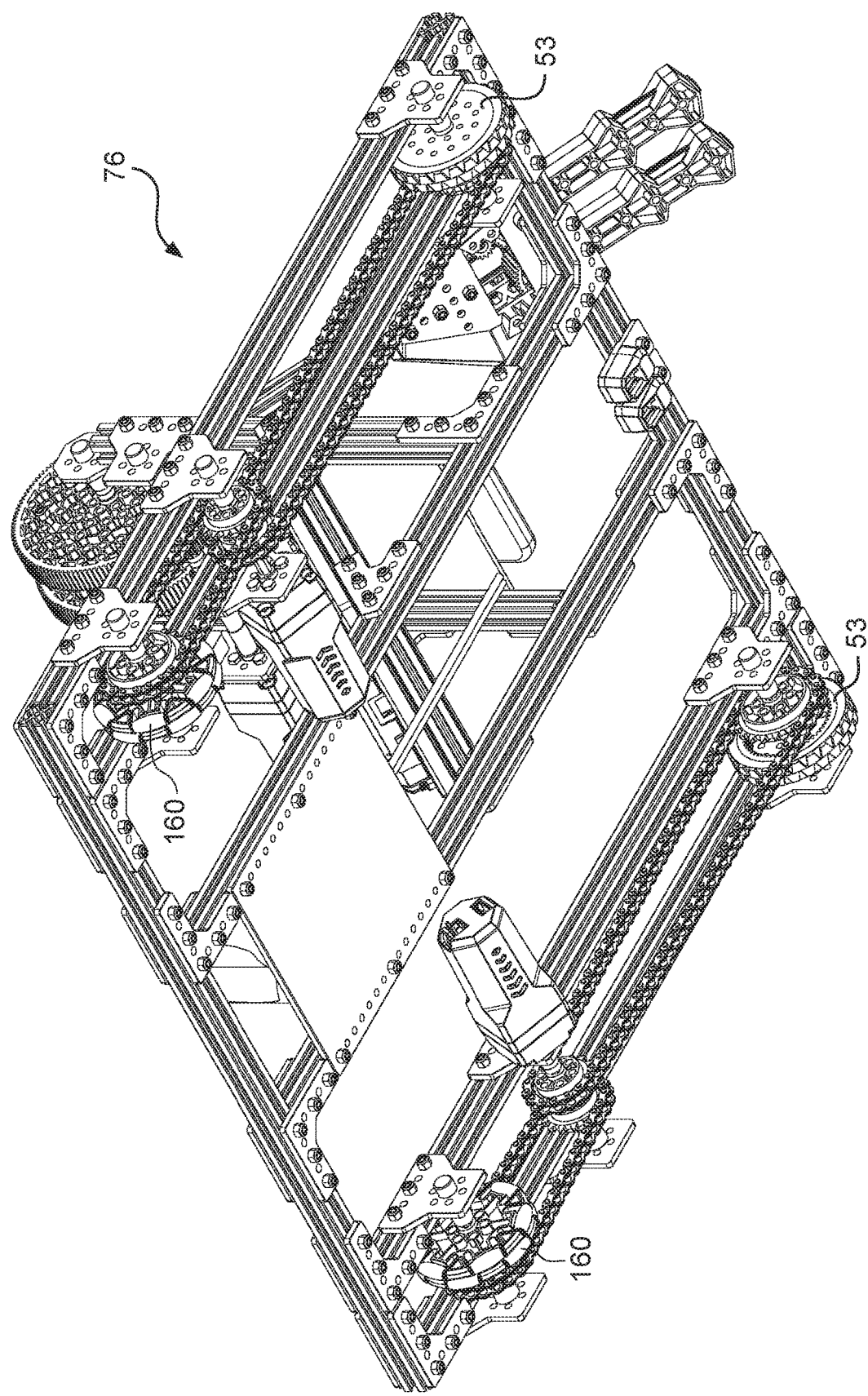
Figure 6A:
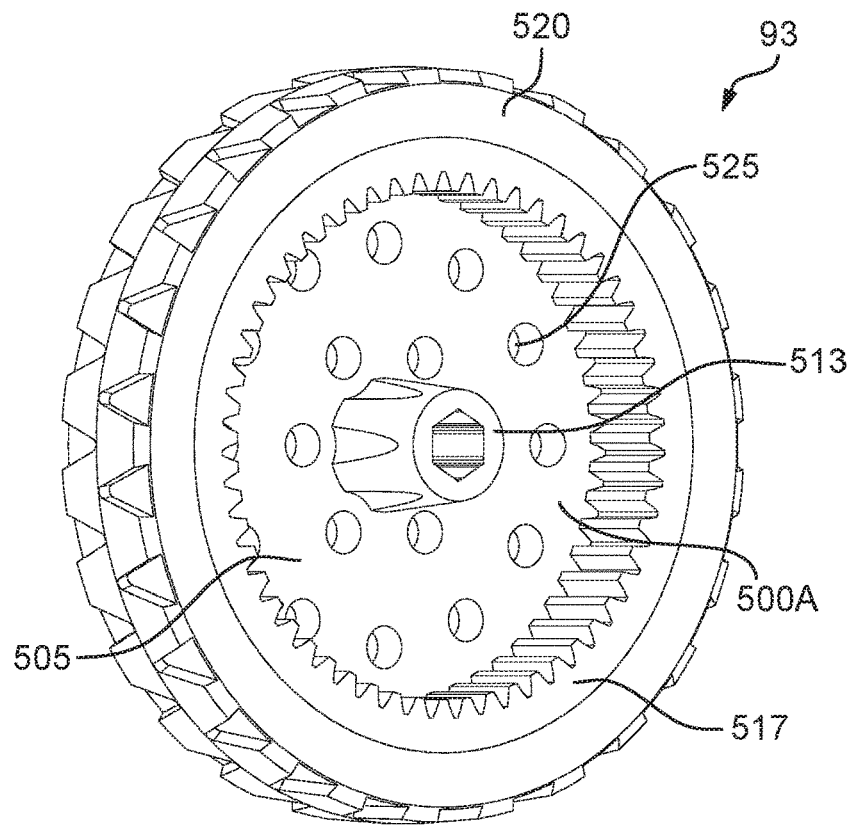
Figure 6B:
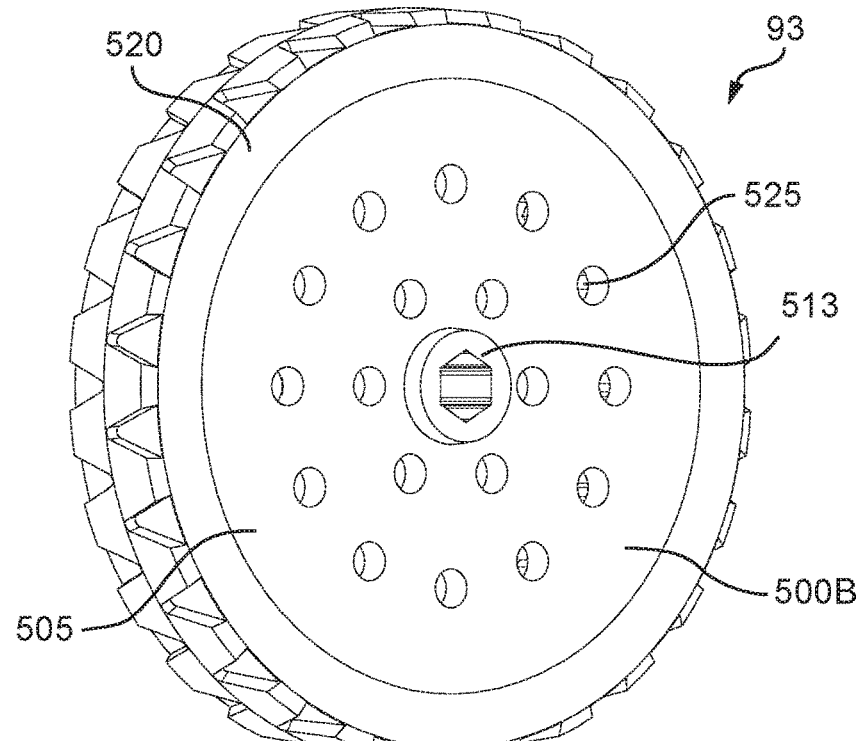

Referring now primarily to FIG. 6A, and FIG. 6B, a first configuration of traction wheel 93 (also shown in FIG. 3 and FIG. 4). Electro-mechanical agent first example configuration 75 (FIG. 3) can comprise at least one traction wheel 93 to provide a mobility feature to electro-mechanical agent first example configuration 75 (FIG. 3). Some configurations of Electro-mechanical agent first example configuration 75 (FIG. 3) can provide a similar and/or dissimilar module/s for mobilizing electro-mechanical agent first example configuration 75 (FIG. 3). Besides contributing to mobilizing the electro-mechanical agent first example configuration 75 (FIG. 3), traction wheel/s 93 can also engage with operative module/s of electro-mechanical agent first example configuration 75 (FIG. 3) and can optionally participate in completion of assigned task/s. The number of traction wheels 93 on electro-mechanical agent first example configuration 75 (FIG. 3) can be governed by conditions such as, but not limited to, nature of the assigned task/s, desired dimensions and weight of electro-mechanical agent first example configuration 75 (FIG. 3), desired number of components of electro-mechanical agent first example configuration 75 (FIG. 3), extent of mobility and pace desired for electro-mechanical agent first example configuration 75 (FIG. 3) and/or the like. Traction wheel 93 can comprise hub portion 505 with a first face 500A and a second face 500B. An axle bearing 513 can be disposed substantially central to the hub portion 505 and can be configured to engage with a shaft (not shown) and/or one or more modules of the electro-mechanical agent 75. The traction wheel 93 can be engaged such that rotary motion of the traction wheel 93 is not hindered by its engagement with the electro-mechanical agent 75. The hub portion 505 can optionally provide at least one engagement hole 525. In some configurations, engagement hole/s 525 can allow the traction wheel 93 to engage with components such as, but not limited to, one or more brackets, one or more sprockets and/or any other modules of the construction kit or extension modules external to construction kit. The traction wheel 93 can further comprise a rim portion 517. The rim portion 517 that can be captured by a tire 520.

Referring now to FIG. 6C that depicts an exploded view of traction wheel 93. Traction wheel 93 can be, but not limited to being a multi-part component. Traction wheel 93 can include wheel frame 521 captured in tire 520. Rim portion 517 of wheel frame 521 can comprise first surface 517(a) and second surface 517(b). First surface 517(a) can be configured to substantially face away from axle bearing 513 while second surface 517(b) can be configured to substantially face towards axle bearing 513. Wheel frame 521 can engage with tire 520 such that tire 520 can substantially wrap around first surface 517(a) of rim portion 517. Tire 520 can further comprise mating surface 520B and treaded surface 520A. Mating surface 520B can include a plurality of receptacles 535 which can be configured to receive corresponding raised segments 545 on wheel frame 521 to allow engagement of rim portion 517 with mating surface 520B. Raised segments 545 can further comprise stem region 545A and roof region 545B. Engagement of rim portion 517 and mating surface 520B of tire 520 can be achieved by, for example, but not limited to, molding at least roof region 545B of raised segment 545 inside corresponding receptacle 535 of tire 520. Treaded surface 520A of tire 520 can be configured to cause maximum friction between traction wheel 93 and a surface (not shown) on which traction wheel 93 can operate.

Referring now to FIG. 6D to FIG. 6G that collectively depict a first configuration of omni-directional wheel 550. FIG. 6D to FIG. 6G can be discussed with reference to FIG. 5 and FIG. 6 which depict electro-mechanical agent second example configuration 76 (FIG. 5) with at least one of the many configurations of omni-directional wheel 160 (FIG. 5 and FIG. 6). Omni-directional wheel 550 can provide omni-directional mobility or a omni-directional drive feature to electro-mechanical agent second example configuration 76 (FIG. 5). Considering a pre-determined position of omni-directional wheels 550 on electro-mechanical agent second example configuration 76 (FIG. 5), but not limited by this placement, electro-mechanical agent second example configuration 76 (FIG. 5) can be configured to move side to side and/or maneuver diagonally without changing direction of omni-directional wheels 550. A single electro-mechanical agent second example configuration 76 (FIG. 5) can comprise one or more omni-directional wheels 550. In some configurations, for example, but not limited to, FIG. 5, electro-mechanical agent second example configuration 76 (FIG. 5) can comprise a combination of traction wheel/s 93 (FIG. 6A to FIG. 6C) and omni-directional wheel/s 550 as mobility modules. In some configurations, all mobility modules on electro-mechanical agent second example configuration 76 (FIG. 5) can be either traction wheels 93 or omni-directional wheels 550. Disposition of omni-directional wheel 550 on electro-mechanical agent second example configuration 76 (FIG. 5) can be user preferred to configure the electro-mechanical agent second example configuration 76 (FIG. 5) in completing and/or contributing towards the assigned task/s. A first configuration of omni-directional wheel 550 can comprise at least one support plate 566 with a hub or core segment 565. Omni-directional wheel 550 can comprise a higher degree of freedom in motion by virtue of components such as, but not limited to, at least one roller 555 configured to engage with at least one support plate 566. Roller/s 555 can be engaged such that roller axis 553, about which roller 555 rotates, can be disposed substantially perpendicular to a omni-directional wheel axis 551 (FIG. 6D), about which omni-directional wheel 550 rotates. Roller/s 555 can be optionally and/or concurrently disposed tangential to circumference of the omni-directional wheel 550. Consequently, the omni-directional wheel 550 can cause a forward and/or backward drive, perpendicular to the axis 551, as in a traction wheel 93 (FIG. 6A to FIG. 6C). Additionally, the omni-directional wheel 550 can move side-ward and/or diagonally along roll surface of rollers 555, in a direction substantially parallel to omni-directional wheel axis 551.

Figure 6D:
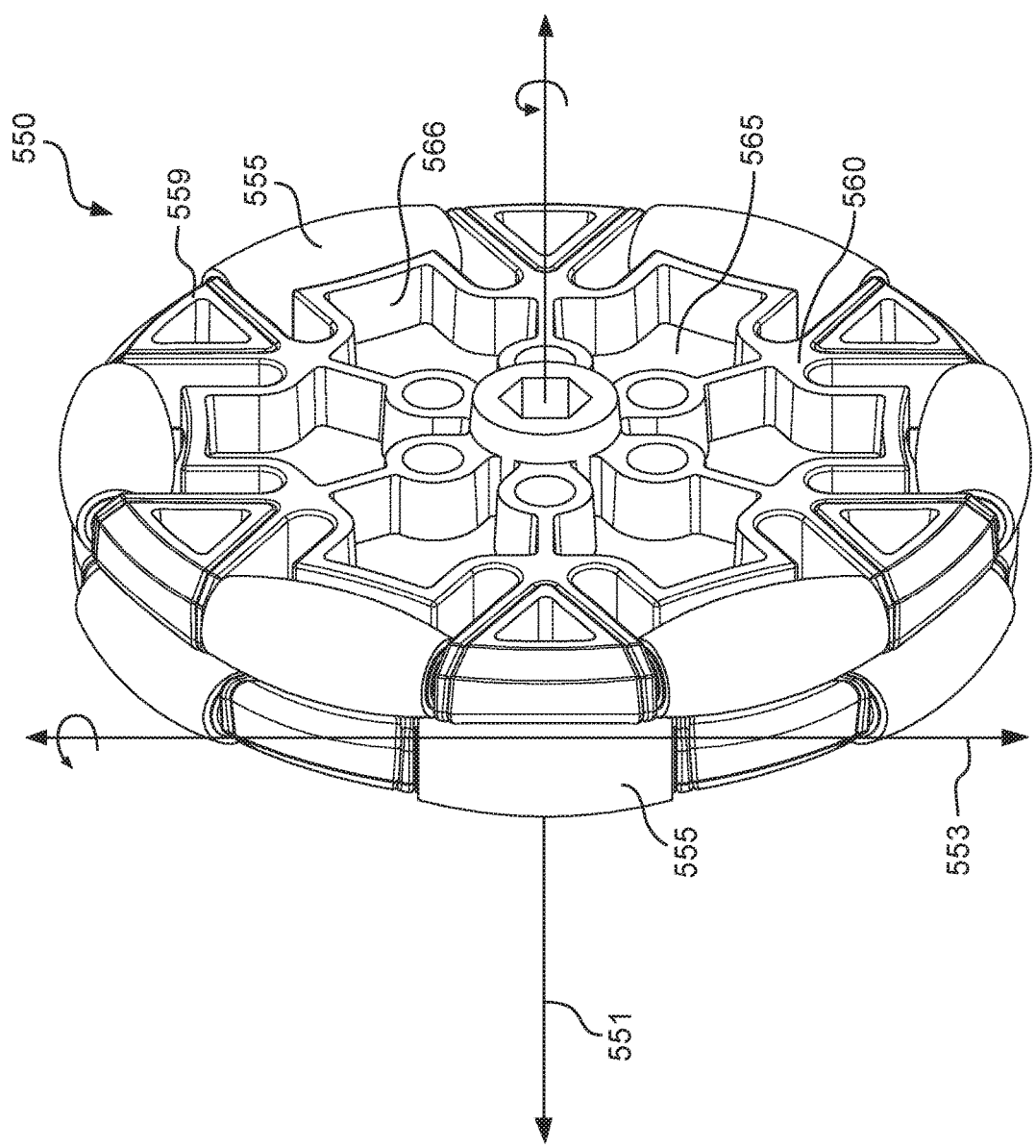
FIGS. 6D-6U are schematic diagrams of omni-directional wheels of the present teachings.
Figure 6E:
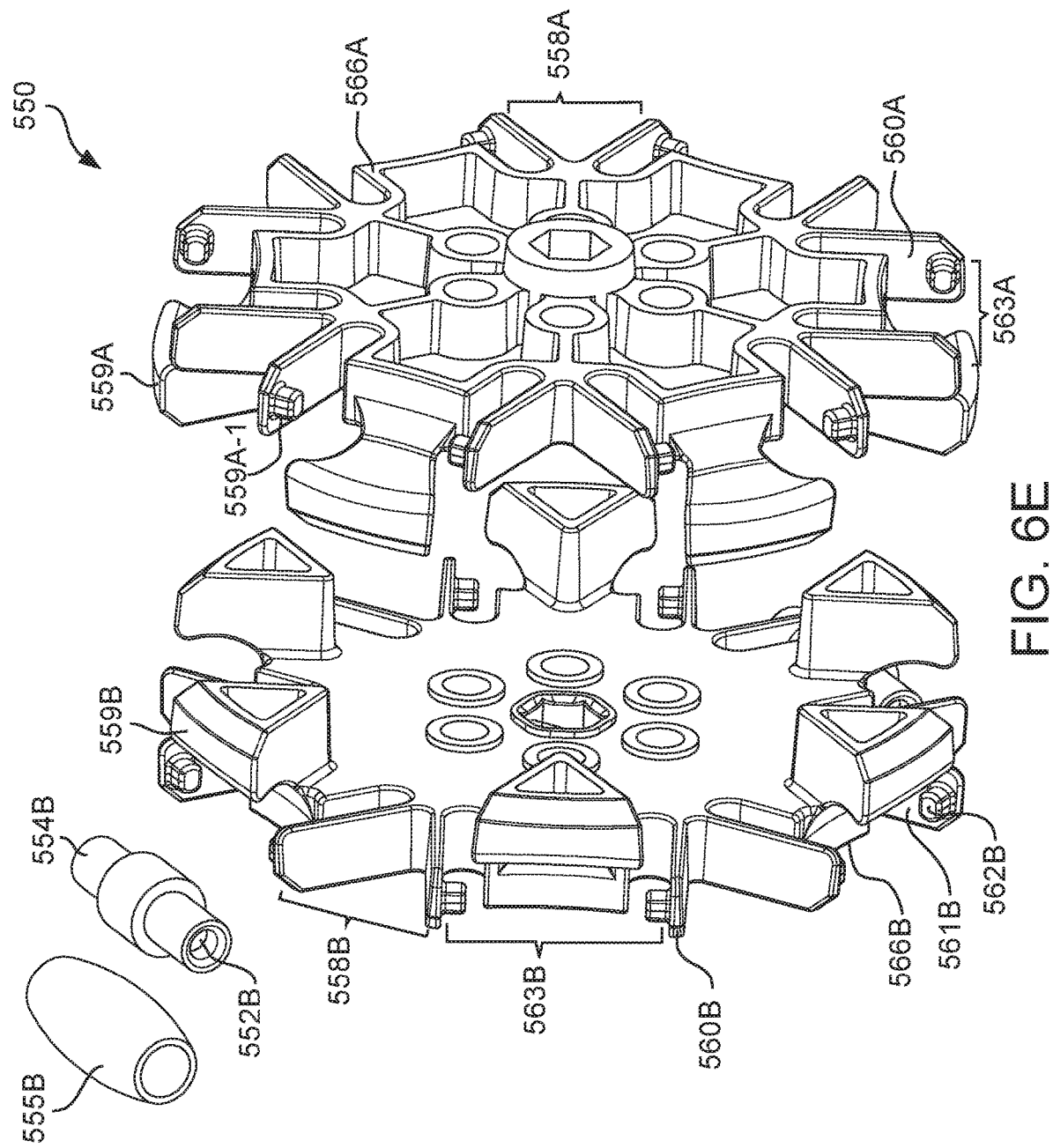

Continuing to refer to FIG. 6D to FIG. 6G, a plurality of rollers 555 can be disposed on at least one support plate 566 (FIG. 6D) such that rotary motion of one of the plurality of rollers 555 can stay uninterrupted by the rotary motion of one or more neighboring rollers 555. In some configurations, plurality of rollers 555 can be circumferentially arranged around single support plate 566 (FIG. 6D) to form a substantially uniform circular periphery. Present teachings of the disclosure illustrate a configuration of the omni-directional wheel 550 that can comprise first support plate 566A (FIG. 6E) and a second support plate 566B (FIG. 6E). First support plate 566A (FIG. 6E) and second support plate 566B (FIG. 6E) can come together to position their respective rollers, belonging to first support plate 566A (FIG. 6E) and rollers 555B (FIG. 6E), belonging to second support plate 566B (FIG. 6E), in an offset arrangement. In some configurations, omni-directional wheel 550 can include a continuous circular periphery. Support plate 566A (FIG. 6E) and 566B (FIG. 6E) can further provide a plurality of flexible pillars 560A (FIG. 6E) and 560B (FIG. 6E), respectively. Flexible pillars 560 (FIG. 6D) can be configured to detain at least one roller 555 (FIG. 6D) there between, such that detained roller 555 (FIG. 6D) can uninterruptedly perform its desired function during operation of omni-directional wheel 550. Pin 559A-1 (FIG. 6E) can include a flattened area to prevent a flash from interfering with rotation.

Figure 6F:
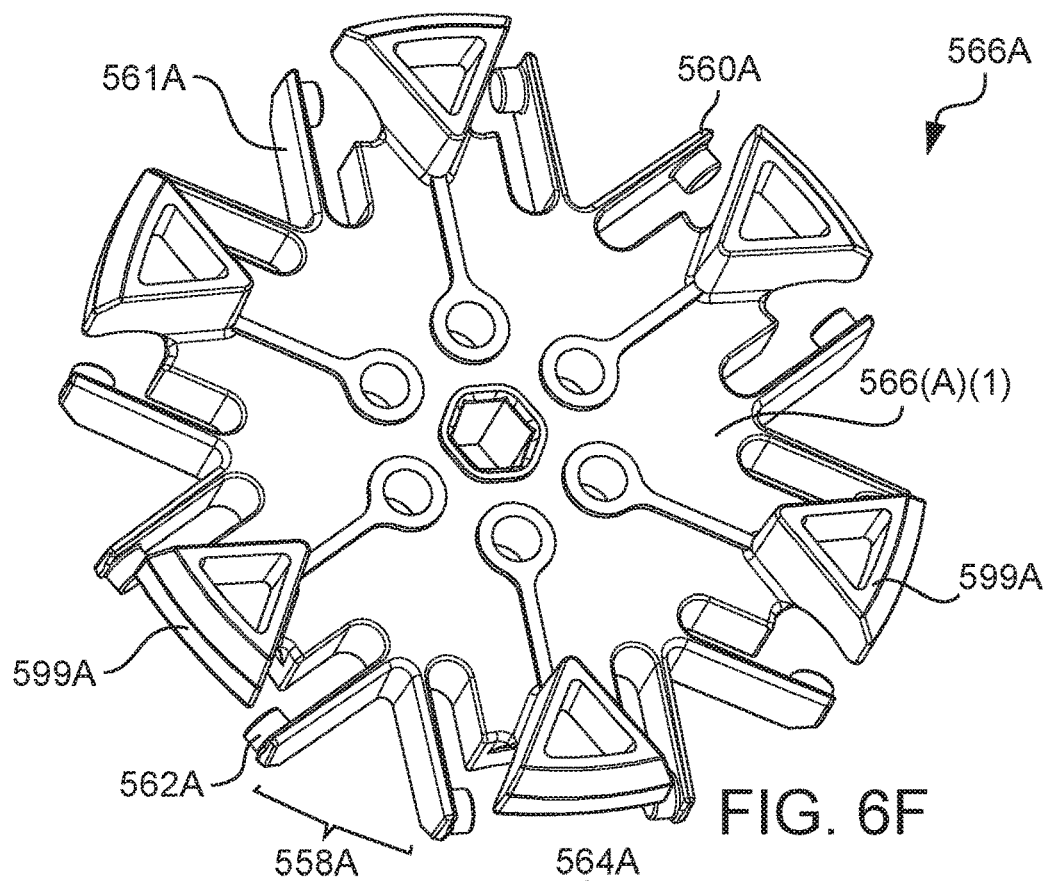
Figure 6G:
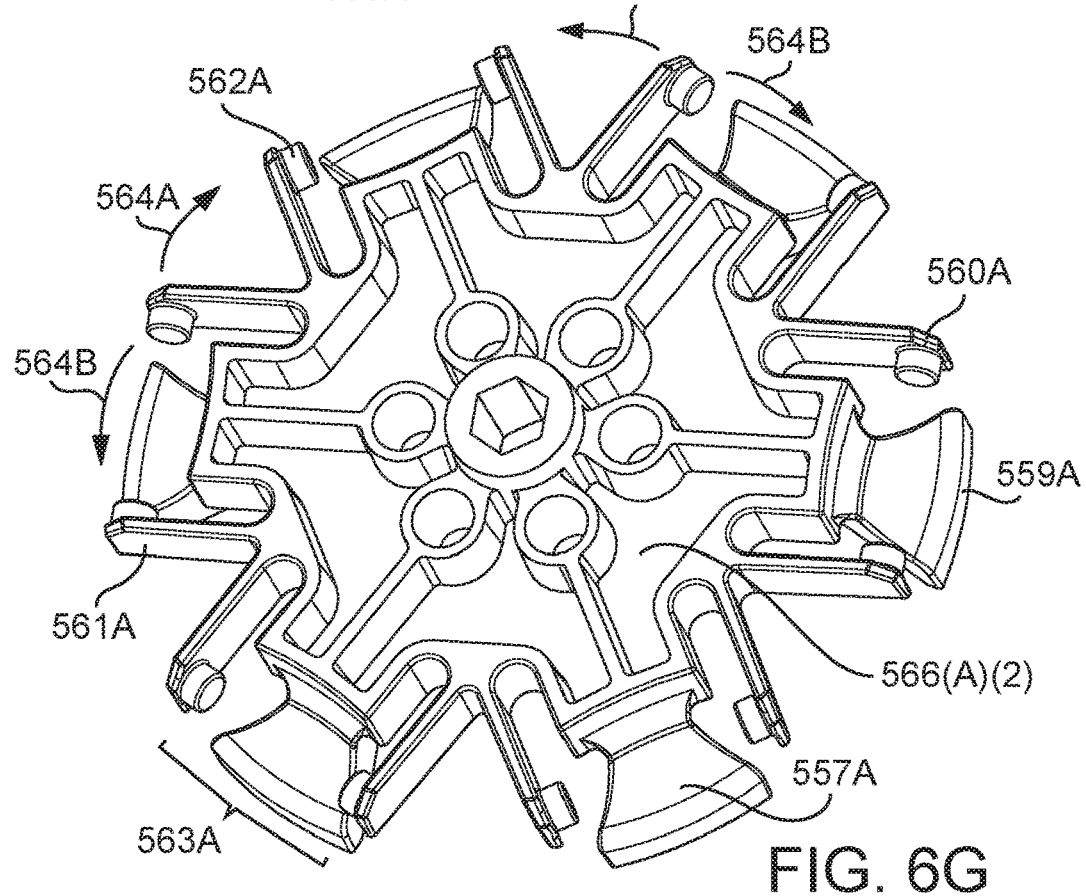
Figure 61:
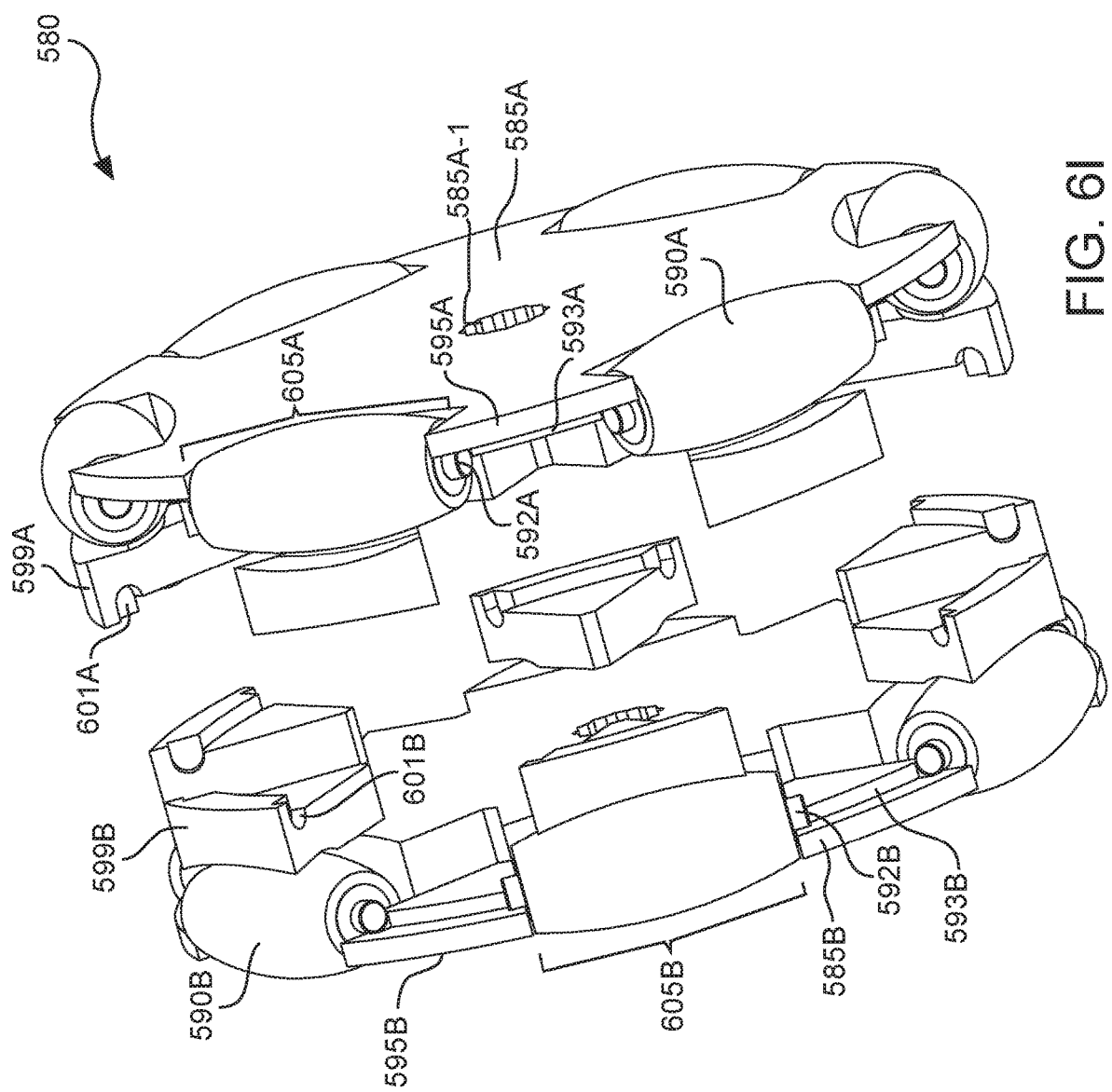

Referring now primarily to FIG. 6F and FIG. 6G, first support plate 566A can include co-operating surface 566(A)(1) (FIG. 6F) and an opposing surface 566(A)(2) (FIG. 6G). Although the following discussion can pertain to first support plate 566A, the discussed features and/or additional features can also be provided by second support plate 566B (FIG. 6E) and/or any subsequent support plates 566 (FIG. 6D). A plurality of flexible pillars 560A can be configured to detain at least one roller 555A (FIG. 6E). The flexible pillars 560A can further provide tower structure 561A and node feature 562A, such that tower structure 561A can extend away from support plate 566A and node feature 562A can be disposed at a terminal end of tower structure 561A. In some configurations, flexible pillars 560A can be configured to, for example, but not limited to, flex in direction 564A (FIG. 6G) or 564B (FIG. 6G). A flexing of flexible pillars 560A can allow an entry of roller 555 (FIG. 6D) in roller space 563A (FIG. 6G). Roller 555 (FIG. 6D) can be detained in roller space 563A (FIG. 6G) by substantially engaging node features 562A of neighboring flexible pillars 560A and can be captured therebetween. At least one support plate 566 (FIG. 6D) can further comprise brace member 559 (FIG. 6G), optionally extending from support plate 566 (FIG. 6D). Brace member 559 (FIG. 6G), can be provided to guard roller space 563 such that a brace wall 557 can face the detained roller 555 (FIG. 6D) and can substantially forbid roller 555 (FIG. 6D) to escape. Brace member 559A of a first support plate 566A, can be intended to raise away from roller space 563A and/or away from co-operating surface 566(A)(1). Support plate/s 566 (FIG. 6D) can further comprise a pre-determined distribution of roller space/s 563A/B (FIG. 6E) such that an interval can be maintained between adjacent rollers 555 (FIG. 6D). As a result, single support plate 566 (FIG. 6D) geometry can refrain from providing a continuous circular periphery to the omni-directional wheel 550.

Continuing to refer to FIG. 6D to FIG. 6G, wherein FIG. 6E depicts a partial explosion of omni-directional wheel 550 depicting a disassembly of first support plate 566A and second support plate 566B. FIG. 6E further depicts engagement of a corresponding roller 555B and roller bone 554B with second support plate 566B. Engagement of remaining of corresponding rollers 555B with second support plate 560B can be substantially similar. In some configurations, engagement of a plurality of rollers with first support plate 560A can be substantially similar to engagement between second support plate 560B and its respective roller/s 555B. In order to provide a continuous periphery to omni-directional wheel 550 and convenience in performing rotary motion of wheel 550 and/or roller/s 555 (FIG. 6D), first supporting plate 566A can mate with second supporting plate 566B such that brace member/s 559A of first supporting plate 566A can be accepted in corresponding interval/s 558B of second supporting plate 566B and vice versa, which can result into a compact omni-directional wheel 550 (FIG. 6D). As a result, single support plate 566 (FIG. 6D) of a completely assembled omni-directional wheel 550 can comprise at least two variations of brace members 559 (FIG. 6D) that can be structurally similar. In some configurations, brace member 559A can extend from first support plate 566A. In some configurations, brace member 559B can be a part of to second support plate 566B. Brace members 559A and 559B can be primarily responsible for engagement of support plates 566A and 566B. Brace member 559A of support plate 566A can contribute in engaging first support plate 566A with second support plate 566B by filling in interval/s 558B that can be provided on second support plate 566B, possibly causing brace member 559A to substantially restrict flex motion of flexible pillars 560B, possibly forming interval/s 558B on second support plate 566B. In some configurations, brace member 559B can assist in engagement of second support plate 566B and first support plate 566A by filing in interval/s 558A that can be provided on support plate 566A. Brace member 559B can also cause restriction in flexing of flexible pillars 555A that can form interval 558A on first support plate 566A. In some configurations, roller 555 (FIG. 6D) and roller bone 554B (FIG. 6E) can be molded together and can rotate together. Second support plate 566B can comprise a plurality of roller/s 555B and corresponding roller bone 554B. Roller/s and corresponding roller bone/s can also be provided by first support plate 566A (FIG. 6E). Roller 555 (FIG. 6D) can be substantially detained in roller space 563A/B (FIG. 6G) by way of, but not limited to, engagement with neighboring flexible pillars 560A/B (FIG. 6E). Such detainment of roller/s 555 (FIG. 6D) can be caused by trapping node features 562A/B (FIG. 6F/E) of flexible pillars 560 (FIG. 6D) into substantially matching node receptacles 552B (FIG. 6E) that can be provided on roller bone 554B (FIG. 6E). Roller 555 (FIG. 6D) and roller bone 554 (FIG. 6E) can be configured to rotate node features 562A/B (FIG. 6E). In some configurations, roller 555B (FIG. 6E) of second support plate 566B (FIG. 6E) and roller bone 554B (FIG. 6E) can rotate while being trapped between flexible pillars 560B (FIG. 6E). Roller 555B (FIG. 6E) can be trapped between flexible pillars 560B (FIG. 6E), by way of receiving node features 562B (FIG. 6E) into node receptacles 552B (FIG. 6E) of roller bone 554B (FIG. 6E).

Referring now to FIG. 6H to FIG. 6M, omni-directional wheel second configuration 580 can be configured to rotate about wheel axis 587 (FIG. 6H) for performing a rotational motion. A higher degree of freedom of rotation can be possessed by omni-directional wheel 580 by means of, but not limited to, roller/s 590 (FIG. 6H) that can be configured to rotate about roller axis 589 (FIG. 6H). Roller axis 589 (FIG. 6H) can be disposed substantially perpendicular to wheel axis 587 (FIG. 6H). At least one support plate 585 (FIG. 6H) can be provided on omni-directional wheel 580 such that at least one support plate 585 (FIG. 6H) can be disposed substantially perpendicular to wheel axis 587 (FIG. 6H) and can contribute in forming a frame of omni-directional wheel 580. At least one peripheral feature 595 (FIG. 6H) can be disposed along a circumference of support plate 585 (FIG. 6H). Support plate 585 (FIG. 6H) can provide brace members 599 (FIG. 6H) that can be configured to form roller space 605 (FIG. 6H) collectively with at least one peripheral feature 595 (FIG. 6H). At least one roller 590 (FIG. 6H) can be received into a corresponding roller space 605 (FIG. 6H) such that at least one roller 590 (FIG. 6H) can freely rotate therein during operation of omni-directional wheel 580. Omni-directional wheel second configuration 580 can comprise first support plate 585A (FIG. 6I) and second support plate 585B (FIG. 6I), that can together form a frame for omni-directional wheel 580. Each of support plates 585A (FIG. 6I) and 585B (FIG. 6I) can contribute in formation and/or operating of omni-directional wheel 580. First support plate 585A (FIG. 6I) can comprise a plurality of corresponding roller/s 590A (FIG. 6I) that can be received by corresponding roller space 605A (FIG. 6I). A plurality of peripheral members 595A (FIG. 6I) can be provided along a circumference of first support plate 585A (FIG. 6I). These peripheral members 595A (FIG. 6I), along with a plurality of brace members 599A (FIG. 6I) can provide at least one roller space 605A (FIG. 6I). Second support plate 595A (FIG. 6I) can comprise a plurality of corresponding roller/s 590B (FIG. 6I) that can be received by corresponding roller space 605B (FIG. 6I). A plurality of peripheral members 595B (FIG. 6I) can be provided, for example, but not limited to, along a circumference of first support plate 585B (FIG. 6I). At least one roller space 605B (FIG. 6I) can be provided by peripheral members 595B (FIG. 6I) and a plurality of brace members 599B (FIG. 6I). Double hex star cavity 585A-1 can enable both halves of wheel second configuration 580 to be manufactured in the same way.

Figure 6J:
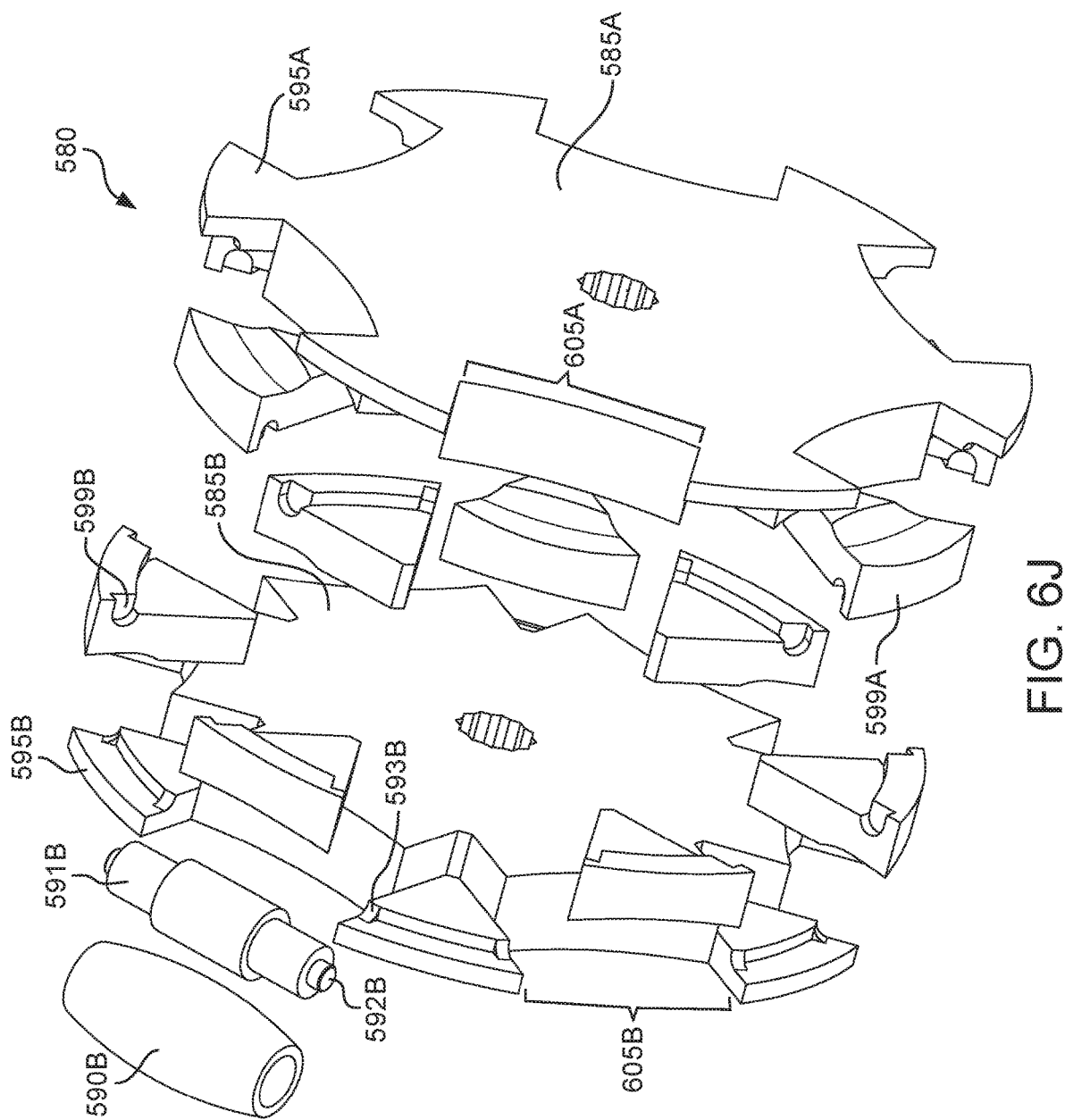

Referring now primarily to FIG. 6J to FIG. 6M, that collectively illustrate mating of first support plate 585A with second support plate 585B along with engagement of roller/s 590 with their respective support plates 585 (FIG. 6H). FIG. 6J depicts an exploded view of omni-directional wheel second configuration 580 and engagement of single roller 590B (FIG. 6J) with second support plate 585B. Other roller/s 590 (FIG. 6K) can be engaged in a substantially similar manner to single roller 590B (FIG. 6J). Roller 590B (FIG. 6J) can be configured to contain roller stem 591B (FIG. 6J), and together roller 590B (FIG. 6J) and roller stem 591B (FIG. 6J) can perform a rotational motion. Roller stem 591B (FIG. 6J) can be configured to engage roller 590B (FIG. 6J) with support plate 585B (FIG. 6J) such that roller 590B (FIG. 6J) and roller step 591B (FIG. J) can together perform rotational motion. At least one stem nub 592B (FIG. 6J) can be provided by roller stem 591B (FIG. 6J) to aid in engaging roller 590B (FIG. 6J) with support plate 585B (FIG. 6J).

Figure 6K:
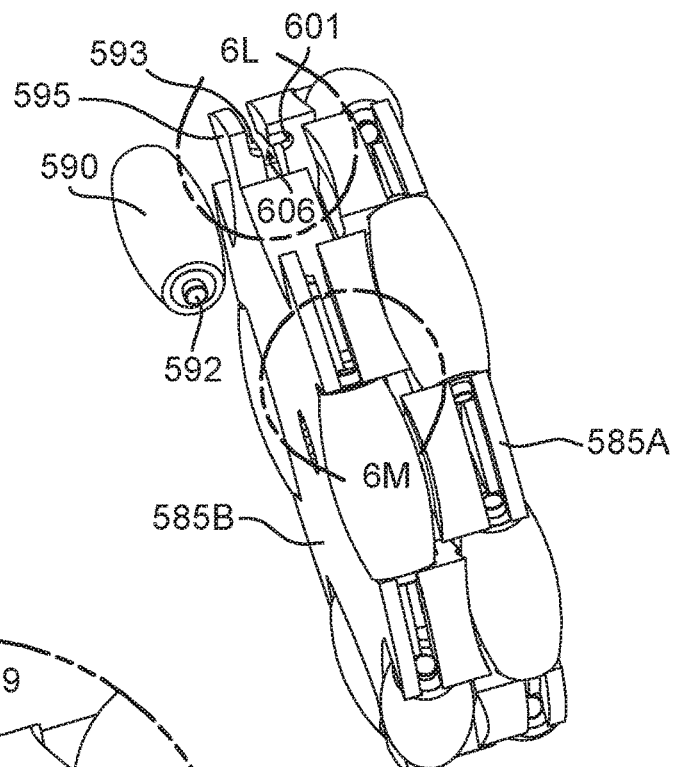
Figure 6L:
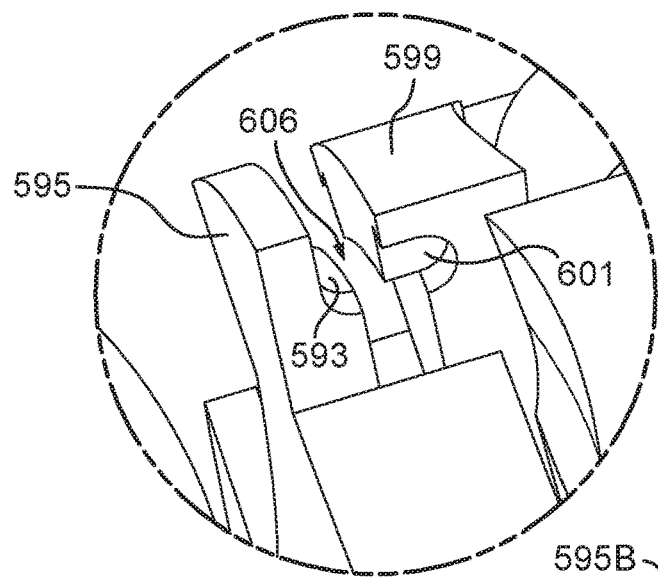

Referring now primarily to FIG. 6K, separation 606 can be configured between support plates 585A and 585B. Peripheral features 595 of support plates 585A/B can provide crate 593 that can be configured to receive stem nubs 592 therein. In some configurations, stem nubs 592 of roller 590 can be received in crates 593 of peripheral features 595 and can cause roller 590 to settle in roller space 605A/B (FIG. 6J).

Referring now to FIG. 6J, because sides 585A and 585B are assembled with an angular misalignment, hold 585A-1 (FIG. 6I) can be patterned such that a hex shaft would fit through side 585A but not through side 585B when the two sides are connected. Different part designs can be used to overcome the misalignment in which the design of side 585A can include a hex bore that is rotated 30° from the design of side 585B. The same plate can be used for both sides if a doubled-up hex bore is used. The doubled-up hex bore can be created by patterning a single hex bore in a 30° rotation. The resulting 12-pointed star is identical every 30° instead of 60° (a hex bore). Alternatively, a third common central hub piece could be used.

Referring now primarily to FIG. 6I, roller 590B, of second support plate 585B, can be disposed into roller space 605B by receiving nubs 592B into crate 593B that can be defined by adjacent peripheral members 595B. A similar disposition of roller 590A can be provided on first support plate 585A. Engagement of support plates 585 (FIG. 6H) can cause brace member 599 (FIG. 6L) of one of support plates 585 (FIG. 6J) to trap stem nubs 592 (FIG. 6K) of roller 590 (FIG. 6K) of an opposing support plate 585 (FIG. 6H). In some configurations, complementing crate 601 can be provided on incoming brace member 599 (FIG. 6L) of an opposing support plate 585 (FIG. 6H).

Referring now to FIG. 6K, complementing crate 601 of brace member 599 (FIG. 6L), of opposing support plate 585 (FIG. 6H), can form tunnel trap 606 with crate 593 which can be provided on peripheral member 595 of a support plate 585A/B that can receive opposing support plate 585A/B.

Figure 6M:
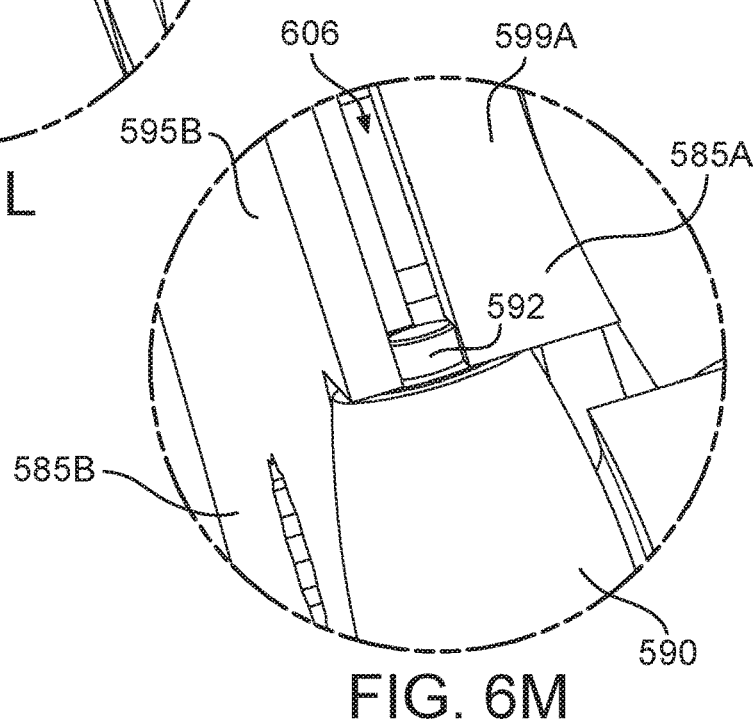

Referring now to FIG. 6M, first support plate 585A can mate with second support plate 585B such that peripheral member 595B of second support plate 585B can receive brace member 599A of first support plate 585A, possibly establishing mating of support plates 585A, 585B and trapping stem nub 592 in tunnel trap 606 that can be defined by engaging peripheral member 595B and brace member 599A. This geometry can be alternately repeated along a circumference of omni-directional wheel second configuration 580 (FIG. 6J) to provide a substantially continuous and smooth periphery to omni-directional wheel second configuration 580 (FIG. 6J). Omni-directional wheel second configuration 580 (FIG. 6J) can cause a forward and/or backward drive of electromechanical agent second example configuration 76 (FIG. 5). In some configurations, omni-directional wheel second configuration 580 (FIG. 6J) can provide a side-ward and/or diagonal drive to electromechanical agent first example configuration 75 (FIG. 4), in a direction substantially parallel to omni-directional wheel axis 551 (FIG. 6D). Presence of at least one omni-directional wheel second configuration 580 (FIG. 6J) on electro-mechanical agent second example configuration 76 (FIG. 5) can enable reduced-friction turns.

Referring now to FIG. 6N to 6U, electro-mechanical agent second configuration 76 (FIG. 5) can be configured to acquire an omni-directional drive by providing at least one mobility module such as, for example, but not limited to, omni-directional wheel third configuration 630. Omni-directional wheel third configuration 630 can provide motion in forward and backward directions, substantially similar to traction wheel 93 (FIG. 6A) and a motion in a side-ward or diagonal direction, the side-ward direction can be substantially perpendicular to frame 633 of omni-directional wheel third configuration 630. Omni-directional wheel third configuration 630 can comprise an omni-direction travel feature by virtue of components such as, but not limited to, at least one roller 655 that can be disposed peripherally about frame 633. Roller/s 655 can be arranged to provide a substantially continuous and uniform and/or even circumference to omni-directional wheel third configuration 630. Such disposition of roller/s 655 can provide uninterrupted operation of each roller 655 during operation of omni-directional wheel third configuration 630. Omni-directional wheel third configuration 630 can comprise first side 635 (FIG. 6N) and second side 637 (FIG. 6O). First side 635 (FIG. 6N) can be an engaging side of omni-directional wheel third configuration 630 such that first side 635 (FIG. 6J) can face a driving module attached to omni-directional wheel third configuration 630 by way of axle receiver 640. Axle receiver 640 can be configured to serve as one of many engaging means for attaching omni-directional wheel third configuration 630 with electro-mechanical agent second example configuration 76 (FIG. 5). In some configurations, omni-directional wheel third configuration 630 can be engaged with electro-mechanical agent first example configuration 75 (FIG. 4) by way of geared ring 645. Geared ring 645 can be annularly disposed on first side 635 (FIG. 6N) and/or second side 637 (FIG. 6O). Gear teeth 644 of geared ring 645 can be configured to mesh with an engaging module and/or a driving module that can comprise complementing geared teeth. Omni-directional wheel third configuration 630 can comprise an engaging means such as, for example, but not limited to, engagement aperture/s 660 (FIG. 6O). Engagement aperture/s 660 (FIG. 6O) can be configured to attach omni-directional wheel third configuration 630 to one or more modules by way of fasteners and/or inserts that can be received through apertures/s 660 (FIG. 6O) and retained therein.

Figure 6P:
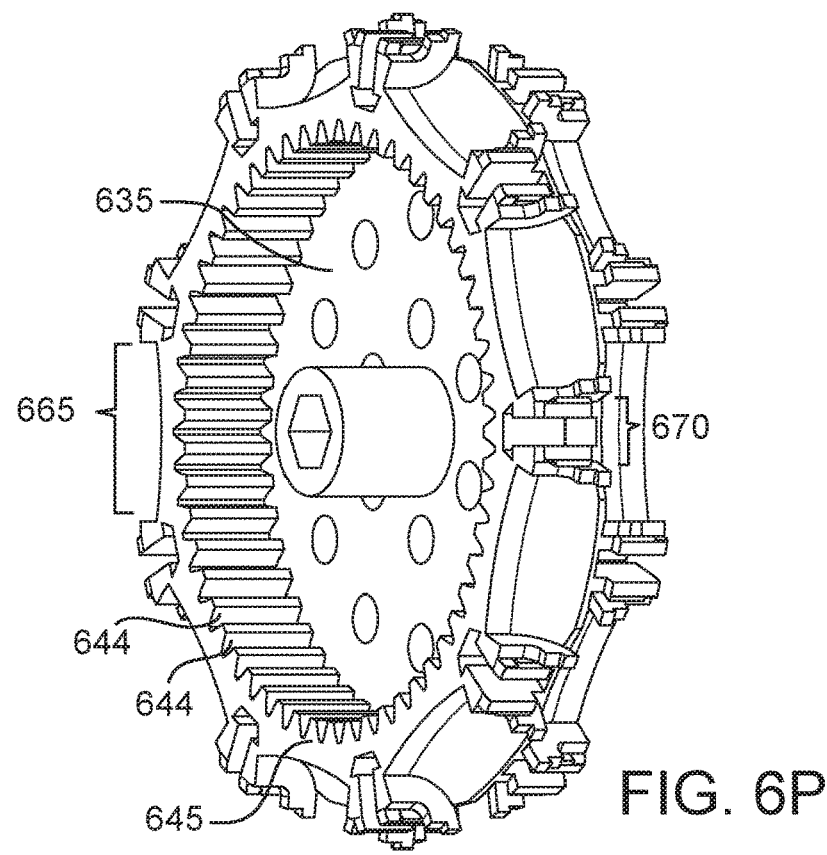
Figure 6Q:
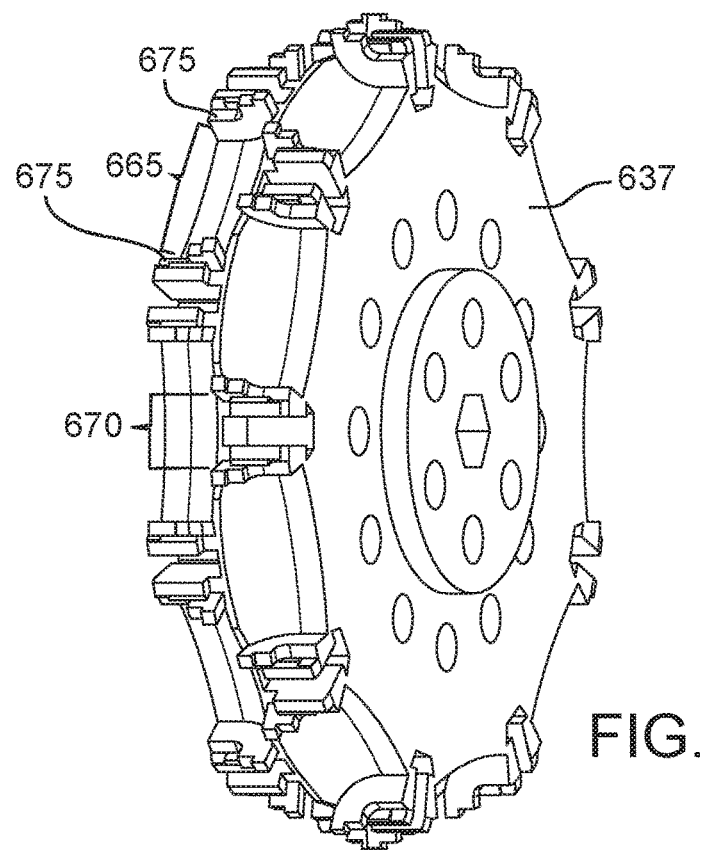
Figure 6R:
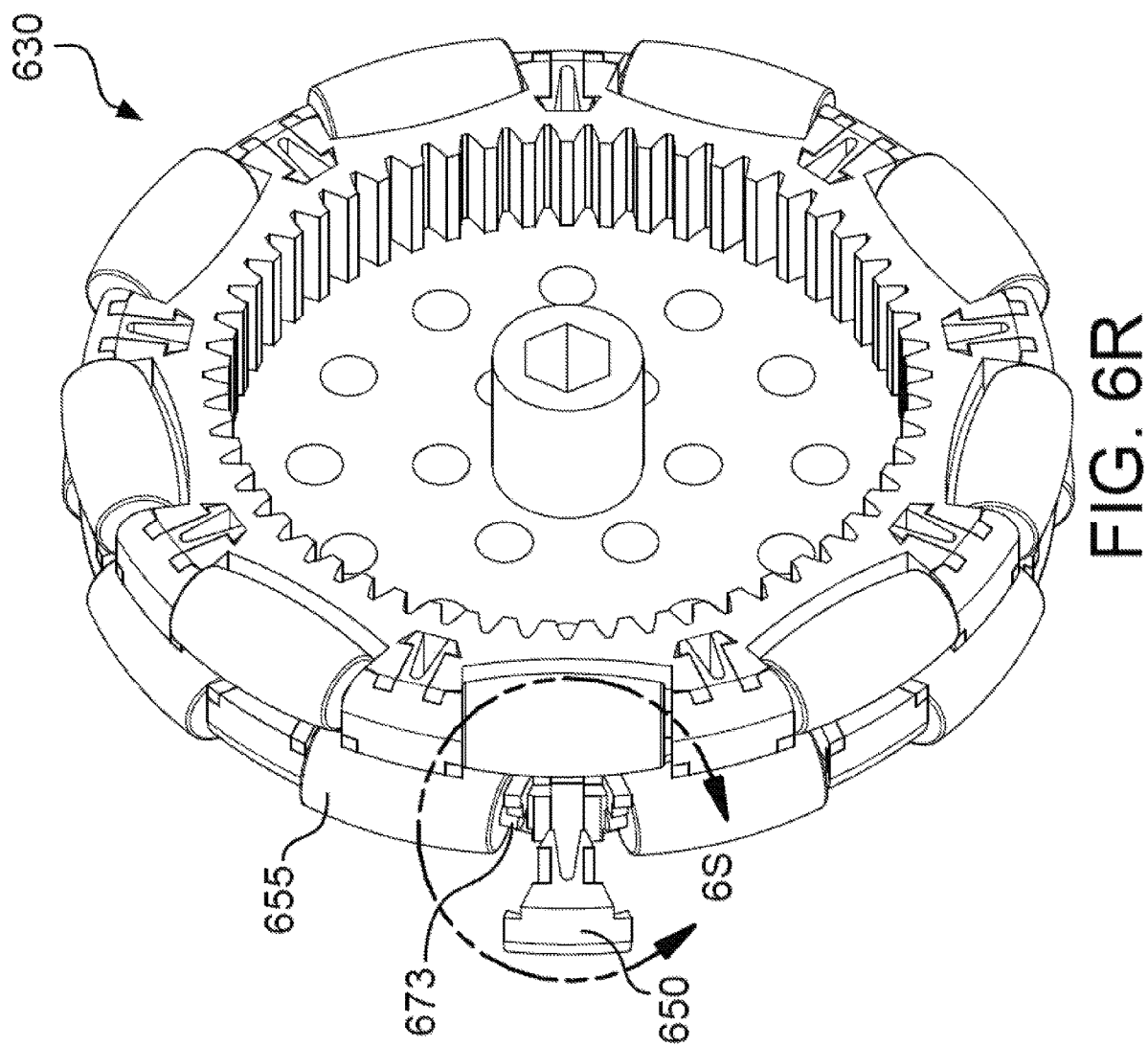
Figure 6S:
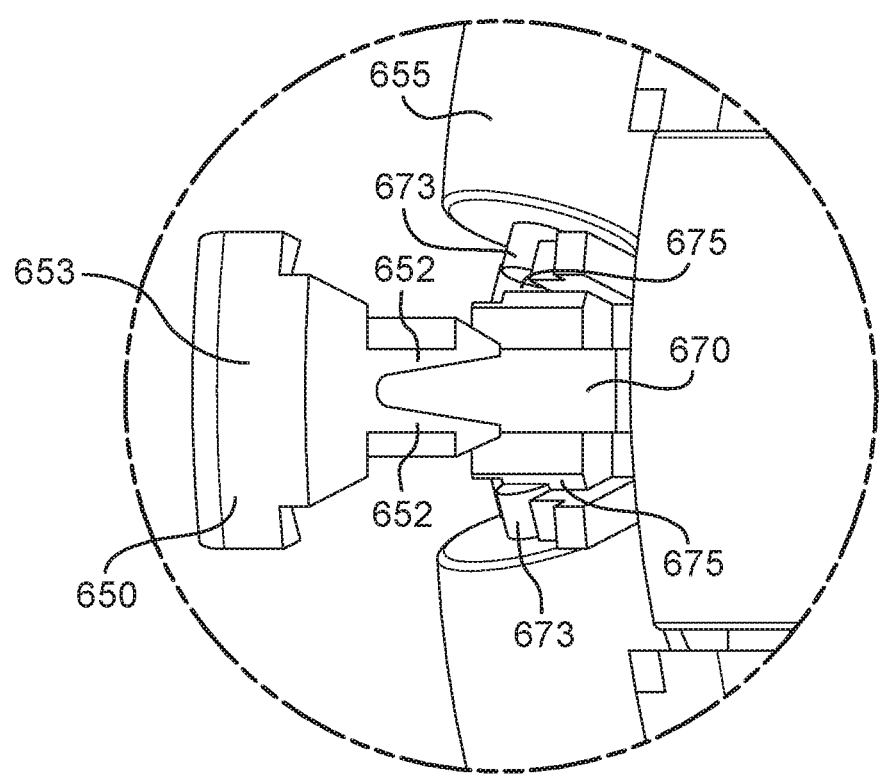

Referring now primarily to FIG. 6P to FIG. 6Q, first side 635 (FIG. 6P) and second side 637 (FIG. 6Q) of omni-directional wheel third configuration 630 (FIG. 6O) are depicted. Omni-directional wheel third configuration 630 (FIG. 6O) can comprise a plurality of roller pockets 665 that can be disposed substantially along a periphery of first side 635 (FIG. 6P) and periphery of second side 637 (FIG. 6Q). Pockets 665 can be distributed such that, on receiving roller/s 655 (FIG. 6O) in pockets 665, roller/s 655 (FIG. 6O) on first side 635 (FIG. 6P) can be offset with respect to roller/s 655 (FIG. 6O) that can be provided on second side 637 (FIG. 6Q). In some configurations, pockets 665 can be disposed to provide interval 670 between adjacent roller/s 655 (FIG. 6O), which can provide operational feasibility to received roller/s 655 (FIG. 6O) and can cause roller pocket 665 on one side, e.g. first side 635 (FIG. 6P), to face interval 670 between adjacent roller pocket/s 665, provided on, for example, second side 637 (FIG. 6Q), and vice versa.

Figure 6U:
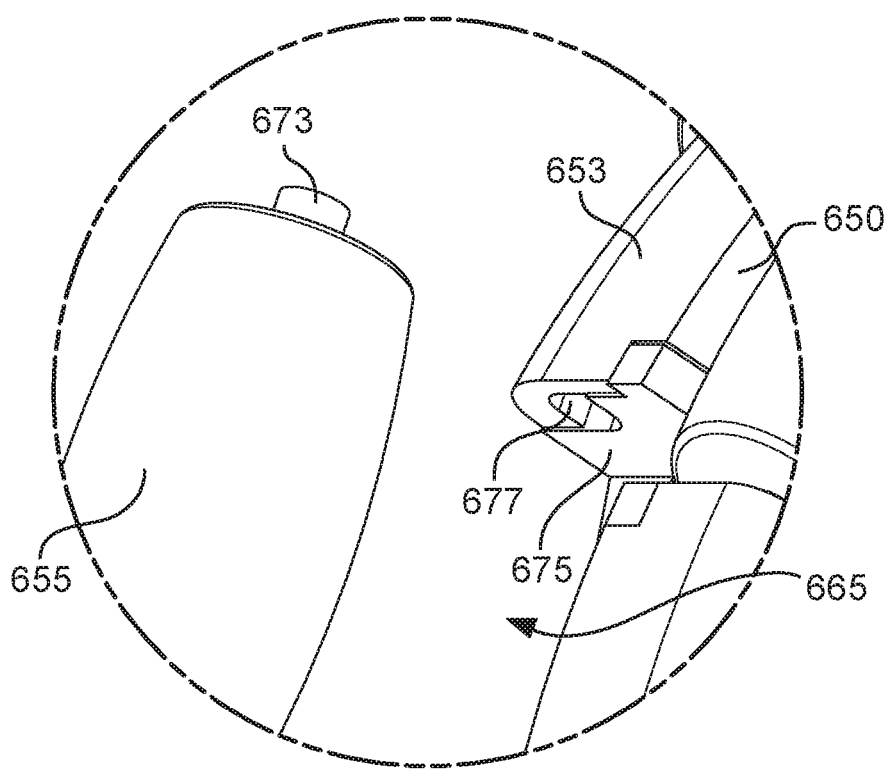
Figures 1, 6U:
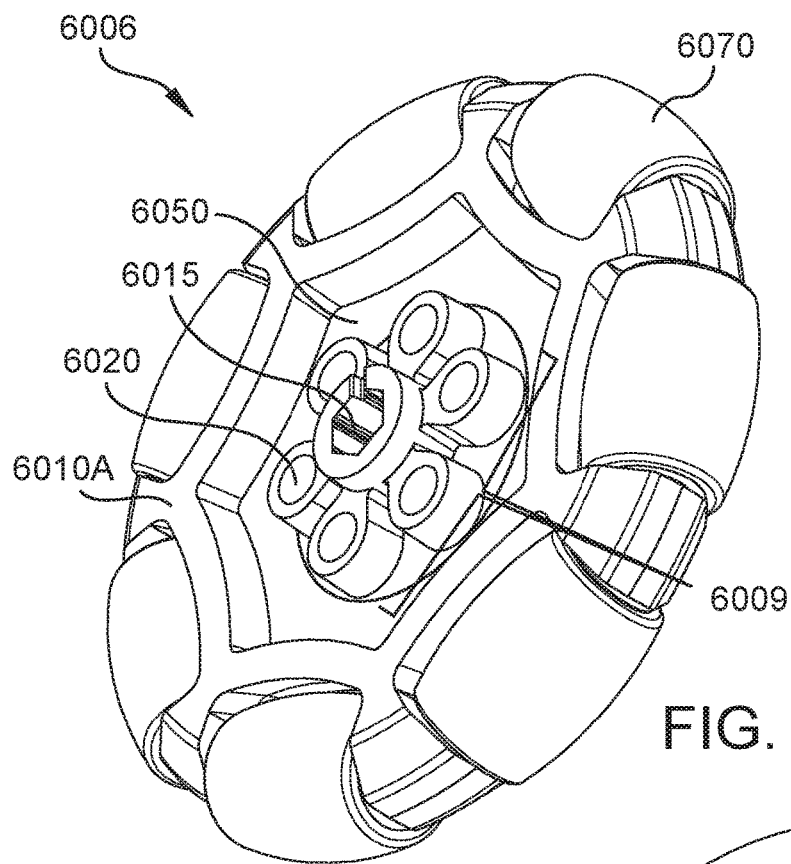
Figures 2, 6U:
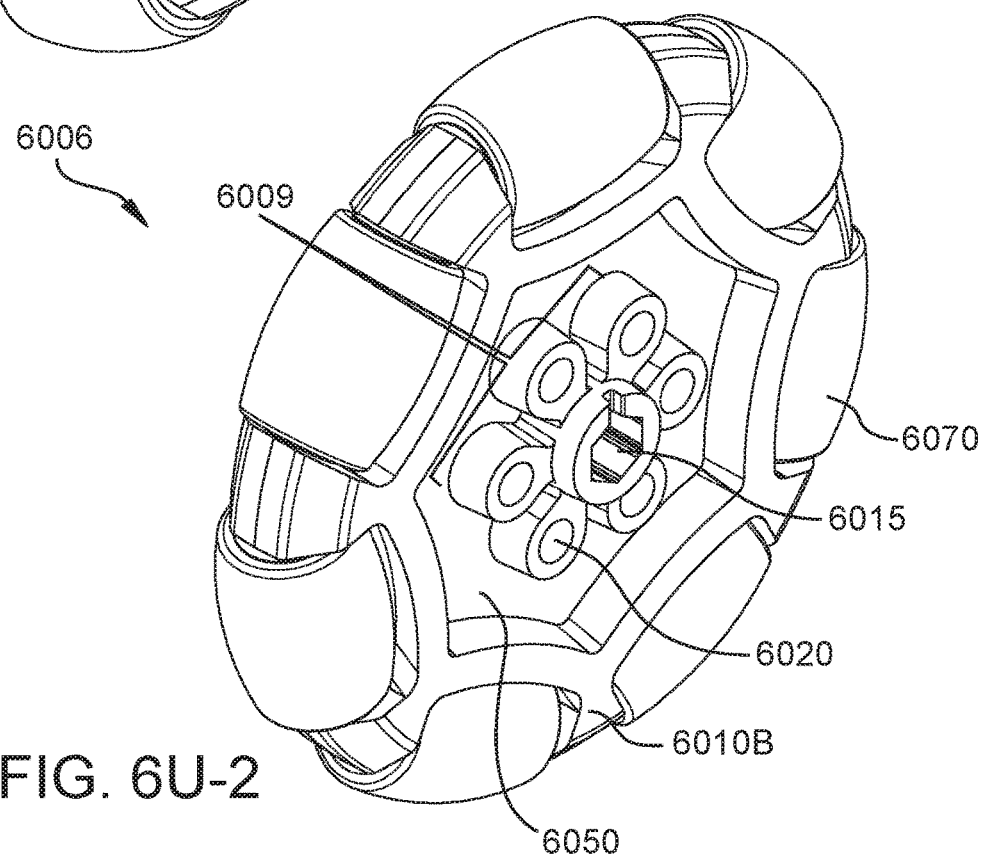
Figures 5, 6U:
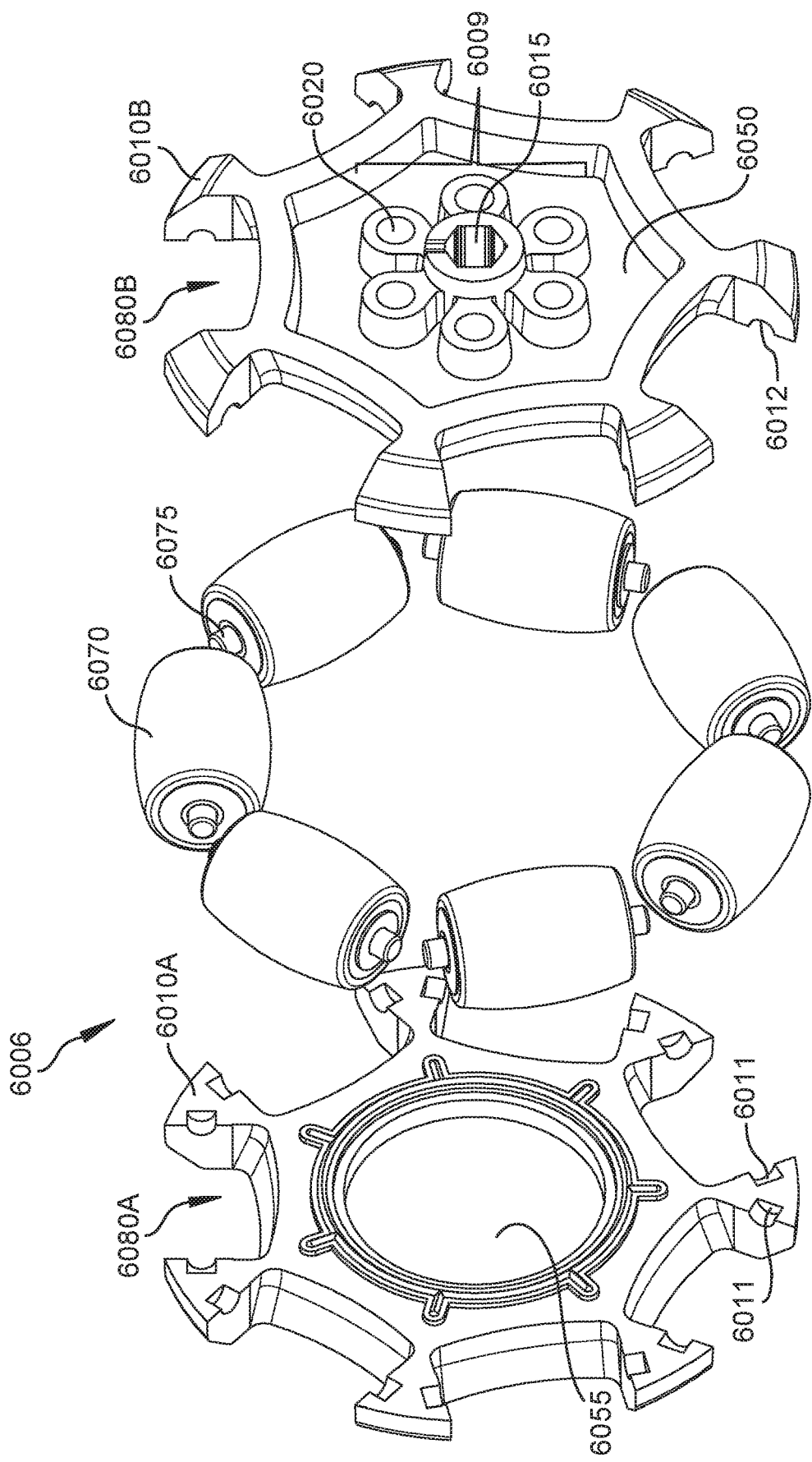
Figures 6, 6U:
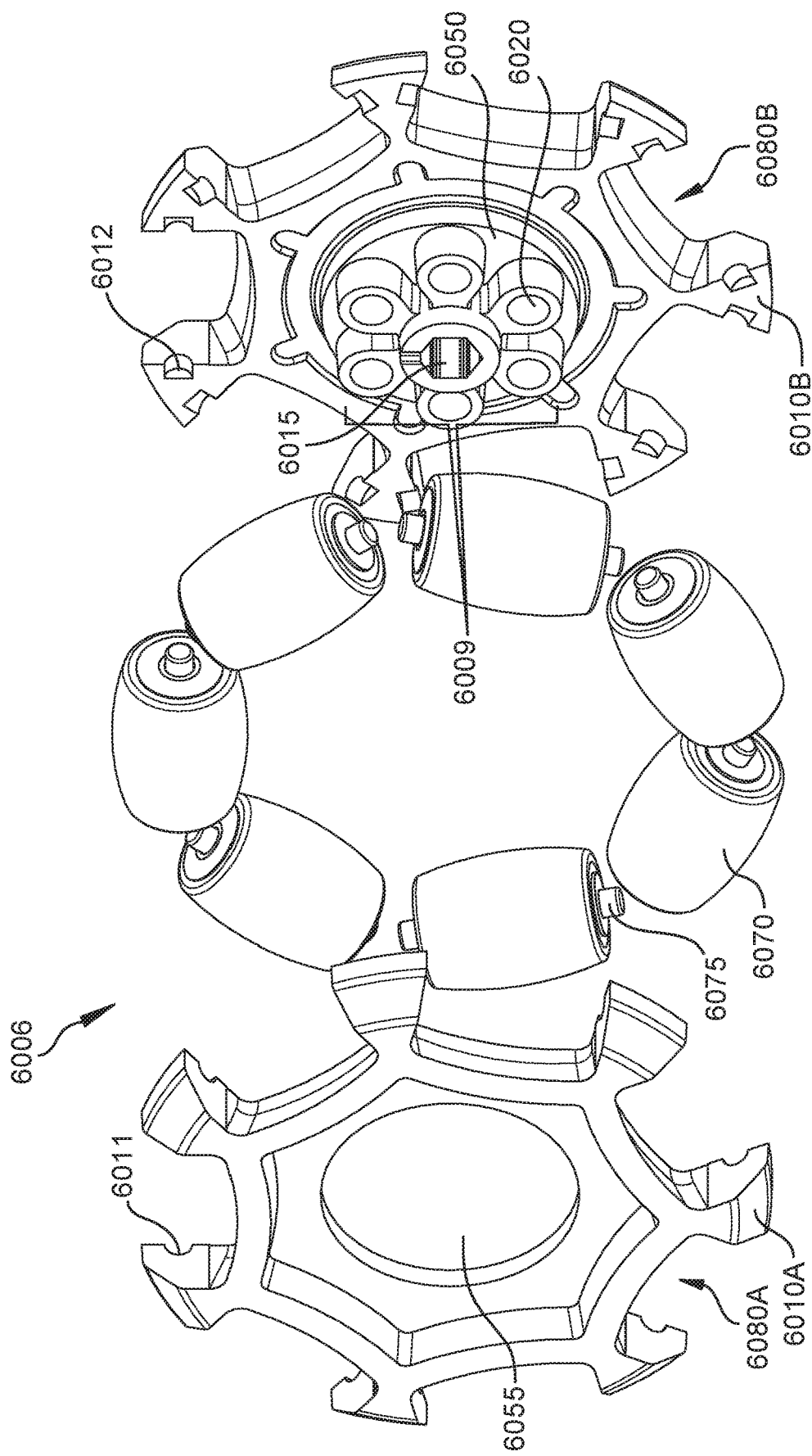
Figures 6, 6U, 7:
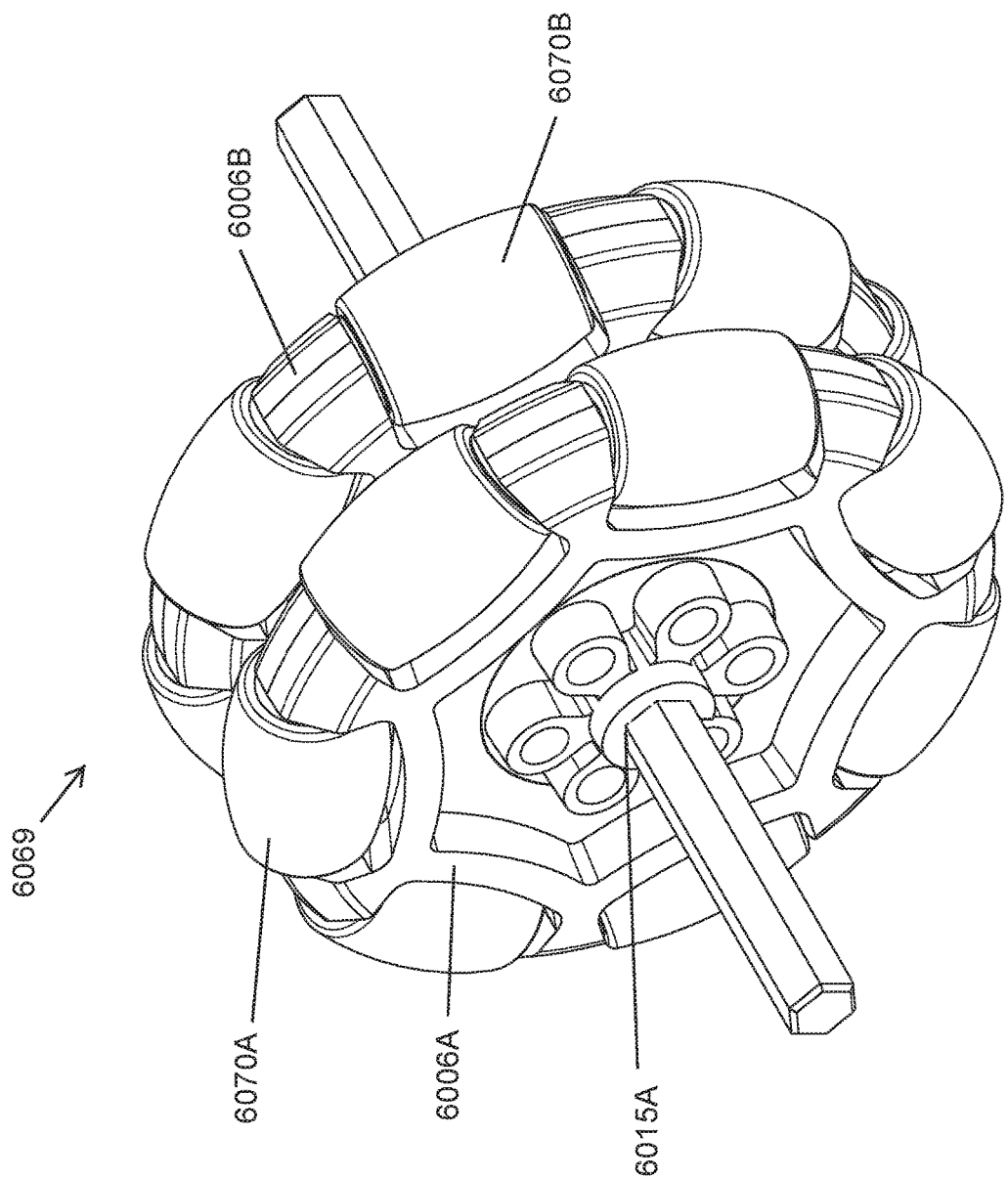
Figures 6, 6U, 7, 8:
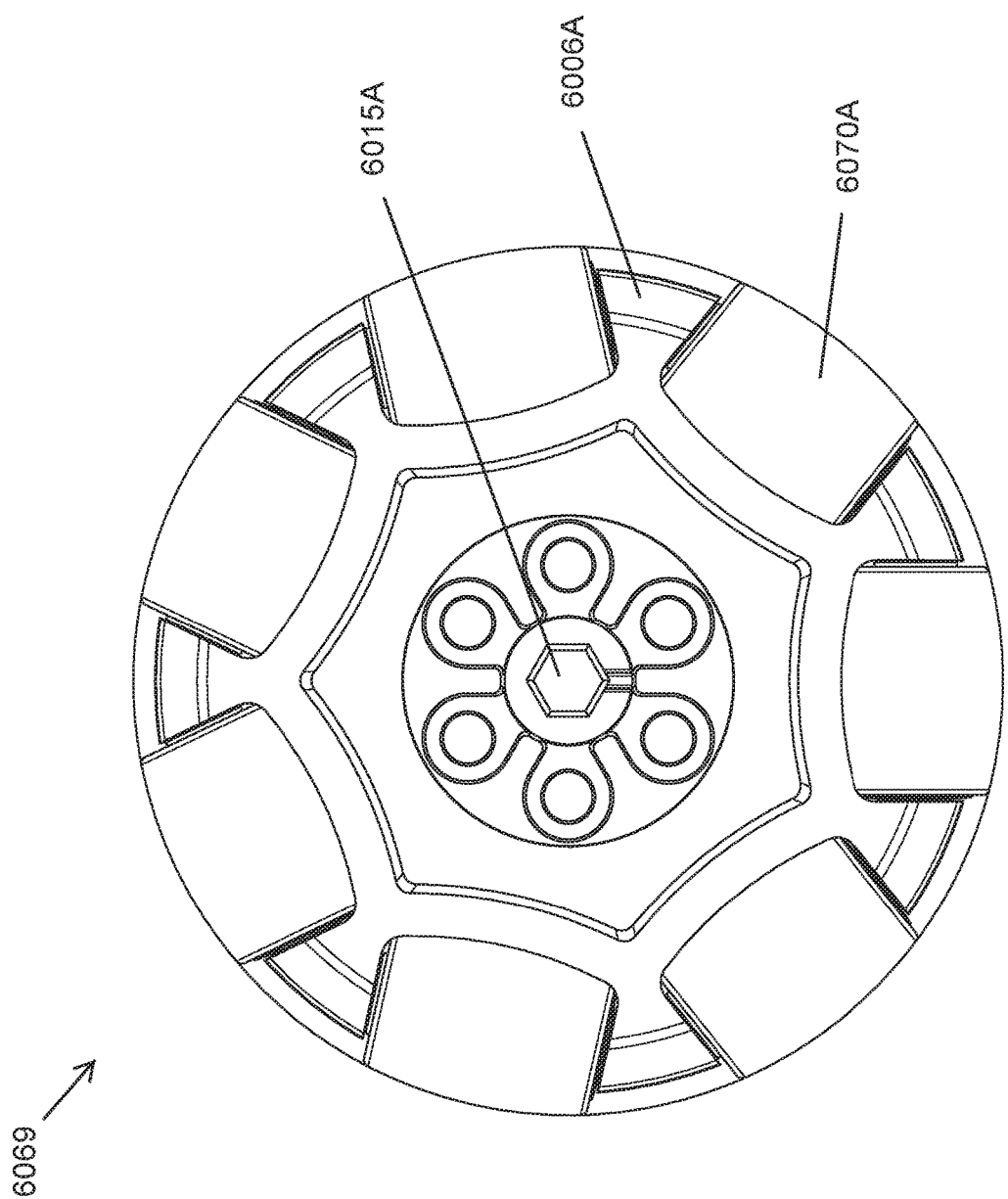
Figures 6, 6U, 7, 8, 9:
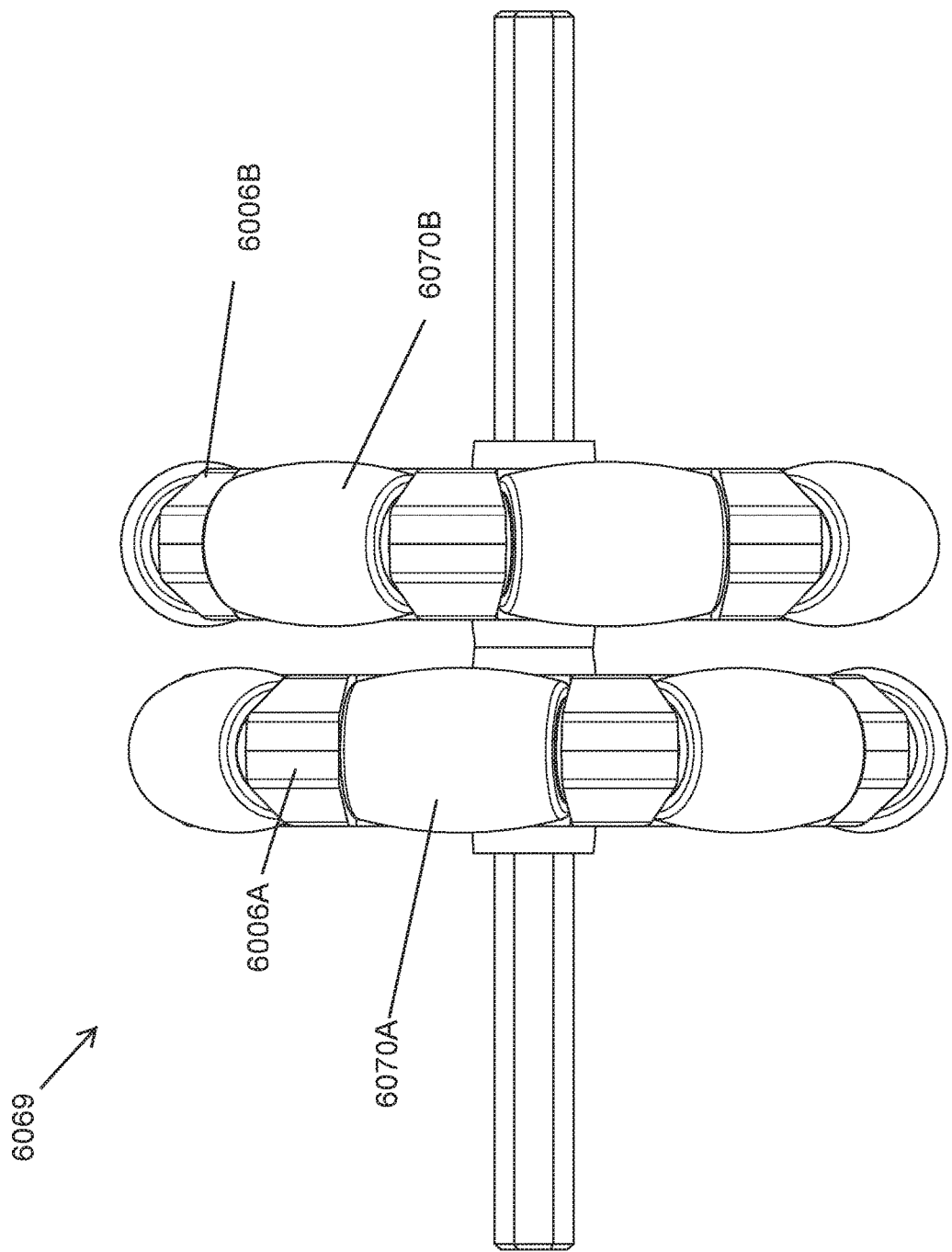
Figures 6, 6U, 7, 8, 9, 10, 11, 12, 13, 14:
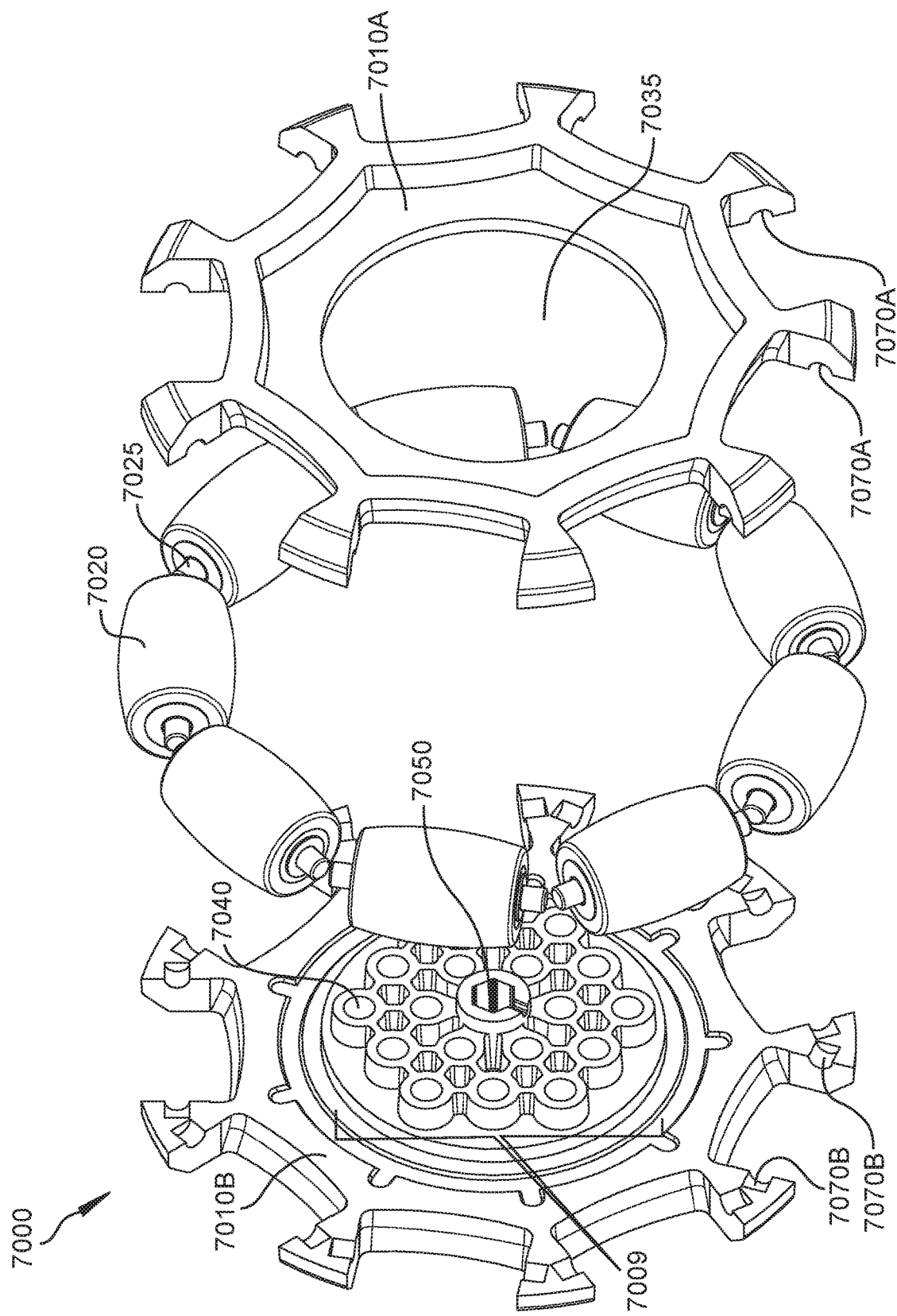
Figure 6V:
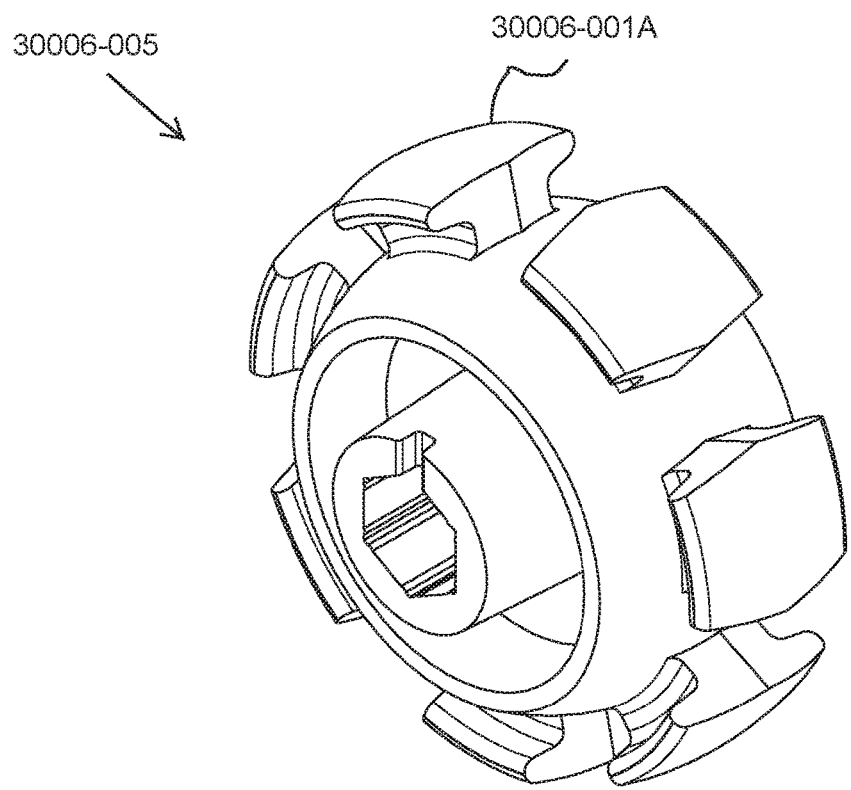
Figure 1:
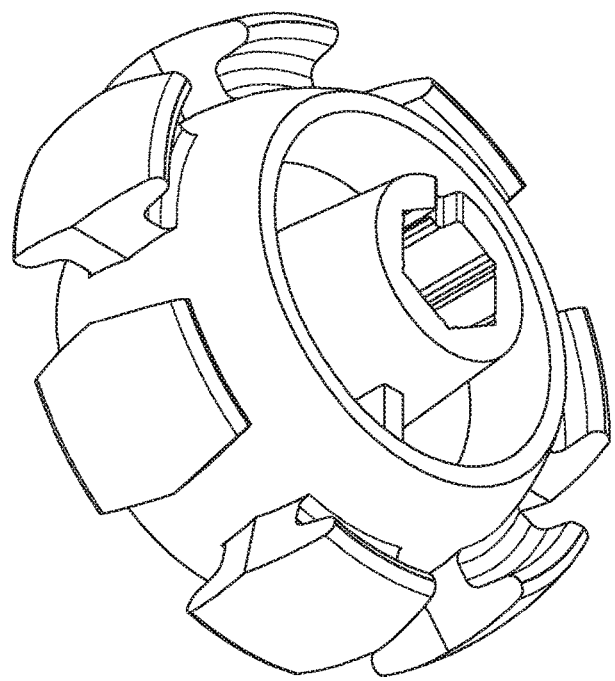
Figure 6W:
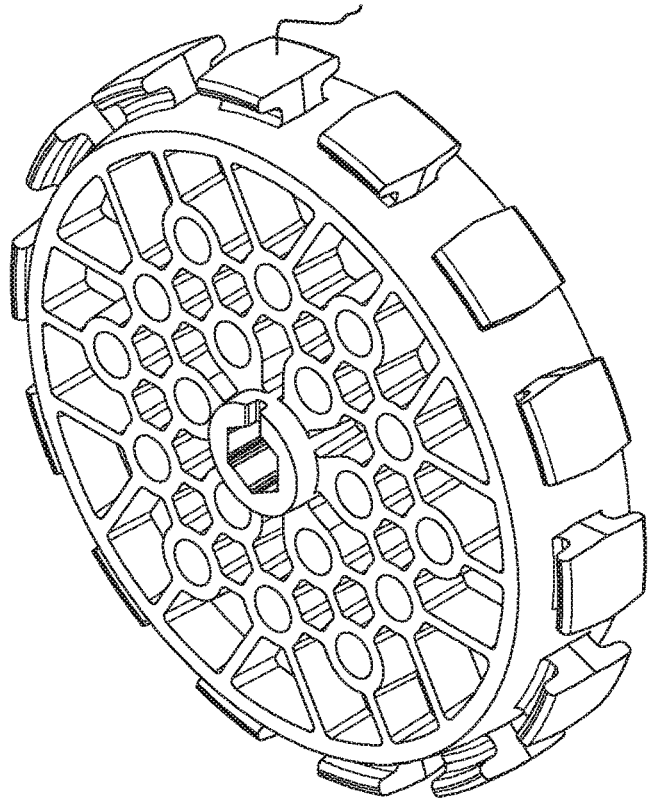
Figure 1:
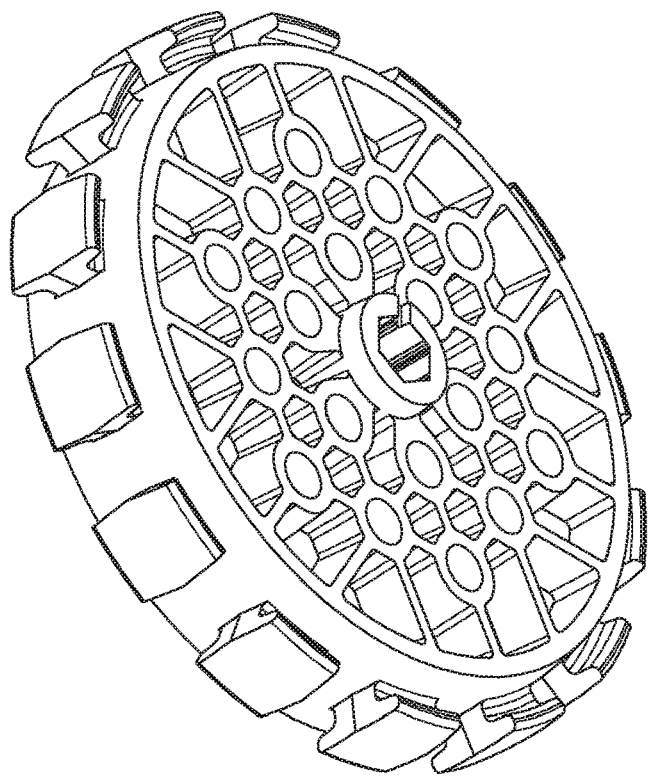
Figure 6X:
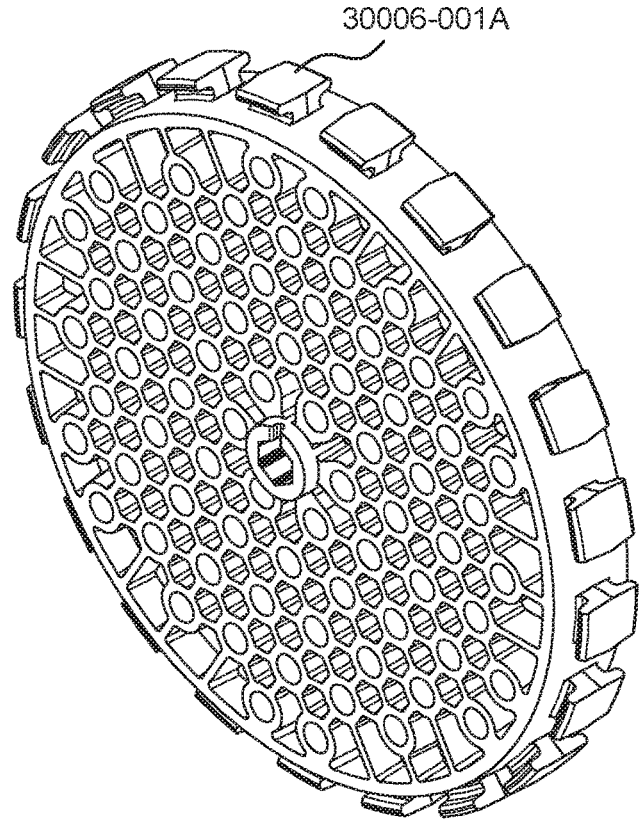
Figure 1:
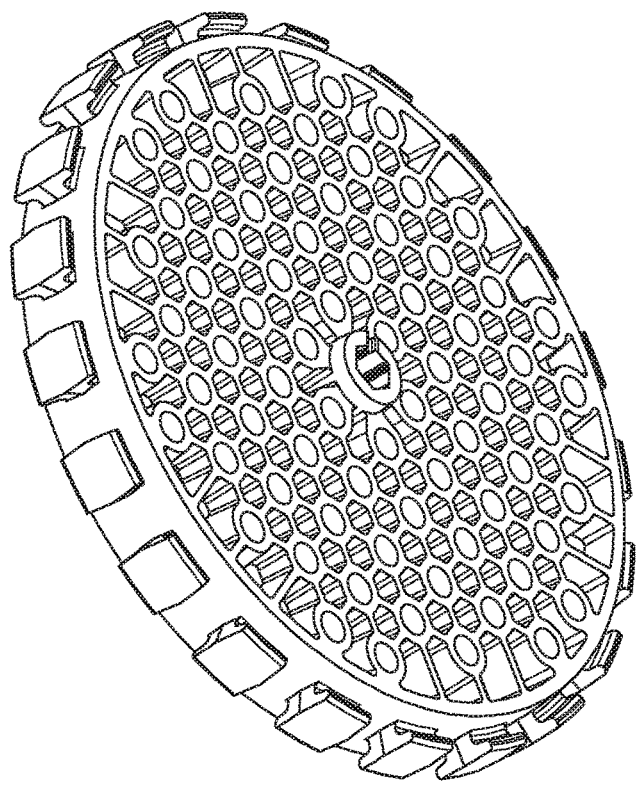
Figures 2, 6X:
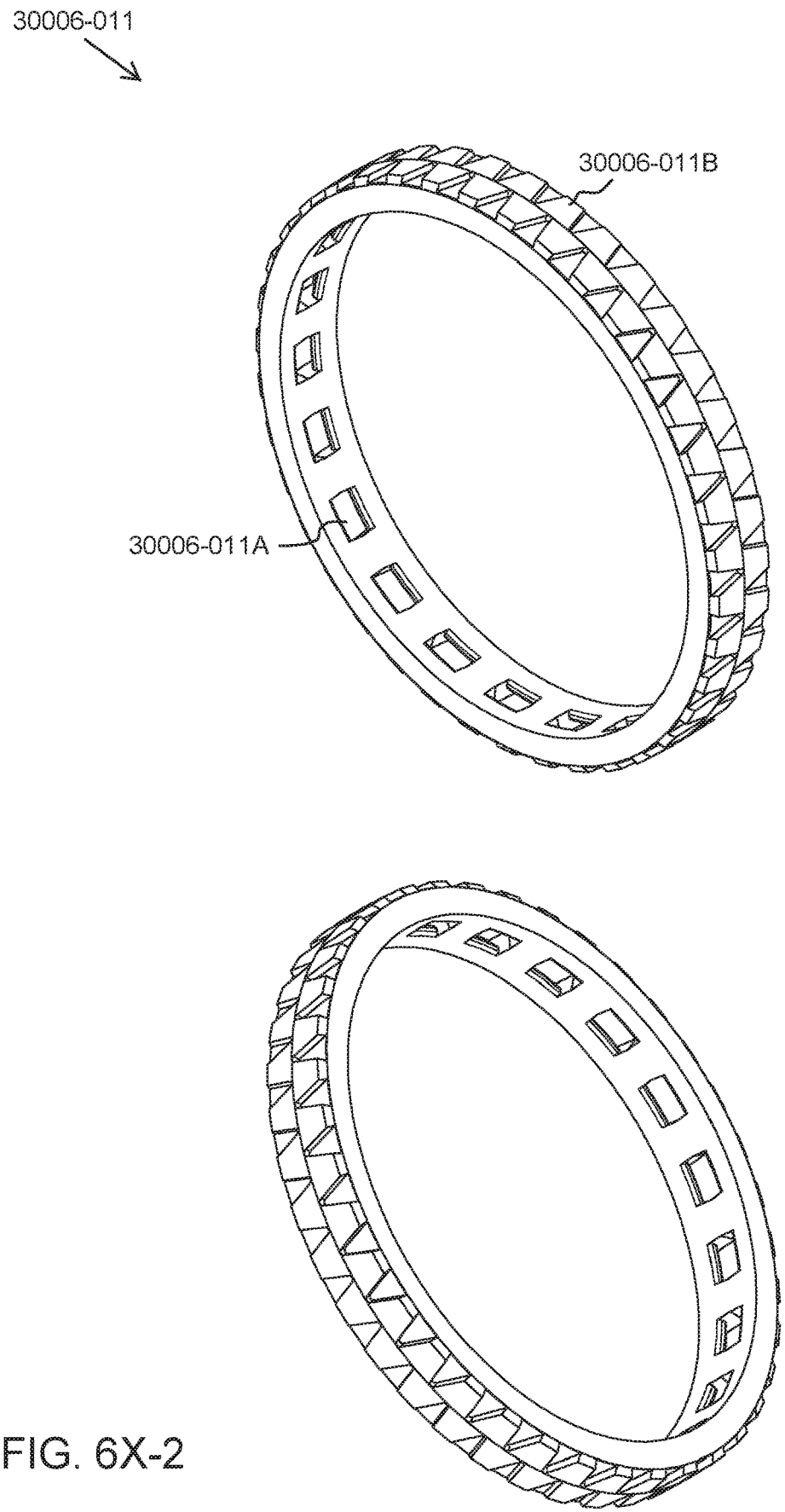
Figure 7:
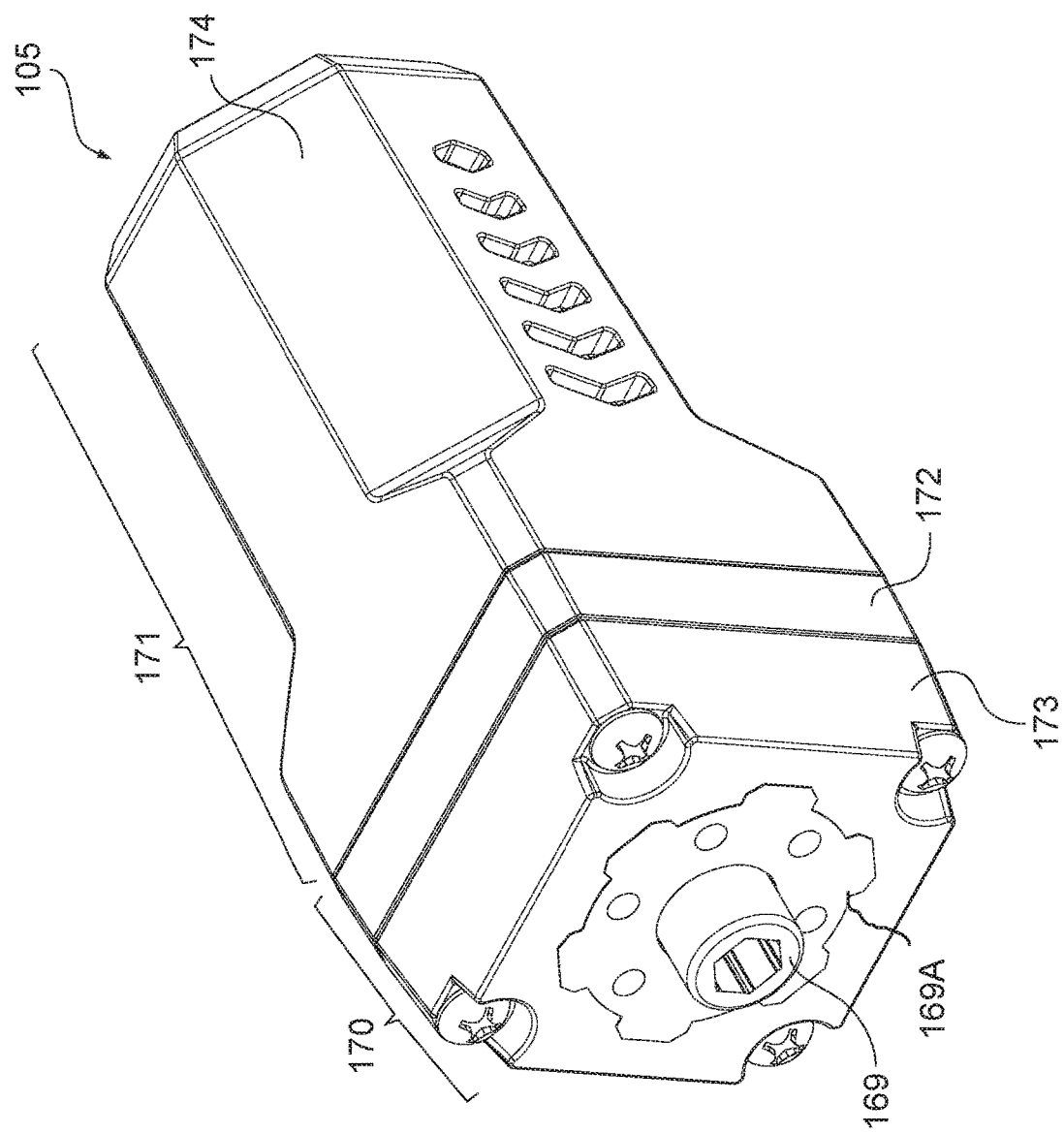
Figure 8:
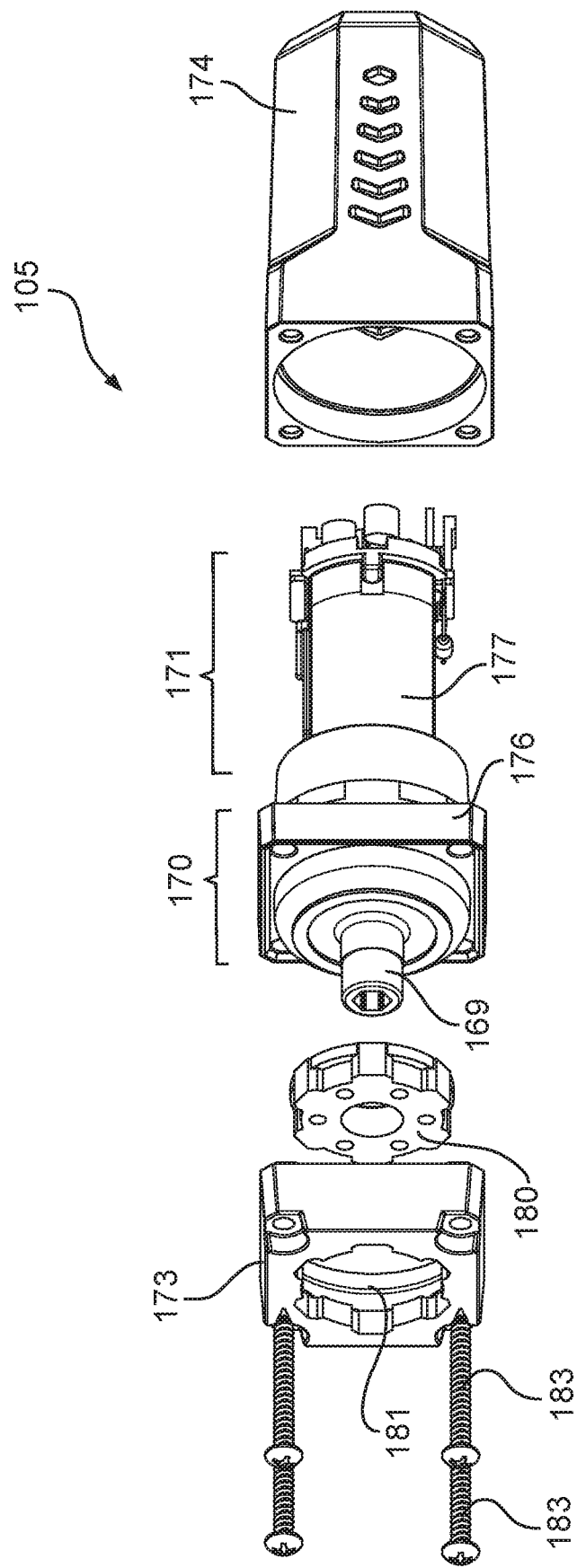
Figure 9:
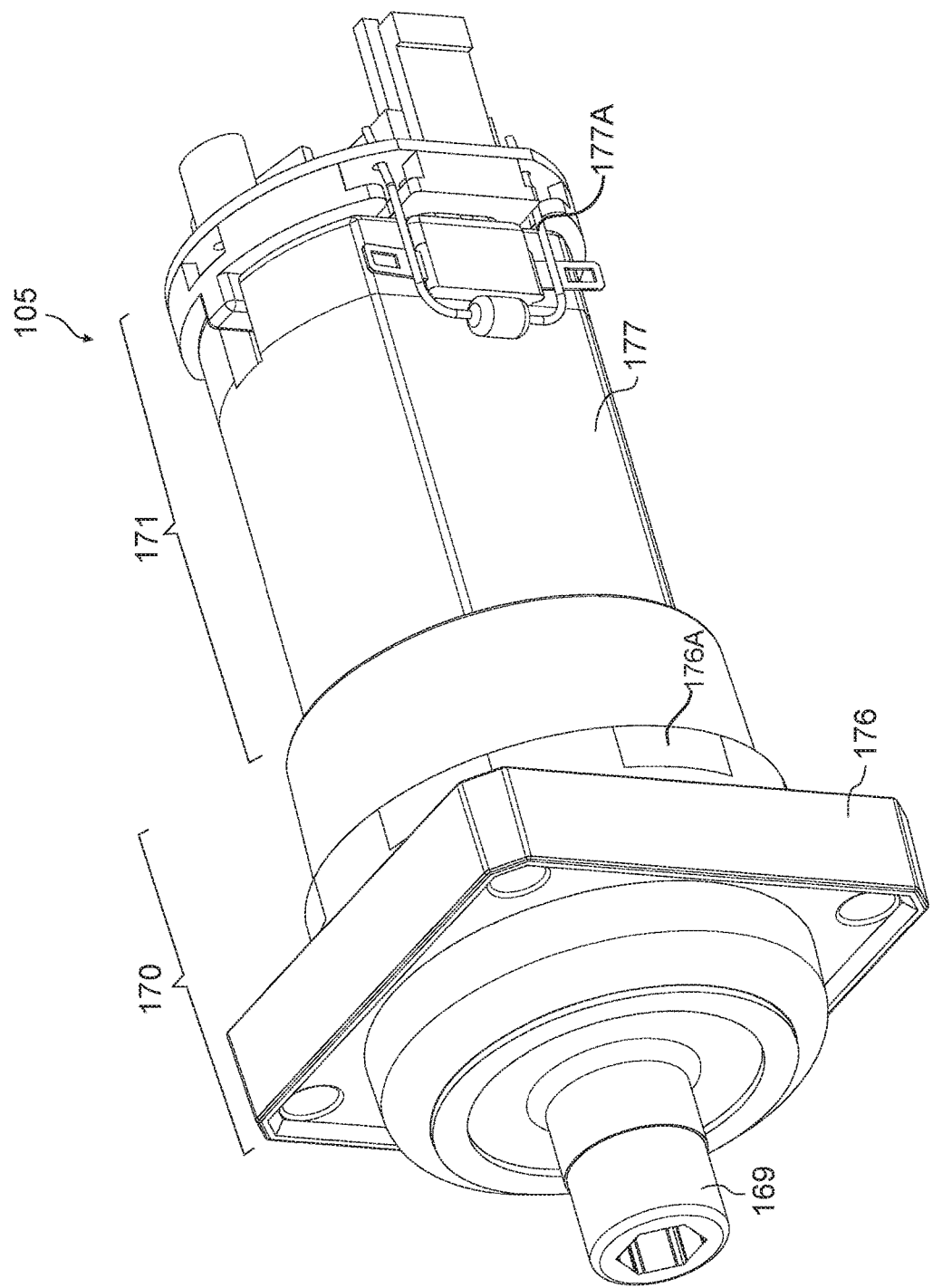
Figure 10:
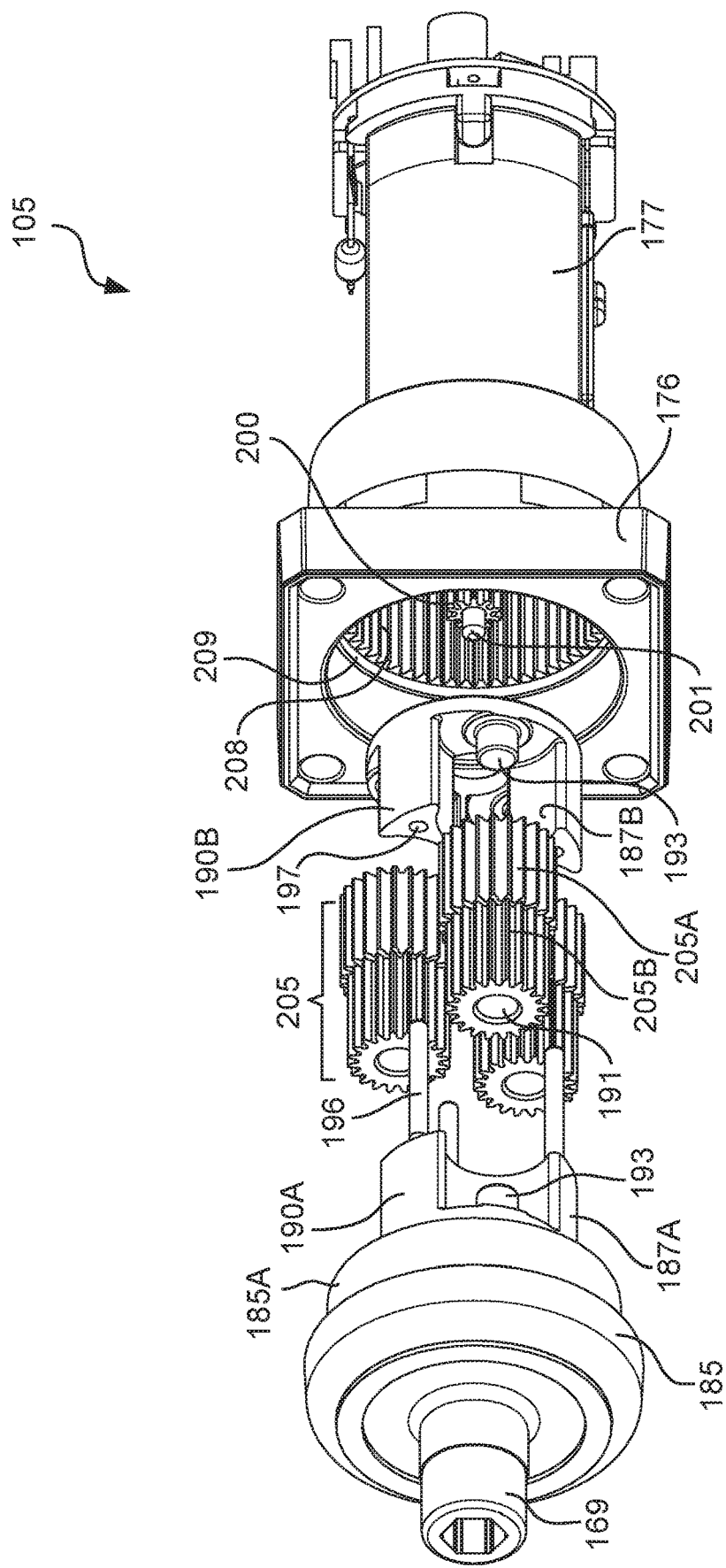
Figure 11:
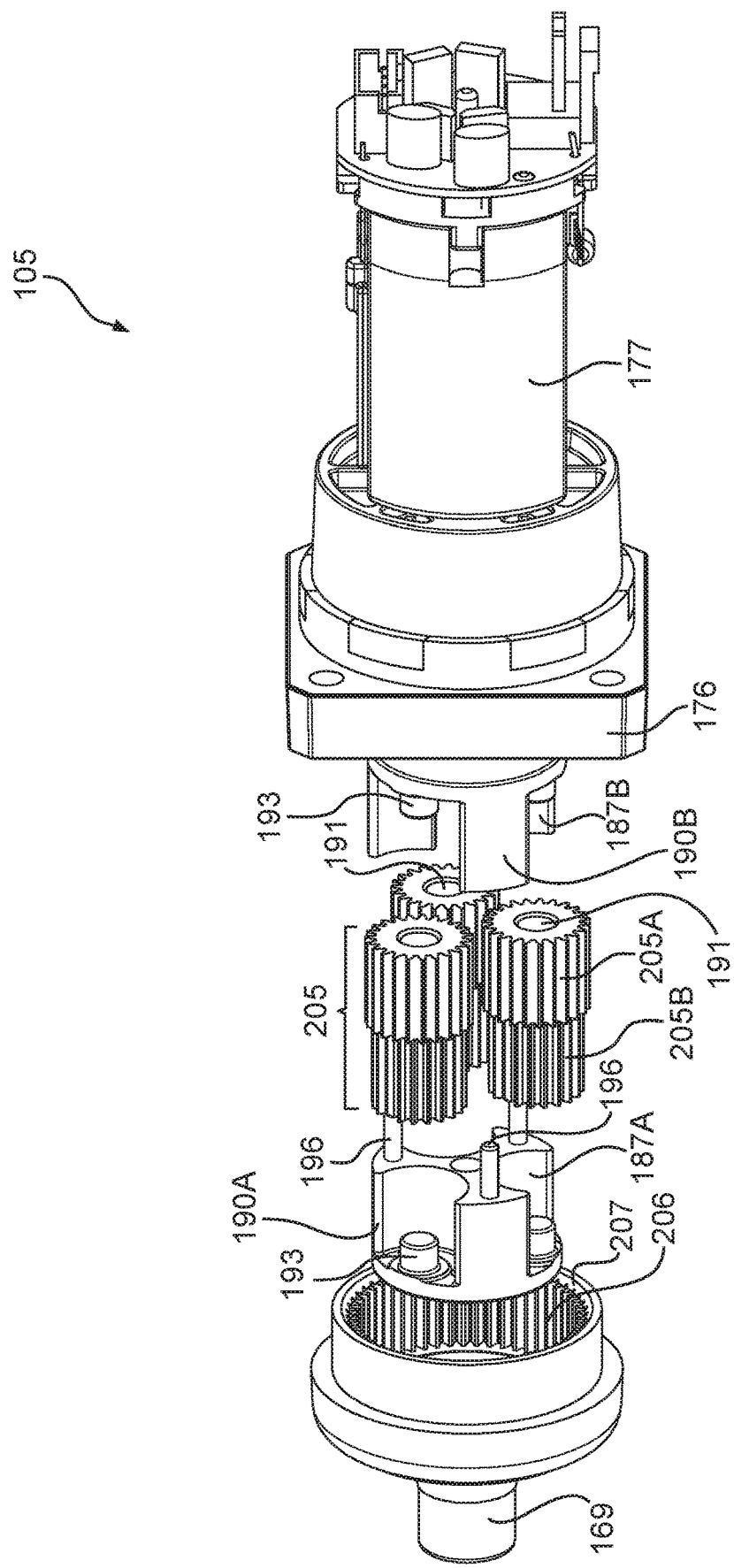

Referring now primarily to FIG. 6R to FIG. 6U, engagement and retaining of roller/s 655 with omni-directional wheel third configuration 630. Roller 655 can comprise at least one roller nub 673, by way of which roller 655 can be retained in roller pocket 655. Roller nub 673 can be optionally provided on at least one terminating end of roller 655. Roller pocket 665 (FIG. 6U) can comprise a cavity that can be configured to receive the body of roller 655, along with nub platforms 675 (FIG. 6U) that can be configured to receive roller nubs 673 of incoming roller 655. In some configurations, roller nubs 673 can include pins that can extend through rollers 655. Locking pin 650 can be provided to retain roller 655 in roller pocket 665 (FIG. 6P). Locking pin 650 can comprise roof 653 and at least one insert 652. Retaining of roller 655 can be achieved by allowing locking pins 650 to substantially occupy interval 670 between adjacent roller/s 655. Roof 653 of locking pin 650 can be configured to form enclosed case 677 (FIG. 6U) in combination with nub platform 675 (FIG. 6U) of roller pocket 665 (FIG. 6U). Disposition of locking pin 650 on interval 670 can cause at least one roller nub 673 to be trapped in enclosed case 677 (FIG. 6U).

Referring now to FIGS. 6U-1 and 6U-2, an exemplary embodiment of mobility module 6006 can include an omnidirectional wheel. Mobility module 6006 can be configured to provide a traction wheel-like drive i.e. in forward and backward direction to electro-mechanical agent 75 (FIG. 3) along with an added feature of avoiding friction when electro-mechanical agent 75 (FIG. 3) is desired to move sideways. A plurality of drive features can be provided to electro-mechanical agent 75 (FIG. 3) due to addition of omni-directional wheels and placement of the wheels in a pre-determined fashion. Module 6006 can comprise first plate 6010A and second plate 6010B. Rollers 6070 can be captured between plates 6010A and 6010B and can be disposed along a periphery of module 6006. A hub portion 6050 can disposed substantially central to module 6006. Hub portion 6050 can comprise at least one bore 6015 surrounded by a pre-set hole pattern 6009. Hub portion features can be jointly employed to achieve an engagement between module 6006 and one or more other supplementary modules of electro-mechanical agent 75 (FIG. 3).

Referring now to FIGS. 6U-3 and 6U-4, features that can aid capturing of rollers 6070 between plates 6010A and 6010B can be depicted through a partially or completely exploded view of module 6006. Each plate 6010A and 6010B can comprise a core region and a peripheral region configured to mate with each other providing a primary wheel body. The peripheral region of each plate can comprise hands extending away from the respective core regions and further distributed to provide pockets for receiving rollers there between. Plate 6010A can comprise a first core region 6008A and a first peripheral region 6007A. Hands of the first peripheral region 6007A can be disposed to provide pockets 6080A. These hands can define contours 6011 that face the mating plate, and can serve to at least partially capture roller support 6075 therein. A complementing set of contours 6012 can be provided on hands of second peripheral region 6007B belonging to second plate 6010B. Mating of hands of respective peripheral regions 6007A and 6007B can cause roller supports 6075 to be captured there between. As a result, rollers 6070 that surround roller support 6075 can be distributed and disposed in complete pockets formed from combining partial pockets 6080A and 6080B of respective plates 6010A and 6010B. Hub portion 6050 can further comprise a pre-set hole pattern 6009 with a central bore 6015 and surrounding apertures 6009, configured to allow engagement between module 6006 and one or more supplementary modules of electro-mechanical agent 75 (FIG. 3).

Referring now to FIGS. 6U-5 and 6U-6, exploded views of module 6006 can include pre-set hole pattern 6009 that can be distributed between plates 6010A and 6010B. In some configurations, hole pattern 6009 can be committed to one of the plates 6010A and 6010B. In some configurations, plate 6010B can include hole pattern 6009 within hub portion 6050, and plate 6010A can comprise a recess 6055 configured to accept hub portion 6050 and hole pattern 6009 therein. Various mechanical features can be provided to engage plate 6010A with 6010B. Some of the engagement methods can include, but are not limited to including, providing a twist and lock arrangement between plates, providing a raised protrusion such as a ring or threads on one plate that can be accepted in corresponding cavities on other plate, providing aligned apertures on two plates that can accept a bolt and screw for engagement, providing a flexible snap on features that can align with one or more hooks on opposing plates. Plates 6010A and 6010B can be engaged through welding techniques, such as but not limited to hot gas welding, heat sealing, high frequency welding, injection welding, ultrasonic welding, friction welding etc. In some configurations, more than one engagement method can be used to combine plates 6010A and 6010B. In some configurations, central bore 6015 can be disposed with a pre-determined phase relationship with the disposition of rollers 6070 along periphery of module 6006. A completely circular circumference or circular profile of the module 6006 can be achieved by a combination of at least two modules 6006 disposed at a phase relationship of 180° from one another on a single shaft. Such an arrangement can cause rollers 6070 of first module 6006 to fill in gaps between rollers of second module 6006. In configurations having an odd number of rollers 6070, the arrangement described herein can be achieved through a pre-calculated phase relationship between hex bore 6015 and even number rollers 6070 placed along the circumference of module 6006. A "double wheel" configuration can be achieved through the arrangement described herein.

Referring now to FIGS. 6U-7 through 6U-9, in some configurations, central bore 6015 can be disposed with a pre-determined phase relationship with disposition of rollers 6070 along periphery of module 6006. A completely circular circumference or circular profile of module 6006 can be achieved by a combination of at least two modules 6006 disposed at a phase relationship of 180° from one another on a single shaft, as shown in exemplary assembly 6069. Assembly 6069 can comprise first module 6006A with corresponding rollers 6070A and central bore 6015A. Assembly 6069 can comprise second module 6006B with corresponding rollers 6070B and bore 6015B. Such an arrangement can cause rollers 6070A of the first module 6006A to fill in gaps between rollers 6070B of second module 6006B. In configurations having an odd number of rollers 6070, the arrangement described elsewhere herein can be achieved through a pre-calculated phase relationship between hex bore 6015 and even number rollers 6070 placed along circumference of module 6006, thereby allowing a user to achieve a "double wheel" configuration.

Referring now to FIGS. 6U-10 through 6U-14, second configuration mobility module 7000 can be similar to mobility module 6006 (FIG. 6U-1) with respect to components and function, but can be dimensionally distinct. Dimensional variation of module 7000 can cause an alteration in pre-set hole pattern 7009 of hub portion 7030. Dimensional variation can govern the number of rollers 7020 and their distribution along a periphery of mobility module 7000. The pre-set hole pattern of hub portion 7030 can comprise at least one central bore 7050 with surrounding apertures 7040. Constituents of the pre-set hole pattern 7009 can be configured to achieve engagement of mobility module 7000 with one or more supplementary modules of electro-mechanical agent 75 (FIG. 3).

Referring now specifically to FIGS. 6U-10 and 6U-11, mobility module 7000 can include an omni-directional wheel. Mobility module 7000 can comprise first plate 7010A and second plate 7010B. Rollers 7020 can be captured between first plate 7010A and second plate 7010B, and can be disposed along a periphery of module 7000. Hub portion 7030 can be substantially central of module 7000. Hub portion 7030 can comprise at least one bore 7050 surrounded by a pre-set hole pattern 7009. Hub portion features can be jointly employed to achieve an engagement between module 7000 and one or more other supplementary module of electro-mechanical agent 75 (FIG. 3).

Referring now to FIGS. 6U-12 and 6U-13, features that aid capturing of rollers 7020 between plates 7010A and 7010B can include each plate 7010A and 7010B comprising a core region and a peripheral region configured to mate with each other, providing a primary wheel-body. The peripheral region of each plate can comprise hands extending away from the respective core regions and distributed to provide pockets for receiving rollers there between. Plate 7010A can comprise first core region 7008A and first peripheral region 7007A. Hands of first peripheral region 7007A can be disposed to provide pockets 7070A. These hands can further define contours 7011 that face the mating plate and can serve to at least partially capture roller support 7025 therein. A complementing set of contours 7012 can be provided on hands of second peripheral region 7007B belonging to second plate 7010B. Mating of hands of respective peripheral regions 7007A and 7007B can cause roller supports 7020 to be captured there between. As a result, rollers 7020 that surround roller support 7025 can be distributed and disposed in complete pockets formed from combining partial pockets 7070A and 7070B of respective plates 7010A and 7010B. Hub portion 7030 can further comprise a pre-set hole pattern 7009 with a central bore 7050 and surrounding apertures 7040, configured to allow engagement between module 7000 and one or more supplementary modules of electro-mechanical agent 75 (FIG. 3).

Referring now to FIGS. 6U-14 and 6U-15, exploded views of module 7000 can include pre-set hole pattern 7009 that can be distributed between plates 7010A and 7010B. In some configurations, hole pattern 7009 can be committed to one of the plates 7010A and 7010B. Plate 7010B can include hole pattern 7009 within hub portion 7030 and plate 7010A that can comprise recess 7035 configured to accept hub portion 7030 and hole pattern 7009 therein. Various mechanical features can be provided to engage plate 7010A with 7010B. Some of the engagement methods can include, but are not limited to including, providing a twist and lock arrangement between plates, providing raised protrusion such as a ring or threads on one plate that can be accepted in corresponding cavities on other plate, and providing aligned apertures on two plates that can accept a bolt and screw for engagement. Plates 7010A and 7010B can be engaged through welding techniques, such as but not limited to hot gas welding, heat sealing, high frequency welding, injection welding, ultrasonic welding, friction welding etc. In some configurations, more than one engagement method can be used to combine plates 7010A and 7010B.

Referring now to FIGS. 6V, 6V-1, 6W, 6W-1, 6X, 6X-1, and 6X-2 wheel/tire assemblies 20006-004 (FIG. 6V), 20006-001 (FIG. 6W), and 20006-005 (FIG. 6X) can include wheels 30006-005 (FIG. 6V-1), 30006-002 (FIG. 6W-1), and 30006-006 (FIG. 6X-1). Tires 20006-004A (FIG. 6V), 20006-001A (FIG. 6W), and 20006-005A (FIG. 6X) can mount to wheels 30006-005 (FIG. 6V-1), 30006-002 (FIG. 6W-1), and 30006-006 (FIG. 6X-1) at mounting notches 30006-001A that can be of any shape and size that can accommodate Tires 20006-004A (FIG. 6V), 20006-001A (FIG. 6W), and 20006-005A (FIG. 6X). Tires 20006-004A (FIG. 6V), 20006-001A (FIG. 6W), and 20006-005A (FIG. 6X) can include any shape, thickness, and configuration of tread. Wheel/tire assemblies 20006-004 (FIG. 6V), 20006-001 (FIG. 6W), and 20006-005 (FIG. 6X) can include notched shaft cavity 20006-001B that can be sized to accommodate any shape and size of shaft. Tire 30006-011 (FIG. 6X-2) can include mounting cavities 30006-011A (FIG. 6X-2) and treads 30006-011B (FIG. 6X-2) including manufacturing-friendly spacing and shapes. In some configurations, mounting cavities 3006-011A (FIG. X-2) can be formed by overmolding.

Figures 4, 4G, 5, 6, 7, 8, 9:
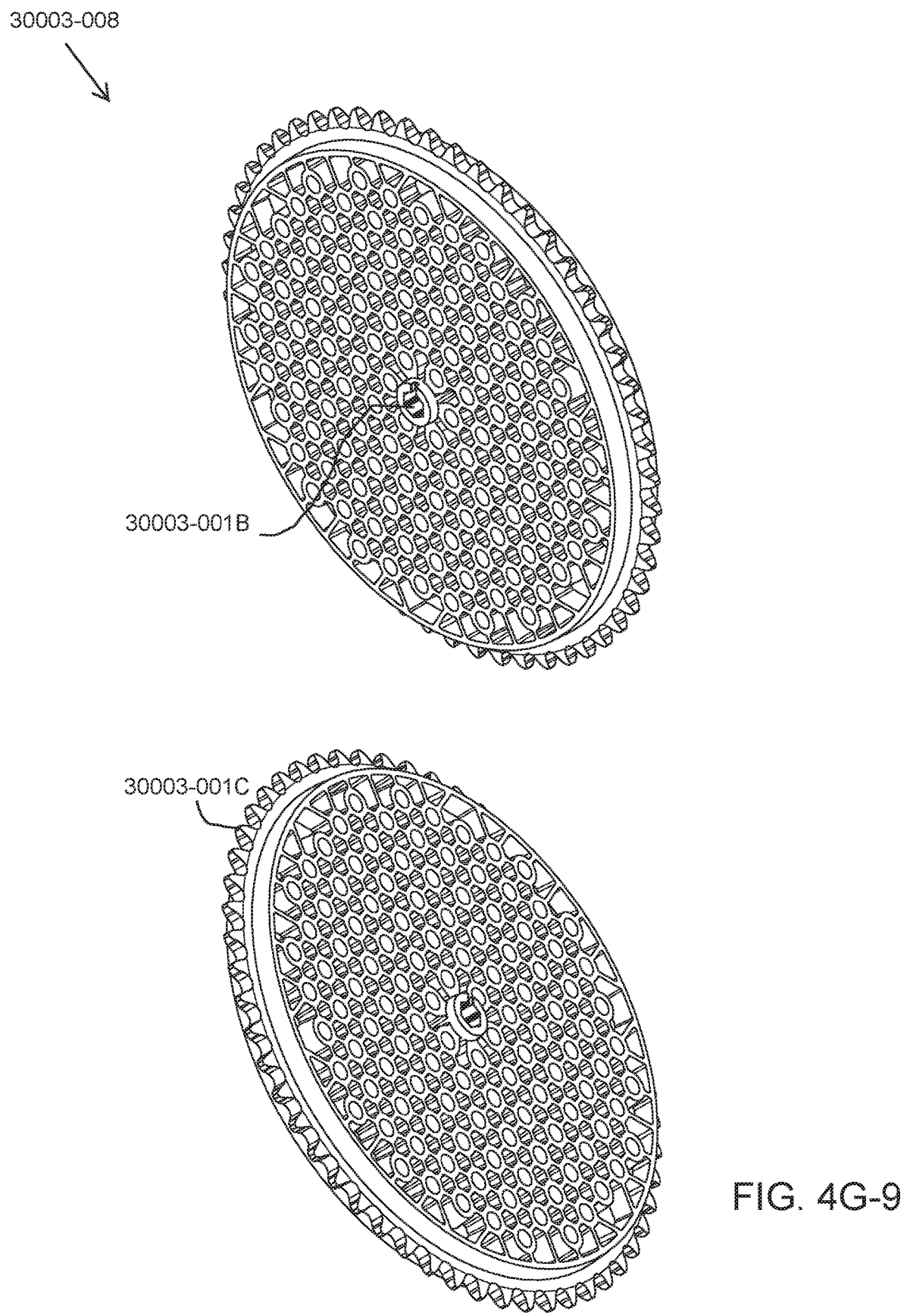

Referring now primarily to FIG. 7, electro-mechanical agent first example configuration 75 (FIG. 3) can be built from a modular construction kit, and can comprise at least one gear motor 105 as a construction module for performing a singular or series of assigned tasks. Gear motor 105 can include into at least two sections. First section 170 can comprise a plurality of gears meshed in a calculated manner, the meshed gear arrangement can be referred to as a gearbox or a gear drive. Second section 171 can comprise at least one motor 174 such as, but not limited to, a DC motor, an AC motor, or a combination thereof, configured to provide an incoming rotational motion to the meshed gears in first section 170. First section 170 and/or second section 171 can further comprise at least one sensing agent (not shown) such as, but not limited to an encoder or a continuous potentiometer. The sensing agent can be configured to receive at least one controller command from controller module 29 (FIG. 1) and can accordingly execute functioning of gear motor 105. In some configurations, the at least one sensing agent can receive instructions from modules other than controller module 29. The sensing agent can transmit an execution-response to a module such as, but not limited to, controller module 29 (FIG. 1) and/or second communications device 26 (FIG. 1). In some configurations, gear motor(s) 105 of electro-mechanical agent 23 (FIG. 1) can be replaced by or further integrated with a DC motor, an AC motor, a servo motor, or the like. Choice of a specific motor-type can be dependent on a number of factors such as, but not limited to, the degree of rotation and/or torque required by a driven component to which the motor can be engaged, whether the location is required to be under direct supervision of one or more controller modules 29 (FIG. 1) in electro-mechanical agent 23 (FIG. 1), whether the supplementary module/extension module engaged with the motor serves as a driver for one or more remaining of the modules/ extension modules of electro-mechanical agent 23 (FIG. 1). Mounting ring 169A can include tapped screw receivers.

Continuing to refer to FIG. 7, gear motor 105 can include gearbox 170 and gear motor 174. An enclosure for gearbox 170, motor 174 and at least one sensing element (not shown) can be referred to as gear motor enclosure 172. Gear motor enclosure 172 can be configured to envelop a variety of gearboxes or gear drives. In some configurations, gear motor enclosure 172 can be configured to enclose a plurality of gear drives, wherein the gear drives can be similar and/or dissimilar in nature. Gear motor enclosure 172 can be built from a material which can qualify for, but is not limited to being, light-weight, heat-resistant, low maintenance, corrosion proof and the like, such that gear motor enclosure 172 can be easily include higher or fewer number of components therein. Gearbox 170 can comprise a gear-drive, (not shown) wherein the gears can be configured to mesh in a calculated manner to decrease an incoming rotational speed from motor 174 and obtain a higher resultant torque. The resultant torque can be obtained at output rotor 169. Output rotor 169 can be configured to engage with a driven supplementary module/extension module of electro-mechanical agent 23 (FIG. 1). Thus, gearbox 170 can serve as an interface between driving motor 174 and one or more driven modules of electro-mechanical agent 23 (FIG. 1).

Continuing to refer to FIG. 7, the gears in gearbox 170 can be, but are not limited to being, a spur gear, helical gear, herringbone gear, internal-external gears, compound gears, and the like. The enlisted gear types can be arranged in a plurality of configurations or drives to obtain a desired gear reduction. In some configurations, gear-box 170 can obtain a gear reduction of a ratio from about 15:1 to 200:1. In some other configurations, gearbox 170 can obtain a gear-reduction of at least 80:1. A gear drive in gearbox 170 can be, but is not limited to being, a harmonic drive, epicyclical drive or a combination thereof and/or the like. In some configurations, gear-box 170 can provide a plurality of similar and/or dissimilar configurations of gear drives. In other configurations, various permutations and combinations of gear—drives can be used for obtaining a desirable resultant torque. In some configurations, a specific feature of one or more gear drives can be incorporated into a distinct gear drive to obtain beneficial characteristics of plurality of gear sets through a single compact gear arrangement.

Referring now primarily to FIG. 8 and FIG. 9, housing 172 (FIG. 7) of gear motor 105 can be segregated into gear box housing 173 and motor housing 174. Gear motor 105, without the outer housing can be divided into a first portion comprising gearbox 170 and the second portion 171 comprising motor 174 and a sensing agent (not shown). Motor 177 can be an AC motor, a DC motor or the like. Choice of the motor can be based on, for example, but not limited to, a desired torque applied to one or more driven modules to which gear motor 165 can be engaged. An incoming rotational motion can be generated by motor 177 in second portion 171 of the gear motor. The incoming rotational motion can be advanced to a gear drive disposed in portion 170 of the gear motor. The gear drive can be configured to alter a speed and torque from the incoming rotational motion to a desired speed and torque. The altered speed and torque can exit the gear drive through output-shaft 169. The gearbox and output shaft 169 can be enveloped in gearbox housing 173. However, outlet 181 can be provided in gear-box housing 173 for passing on the resultant speed and torque from the output shaft to one or more driven supplementary and/or extension modules of the electro-mechanical agent. Shaft aligner 180 can provide mounting holes, ensure an appropriate placement of output shaft 169 in gearbox housing 173, and allow transfer of speed and torque from output shaft 169 to the one or more driven modules, located outside gear-motor 105. Two halves 173 and 174 of the gear motor housing can be coupled by means of coupling fasteners 183. In some configurations, a single set of coupling fasteners can extend from first portion 173 through gearbox 176 and to second portion 174 of gear motor 105. In some configurations, gearbox frame 176 can be over molded with ring gear 176A and then engaged with second portion 174. As a result of segregating the gear motor housing into first portion 170 and second portion 171, the variety of gearboxes with similar or dissimilar gear-drive can be engaged with motor 177. Some configurations can provide a single continuous housing for the gearbox and the gear motor. In some configurations, power can be delivered to motor 105 through capacitor leads 177A (FIG. 9). In some configurations, metal insert 185A (FIG. 10) can be overmolded.

Figures 4, 4G, 5, 6, 7, 8, 9, 10, 11:
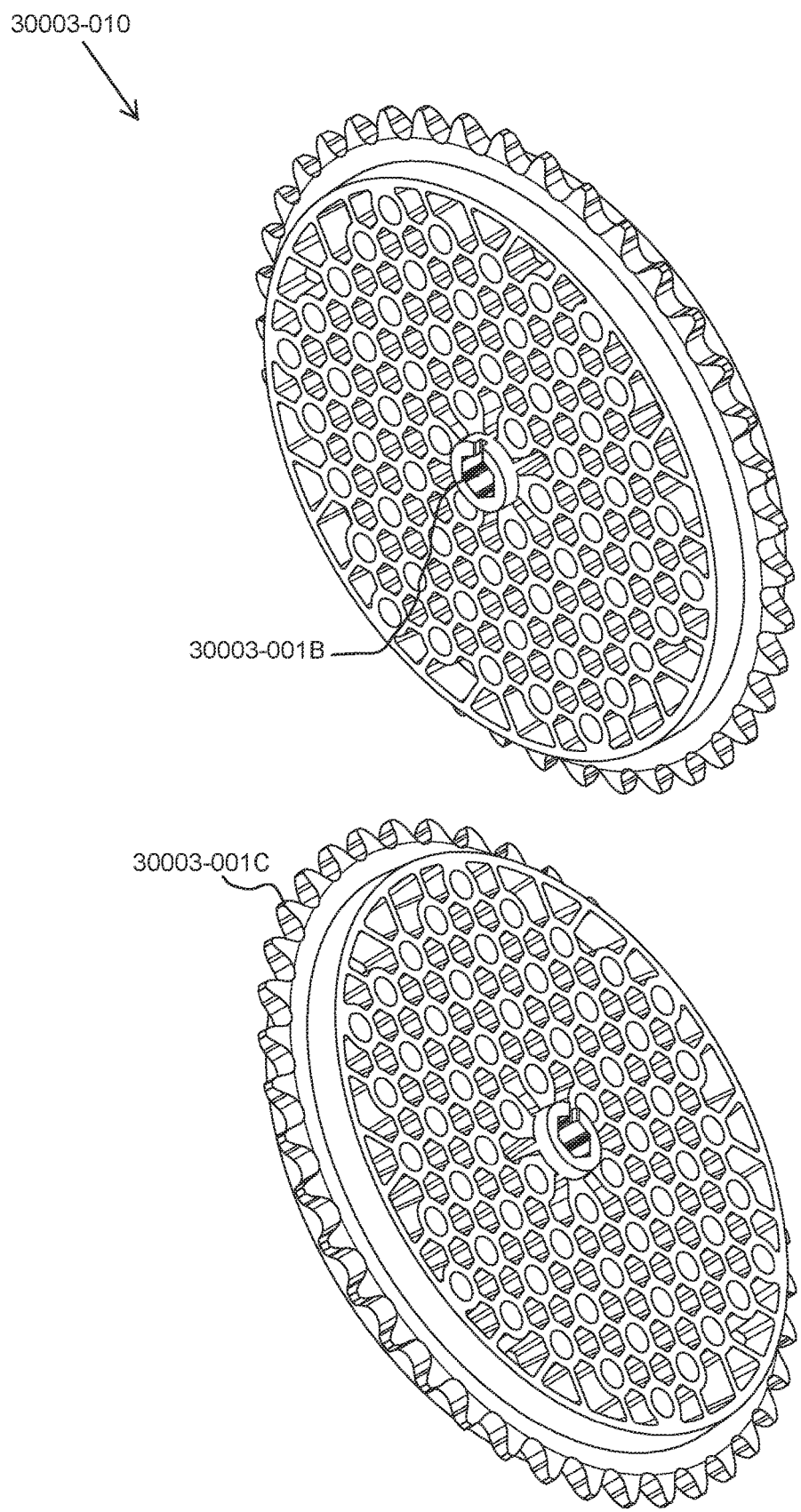

Referring now primarily to FIG. 10, exploded first portion 171 (FIG. 9) comprises principal gear 200 engaged to motor 177 by way of connecting shaft 201. Principal gear 200 can serve as a point of receipt for an incoming rotational motion and torque from motor 177. Thus, motor 177 can serve as a driver component in gear motor 105. In accordance with, but not limited to, disposition of principal gear 200 and motor 177, principal gear 200 can be configured to rotate at a rotational speed generated from motor 177. Principal gear 200 can be disposed at a terminal end of connecting shaft 201 such that teeth of principal gear 200 can extend away from and substantially perpendicular to connecting shaft 201. Additionally, principal gear 200 can be disposed such that it can be substantial central of gear arrangement of the gear drive.

Continuing to refer to FIG. 10, a plurality of conditional gears 205 can be disposed surrounding principal gear 200 and positioned substantially parallel to connecting shaft 201. Conditional gears 205 can be configured to provide first section 205A with a first set of geared teeth and second section 205B with a second set of geared teeth. Besides having a discrete number of geared teeth, first section 205A and second section 205B can further be differentiated on the basis of their respective diameters. In some configurations, conditional gears 205 can comprise a plurality of geared sections with distinct number of geared teeth thereupon and/or distinct diameters. Each of the plurality of geared sections of conditional gears 205 can be associated with the subsequent geared sections such that a rotational motion of any one of the geared sections can cause the subsequent sections to rotate at substantially similar rotational speeds. In some configurations, rotation of one of the geared sections of conditional gears 205 can cause the subsequent geared sections to rotate at the same speed. Additionally, the geared teeth belonging to one of first geared section 205A and/or second geared-section 205B of conditional gears 205 can mesh with the geared-teeth of principal gear 200. For example, geared teeth of first geared-section 205A of the surrounding conditional gears can mesh with the geared teeth of centrally located principal gear 200. As the result of the meshing, principal gear 200 can be configured to drive conditional gears 205. In some configurations, respective diameters of the plurality of geared sections of surrounding conditional gears 205 can be larger than the diameter of principal gear 200 such that a lower number of rotations of conditional gears 205 can be obtained with respect to the number of rotations per minute of principal gear 200. In some configurations, principal gear 200 can be surrounded by a pre-determined number of conditional gears 205 such that each of the geared teeth of principal gear 200 can mesh with an aligned geared tooth of at least one geared-section of surrounding conditional gears 205. For example, geared teeth disposed in first geared-section 205A of conditional gears 205 can mesh with the geared teeth of principal gear 200.

Continuing to refer to FIG. 10, geared teeth of principal gear 200 can operatively mesh with the geared teeth of conditional gears 205. Part of conditional gears 205 can be rested between at least one annular gear 209 and principal gear 200, annular gear 209 being disposed substantially concentric to a circumference of principal gear 200. Annular gear 209 can comprise an inner surface 208 facing conditional gears 205 and an outer surface (not shown), facing away from conditional gears 205. A set of geared teeth can be provided on the inner surface 208 of annular gear 209 such that they operatively mesh with the geared teeth on at least one geared section of one or more conditional gears 205. Rotation of principal gear 200 can cause a rotational motion of conditional gears 205 due to the meshing of the respective gear teeth. A rotational motion of annular gear 209 can be achieved as a result of an operational meshing of gear teeth of annular gear 209 with conditional gears 205. In some configurations, conditional gears 205 can potentially rotate about their respective axes as well as revolve around principal gear 200 along a circular path concentric with the circumference of annular gear 209. In some configurations, annular gear 209 can be held stationary as conditional gears 205 can be configured to rotate about their respective axes and revolve along the inner geared-surface of stationary annular gear 209. In some configurations, the geared teeth of first geared-section 205A of conditional gears 205, can be in operational meshing with centrally disposed principal gear 200 and annular gear 209. While operationally meshed, the geared teeth on an outer circumference of first geared section 205(*a*) of conditional gear 205 can alternatively mesh with geared teeth of principal gear 200 and the geared teeth of annular ring gear 209.

Referring now to FIG. 11, conditional gears 205 can include, but are not limited to including, one or more geared sections. Subsequent second geared section 205B can rotate due to rotation of first geared-section 205A of conditional gears 205, disposed between principal gear 200 (FIG. 10) and annual gear 209 (FIG. 10). Output gear 207 can be provided to surround second geared section 205B of conditional gear 205, such that a set of geared teeth of output gear 207 can circumferentially mesh with the geared teeth of second geared-section 205(*b*). Output gear 207 can include a ring gear with an inner surface 206 and an outer surface (not shown), and the inner surface can comprise a plurality of gear teeth configured to mesh with second section 205B of conditional gears 205. Output gear 207 can be disposed substantially co-axial with principal gear 200 and annular gear 209. Output gear 207 can be rotated as a result of the rotation and/or revolution of second section 205B of conditional gears 205, around principal gear 200 (FIG. 10). A resultant torque can be harvested from the gear drive by providing output rotary connector 169 engaged with output gear 207. Output rotary connector 169 can be engaged with one or more driven supplementary modules and/or extension modules to advance the resultant torque.

Referring now to FIG. 10 and FIG. 11, gear drive can include, but is not limited to including, gear-aligning elements such as, for example, but not limited to, gear-aligning elements 187A and 187B. Operation of the gears can be achieved by appropriate alignment of the individual gears in the gear drive. In general, operation of a gear motor can cause a disorientation of one or more of the participating gears from their respective locations. In some gear drives, the resultant torque can be affected due to the discussed disorientation and/or vibration, sloppiness or any other undesirable movement of the gears when the gear motor is in operation. To maintain a pre-determined alignment between the gears during the operation of the gear motor, a gear-aligning element can be configured to ensure that the desired resultant torque is obtained at output rotary connector 169. A gear aligning element can, for example, be a single continuous part or a multi-part element.

Continuing to refer to FIG. 10 and FIG. 11, a first configuration of one or more exemplary gear-aligning elements can include, but is not limited to including, a two-part module comprising first part 187A and second part 187B. First part 187A and second part 187B can mate together to house principal gear 200 and surrounding conditional gears 205, there between. Gear-aligning element first part 187A and second part 187B can include, but is not limited to including at least on nub 193 that can be received in one or more corresponding nub-cavities 191 on conditional gear 205. Nubs 193 and complementing nub-cavity 191 can be one of the many aligning features of gear-aligning elements 187. Another example of an aligning feature can be, but is not limited to being, employing one or more dowel pins 196 to engage first part 187A of the aligning element and second part 187B of the aligning element. First part 187A and second part 187B can further comprise at least one dowel-pin insert 197 that can be configured to receive corresponding dowel pin 196, thus engaging the two parts. First part 187A of the gear-aligning element can comprise a first set of dowel pin inserts 197A wherein dowel pins 196 can be substantially trapped. In some configurations, a substantial part of the one or more dowel pins 196 can be permanently or temporarily trapped in the corresponding dowel-pin insert 197 on first part 197A of the gear-aligning element and/or second part 197B of the gear aligning element. An ally dowel pin insert 197 can be provided on the other of either first part 187A or second part 187B, wherein an untrapped or exposed part of dowel pin 196 can be temporarily or permanently received to allow mating of first part 187A and second part 187B.

Continuing to refer to FIG. 10 and FIG. 11, gear-aligning element first part 187A and second part 187B can include, but are not limited to including, at least one spacer 190. First part 187A of the gear aligning element can comprise a first set of spacers 190A and second part 187B of the gear aligning element can comprise a second set of spacers 190B. Spacers 190 can serve to occupy un-operational spaces between and/or in the vicinity of the participating gears in gear drive 161. Spacers 190 can include, but are not limited to including, at least one protrusion in gear-aligning element first part 187A and second part 187B, disposed to substantially cage principal gear 200 and surrounding conditional gears 205 at their respective positions during operation of gear drive 161. In some configurations, spacers 190 can assist nubs 193 and nub receiving cavity 191, dowel pin 196 and dowel-pin insert 197, in maintaining the gear alignment of the gear drive. In other configurations, various permutations and combinations of these alignment features can be used. In some configurations, any one of the discussed alignment features can be used.

Figures 4, 4G, 5, 6, 7, 8, 9, 10, 11, 12:
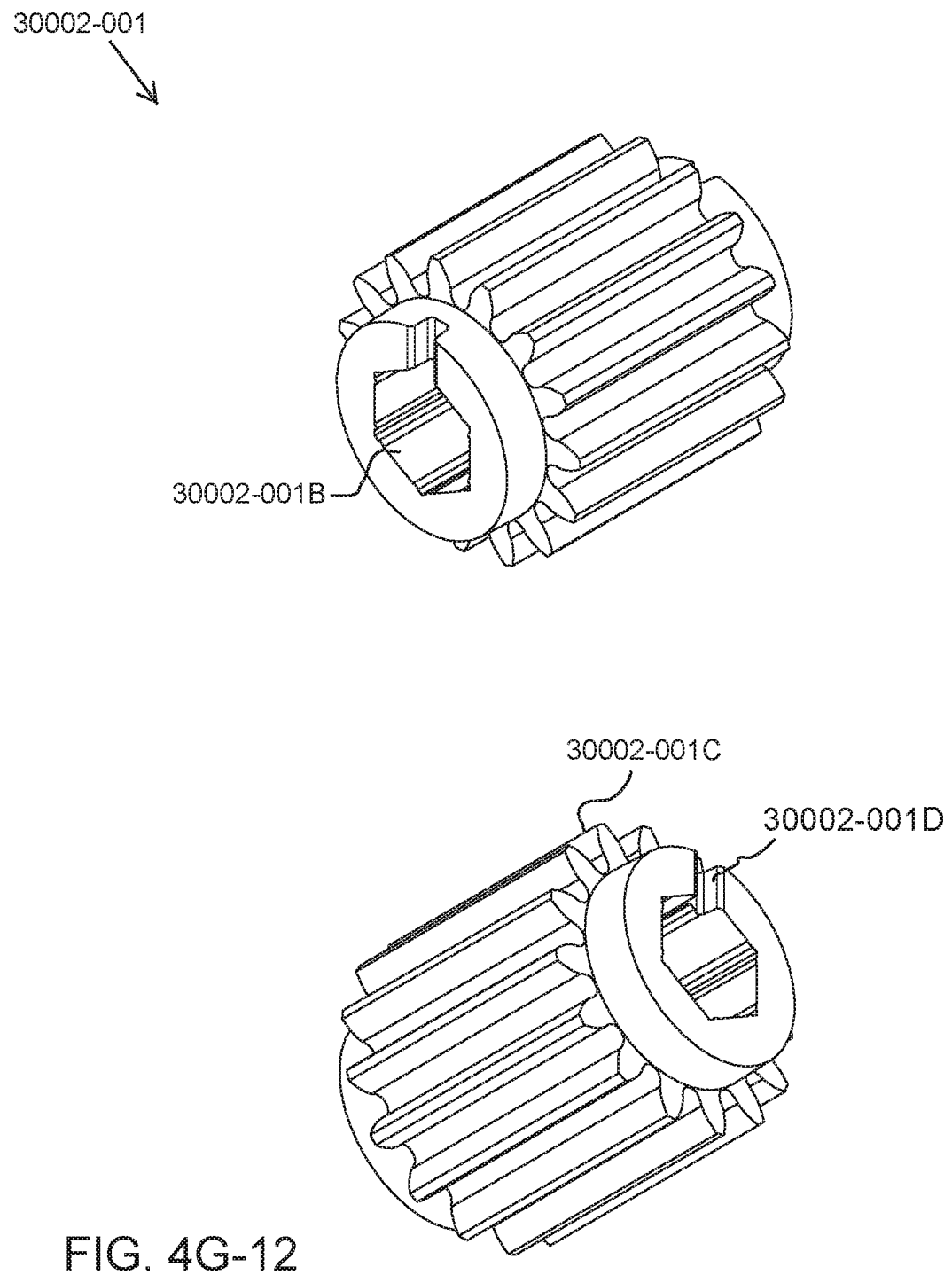
Figures 4, 4G, 5, 6, 7, 8, 9, 10, 11, 12, 13, 14, 14A:
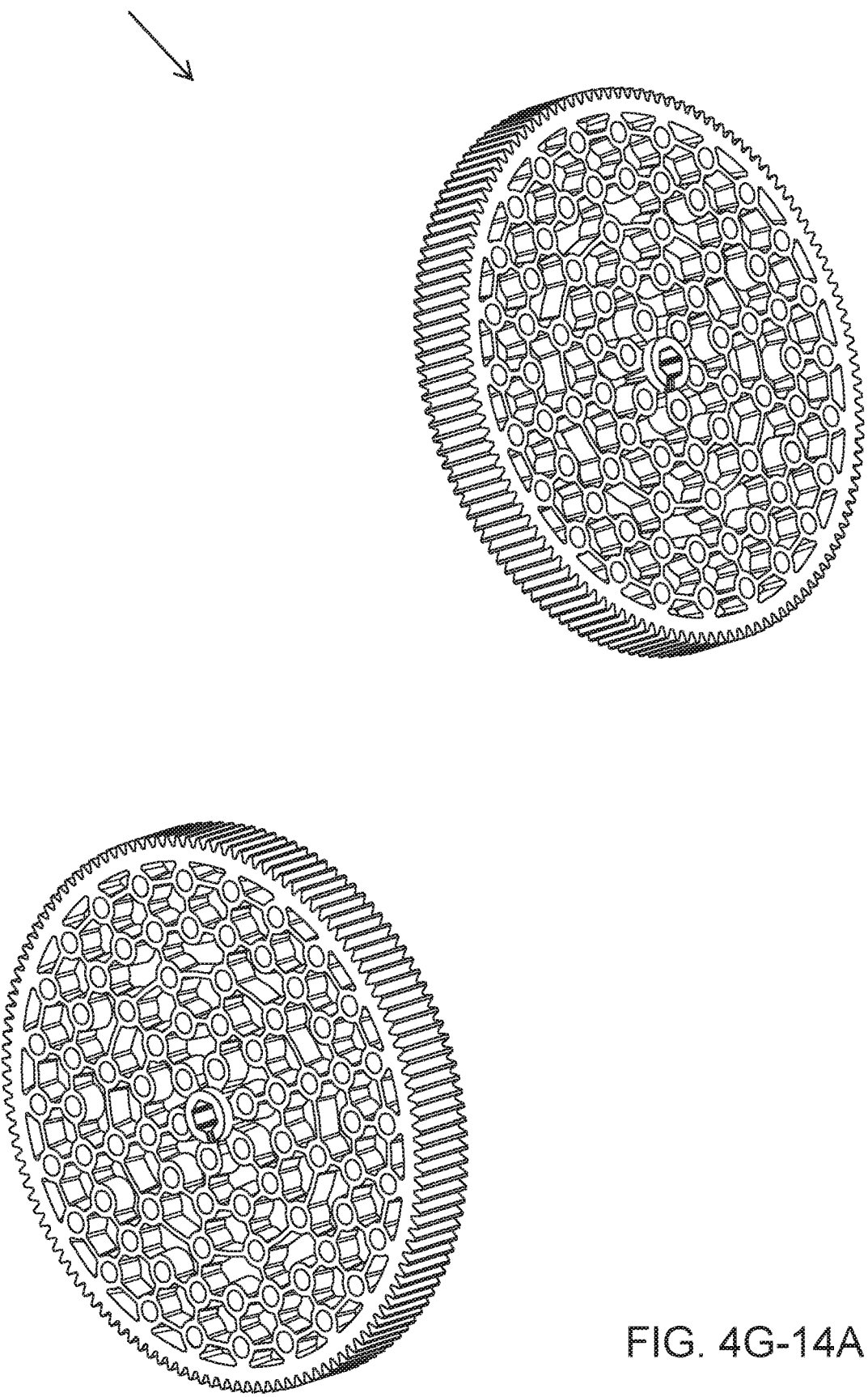
Figure 5:
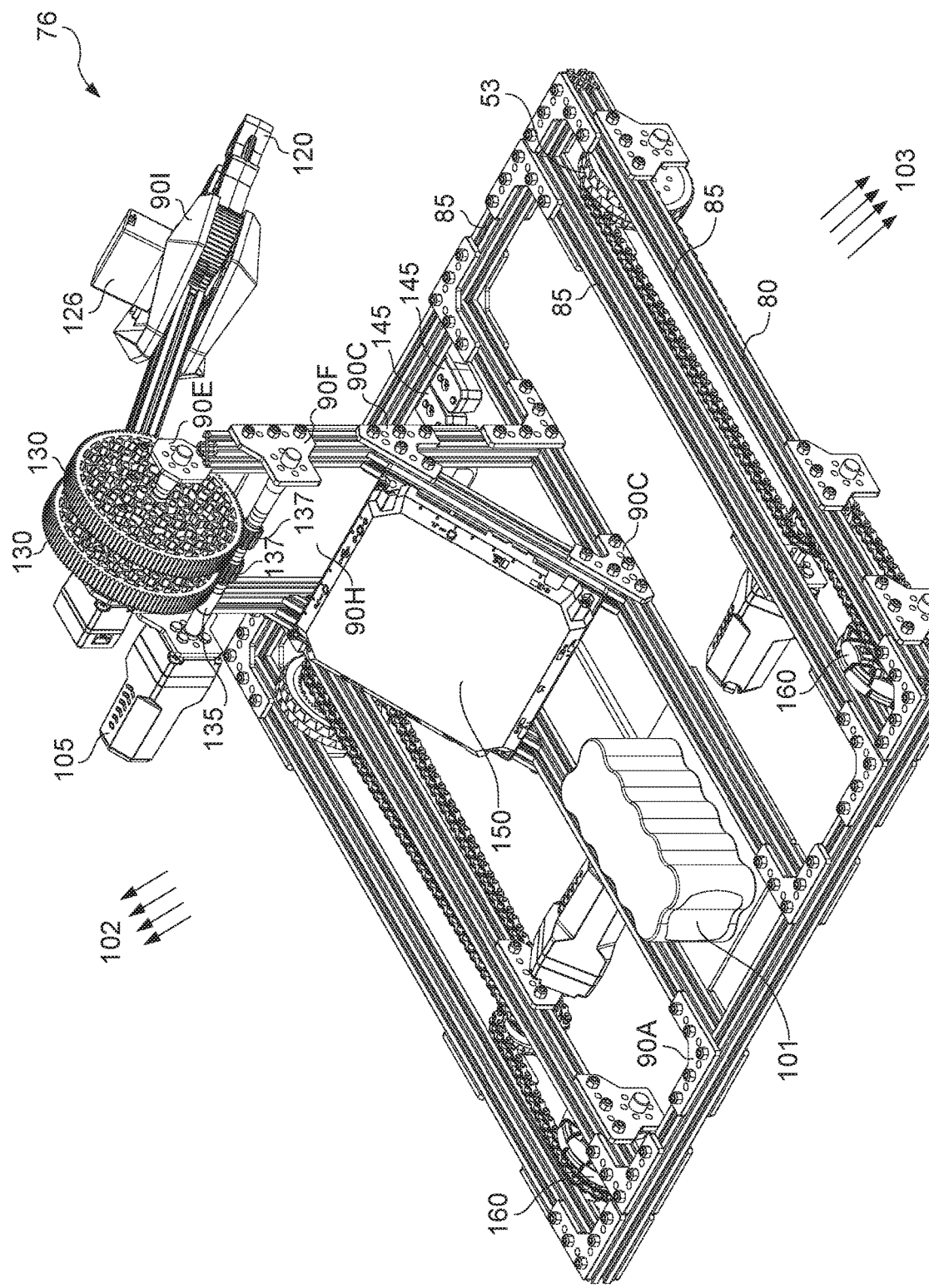
Figure 12:
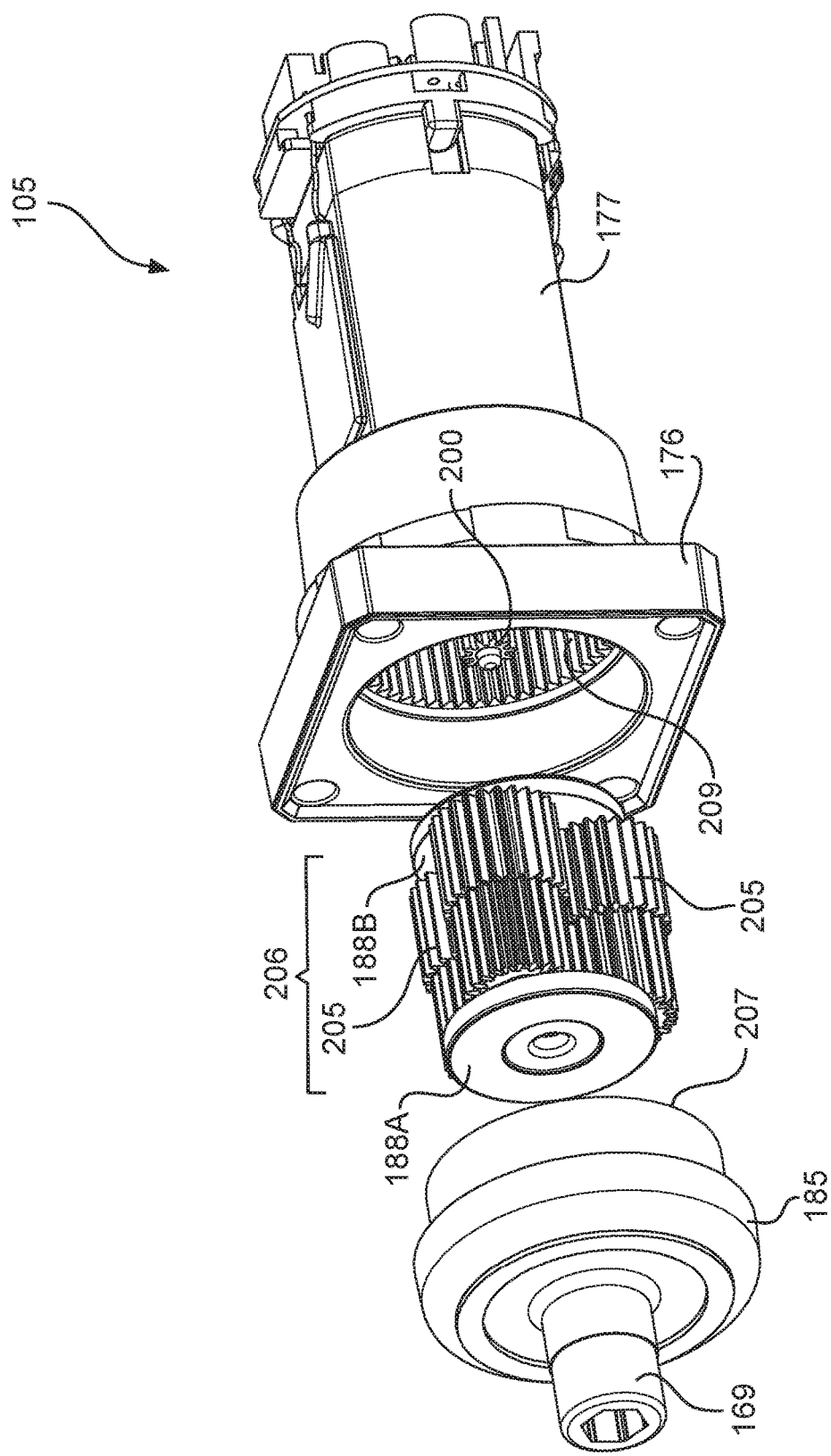
Figure 12A:
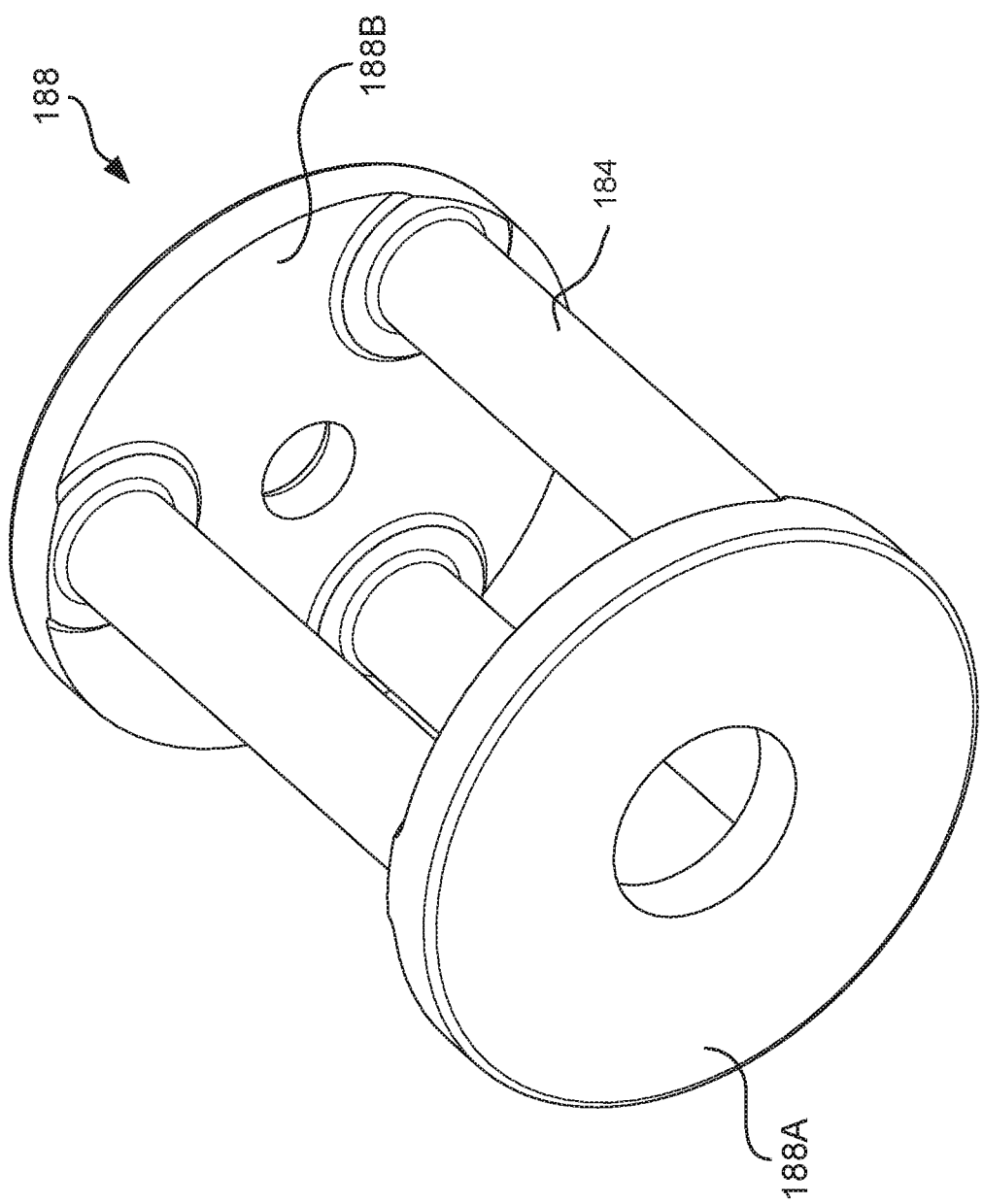
FIG. 12A is a perspective view of the gear carrier of the present configuration.
Figure 13:
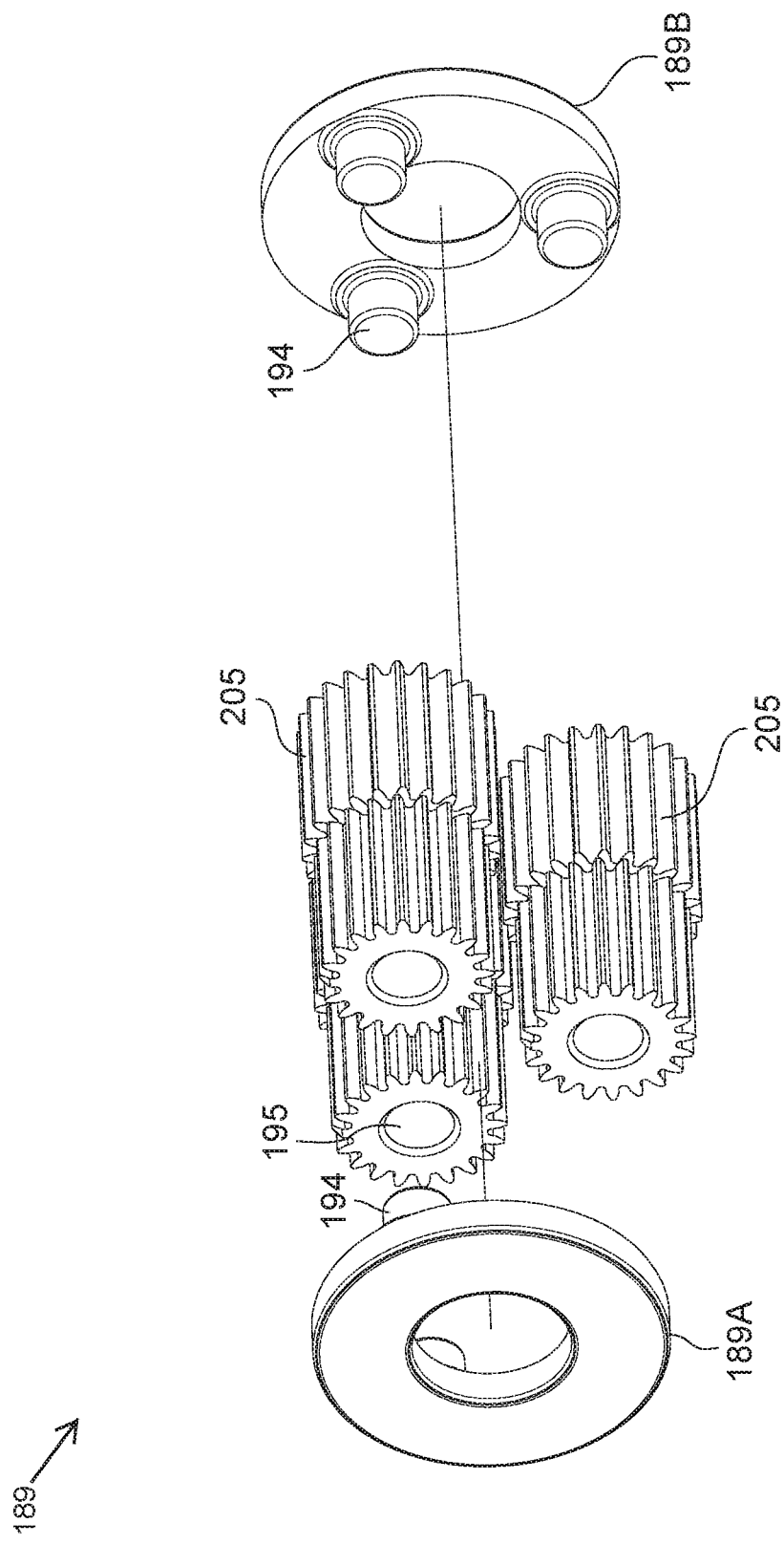
Figure 14:
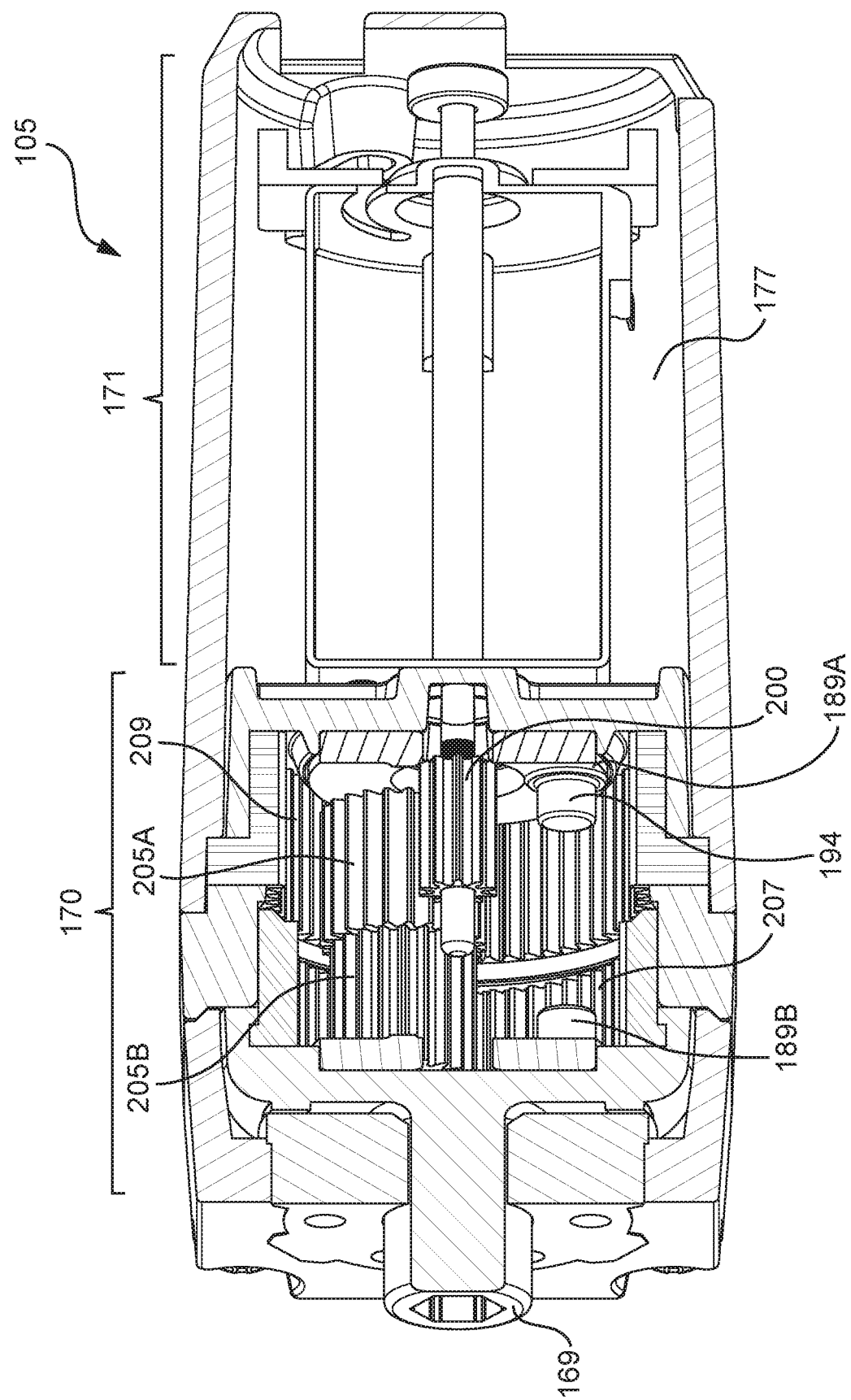

Referring now primarily to FIG. 12, FIG. 12A, and FIG. 13, a second configuration of gear aligning element 188 (FIG. 12) can serve to appropriately align participating principal gear 200 and surrounding conditional gears 205 of gear drive 161. Second configuration of gear alignment element 188 (FIG. 12) can include, but is not limited to including, terminal discs 188A (FIG. 12) and 188B (FIG. 12). Terminal discs 188A (FIG. 12) and 188B (FIG. 12) can be engaged by means of elongated bars 184 (FIG. 12A) extending through an axial groove (not shown) of conditional gears 205 (FIG. 12), such that the geared-teeth of conditional gears 205 (FIG. 12) can extend away from elongated bars 184 (FIG. 12A) and can be disposed substantially perpendicular to elongated bars 184 (FIG. 12A). In some configurations, if gear-aligning element 188 (FIG. 12A) is a single continuous part, elongated bars 184 (FIG. 12A) can be wrapped inside conditional gears 205 (FIG. 12). Wrapping of elongated bars 184 (FIG. 12A) within the axial grooves (not shown) of conditional gears 205 (FIG. 12) is shown in the area 206 (FIG. 12). FIG. 12A depicts an independent or unwrapped gear aligning element 188 (FIG. 12A) to providing clarity in discussion. A third configuration of gear aligning element 189 (FIG. 13) can comprise first part 189A (FIG. 13) and second part 189B (FIG. 13) and can include, but is not limited to including, a terminal disc with at least one aligning nub 194 (FIG. 13). Aligning nubs 194 (FIG. 13) can be received by a plurality of corresponding nub-inserts 195 (FIG. 13) provided on conditional gears 205 (FIG. 13). In some configurations, a combination of gear-aligning elements first part 187A (FIG. 11), second part 187B (FIG. 11), 188 (FIG. 12A), 189A (FIG. 13), 189B (FIG. 13) and/or the like can be employed for ensuring appropriate placement of the participating gears in the gear drive.

Referring now primarily to FIG. 14, gear motor 105 can be segregated into first section 171 comprising motor 177 and second section 170 comprising a gear drive with the participating gears. Gear aligning elements first part 189A and second part 189B, can include, but are not limited to including, at least one nub 194. The at least one nub 194 can be inserted in the corresponding nub-inserts 195 (FIG. 13) provided on conditional gears 205. Gears can be interactively arranged in gear motor 105. One or more principal gears 200 can be disposed such that geared teeth of principal gear 200 substantially engage with geared teeth of at least one conditional gears 205 surrounding principal gear 200. Conditional gears 205 can be operatively rested between principal gear 200 and at least one annular gear 209. In some configurations, first section 205A of conditional gears 205 can comprise a known radius and a known number of geared teeth. The known number of geared teeth can operatively mesh with geared teeth of principal gear 200 and geared teeth of annular gear 209. Conditional gears 205 can further comprise second section 205B such that a plurality of geared tooth on second section 205B can operatively mesh with a geared surface of output gear 207. Output gear 207 can further comprise output rotary shaft 169 such that a torque generated by gear motor 105 is advanced to a driven component by means of output rotary shaft 169. In some configurations, annular gear 209 can be held stationary and conditional gears 205 can undergo a rotational motion along with a revolution around an axis (not shown) of principal gear 200. Meshing of the gear teeth on second section 205B of conditional gears 205 (FIG. 13) with the geared surface 206 (FIG. 11) of output gear 207 can cause output gear 207 to rotate about a circular path (not shown) substantially coaxial with principal gear 200.

Figure 15:
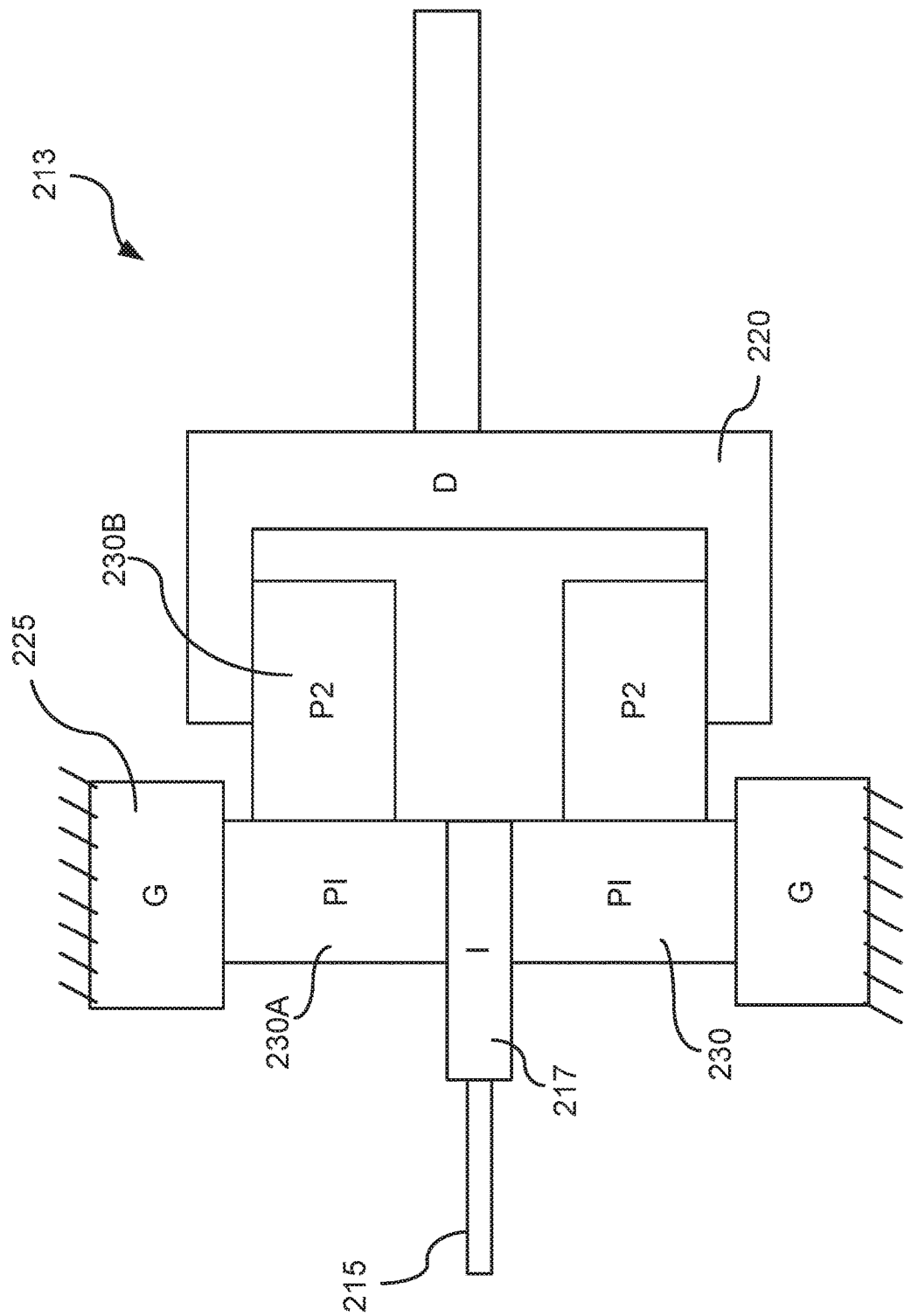

Primarily referring to FIG. 15, gear drive 213 is depicted to support a discussion on gear-reduction calculation related to the exemplary gear motor of electro-mechanical agent 23 (FIG. 1). A gear-reduction aims at reducing an incoming rotational speed to a desired rotational speed, thereby obtaining a higher torque output from gear drive 213. Principal gear 217 can be centrally disposed in gear drive 213. For convenience in discussing the gear reduction calculation, principal gear 217 can be alphabetically represented by 'I'. Principal gear 217 can comprise $N_I$ number of geared teeth. A radius of principal gear 217 can be alphabetically referred to as $R_I$. Additionally, principal gear 217 can be operatively surrounded by a plurality of conditional gears 230. In some configurations, conditional gears 230 can comprise first section 230A with a first set of geared teeth and second section 230B with a second set of geared teeth. For further explanation of the perspective view and ease in discussing the related gear reduction calculation, single conditional gear 230 can be considered. First section 230A of single conditional gears 230 can be referred to as P1 and second section 230B can be referred as P2. Similarly, first part P1 of conditional gear 230A can comprise $N_{P1}$ number of geared teeth on its meshing surface and second part P2 of conditional gear 230b can comprise $N_{P2}$ number of geared teeth. In some configurations, conditional gears 230 can be a compound gear such that a first radius of first section 230A can be denoted by $R_{P1}$ which is distinct from a second radius of second section 230B of conditional gear 230 and can be denoted by $R_{P2}$.

Continuing to refer to FIG. 15, the geared teeth of first section 230A of conditional gears 230 mesh with the geared teeth of fixed annular gear 225. For convenience in discussing gear-reduction calculations, fixed annular gear 225 can be alphabetically represented as 'G'. Conditional gears 230 can interact with output ring gear 220. Output ring gear 220 can be alphabetically represented by 'D'. Output ring gear 220 can comprise a plurality of geared teeth on a surface in contact with conditional gears 230. Hence a plurality of geared teeth can mesh with the geared teeth of output ring gear 220. In some configurations, geared teeth in first part P1 of conditional gear 230 can substantially mesh with the geared teeth on annular gear 225 whereas the geared teeth on second part P2 of conditional gears 230 can substantially mesh with the geared teeth on output ring gear 220. Centrally disposed principal gear 217 can be configured to undergo rotational motion when connected with a motor (not shown) by means of motor shaft 215.

Continuing to refer to FIG. 15. Rotational velocities of each component in gear drive 213 can be represented by the following symbols:

| Component | Alphabetical representation | Representation for rotational velocity |
|---|---|---|
| Rotational velocity of principal gear 217 | I | $\omega_I$ |
| Rotational velocity of first section of the conditional gear 230A | $P_1$ | $\omega_{P1}$ |
| Rotational velocity of second section of the conditional gear 230B | $P_2$ | $\omega_{P2}$ |
| Rotational velocity of the output ring gear 220 | D | $\omega_D$ |
| Considering a central axis of the gear drive, a precession velocity of the participating gears 230A/B during operation of the gear motor 105 | — | $\omega_{precession}$ |
| Rotational velocity of the participating gears with respect to precession of the conditional gears P | — | $\omega_{gear\text{-}symbol/precession}$ |

Continuing to refer to FIG. 15, rotational velocity of principal gear 217 can be obtained by the expression:

$$\omega_I = \omega_{I/precession} + \omega_{precession}$$

where $\omega_I$=rotational velocity of sun gear I 217, $\omega_{precession}$ can represent precision velocity of sun gear I 217, during operation of gear motor 105 (FIG. 14), and $\omega_{I/precession}$ can represent rotational velocity of the sun gear I 217 with respect to precession of the conditional gears P.

The rotational velocity of principal gear 217 can be obtained by an addition of the precession velocity of principal gear 217 and rotational velocity of principal gear 217, where the rotational velocity of principal gear 217 added due to the precession effect during operation of gear-drive 213. A surface speed of principal gear 217 can be obtained by $\omega_I^* R_I$, where $R_I$ stands for the radius of principal gear 217. In some configurations, annular gear 225 can be held stationary, as a result of which a precession speed of conditional gears 220 can be half of the surface speed of principal gear 217. As a result, the precession rotational velocity of conditional gear 230 can be represented as $$\omega_{precession} = \frac{\frac{s}{z}\omega_I r_I}{r_I + r_{P_1}} \quad (1)$$

For convenience in calculation, a constant 'k' can be considered to obtain a relationship between radius $R_{P1}$ and number of geared teeth $N_{P1}$ of the respective component of the gear drive. On substituting the values in equation (1), the following equation can be obtained:

$$\omega_{precession} = \frac{\frac{s}{z}\omega_I k N_I}{k N_I + k N_{P_1}} = \frac{1}{2}\frac{N_I}{N_I + N_{P_1}}\omega_I \quad (2)$$

The following table can be considered for providing relationship between rotational velocity of the participating gear with rotational velocity of the participating gear with respect to a precession effect:

| Gear x | $\omega_{x/precession}$ | $\omega_x$ | Relationship to previous | |
|---|---|---|---|---|
| I | $\omega_I - \omega_{precession}$ | $\omega_I$ (known) | N/A | |
| $P_1$ | $-\frac{N_I}{N_{P_1}}(\omega_I - \omega_{precession})$ | $\omega_{P_1}$ (not sought) | $\omega_{P_1/precession} = -\frac{N_I}{N_{P_1}}\omega_{I/precession}$ | |
| $P_2$ | $-\frac{N_I}{N_{P_2}}(\omega_I - \omega_{precession})$ | $\omega_{P_2}$ (not sought) | $\omega_{P_2/precession} = \omega_{P_1/precession}$ | |
| D | $-\frac{N_I}{N_{P_1}}\frac{N_{P_2}}{N_D}(\omega_I - \omega_{precession})$ | $-\frac{N_I}{N_{P_1}}\frac{N_{P_2}}{N_D}(\omega_I - \omega_{precession}) + \omega_{precession}$ | $\omega_{D/precession} = \frac{N_{P_2}}{N_D}\omega_{P_2/precession}$ | |

For determining the final output velocity at output ring gear 220, substituting the above obtained equations:

$$\omega_D = -\frac{N_I}{N_{P_1}}\frac{N_{P_2}}{N_D}\left(\omega_i - \frac{1}{2}\frac{N_I}{N_I + N_{P_1}}\omega_i\right) + \frac{1}{2}\frac{N_I}{N_I + N_{P_1}}\omega_i$$

$$= -\frac{N_I}{N_{P_1}}\frac{N_{P_1}}{N_D}\omega_i + \frac{1}{2}\frac{N_I}{N_{P_1}}\frac{N_{P_1}}{N_D}\frac{N_I}{N_I + N_{P_1}}\omega_i + \frac{1}{2}\frac{N_I}{N_I + N_{P_1}}\omega_i$$

$$= \left(-\frac{N_I}{N_{P_1}}\frac{N_{P_2}}{N_D} + \frac{1}{2}\frac{N_I}{N_{P_1}}\frac{N_{P_2}}{N_D}\frac{N_I}{N_I + N_{P_1}} + \frac{1}{2}\frac{N_I}{N_I + N_{P_1}}\right)\omega_i$$

Further simplification and division can produce the gearbox ratio, as follows:

$$R = \frac{\omega_i}{\omega_D} = \frac{2}{\frac{N_I}{N_I + N_{P_1}}\left(\frac{N_I}{N_{P_1}}\frac{N_{P_2}}{N_D} + 1\right) - 2\frac{N_I}{N_{P_1}}\frac{N_{P_2}}{N_D}}$$

Continuing to refer to FIG. 15, in some configurations, a larger gear reduction can be obtained as values of the radii of annular gear 225 and output ring gear 220 come close. In some configurations the gear reductions can be at least 80:1. Additionally, the number of geared teeth on any of the participating gears in gear drive 213 can influence the gear-reduction value. The following table logs a series of gear sizes with respect to the number of geared teeth on respective gears such as principal gear 217, conditional gears 230, annular gear 225 and output ring gear 220:

| Principal Gear I | First section of conditional gear P1 | Second section of conditional gear P2 | Gear Ratio | Ring Gear G | Output D |
|---|---|---|---|---|---|
| 10 | 20 | 17 | 62.66667 | 50 | 47 |
| 10 | 23 | 20 | 81.26667 | 56 | 53 |
| 10 | 26 | 23 | 102.2667 | 62 | 59 |
| 10 | 32 | 29 | 151.4667 | 74 | 71 |
| 10 | 38 | 35 | 210.2667 | 86 | 83 |
| 14 | 22 | 19 | 57.61905 | 58 | 55 |
| 14 | 28 | 25 | 89.33333 | 70 | 67 |
| 14 | 34 | 31 | 127.9048 | 82 | 79 |
| 14 | 43 | 40 | 198.619 | 100 | 97 |
| 15 | 24 | 21 | 64 | 63 | 60 |
| 15 | 30 | 27 | 96 | 75 | 72 |
| 15 | 36 | 33 | 134.4 | 87 | 84 |

-continued

| Principal Gear I | First section of conditional gear P1 | Second section of conditional gear P2 | Gear Ratio | Ring Gear G | Output D |
|---|---|---|---|---|---|
| 15 | 42 | 39 | 179.2 | 99 | 96 |
| 16 | 32 | 29 | 102.6667 | 80 | 200 |
| 16 | 35 | 32 | 121.0417 | 86 | 83 |
| 16 | 38 | 35 | 140.9167 | 92 | 89 |
| 16 | 41 | 38 | 162.2917 | 98 | 95 |
| 16 | 44 | 41 | 185.1667 | 104 | 101 |

Figure 15A:
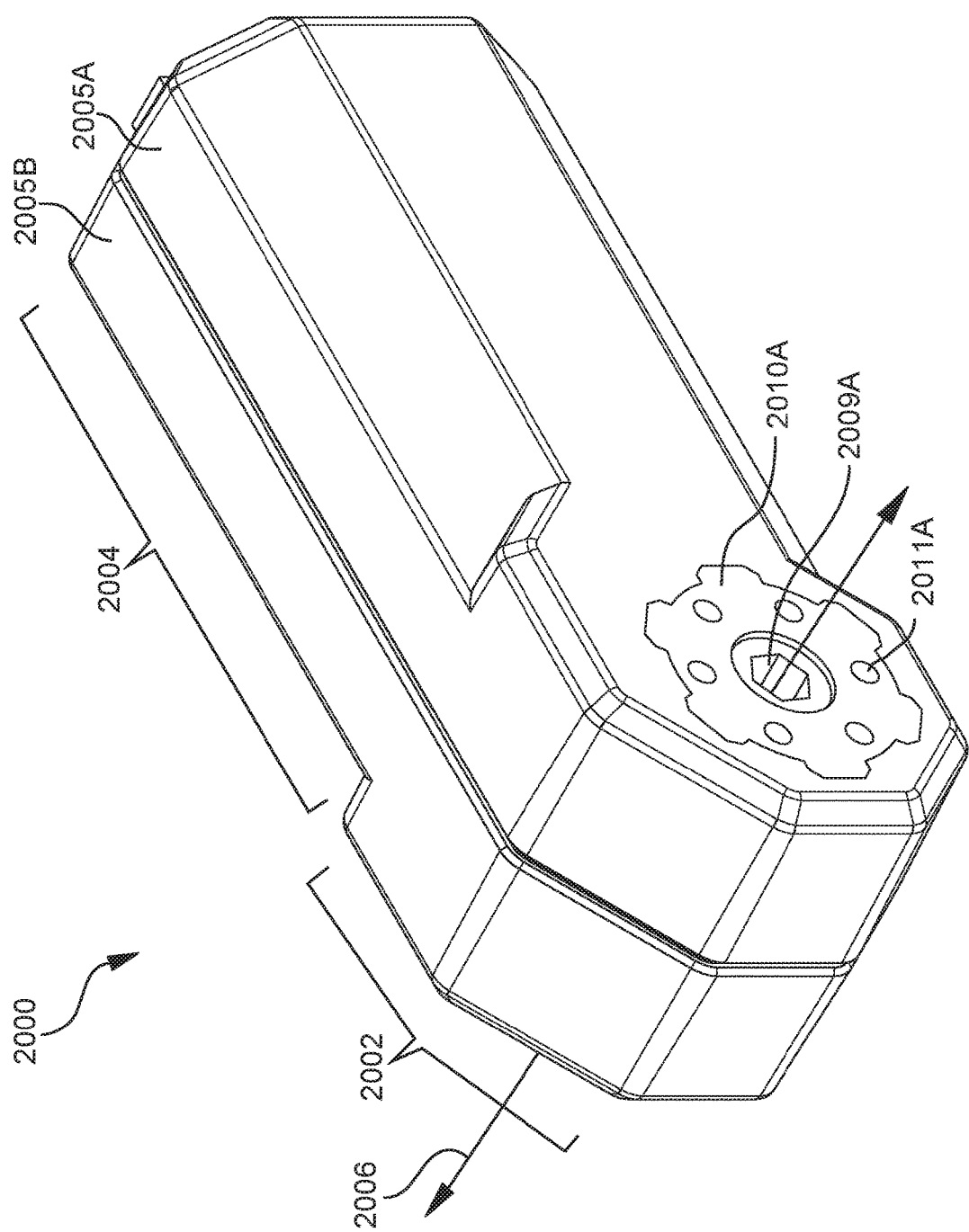
FIG. 15A is a perspective view of a second configuration of the gearmotor of present teachings.
Figures 1, 15A:
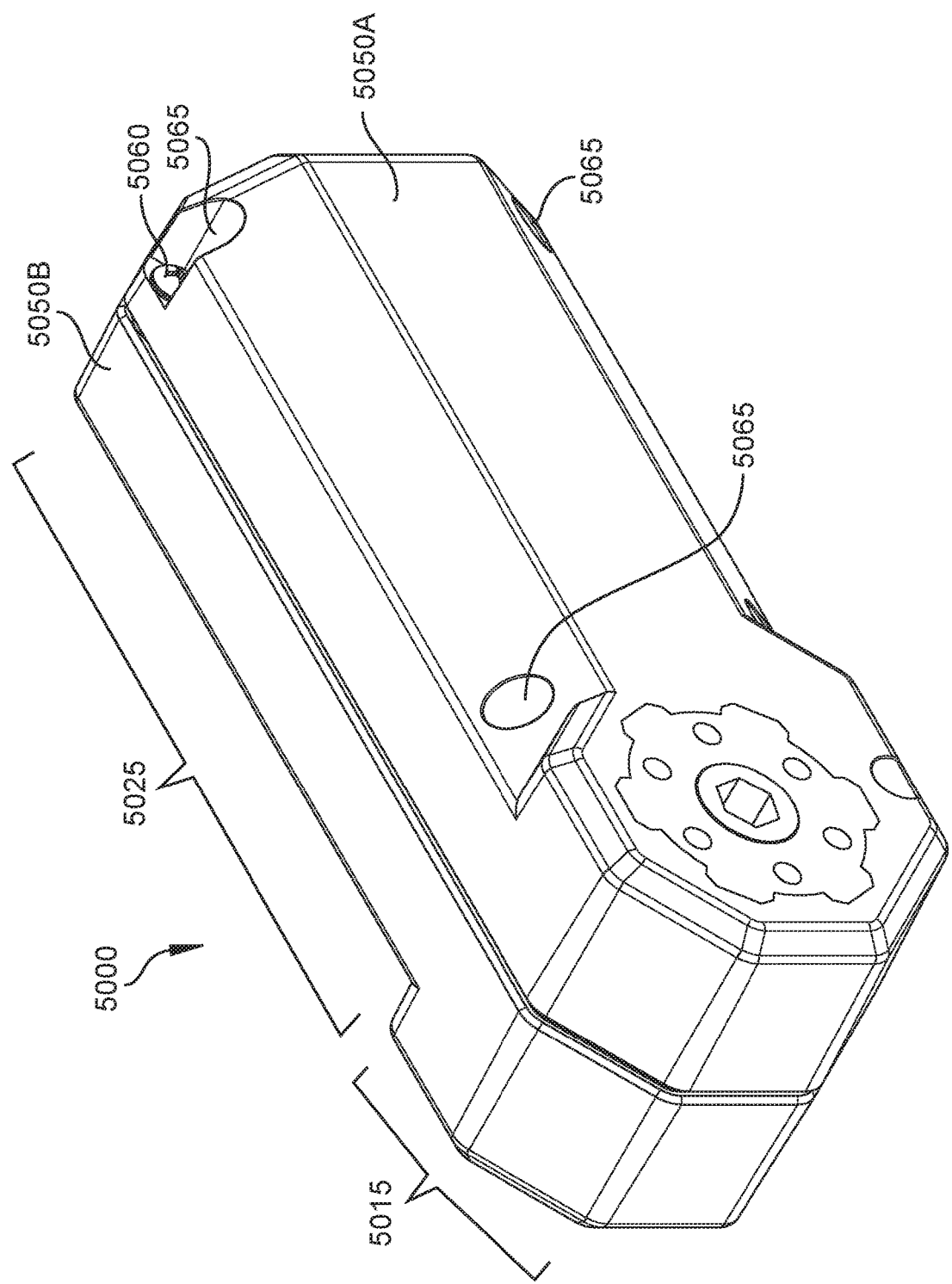

Referring now to FIG. 15A, modular construction kit can include a second exemplary configuration of gearmotor 2000. This exemplary configuration can be employed in conjunction with or replace first exemplary gearmotor 105

(FIG. 7) and can be configured for generating desirable torque to fulfill one or more tasks of exemplary electromechanical agent 75 (FIG. 3). Gearmotor 2000 can include an enclosure that can form a continuous covering to guard one or more torque producing mechanisms (not shown) within the enclosure. In some configurations, the enclosure can comprise first enclosure covering 2005A and second enclosure covering 2005B. First and second enclosure coverings 2005A, 2005B can enclose torque producing mechanisms by travelling and uniting along horizontal axis 2006. Engagement of first and second enclosure plates 2005A, 2005B can provide a cavity or space 2007 (FIG. 15B) for accommodating torque producing mechanism therein.

Continuing to refer to FIG. 15A, gearmotor 2000 can be divided into first portion 2002 and second portion 2004. First portion 2002 can comprise a plurality of gears meshed to produce a resultant desirable output torque. The plurality of gears can be collectively referred to as a gear drive (not shown). Output window 2009A on connecting plate 2010A and an analogous output window on connecting plate 2010B (FIG. 15C) can serve as outlets for resultant torque derived from the enclosed gear drive. An output shaft (not shown) of gear drive can extend from output window 2009A and the analogous output window on connective plate 2010B (FIG. 15C) to engage with a module outside of gear motor 2000 for torque transfer. In some configurations, connecting plates 2010A and 2010B can be further configured to engage with other modules, such as but not limited to, elementary unit 85 (FIG. 15H), of the construction kit. This engagement can be achieved by providing engagement means such as, but not limited to, engagement holes or engagement nubs that can receive or be accepted by complementing nubs or holes of engaging modules. Some configurations of the engaging holes can comprise threads configured to accept threads of an incoming screw. In some configurations, gearmotor 2000 can include coupling holes 2011A and 2011B (FIG. 15C) on connecting plates 2010A and 2010B (FIG. 15C), respectively. Second portion 2004 can house a motor such as a DC motor or AC motor or a combination of two. The motor can be chosen from diverse motor sizes for providing varied incoming torque that can be modified by gear drive to obtain a desirable output torque.

Referring now primarily to FIG. 15A-1 enclosure 5000 of gear motor 2000 (FIG. 15A) can comprise at least one gear drive 5070 (FIG. 15C-1) that can be substantially similar to gear drive in gear motor 2000 (FIG. 15A). In some embodiments, gear drive 5070 of enclosure 5000 can comprise a higher number of gears than the gears located in gear motor 2000, and the higher number of gears can be distinctly oriented with respect to the gears of gear motor 2000. It should be noted that previously discussed features related to gear drives 2002, 2002A (FIG. 15C and FIG. 15F); gear motor 2015 (FIG. 15C), sensing agent or encoder 2003 (FIG. 15B) can also be applicable to gear drive 5070 (FIG. 15C-1) and motor 5077 (FIG. 15C-1) and sensing agent 5078 (FIG. 15C-1) of exemplary enclosure 5000. Alteration in gear number and change in orientation can cause crowding of gears in first portion 5015 of enclosure 5000. Desirable functioning of gear motor 2000 can be achieved at least by ensuring a compact enclosure, such as but not limited to, enclosure 5000 for gear drive and the motor therein. This requirement can be fulfilled by providing fastening aids in terms of permanent or non-permanent joints. In some configurations, non-permanent joints such as, but not limited to, screw-nut, bolts, clamps, clasps, clips, latches, pins, rivets, etc. can be included. Exemplary enclosure 5000 can comprise fastening agents 5060 that can be distributed along body of enclosure plates 5050A and 5050B. Enclosure 5000 can further provide fastening slots 5065 for receiving at least one fastening agent 5060 therein. In some configurations, the fastening agent can be a screw with a head and a threaded body configured to enter enclosure plate 5050A and through gear motor 2000, exiting from enclosure plate 5050B. Orientation of the screw can be reversed. A plurality of screws in combination with other fastening agents can be employed on enclosure 5000. In some configurations, employed screws can be self-tapping screws.

Figure 15B:
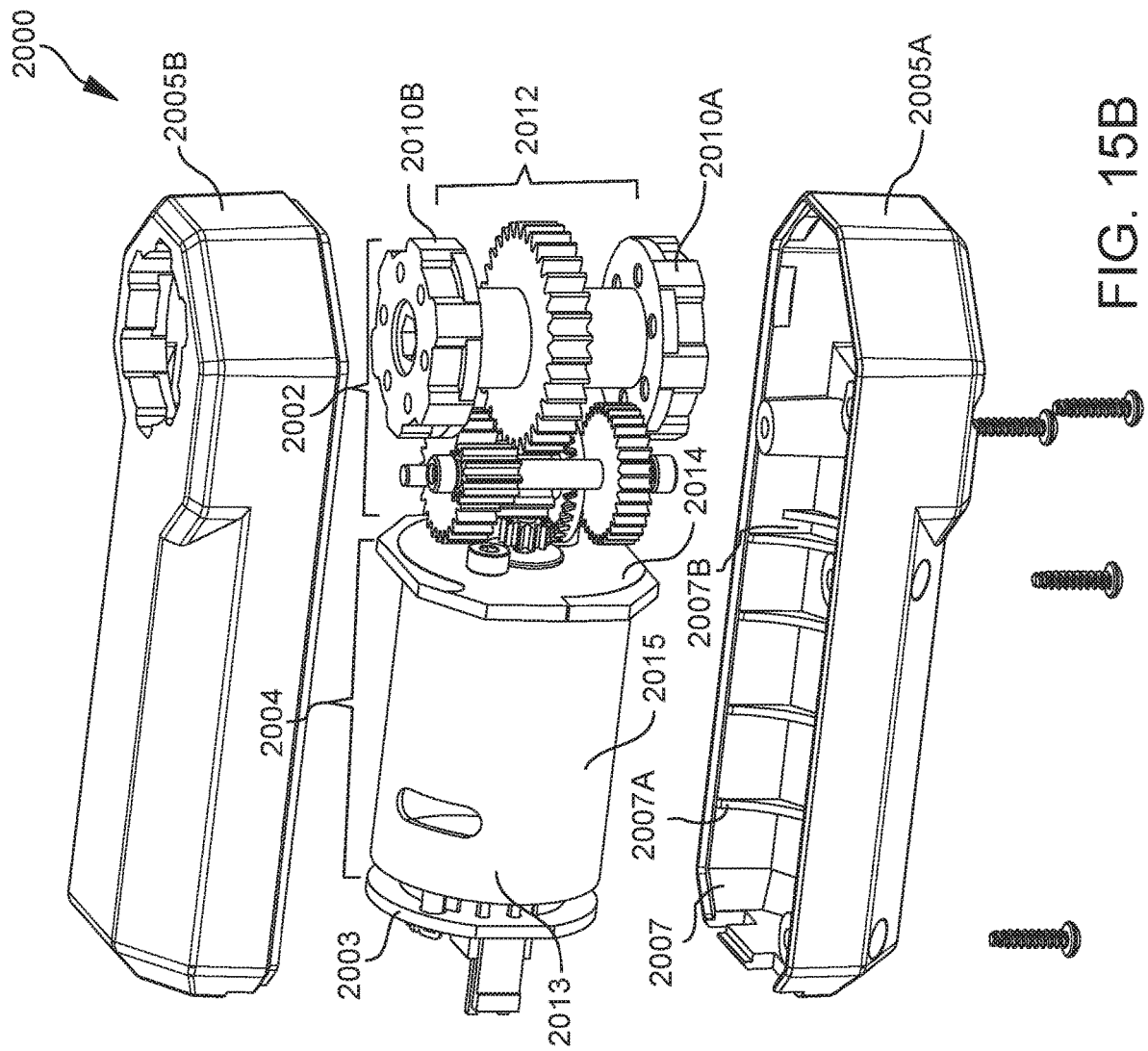
FIG. 15B is an exploded perspective view of the second configuration of the gearmotor as shown in FIG. 15A.
Figure 15C:
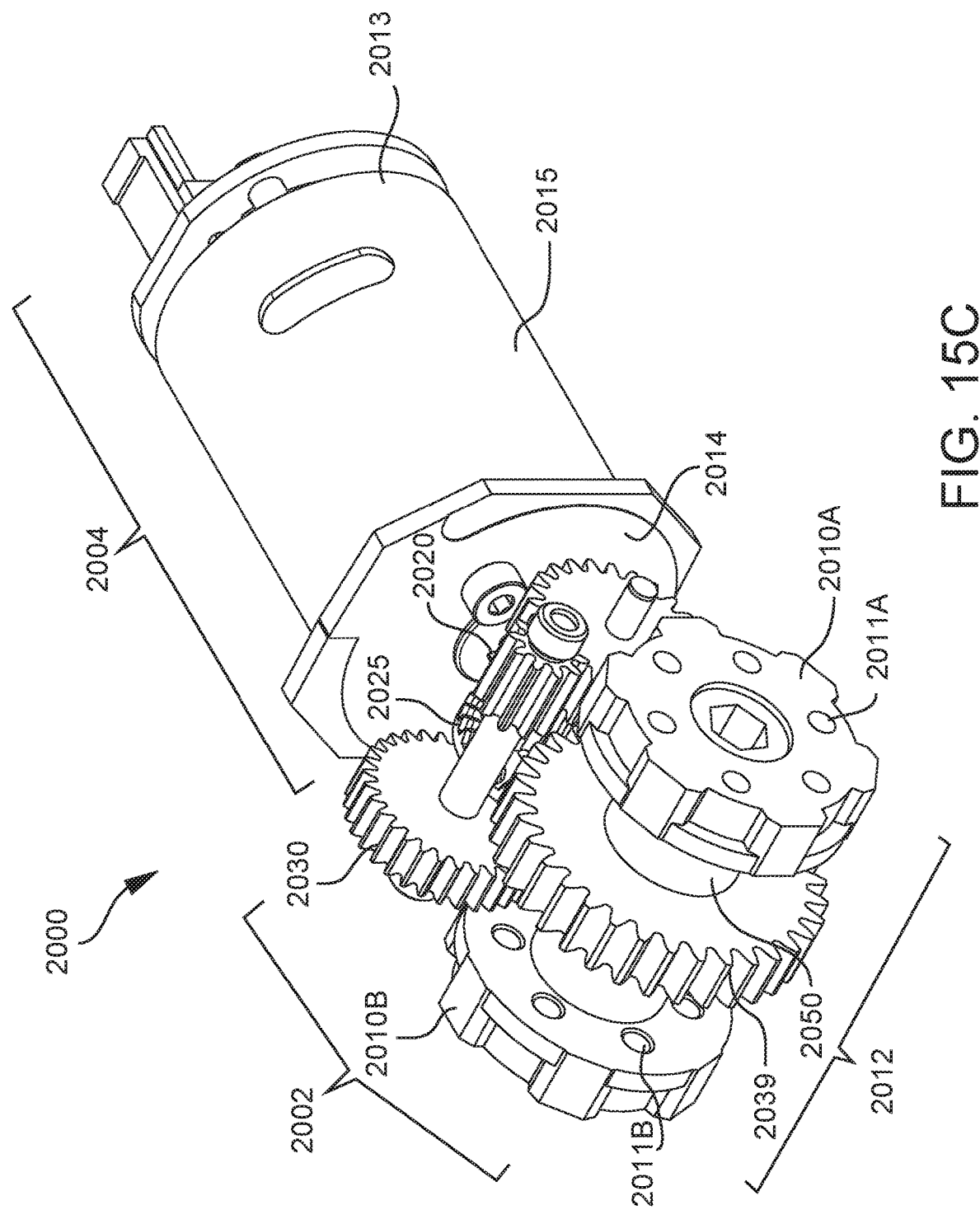
FIG. 15C is a perspective view of gear drive and motor of the gearmotor as shown in FIG. 15B.
Figures 1, 15C:
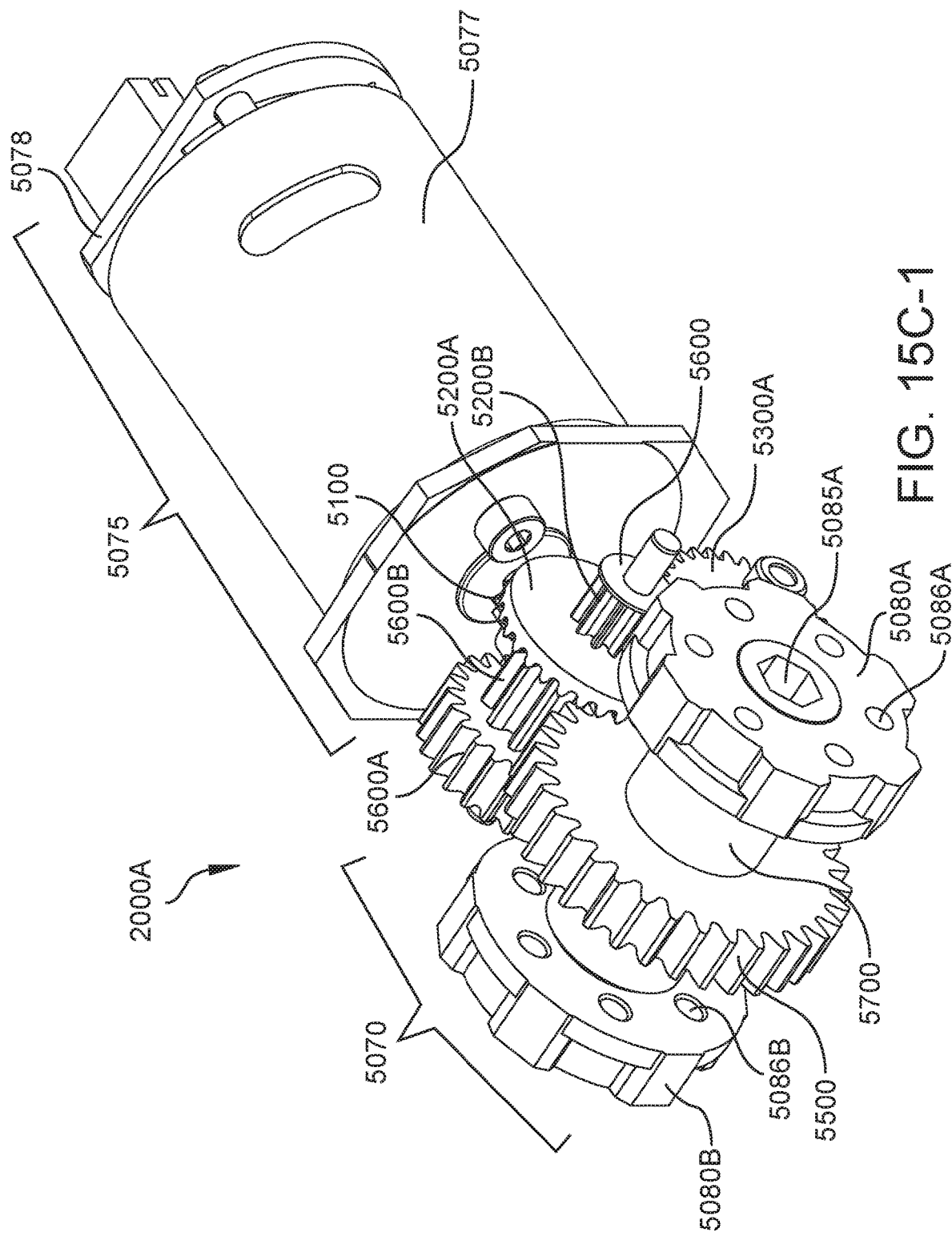

Referring now to FIG. 15B and FIG. 15C, first enclosure covering 2005A and second enclosure covering 2005B can provide a cavity or space 2007 there between, configured to enclose motor 2015 and gear drive 2012. First enclosure covering 2005A and second enclosure covering 2005B can include features that can accommodate various gear and motor configurations. For example, standoffs 2007A can accommodate various shapes and sizes of motors. Slot 2007B can accommodate motor plate 2014 that can include various shapes, widths, and diameters. Any of motors 2015 that meet certain size requirements of first and second enclosure coverings 2005A/2005B can be accommodated by gearmotor 2000 of the present teachings. First enclosure covering 2005A and second enclosure covering 2005B can include features that can accommodate various gear configurations, for example, output winder 2009A (FIG. 15A) that can make torque transmission possible. First enclosure covering 2005A and second enclosure covering 2005B can accommodate an infinite number of gear configurations, two of which are illustrated herein. The present teachings are not limited to the gear configurations presented herein. In some configurations, motor 2015 can be a permanent magnet DC motor configured to provide an incoming rotational motion of 5000 RPM to 20000 RPM. Motor 2015 can further comprise first end 2013 and second end 2014. Sensing agent 2003 can occupy first end 2013 of motor 2015. Motor 2015 can be controlled by the controller according to signals that sensing agent 2003 can receive from outside of gearmotor 2000. Sensing agent 2003 can include, but is not limited to including, an encoder or a continuous potentiometer configured to provide to the controller module 29 (FIG. 1) signals that can assist in proper control of gear motor 2000.

Continuing to refer to FIG. 15B and FIG. 15C, gear drive 2012 can be engaged to motor plate 2014 of motor 2015. A motor shaft (not shown) belonging to motor 2015 can transfer an initial torque to gear drive 2012. Gear drive 2012 can comprise a plurality of gears such as, for example, but not limited to one or more spur gears, helical gears, herringbone gears, internal-external gears, compound gears and the like. Meshed gears can provide a desirable torque output. In some configurations, first portion 2002 can comprise more than one gear drive configured to mesh with each other and can provide torque output. Connecting plates 2010A and 2010B can couple with output shaft 2050 (FIG. 15C) that can carry the resultant torque. Output shaft 2050 can extend from first connecting plate 2010A to second connecting plate 2010B allowing torque transfer from either side.

Referring to FIG. 15C-1, the interior of enclosure 5000 can include first portion 5070 that can include at least one gear drive, and a second portion 5075 that can include a motor 5077 with sensing agent 5078. Functioning of motor 5077 and sensing agent 5078 can be similar to the functioning of the motor and sensing agents of gear motors in configurations described herein. Desirable reduction in torque can vary from one gear drive to another, determined by, but not limited to being determined by, number of gears and gear-teeth, type of gears, and orientation or arrangement of gears. FIG. 15C-1 further depicts a third gear drive configuration. A plurality of gear combinations can be employed in gear drive 5070. First gear 5100 can serve to receive rotational motion from a motor shaft (not shown) through motor 5077. Rotational motion can travel through the gear drive until final out gear 5500 and engages with output shaft 5700. Mounting rings or plates 5080A and 5080B can sandwich output shaft 5700 and can further provide corresponding torque transfer bores 5085A and 5085B. Apertures 5086A and 5086B on respective mounting rings can assist in engagement with enclosures 5050A and 5050B, respectively, as shown in FIG. 15A-1. Sensing agent 5078 can serve to communicate with a controller (not shown) from outside of gear motor 2000A and provide data that can assist the controller with operation of gear motor 200A. Addition or deletion of fastening agents 5060 (FIG. 15A-1) can demand alteration in dimensions of sensing agent 5078 to allow its accommodation within enclosure 5000 (FIG. 15A-1).

Figure 15D:
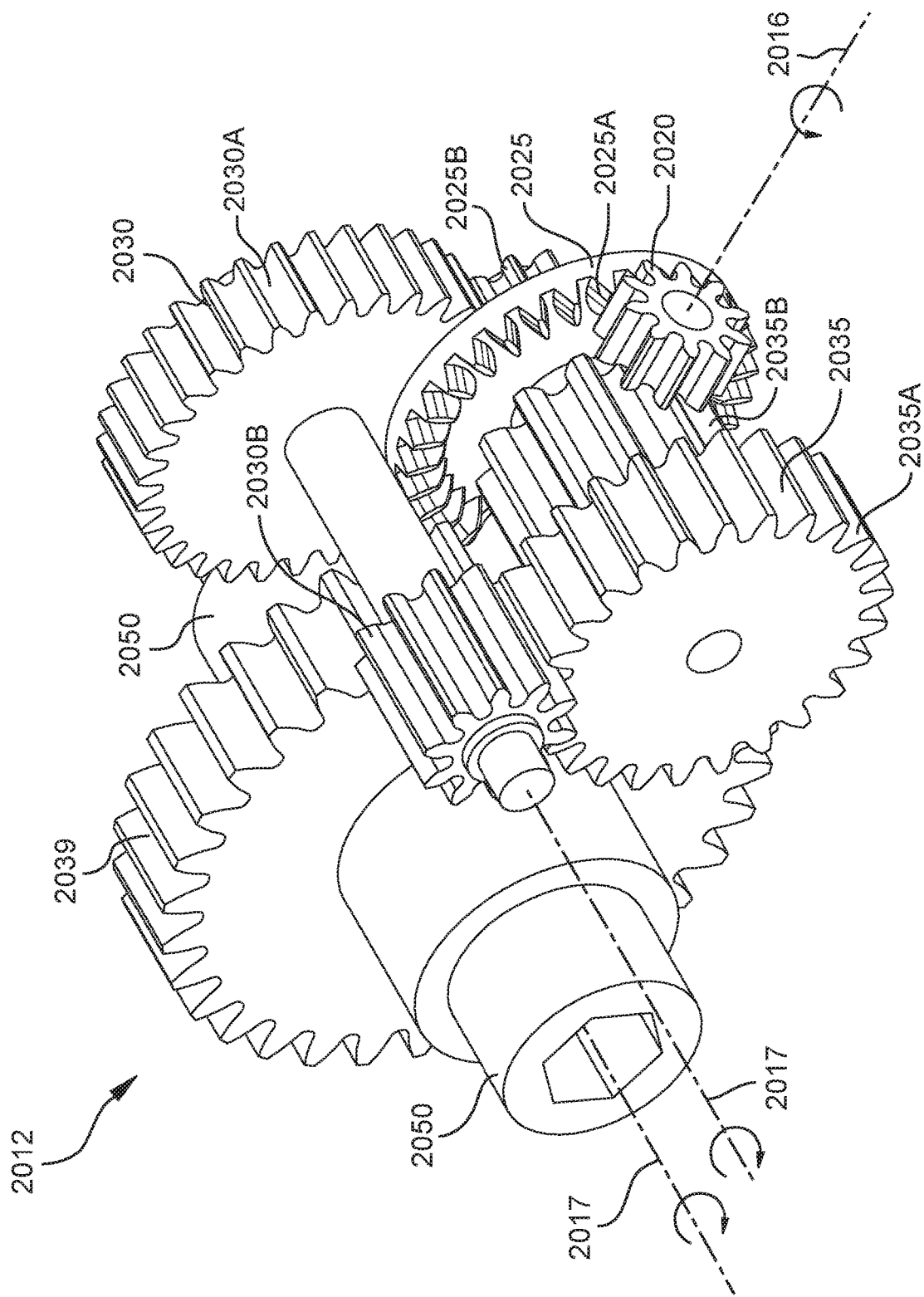
FIG. 15D is a perspective view of gear drive as shown in FIG. 15C.
Figure 15E:
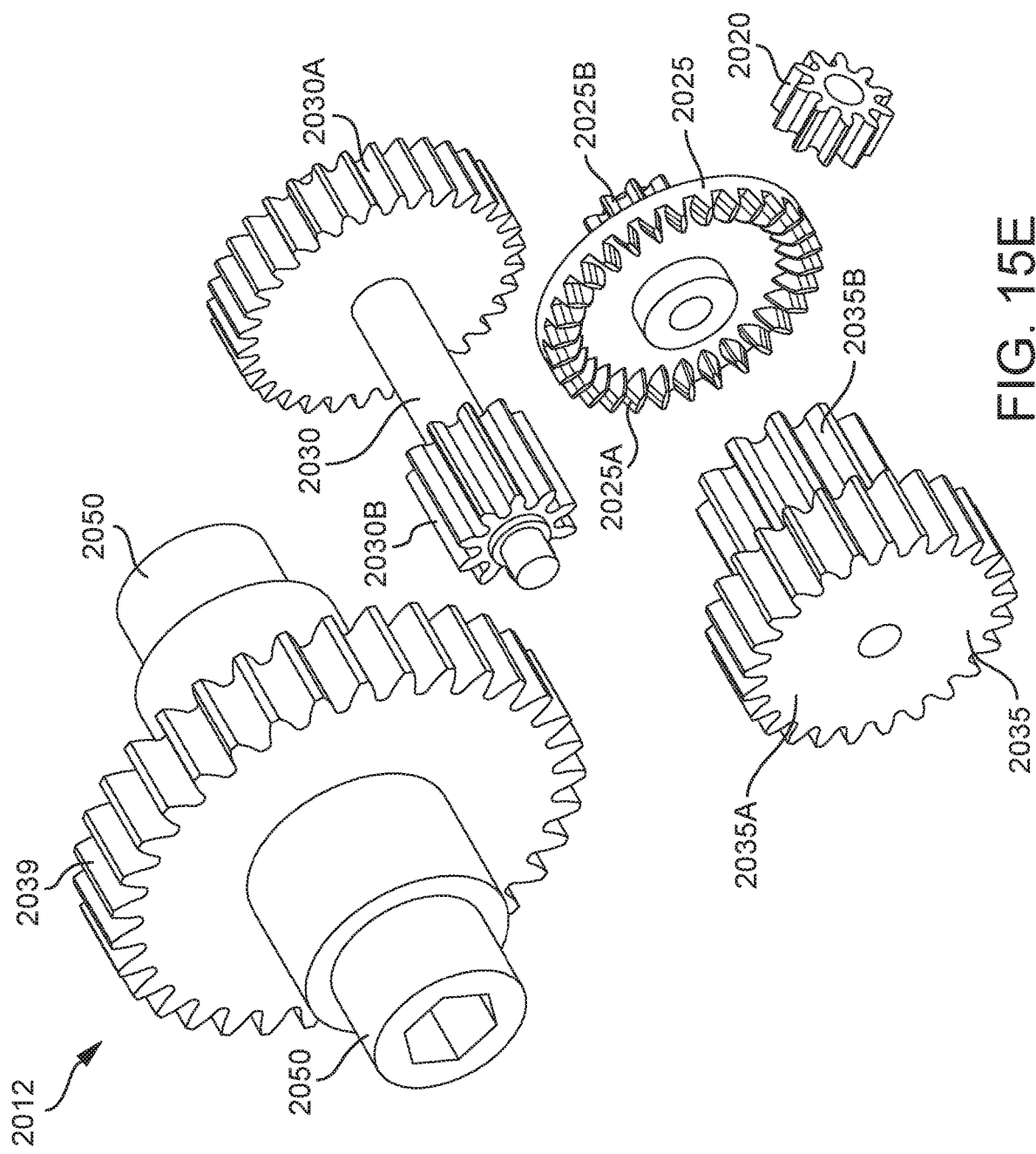
FIG. 15E is an exploded perspective view of gear drive as shown in FIG. 15D.
Figures 1, 15E:
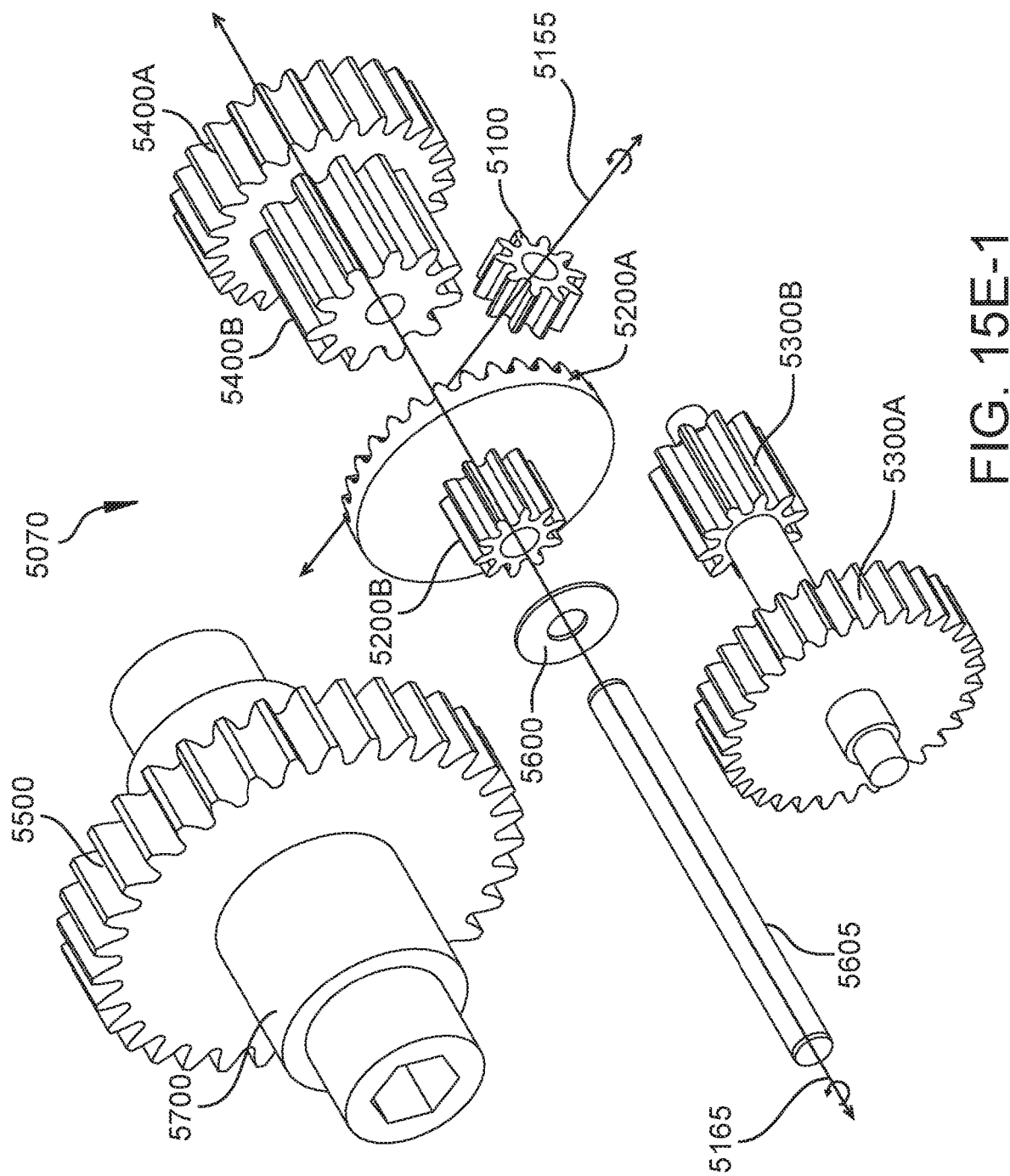
Figures 2, 15E:
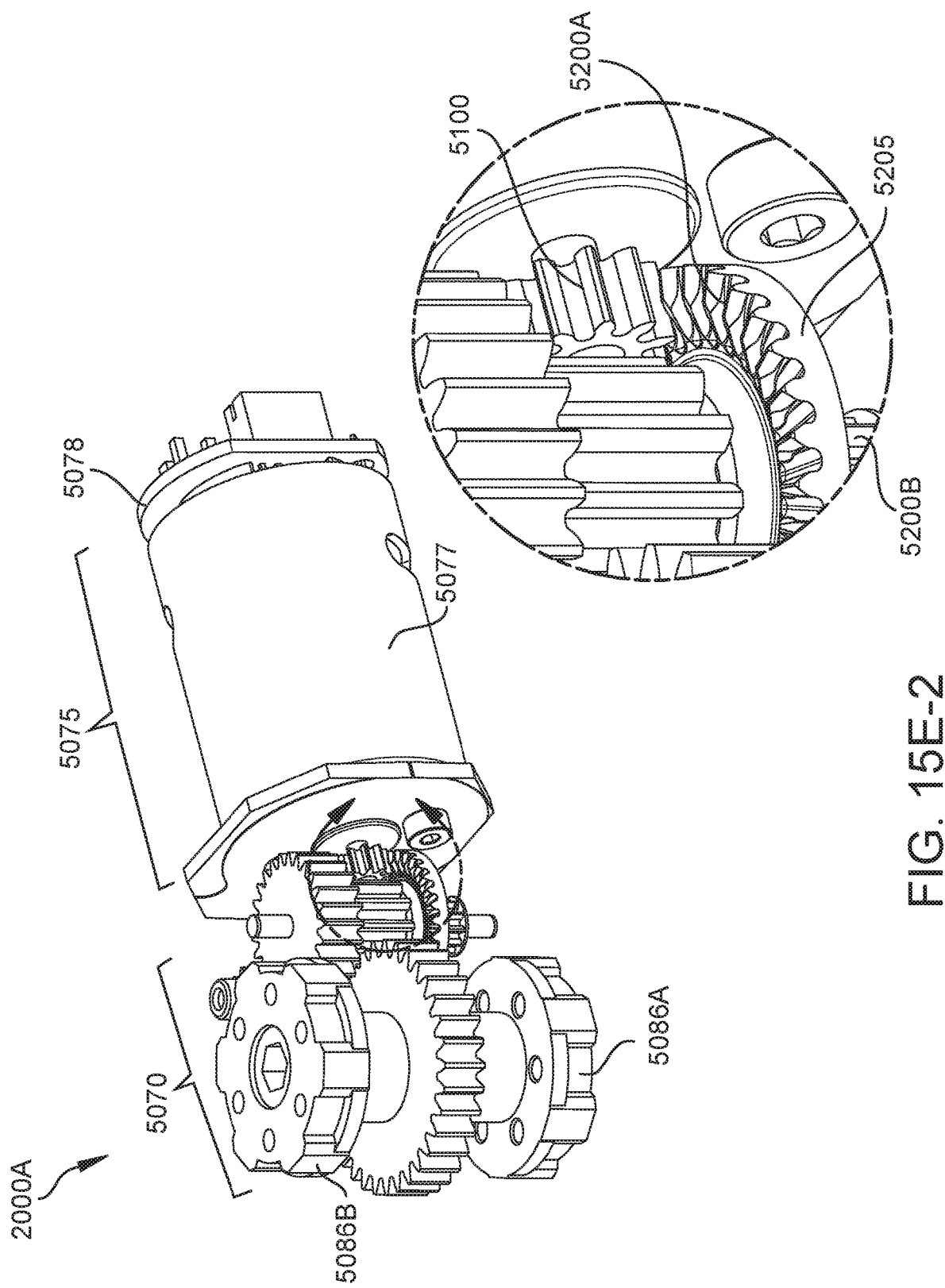

Referring now to FIG. 15D and FIG. 15E, output motor shaft (not shown) from motor 2015 (FIG. 15C) can rotatably couple with at least one input gear 2020. Coupling of input gear 2020 and output motor shaft can occur along rotational axis 2016 that can be parallel or travel through body of motor 2015 (FIG. 15C). Input gear 2020 can transfer incoming torque to crown gear 2025. In addition to reduction or alteration of torque, disposition and interaction of input gear 2020 and crown gear 2025 can also cause an alteration in direction of the incoming rotational torque. In some configurations, the direction can be altered by 90°. In some configurations, diverse disposition and geometry of crown gear 2025 can obtain a desirable alteration in changing the direction of incoming torque. A first stage of torque reduction can be completed by interaction of input gear 2020 and crown gear 2025. In some configurations, input gear 2020 can include 10 teeth and can interact with the geared teeth of crown gear 2025 that can include 30 teeth, causing a reduction of 3:1 during the first stage. The reduction can be altered by altering the number of geared teeth.

Continuing to refer to FIGS. 15D and 15E, crown gear 2025 can further comprise more than one set of gear teeth. A first set of geared teeth 2025A can mesh with geared teeth of input gear 2020 while a second set of geared teeth 2025B can mesh with subsequent gears to transfer torque. A varied set of geared teeth belonging to a single gear can be disposed along a common axis. Some configurations of gear drive 2012 can comprise a plurality of compound gears that can provide a plurality of geared teeth sets and that can overcome space constraints between enclosure coverings 2005A (FIG. 15B) and 2005B (FIG. 15B). Second set of geared teeth 2025A can mesh with at least one set of geared teeth 2030A of first intermediate gear 2030. Similar to crown gear 2025, first intermediate gear 2030 can also comprise more than one set of geared teeth. In some configurations, second set of geared teeth 2025B can include 10 teeth that can mesh with 32 teeth of first set of geared teeth 2030A. This interaction can be a second stage of reduction causing torque reduction of 3.2:1.

Continuing to refer to FIG. 15D and FIG. 15E, second intermediate gear 2030 can mesh with a third intermediate gear 2035 through second set of geared teeth 2030B and first set of geared teeth 2035A. First set of geared teeth 2030A and second set of geared teeth 2030B can be distantly disposed to allow an uninterrupted meshing with their respective partner geared teeth. Interaction of gear teeth 2030B and gear teeth 2035A can cause a third stage of reduction in received torque. In some configurations, second set of geared teeth 2030B can include 10 teeth and can interact with first set of geared teeth 2035A that can include 25 teeth, causing a reduction of 2.5:1 in the third stage. Third intermediate gear 2035 can be a compound gear with a second set of geared teeth 2035B. In some configurations, first set of geared teeth 2035A and second set 2035B can be distantly arranged, to allow alignment of partner meshing gear teeth. Gear teeth 2035B can mesh with output gear 2039 to reach a final reduction stage. In some configurations, a plurality of intermediate gears can be added before final stage. The number of intermediate gears and their respective teeth can depend on required reduction in output torque. Second set of geared teeth 2035B can comprise 11 teeth while output gear 2039 can comprise 33 geared teeth, causing a final stage reduction of 3:1.

Continuing to refer to FIG. 15D and FIG. 15E, output gear 2039 can surround output shaft 2050. The torque of output gear 2039 can be carried by output shaft 2050 outside gear drive 2012. Output shaft 2050 can partially or completely couple with engagement plates 2010A, 2010B (FIG. 15B and FIG. 15C). Such an engagement can be achieved by accommodating corresponding ends of output shaft 2050 within respective output windows 2009A (FIG. 15A and FIG. 15C) and the analogous output window on connective plate 2010B (FIG. 15C). Output window 2009A (FIG. 15C) can be dimensioned to allow output shaft 2050 to rotate with a torque that equals output torque of gear drive 2012. In some configurations, output window 2009A (FIG. 15C) and the analogous output window on connective plate 2010B (FIG. 15C) can serve as an engagement junction for torque transfer from gear motor 2000 to at least one module outside gear motor 2000. In some configurations, output shaft 2050 can comprise a hex path to receive a corresponding hex shaft therein, the hex shaft being coupled to a module required to rotate at the desired output torque obtained from gear motor 2000. In some configurations, other engagement mechanisms can be used for coupling output shaft 2050 with engagement plates 2010A, 2010B and for engaging of output shaft 2050 with modules outside of gear motor 2000 for torque transfer.

Referring to FIG. 15E-1, third embodiment of gear drive 5070 can comprise a first gear 5100 configured to be in direct contact with a motor shaft from motor 5077 (FIG. 15C-1). First gear 5100 can in turn advance the received torque to crown gear 5200, causing a pre-determined change in direction of the received torque. In some embodiments, the change in direction can vary and can be determined by orientation or placement of one or more crown gears 5200, and also tooth-profile or tooth contours of the meshing crown gear 5200. This variation can cause a change in angular relationship between an incoming torque axis 5155 and an outgoing torque axis 5165. Crown gear 5200A can include a compound gear comprising a first integrated set of gear teeth 5200B. Gear drive 5070 can optionally comprise a washer 5600 configured to avoid wearing of integrated gear 5200B and wear of enclosure 5000 during operation of gear drive 5070. Rotational motion of crown gear 5200A can cause a substantially similar rotational motion of integrated gear-set 5200B. At least one gear set of a second gear arrangement 5300 can be meshed with first integrated gear set 5200B to receive torque there from. Second gear arrangement 5300 can also be a compound gear arrangement or comprise one or more gears over a common shaft sharing an axis of rotation. In FIG. 15E-1, second gear arrangement can comprise a first participating gear 5300A and a second participating gear 5300B. First gear 5300A can mesh with the integrated gear set 5200 of crown gear 5200A, thereby receiving the torque and causing resultant rotational motion of second participating gear 5300B. At least one gear of a third arrangement 5400 can mesh with one or more gears of the second gear arrangement 5300. In some configurations, second participating gear 5300B of the second gear arrangement can mesh with a first participating gear 5400A of the third gear arrangement 5400. Such an engagement can cause rotational motion of second participating gear 5400B of the third gear arrangement. Such a meshing of gear and gear arrangements can be continued until the rotational force is transferred to the final output gear. In this case the final output gear can include gear 5500. Rotation of gear 5500 can cause rotation of output shaft 5700, where output shaft 5700 is configured to engage with at least one module of the electro-mechanical agent 75 (FIG. 3).

Referring now to FIG. 15E-2, exemplary gear motor 2000A can include interaction between first gear 5100 and crown gear 5200B. Gear drive 5070 comprises crown gear 5200B with teeth contours distinct from those of earlier discussed crown gears. A pre-calculated tooth profile of crown gear teeth can determine an appropriate and desirable torque transfer form first gear 5100 to crown gear 5200B. In some configurations, a base 5205 of crown gear may be thicker than a base of crown gear profiles described elsewhere herein. Added material in base 5205 can ensure higher tolerance to vibrations or other undesirable motions caused due to operation of gear motor 2000A. It should be noted that the tooth profile of crown gear 5200B and thickness of its base 5205 can vary in different gear drives and may be governed by the reduction expectation of the gear drive.

Figure 15F:
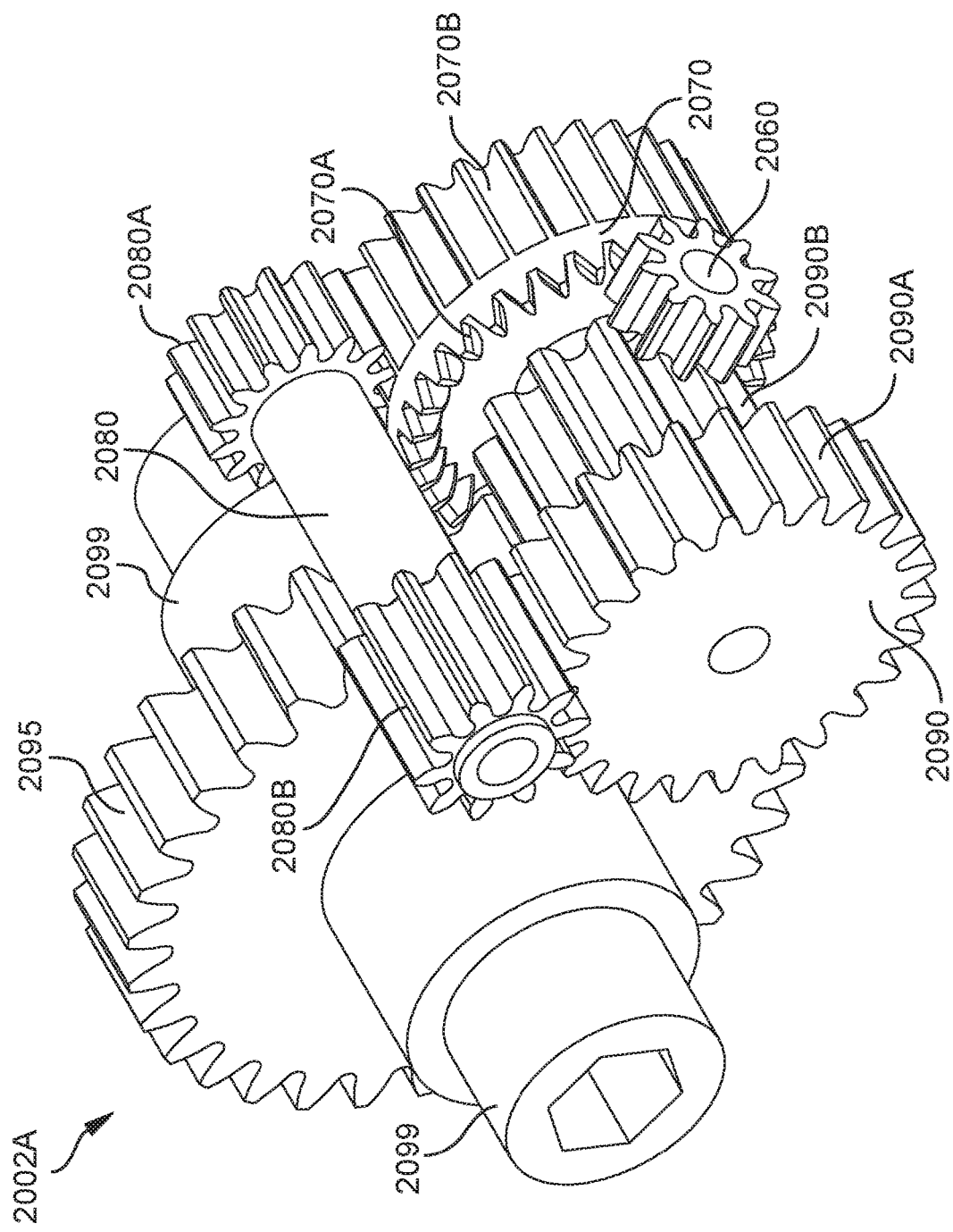
FIG. 15F is a perspective view of a second configuration of the gear drive that can be accommodated within the gearmotor enclosure depicted in FIG. 15A.
Figure 15G:
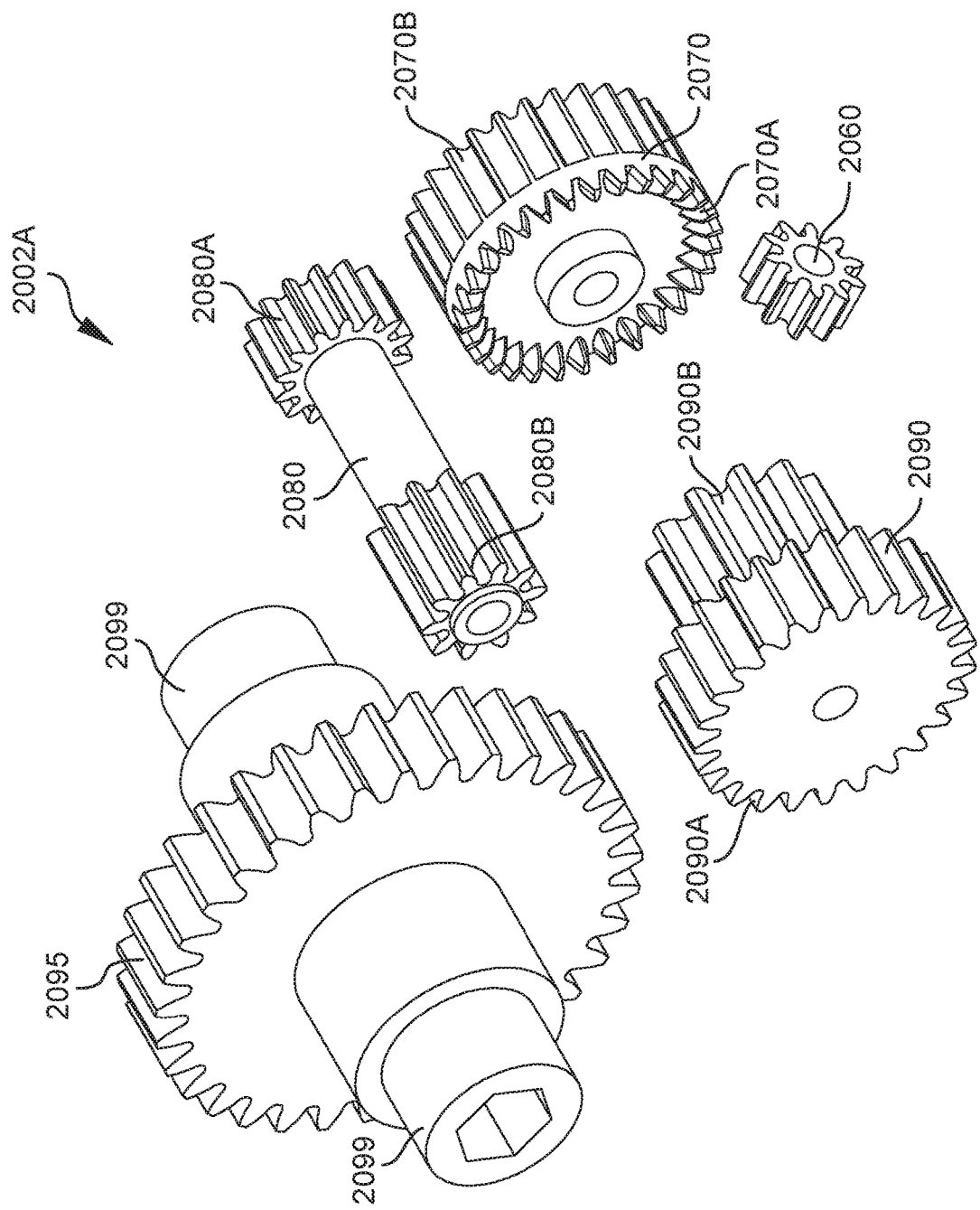
FIG. 15G is an exploded view of the second configuration of the gear drive as depicted in FIG. 15F.
Figures 1, 15G:
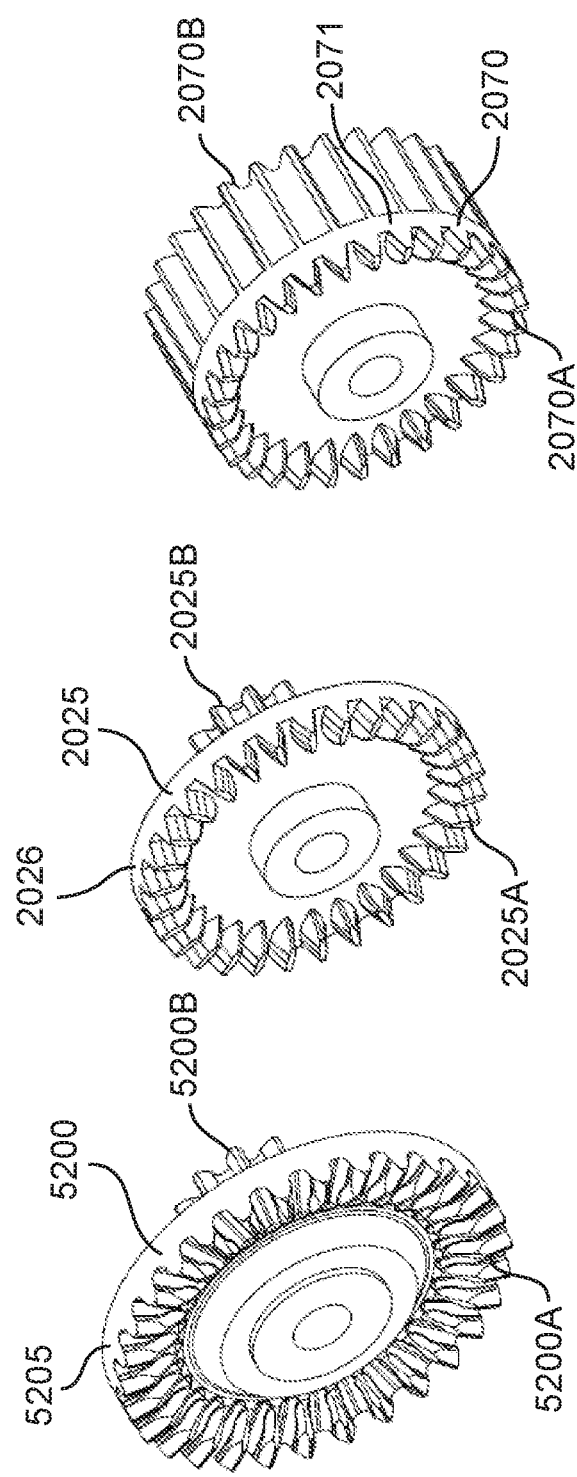

Referring now to FIG. 15F and FIG. 15G, a variety of gear combinations can be employed in gear motor 2000 that can be conveniently disposed therein. Each gear drive can be coupled with a suitable motor size that may be similar or different from the motor depicted in given configurations. Thus, a variety of combinations of gear drives and corresponding motor sizes can be accommodated in space provide by enclosure coverings 2005A, 2005B (FIG. 15B). In some configurations, gear drive 2002A can be accommodated within space 2007 (FIG. 15B) between enclosure coverings 2005A, 2005B (FIG. 15B). Gear drive 2002A can comprise gears with a different number of geared teeth as compared to gears of gear drive 2012 (FIG. 15D and FIG. 15E), thereby causing an alteration in torque output. In some configurations, gear drive 2002A can provide a lower reduction than the reduction provided by gear drive 2012.

Continuing to refer to FIGS. 15F and 15G, input gear 2060 can receive incoming torque from motor 2015 (FIG. 15C) and transfer it to crown gear 2070 by meshing with a first set of gear teeth 2070B. Crown gear 2070 can be disposed to cause directional alteration of received torque at a desirable angle. In some configurations, the disposition of crown gear 2070 and the angles of gear teeth 2070A and gear teeth 2060 can affect the output torque. Gear drive 2002A can allow the direction of the incoming torque to change by 90°, following interaction of input gear 2060 and crown gear 2070. Second set of geared teeth 2070B of crown gear 2070 can mesh with first intermediate gear 2080, thus achieving a second stage of torque reduction. A second stage of torque reduction can be achieved by interaction of second gear teeth set 2080B of first intermediate gear 2080 with gear teeth set 2090A of second intermediate gear 2090. Intermediate gear 2090 can further comprise a second set of gear teeth 2090B configured to mesh with output gear 2095, thus achieving final stage of torque reduction. Output gear 2095 can include output shaft 2099 that can rotate at a torque equal to the output torque of gear 2095. Output shaft 2099 can be configured to pass on final torque to at least one module outside of gearmotor 2000.

Referring now to FIG. 15G-1, exemplary tooth geometries of crown gears 2070 (FIG. 15G), 2025 (FIG. 15E) and 5200 (FIG. 15E-1) can be responsible for varying reduction outputs from their respective gear drives, and can include a compound gear type of crown gears. The compound gear feature can be compromised depending on reduction expectation from the gear drive. First exemplary crown gear 2070 can comprise a first crown gear portion 2070A and an integrated geared teeth set 2070B. A second exemplary crown 2025 can comprise a second crown geared portion 2025A and a second integrated geared teeth 2025B. Integrated geared teeth of exemplary crown gears 2070 and 2025 can vary with respect to the size or teeth number from one gear drive to another. The two crown gears can be encompassed with the remainder of their gear drive in a single enclosure, substantially similar to enclosure 5000 (FIG. 15A-1). Third crown gear example 5200 can comprise a crown gear portion 5200A and an integrated geared teeth set 5200B. Teeth profile of crown gear teeth in third example 5200 can be distinct from teeth profile of other crown gear examples described herein. Base 5205 of third example 5200 can be higher in thickness with added material that can increase tolerance of the crown gear 5200 during operation of its gear drive. Crown gear examples 2070, 2025 and 5200 can illustrate the use of these or any other crown gear geometry in gear motor examples describe elsewhere herein.

Figure 15H:
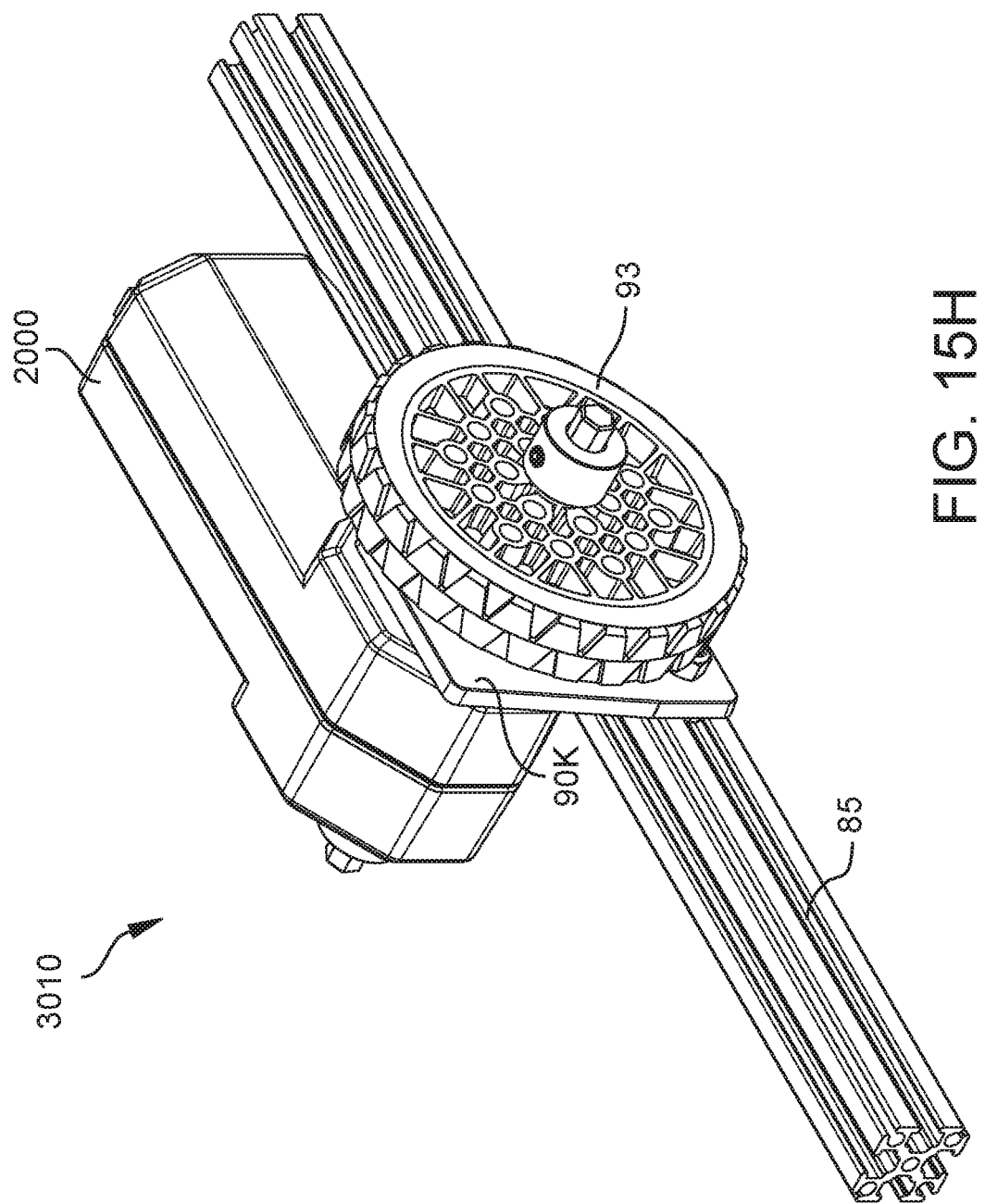
FIG. 15H is a perspective view of a first position of a second exemplary gearmotor.
Figure 15I:
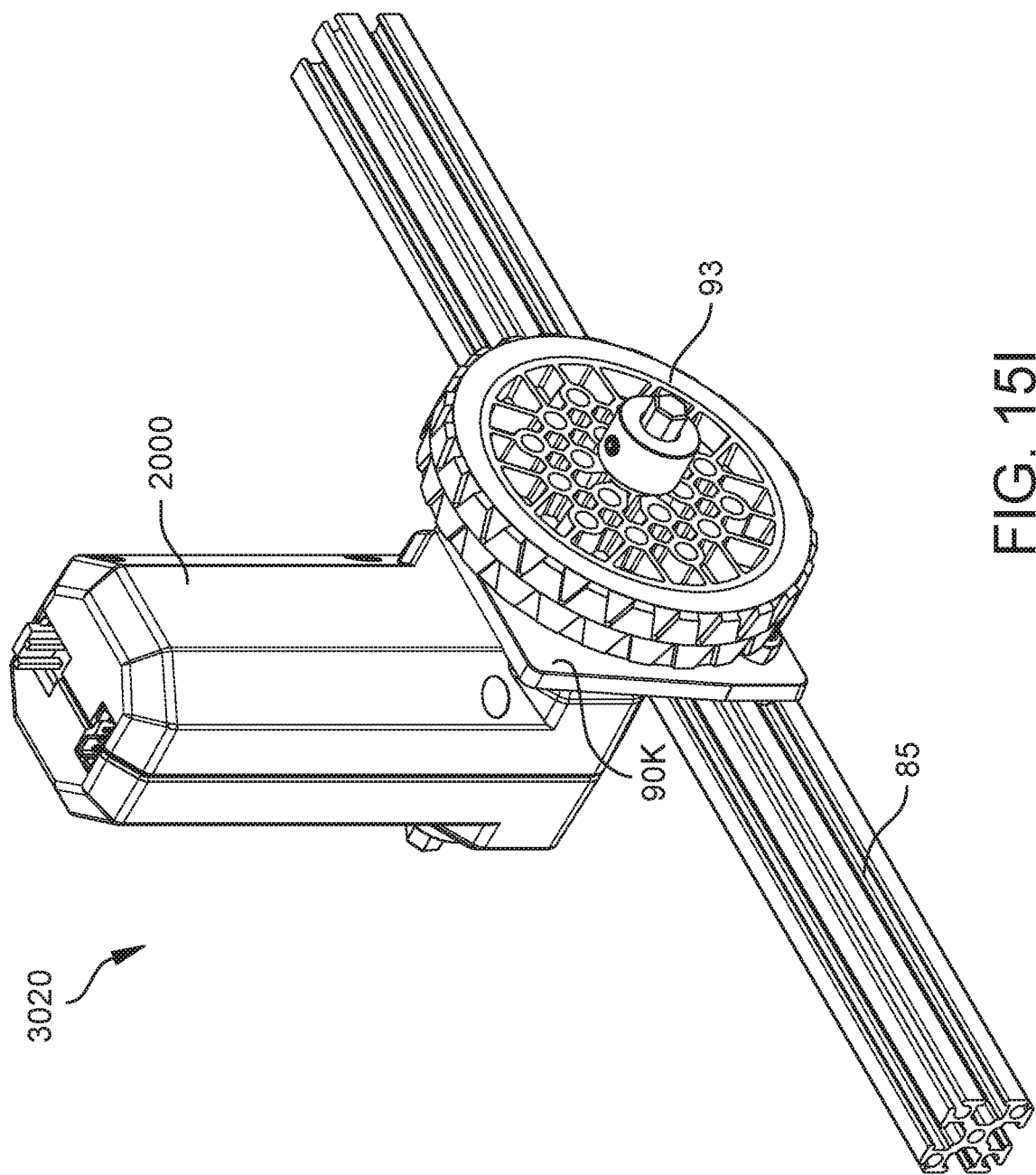
FIG. 15I is a perspective view of a second position of the second exemplary gearmotor.

Referring now primarily to FIG. 15H and FIG. 15I, first assembly 3010 and second assembly 3020 depict a first position and second position, respectively for engaging exemplary gearmotor 2000 with one or more module/supplementary modules in constructing electromechanical agent 75 (FIG. 3 and FIG. 4). Gearmotor 2000 can be coupled to at least one module through engagement plates 2010A, 2010B (FIG. 15C). First assembly 3010 and second assembly 3020 depict engagement of gear motor 2000 with elementary unit 85 through exemplary bracket 90K. Engagement plates 2010A, 2010B (FIG. 15C) can comprise coupling holes 2011A and 2011B (FIG. 15C), respectively. First engagement plate 2010A can operably couple with facing exemplary bracket 90K while second engagement plate 2010B can extend away from bracket 90K or vice versa. Coupling holes 2011A and 2011B (FIG. 15C) can be disposed at an angle offset from one other, allowing gearmotor 2000 to vary its engagement angle with, in this case, bracket 90K. As a result, gearmotor 2000 can be disposed in more than one position while engaging with other modules of the construction kit. Varied configurations of gearmotor 2000 can vary offset angle between coupling holes 2011A and 2011B (FIG. 15C), thus giving multiple placement and mounting options for gearmotor 2000. Because the shaft is perpendicular to the motor, the motor and shaft can be located in tight spaces.

Figure 15J:
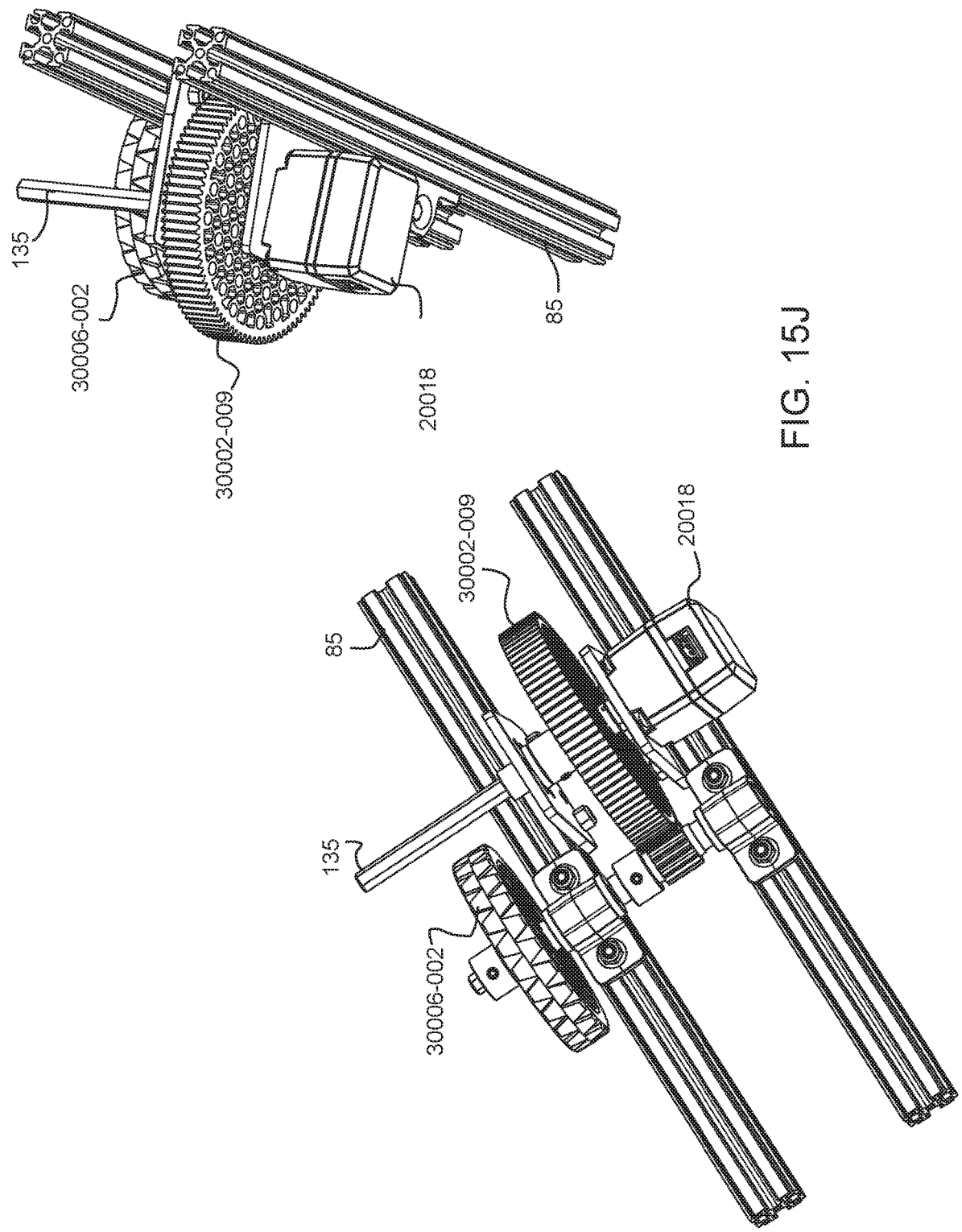
FIG. 15J is a perspective view of a possible positioning of the potentiometer of the present teachings.

Referring now to FIG. 15J, potentiometer 20018 can measure angular position of shaft 135 passing through its center and, therefore, components sharing shaft 135 such as, for example, gear 30002-009 and the components rotating synchronously with gear 30002-009 such as, for example, wheel 30006-002. Potentiometer 20018 can provide data that can be used for control of components described herein.

Figure 15K:
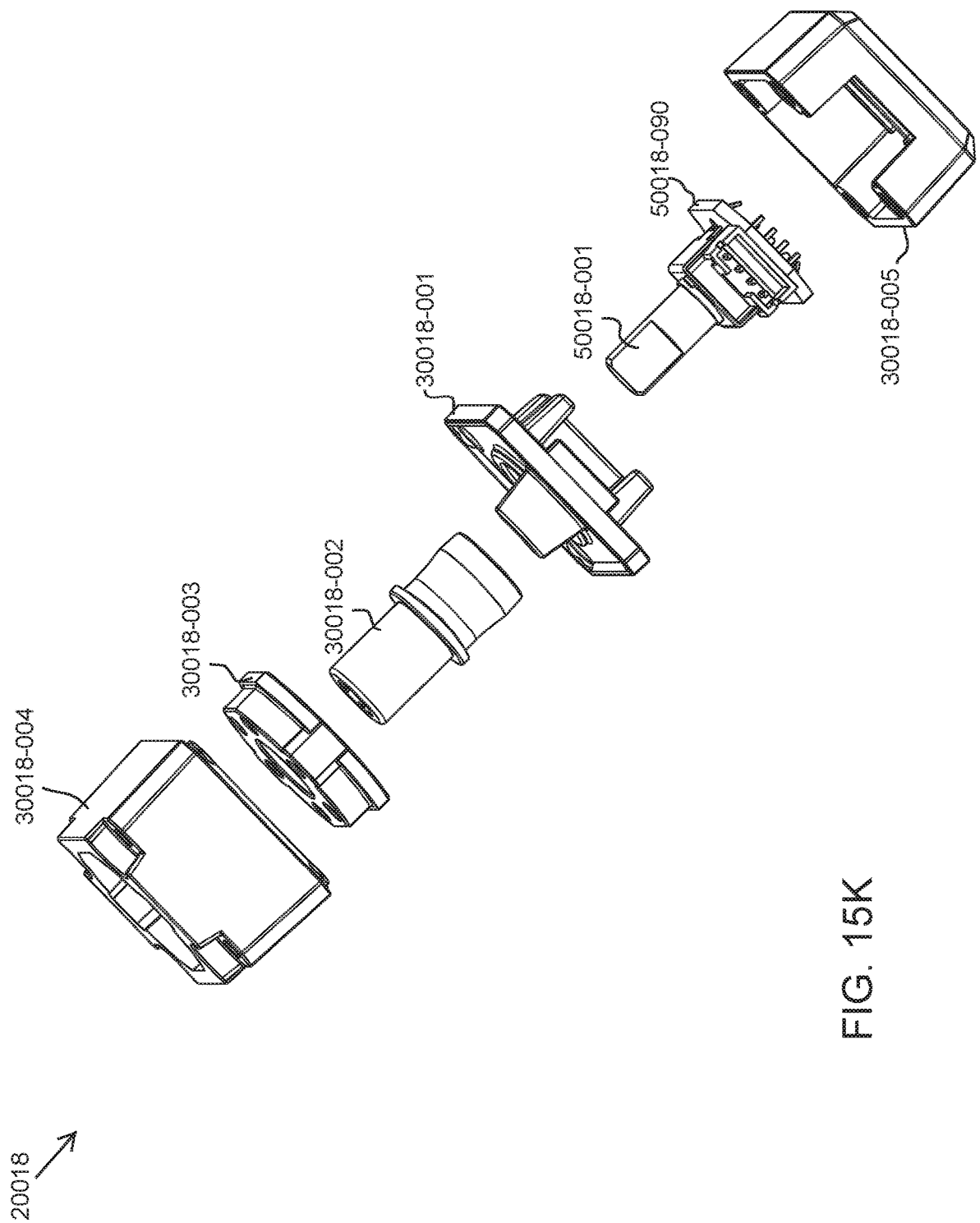
FIG. 15K is an exploded, perspective view of the potentiometer of the present teachings.
Figure 15N:
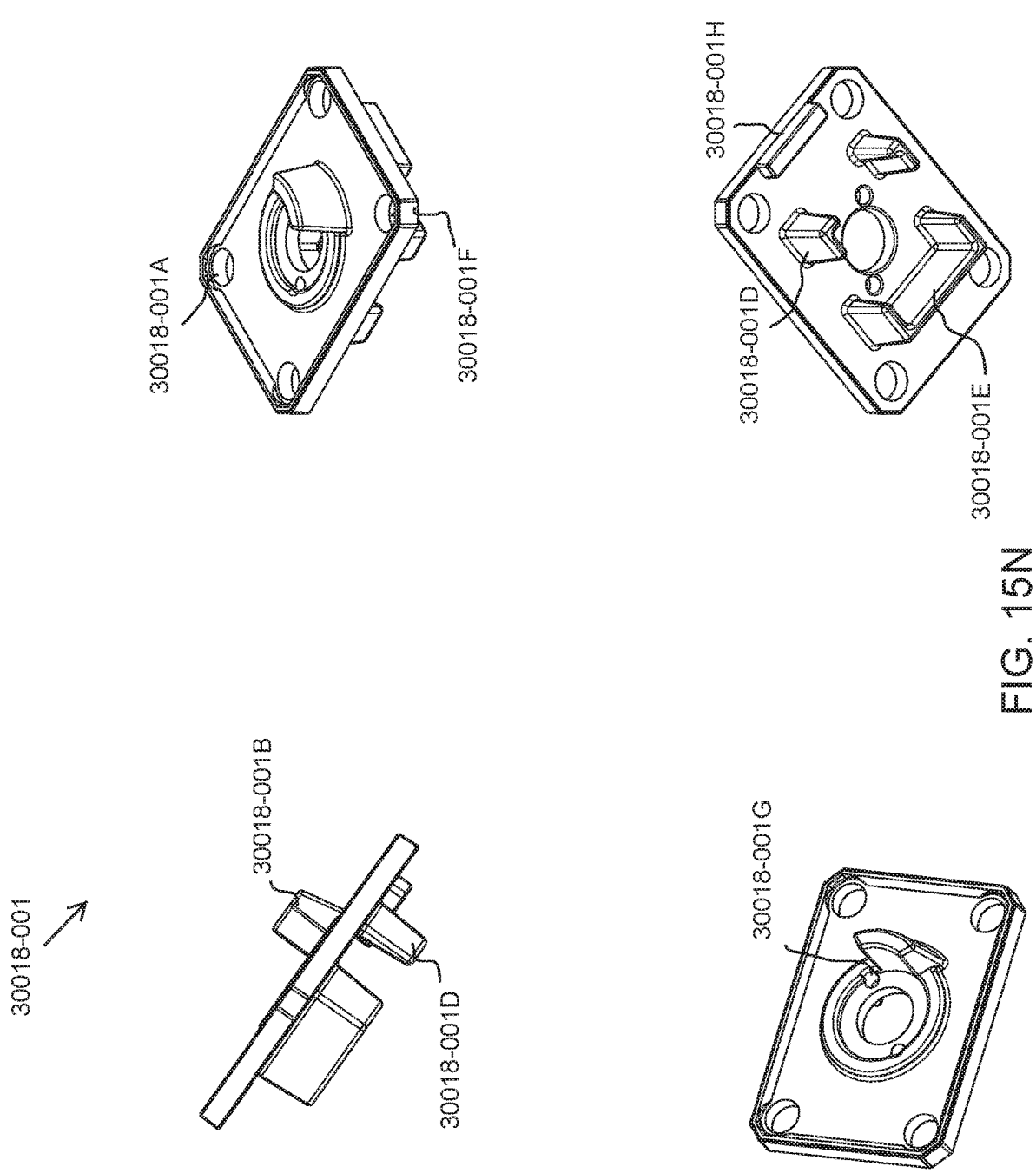
FIG. 15N is a perspective view of the potentiometer sensor mount of the present teachings.
Figure 15O:
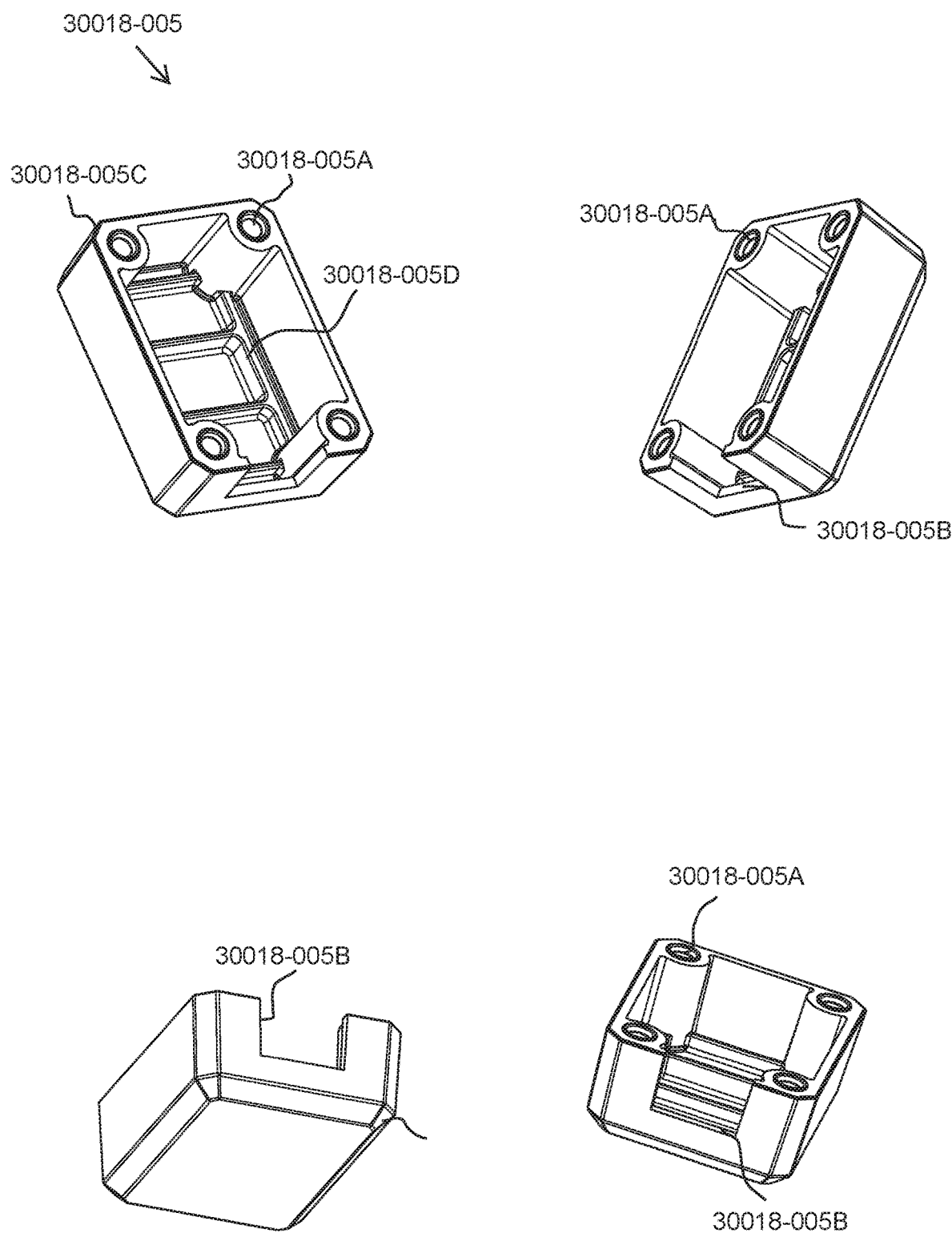
FIG. 15O is a perspective view of the potentiometer lower housing of the present teachings.

Referring now to FIGS. 15K-15O, potentiometer 20018 (FIG. 15K) can include, but is not limited to including, shaft mount 30018-002 (FIG. 15L), upper housing 30018-004 (FIG. 15M), shaft collar 30018-003 (FIG. 15K), sensor mount 30018-001 (FIG. 15N), sensor 50018-001A (FIG. 15K), and lower housing 30018-005 (FIG. 15O). Sensor

50018-001A (FIG. 15K) can receive power from and provide sensor data to circuit board 50018-090 (FIG. 15K), upon which sensor 50018-001A (FIG. 15K) is mounted. Power/data jack 50018-001B (FIG. 15K) can provide the power interface and data input/output for circuit board 50018-090 (FIG. 15K), and can be mounted on circuit board 50018-090 (FIG. 15K). In some configurations, shaft mount 30018-002 (FIG. 15L) can include hex shaft fitting 30018-002A (FIG. 15L) that can accommodate hex shaft 135 (FIG. 15J), and internal geometry to accommodate sensor 50018-001A (FIG. 15K) and external geometry 30018-002D (FIG. 15L) to accommodate shaft collar 30018-003 (FIG. 15K). Mounting brace 30018-002C (FIG. 15L) can stabilize shaft mount 30018-002 (FIG. 15L) and therefore stabilize sensor 50018-001A (FIG. 15K). Mounting brace 30018-002C (FIG. 15L) can retain connection with input shaft 30018-002. Rotation protrusion 30018-002B (FIG. 15L) can interface with rotation stop 30018-001B (FIG. 15N) to control the subtended angle of potentiometer 20018 (FIG. 15K). Upper housing 30018-004 (FIG. 15M) can accommodate the geometry of shaft collar 30018-003 (FIG. 15K) in opening 30018-004D, and can provide recessed fastening 30018-004B (FIG. 15M) of upper housing 30018-004 (FIG. 15M) through lower recesses 30018-004C (FIG. 15M) and sensor mount 30018-001 (FIG. 15N) to lower housing lower housing 30018-005 (FIG. 15O) at recesses 30018-005A (FIG. 15O). In some configurations, space considerations can be accommodated by chamfered edges 30018-004A (FIG. 15M), 30018-001F (FIG. 15N), and 30018-005C (FIG. 15O). Sensor mount 30018-001 (FIG. 15N) can interconnect sensor 50018-001A (FIG. 15K) with shaft mount 30018-002 (FIG. 15L), providing standoffs 30018-001D/E (FIG. 15N) to accommodate the geometry of circuit board 50018-090 (FIG. 15K) and sensor 50018-001A (FIG. 15K), and standoffs 30018-001H (FIG. 15N) to accommodate power jack 50018-001B (FIG. 15K). Lower housing 30018-005 (FIG. 15O) can include connector cavity 30018-005B (FIG. 15O) that can accommodate power jack 50018-001B (FIG. 15K), among other connectors. Lower housing 30018-005 (FIG. 15O) can include recessed compartments 30018-005D (FIG. 15O) that can, for example, but not limited to, reduce the weight of potentiometer 20018 (FIG. 15K). Recessed compartments 30018-005D (FIG. 15O) can support circuit board 50018-090 (FIG. 15K) and provide room for protruding elements of circuit board 50018-090 (FIG. 15K).

Figure 16:
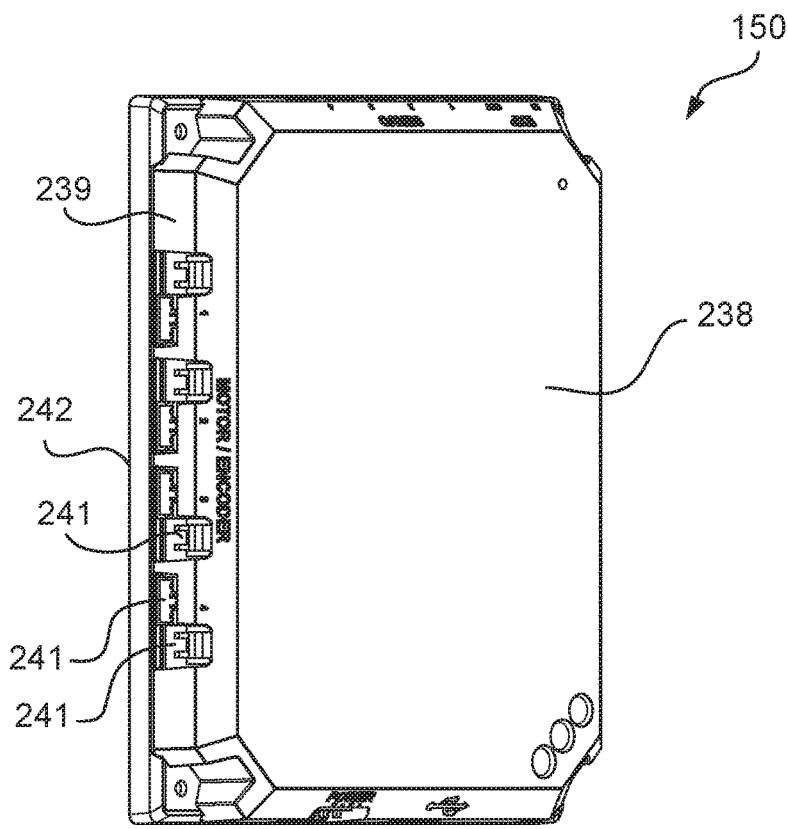
Figure 17:
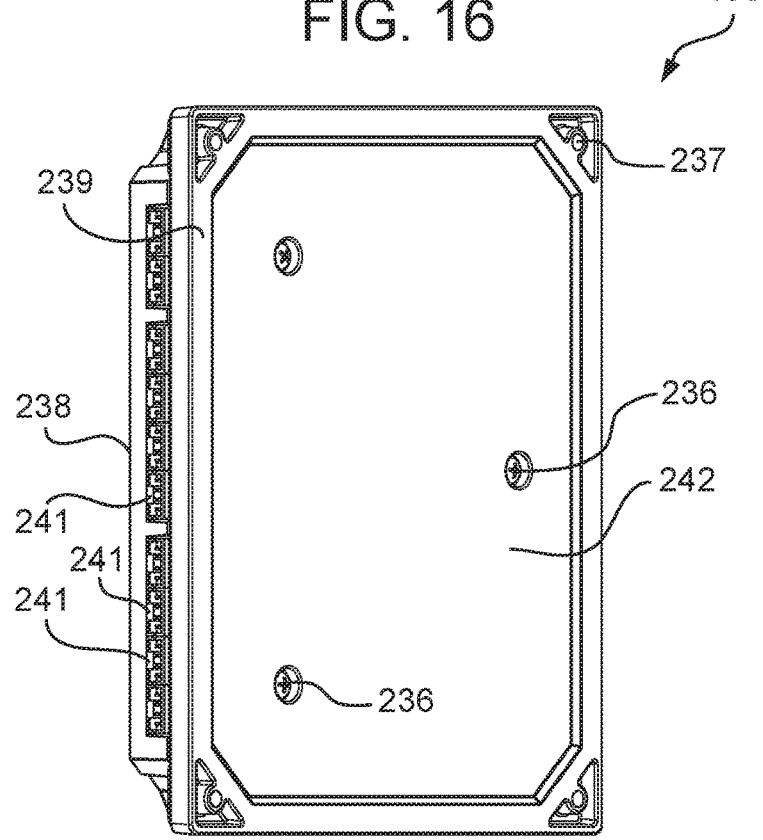

Referring primarily to FIG. 16 and FIG. 17, controller module 150 of electro-mechanical agent first example configuration 75 (FIG. 3) can serve as a brain or control center or control system that can be configured to operate mechanical and electrical supplementary modules and/or extension modules of the electro-mechanical agent. In some configurations, second communications device 26 (FIG. 1 and FIG. 2) can optionally serve as a processing and/or a decision making unit while controller module 150 can be an input/output hardware configured to execute instructions obtained from second communications device 26. In some configurations, a controller module 150 and second communications device 26 can be integrated into a single unit. Controller module 150 and/or second communications device 26 (FIG. 1 and FIG. 2) can be further configured to serve as a computational and a communications platform. Additionally, controller module 150 and/or second communications device 26 (FIG. 1 and FIG. 2) can be configured to decode programming instructions embedded therein or received by controller module 150 from an external device. In some configurations, the incoming instructions can be received by controller module 150 by way of communicators 5 (FIGS. 1 and 2) and/or second communications device 26 that can be configured to communicate with a plurality of user interface devices 16 (FIG. 1) disposed remotely from the electro-mechanical agent first example configuration 75 (FIG. 3).

Figure 18:
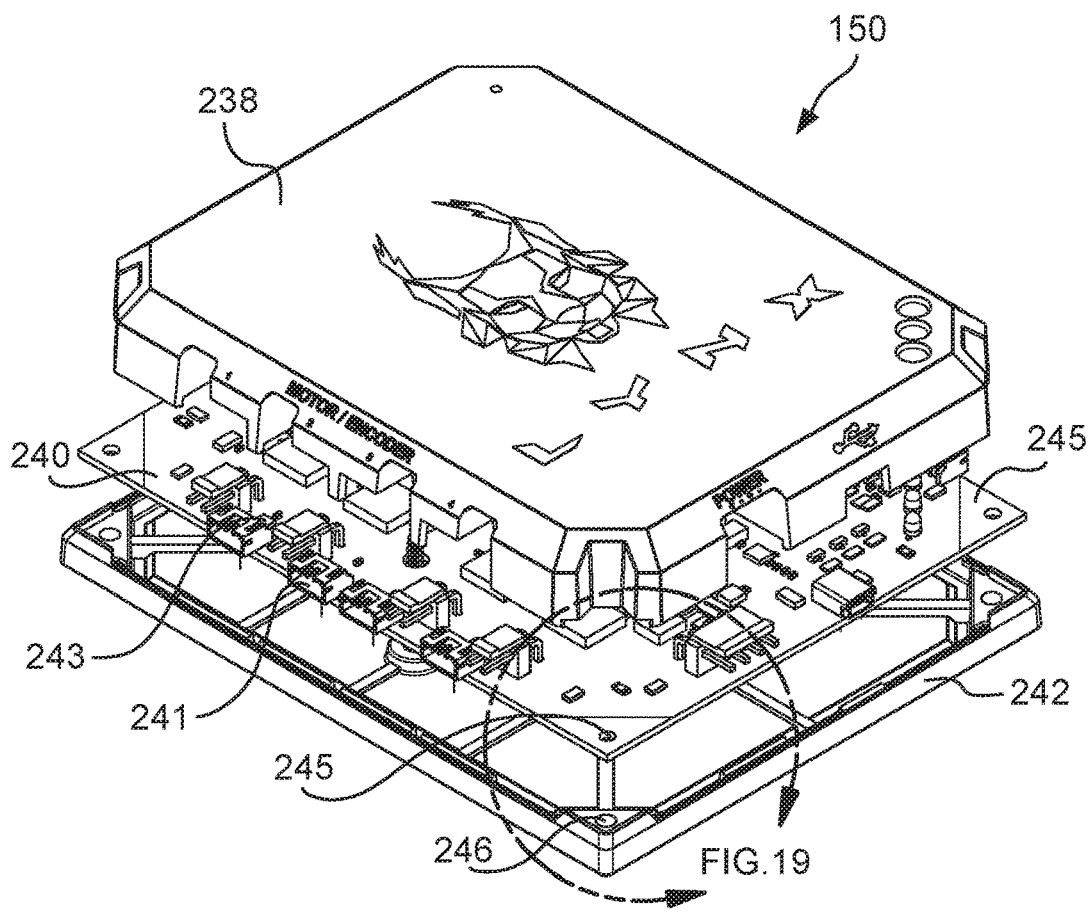

Continuing to refer primarily to FIG. 16 and FIG. 17, controller module 150 can include, but is not limited to including, controller enclosure 239. As previously discussed, the controller module can comprise the electronics of the electro-mechanical agent 75 (FIG. 3). In some configurations, the electronics in controller module 150 can be embedded on a printed circuit board or PCB 240 (FIG. 18) that can be enveloped in enclosure 239. In some configurations, enclosure 239 can be a single continuous component comprising one or more PCBs 240 (FIG. 18). One or more PCB 240 (FIG. 18) can include, but is not limited to including, a plurality of ports provided to communicate with the supplementary modules and/or extension modules of electro-mechanical agent first example configuration 75 (FIG. 3). In some configurations, enclosure 239 can be multi-part module wherein the parts can come together to enclose one or more PCB 240 (FIG. 18). In some configurations, enclosure 239 can include, but is not limited to including, cover portion 238 and base portion 242. Cover portion 238 can be received by base portion 242, thereby sandwiching the PCB 240 (FIG. 18) there between. Cover portion 238 can be engaged with base portion 242 by means of fasteners that can be received in the engagement points. A first set of engagement points 237 (FIG. 17) can be provided on for example, a peripheral region of cover portion 238 and base portion 242. A second set of engagement points 236 (FIG. 17) can be provided on cover portion 238 and base portion 242. At least one connection port 241 can be provided on enclosure 239, for example, motor/encoder shared ports. Connection ports 241 can be configured to receive connectors (not shown) from the one or more supplementary modules and/or extension modules of the electro-mechanical agent first example configuration 75 (FIG. 3). Grounding plane 241A can enable grounding for PCB 240 (FIG. 18).

Figure 19:
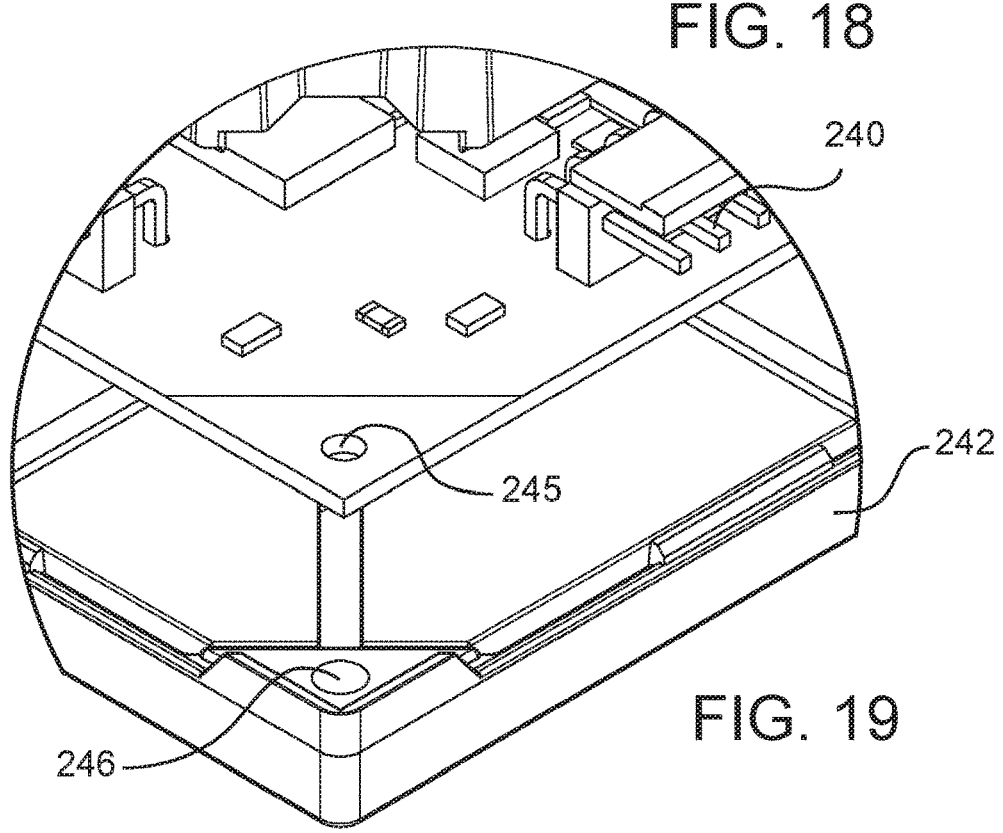

Referring now primarily to FIGS. 18 and 19, controller module 150 can include, but is not limited to including, cover portion 238 and base portion 242 and an electronics board or printed circuit board 240 substantially disposed between cover portion 238 and base portion 242. In some configurations, a plurality of printed circuit boards 240 can be enclosed between cover portion 238 and base portion 242. In some configurations, PCB 240 can comprise at least one electronic component configured to execute instructions issued from second communications device 26 (FIG. 1) and accordingly issue controller commands for at least one supplementary module and/or extension module of the electro-mechanical agent 23 (FIG. 1). Electro-mechanical agent 23 can comprise a plurality of electrical and mechanical modules thereupon. These electrical and/or mechanical modules and the modules external to electro-mechanical agent 23 can be in constant information exchange through wired and/or wireless mode. There can be a high possibility of generation of static electricity in and/or around electro-mechanical agent 23 (FIG. 1). Generation of static electricity can cause an electro-static discharge (ESD) event that can interfere with functioning of PCB 240. Any disturbance to the desired functioning of the at least one electronic component on PCB 240 can cause a detrimental impact on functioning of modules and/or extension modules of the electro-mechanical agent 23 (FIG. 1). The ESD event can be routed to ESD suppression points. Controller module 150 (FIG. 17) can provide at least one ESD suppression means for safeguarding the at least one electronic component from ESD events that can be produced within and/or external to PCB 240. At least one diversion diode 243 (FIG. 18) can be provided on PCB 240 to capture an incoming ESD event and optionally ground the ESD event. In some configurations, diversion diodes 243 (FIG. 18) can be disposed substantially close to connector junction 241 (FIG. 18) that can be configured to connect PCB 240 to at least one module external to controller module 150. Electrical channels (not shown) on PCB 240 can route the at least one incoming ESD event to ESD suppression points 245 by way of diversion diodes 243. Corresponding ESD suppression points 246 can also be provided on base portion 242 of the enclosure.

Continuing to refer to FIG. 18 and FIG. 19, PCB 240 can provide at least one connector junction 241 (FIG. 18) that can be configured to receive connectors from at least one module external to controller module 150. An ESD event occurring external to controller module 150 can optionally enter PCB 150 through entry points such as, but not limited to, connector junction 241 (FIG. 18). Such an ESD event can be an unwanted signal and can be captured by diversion diodes 243 (FIG. 18) that can be disposed substantially close to connector junction 241 (FIG. 18).

Figure 19A:
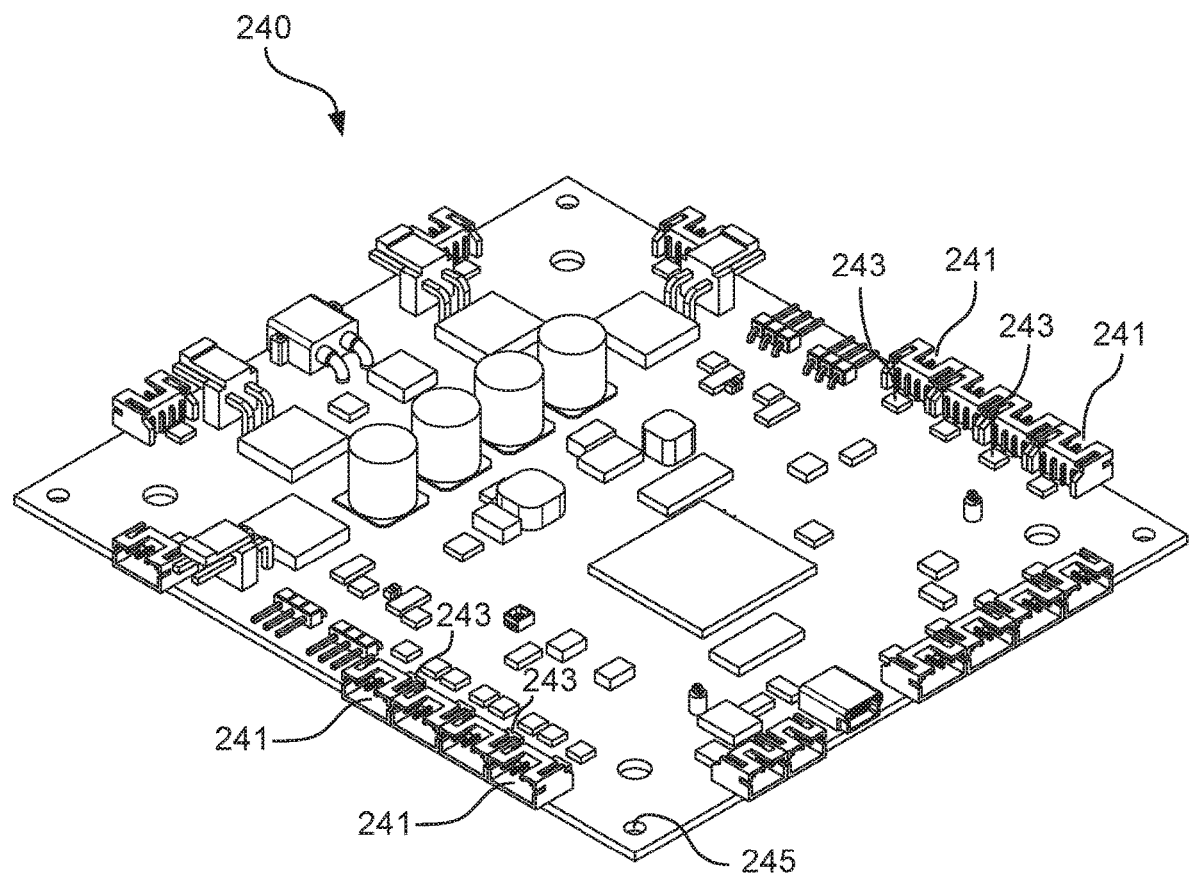
FIG. 19A is a perspective view of the printed circuit board having ESD features of the present teachings.

Referring now to FIG. 19A, an optional disposition of connector junctions 241 and corresponding diversion diodes 243 is depicted. Diversion diodes 241 can be configured to channel at least one incoming ESD event to one or more ESD suppression points 245. The one or more ESD suppression points can be optionally disposed at terminating ends of PCB 240 and can be in conductive communication with corresponding ESD suppression points that can be provided on base portion 242 of the controller module enclosure 150. At least one fastener (not shown) made from a substantially conducting material can be received through ESD suppression points 245 and 246 (FIG. 19) such that a received ESD event can be conducted out of PCB 240 by way of the at least one fastener (not shown). The at least one fastener can also be configured to engage PCB 240 with base portion 242 (FIG. 19). Controller module 150 can be mounted on base platform 80 (FIG. 5) of electro-mechanical agent first example configuration 75 (FIG. 3) such that at least one ESD event can be channelized through ESD suppression points 245, 246 (FIG. 19) towards base platform 80, thus grounding the ESD. In some configurations, controller module 150 can comprise electro-magnetic compatibility (EMC) features (not shown) to eliminate at least one ESD event that can be produced within PCB 240.

Figure 20:
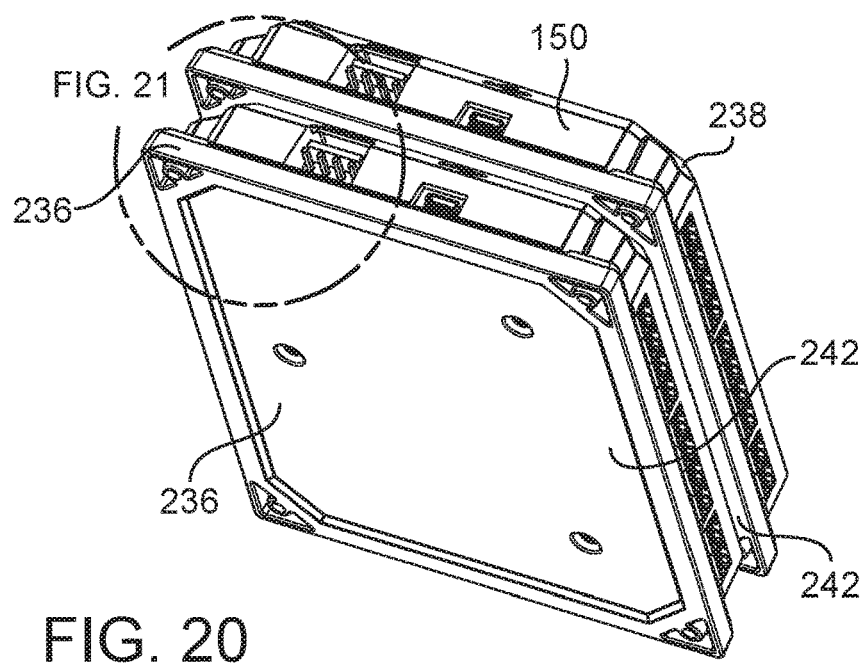
FIG. 20 is a perspective view of a configuration of a plurality of the controller modules of the present teachings.
Figure 21:
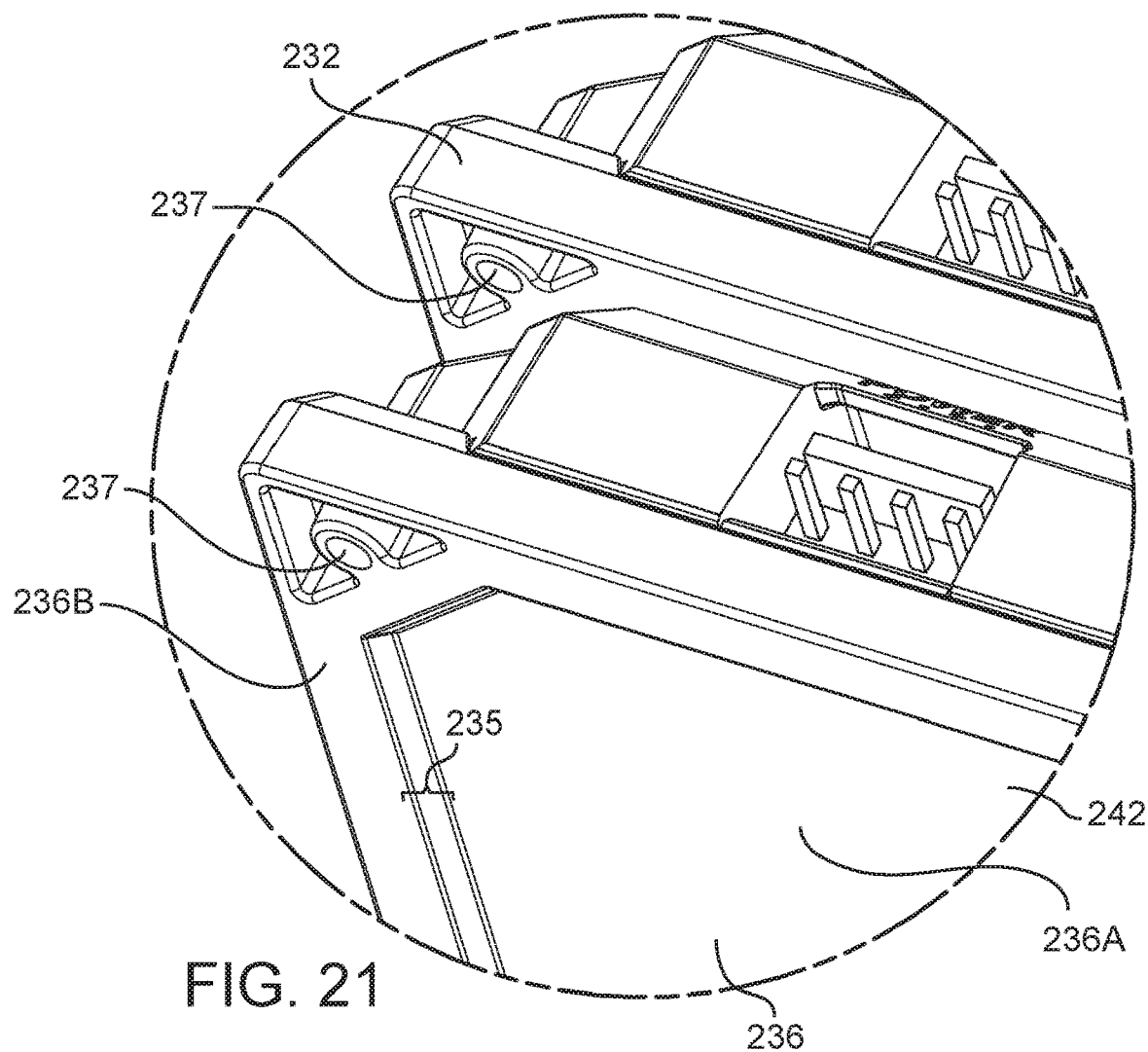
FIG. 21 is a detailed view of the plurality of controller modules as depicted in FIG. 20, focusing on a stack-ability aspect of the enclosures.

Referring now primarily to FIG. 20 and FIG. 21, electro-mechanical agent 23 (FIG. 1) can be constructed from a plurality of supplementary modules and extension modules to achieve at least one assigned task. In some configurations, electro-mechanical agent 23 (FIG. 1) can include additional supplementary modules and/or extension modules that can contribute in performing the at least one assigned task. Additional electronic components on controller module 29 (FIG. 1) can be provided to cope with additional input/output signals in system 21 (FIG. 1). In some configurations, the required addition of the electronics can be done on a single PCB 240 (FIG. 19). In some configurations, an additional controller module 29 (FIG. 1) can provide supplementary electronic components embedded on PCB 240 (FIG. 19) that can, for example, but not limited to, enable smooth functioning of electronic components on PCB 240 (FIG. 19) and conformance to dimensional constraints of controller module 29 (FIG. 1). Additional controller module 29 (FIG. 1) can be stacked with others of controller modules 29 (FIG. 1).

Continuing to refer to FIG. 20 and FIG. 21, base portion 242 (FIG. 20) of controller module 150, can include, but is not limited to including, base frame 232 (FIG. 21). A width of base frame 232 (FIG. 21) can be distinct from an overall width of base portion 242. Base portion 242 can further comprise a first surface (not shown) that can face PCB 240 (FIG. 19) of controller module 150 (FIG. 18) and a second surface 236 that can face a module on which controller module 150 (FIG. 18) can be mounted. The second surface 236 can further comprise first region 236A (FIG. 21) that can be beveled towards the first surface (not shown) of base portion 242 and second region 236B (FIG. 21) that can be adjacent to first region 236A (FIG. 21). Second region 236B (FIG. 21) can be in contact with a module (not shown) on which controller module 150 can be mounted. Beveled portion 235 (FIG. 21) can serve as a connecting surface between first region 236A (FIG. 21) and second region 236B (FIG. 21). In some configurations, first region 236A (FIG. 21) of the second surface of base portion 242 can be beveled to receive cover portion 238 (FIG. 20) of another controller enclosure 150 (FIG. 19). A plurality of controller enclosures 150 (FIG. 19) can be stacked such that base portion 242 of first controller enclosure 150 (FIG. 19) can receive cover portion 238 (FIG. 20) of second controller enclosure 150 (FIG. 219). This engagement can be repeated for a plurality of controller modules 29 (FIG. 1) engaged with electro-mechanical agent 23 (FIG. 1). Engagement points 237 (FIG. 21) and/or ESD suppression points 246 (FIG. 18) on each of stacked controller enclosures 150 (FIG. 19) can be aligned and can collectively engage with electro-mechanical agent 23 (FIG. 1) by way of at least one fastener.

Figure 21A:
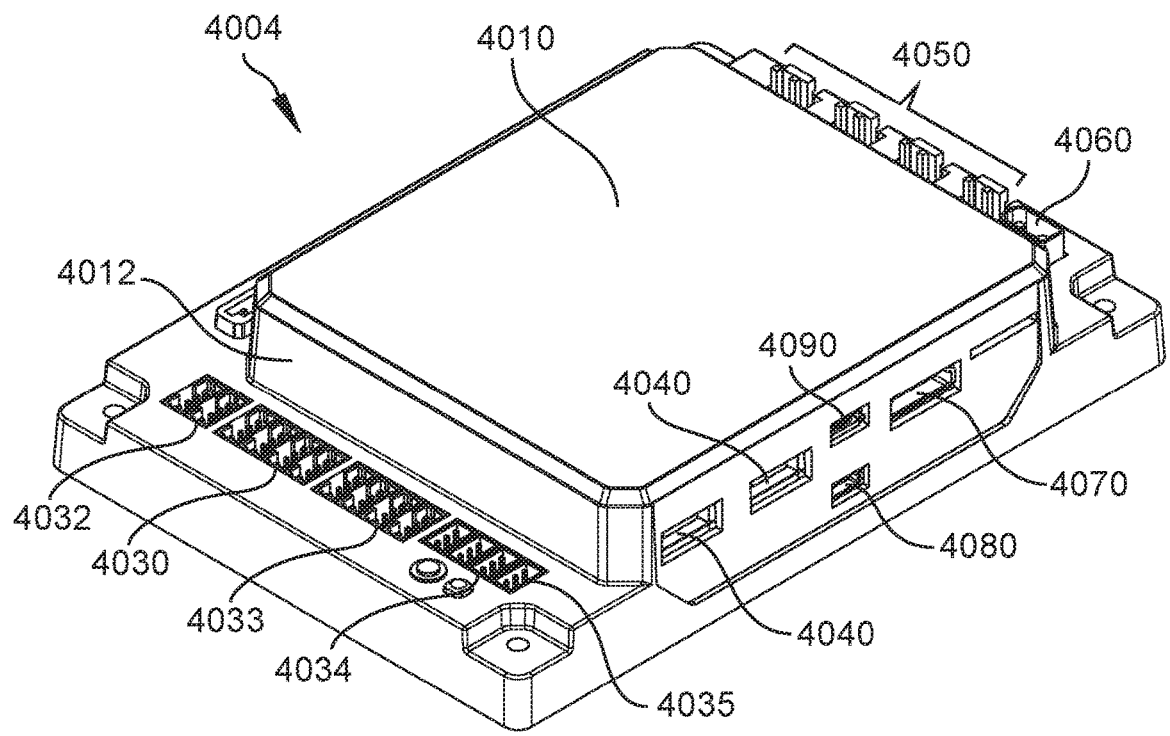
FIGS. 21A-21G are perspective views of the controller enclosure of the present teachings.
Figure 21B:
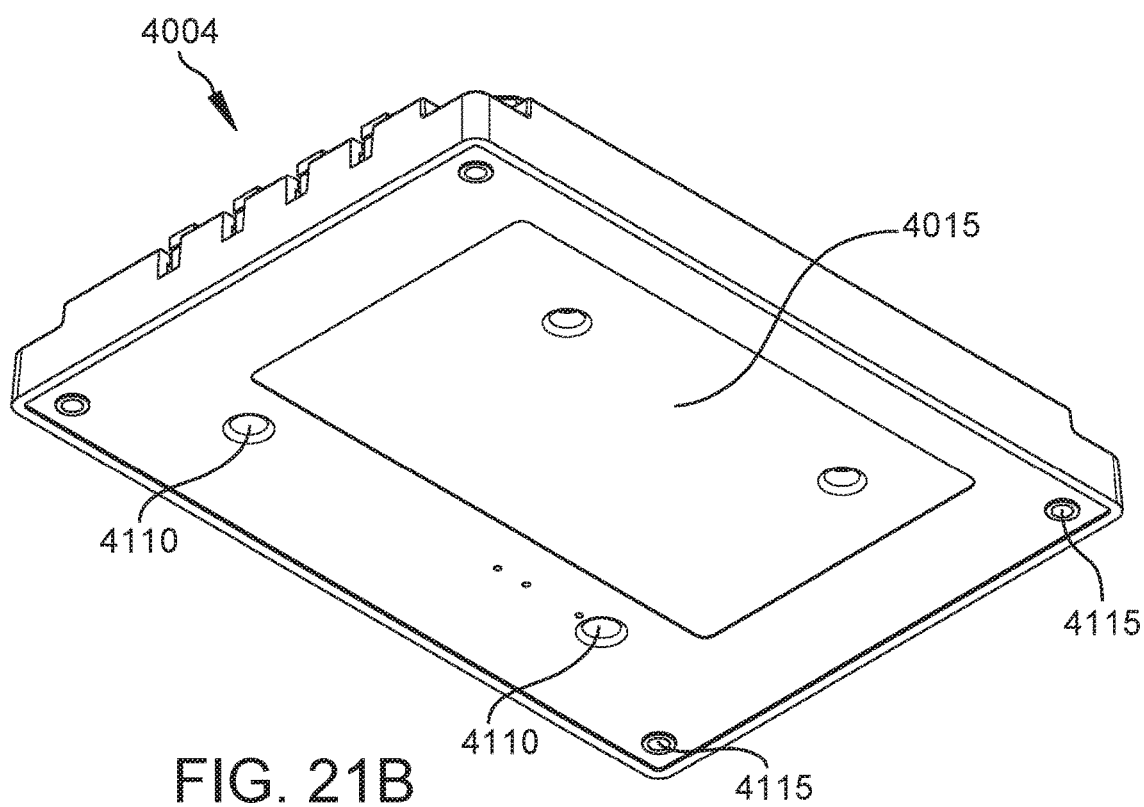
Figure 21C:
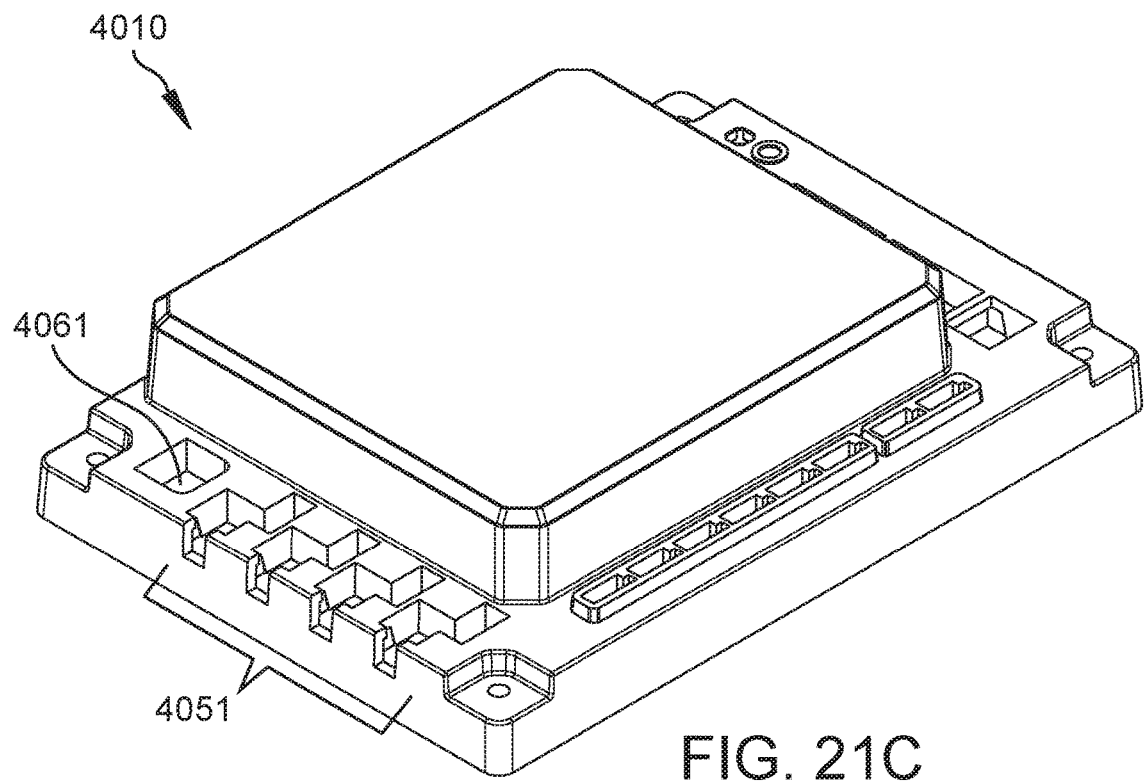
Figure 21D:
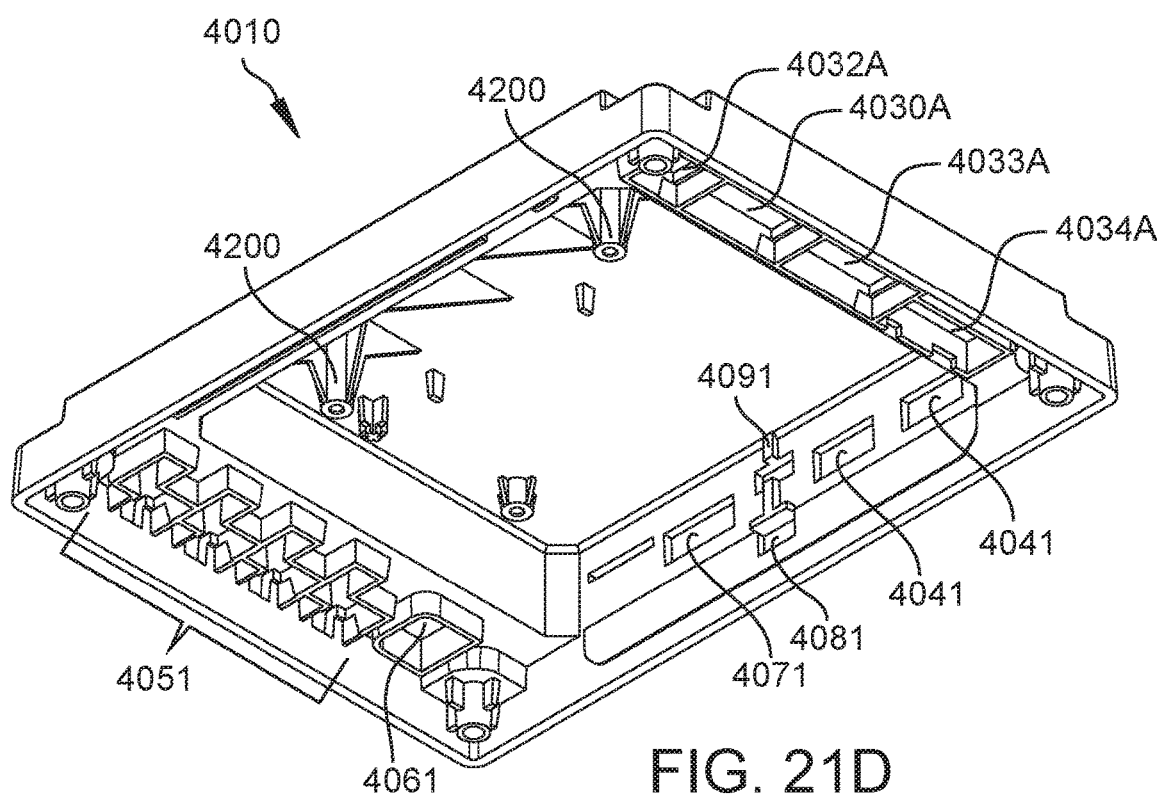
Figure 21E:
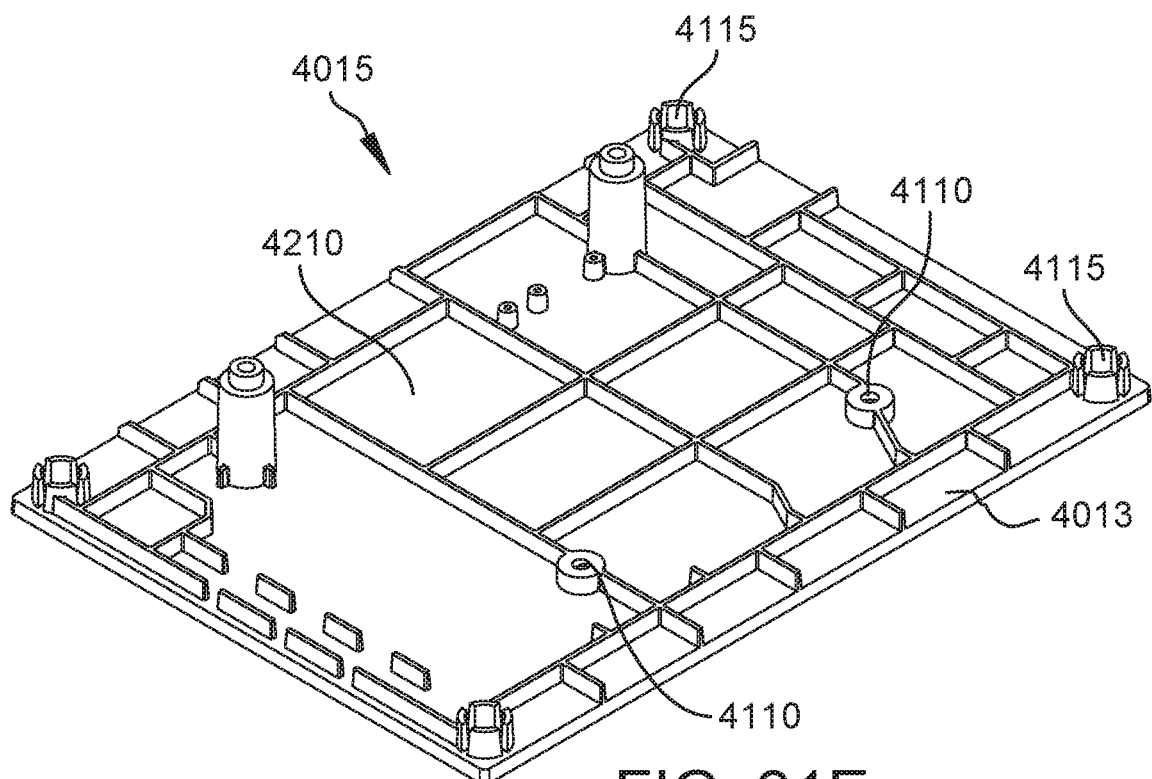
Figure 21F:
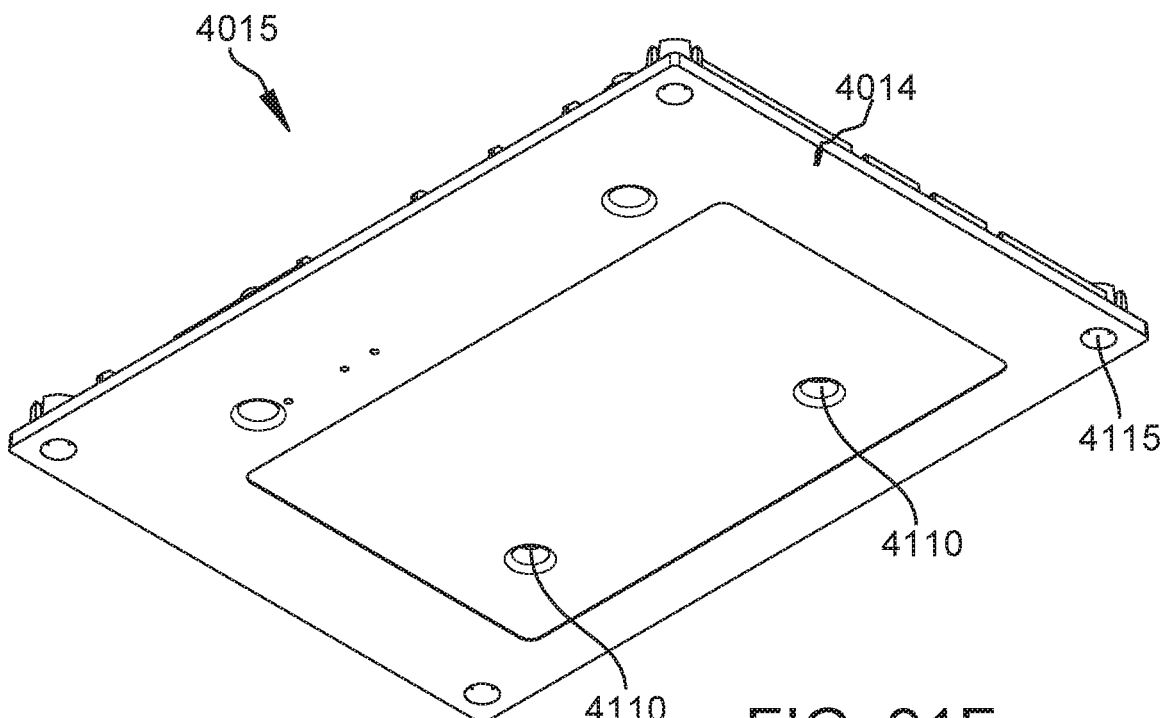

Referring now to FIGS. 21A and 21B, second exemplary controller module 4004 can comprise at least one programmable controller and a mechanical enclosure configured to house one or more programmable modules and provide engagement with one or more modules of exemplary electro-mechanical agent 75 (FIG. 3). In some configurations, controller 4004 can include an integration of at least one computer module, described elsewhere herein, that can be programmed as per user requirements in a language suitable for operation of electrical and mechanical module electro-mechanical agent 75 (FIG. 3). Computer module can include, for example, but not limited to, an ANDROID® module or a LINUX® module or an open source language compatible module. Some examples of computer modules can include, but are not limited to including, ARDUINO® controller, RASPBERRY PI®, and SNAPDRAGON®. Some configurations can include more than one computer module and/or computer modules of more than one type. Programming of the module can graduate the module to communicate with at least one user interface that is configured to generate user commands or instructions for operation of electro-mechanical agent 75 (FIG. 3). These instructions can be forwarded to at least one hardware controller board, described elsewhere herein. The hardware controller board can provide the required circuitry for operation of all the electrical and mechanical modules of electro-mechanical agent 75 (FIG. 3). The controller module can be configured to house at least one computer module and at least one hardware controller module therein.

Continuing to refer to FIGS. 21A and 21B, housing of controller module 4004 can comprise top cover 4010 that can be constructed to provide compartment 4012 to receive at least one computer module. Top cover 4010 can further comprise connection ports for establishing wired connections between control module, hardware controller module circuitry and the electrical and mechanical modules of electro-mechanical agent 75 (FIG. 3). In some configurations, a peripheral region of top cover 4010 can comprise connection port cavities such as, for example, but not limited to, battery connector port cavities 4060, general purpose connector port cavities 4030 that can include cavities that can accommodate digital connectors, analog input connector port cavities 4032, I2C connector port cavities 4033, connector port cavities 4034 configured to connect add-on controller modules (not shown) that can comprise additional hardware controller modules, or an expanded version of electro-mechanical agent 75 (FIG. 3), USB port cavities 4040, 4080, 4090, not limited to regular, micro USB and mini USB, daisy chain connector cavities 4050 for power, HDMI connection port cavities 4070, servo motor connector port cavities 4075, +5V power connector port cavities 4078, and encoder connector port cavities. Controller module enclosure 4004 can further comprise at least one button (not shown) to pair controller module enclosure 4004 with electro-mechanical agent 75 (FIG. 3). Module enclosure 4004 can further provide at least one status indicator means (not shown) for determining real-time status of electro-mechanical agent 75 (FIG. 3) and can also serve as debugging means for electro-mechanical agent 75 (FIG. 3). Base 4015 can mate with top portion 4010 to substantially envelope computer module and hardware controller module therein.

Referring now to FIGS. 21C through 21F, top enclosure cover 4010 can be configured to comprise slots that can be molded with body of cover 4010 for connection port cavities described herein. Connection slots can be customized to incorporate each port from an interior 4009 of enclosure 4010 to exterior 4008. Top cover 4010 can provide at least one engagement point for coupling top cover 4010 with base 4015 and with at least one module of electro-mechanical agent 75 (FIG. 3). Base 4015 of controller module enclosure 4004 can comprise internal face 4013 committed towards top cover 4010 and external face 4015 facing away from top cover 4010. Internal face 4013 can be sectioned to appropriately align a plurality of circuits of hardware controller module. Base 4015 can comprise engagement points 4115 and 4110 that can align with engagement points of top cover 4010 to allow coupling therewith along with pairing of coupled module 4004 with at least one module of electro-mechanical agent 75 (FIG. 3).

Figure 21G:
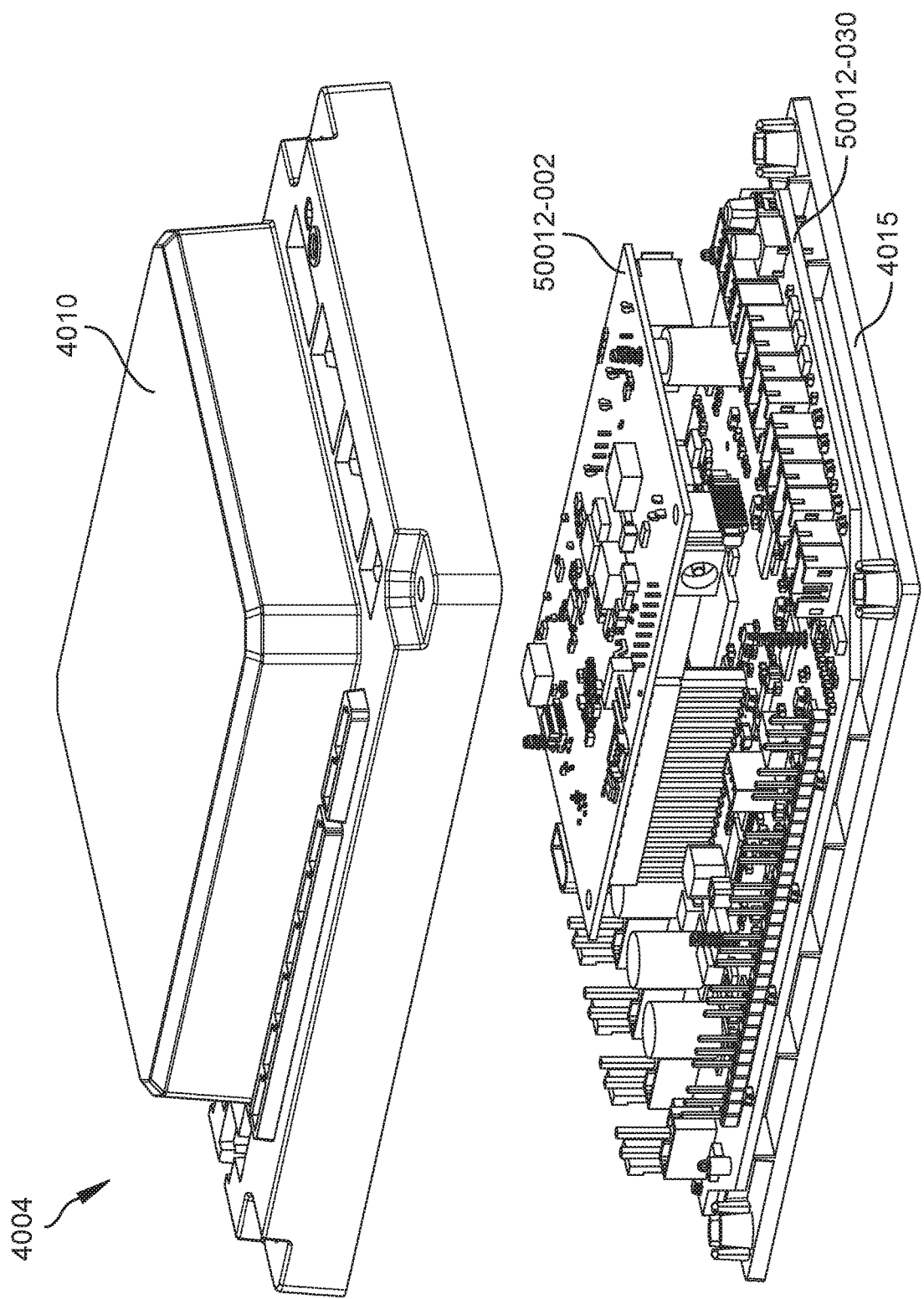

Referring now to FIG. 21G, disengagement of top cover 4010 of controller module enclosure 4004 reveals an exemplary disposition of computer module 50012-002 and hardware controller module 50012-030. Boards 50012-002 and 50012-030 can be affixed through at least one set of pairing features (not shown) and can be jointly engaged with base 4015. Controller enclosure 4004 can capture second configuration controller module 50012-030 physically at, for example, but not limited to, several points between the upper and lower enclosure parts. In some configurations, four screws can hold the upper and lower enclosure parts together. Two screws can go directly through second configuration controller module 50012-030 and cause the upper and lower enclosure parts to pinch second configuration controller module 50012-030, resulting in a strong fit. The other two screws can be contained within hollow bosses that can protrude through second configuration controller module 50012-030. Features of the upper enclosure can pinch communications module 50012-002, and there can be a few bosses extending from the upper enclosure that can touch off on the surface of communications module 50012-002, and mounting holes that can help locate the board and prevent it from moving upwards. Downward movement is constrained by connection 50012-002A (FIG. 21I)

Figure 21H:
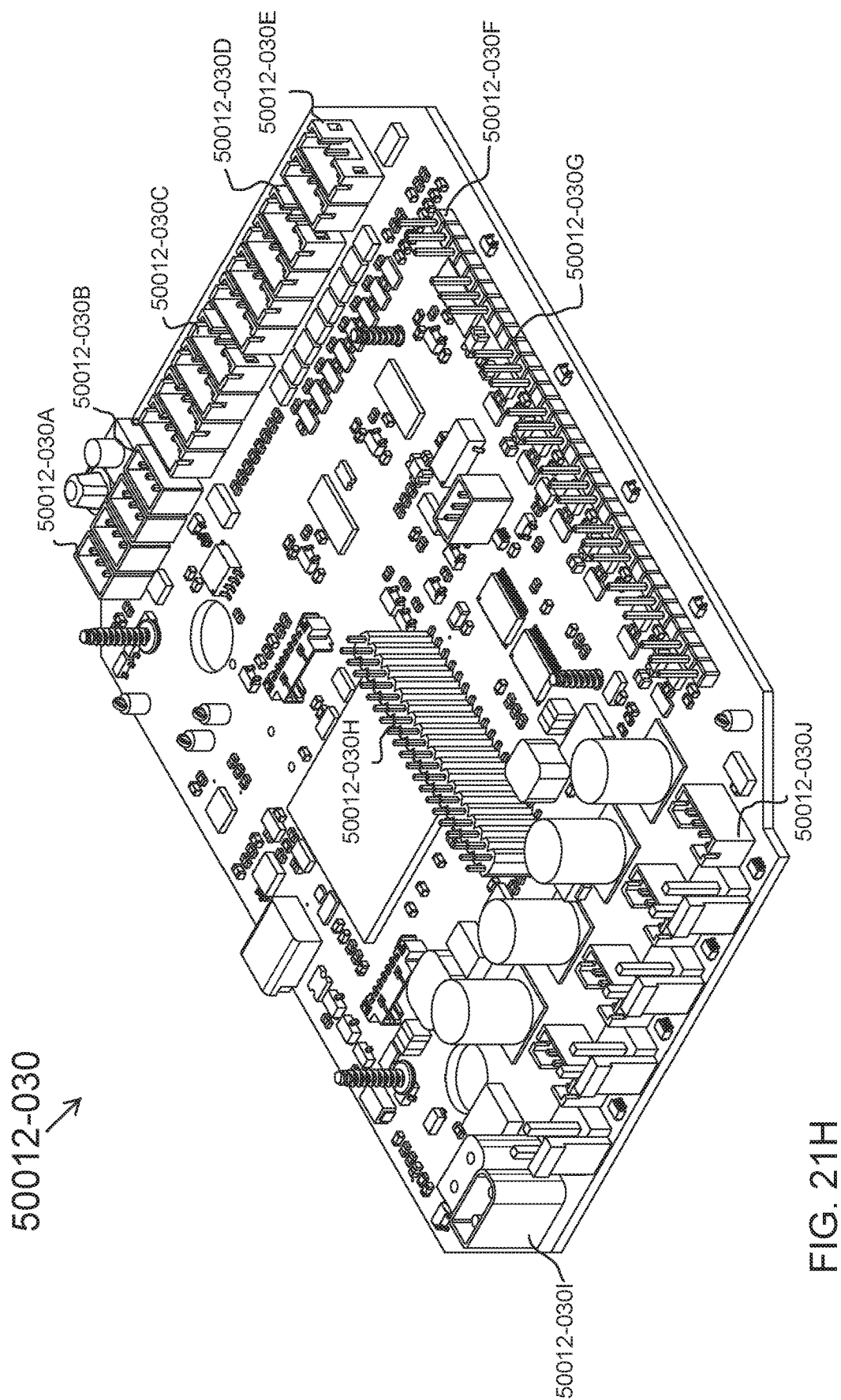
FIG. 21H is a perspective view of the controller module of the present teachings.

Referring now to FIG. 21H, second configuration controller module 50012-030 can receive commands and translate those commands to instructions for the components of the system. Second configuration controller module 50012-030 can include, but is not limited to including, external power connectors 50012-0301 and motor connectors 50012-030J that can receive and provide power. External power connectors 50012-0301 can support daisy chaining power to other controller modules 50012-030 enabling a system that can be powered by a single battery. Second configuration controller module 50012-030 can include external communications board connection 50012-030H that can enable interface with external communications board 50012-002. The position of external communications board connection 50012-030H can enable compact stacking of circuit boards that can reduce space consumption. The height of external communications board connection 50012-030H can enable clearance above second configuration controller module 50012-030 and ventilation for the circuit boards. Second configuration controller module 50012-030 can include connectors that can conduct input/output with servos 50012-030G, auxiliary power 50012-030F, analog input 50012-030E, and GPIO 50012-030D. Second configuration controller module 50012-030 can include I2C ports 50012-030C that can support multiple sensors, daisy chained in a bus, as long as the multiple sensors have different I2C addresses. Second configuration controller module 50012-030 can include RS485 50012-030B and UART 50012-030A connectors. The 4-pin connectors on second configuration controller module 50012-030 can include pin outs that can protect second configuration controller module 50012-030 and sensors from damage if they become engaged with the wrong connector.

Figure 21I:
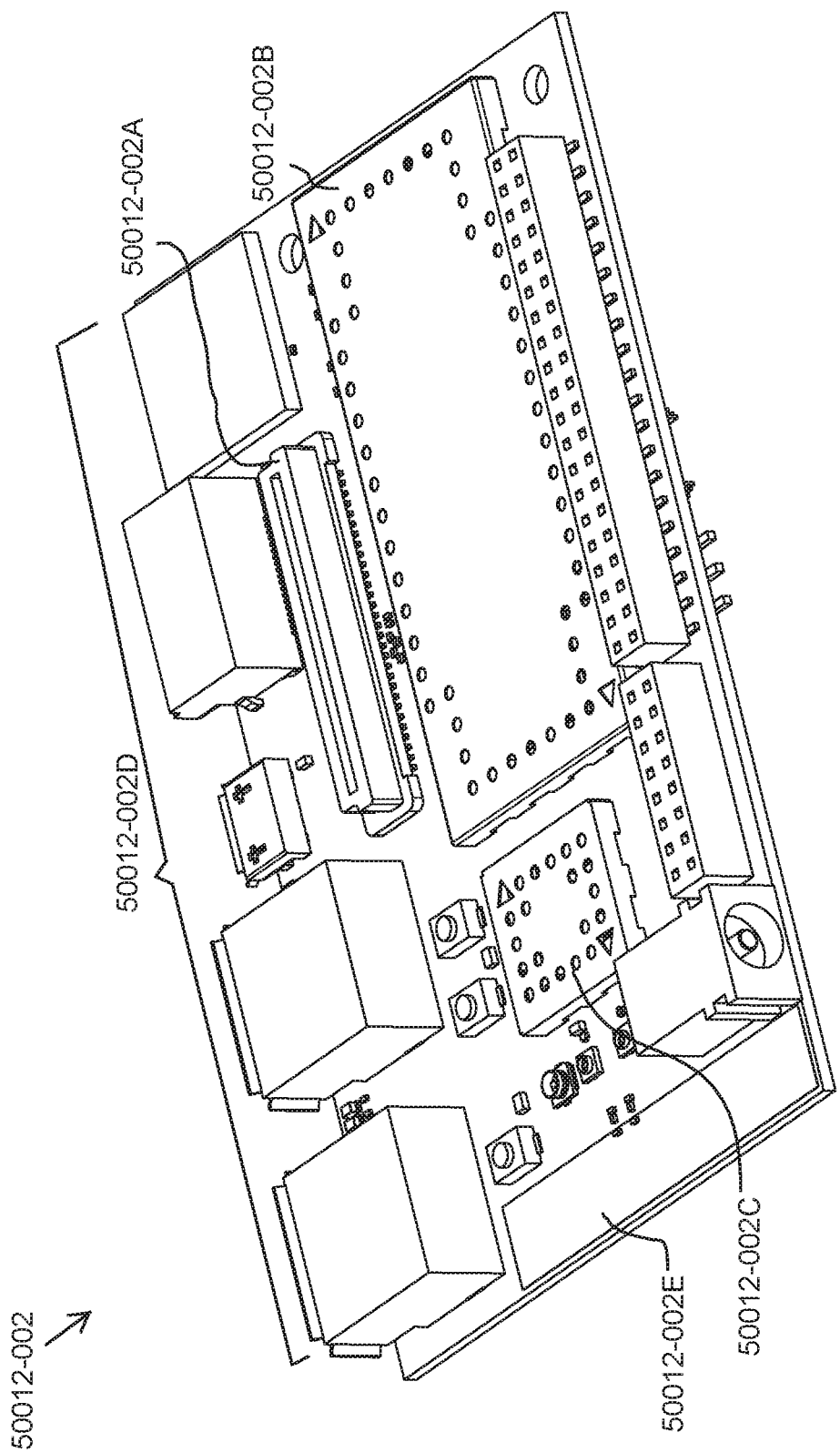
FIG. 21I is a perspective view of an exemplary communications board of the present teachings.

Referring now to FIG. 21I, external communications board 50012-002 can provide communications between second configuration controller module 50012-030 and external components such as peripherals and remote processors. External communications board 50012-002 can receive commands from an external application and provide those commands to second configuration controller module 50012-030 through connector 50012-002A to provide direction and control to the components of the electro-mechanical agent. External communications board 50012-002 can include, but is not limited to including, peripheral connectors 50012-002D, computation electronics 50012-002B, communications circuitry 50012-002C, and communications sensors 50012-002E. In some configurations, external communications board 50012-002 can include a 32/64-bit CPU, 1 GB of storage, and camera/video support. In some configurations, external communications board 50012-002 can support Wifi 802.11, BLUETOOTH® protocol, and USB and HDMI connections. In some configurations, a DRAGONBOARD® circuit board from Qualcom, Inc. can provide communications functionality.

Figure 22:
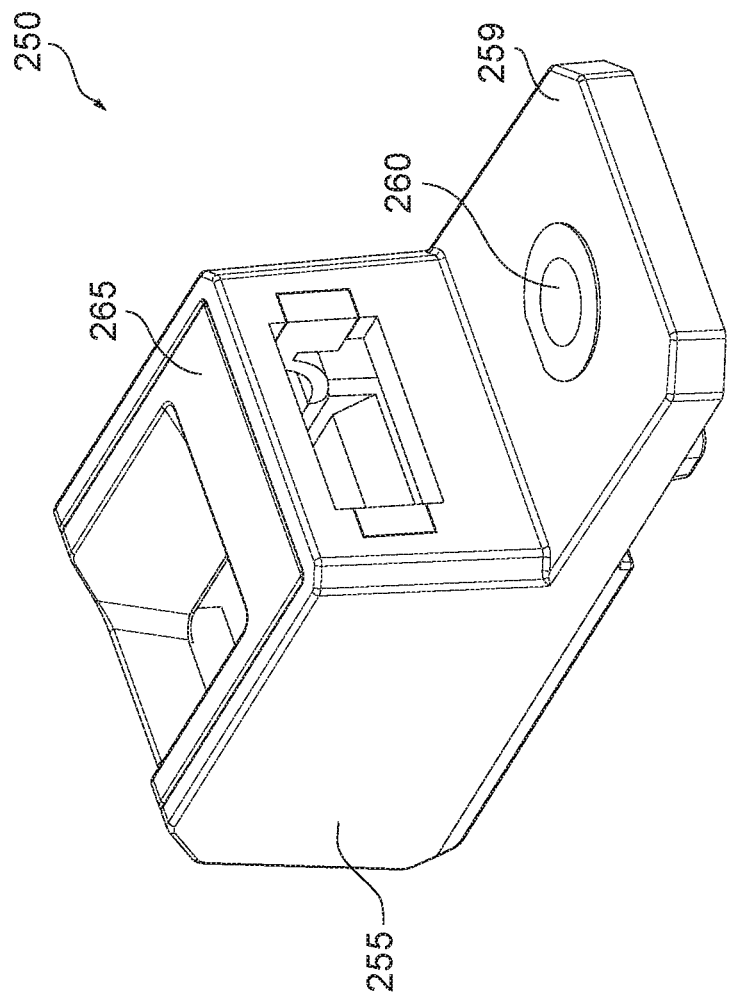
FIG. 22 is a perspective view of a configuration of the sensor housing of the present teachings.
Figure 23:
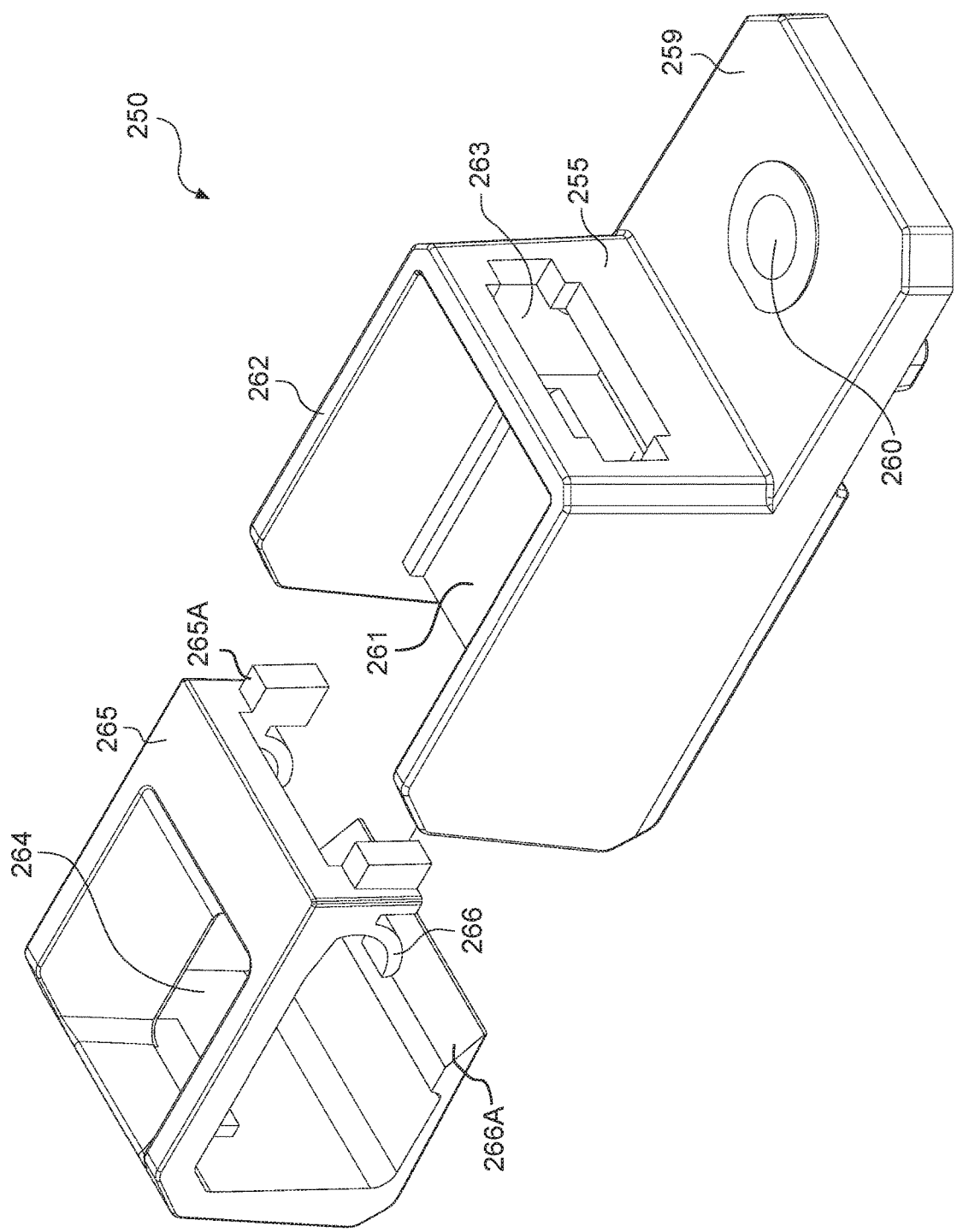
FIG. 23 is an exploded view of the configuration of the sensor housing shown in FIG. 22.
Figure 24:
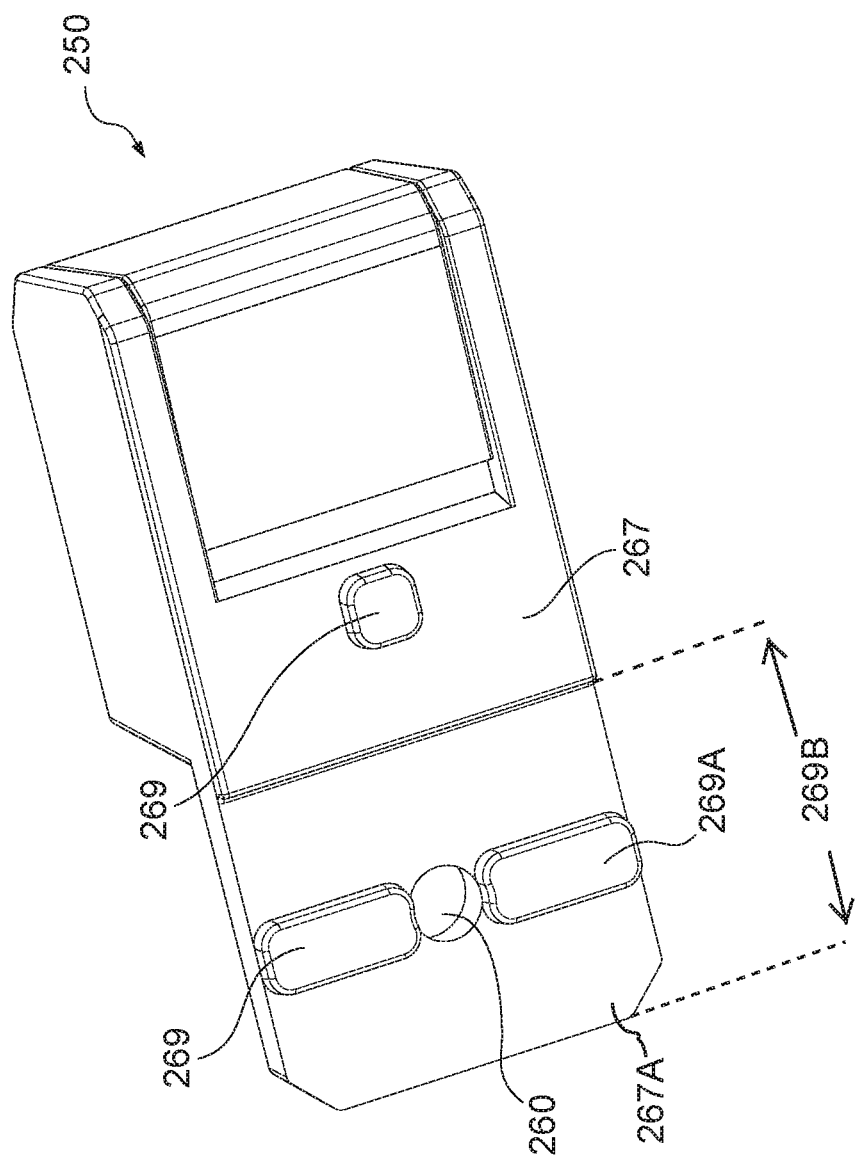
FIG. 24 is another view of the configuration of the sensor housing shown in FIG. 22, focusing on aligning nubs provided on the base surface.

Referring now primarily to FIG. 22, FIG. 23, and FIG. 24, sensor housing first example configuration 250 can comprise receiving pedestal 255 and slidable covering 265. Receiving pedestal 255 can comprise mounting platform 259. Mounting platform 259 can be figured to engage with elementary unit 80 (FIG. 5). Mounting platform 259 can further comprise mounting groove 260 for engaging sensor housing first example configuration 250 with one or more elementary units and/or one or more supplementary modules and/or extension modules of electro-mechanical agent 23 (FIG. 1). A sensor board (not shown) can be disposed between slidable covering 265 and receiving pedestal 255.

Continuing to refer to FIG. 22, FIG. 23, and FIG. 24, receiving pedestal 255 can further comprise pedestal-compartment 261 (FIG. 23) wherein slidable covering 265 (FIG. 22) can be rested. In some configurations, slidable covering 265 (FIG. 22) can be guarded by wall 262 (FIG. 23) of pedestal compartment 261. Slidable covering 265 (FIG. 22) can provide a plurality of resting bends 266 (FIG. 23) that can serve as a platform to allow one or more sensor circuit boards and/or sensor encoder (not shown) to rest thereupon, and to flex, preventing rattle. Vertical retention means 265A (FIG. 23) can enable secure interconnection of slidable covering 265 within pedestal compartment 261 (FIG. 23), and snap feature 266A (FIG. 23) can extend the width of slidable covering 265. First window 264 (FIG. 23) can be provided on slidable covering 265 (FIG. 22) such that the electrical components on a sensor circuit board can perform a sensing operation. The sensing operation of sensor 37 (FIG. 1) housed in sensor housing 250 can be enabled by way of second window 263 (FIG. 23), provided on pedestal compartment 261 (FIG. 23) of receiving pedestal 255 (FIG. 22). Sensor housing first example configuration 250 can comprise floor 267 (FIG. 24). Mounting of sensor housing first example configuration 250 can cause floor 267 (FIG. 24) to be in contact with at least one module (not shown) on which sensor housing first example configuration 250 can be mounted. Floor 267 (FIG. 24) can comprise a plurality of aligning nubs 269 (FIG. 24). Exemplary sensors 145 (FIG. 3) can be engaged with elementary unit 85 (FIG. 3) such that mounting platform 259 (FIG. 22) can be fastened on an attachment groove of elementary unit 85 (FIG. 3). Aligning nubs 269 (FIG. 24), provided on floor 267 (FIG. 24) of sensor housing first example configuration 250 can enable a substantially sturdy engagement between sensor housing first example configuration 250 and elementary unit 85 (FIG. 3). A longitudinal engagement groove on elementary unit 85 (FIG. 3) can be configured to receive nubs 269 (FIG. 24) when sensor housing first example configuration 250 is mounted on elementary unit 85 (FIG. 3). Presence of nubs 269 (FIG. 24) can restrict sensor housing first example configuration 250 to pivot about a fastener configured to attach housing 250 with elementary unit 85 (FIG. 3) by way of mounting groove 260 (FIG. 24). Width 269B (FIG. 24) can match the width of elementary unit 85 (FIG. 3). Floor 267 and surface 267A (FIG. 24) can be coplanar.

Figure 25:
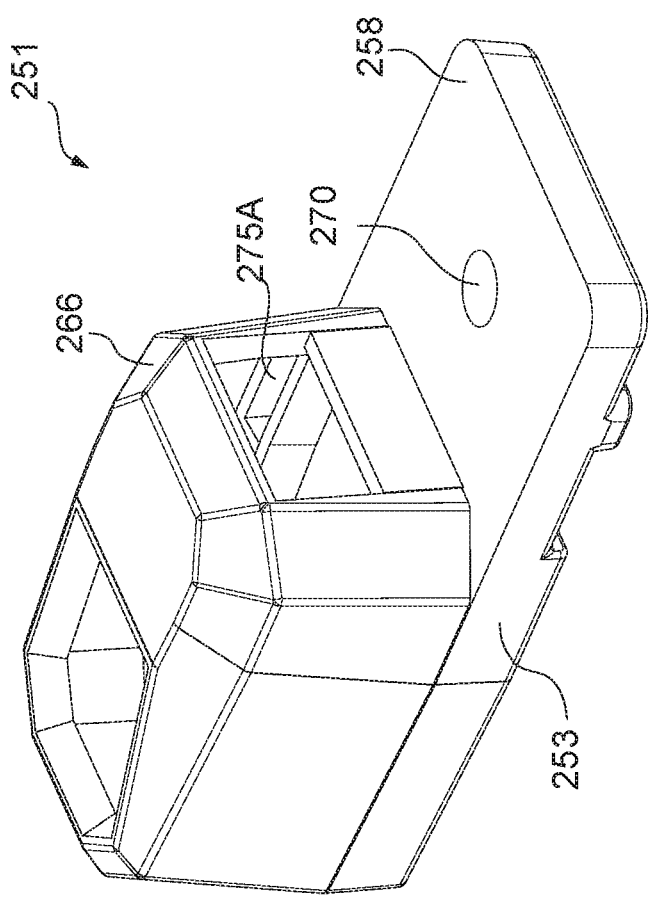
FIG. 25 is a perspective view of another configuration of the sensor housing of the present teachings.
Figure 26:
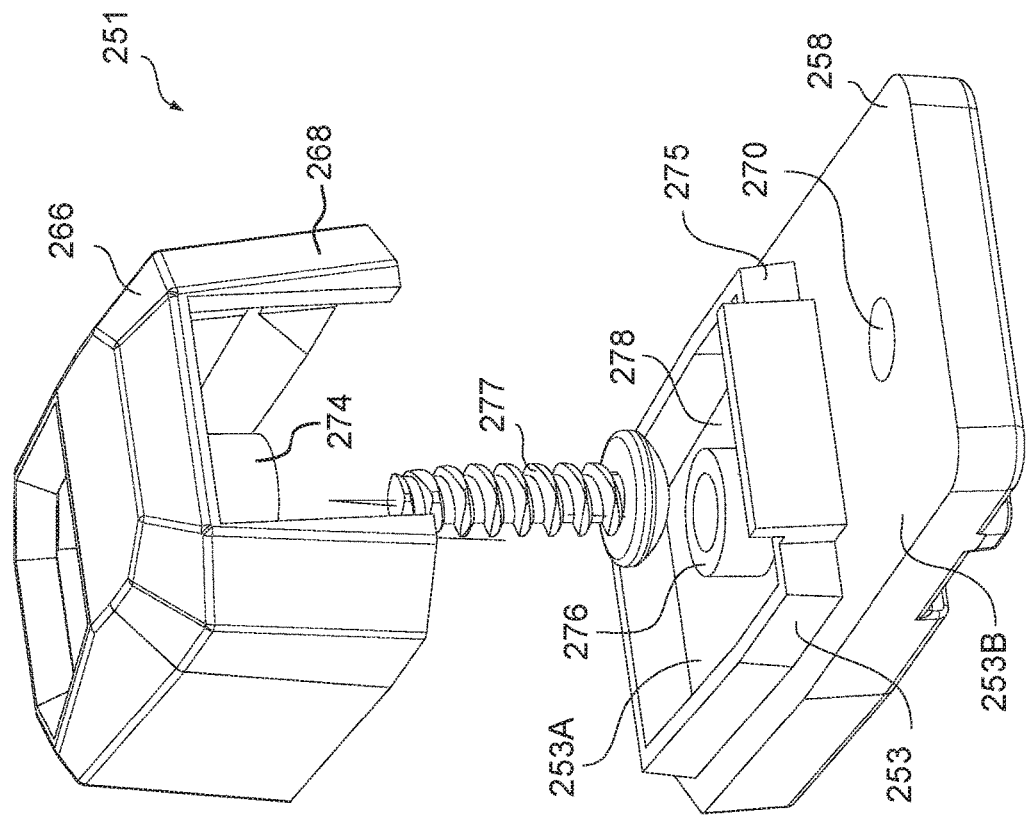
FIG. 26 is an exploded view of the configuration of the sensor housing shown in FIG. 25.
Figure 27:
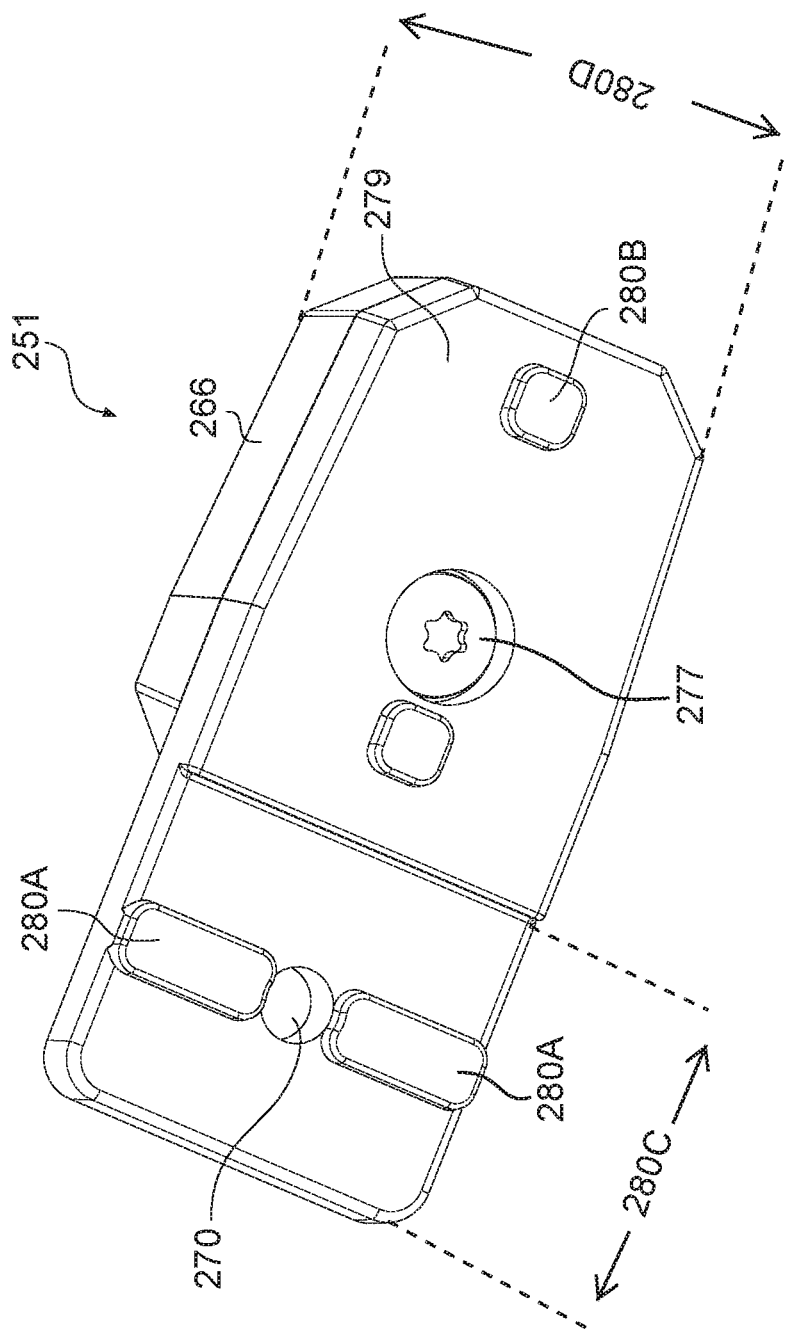
FIG. 27 is a base view of the configuration of the sensor housing shown in FIG. 26, focusing on the aligning nibs provided on the base surface.

Referring now primarily to FIG. 25, FIG. 26 and FIG. 27, sensor housing second example configuration 251 can further comprise base portion 253 (FIG. 25) and top covering 266. Top covering 266 can be configured to substantially occupy base portion 253 (FIG. 25) and partially or fully enclose a pre-determined area of base portion 253. In some configurations, base portion 253 (FIG. 25) can be divided into a first area 253A enclosed by top covering 266 and a second area 253B (FIG. 26) configured to mount sensor housing second example configuration 251 on an elementary unit and/or a supplementary module and/or extension module of electro-mechanical agent first example configuration 75 (FIG. 3). Top covering 266 can be an inverted cup structure enclosing first area 253A (FIG. 26) of base portion 253 (FIG. 25). A sensor circuit can be disposed within the first area enclosed by top covering 266. Top covering 266 can further provide at least one operation window 275A (FIG. 25) configured to perform a sensing operation by way of one or more sensor circuits disposed therein. A second area 253B (FIG. 26) of base portion 253 (FIG. 25) can comprise mounting groove 270 to allow engagement of sensor housing second example configuration 251 on a mounting module such as but not limited to, elementary unit 85 (FIG. 3) by way of at least one fastener.

Referring now to FIG. 26, base portion 253 can comprise fenced ground 278 configured to be enclosed by top covering 266. Base portion 253 can also include engagement facility 276 for allowing engagement of base portion 253 with top covering 266. Engagement fastener 277 can be employed under and through engagement facility 276 into upper engagement means 274 to assist with this engagement. Top covering 266 can further provide enclosure walls 268 that can rest on base portion 253 such that fence 275 of fenced ground 278, is enclosed within walls 268 as top covering 266 mates with base portion 253. Top covering 266 can further comprise fastener receiver 264 configured to receive engagement fastener 277 through engagement facility 276 assisting in base portion 258.

Referring now primarily to FIG. 27, floor area 279 of sensor housing second example configuration 251 is shown. Base portion 258 (FIG. 26) can attach with elementary unit 85 (FIG. 3) by way of one or more fasteners configured to enter one or more corresponding mounting grooves 270 provided on mounting platform 258 (FIG. 26) of base portion 253 (FIG. 26). Exemplary sensors 145 (FIG. 3) can be engaged with elementary unit 85 (FIG. 3) by way of at least one fastener. Floor area 279 of base portion 258 (FIG. 26) can provide a plurality of nubs 280A/B configured to align sensor housing second example configuration 251 when mounted. Nubs 280A/B can include protrusions of diverse dimensions, extending from floor area 279 of base portion 258 (FIG. 26). A longitudinal engagement groove (not shown) on elementary unit 85 (FIG. 3) can be configured to receive nubs 280A/B when sensor housing second example configuration 251 is mounted on elementary unit 85 (FIG. 3). Nubs 280A/B can enable a substantially sturdy engagement between sensor housing second example configuration 251 and elementary unit 85 (FIG. 3) and can restrict sensor housing second example configuration 251 from pivoting about a fastener configured to attach sensor housing second example configuration 251 with elementary unit 85 (FIG. 3) by way of engagement groove 270. In some configurations, at least two types of nubs 280A and 280B can be provided. Nubs 280A can be employed for alignment when sensor housing second example configuration 251 is placed perpendicular to elementary unit 85 (FIG. 3) in width 280C, while nubs 280B can be employed for alignment when sensor housing second example configuration 251 is disposed parallel to elementary unit 85 (FIG. 3) in width 280D. Engagement fastener 277 can be used for engagement between sensor housing second example configuration 251 and elementary unit 85 (FIG. 3).

Figures 1, 27A:
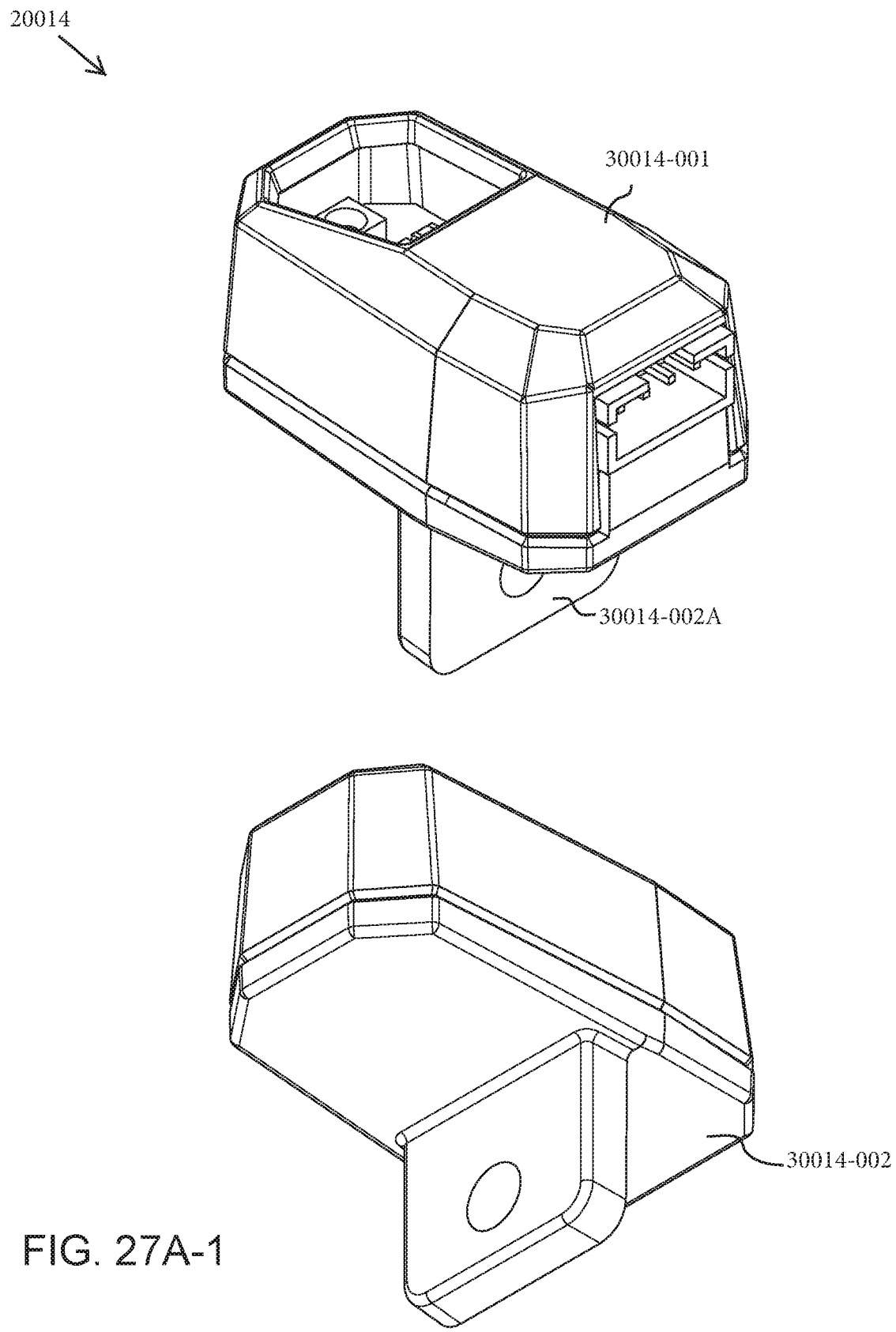
Figures 2, 27A:
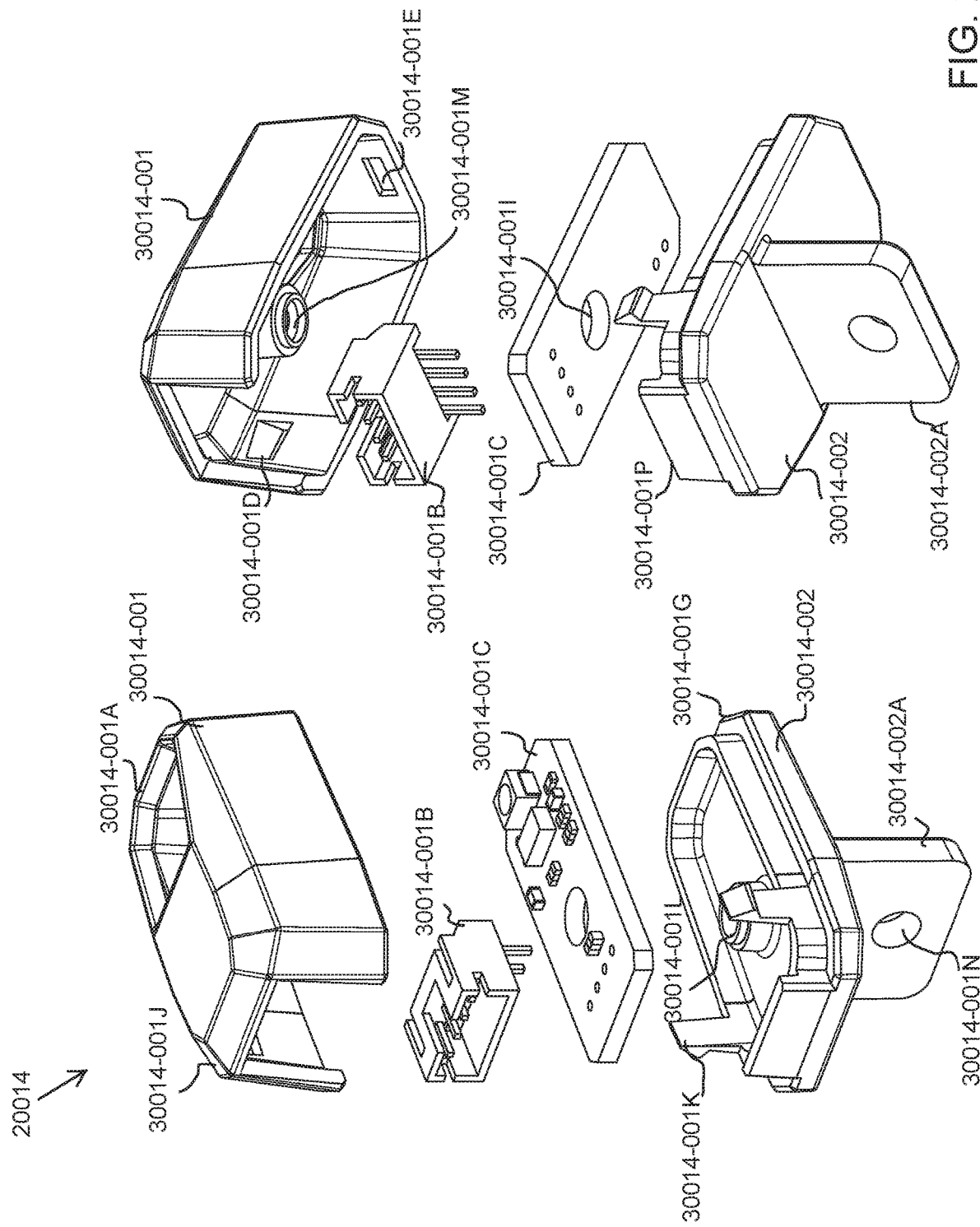
Figure 27A:
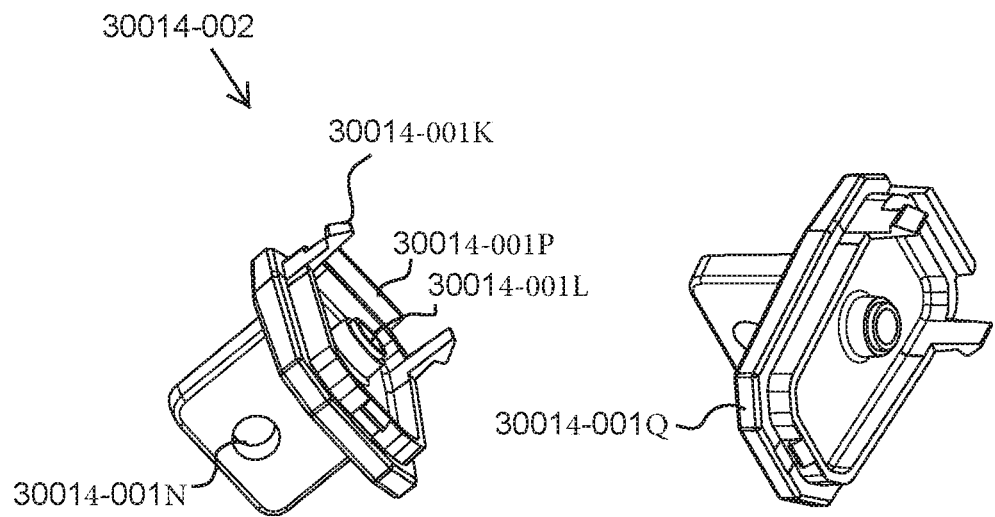
Figure 3:
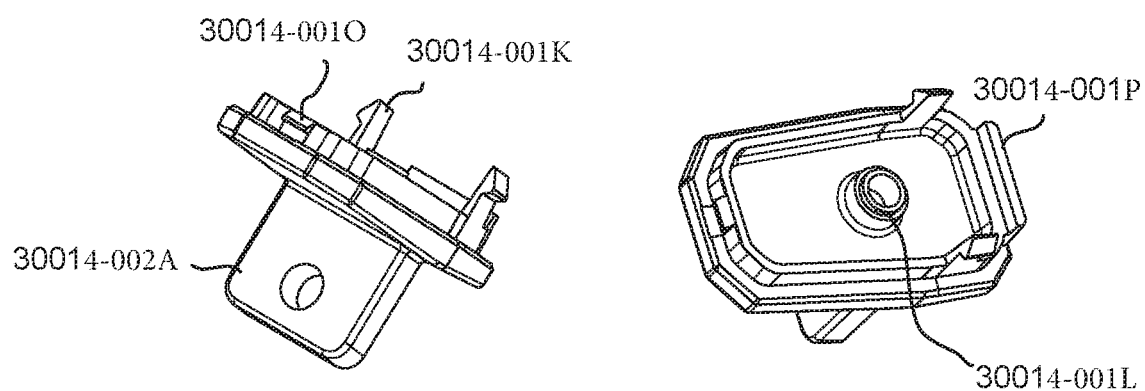
Figures 4, 27A:
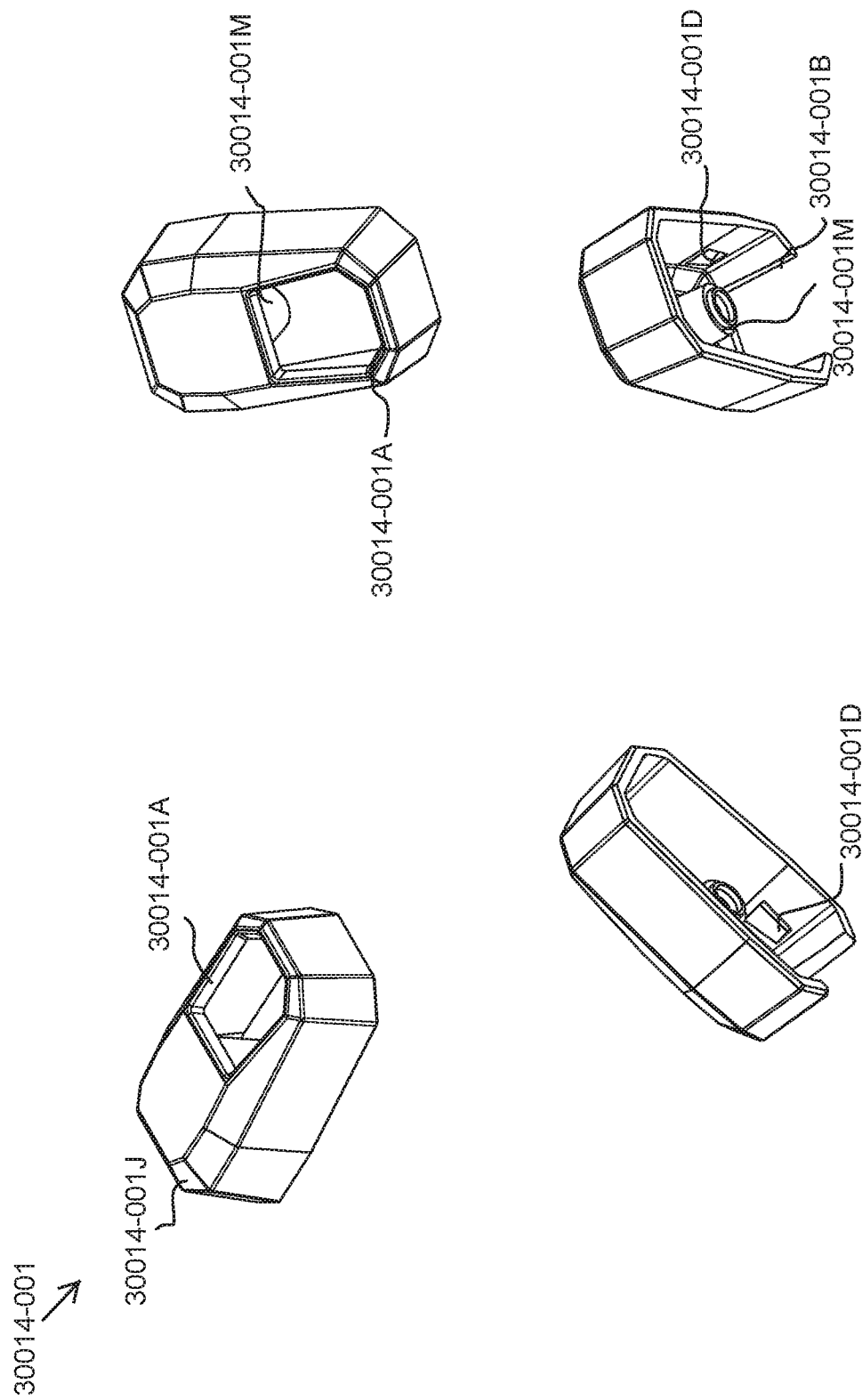
Figures 5, 27A:
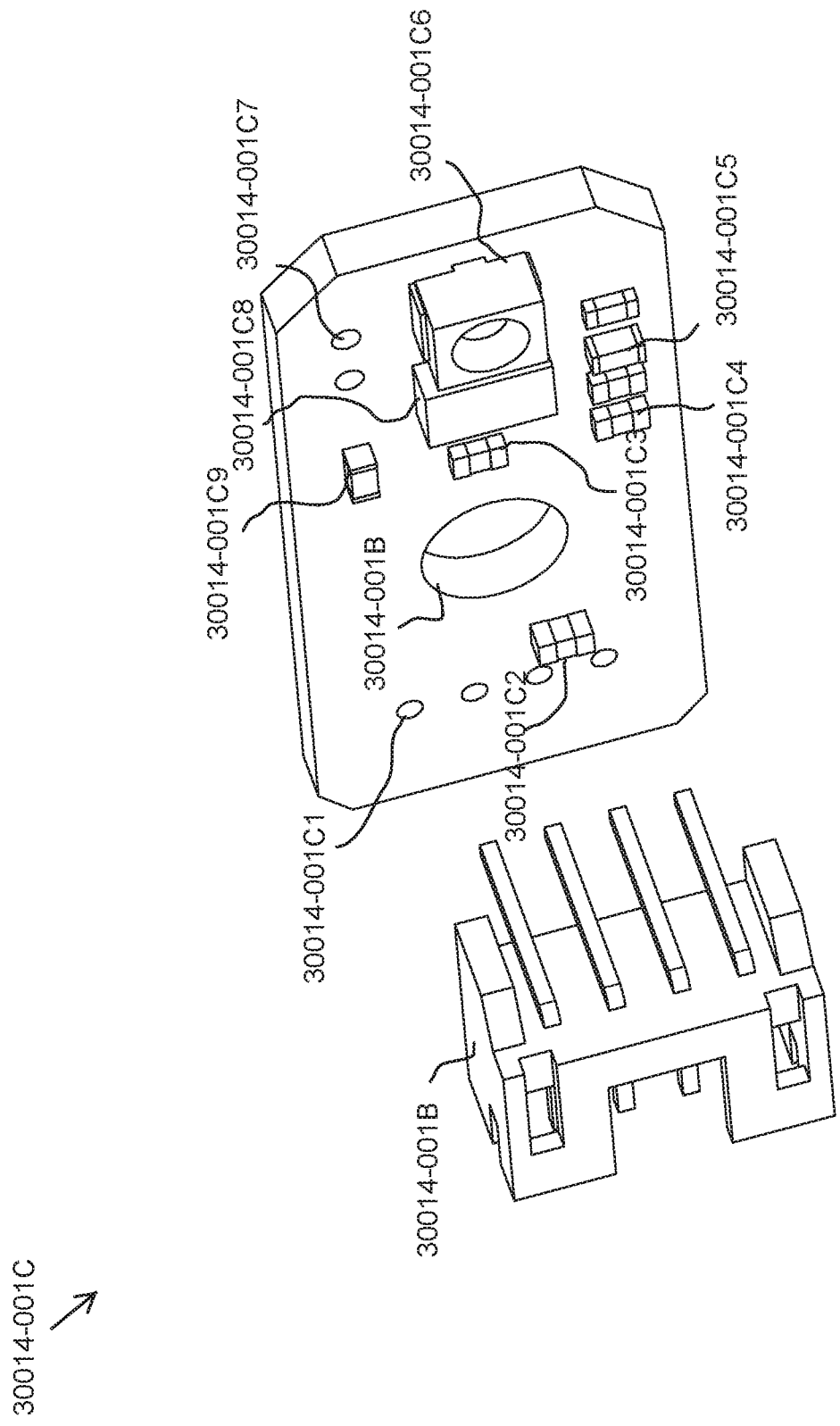

Referring now to FIGS. 27A-1 and 27A-2, third example sensor configuration 20014 can include a sensor that can, for example, sense light impinging upon modular electro-mechanical agent 75 (FIG. 3) upon which third example sensor configuration 20014 can be mounted, and detect proximity of objects by casting light on them and sensing the intensity of the reflected light. Third example sensor configuration 20014 can include, but is not limited to including, upper housing 30014-001, lower housing 30014-002, and mounting protrusion 30014-002A. In some configurations, third example sensor configuration 20014 can be mounted upon extrusion 85 (FIG. 3) and can be appropriately positioned to sense environmental parameters important to modular electro-mechanical agent 75 (FIG. 3), for example. Lower housing 30014-002 (FIG. 27A-3) can include mounts 30014-001K, 30014-001O (FIG. 27A-3) that can operably couple with attachment mount cavities 30014-001D, 30014-

001E (FIG. 27A-4) by means of flexing in both housing components, to maintain secure coupling between upper housing 30014-001 (FIG. 27A-4) and lower housing (FIG. 27A-3) to protect sensor equipment. Lower housing 30014-002 (FIG. 27A-3) can include lower alignment means 30014-001L (FIG. 27A-3) that can operably mate with upper alignment means 30014-001M (FIG. 27A-4) through alignment hole 30014-0011 (FIG. 27A-5) in sensor board 30014-001C (FIG. 27A-5), thus stabilizing sensor board 30014-001C (FIG. 27A-5) and the associated sensor to insure accurate readings. Lower housing can include mounting protrusion 30014-002A (FIG. 27A-3) and mounting cavity 30014-001N (FIG. 27A-3) that can enable mounting of third example sensor configuration 20014 (FIG. 27A-2) onto extrusion 85 (FIG. 3). Chamfered ends 30014-001Q (FIG. 27A-3), 30014-001J (FIG. 27A-4) can enable accommodation for space and elimination of sharp edges, among other advantages. Upper housing 30014-001 (FIG. 27A-4) can include sensor cavity 30014-001A (FIG. 27A-4) that can allow the sensor upon sensor board 30014-001C (FIG. 27A-5) to interface with the environment. Sensor board 30014-001C (FIG. 27A-5) can include, for example, resistors 30014-001C3/C4 (FIG. 27A-5), capacitors 30014-001C2/C5/C9 (FIG. 27A-5), diode 30014-00106 (FIG. 27A-5), and connection means 30014-001C1/C7 (FIG. 27A-5). In some configurations, connection means 30014-001C1 (FIG. 27A-5) can accommodate power/communications jack 30014-001B (FIG. 27A-5). Integrated circuit 30014-001C8 (FIG. 27A-5) can enable the particular sensor. Third example sensor configuration 20014 (FIG. 56A) can be positioned anywhere on an electro-mechanical agent, for example, upon extrusions that make up the frame of the electro-mechanical agent. In some configurations, multiple third example sensor configurations 20014 (FIG. 56A) can be mounted together.

Figure 29:
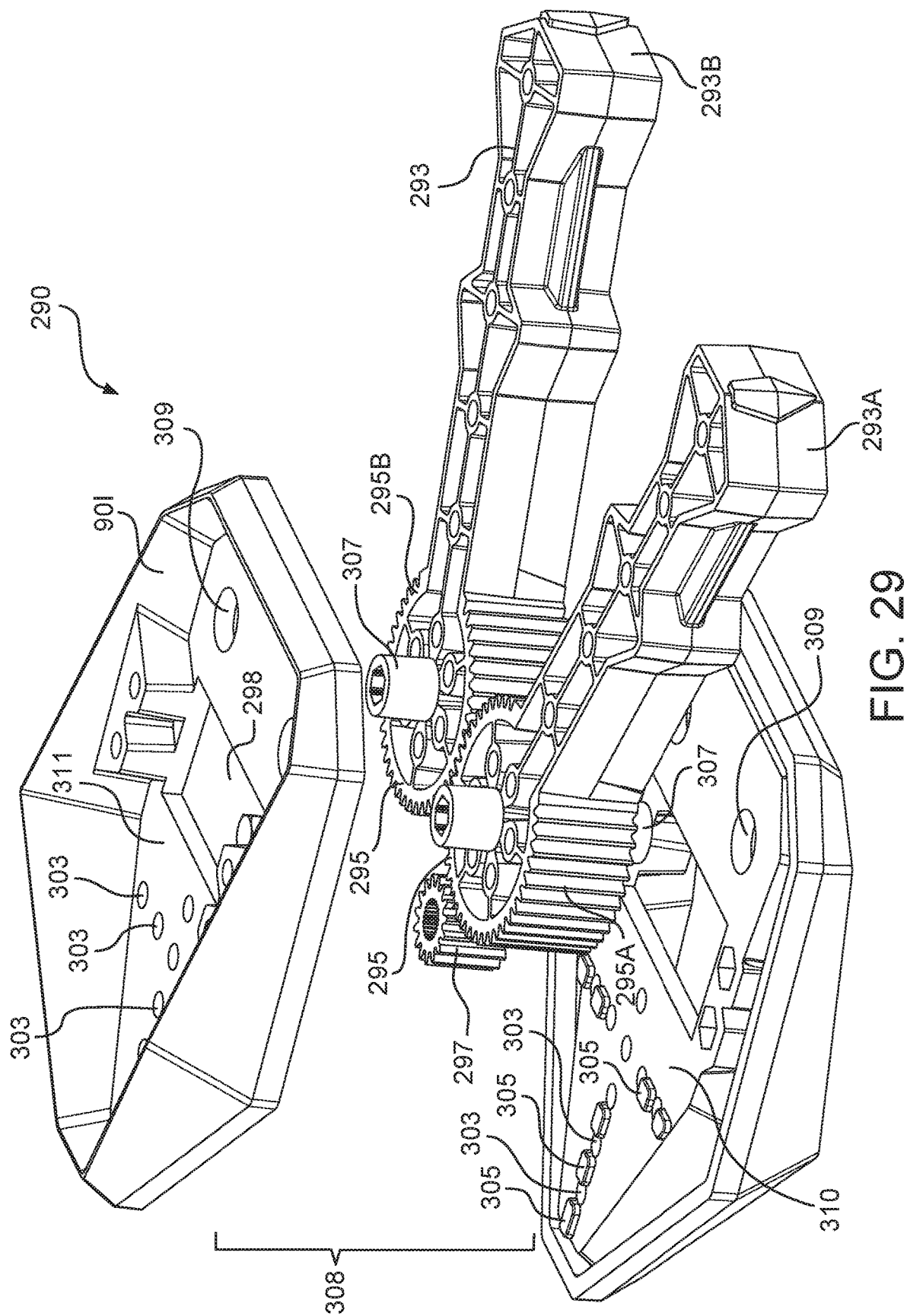
FIG. 29 is an exploded view of the configuration of the engagement assembly including a grasping tool shown in FIG. 28.

Referring now to FIG. 28 to FIG. 31, exemplary engagement tool 290 is depicted. Electro-mechanical agent first example configuration 75 (FIG. 3) can comprise at least one engagement tool to perform and/or contribute in performing at least one assigned task. A plurality of engagement tools can be provided on a single electro-mechanical agent 75 (FIG. 3). The choice of engagement tools can depend on, for example, but not limited to, the nature of the at least one assigned task and/or restrictions on the weight and/or dimensions of electro-mechanical agent first example configuration 75 (FIG. 3), for example. Engagement tools can be constructed from one or more supplementary modules of the modular construction kit and/or the extension modules external to the modular construction kit. First exemplary engaging tool 290 can include a grasping assembly. First exemplary configuration engaging tool 290, can include at least one set of graspers 293. Graspers 293 can comprise at least two arms extending away from electro-mechanical agent 75 (FIG. 3) and can be configured to attain an open position and a closed position. At least one geared end 295 can be provided on one of the terminal ends of graspers 293. At least one set of arms of graspers 293 can be held between a first set of grasper plates 90I (FIG. 29). Besides trapping graspers 293, grasper plates 90I (FIG. 29) can also serve as intermediaries for engaging graspers 293 with remaining of electro-mechanical agent first example configuration 75 (FIG. 3).

Referring now primarily to FIG. 29, geared ends, collectively referred to as geared end 295 of grasper arms 293 can be provided on the terminal ends disposed close to the electro-mechanical agent 75 (FIG. 3). Geared ends 295A and 295B can be configured to mesh such that a rotary motion of one of geared ends 295A can cause a resultant rotary motion of other geared end 295B thereby causing first exemplary configuration engaging tool 290 to switch from an open position (depicted) to a closed position and vice-versa. First exemplary configuration engaging tool 290 can comprise driving gear 297 configured to mesh with any one or both of geared ends 295A and 295B of grasper arms 293A and 293B. Driving gear 297 can receive an input rotational motion from grasper motor 315 (FIG. 30) such as, for example, but not limited to, a servo-motor. Driving gear 297 can advance the rotational motion and torque from grasper motor 315 (FIG. 30) to geared ends 295A and 295B causing the required extent of opening or closing of grasper arms 293A and 293B. In some configurations, driving gear 297 can mesh with first geared end 295A of grasper arm 293A, first geared end 295A can in turn mesh with second geared end 295B of grasper arm 293B. Geared ends 295A and 295B can be disposed in an offset manner to ensure an equal length of two grasper arms 293A and 293B. Grasper arms 293 can be cast out of a single mold and can reduce the manufacturing costs for the grasper arms 293 due to the offset.

Continuing to refer primarily to FIG. 29, grabbing assembly 290 can comprise grasper plates or grasper brackets 90I, configured to trap grasper arms 293 by way of one or more grasper shafts 307. Grasper brackets 90I can further comprise inner surface 310, facing trapped grasper arms 293 and outer surface 311, facing away from grasper arms 293. Grasper brackets 90I can come together to encompass spatial region 308 of respective inner surfaces 310. A plurality of entry points can be provided to spatial region 308. Geared ends 295A and 295B of grasper arms 293A and 293B can enter spatial region 308 from one of the plurality of entry points and can be trapped in spatial region 308 after travelling a pre-determined distance from the entry point. Grasper brackets 90I can further include a plurality of attachment grooves 303. Grooves 303 can be configured to engage at least one set of grasper brackets 90I with one or more elementary units 85 (FIG. 3) and/or one or more supplementary modules and/or extension modules of electro-mechanical agent first exemplary configuration 75 (FIG. 3). In some configurations, grasper brackets 303 can engage with one or more elementary units 85 (FIG. 3) and/or one or more modules with spatial region 308, as they also continue to trap grasper arms 293A and 293B. Elementary units 85 (FIG. 3) can be inserted in spatial region 308 and detachably engage therebetween. A plurality of alignment nubs 305 can further ensure sturdy engagement between elementary units 85 (FIG. 3) with grasper brackets 90I. The plurality of alignment nubs 305 can be rested in a longitudinal groove provided on elementary units 85 (FIG. 3), as one or more fasteners engage elementary units 85 (FIG. 3) with grasper brackets 90I by way of engagement grooves 303, and can further ensure this engagement to be sturdy by providing the plurality of alignment nubs 305 between engagement grooves 303.

Continuing to refer primarily to FIG. 29, geared ends 295A and 295B of grasper arms 293A and 293B can be received by at least one grasper shaft 307, which can be subsequently received by shaft-engaging grooves 309 provided on grasper brackets 90I. Grasper arms 293 can pivot about corresponding grasper shafts 307.

Referring now primarily to FIG. 30, depict engaging tool first exemplary configuration 290 is depicted in an operational mode, wherein grasper arms 293A and 293B engage target object 313. Terminal ends of grasper arms 293A and 293B can be configured to separate from one another to provide a trapping space for at least one target object 313.

The degree of separation between the terminal ends of grasper arms 293A and 293B can be determined by dimensions of target object 313 and/or the number of target objects 313 that can be trapped together at once.

Figure 31:
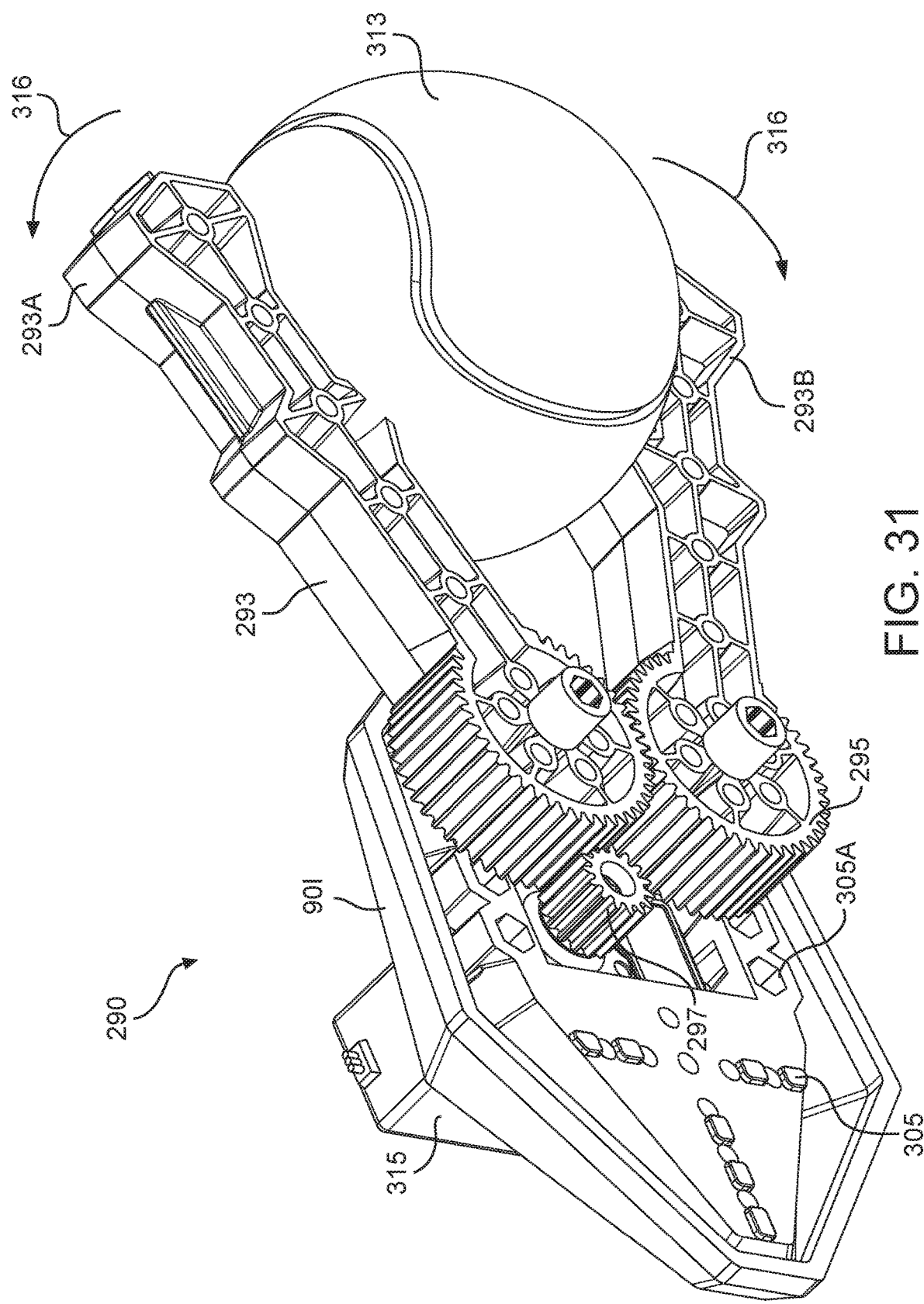
FIG. 31 is a perspective view of the configuration of the engagement assembly including the grasping tool shown in FIG. 30, and focusing on an internal gear arrangement of the engagement assembly.

Referring now primarily to FIG. 31, in some configurations, engaging tool first exemplary configuration 290 can approach target object 313, pivot grasper-arms 293A and 293B in a direction such as, for example, but not limited to, direction 316 to an extent enough to receive at least one target object 313 between them. Grasping arms 293 can further travel in direction 317 (FIG. 30) to substantially trap at least one target object 313 and perform the assigned task with trapped object 313. Grasper arms 293A and 293B with motion in direction 317 (FIG. 30) and/or in direction 316 can be directed by the interaction of geared ends 295A (FIG. 29) and 295B (FIG. 29) with driver gear 297 (FIG. 29). Driver gear 297 (FIG. 29) can be in rotary connection with grasper-motor 315 to receive an incoming rotational motion to drive grasper arms 293A and 293B. Hex cavities 305A can enable servo mounting, for example.

Figure 32A:
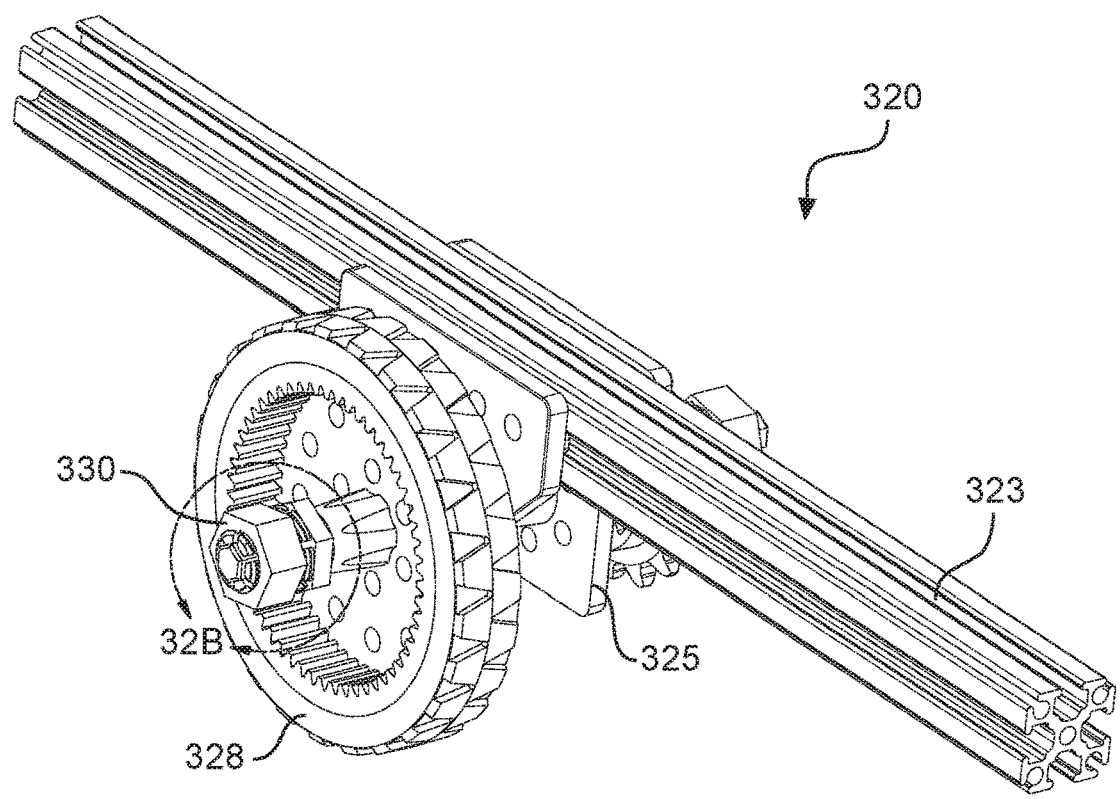
FIG. 32A is a perspective view of a configuration of the shaft collar of the present teachings.
Figure 32B:
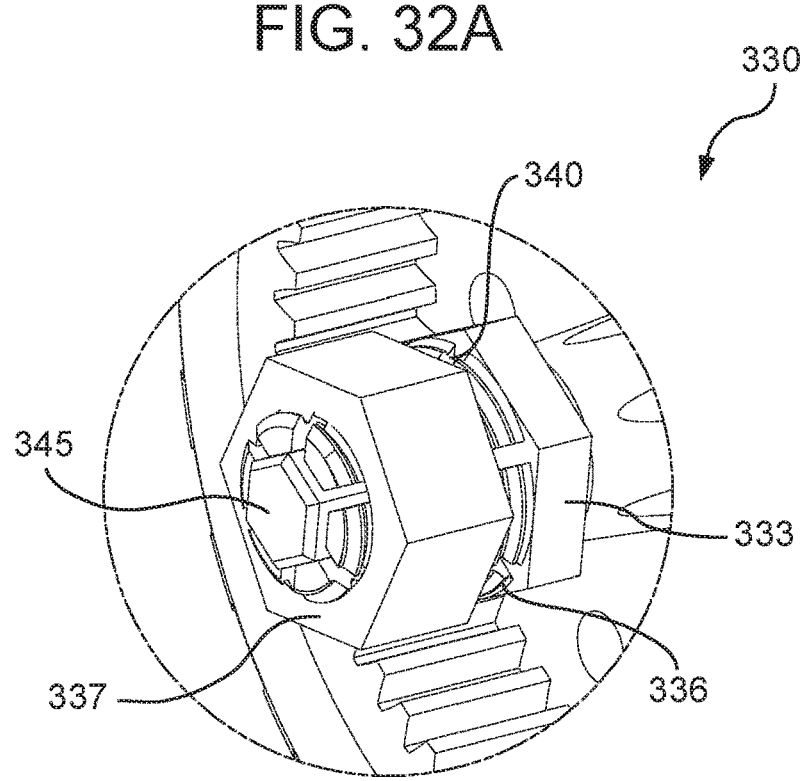
FIG. 32B is a detailed view of the shaft collar shown in FIG. 32A, focusing on the engagement of the shaft collar and a shaft.

Referring primarily to FIG. 32A, shaft collar 330 can serve as a locking or grasping apparatus for an exposed portion of shaft 345 (FIG. 32B). A shaft can be coupled to one or more components by being inserted in at least one shaft receiving-mouth provided on the one or more components. The engagement area between the shaft and one or more components can be limited to the area of the shaft-receiving mouth, thus leaving a portion of the shaft exposed. This engagement can be ruptured due to any motion of the one or more component and can cause the shaft to withdraw from the shaft-receiving mouth of the component. FIG. 32A depicts an environmental assembly 320 employing shaft collar 330. Environmental assembly 320 is depicted as an example to discuss components of shaft collar 330 and the method of engaging shaft collar 330 on an exposed shaft portion. Environmental assembly 320 can comprise elementary unit 323 configured to receive at least one rotating module, for example, but not limited to, at least one wheel module 328, wherein wheel module 328 can be, but is not limited to being, a regular wheel or an omni-directional wheel. A plurality of connectors 325 can serve as intermediaries for engaging wheel module 328 with elementary unit 323 and/or additional supplementary modules and/or extension modules. Shaft 345 (FIG. 32B) can be configured to connect wheel module 328 with elementary unit 323 via intermediary connectors 325.

Referring now primarily to FIG. 32B, shaft collar 330 can be, for example, but not limited to, a multi-part component. Shaft collar 330 can be used for various geometries of shafts 345 and/or a customized shaft collar can be built to suit specific geometry of shaft 345. A modular construction kit can comprise, but is not limited to, hexagonal shafts 345 for constructing electro-mechanical agent 23 (FIG. 1). In some configurations, shaft collar 330 can comprise first part 340 and second part 337. First part 340 can comprise head region 333 and body 336. Second part 337 of shaft collar 330 can comprise locking fixture 337, configured to engage body 336 of first part 337 of shaft collar 330, thereby collectively forming shaft collar 330.

Figure 32C:
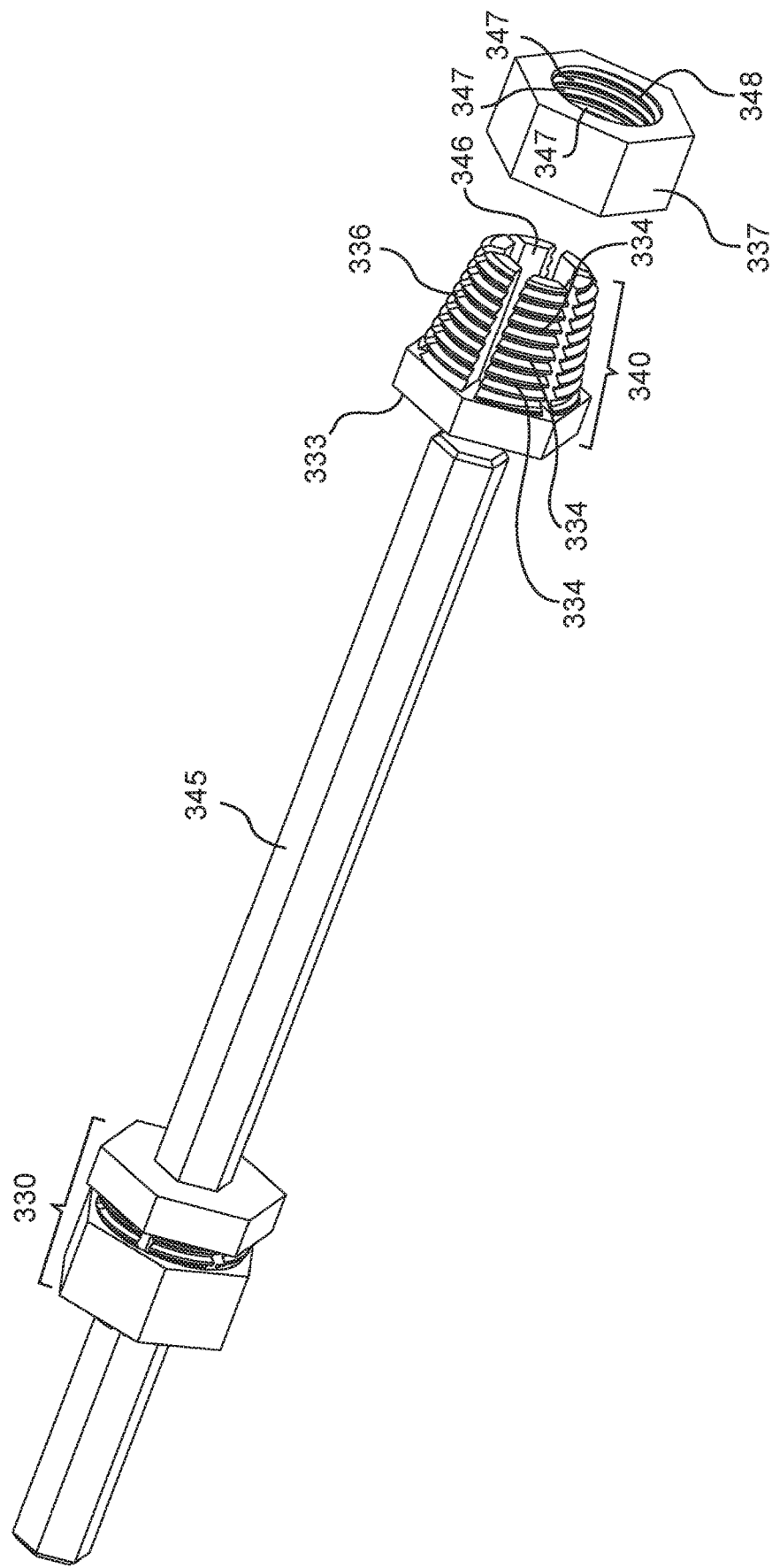
FIG. 32C is a perspective view of a plurality of the shaft collar of the present teachings, an unassembled view of a first of the shaft collars, focusing on engagement of the two-piece shaft collar and an assembled view of a second of the shaft collars, engaged with the shaft of the present teachings.

Referring now to FIG. 32C, the engagement of multi-part shaft collar 330 with exemplary shaft 345 is depicted. Exemplary shaft 345 can be, for example, but not limited to, a hexagonal shaft comprising six surfaces and six vertices configured to participate in its engagement with shaft collar 330. Exemplary shaft 345 can be received into shaft channel 346 provided in first part 340 of shaft collar 330. Shaft channel 346 can initiate from head region 333 and extend along body 336 of first part 340. Exemplary shaft 345 can enter shaft channel 346 from head region 333 and travel through body 336 until a portion of shaft 345 exits from the terminal end of shaft channel 346 of shaft collar 330. A portion of exemplary shaft 345 can be trapped by first part 340 of shaft collar 330.

Figure 32D:
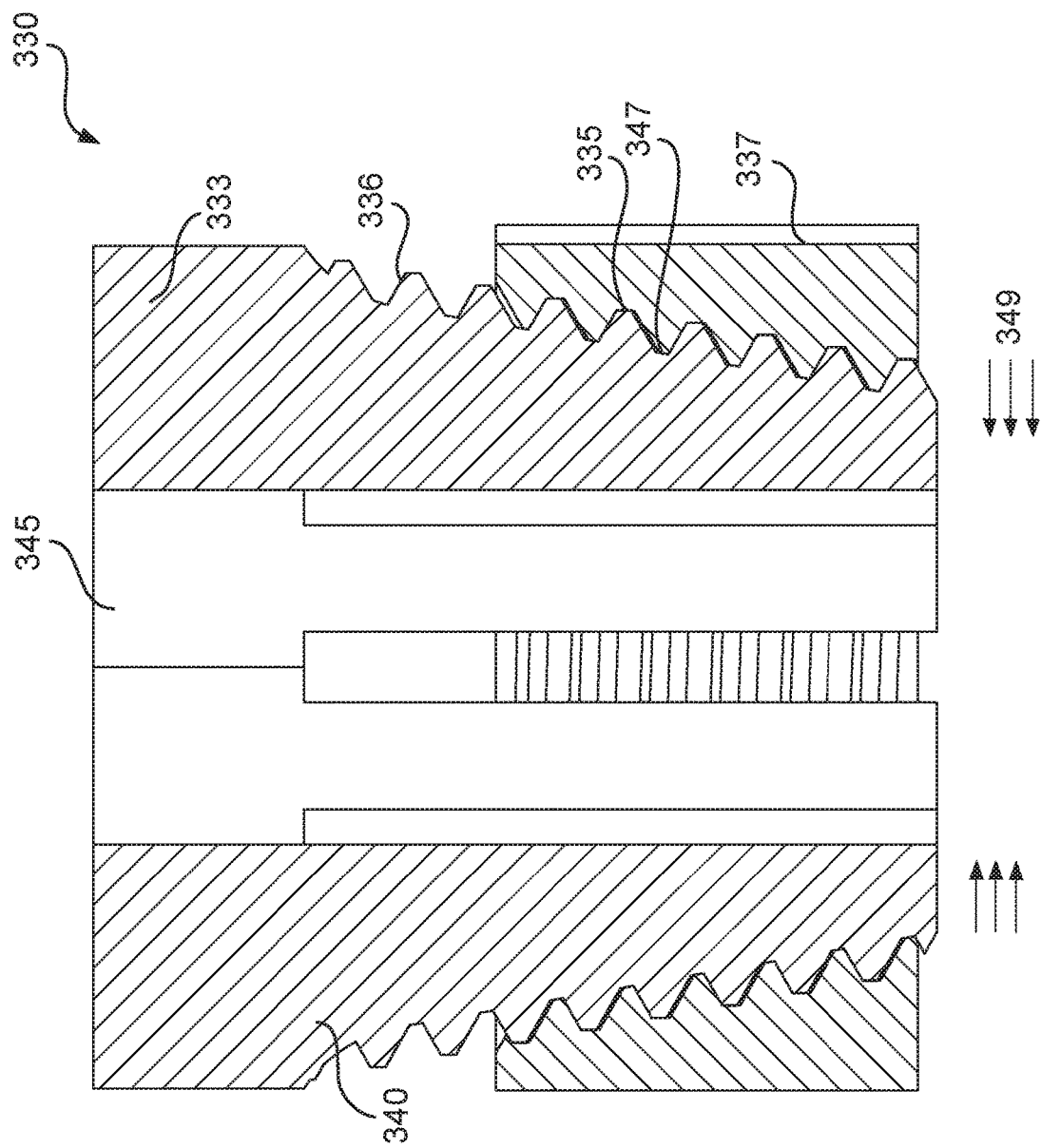
FIG. 32D is a first cross-section view of the shaft collar shown in FIG. 32A.

Continuing to refer primarily to FIG. 32C, body 336 of first part 340 of shaft collar 330 can provide a plurality of cantilever crenellations 334 protruding from head region 333 (FIG. 32C/D) and extending along body 336 (FIG. 32C/D) of first part 340. Each of cantilever crenellations 334 can be further configured to rest on a corresponding surface of hexagonal shaft 345 (FIG. 32C/D) as the shaft travels along shaft channel 346 and enters body 336 of first part 340. First cantilever crenellation 334 can be disposed at a known gap from adjacent cantilever crenellations 334. The known gap can enable cantilever crenellations 334 to have adequate space when an inward force in direction 349 (FIG. 32D) is applied on at least one of cantilever crenellations 334. This configuration can allow cantilever crenellations 334 to compactly grip exemplary shaft 345, disposed in shaft channel 346. Locking fixture 337 can participate in trapping the shaft by providing a complementing shaft channel configured to receive body region 336 with exemplary shaft 345 trapped therein. Locking fixture 337 can comprise an outer surface and inner threaded surface 348. Inner threaded surface 348 can provide a plurality of threads 347 (FIG. 32C/D) configured to engage the crenellations on cantilever crenellations 334 as locking fixture 337 progressively grips body 336 of first part 340 of shaft collar 330. Engagement of first part 340 and second part 337 of shaft collar 330 can cause crenellation 334 to be entrapped by rings 347, thereby ensuring a compact grip of exemplary shaft 345.

Figure 33A:
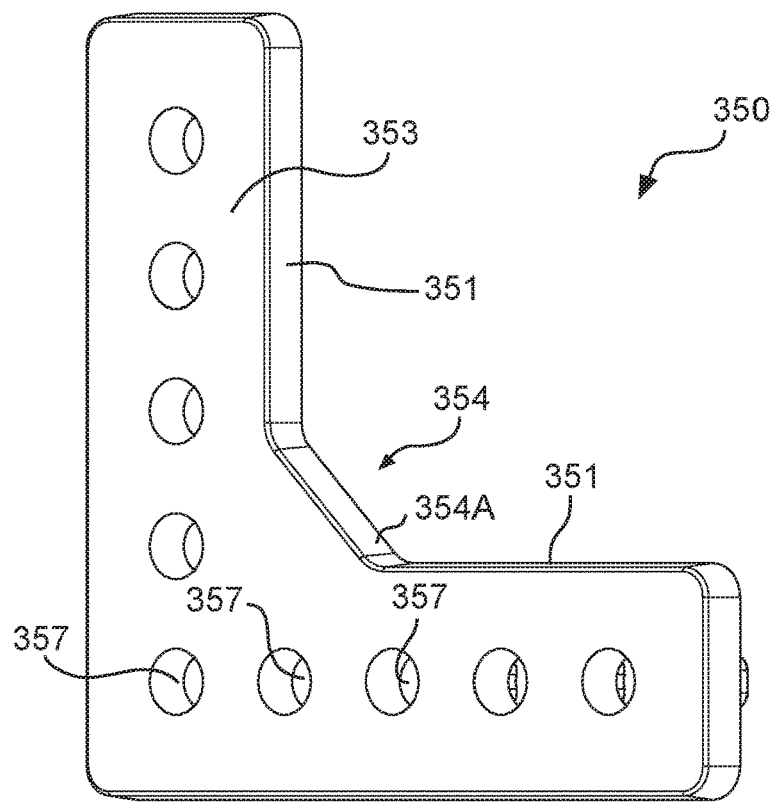
FIGS. 33A-33B are perspective views of the 90° connector of the present teachings including attachment grooves.
Figure 33B:
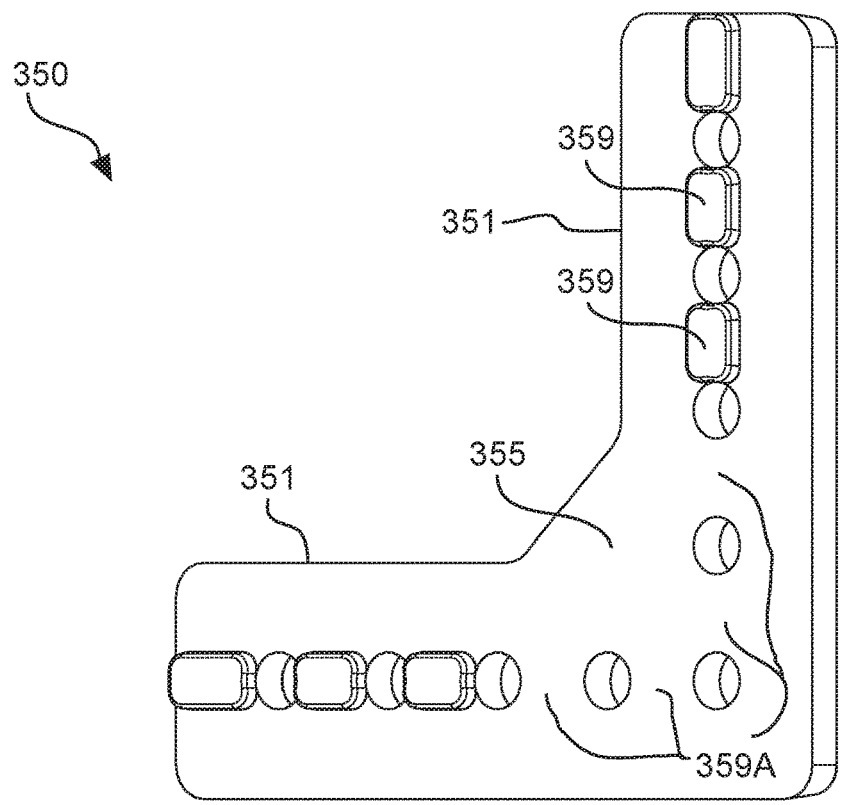

Referring now to FIG. 33A and FIG. 33B, connector 350 can include connecting grooves 357 (FIG. 33A) and can be configured to connect at least one elementary unit 85 (FIG. 3) having access to one or more supplementary modules and/or one or more extension modules with another elementary unit 85 (FIG. 3) having access to one or more supplementary modules and/or one or more extension modules. Connector 350, exemplarily referred to as connector 90A (FIG. 3), can serve as an intermediary in the engagement of at least two modules of electro-mechanical agent first exemplary configuration 75 (FIG. 3). Connector 350 can comprise a plurality of connecting arms 351 configured to engage with one or more connecting modules. Connection angle 354 (FIG. 33A) can be defined between the plurality of connecting arms 351 of connector 350. The at least two modules can be fastened to the plurality of connecting arms 351 by way of connecting grooves 357 (FIG. 33A). The number of connecting arms 351 and degree of connection angle 354 (FIG. 33A) can be governed by, for example, but not limited to, the number of modules that can be connected by connector 350, a distance at which connecting modules 350 can be connected and/or the like. Support gusset 354A can stabilize connection angle 354. In some configurations, connector 350 can include at least two connecting arms 351, disposed at an angle being at least 90°, or less than 90° for acute angle connectors. Connector 350 can further comprise first face 353 (FIG. 33A) and second face 355 (FIG. 33B). During engagement of connecting modules, first face 353 (FIG. 33A) can be configured to receive one or more locking means to capture complementing fasteners that engage the component through engagement grooves 357 (FIG. 33A). Second face 355 (FIG. 33B) can rest on one or more connecting modules. A plurality of alignment nubs 359 (FIG. 33B) can be provided on second face 355 (FIG. 33B).

Nubs 359 (FIG. 33B) can be received in corresponding alignment grooves (not shown) that can be provided on connecting modules. Alignment nubs 359 (FIG. 33B) can enable a substantially fail-proof engagement between the connecting modules. Spaces 359A can enable a snug fit with elementary unit 85 (FIG. 3).

Figure 34A:
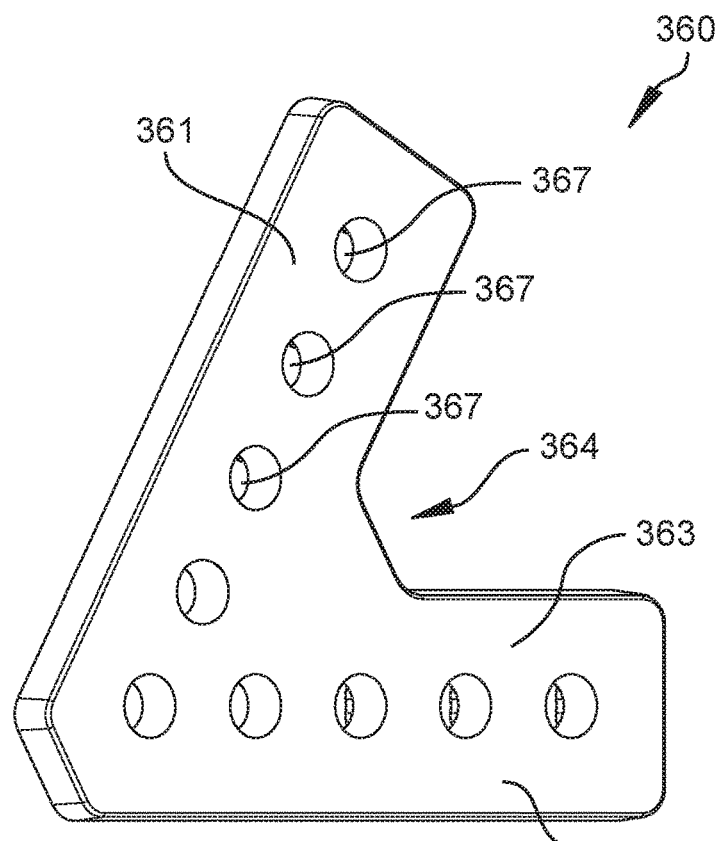
FIGS. 34A-34B are perspective views of the 60° connector of the present teachings including attachment grooves.
Figure 34B:
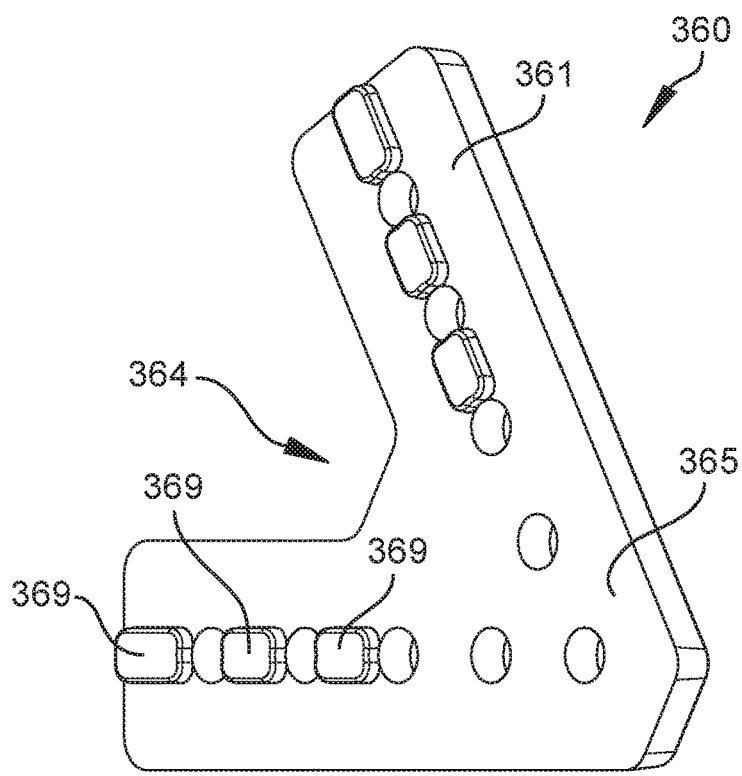

Referring now to FIG. 34A and FIG. 34B, connector 360 with connecting grooves 367 (FIG. 34A) can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connector 360, shown exemplarily as connector 90C (FIG. 3), can serve as an intermediary in the engagement of at least two modules of electro-mechanical agent first exemplary configuration 75 (FIG. 3). Connector 360 can comprise a plurality of connecting arms 361 configured to engage with one or more connecting modules. Connection angle 364 can be defined between the plurality of connecting arms 361 of connector 360. The at least two modules can be fastened to the plurality of connecting arms 361 by way of connecting grooves 367 (FIG. 34A). The number of connecting arms 361 and degree of connection angle 364 can be governed by, for example, but not limited to, the number of modules that are connected by connector 360, a distance at which the connecting modules can be connected and/or the like. In some configurations, connector 360 can include at least two connecting arms 361, disposed at an angle being at least 60 degrees. Connector 360 can further comprise first face 363 (FIG. 34A) and second face 365 (FIG. 34B). During engagement of the connecting modules, first face 363 (FIG. 34A) can be configured to receive one or more locking means to capture complementing fasteners that engage the component through connecting grooves 367 (FIG. 34A). Second face 365 (FIG. 34B) can rest on the one or more connecting modules. A plurality of alignment nubs 369 (FIG. 34B) can be provided on second face 365 (FIG. 34A). Nubs 369 (FIG. 34B) can be received in corresponding alignment grooves (not shown) that can be provided on the connecting modules. As a result, alignment nubs 369 (FIG. 34B) can enable a substantially fail-proof engagement between the connecting modules.

Figure 35A:
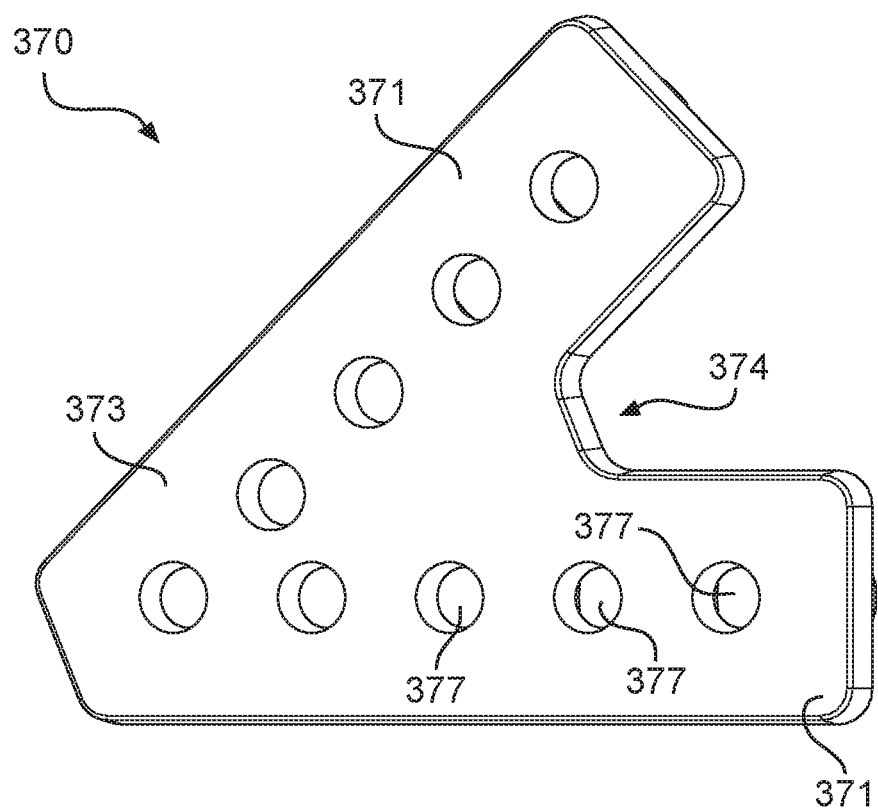
FIGS. 35A-35B are perspective views of the 30° connector of the present teachings including attachment grooves.
Figure 35B:
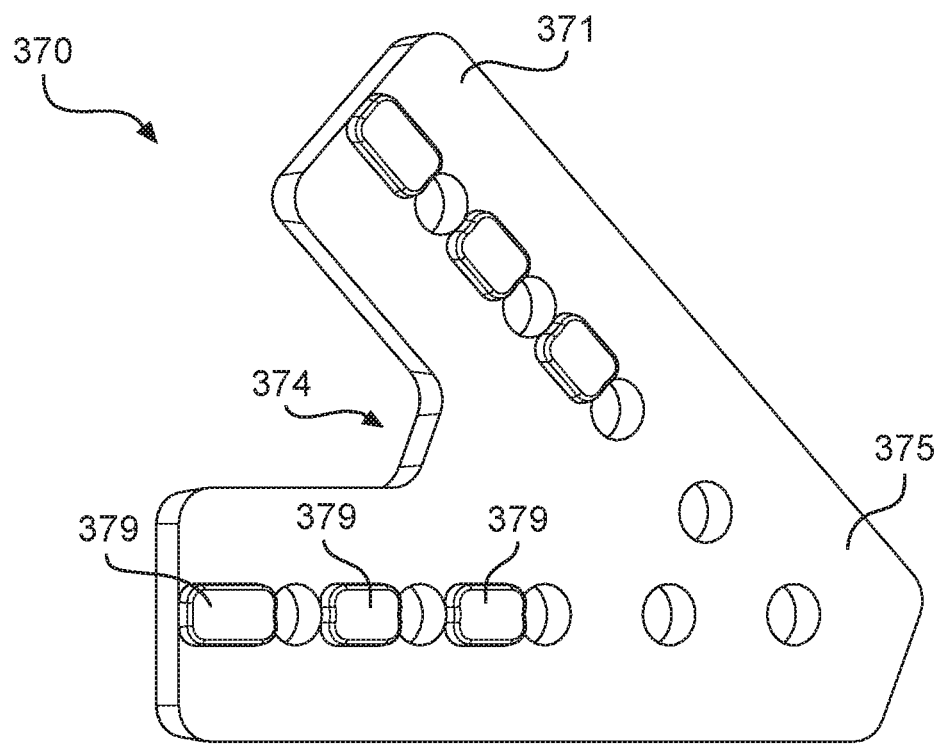

Now referring to FIG. 35A and FIG. 35B, connector 370 with connecting grooves 377 (FIG. 35A) and configured to connect at least one elementary unit 85 (FIG. 3) and/or one or more supplementary modules and/or one or more extension modules, with another elementary unit 85 (FIG. 3) and/or one or more supplementary modules and/or one or more extension modules. As a result, connector 370, exemplarily referred to as connector 90C (FIG. 3), can also serve as an intermediary in the engagement of at least two modules of electro-mechanical agent first exemplary configuration 75 (FIG. 3). Connector 370 can further comprise a plurality of connecting arms 371 configured to engage with one or more connecting modules. Connection angle 374 can be defined between the plurality of connecting arms 371 of connector 370. The at least two modules can be fastened to the plurality of connecting arms 371 by way of connecting grooves 377 (FIG. 35A). The number of connecting arms 371 and degree of connection angle 374 can be governed by, for example, but not limited to, the number of modules that are connected by connector 370, a distance at which the connecting modules can be connected and/or the like. In some configurations, connector 370 can include at least two connecting arms 371, disposed at an angle being at least 30 degrees. Connector 370 can further comprise first face 373 (FIG. 35A) and second face 375 (FIG. 35AB). During engagement of the connecting modules, first face 373 (FIG. 35A) can be configured to receive one or more locking means to capture complementing fasteners that engage the component through connecting grooves 377 (FIG. 35A). Second face 375 (FIG. 35B) can rest on the one or more connecting modules. A plurality of alignment nubs 379 (FIG. 35B) can be provided on second face 375 (FIG. 35B). Nubs 379 (FIG. 35B) can be received in corresponding alignment grooves (not shown) that can be provided on the connecting modules. As a result, alignment nubs 379 (FIG. 35B) can enable a substantially fail-proof engagement between the connecting modules.

Figure 36A:
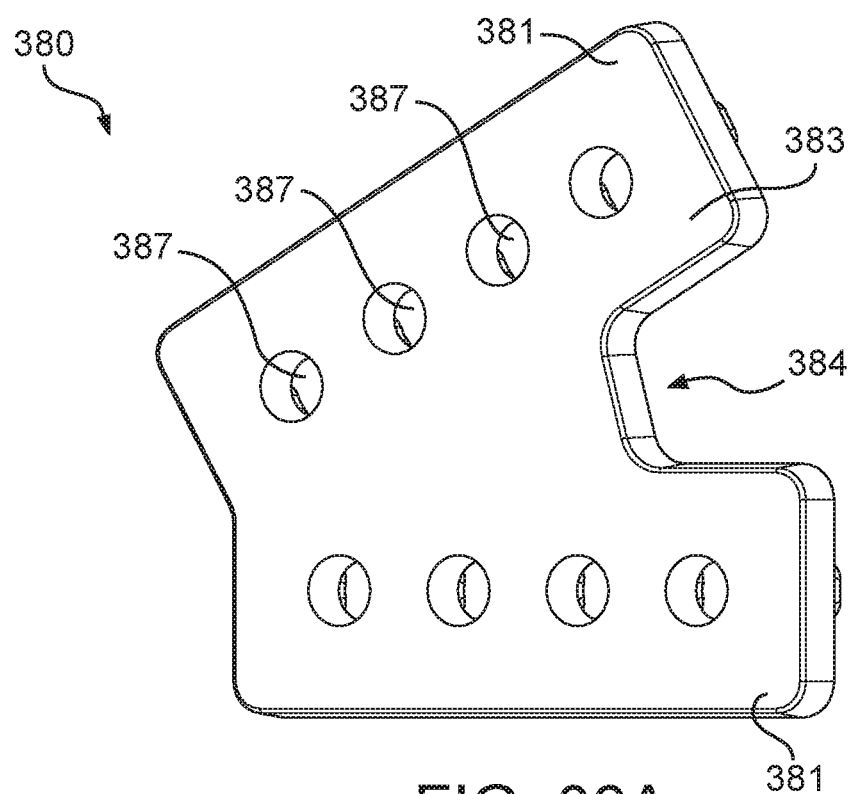
FIGS. 36A-36B are perspective views of the 45° connector of the present teachings including attachment grooves.
Figure 36B:
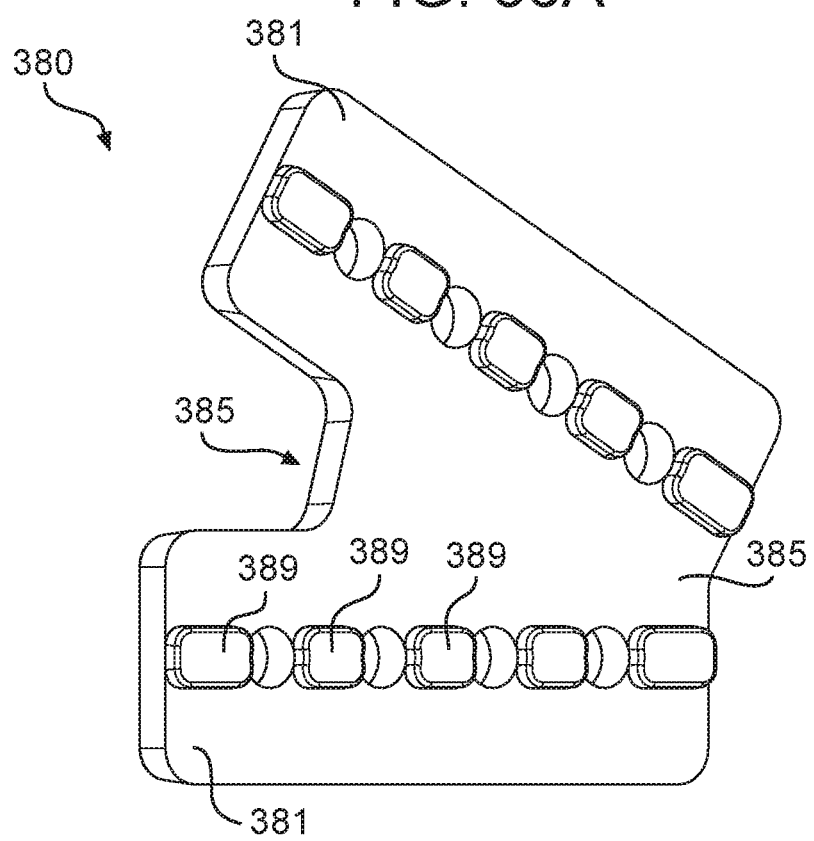

Now referring to FIG. 36A and FIG. 36B, connector 380 with connecting grooves 387 (FIG. 36A) can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connector 380 can also serve as an intermediary in the engagement of at least two modules of electro-mechanical agent first exemplary configuration 75 (FIG. 3). Connector 380 can comprise a plurality of connecting arms 381 configured to engage with one or more connecting modules. Connection angle 384 can be defined between the plurality of connecting arms 381 of connector 380. The at least two modules can be fastened to the plurality of connecting arms 381 by way of connecting grooves 387 (FIG. 36A). The number of connecting arms 381 and degree of connection angle 384 can be governed by, for example, but not limited to, the number of modules that are connected by connector 380, a distance at which the connecting modules are required to be connected and/or the like. In some configurations, connector 370 comprises at least two connecting arms 381, disposed at an angle being at least 45 degrees. Connector 380 can further comprise first face 383 (FIG. 36A) and second face 385 (FIG. 36B). During engagement of the connecting modules, first face 383 (FIG. 36A) can be configured to receive one or more locking means to capture complementing fasteners that engage the component through connecting grooves 387 (FIG. 36A). Second face 385 (FIG. 36B) can rest on the one or more connecting modules. A plurality of alignment nubs 389 (FIG. 36B) can be provided on second face 385 (FIG. 36B). Nubs 389 (FIG. 36B) can be received in corresponding alignment grooves (not shown) that can be provided on the connecting modules. As a result, alignment nubs 389 (FIG. 36B) can enable a substantially fail-proof engagement between the connecting modules.

Figure 37A:
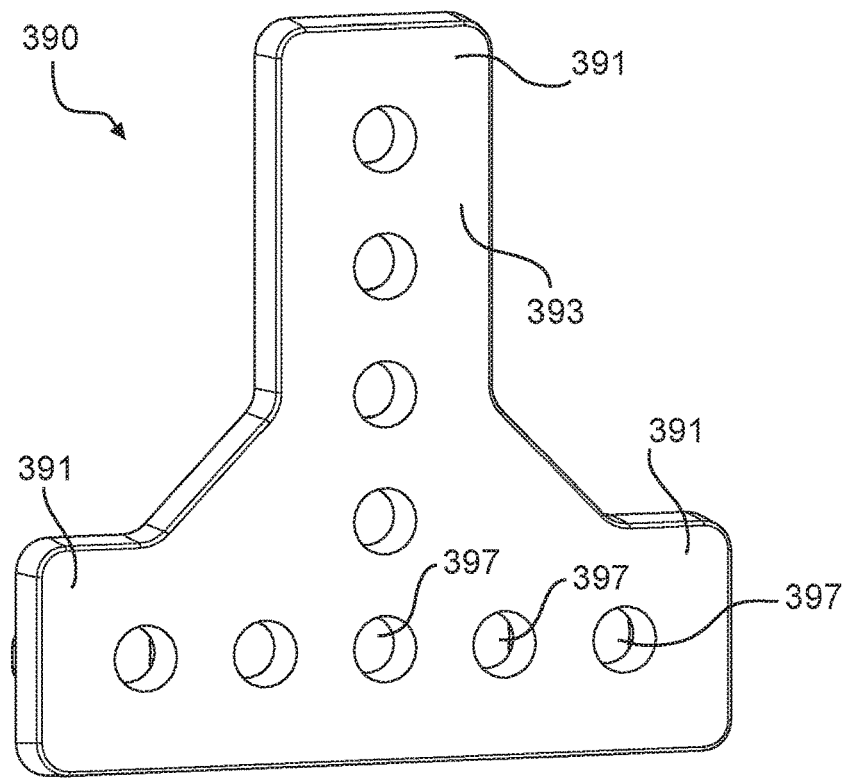
FIGS. 37A-37B are perspective views of the T-shaped connector of the present teachings including attachment grooves.
Figure 37B:
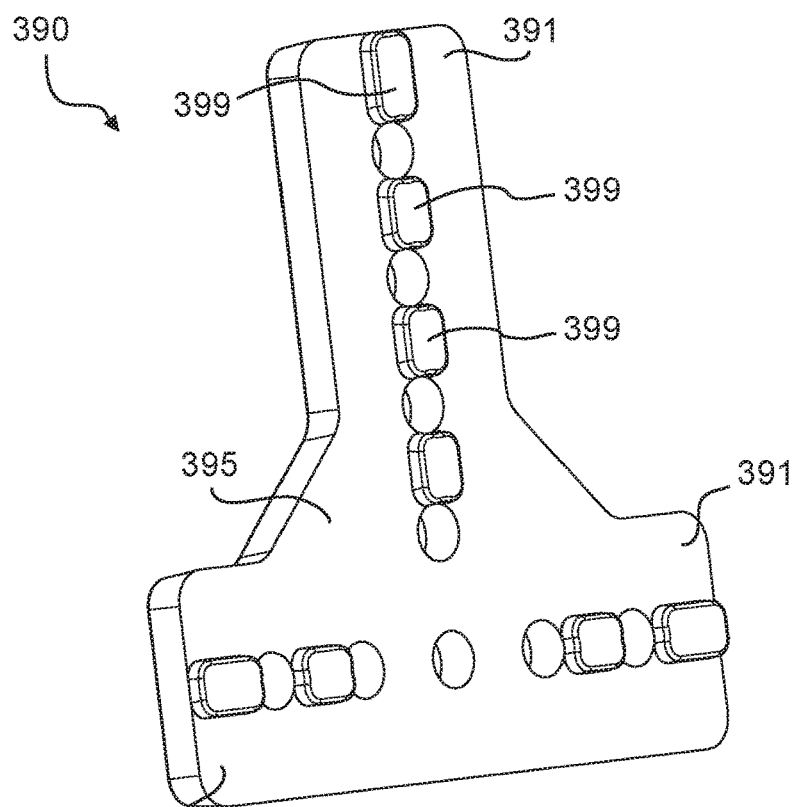

Now referring to FIG. 37A and FIG. 37B, connector 390 with connecting grooves 397 (FIG. 37A) can be configured to connect at least one elementary unit 85 (FIG. 3) and/or one or more supplementary modules and/or one or more extension modules, with another elementary unit 85 and/or one or more supplementary modules and/or one or more extension modules. As a result, connector 390 can also serve as an intermediary in the engagement of at least two modules of electro-mechanical agent first exemplary configuration 75 (FIG. 3). Connector 390 can further comprise a plurality of connecting arms 391 configured to engage with one or more connecting modules. In some configurations 390, connecting arms 391 can be configured to form a substantially T-shaped configuration. At least one connecting module can be received on each of connecting arms 391 that form the T-configuration. In some configurations, connector 390 comprises at least three connecting arms 391 configured to receive the connecting modules. Connector 390 can further comprise first face 393 (FIG. 37A) and second face 395 (FIG. 37B). During engagement, of the connecting modules, first face 393 (FIG. 37A) can be configured to receive one or more locking means to capture complementing fasteners that engage the component through connecting grooves 397 (FIG. 37A). Second face 395 (FIG. 37B) can rest on the one or more connecting modules. A plurality of alignment nubs 399 (FIG. 37B) can be provided on second face 395 (FIG. 37B). Nubs 399 (FIG. 37B) can be received in corresponding alignment grooves (not shown) that can be provided on the connecting modules. As a result, alignment nubs 399 (FIG. 37B) can enable a substantially fail-proof engagement between the connecting modules.

Figure 38B:
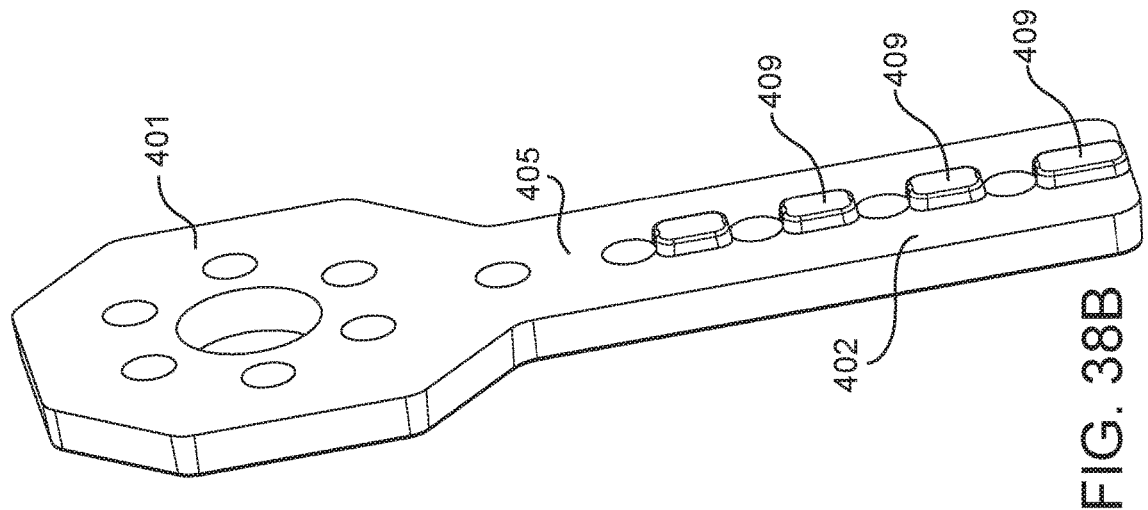
FIGS. 38A-38B are perspective views of the rod-end connector of the present teachings including attachment grooves.
Figure 38A:
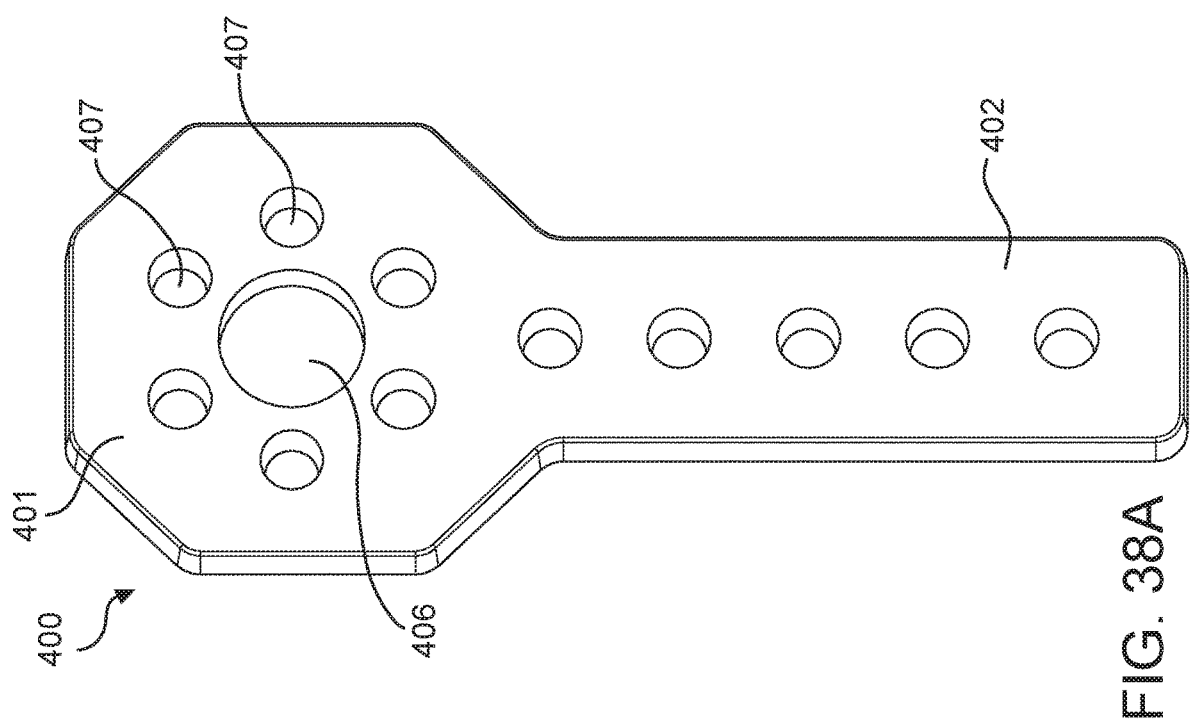

Now referring to FIG. 38A and FIG. 38B, connector 400 with connecting grooves 407 (FIG. 38A) can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connector 400, referred to exemplarily as connector 90E (FIG. 4), can also serve as an intermediary in the engagement of at least two modules of electro-mechanical agent first exemplary configuration 75 (FIG. 3). Connector 400 can further comprise apex portion 401 and at least one arm 402, extending from apex portion 401 and configured to participate in engaging the connecting modules. Apex portion 401 can comprise a plurality connecting grooves 407 of diverse dimensions. Connecting grooves 407 (FIG. 38A) can be configured to receive at least, but not limited to, one or more shafts, a fastener substantially engaged with the connecting module, and/or any segment of the connecting module configured to engage with connector 400. Arm(s) 402 can comprise a plurality of similar and/or dissimilar connecting grooves 407 (FIG. 38A). Connector 400 can further comprise first face 403 (FIG. 38A) and second face 405 (FIG. 38B). In some configurations, first face 403 (FIG. 38A) can face away from the connecting modules while second face 405 (FIG. 38B) can rest on the one or more connecting modules. A plurality of alignment nubs 409 (FIG. 38B) can be provided on second face 405 (FIG. 38B) of connector 400. Nubs 409 (FIG. 38B) can be received in corresponding alignment grooves (not shown) that can be provided on the connecting modules. Alignment nubs 409 (FIG. 38B) can enable a substantially fail-proof engagement between the connecting modules.

Figure 39A:
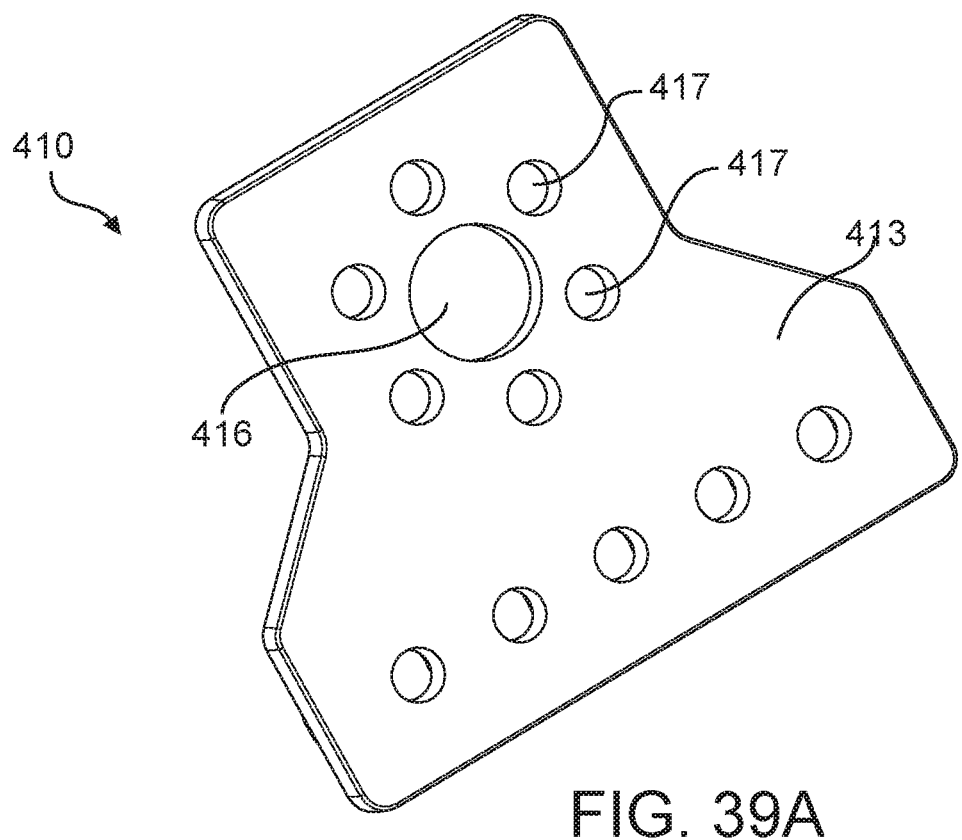
FIGS. 39A-39B are perspective views of the broad-base connectors of the present teachings including attachment grooves.
Figure 39B:
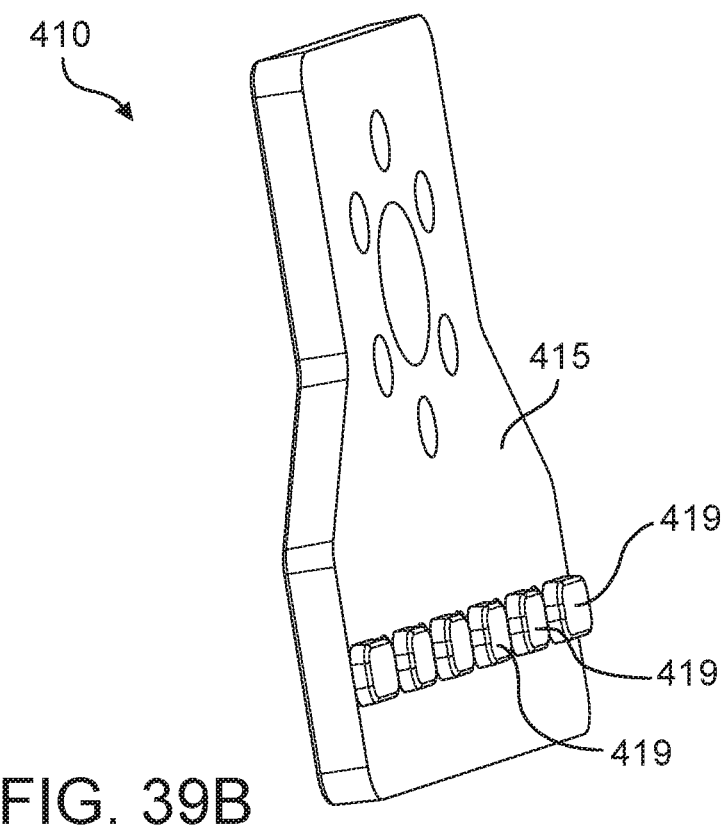

Now referring to FIG. 39A and FIG. 39B, connector 410 with connecting grooves 417 (FIG. 39B) can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connector 410, referred to exemplarily as connector 90F (FIG. 4), can serve as an intermediary in the engagement of at least two modules of electro-mechanical agent first exemplary configuration 75 (FIG. 3). Connector 410 can further comprise an apex portion and a base, extending from the apex portion and configured to participate in engaging the connecting modules. The apex portion can comprise a plurality connecting grooves 417 (FIG. 39A) of diverse dimensions. Connecting grooves 417 (FIG. 39A) can be configured to receive at least, but not limited to, one or more shafts, a fastener substantially engaged with the connecting module and/or any segment of the connecting module configured to engage with connector 410. The base portion can comprise a plurality of similar and/or dissimilar connecting grooves 417 (FIG. 39A). Connector 410 can further comprise first face 413 (FIG. 39A) and second face 415 (FIG. 39B). In some configurations, first face 413 (FIG. 39A) can face away from the connecting modules while second face 415 (FIG. 39B) can rest on the one or more connecting modules. A plurality of alignment nubs 419 (FIG. 39B) can be provided on second face 415 (FIG. 39B) of connector 410. Nubs 419 (FIG. 39B) can be received in corresponding alignment grooves (not shown) that can be provided on the connecting modules. As a result, alignment nubs 419 (FIG. 39B) can enable a substantially fail-proof engagement between the connecting modules.

Figure 40A:
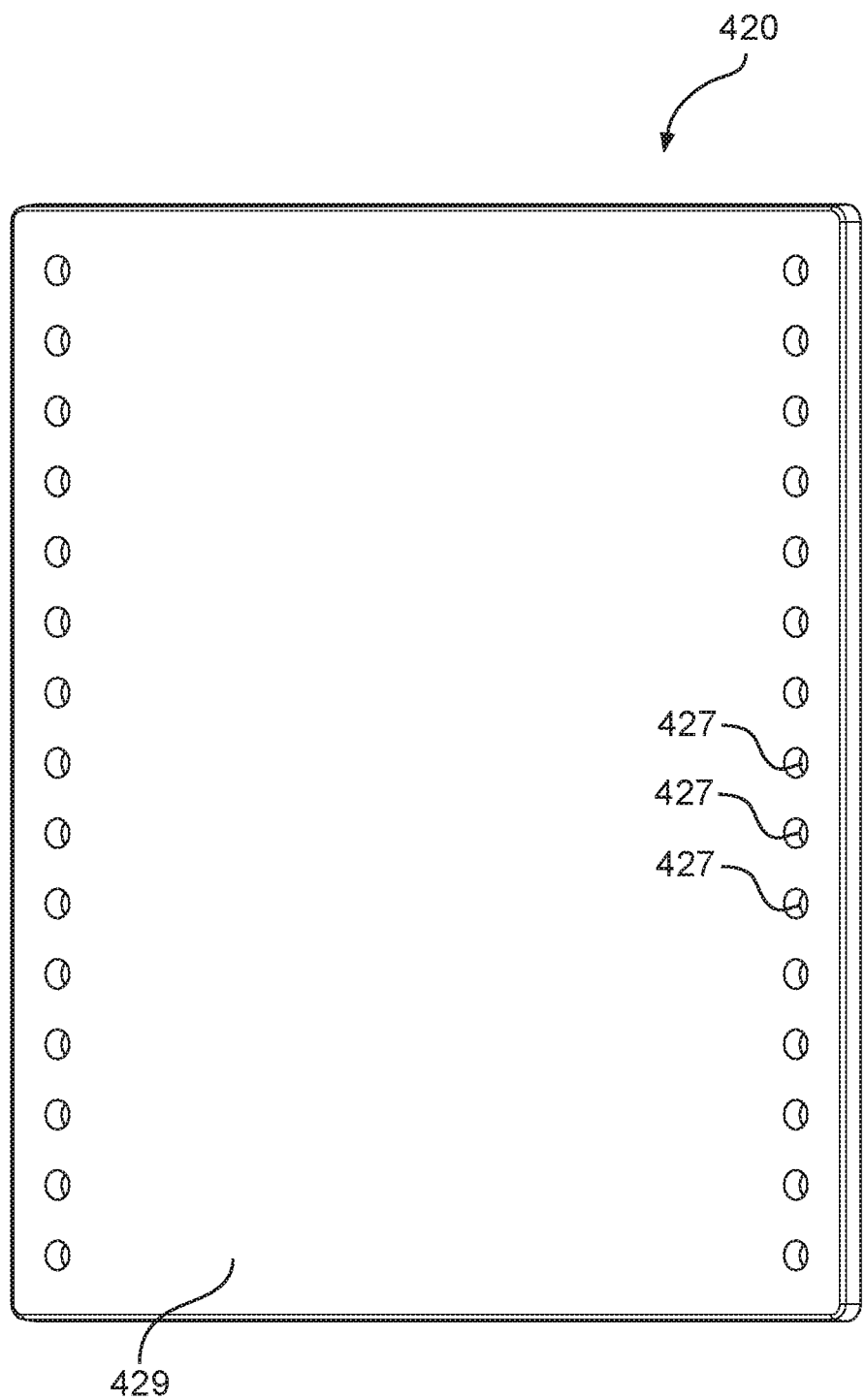
FIGS. 40A-40B are perspective views of the flat plate connector of the present teachings, including a logo-space on a front face of the flat plate connector.
Figure 40B:
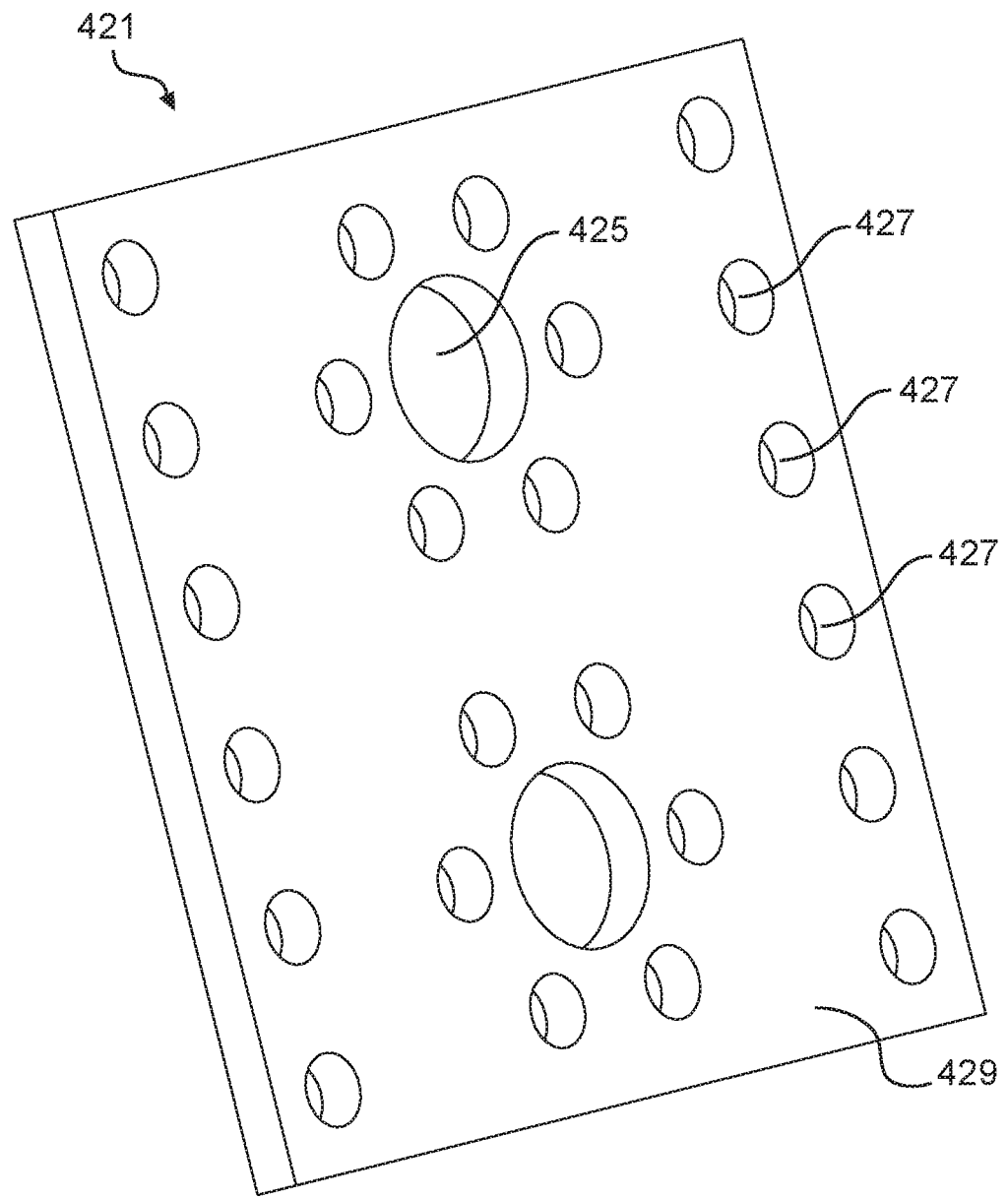

Now referring to FIG. 40A and FIG. 40B, connector 420 (FIG. 40A) can include first connecting groove pattern 427 (FIG. 40A) and connector 421 (FIG. 40B) can include second connecting groove pattern 425 (FIG. 40B). Connectors 420 (FIG. 40A) and 421 (FIG. 40B) can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connectors 420 (FIG. 40A) and 421 (FIG. 40B), referred to exemplarily as connector 90H (FIG. 3), can serve as an intermediary in the engagement of at least two modules of electro-mechanical agent 75 (FIG. 3). First connecting groove pattern 427 (FIG. 40A) and second connecting groove pattern 425 (FIG. 40B) can comprise a plurality of connecting grooves. The connecting grooves can be of diverse dimensions. The connecting grooves can be configured to receive at least, but not limited to, one or more shafts, a fastener substantially engaged with the connecting module, and/or any segment of the connecting module configured to engage with connector 420 (FIG. 40A) and/or connector 421 (FIG. 40B). Connectors 420 (FIG. 40A) and 421 (FIG. 40B) can further comprise first face 429 and a second face. In some configurations, first face 429 can face away from the connecting modules while the second face can rest on the one or more connecting modules. Connectors 420 (FIG. 40A) and 421 (FIG. 40B) can comprise alignment nubs. In some configurations, connectors 420 (FIG. 40A) and connector 421 (FIG. 40B) can provide an identification space or a title space that can comprise an identifying name and/or logo or any other identification attribute of electro-mechanical agent first exemplary configuration 75 (FIG. 3).

Figure 40C:
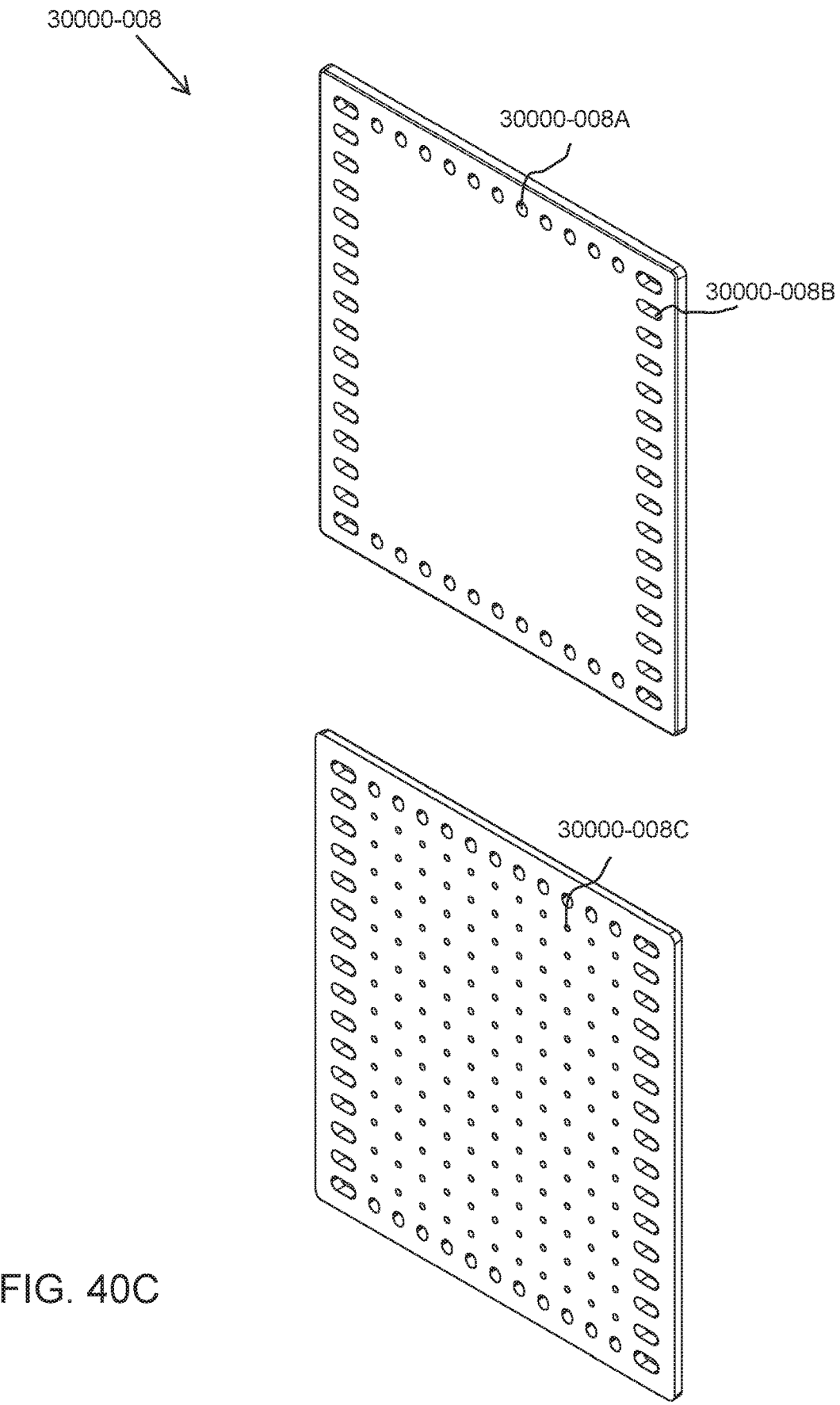
FIG. 40C is a perspective view of the arm brace bracket of the present teachings.
Figures 3, 40C:
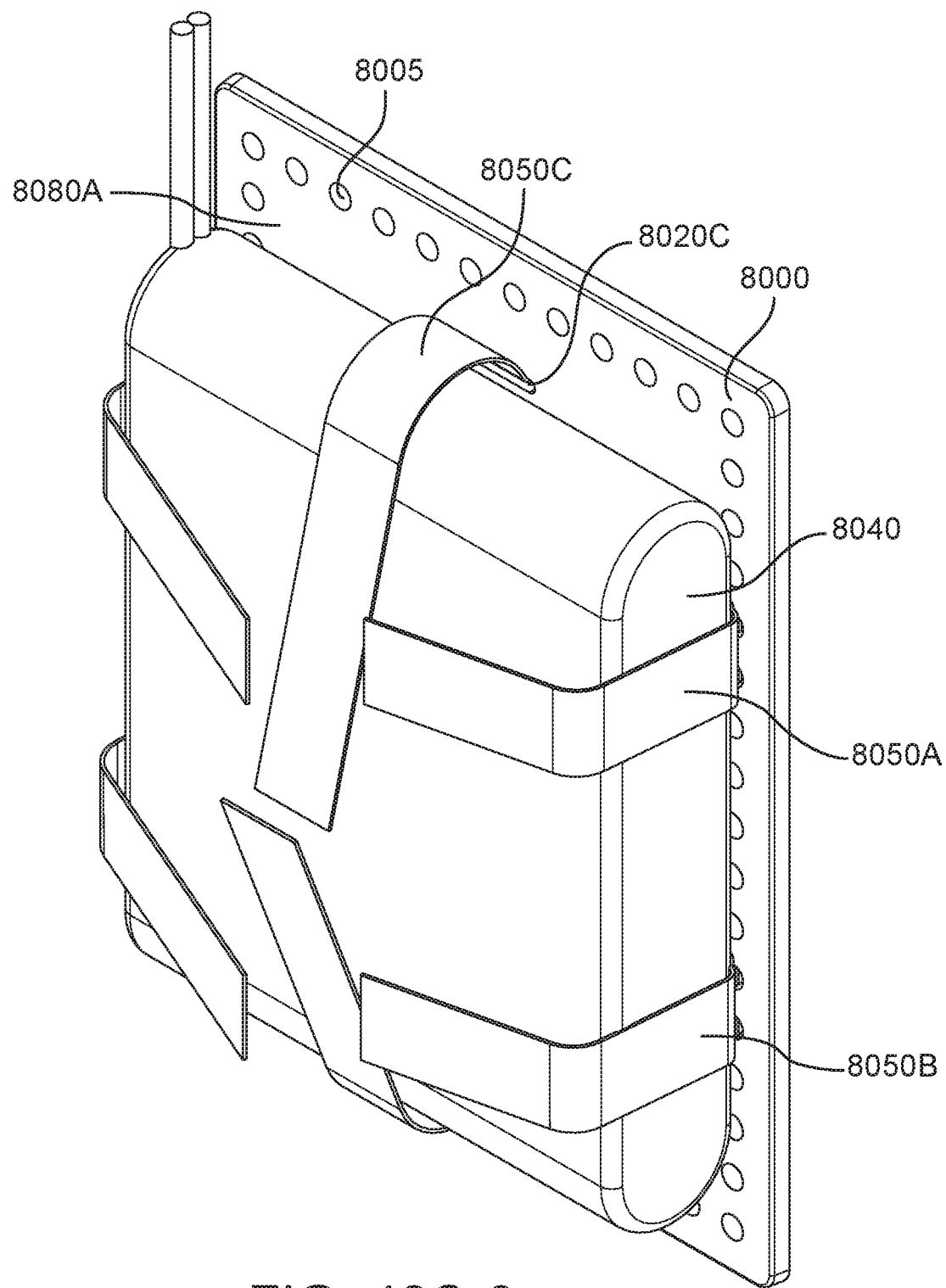
Figures 4, 40C:
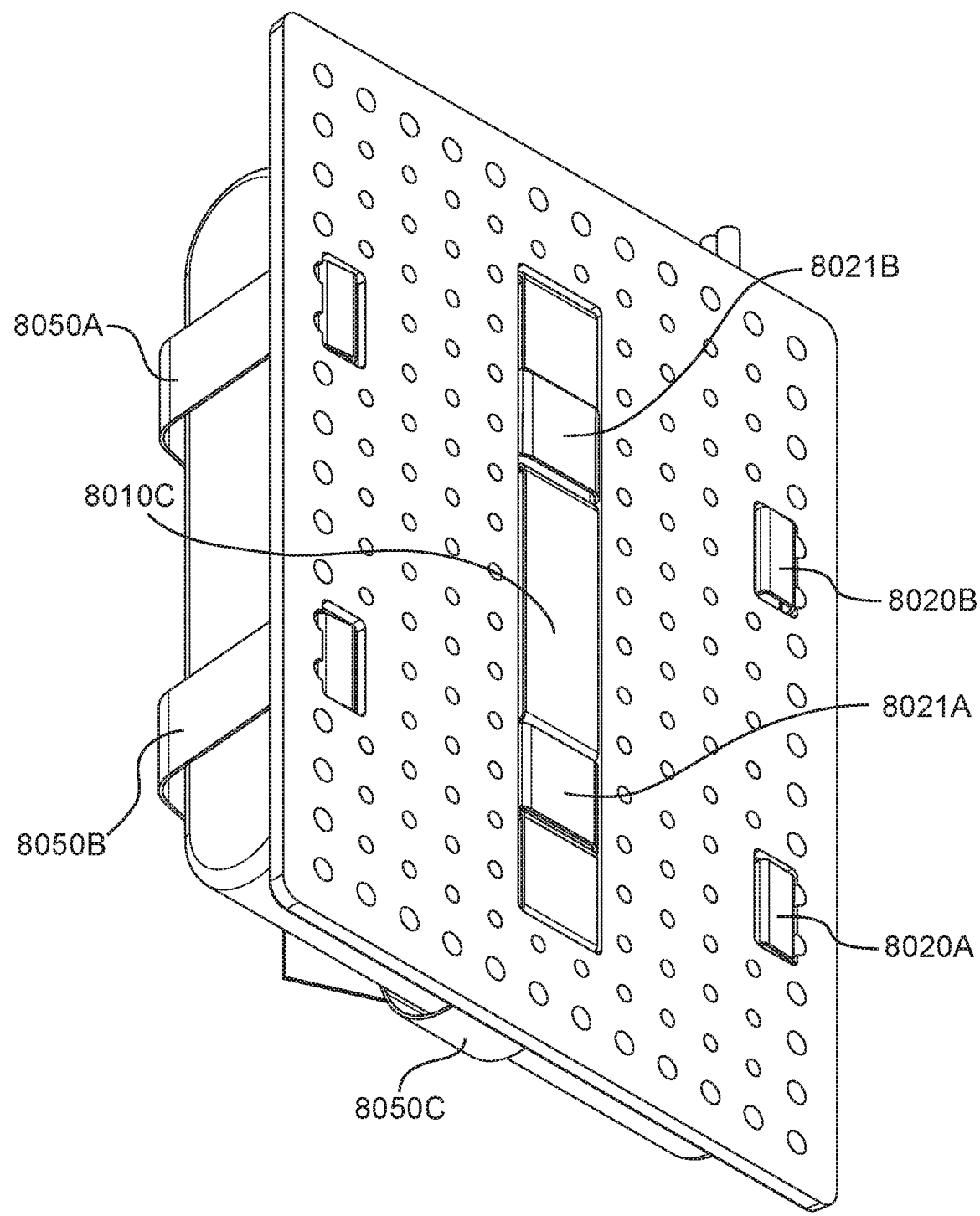
Figures 5, 40C:
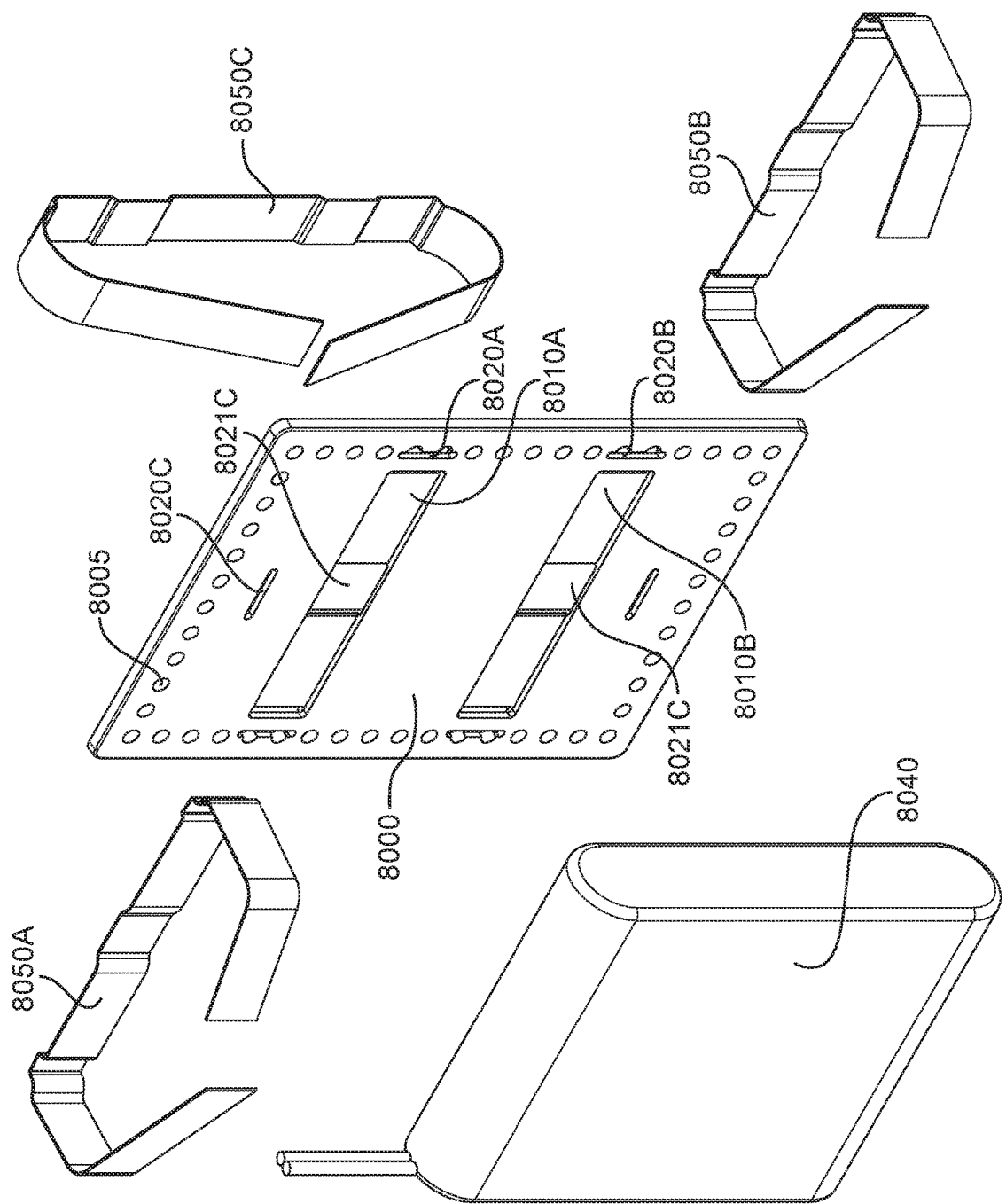

Referring now to FIG. 40C, arm brace bracket 30000-008 can include, but is not limited to including, adjustable extrusion connecting cavities 30000-008A that can enable flexible placement of extrusions 4B-1B (FIG. 4B-1) and 4B-1C (FIG. 4B-1). Arm brace bracket 30000-008 can include end connecting cavities 30000-008B that allow fixed placement of extrusions 4B-1B (FIG. 4B-1) and 4B-1C (FIG. 4B-1) with respect to each other. Arm brace bracket 30000-008 can include dimples 30000-008C that can enable flexible placement of connectors while maintaining bracket strength and stability. Dimples 30000-008C can enable drill placements.

Referring now to FIG. 40C-1 and FIG. 40C-2, exemplary connector embodiment 8000 can comprise a first surface 8080A and a second surface 8080B. A plurality of apertures can be provided on first and second surfaces 8080A, 8080B, such that a single aperture can be disposed through and through between the two surfaces. In some configurations, apertures can be drilled out of pre-set recess or drillable holes provided in place of through and through apertures. Connector 8000 can include a first set of apertures 8005 that can be distributed along the periphery of the connector 8000. A second set of apertures can be obtained through a plurality of drillable holes 8007 that can be distributed over surfaces 8080A and/or 8080B. Connector 8000 can be configured to connect at least one elementary unit 85 (FIG. 3) and/or one or more supplementary modules and/or one or more extension modules, with another elementary unit 85 (FIG. 3) and/or one or more supplementary modules and/or one or more extension modules. Connector 8000 can be engaged in a similar fashion as connector 90H (FIG. 3).

Continuing to refer to FIG. 40C-1 and FIG. 40C-2, in some configurations, besides the primary function of engaging two or more elementary units 85 and/or electrical or mechanical modules, connector 8000 can be further configured to serve as a base or platform for positioning at least one module over one of its surfaces 8080A and 8080B. Surfaces 8080A and 8080B can comprise one or more features to serve the purpose of acting as a base or platform for the add-on module and locking the module there with to avoid displacement of the module during operation of the electro-mechanical agent 75 (FIG. 3). One of many features for achieving this can include providing at least one indented strip support to accept one or more hook and loop fasteners (not shown) on first surface 8080A and second surface 8080B of the connector 8000. FIG. 40C-1 and 40C-2 depict indented strip supports 8010A, 8010B on surface 8080A and 8010C on indented strip support 8010C on surface 8080B. Each indented strip support 8010A, 8010B and 8010C can further comprise a complementing set of support slots 8020A, 8020B and 8020C to entangle relevant hook and loop fasteners with the desirable surface 8080A or 8080B.

Referring now to FIG. 40C-3 and FIG. 40C-4, an example assembly can include connector 8000 as a base or platform for engaging at least one module with surfaces 8080A and/or 8080B. In some configurations, battery pack 8040 can be engaged with surface 8080A. Battery pack 8040 can be captured by way of hook and loop fasteners 8050A, 8050B and 8050C. In some configurations, the fasteners can be, but are not limited to being, flexible belts configured to conveniently rest with in a pre-determined dimension of indented strips on the surface and foldable to enter slots such that the belt is possessed by the surface due to the indented strip and slot combinations. Indented strip supports 8010A, 8010B, and 8010C can receive at least a portion of corresponding fasteners stretched and rested along its length. A remaining portion of the fasteners or fastening belts 8050A, 8050B and 8050C can be looped through corresponding set of support slots 8020A, 8020B and 8020C. Provision of the indented strip supports 8010A, 8010B and 8010C in combination with the support slots 8020A, 8020B, and 8020C can allow an engagement of the fastening features 8050A, 8050B, and 8050C with connector 8000. The fastening features can include, but are not limited to including, flexible belts with adhesives to capture the engaged module. Velcro belts or double sided hook and loop fasteners can be used as fasteners 8050A, 8050B and 8050C. In some configurations, ties and straps can be used manually fasten the module on connector 8000. In some configurations, fastening can include gluing the module onto connector 8000, and screw mounting the module or other mechanical engagement between mating surfaces of the connector and one or more module, that are required to be mounted.

Referring now to FIG. 40C-5, an exploded view of exemplary assembly in FIGS. 40C-3 and 40C-4 can include first indented strip support 8010A and corresponding set of support slots 8020A that can jointly engage at least one hook and loop fastener 8050A. Second indented strip support 8010B with corresponding set of support slots 8020B can jointly engage second hook and loop fastener 8050B, and third indented strip support 8010C with corresponding set of support slots 8020C can engage third hook and loop fastener 8050C. Retention spaces 8021A (FIG. 40C-4) and 8021B (FIG. 40C-4) can be included on indented strip support 8010C. Hook and loop fasteners that can be committed to strip supports 8010A and 8010B and can be looped through corresponding slots 8020A and 8020B can overlap the hook and loop fastener of strip support 8010C. Spaces 8021A (FIG. 40C-4) and 8021B (FIG. 40C-4) on strip support 8010C can support such arrangement by retaining the overlapping portion of hook and loop fasteners of supports 8010A and 8010B. Besides overlapping feature, spaces 8021A (FIG. 40C-4) and 8021B (FIG. 40C-4) can increase frictional retention of the hook and loop fasteners that cross over them. Spaces 8021A (FIG. 40C-4) and 8021B (FIG. 40C-4) can be provided on strip supports 8010A and 8010B, as required. Exemplary spaces 8021C can be included on indented strip supports 8010A and 8010B. Any number of fastening features of a single connector 8000 and module engagement can be included. In some configurations, the fastening features can be similar or can be mechanically distinct from each other.

Figure 41A:
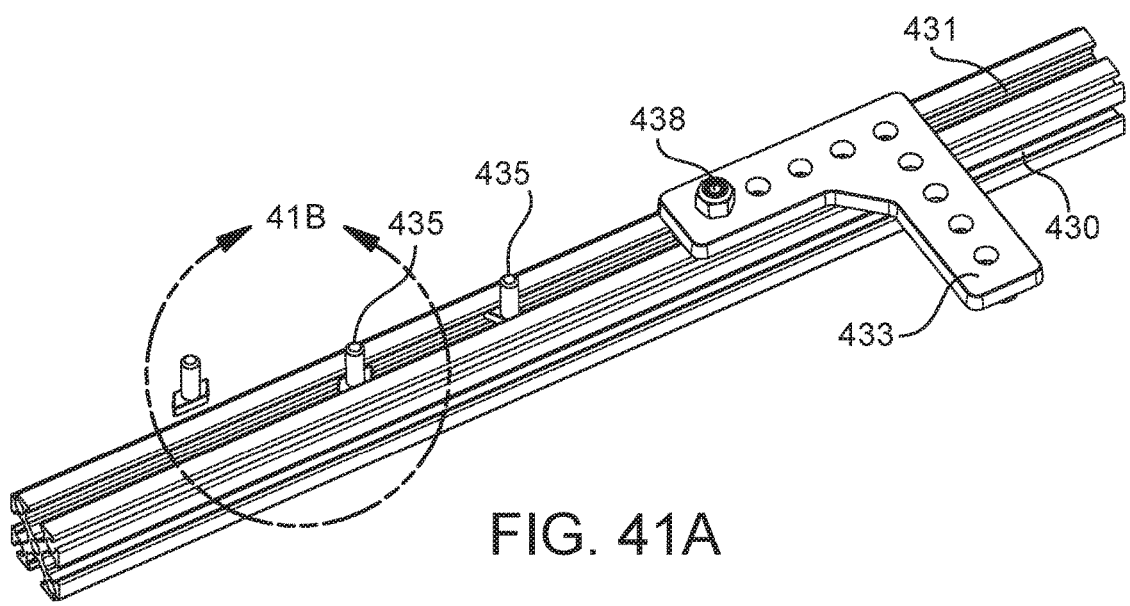
FIG. 41A is a perspective view of a configuration of an engagement between a 90° and an extrudates by way of a t-head fastener of the present teachings.

Referring now primarily to FIG. 41A, bolt 435 can be engaged with elementary unit 430. FIG. 41A depicts an exemplary setting to depict this engagement by attaching connector module 433 with elementary unit 430 by way of bolt 435. Elementary unit 430 can comprise at least one trench 431 that can be configured to receive fasteners such as exemplary bolt 435 and/or segments of one or more modules with which elementary unit 430 can engage. A portion of exemplary bolt 435 can be received in trench 431, whereas a remaining portion of bolt 435 can extend away from elementary unit 430. The portion received by trench 431 can be referred to as head 433A (FIG. 41B) of bolt 435 whereas the portion extending away from elementary unit 430 can be referred as body 434 (FIG. 41B) of bolt 435. Body 434 (FIG. 41B) can be further configured to receive one or more connecting modules that can be trapped there upon by way of nut 438. Bolt 435 can serve as a fastener in a similar and/or dissimilar setting as depicted in FIG. 41A. In some configurations, bolt 435 can be used for fastening together one or more supplementary modules from the modular construction kit and/or one or more extension modules from outside the modular construction kit.

Figure 41B:
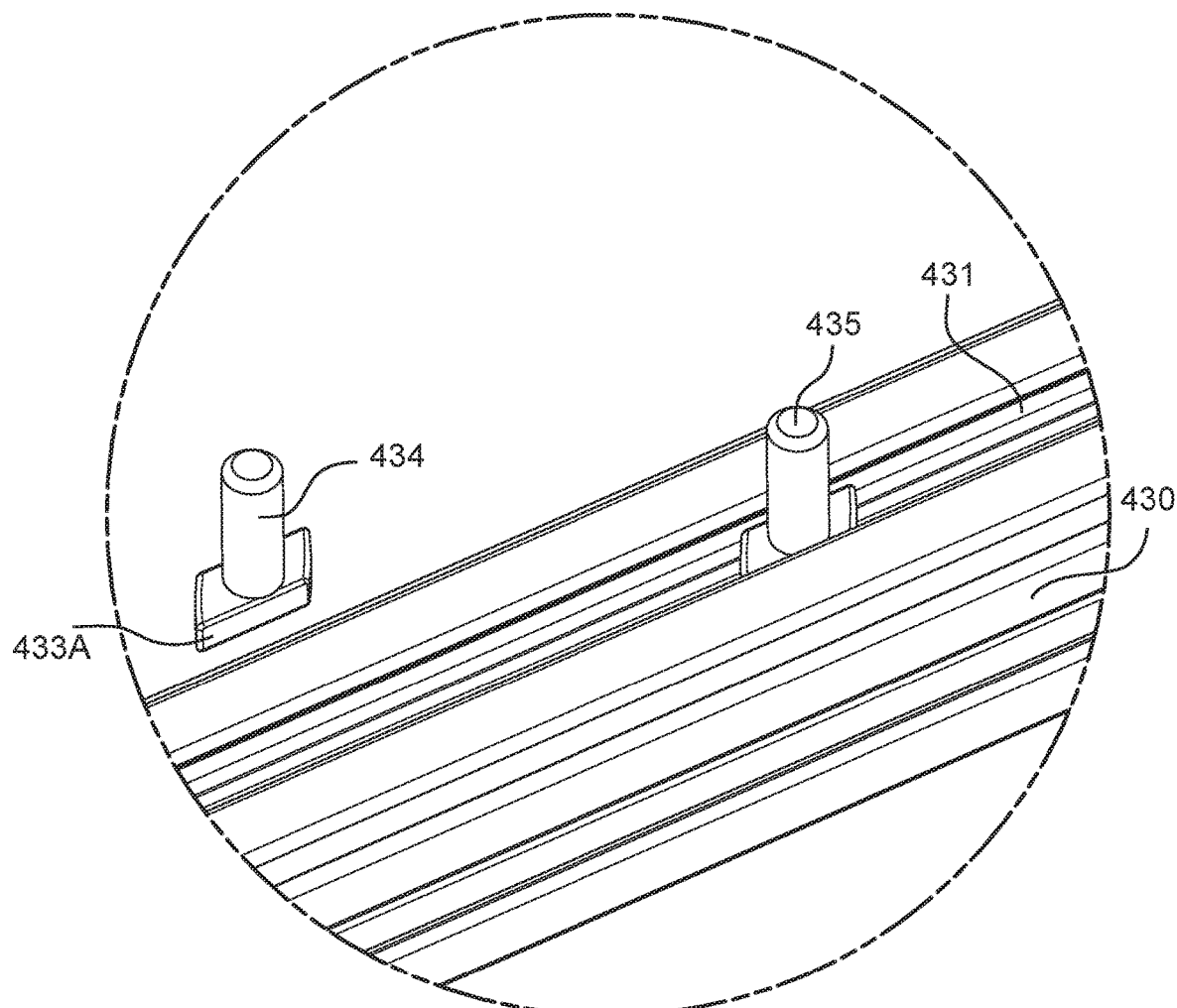
FIG. 41B is a detailed view of the configuration shown in FIG. 41A, focusing on a engaging the T-head fastener with the extrudates, as shown in FIG. 41A.

Referring primarily to FIG. 41B, head 433A of bolt 435 can comprise a longitudinal configuration of distinct dimensions and/or substantially similar to at least a portion of trench 431 of elementary unit 430. Bolt 435 can be inserted into trench 431 by way of head 433A, held parallel to trench 431. Due to similarity in the configuration of head 433A and trench 431, bolt 435 can be inserted in elementary unit 430. Head 433A of bolt 435 can be rested with trench 431 and body 434 can extend outward from longitudinal trench 431. A change in the orientation of bolt 435, while it is inserted in trench 431, can cause bolt 435 to be trapped inside trench 431 by way of head 433.

Figure 41C:
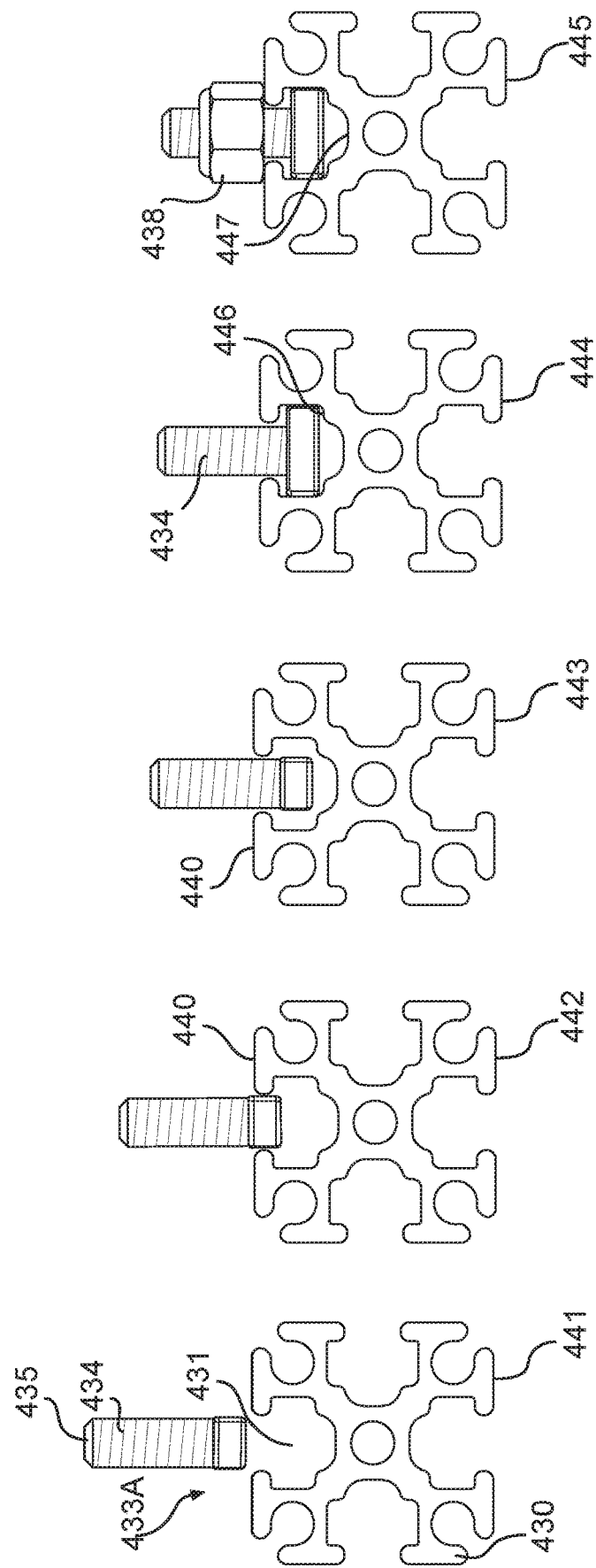
FIG. 41C is a representational diagram of a plurality of stages of engagement of a configuration of the T-head fastener of the present teachings with an extrudates.

Referring now primarily to FIG. 41C, a plurality of stages of inserting bolt 435 into trench 431 provided in elementary unit 430 is shown. A side view of elementary unit 430 is shown as bolt 435 is configured to enter trench 431 and trap there inside after rotating into place. First stage 441, depicts head 433A of bolt 435 facing trench 431 and held such that the head configuration can be received by trench 431 without any obstruction. Second stage 442, depicts head 433A of bolt 435 at the entrance of trench 431 such that head 433A can be at the same level as at least one flange 440 that can define an entrance to trench 431. Third stage 443 (FIG. 41C) depicts an insertion bolt 435 in trench 431 and held at the same orientation at which it entered the trench. Fourth stage 444 depicts a change in orientation of bolt 435 such that head 433A can be held substantially perpendicular to trench 431 of elementary unit 430. Head 433A can be trapped between partially raised floor 446 and at least one flange 440. Body 434 can be configured to extend out from trench 431 and can be configured to receive one or more modules and/or connectors that can be engaged with elementary unit 430. Fifth stage 445, depicts nut 438 configured to grab body 434 that extends away from trench 431, thereby locking the engagement between bolt 435 and elementary unit 430 of electro-mechanical agent first exemplary configuration 75 (FIG. 3). In some configurations, a protrusion can be added to head 433A of bolt 435 to cause it to sit flat when rested in longitudinal trench 431 of elementary unit 430 thereby allowing the engagement to align one or more connecting modules. In other configurations, body 434 of bolt 435 can further provide a thread locker and/or a nylon patch, also referred to as an ND patch.

Referring now to FIG. 42A and FIG. 42B, first exemplary bolt configuration 436 can include head region 450 and body 455 (FIG. 42B). Head 450 of bolt 436 can further comprise at least one first edge-portion 451 and at least one second edge-portion 452. Dimension of first edge-portion 451 can be distinct from dimensions of second edge-portion 452. A plurality of first edge-portions 451 and plurality of second edge-portions 452 can form head 450 of bolt 436. First exemplary bolt configuration 436 can be inserted into a trench 431 (FIG. 41A) of exemplary elementary unit 430 (FIG. 41A) such that first edge portion 451 can be disposed substantially parallel to trench 431 (FIG. 41A). In some configurations, a plurality of first edge-portions 451 can come together with a plurality of second edge-portions 452, such that head 450 of first exemplary bolt configuration 436 can form a geometry such as, for example, but not limited to, a hexagonal geometry. The advantage of a hexagonal geometry is that a bolt of this form can still engage with a standard hex wrench or socket. Body 455 (FIG. 42B) of first exemplary bolt configuration 436 can extend away from head 450. First exemplary bolt configuration 436 can engage with exemplary elementary unit 430 (FIG. 41A) by re-arranging inserted bolt 436 such that first edge-portion 451 can be in a perpendicular relationship with trench 431 (FIG. 41A) of exemplary elementary unit 430 (FIG. 41A). Such re-arrangement of bolt 436 can further cause at least one vertex 475, formed by adjacent second edge portions 452, to be in contact with sides (not shown) of longitudinal cavity 431 (FIG. 41A). In some configurations, contact area between head 450 of bolt 436 can comprise a part of first edge portion 451 and/or a part of second edge portion 452.

Referring now to FIGS. 43A and 43B, second exemplary bolt configuration 437 can include head region 460 and body 465 (FIG. 43B). Head 460 can comprise at least one first exteriority 461 and at least one second exteriority 462. Dimensions of the at least one first exteriority 461 can be similar or dissimilar from dimensions of at least one second exteriority 462. In some configurations, a plurality of first edge portion 461 and a plurality of second edge portion 462 can collectively form head 460. At least one first edge portion 461 and at least one second edge portion 462 can meet at a common point that can form vertex 467 of head 460. Body 465 (FIG. 43B) of second exemplary bolt configuration 437 can extend away from head 460. Second exemplary bolt configuration 437 can be inserted into trench 431 (FIG. 41A) of exemplary elementary unit 430 (FIG. 41A) such that, during insertion, at least one first edge portion 461 can be disposed substantially parallel to trench 431 (FIG. 41A). Second exemplary bolt configuration 437 can be configured to engage with exemplary elementary unit 430 (FIG. 41A) by re-arranging inserted bolt 437 such that first edge-portion 461 can be in a perpendicular relationship with trench 431 (FIG. 41A) of exemplary elementary unit 430 (FIG. 41A). Such re-arrangement of bolt 437 can further cause a part of at least one second edge-portion 462 to be in significant contact with sides (not shown) of trench 431 (FIG. 41A). In some configurations, contact area between head 460 of bolt 437 can comprise, but is not limited to comprising, a part of first edge portion 461 and/or vertex 467. At least one first edge-portion 461 and/or at least one second edge-portion 462 can further comprise curved geometry that can refrain portions 461, 462 from digging into extrusion sides (not shown) of exemplary elementary unit 430 (FIG. 41A).

Figure 44A:
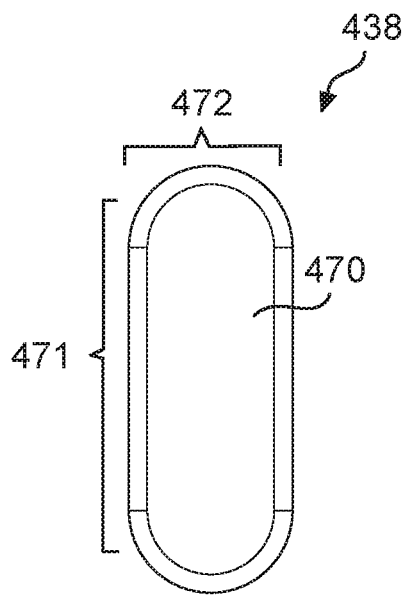
Figure 44B:
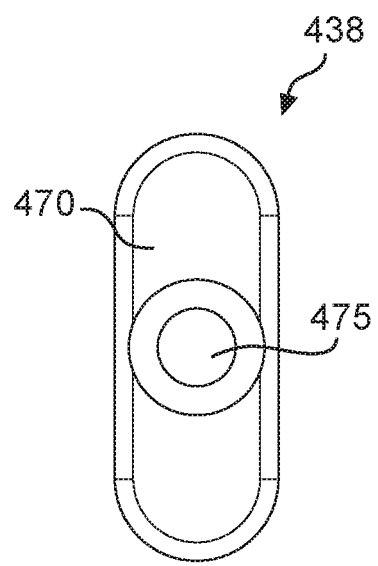

Referring now to FIG. 44A and FIG. 44B, third exemplary bolt configuration 438 can include head region 470 and body 475 (FIG. 44B). Head 470 can be a curved geometry comprising at least one first curved area 471 (FIG. 44A) and at least one second curved area 472 (FIG. 44A). In some configurations, at least one first curved area 471 and at least second curved area 472 can collectively form an enclosed curved geometry of head 470. Body 475 (FIG. 44B) of third exemplary bolt configuration 438 can extend away from head 470. Third exemplary bolt configuration 438 can be inserted into trench 431 (FIG. 41A) of exemplary elementary unit 430 (FIG. 41A) such that, during insertion, at least one first curved region 471 (FIG. 44A) can be disposed substantially parallel to trench 431 (FIG. 41A). Third exemplary bolt configuration 438 can be configured to engage with exemplary elementary unit 430 (FIG. 41A) by re-arranging inserted bolt 438 such that at least one first curved region 471 (FIG. 44A) can be in a perpendicular relationship with trench 431 (FIG. 41A) of exemplary elementary unit 430 (FIG. 41A). Such re-arrangement of bolt 438 can further cause a part of at least one second curved region 472 (FIG. 44A) to be in contact with sides (not shown) of trench 431 (FIG. 41A). In some configurations, contact area between head 470 of bolt 438 can comprise, but is not limited to comprising, a part of the at least one first curved region 471 (FIG. 44A).

Figure 45A:
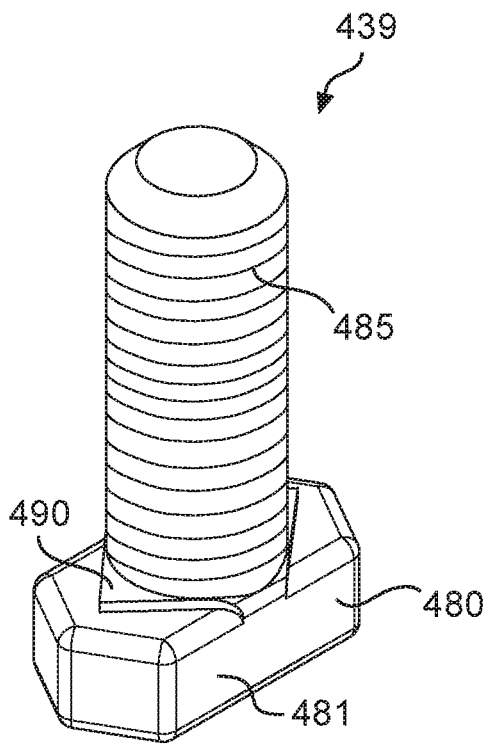
Figure 45B:
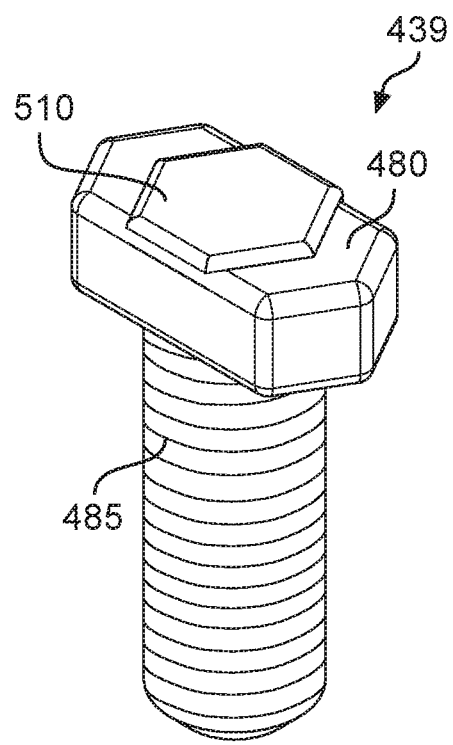

Referring now to FIG. 45A and FIG. 45B, fourth configuration bolt 439 can include head 480 and threaded body 485. Fourth configuration bolt 439 can be inserted into trench 431 (FIG. 41C) of exemplary elementary unit 430 (FIG. 41C) such that head 480 of bolt 439 can enter and can be followed by threaded body 485 that can extend away from trench 431 (FIG. 41C). Head 480 can extend along a length of trench 431 (FIG. 41C) such that side 481 (FIG. 45B) of head 480 can be parallel to sides (not shown) of trench 431 (FIG. 41C). On inserting head 480, threaded body 485 can extend out of trench 431 and can be configured to receive at least one module and/or extension module (not shown) that can be engaged with elementary unit 430 (FIG. 41C) by way of fourth configuration bolt 439. Engagement of fourth configuration bolt 439 inside trench 431 (FIG. 41C) can be achieved by re-arrangement of head 480 such that side 481 (FIG. 45A) of head 480 can be disposed perpendicular to at least one side (not shown) of trench 431 of elementary unit 430. At least one locking feature 490 (FIG. 45A) can be provided to retain fourth configuration bolt 439 in an engaged position with exemplary elementary unit 430 (FIG. 41C). In some configurations, at least one locking feature 490 can be disposed between head 480 and threaded body 485. During engagement of fourth configuration bolt 439 and exemplary elementary unit 430 (FIG.

41C), at least one locking feature 490 (FIG. 45A) can slide and can be retained between at least one set of opening rails (not shown) that can be provided on flanges 440 (FIG. 41C) of exemplary elementary unit 430 (FIG. 41C). Additionally, locking feature 490 (FIG. 45A) can be retained between the opening rails (not shown) when fourth configuration bolt 439 is appropriately aligned and tightened in trench 431 (FIG. 41C) of exemplary elementary unit 430 (FIG. 41C). Such an arrangement can forbid fourth configuration bolt 439 to disorient its locked position and separate from elementary unit 430 (FIG. 41C). In some configurations, at least one locking feature 490 (FIG. 45A) can serve as an aligning component and can press against flange 440 (FIG. 41C) as fourth configuration bolt 439 is engaged in trench 431 (FIG. 41C) of elementary unit 430 (FIG. 41C). Top protrusion 510 (FIG. 45B) can be optionally provided on head 480 of fourth configuration bolt 439. Top protrusion 510 (FIG. 45B) can be disposed such that insertion of fourth configuration bolt 439 into trench 431 (FIG. 41C) can cause top protrusion 510 (FIG. 45B) to rest on floor 447 (FIG. 41C) of exemplary elementary unit 430 (FIG. 41C). Such an arrangement can cause a convenient alignment while performing an engagement between elementary unit 430 (FIG. 41) and at least one module and/or extension module (not shown). A geometry of at least one top protrusion 510 (FIG. 45B) can be such that top protrusion (FIG. 45B) can be received and disposed on floor 447 (FIG. 41C) of exemplary elementary unit 430 (FIG. 41C).

Referring now to FIGS. 46A and 46B, motor bracket second configuration 90K can engage one or more supplementary/extension modules with elementary units 85 (FIGS. 4A and 4B) and/or base frame 80 (FIGS. 4A and 4B). A connecting shaft (not shown) that can belong to a supplementary module can be received into principal aperture 5800 from a first face 5710 of motor bracket second configuration 90K thus engaging the supplementary module therewith using, for example, a bearing. Principal aperture 5800 can be provided in first portion 5550A of motor bracket second configuration 90K. Second portion 5550B can further provide a plurality of connecting apertures 5750, and adequate spacing on motor bracket second configuration 90K, that can be employed for engaging motor bracket second configuration 90K with elementary unit 85 (FIGS. 4A and 4B) and/or base frame 80 (FIGS. 4A and 4B) or any other supplementary module. Component/s that can be engaged with second portion 5550B can be disposed to align with connecting apertures 5750 and fastened by way of screws (not shown) that can be received there through. A pre-determined gap (not shown) can be maintained between first portion 5550A and second portion 5550B such that two or more connecting components can be accommodated without any interference. As a result of the pre-determined gap, the connecting shaft of a supplementary module can be received from first face 5710 or second face 5720 of motor bracket second configuration 90K. Motor bracket second configuration 90K can include a plurality of alignment nubs 5900 that can rest into a matching groove (not shown) that can be provided on one or more connecting supplementary modules, elementary units 85 (FIGS. 4A and 4B) or base frame 80 (FIGS. 4A and 4B). This arrangement of engaging via connecting apertures 5750 and nubs 5900 can ensure a stable connection between motor bracket second configuration 90K and the connecting supplementary module, elementary unit 85 (FIGS. 4A and 4B) or base frame 80 (FIGS. 4A and 4B).

Figure 46C:
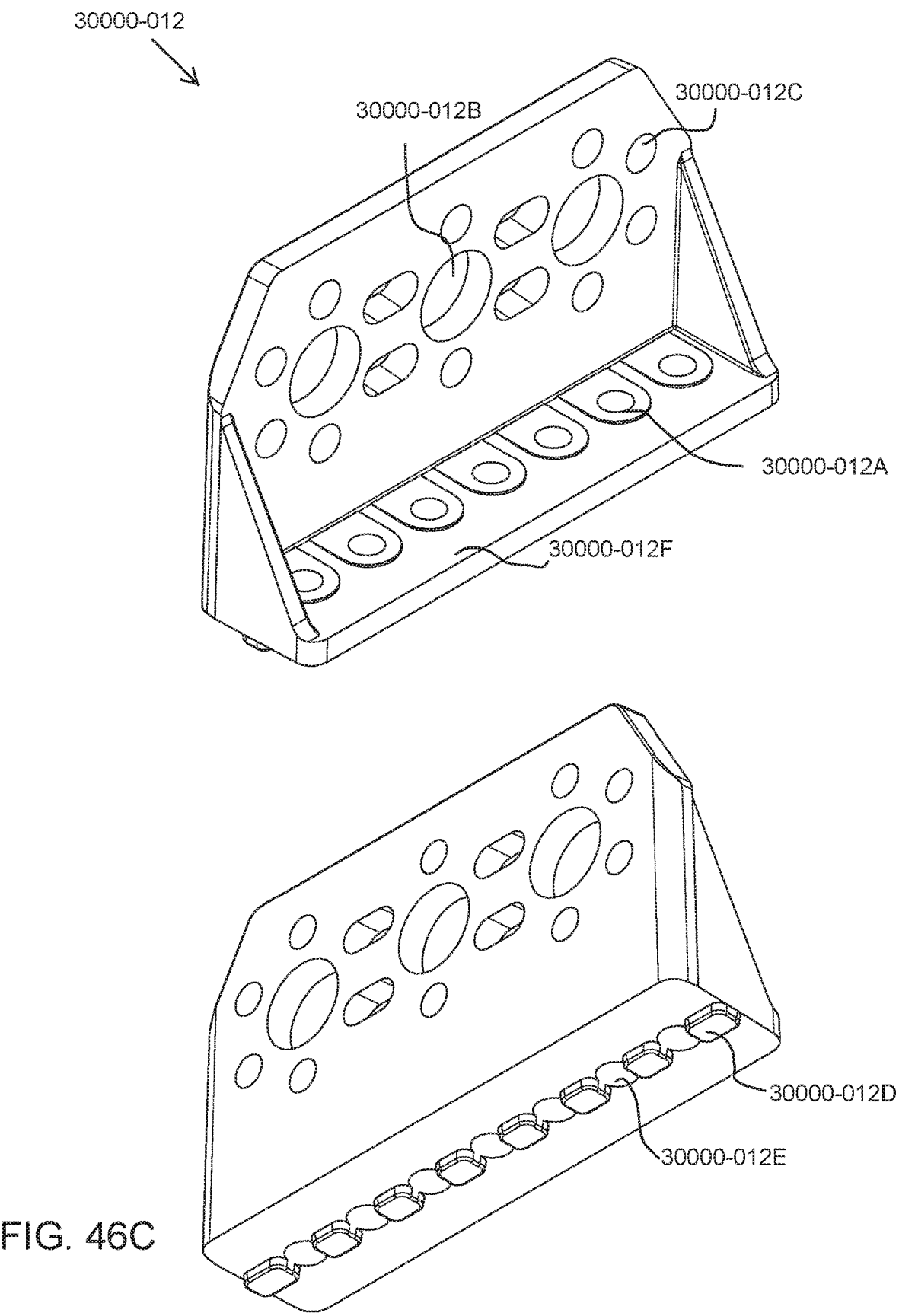
FIG. 46C includes perspective views of the motor pillow bracket of the present teachings.

Referring now to FIG. 46C, motor pillow bracket 30000-012 can include, but is not limited to including, at least one shaft mount cavity 30000-012B that can accommodate any shape shaft, for example hex shaft 4B-31 (FIG. 4B-3). Multiple shafts can be mounted in shaft mount cavities 30000-012B, enabling gear alignment. The distance between holes 30000-012E can vary according to the requirements of the gears used with motor pillow bracket 30000-012. Motor pillow bracket 30000-012 can include various sizes of mounting cavities that can accommodate flexible placement of motor pillow bracket 30000-012. Motor pillow bracket 30000-012 can include embedded washer features 30000-012A accommodating mounting and bolt placement, nubs 30000-012D accommodating placement of motor pillow bracket 30000-12 on extrusions of the present teachings, if necessary, and extrusion mounting cavities 30000-012E for mounting motor pillow bracket 30000-012 slidably on an extrusion. Base 30000-012F can be sized to enable access to screws when motor 105 (FIG. 4B-3) is installed.

Figure 47A:
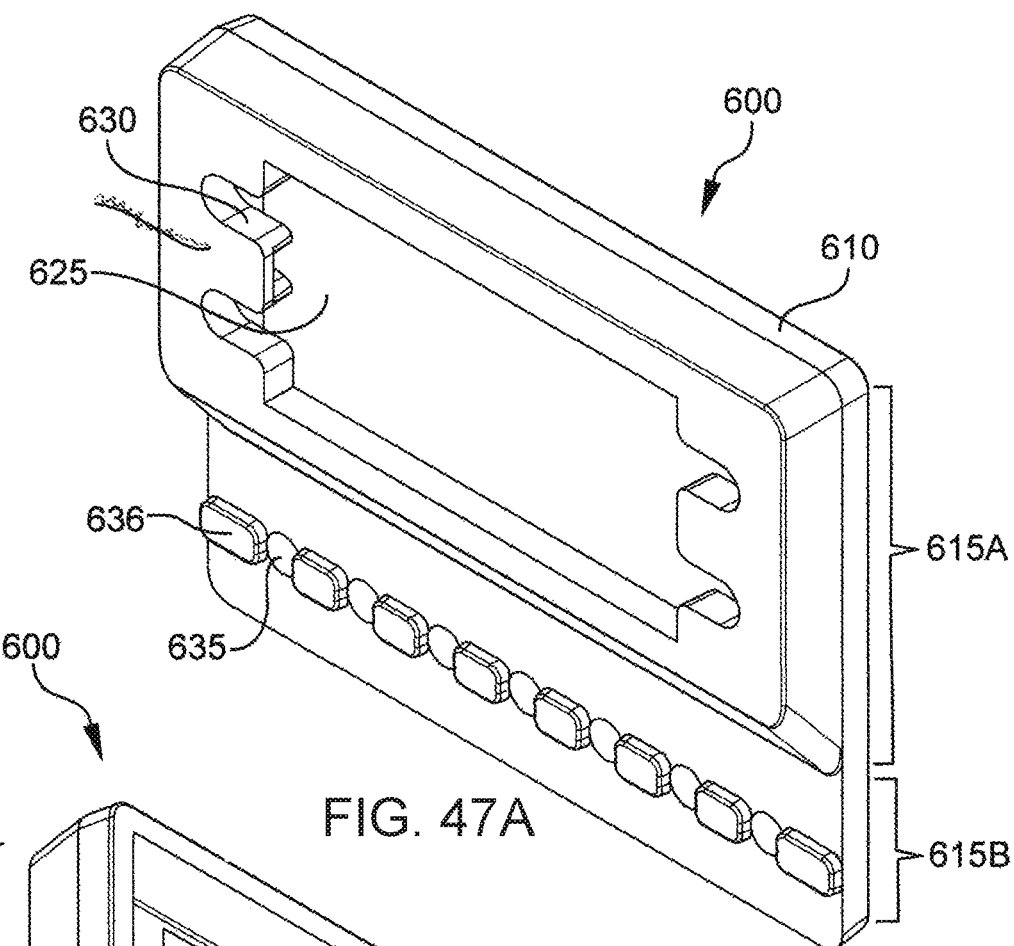
FIGS. 47A-47B are schematic diagrams of perspective views of the servo motor connector of the present teachings.
Figure 47B:
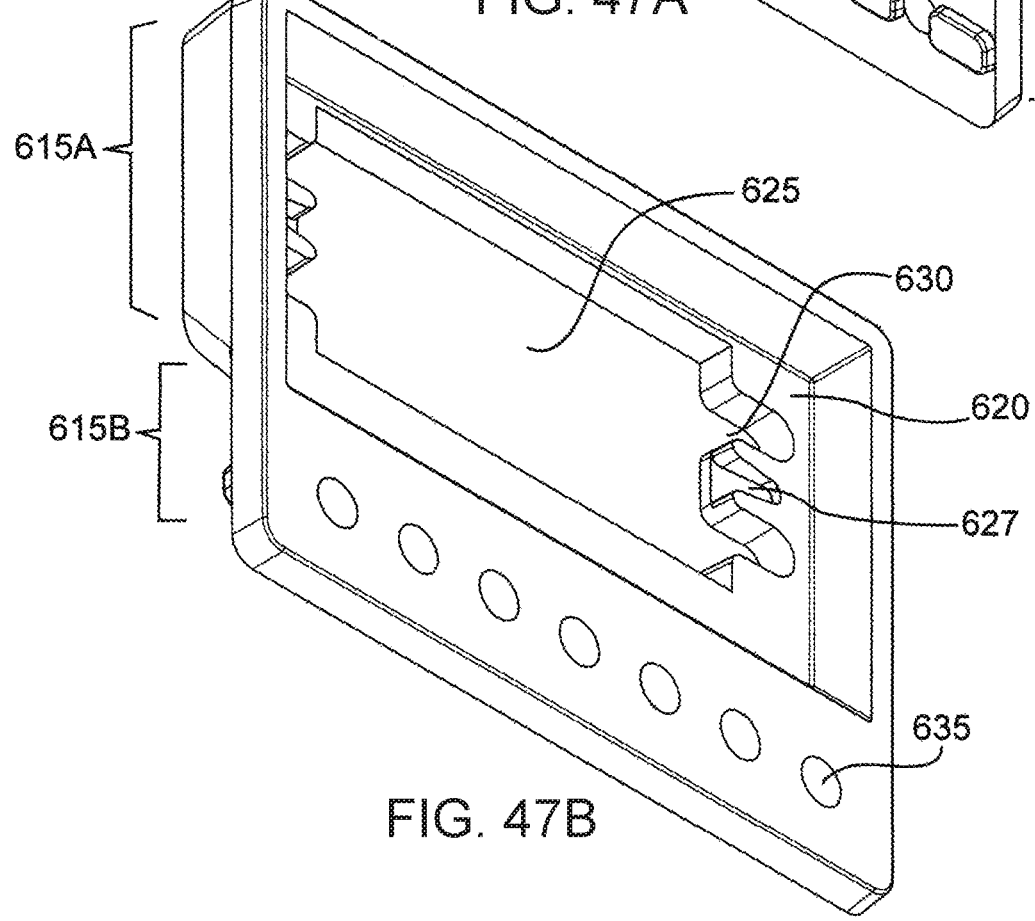

Referring now to FIGS. 47A and 47B, servo motor 126 (FIG. 4B) can be engaged with one or more supplementary module, elementary units 85 (FIGS. 4A and 4B) or base frame 80 (FIG. 4A) by way of servo connector 600. A first portion 615A can be configured to partially receive servo motor 126 through frame 625. Frame 625 can be further disposed in an embedded cavity 620 of first portion 615A. Embedded cavity 620 can be configured to guide in receiving servo motor 126 into frame 625 and engage therewith through screw receiving apertures 630. Apertures 630 can be aligned with matching apertures (not shown) of servo motor 126 (FIG. 4B-4D). As previously mentioned, a part of servo motor 126 can be received through frame 625 and a part of remainder of servo motor 126 can be accommodated into embedded cavity 620. Thus, in some configurations a connecting servo motor 126 (FIG. 4B) can be received only from a side that contains embedded cavity 620. A second side can face away from embedded cavity 620 and can be configured to engage with another component such as, but not limited to a supplementary/extension module, an elementary unit 85 (FIGS. 4A and 4B) or base frame 80 (FIG. 4A). Such an engagement can be achieved through connecting apertures 635 provided therein. In some configurations, alignment of elementary unit 85 during this engagement can be ensured through a plurality of alignment nubs 636 that can complement connecting apertures 635. As shown in FIG. 4B, servo motor 126 can be engaged with servo connector 600 in more than one configuration. A first exemplary engagement configuration can be achieved by engaging an elementary unit 85 with second portion 615B through second side of servo connector 600 and accommodating servo motor 126 into frame 625 through first side such that a servo shaft (FIGS. 4C and 4D) can extend away from frame 625 and surpass a width of elementary unit 85 engaged on second side of servo connector 600. In reference to FIG. 4B, such an exemplary engagement can allow servo shaft (not shown) to engage at least one gear (FIGS. 4B-4D). Engaged gear can be further configured to interact with one or more meshed gears without any interference of elementary unit 85. A second exemplary engagement configuration can be achieved by engaging an elementary unit 85 with second portion 615B through second side of servo connector 600 and accommodating servo motor 126 into frame 625 through first side such that a servo shaft (FIGS. 4C and 4D) can extend away from frame 625 and can stay within a width of elementary unit 85. Such an arrangement can allow servo shaft to interact with a shaft component 135 (FIG. 4C) through an adaptor (not shown) configured to play an intermediary between the two shafts. The above mentioned interaction can be achieved irrespective of elementary unit 85 being attached to second portion 615B of servo connector 600.

Figure 48B:
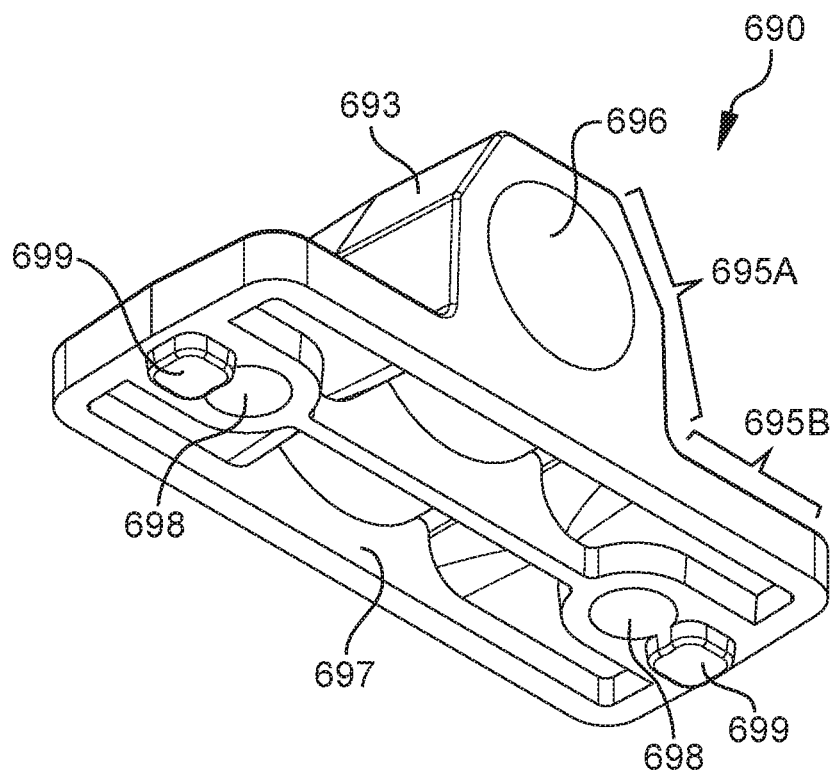

Referring now primarily to FIGS. 48A and 48B in support with FIG. 4A. Some configurations of earlier mentioned assemblies of FIGS. 4A-FIG. 4E can comprise an engagement of a shaft 135 with elementary unit 85 and/or base frame 80. Such an engagement can be achieved by bearing connector 690 which is also depicted as bearing connector 90N in FIG. 4A. Bearing connector 690 can further comprise a first portion 695A that can be configured to receive a shaft and a second portion 695B that can be configured to engage with a supplementary module, elementary unit 85 (FIGS. 4A and 4B) or base frame 80 (FIG. 4A). First portion 695A can further comprise a substantially cylindrical bore 696 through which a shaft such as but not limited to, a cylindrical shaft or a hex shaft can be received. Received shaft can maintain its rotational and linear freedom of motion by providing a bearing (not shown) that can surround the shaft portion entering or interacting with bore 696. Second portion 695B can comprise attachment points 698 configured to achieve engagement of bearing connector 690 with modules such as but not limited to, elementary unit 85. Attachment points 698 can terminate at base portion 697 that can be further configured to rest on elementary unit 85. A plurality of alignment nubs 699 can be provided on base portion 697 to complement with attachment points 698 and ensure an uninterrupted engagement between bearing connector 690 and a supplementary module, elementary unit 85 (FIGS. 4A and 4B) or base frame 80 (FIG. 4A).

Figure 49A:
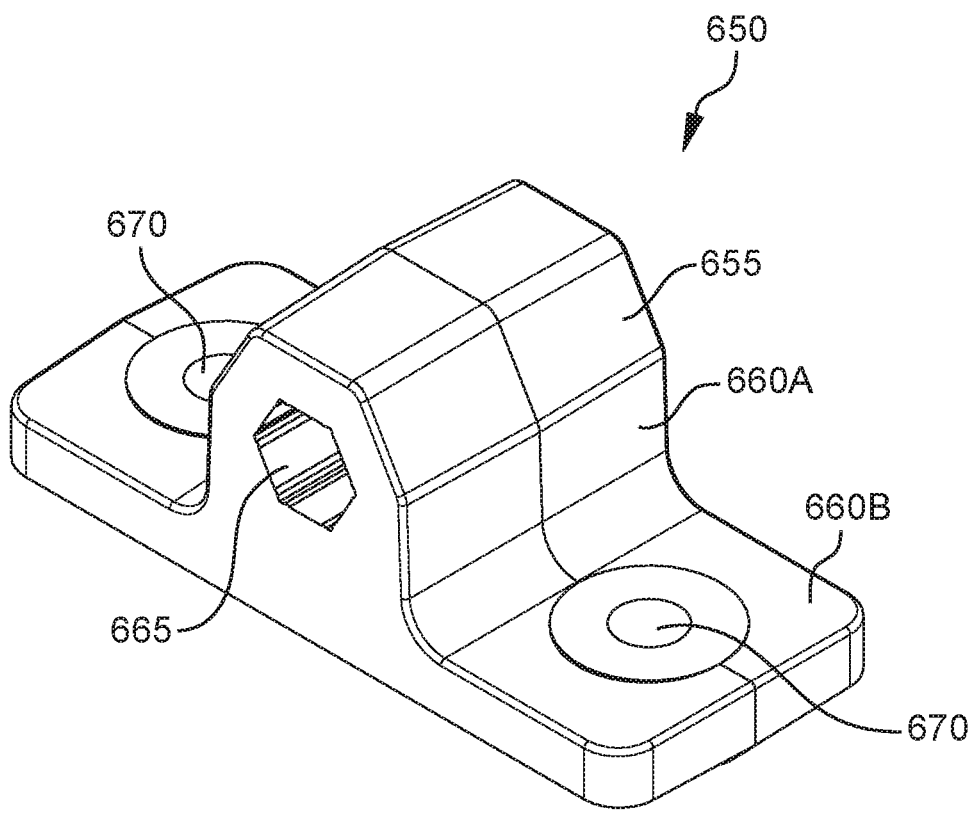
Figure 49B:
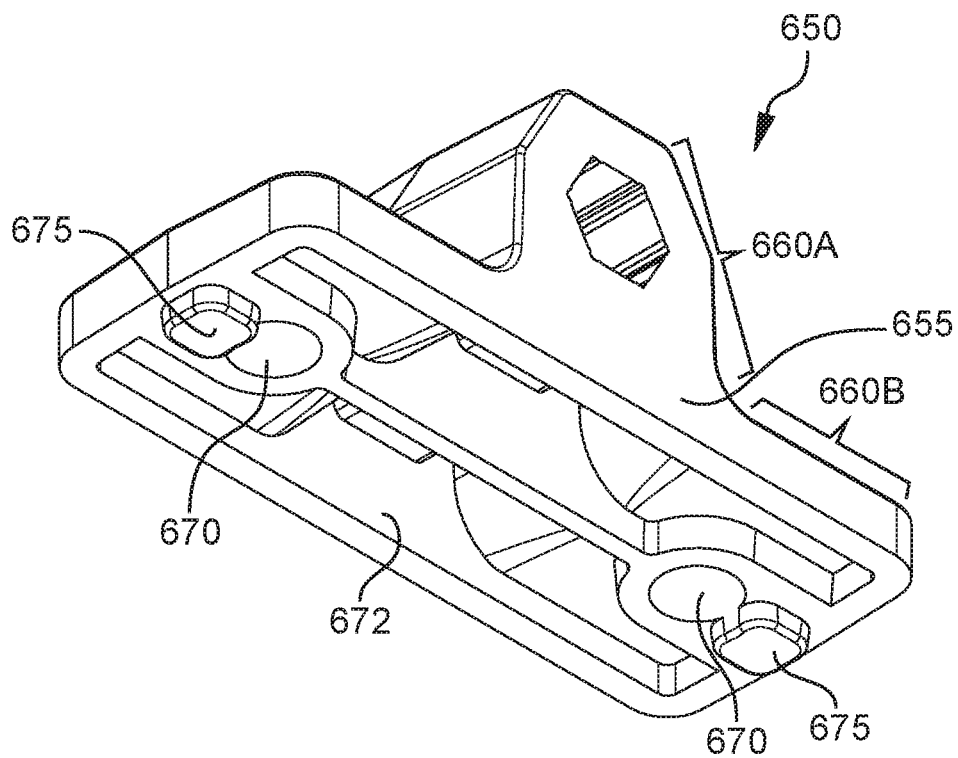

Referring now primarily to FIGS. 49A and 49B, hex connector 650, a second configuration of bearing connector 690, can be configured to receive hex shafts. Hex connector 650 can comprise a first portion 660A that can be configured to receive a shaft and a second portion 660B that can be configured to engage with a supplementary module, elementary unit 85 (FIGS. 4A and 4B) or base frame 80 (FIG. 4A). First portion 660A can further comprise a substantially hex-shaped bore 665 through which a shaft such as but not limited to, a hex shaft (not shown) can be received. Received hex shaft can be forbidden to maintain its rotational and/or linear freedom of motion post entering bore 665. Second portion 660B can comprise attachment points 670 configured to achieve engagement of hex connector 650 with modules such as but not limited to, elementary unit 85. Attachment points 670 can terminate at base portion 672 that can be further configured to rest on elementary unit 85. A plurality of alignment nubs 675 can be provided on base portion 672 to complement with attachment points 670 and ensure an uninterrupted engagement between hex connector 650 and elementary unit 85.

Figure 50A:
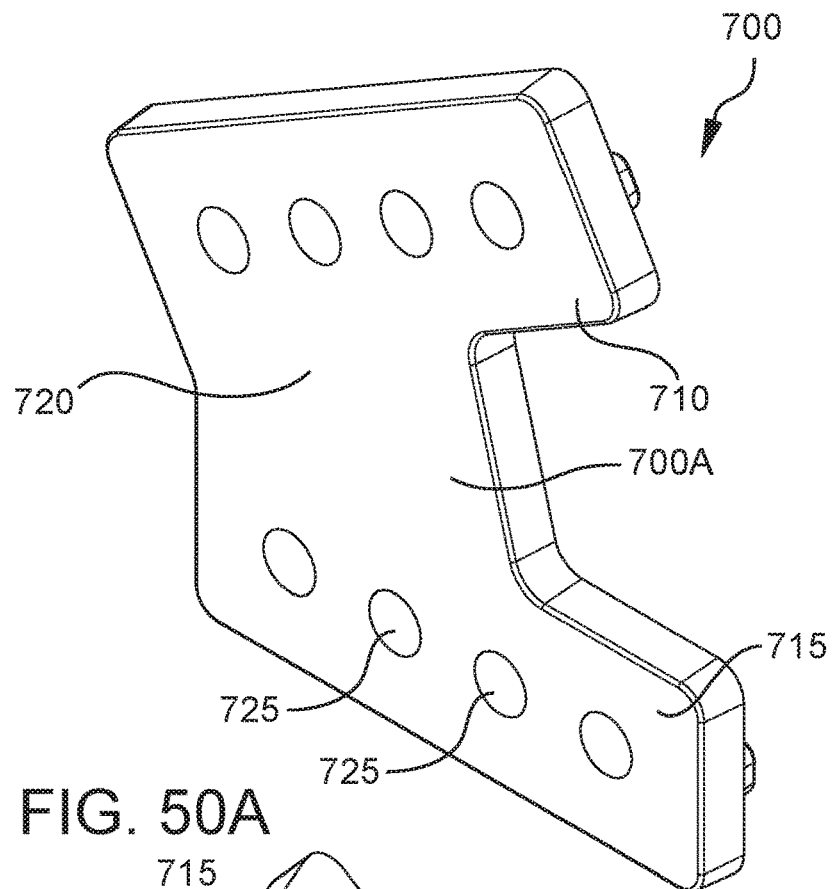
Figure 50B:
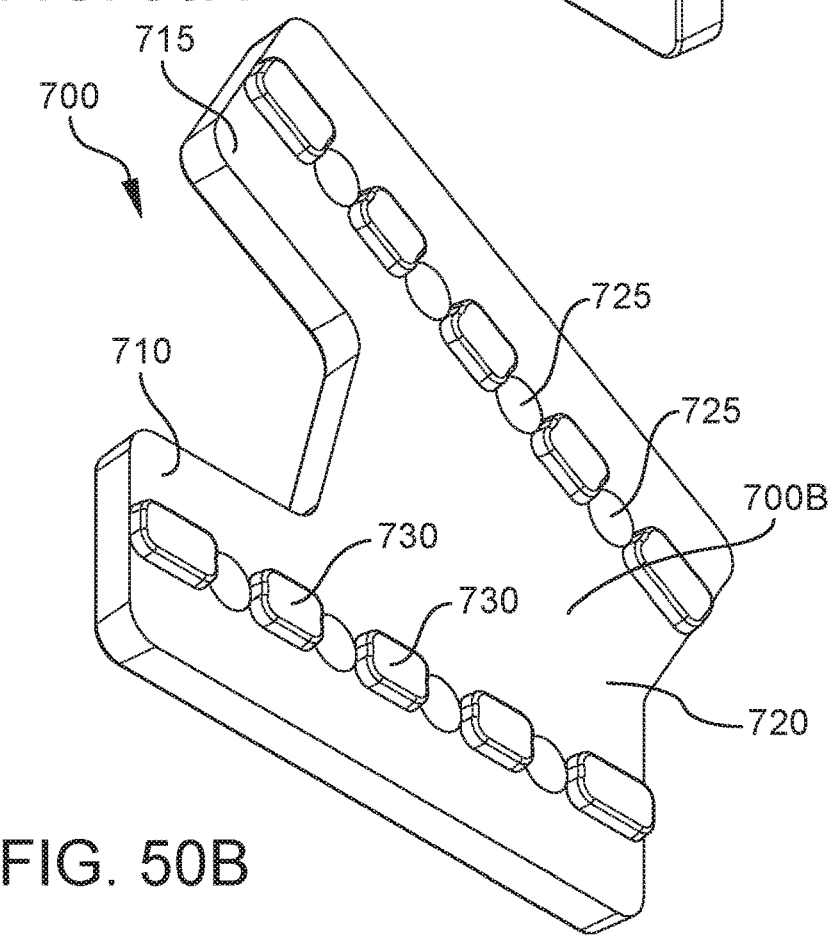

Referring now primarily to FIGS. 50A and 50B in support with FIG. 4E. An acute angle connector 700 can comprise a first arm 710 configured to engage with a first supplementary module, elementary unit 85 (FIGS. 4A and 4B) or base frame 80 (FIG. 4A) and a second arm 715 configured to engage with a second supplementary module, elementary unit 85 (FIGS. 4A and 4B) or base frame 80 (FIG. 4A). First arm, 710 and second arm 715 can be related such that the respective engaging components can be in an acute angle relationship with each other. In some configurations, a first elementary unit 85 can be configured to engage with first arm 710 and second elementary unit 85 can be configured to engage with second arm 715. Acute angle connector 700 can further comprise an intermediate area or spacing 720 configured to allow first elementary unit 85 and second elementary unit 85 to engage with connector 700 without interference from each other. A plurality of attachment points 725 can be provided such that they can initiate at a first face 700A of connector 700 and terminate at second face 700B. Attachment points 725 can be configured to aid in engagement with elementary units 85 by way of a screw (not shown) that can pass there through. Connector 700 can further provide a plurality of alignment nubs 730 that can prevent connector 700 to dislocate during its engagement with one or more a first supplementary module, elementary unit 85 (FIGS. 4A and 4B) or base frame 80 (FIG. 4A).

Figure 51A:
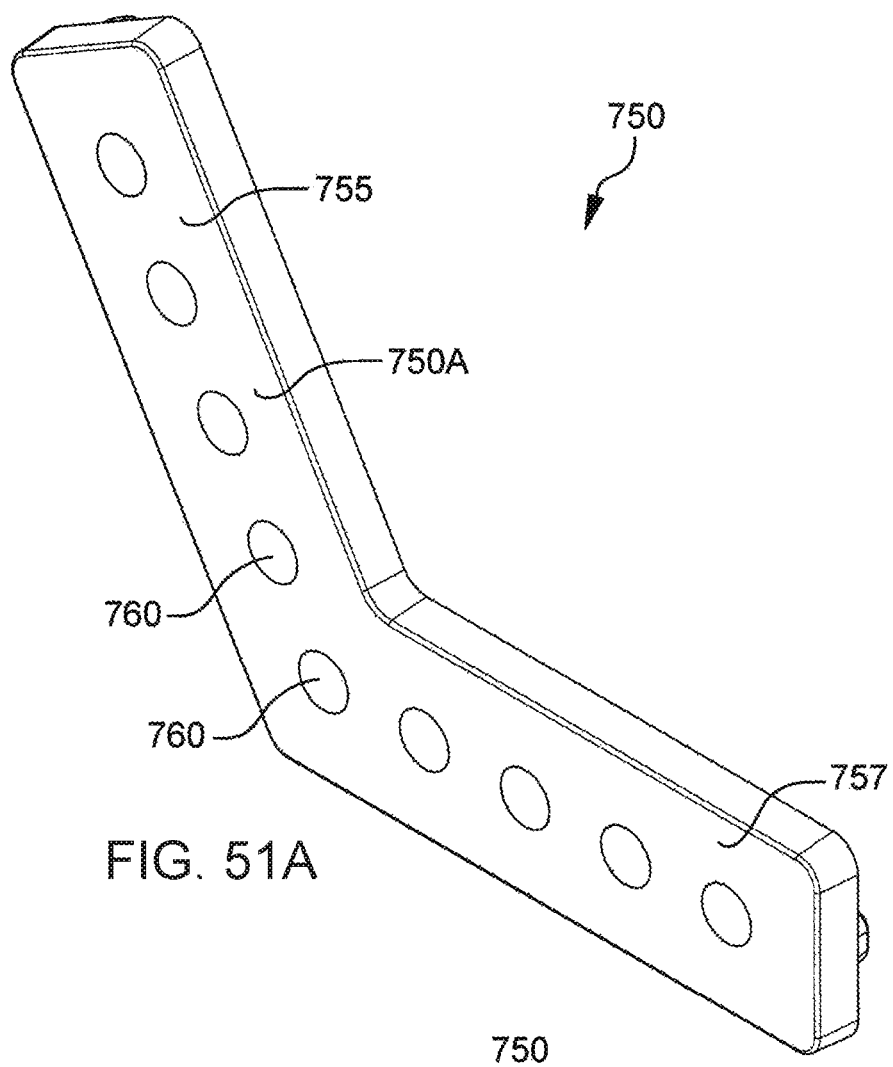
Figure 51B:
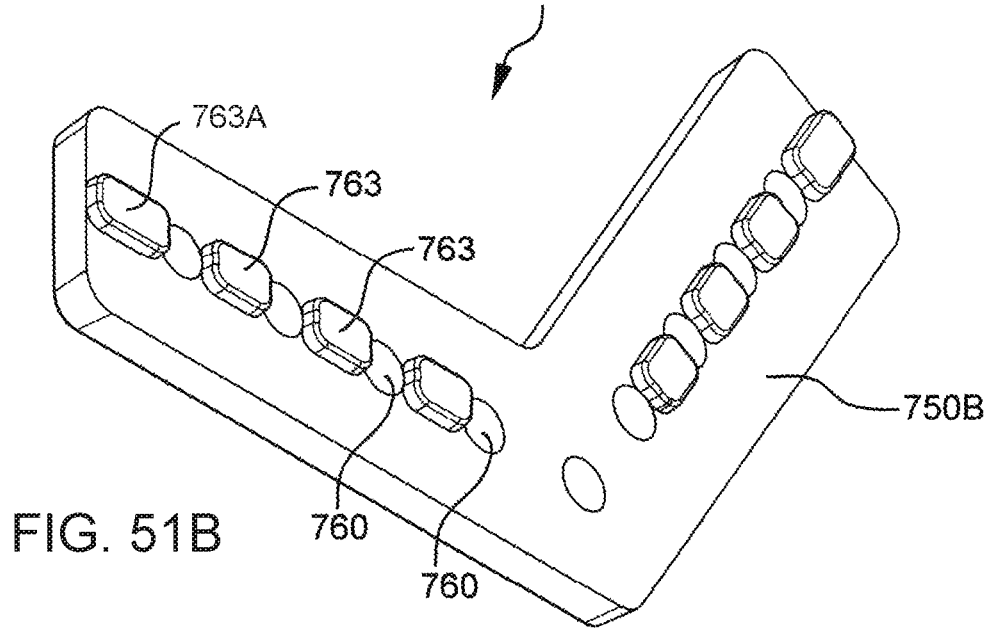
Figure 51C:
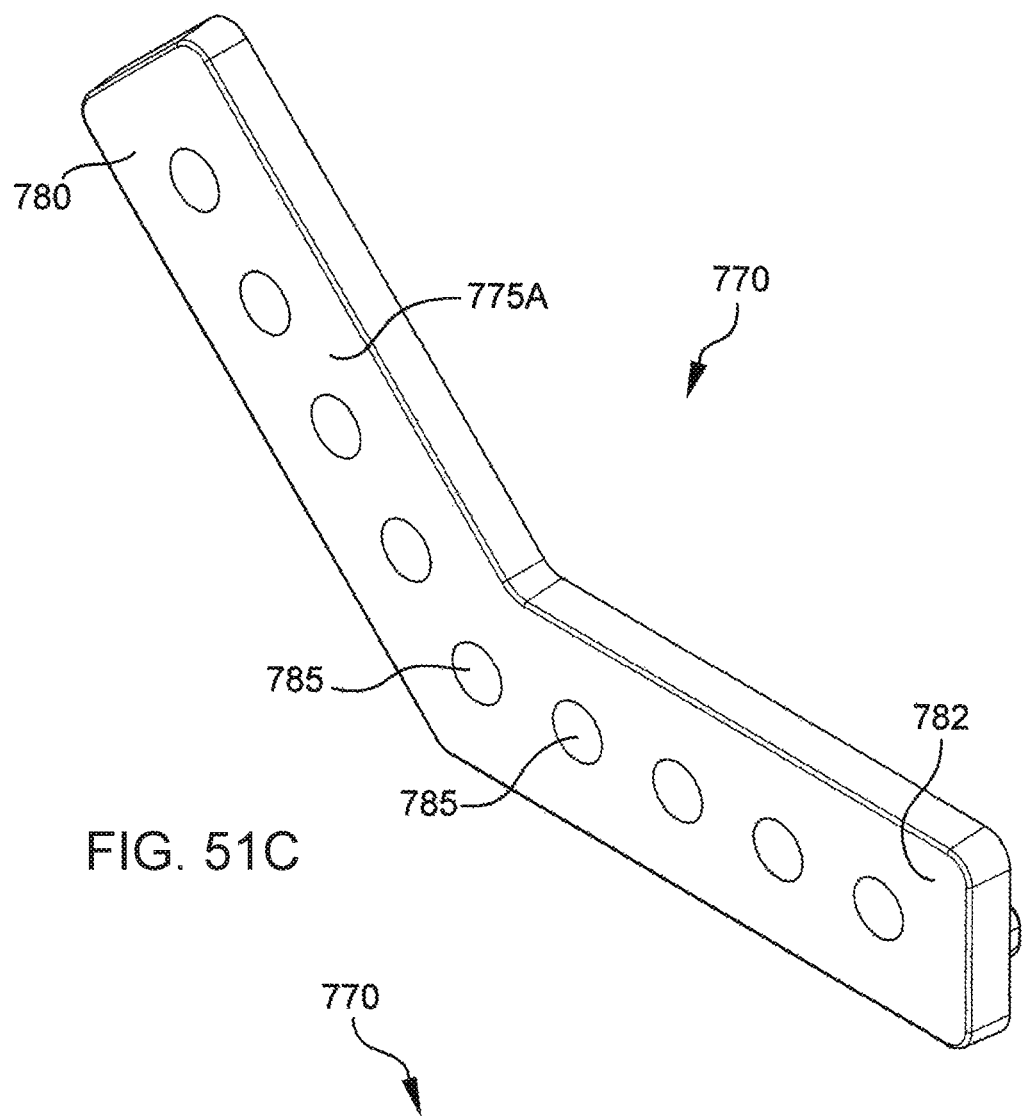
Figure 51D:
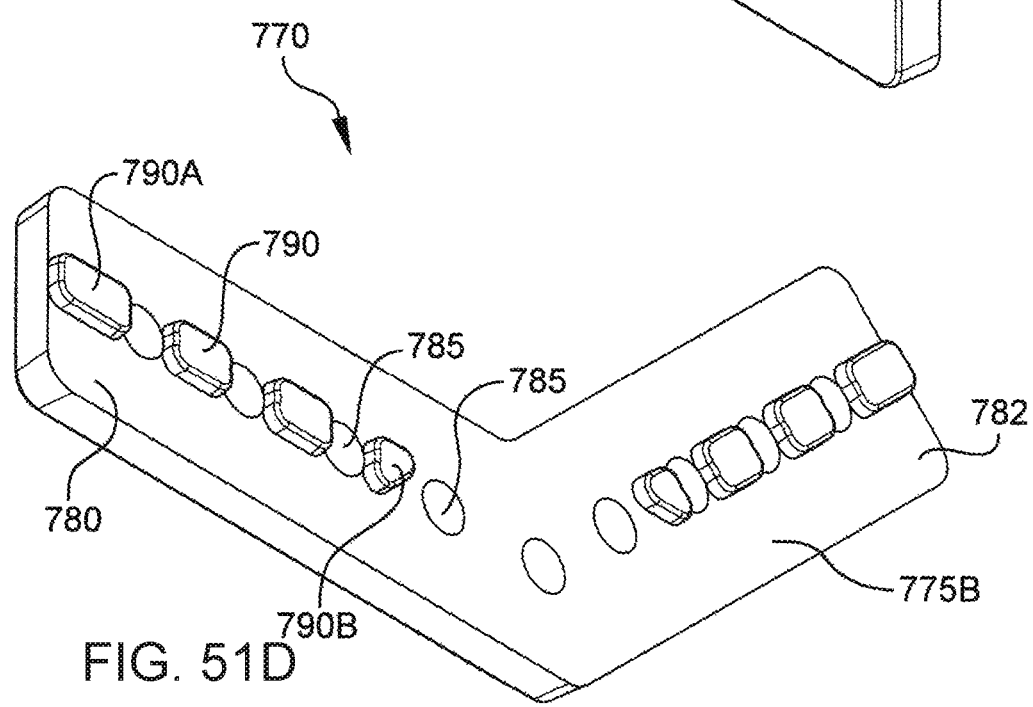
Figure 51E:
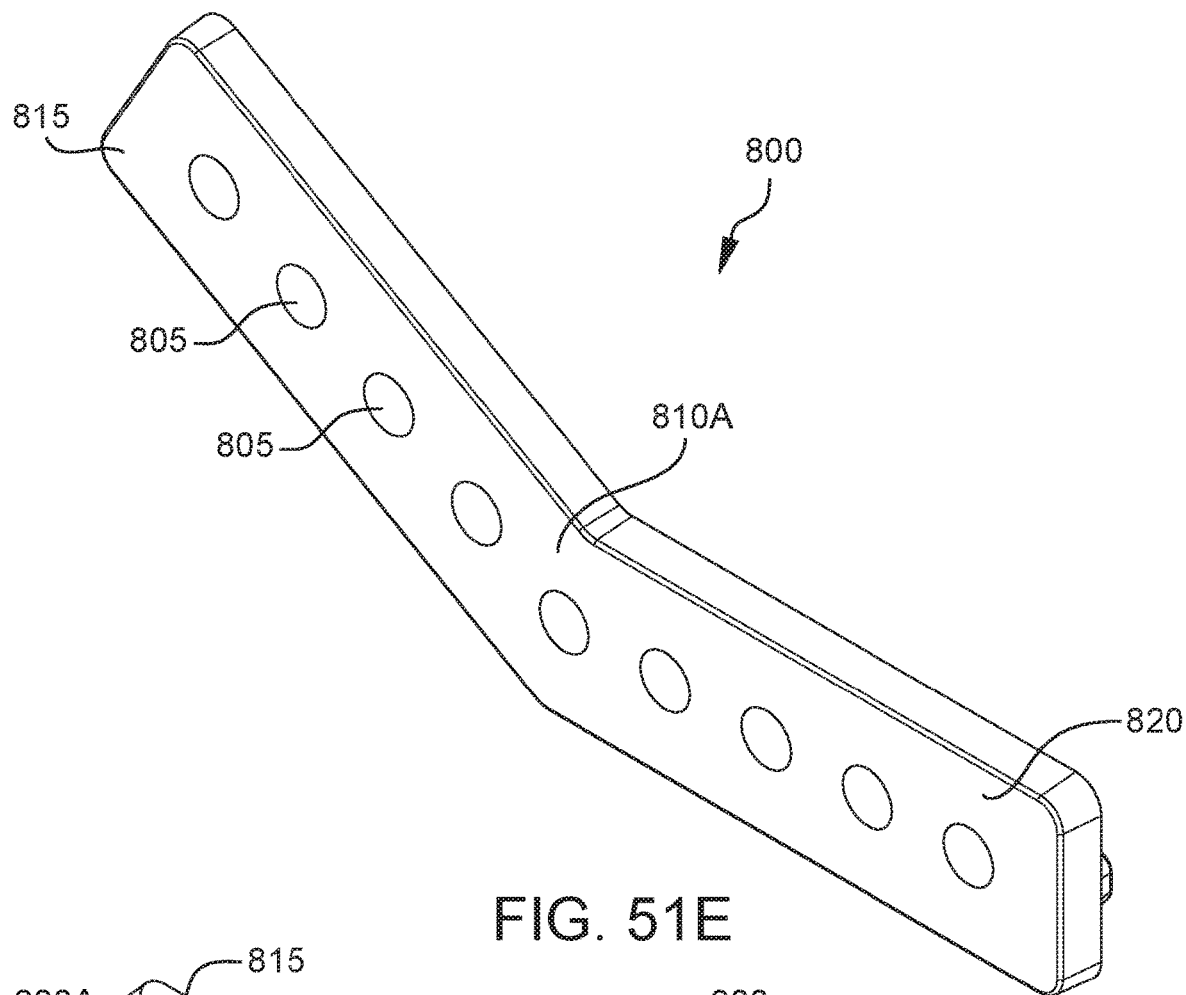
Figure 51F:
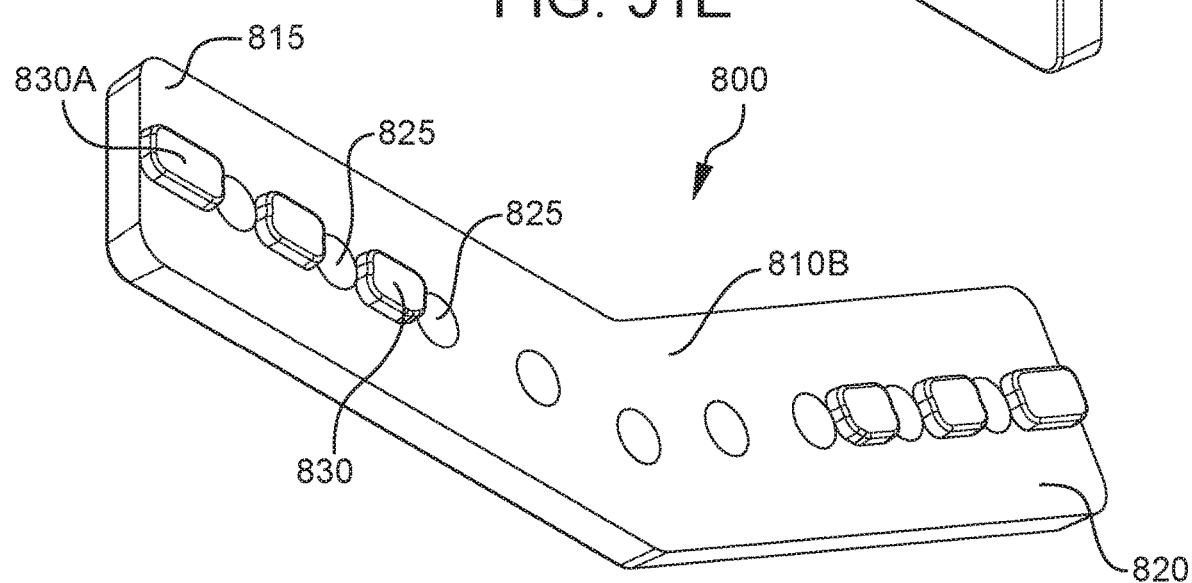

Referring now primarily to FIGS. 51A-51F in support with FIG. 4E. FIGS. 51A and 51B depict a first configuration of an obtuse angle connector 750. FIGS. 51C and 51D depict a second configuration of an obtuse angle connector 770. Partial nubs 790B can enable space for extrusion connection. FIGS. 51E and 51F depict a third configuration of an obtuse angle connector 800. Connectors 750, 770 and 800 can further comprise a first arm 755, 780 and 815 and second arm 757, 782 and 820, respectively. First arm 755, 780, 815 and second arm 757, 782 and 820 that can each be configured to engaged with at least one supplementary module, elementary unit 85 (FIGS. 4A and 4B) or base frame 80 (FIG. 4A). FIG. 4E depicts one of the obtuse angle connectors 750, 770 and 800 in engagement with a first elementary unit 85 and a second elementary unit 85. Arms of one of the employed obtuse angle connectors 750, 770 and 800 can be in an obtuse angle relationship with each other to obtain a similar relationship between the connecting elementary units 85, in case of FIG. 4E. First configuration of obtuse angle connector 750 can provide a relationship of, but not limited to, 120° between its first arm 755 and second arm 757. Second configuration of obtuse angle connector 770 can provide a relationship of, but not limited to, 135° between its first arm 780 and second arm 782. Third configuration of obtuse angle connector 800 can provide a relationship of, but not limited to, 150° between its first arm 815 and second arm 820. Connectors 750, 770 and 800 can further comprise a first face 750A, 775A and 810A and a second face 750B, 775B and 810B, respectively. First face 750A, 775A and 810A can be configured to face away from connecting supplementary module, elementary unit 85 (FIGS. 4A and 4B) or base frame 80 (FIG. 4A) while second face 750B, 775B and 810B can be configured to face towards connecting supplementary module, elementary unit 85 (FIGS. 4A and 4B) or base frame 80 (FIG. 4A). A plurality of connecting apertures 760, 785 and 825 can be provided to each obtuse angle connector 750, 770 and 800, respective and that can initiate from first face 750A, 775A and 810A and terminate at second face 750B, 775B and 810B of the connectors. Connecting apertures 760, 785 and 825 can be aligned with one or more connecting supplementary module, elementary unit 85 (FIGS. 4A and 4B) or base frame 80 (FIG. 4A) and can be fastened therewith through, but not limited to, fastening screws that can be receive by connecting apertures 760, 785 and 825. Connectors 750, 770 and 800 can further comprise a plurality of alignment nubs 763, 790 and 825 that can be disposed over second surface 750B, 775B and 810B, respectively. Dimensions and distribution of alignment nubs 763, 790 and 830 can vary from one obtuse angle connector to another to ensure an uninterrupted engagement between the connecting supplementary module, elementary unit 85 (FIGS. 4A and 4B) or base frame 80 (FIG. 4A). First configuration of obtuse angle connector 750 comprises a plurality of alignment nubs 760 that can be disposed closer to a point of contact 751 where first arm 755 meets second arm 757. Connector 750 further provides a second configuration of alignment nubs 763A configured to complement overall engagement along with connecting apertures 760 and other alignment nubs 763. Similarly, second configuration of obtuse angle connector 770 can comprise a plurality of alignment nubs 790 that can be appropriately spaced from point of contact 781 where first arm 780 meets second arm 782. In some exemplary obtuse angle connectors, a second configuration of alignment nubs 790B can employed. The second configuration of alignment nubs 790B can be dimensionally trimmed or truncated to align with connecting supplementary module, elementary unit 85 (FIGS. 4A and 4B) or base frame 80 (FIG. 4A) and simultaneously avoid any engagement that interrupts connection between obtuse angle connector 770 and one or more above mentioned engaging components. Alignment nubs 830 of obtuse angle connector 800 can be distributed and dimensioned to fulfill a similar goal as discussed in earlier examples of obtuse angle connectors 750 and 770.

Figure 52A:
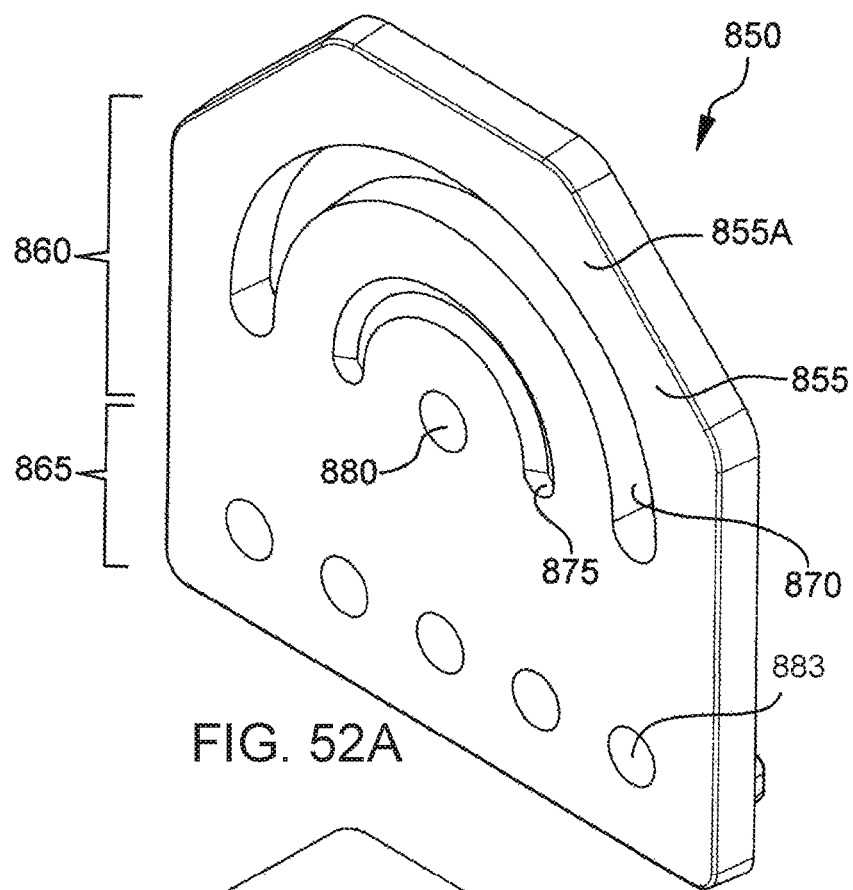
Figure 52B:
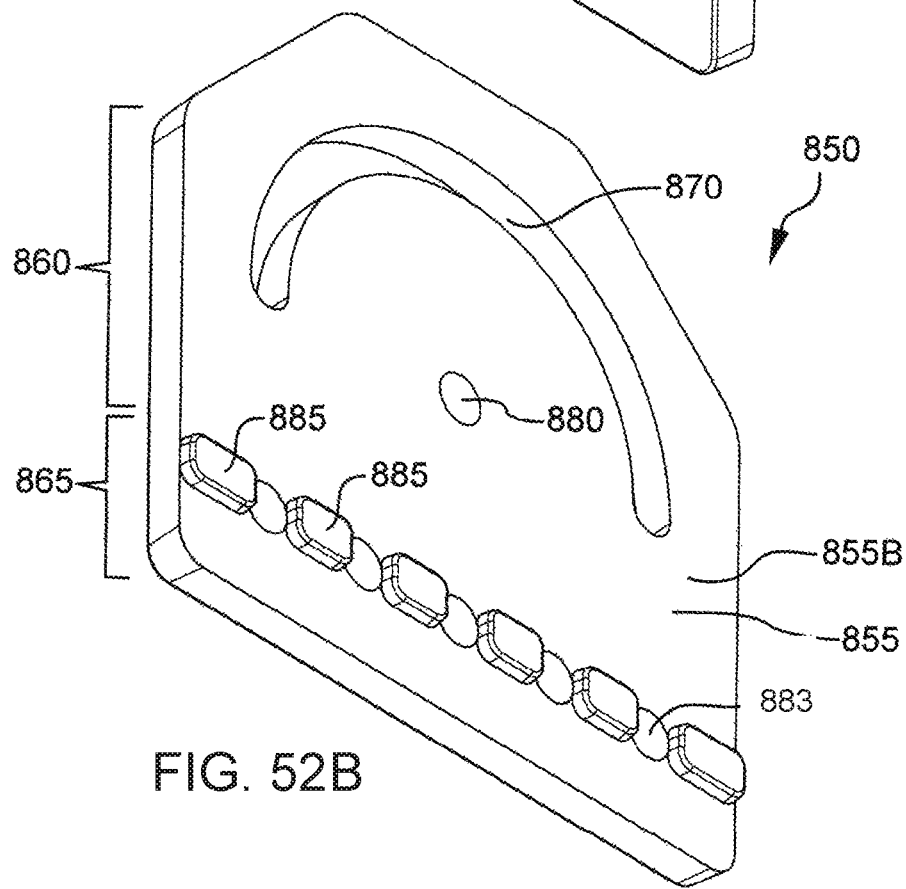

Referring now primarily to FIGS. 52A and 52B, variable angle connector 850 can be configured to engage two or more supplementary modules and/or elementary unit 85 (FIGS. 4A and 4B). A first face 855A can be configured to face away from at least one of connecting supplementary modules and/or elementary unit 85 (FIGS. 4A and 4B) while a second face 855B can be configured to face towards another of supplementary modules and/or elementary unit 85 (FIGS. 4A and 4B). FIG. 4A comprises an exemplary arrangement depicting engagement of two elementary units 85 through variable angle connector 850, referred to as 90R therein. First face 855A can comprise a substantially semi-circular aperture 870 that can be aligned with a matching groove/aperture (not shown) on connecting component/s and an optional aligner 875 (having optional drilled cavity) that can complement this engagement. A complementing aperture 880 can also be provided to participate in engagement along with substantially semi-circular aperture 870. Such an arrangement can restrict connecting component/s from dislocating from their position when in engagement with connector 850. Semi-circular aperture 870, optional aligner 875 (having optional drilled cavity) and complementing aperture 880 can be provided in a first portion 860 of connector 850 and can be further configured to commit to first set of engaging components. A second portion 865 can comprise a plurality of connecting apertures 883 that can initiate from first face 855A and terminate at second face 885B. These connecting apertures 883 can be dedicated to a second set of engaging component/s comprising but not limited to one or more supplementary modules and/or elementary unit 85 (FIGS. 4A and 4B). A plurality of alignment nubs 885 can be provided on second face 855B and can be further configured to complement connecting apertures 883. Disposition of semi-circular aperture 870 and its complementing features along in first portion 860 and connecting apertures 883 along with its complementing features in second portion 865 can allow the respective connecting components to be at a desirable angular relationship with each other. This angular relationship can range from a 0° relationship to a 180° relationship. In some configurations, the angular relationship can be between 30° and 150°.

Figure 53A:
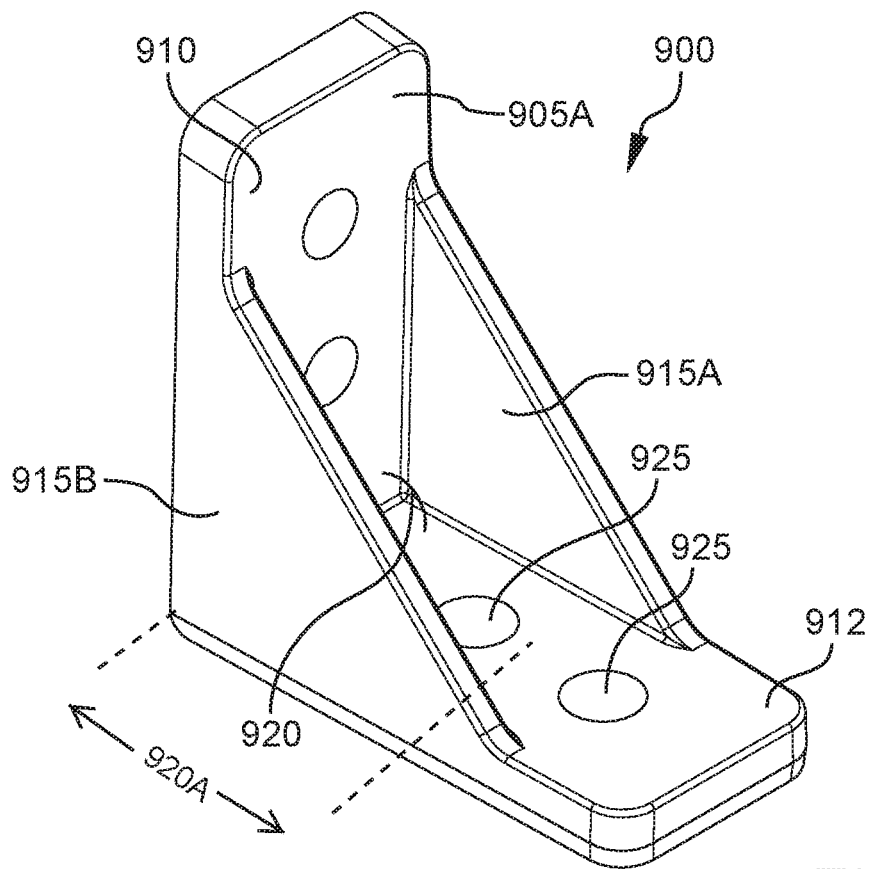
Figure 53B:
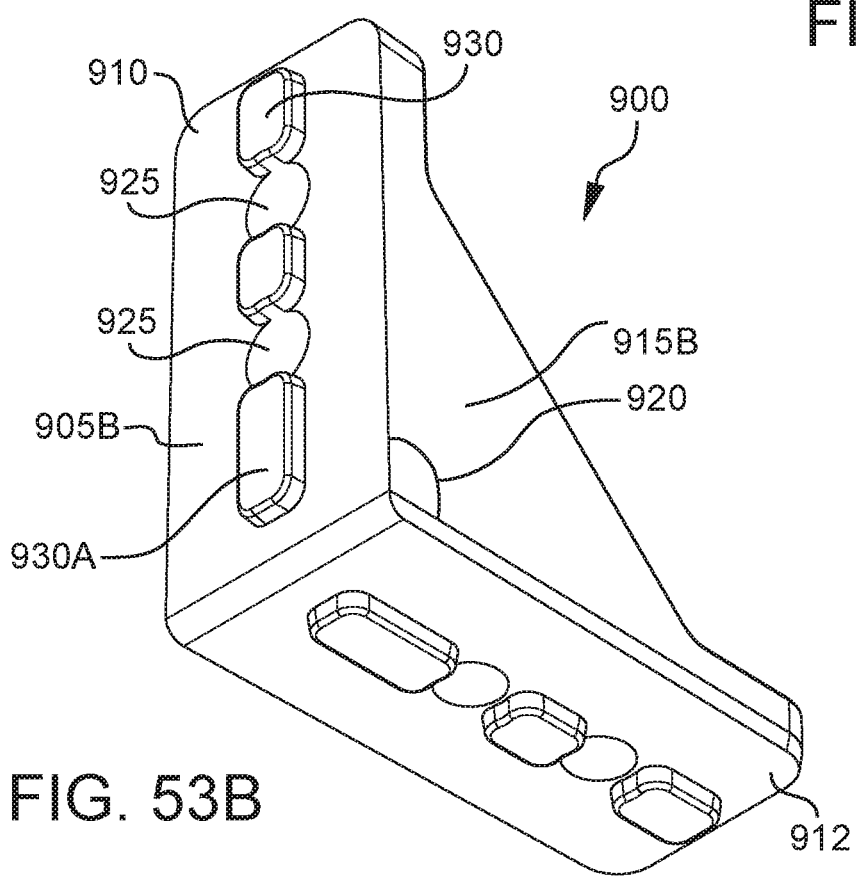

Referring now to FIGS. 53A and 53B in support with FIG. 4E. Inside corner bracket 900 can comprise a first arm 910 and a second arm 912 configured to engage at an angular junction 920. Bridges 915A and 915B can extend between first arm 910 and second arm 920 and can be disposed substantially parallel to each other. First arm 910, second arm 912 and bridges 915A, 915B can come together to form an interior 905A and an exterior 905B (FIG. 53B) of connector 900. A plurality of connecting apertures 925 can be provided on first arm 910 and second arm 912 and can initiate from interior 905A to terminate at exterior 905B (FIG. 53B). First arm 910 and second arm 912 can be engaged with their respective one or more supplementary modules and/or elementary unit 85 (FIG. 4A and FIG. 4B) through connecting apertures 925 thereby allowing a engagement between the two or more connecting components. FIG. 4E depicts a first elementary unit 85 in engagement with second elementary unit 85 through connector 900. The connecting components, in this example case, the elementary units 85, can come together to form frame 74 (FIG. 4E). Above discussed geometry of connector 900 can be configured to allow its disposition inside frame 74 thereby allowing interior 905A to face away from the connecting components. A plurality of alignment nubs 930 (FIG. 53B) can be provided at exterior 905B (FIG. 53B) to ensure an interrupted and stable engagement between connecting components such as but not limited to, one or more supplementary modules and/or elementary unit 85 (FIG. 4A and FIG. 4B) and connector 900. In some configurations, dimension and distribution of alignment nubs 930 (FIG. 53B) can be altered to achieve the desired engagement. A second configuration of alignment nubs 930A (FIG. 53B) is depicted for this purpose. Distance 920A can enable the use of fastening tools in confined spaces, for example, but not limited to, the use of a nut driver when other screws are present.

Referring now to FIG. 53C, lap corner bracket 30000-018 can include base connection cavity 30000-018A and side connection cavities 30000-018B that can be used to connect extrusions 4B-1A (FIG. 4B-1) and 4B-1B (FIG. 4B-1). The absence of nubs 30000-018C on surface 30000-018D can enable connections between extrusions.

Figure 54A:
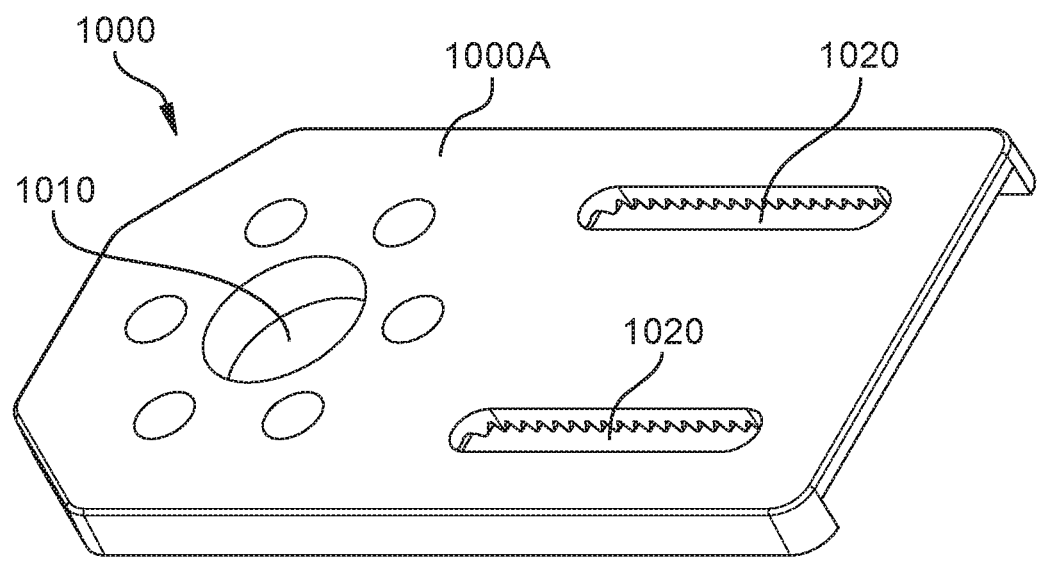
Figure 54B:
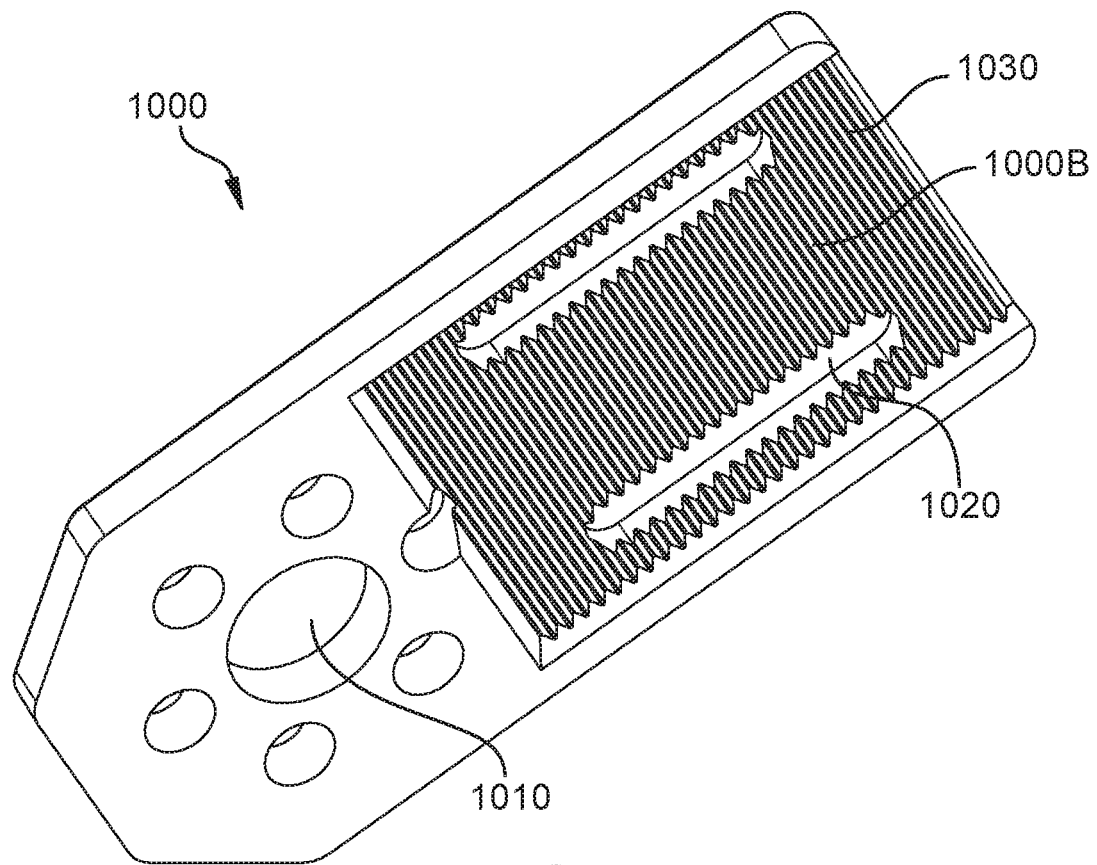
Figure 54D:
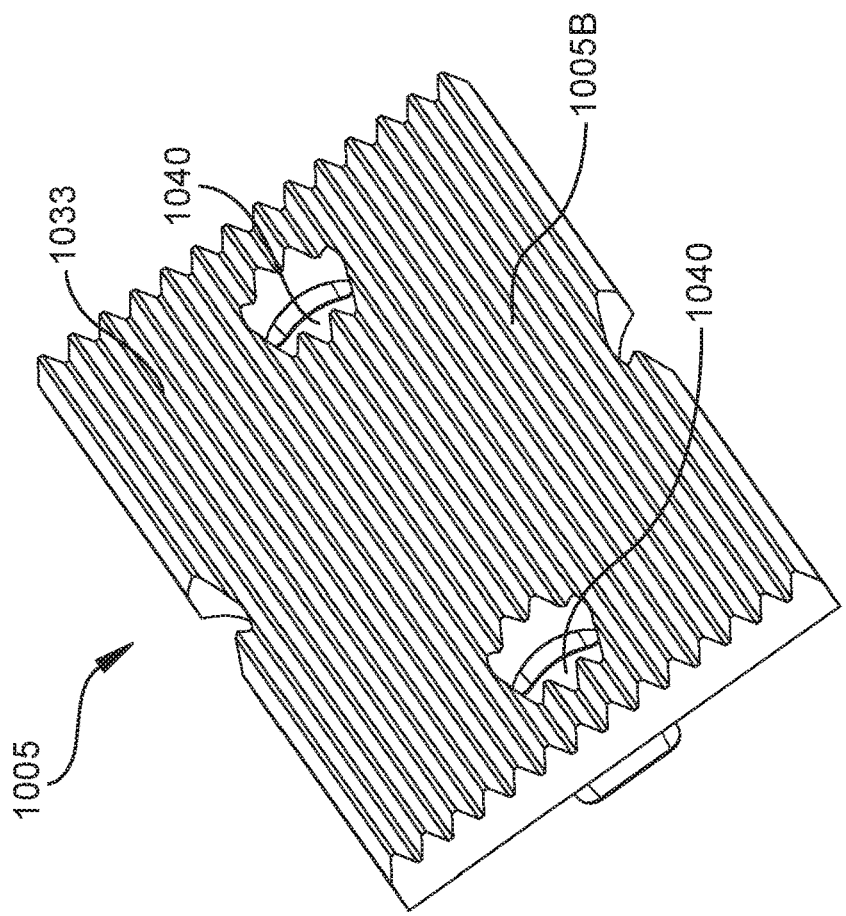
Figure 54C:
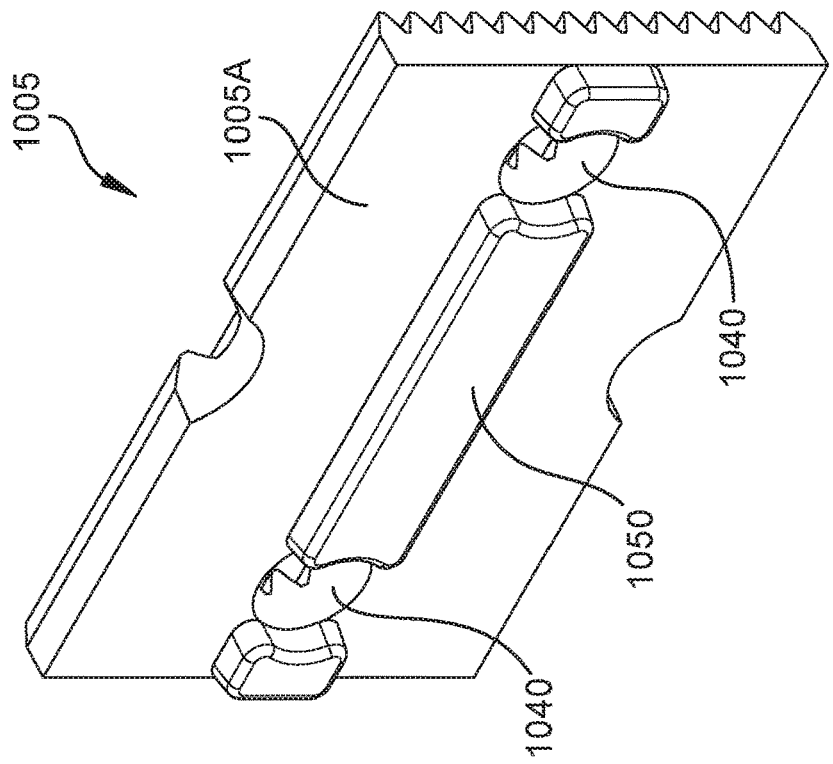

Referring now to FIG. 54A to FIG. 54D, indexable bracket 1000 can include, but is not limited to including, first face 1000A (FIG. 54A) and second face 1000B (FIG. 54B). Indexable bracket 1000 can include shaft receiving aperture 1010 configured to engage at least one shaft or a similar component there through. Indexable bracket 1000 can include two or more slidable slots 1020 configured to participate in engaging indexable bracket 1000 with at least one elementary unit 85 (FIG. 4B-1). Such an engagement can be achieved by receiving a stem of at least one screw through slidable slots 1020, a head of the receiving screw can be accommodated into elongated pockets provided on elementary unit 85 (FIG. 56). Second face 1000B of indexable bracket 1000 can further comprise a recessed spline 1030 configured to accommodate slidable slots 1020.

Continuing to refer to FIG. 54A to FIG. 54D, intermediate clamp 1005 can be configured to bridge engagement between indexable bracket 1000 and elementary unit 85 (FIG. 4B-1). A first surface 1005A of intermediate clamp 1005 can engage with elementary unit 85 (FIG. 4B-1) and a second surface 1005B can engage with second face 1000B of indexable bracket 1000 (FIG. 54A-54B). Mating of second surface 1005B of intermediate clamp 1005 and second face 1000B of indexable bracket 1000 can be obtained by providing complementing recessed spline 1033 on second surface 1005B of intermediate clamp 1005. Second surface 1005B can further provide two or more screw slots 1040 that can coincide with slidable slots 1020 of indexable clamp 1000. Intermediate clamp 1005 can be variably accommodated along a length of recessed spline 1030 of indexable bracket 1000. As a result of this feature one or more modules engaged with elementary unit 85 (FIG.

4B-1) through indexable bracket 1000 and intermediate clamp 1005, can be disposed at more than one positions with respect to elementary unit 85. Once fastened, engaged module can be easily adjusted by unscrewing and sliding indexable bracket 1000 to a desirable height. First surface 1005A can further comprise nodules 1050 configured to be accommodated into elongated pocket of elementary unit 85 (FIG. 4B-1) Nodules 1050 can be spaced to avoid interference with functioning of screw slots 1040. In some configurations, terminating ends of nodules 1050 can be curved to adjust T-slot screws that have been previously discussed in this application. Recesses 1005C can enable collision avoidance with motor and potentiometer mounting screws, for example. Discreet heights that can be achieved with recessed spline 1033 can be used for alignment.

Referring to FIGS. 55A and 55B, transfer of torque from one module to another can be achieved through mechanical coupling. The mechanical coupling can be compact and can maintain a high tolerance during operation of electro-mechanical agent 75 (FIG. 3). The mechanical coupling can be immune to external impacts caused during operation or non-operation of electro-mechanical agent 75 (FIG. 3), and can maintain the desirable torque transfer. Desirable transfer of torque from a shaft to a wheel, sprocket, gear, pulley or any similar component can require the use of efficient mechanical coupling with at least the characteristics described elsewhere herein. Adaptor 9000 can be configured to engage with hubs of mechanical modules such as but not limited to, wheels, including omni-wheels, gears, sprockets, and pulleys, of electro-mechanical agent 75 (FIG. 3). Adaptor 9000 can comprise a body 9005 that can be generally disc-shaped, and raised cylindrical portion 9010. Body 9005 can comprise first face 9005A and second face 9005B. First face 9005A can be oriented towards one of the engaging modules, such as wheels, sprockets, gears, pulleys, etc., while second face 9005B can be oriented towards a shaft or similar mechanical module. Second face 9005B can further comprise cylindrical raised portion 9010 configured to provide a bore 9020. In some configurations, bore 9020 can accept a regular cylindrical shaft. Hex bore 9020 can receive a hex shaft there through. Shaft (not shown), whether hex or cylindrical, can enter adaptor 9000 through one of the two faces 9005A and 9005B, and can exit the adaptor from the other of the other of two faces 9005A and 9005B. First face 9005A can comprise at least one projection 9015 configured to be received into a housing (not shown) in the engaging module such as, but not limited to wheels, sprockets, gears, pulleys, etc. Raised surface 9013 can serve as a thrust bearing agent during operation of electro-mechanical agent 75 (FIG. 3).

Referring now to FIG. 55C and FIG. 55D, exemplary assembly 9050 can enable the transfer of torque using adaptor 9000 from one module to another. Assembly 9050 can include more than one combination of modules for engagement and transfer of torque there between, as a result employing at least one adaptor 9000 for each of those combinations. Shaft 9030 can support exemplary traction wheel 2006-001 and example gear 3002-006. Adaptor 9000 can be employed at each junction where shaft 9030 meets and exits the wheel 2006-001 and/or gear 3002-006. Wheel 2006-001 and gear 3002-006 can comprise a central region with a pre-set hole pattern, as discussed elsewhere herein. Projection 9015 can be constructed to align with the pre-set hole pattern of gear 3002-006 or wheel 2006-001 or any other module that is to be engaged with shaft 9030. First surface 9000A can provide one or more projections 9015 such that they are aligned to be received into at least one of the holes of the pre-set hole pattern. Adaptor 9000 can provide apertures 9017 that can be disposed on surface 9005A such that they can align with the pre-set holes and allow engagement with modules, in this case the wheel and the gear, through a fastener that can be received there through. Holes 9017 can be configured to align with module from outside of the kit discussed elsewhere herein. An exemplary module from outside the kit can be, but not limited to being a module from a TETRIX® robotics kit or any other robotic kit in market. In some configurations, a screw and nut fastening between adaptor 9000 and the engaging module can be included. In some configurations, holes 9017 can be threaded and can be configured to accept screws such as, but not limited to M3 screws. Exemplary shaft 9030 can be received and rested within bore 9020 of adaptor 9000. First surface 9005A can comprise an optional indent 9025 for allowing an un-interrupted mating with a hub of the engaging module. The pre-sent hole pattern of the present teachings can comprise a raised periphery surrounding the corresponding bore of the wheels, gears, sprockets, pulleys, etc., that are configured to receive a regular or hex shaft. First surface 9005A can be constructed to receive the raised portion of the engaging module into indent 9025 along with trapping its projections 9015 into at least one of the holes belonging to the pre-set hole pattern of the engaging module.

Referring now to FIGS. 56A, 56B, 57A, and 57B, exemplary configurations of electro-mechanical agents 1100 and 1200 can comprise a plurality of electrical and mechanical modules discussed in earlier sections of this application. Exemplary electro-mechanical agents 1100 and 1200 can comprise configurations of modules different from those depicted in agent 75 (FIG. 3). It should be noted that more than one configuration of a module can be employed in a common electro-mechanical agent. Various combinations of suitable module configurations can be used to construct an electro-mechanical agent that can fulfill desirable tasks or carry out user-defined actions. Exemplary agents 1100 and 1200 can be categorized as a less sophisticated agent with less number of moving parts. However, agent 1100 can be built upon as required by a user. Agent 1100 can comprise mobility modules that can include, but not limited to traction wheels 2006-005 and omni-directional wheels 7000. Mobility modules can enable a forward and backward movement of agent 1100. Presence of omni-directional wheels 7000 can allow a smooth side-ways travel capability for agent 1100. Detailed discussion on wheels 7000 can be located through FIG. 6U-1 to FIG. 6U-15 and the relevant description. It should be noted that disposition or placement of omni-directional wheel 7000 or its configurations, can provide a holonomic drive to exemplary agent 1100. An example of an alternative disposition of mobility module 6006, a configuration of module 7000, can be illustrated through FIG. 57A and FIG. 57B and agent 1200 therein.

Continuing to refer to FIGS. 56A, 56B, 57A, and 57B, agent 1100 can comprise connector 8000 configured to engage elementary units 85 to form a base structure of agent 1100. Connector 1100 can further serve as a base platform for at least one module to rest or retained thereupon. Detailed discussion on connector 8000 can be obtained through FIGS. 40C-1 to 40C-5 and the relevant description of this application. Agent 1100 can further comprise an exemplary controller module 4004 that can serve as a brain of agent 1100 and can further comprise at least one computer programmable controller and at least one hardware controller. Exemplary gear motor enclosure 5000 with gear motor 2000A (FIG. 15C-1) therein can engage with at least one movable module of agent 1100. Gear motor 2000A (FIG. 15C-1) can be engaged, but not limited to being engaged with exemplary traction wheels 2006-005 for a desirable motion of agent 1100. An elaborated discussion on above mentioned exemplary gear motor can be obtained through FIG. 15A to FIG. 15I and the relevant description of this specification.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on a different computer. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A kit for constructing an electro-mechanical agent configured to achieve one or more pre-determined tasks, the kit comprising:
    at least one rail structure having a plurality of rail surfaces, each of the plurality of rail surfaces including a pre-defined rail slot pattern, the pre-defined rail slot pattern receiving at least one fastener;
    at least one unit including at least one of the at least one rail structures, the at least one unit forming a support structure for at least one module;
    at least one connector operably coupling the at least one unit to the at least one module, the at least one connector including a first surface and a second surface, the first surface including a plurality of protrusions operably coupling with at least one of the plurality of rail surfaces in the pre-defined rail slot pattern, the second surface including at least one hole receiving the at least one fastener, the second surface operably coupling with at least one portion of the at least one module;
    at least one user interface receiving at least one command from a user;
    at least one communicator receiving and interpreting the at least one command, forming at least one interpreted command, through at least one communications network, the at least one communicator receiving data related to the at least one module, the at least one communicator transmitting the data to the at least one user interface through the at least one communications network;
    at least one controller receiving the at least one interpreted command, the at least one controller controlling the at least one module based at least on the at least one interpreted command; and
    at least one power source providing power to the at least one controller, the at least one communicator, and the at least one module,
    wherein the electro-mechanical agent includes at least one of the at least one unit.

2. The kit as in claim 1 wherein the at least one user interface comprises:
    a device including at least one user input means and at least one display means.

3. The kit as in claim 1 wherein the at least one rail structure comprises an extrusion.

4. The kit as in claim 1 wherein the at least one connector comprises a variable angle connector, the variable angle connector including at least one semi-circular aperture accommodating variable angle connections and a complementing aperture.

5. The kit as in claim 1 wherein the at least one connector comprises an indexable connector, the indexable connector including a first piece including a first splined surface and an opposite planar surface, the first piece including apertures to receive fasteners, the indexable connector including a second piece variably engaging with the first piece, the second piece including a top portion and a bottom portion, the top portion including a hole pattern, the bottom portion having at least one slot and a second splined surface complementarily mating with the first splined surface.

6. The kit as in claim 5 wherein the at least one connector comprises a servo motor connector, the servo motor connector including an embedded cavity receiving a servo motor, a frame within the embedded cavity, housing the servo motor, peripheral apertures along a peripheral of the frame accommodating the servo motor, at least one alignment nub, and connecting apertures associated with the at least one alignment nub.

7. The kit as in claim 1 wherein the at least one connector comprises a variable angle connector, the variable angle connector including a first portion and a second portion, the first portion including at least one semi-circular aperture and a complementing aperture, the second portion including a plurality of connecting apertures associated with a plurality of alignment nubs.

8. The kit as in claim 1 where the at least one connector comprises a plate, the plate including a pattern of dimples, the pattern of dimples enabling drilling of mounting points on the plate, the plate including at least two converging slots, the at least two converging slots including openings at points where the at least two converging slots intersect.

9. The kit as in claim 1 wherein the at least one module comprises:
  a hole pattern enabling compatibility with others of the at least one module in the kit; and
  a hex shaft enabling connectivity with others of the at least one module in the kit.

10. The kit as in claim 1 further comprising:
  a gear motor enclosure accommodating multiple gear configurations.

11. A kit for constructing an electro-mechanical agent configured to achieve one or more pre-determined tasks, the kit comprising:
  at least one rail structure having a plurality of rail surfaces, each of the plurality of rail surfaces including a pre-defined rail slot pattern, the pre-defined rail slot pattern receiving at least one fastener;
  at least one unit including at least one of the at least one rail structures, the at least one unit forming a support structure for at least one module;
  at least one connector operably coupling the at least one unit to the at least one module, the at least one connector including a first surface and a second surface, the first surface including a plurality of protrusions operably coupling with at least one of the plurality of rail surfaces in the pre-defined rail slot pattern, the second surface including at least one hole receiving the at least one fastener, the second surface operably coupling with at least one portion of the at least one module;
  at least one communicator receiving and interpreting at least one command through at least one communications network, the at least one communicator receiving data related to the at least one module, the at least one communicator transmitting the data through the at least one communications network;
  at least one controller receiving the interpreted at least one command, the at least one controller controlling the at least one module based at least on the interpreted at least one command; and
  at least one power source providing power to the at least one controller, the at least one communicator, and the at least one module,
  wherein the electro-mechanical agent includes at least one of the at least one unit.

12. The kit as in claim 11 wherein the at least one rail structure comprises an extrusion.

13. The kit as in claim 11 wherein the at least one connector comprises an indexable connector, the indexable connector including a first piece including a first splined surface and an opposite planar surface, the first piece including apertures to receive fasteners, the indexable connector including a second piece variably engaging with the first piece, the second piece including a top portion and a bottom portion, the top portion including a hole pattern, the bottom portion having at least one slot and a second splined surface complementarily mating with the first splined surface.

14. The kit as in claim 13 wherein the at least one connector comprises a servo motor connector, the servo motor connector including an embedded cavity receiving a servo motor, a frame, within the embedded cavity, housing the servo motor, peripheral apertures along a peripheral of the frame accommodating the servo motor, at least one alignment nub, and connecting apertures associated with the at least one alignment nub.

15. The kit as in claim 11 wherein the at least one connector comprises a variable angle connector, the variable angle connector including a first portion and a second portion, the first portion including at least one semi-circular aperture and a complementing aperture, the second portion including a plurality of connecting apertures associated with a plurality of alignment nubs.

16. The kit as in claim 11 where the at least one connector comprises a plate, the plate including a pattern of dimples, the pattern of dimples enabling drilling of mounting points on the plate, the plate including at least two converging slots, the at least two converging slots including openings at points where the at least two converging slots intersect.

17. A modular construction kit comprising:
  a base including at least one extrusion;
  at least one mechanical component attached, by a first at least one connector, to the base, the first at least one connector including an indexable connector, the indexable connector including a first piece, the first piece including a first splined surface and an opposite planar surface, the first piece including apertures to receive fasteners, the indexable connector including a second piece, the second piece variably engaging with the first piece, the second piece including a top portion and a bottom portion, the top portion including a hole pattern, the bottom portion having at least one slot and a second splined surface complementarily mating with the first splined surface;
  at least one electrical component attached, by a second at least one connector, to the base;
  at least one controller enclosure attached, by a third at least one connector, to the base, the at least one controller enclosure including at least one communications system and at least one controller module,
  wherein the at least one controller module directs the at least one electrical component to move the at least one mechanical component according to commands received by the at least one communications system.

18. The modular construction kit as in claim 17 further comprising at least one sensor enclosure attached, by at least one fourth at least one connector, to the base, the at least one sensor enclosure including at least one sensor, the at least one sensor sensing environmental characteristics in the vicinity of the modular construction kit.

19. The modular construction kit as in claim 17 further comprising at least one shaft collar attaching the at least one mechanical component to the base, the at least one shaft collar including a first part and a second part, the first part including a head region and a body, the second part including a locking fixture engaging the body, the body including cantilever crenellations protruding from the head region, the locking fixture including a plurality of rings engaging the cantilever crenellations.

* * * * *